US012704863B2

(12) United States Patent
Blair et al.

(10) Patent No.: US 12,704,863 B2
(45) Date of Patent: Aug. 11, 2026

(54) VEHICLE SEAT ASSEMBLY AND SUBASSEMBLIES THEREOF

(71) Applicant: LEAR CORPORATION, Southfield, MI (US)

(72) Inventors: Samuel Blair, Rochester, MI (US); David Abdella, Farmington Hills, MI (US); Joshua Hallock, Warren, MI (US); Ashley Baisch, Washington Township, MI (US); Benedict J. Messina, Warren, MI (US); Ramon Arias, Southfield, MI (US); Ronald L. Miotto, Canton, MI (US); Thomas Welch, Jr., Ortonville, MI (US); Thomas A. Welch, Sr., Ortonville, MI (US); Christopher D. Johnson, Novi, MI (US); Lisa Swikoski, West Bloomfield, MI (US); Mitchell Wing, Southfield, MI (US); Grzegorz Kasperczyk, Warsaw (PL); Salim Marouf, Ann Arbor, MI (US); Ian Fletcher, Milford, MI (US); Sumanth Muthyala, Ann Arbor, MI (US); Tyler Washington, Southfield, MI (US); Ibrahim Valenzuela, Novi, MI (US); Paul Severinski, Brownstown, MI (US); Louella Patterson, Goodells, MI (US); Michelle A. Brudzynsky, Farmington Hills, MI (US); Srikanth Bheemshetty, Pune (IN); Jayant Chaudhari, Pune (IN); Akshay Jadhav, Pune (IN); David Hale, Southfield, MI (US); Vyachislav Ivanov, West Bloomfield, MI (US); William Paruszkiewicz, Clinton Township, MI (US); Mark Karges, Macomb, MI (US)

(73) Assignee: LEAR CORPORATION, Southfield, MI (US)

( * ) Notice: Subject to any disclaimer, the term of this patent is extended or adjusted under 35 U.S.C. 154(b) by 42 days.

(21) Appl. No.: 18/874,000

(22) PCT Filed: Jun. 15, 2023

(86) PCT No.: PCT/US2023/025483

§ 371 (c)(1),
(2) Date: Dec. 11, 2024

(87) PCT Pub. No.: WO2023/244763

PCT Pub. Date: Dec. 21, 2023

(65) Prior Publication Data

US 2026/0037010 A1 Feb. 5, 2026

Related U.S. Application Data

(63) Continuation-in-part of application No. 17/841,745, filed on Jun. 16, 2022, and a continuation of (Continued)

(30) Foreign Application Priority Data

Jan. 19, 2023 (DK) ................................. 202370027
Jan. 19, 2023 (DK) ................................. 202370030

(51) Int. Cl.
*G05D 16/20* (2006.01)
*B60N 2/90* (2018.01)

(52) U.S. Cl.
CPC .......... *G05D 16/204* (2013.01); *B60N 2/914* (2018.02); *G05D 16/2024* (2019.01)

(58) Field of Classification Search
CPC ... G05D 16/204; G05D 16/2024; B60N 2/914
See application file for complete search history.

(56) References Cited

U.S. PATENT DOCUMENTS 6,481,418 B1 11/2002 Ristich et al.
2005/0092168 A1 5/2005 Christopher (Continued)

FOREIGN PATENT DOCUMENTS

CN 111449930 A 7/2020
DE 10056235 A1 5/2002
EP 3599128 A1 1/2020

OTHER PUBLICATIONS

International Search Report and Written Opinion for PCT/2023/25483 mailed Nov. 21, 2023.

*Primary Examiner* — P. Macade Nichols
(74) *Attorney, Agent, or Firm* — Carlson, Gaskey & Olds, P.C.

(57) ABSTRACT

Seat assemblies and subassemblies to fluidly actuate seat actuators, such as massage bladders are disclosed. The (Continued)

subassemblies include various valve assemblies to maximize output function while minimizing component quantity and optimizing valve assembly compactness. The valve assemblies provide dual sided linear valves, gate valve matrices, valve output multiplication by shared actuation, fluid circuit control logic to multiplex valve output, and/or three position valves.

20 Claims, 99 Drawing Sheets

Related U.S. Application Data application No. 18/087,223, filed on Dec. 22, 2022, now Pat. No. 12,326,742, and a continuation of application No. 17/983,881, filed on Nov. 9, 2022, now Pat. No. 12,337,738, and a continuation-in-part of application No. 18/087,050, filed on Dec. 22, 2022, now abandoned, application No. 18/874,000 is a continuation-in-part of application No. 18/085,120, filed on Dec. 20, 2022.

(60) Provisional application No. 63/357,060, filed on Jun. 30, 2022, provisional application No. 63/393,386, filed on Jul. 29, 2022, provisional application No. 63/393,382, filed on Jul. 29, 2022, provisional application No. 63/393,389, filed on Jul. 29, 2022, provisional application No. 63/354,079, filed on Jun. 21, 2022, provisional application No. 63/393,392, filed on Jul. 29, 2022, provisional application No. 63/411,400, filed on Sep. 29, 2022, provisional application No. 63/354,319, filed on Jun. 22, 2022, provisional application No. 63/356,324, filed on Jun. 28, 2022, provisional application No. 63/356,093, filed on Jun. 28, 2022, provisional application No. 63/354,977, filed on Jun. 23, 2022, provisional application No. 63/393,141, filed on Jul. 28, 2022, provisional application No. 63/392,914, filed on Jul. 28, 2022, provisional application No. 63/392,926, filed on Jul. 28, 2022, provisional application No. 63/433,599, filed on Dec. 19, 2022, provisional application No. 63/354,412, filed on Jun. 22, 2022, provisional application No. 63/357,001, filed on Jun. 30, 2022.

(56) References Cited

U.S. PATENT DOCUMENTS

| | | | | |
|---|---|---|---|---|
| 2005/0256626 | A1 | 11/2005 | Hsieh et al. | |
| 2011/0227388 | A1 | 9/2011 | Bocsanyi et al. | |
| 2017/0015222 | A1 | 1/2017 | Dankbaar et al. | |
| 2017/0266070 | A1 | 9/2017 | Bobey et al. | |
| 2018/0100520 | A1 | 4/2018 | Bissbort et al. | |
| 2018/0202569 | A1 | 7/2018 | Kawase et al. | |
| 2020/0103047 | A1* | 4/2020 | Beuschel .............. | F16K 31/025 |
| 2025/0153620 | A1* | 5/2025 | Kasperczyk ........... | B60N 2/976 |

* cited by examiner

6602 Attaching a trim cover layer to a nonfoam layer

6604 Attaching one or more fasteners to the trim cover layer and/or the nonfoam layer such that the trim cover layer, the nonfoam layer, and the one or more fasteners form a trim assembly.

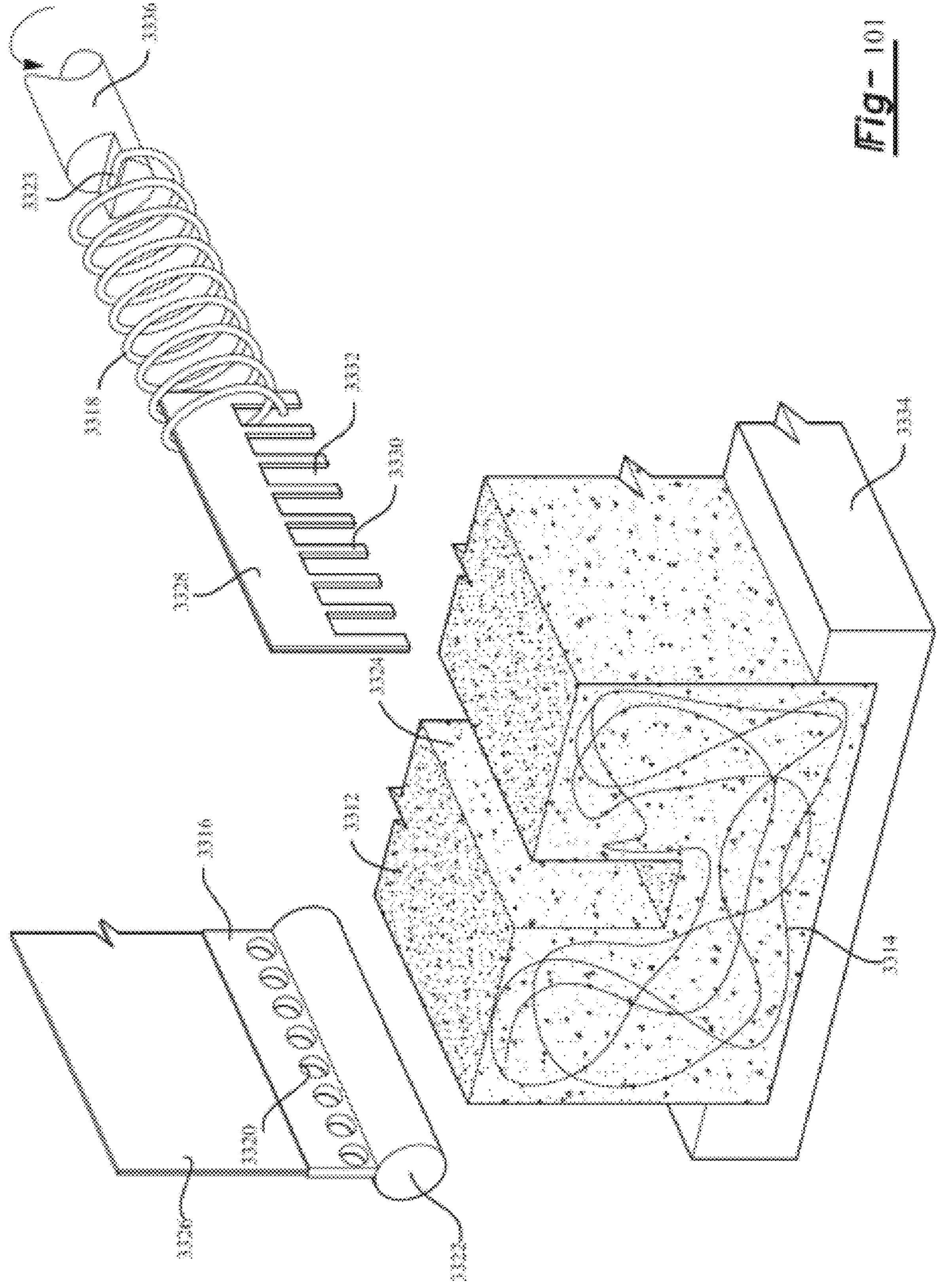
*Fig*- 101

3432
3434
3436
3428
BW
3442
RT
RW
3438
CW 3432
3434
3436
3442
3428
3438

3432
3431
3436
3442
3438
3428

3432
3442
3428
3438

3644
D3
3646
3652
3650
D4
3648

3654
3656
3668
3666
3662
3660
3672
3658
3670
3664
D5
3648

3646
A3
3625
D6
3672
3653
3650

3674
3672
3652
Air Valve
3676
3650

3700
3702
3704
3708
3706

3902
3900
3906
3904

3906
3900
3902
3904

3908
3910
3904
3900
3912
3914
310

3900
3902
3904
3918
3906
$W_D$
$W_C$ 3902
3900
3904
3904
3902
3900
3906
3906
3904
3900
3902
3900
3902
3932
3900
3902
3932
3706
3700
3704
3702
3900
3902
3932

5700
5704
5734
5752
5750
5754 5706
5756
5744
5746
5722
5720
5714
5726
5702
5716
5656
5732
5730
5742 5602
5740
5712 5702
5710

VEHICLE SEAT ASSEMBLY AND SUBASSEMBLIES THEREOF

CROSS-REFERENCE TO RELATED APPLICATIONS

This application is a continuation-in-part of U.S. patent application Ser. No. 17/841,745 filed on Jun. 16, 2022; claims the benefit of U.S. Provisional Patent Application No. 63/357,060 filed on Jun. 30, 2022; claims the benefit of U.S. Provisional Patent Application No. 63/393,386 filed on Jul. 29, 2022; claims the benefit of U.S. Provisional Patent Application No. 63/393,382 filed on Jul. 29, 2022; claims the benefit of U.S. Provisional Patent Application No. 63/393,389 filed on Jul. 29, 2022; claims the benefit of U.S. Provisional Patent Application No. 63/354,079 filed on Jun. 21, 2022; claims the benefit of U.S. Provisional Patent Application No. 63/393,392 filed on Jul. 29, 2022; claims the benefit of U.S. Provisional Patent Application No. 63/411,400 filed on Sep. 29, 2022; is a continuation-in-part of U.S. patent application Ser. No. 18/085,120 filed on Dec. 20, 2022; claims the benefit of U.S. Provisional Patent Application No. 63/354,412 filed on Jun. 22, 2022; claims the benefit of U.S. Provisional Patent Application No. 63/357,101 filed on Jun. 30, 2022; is a continuation-in-part of U.S. patent application Ser. No. 18/087,223 filed on Dec. 22, 2022; claims the benefit of U.S. Provisional Patent Application No. 63/354,319 filed on Jun. 22, 2022; claims the benefit of U.S. Provisional Patent Application No. 63/356,324 filed on Jun. 28, 2022; claims priority of Denmark Patent Application No. PA 2023 70030 filed on Jan. 19, 2023; claims the benefit of U.S. Provisional Patent Application No. 63/356,093 filed on Jun. 28, 2022; claims priority of Denmark Patent Application No. PA 2023 70027 filed on Jan. 19, 2023; claims the benefit of U.S. Provisional Patent Application No. 63/354,977 filed on Jun. 23, 2022; claims the benefit of U.S. Provisional Patent Application No. 63/393,141 filed on Jul. 28, 2022; claims the benefit of U.S. Provisional Patent Application No. 63/392,914 filed on Jul. 28, 2022; claims the benefit of U.S. Provisional Patent Application No. 63/392,926 filed on Jul. 28, 2022; is a continuation-in-part of U.S. patent application Ser. No. 17/983,881 filed on Nov. 9, 2022; claims the benefit of U.S. Provisional Patent Application No. 63/433,599 filed on Dec. 19, 2022; is a continuation-in-part of U.S. patent application Ser. No. 18/087,850 filed on Dec. 23, 2022, the disclosures of which are hereby incorporated by reference in their entirety.

TECHNICAL FIELD

The present disclosure relates seat assemblies and subassemblies thereof. More specifically the present disclosure relates to vehicle seat assemblies and subassemblies such as fluid assemblies (e.g., ventilation and/or massaging assemblies, valve assemblies), trim assemblies, cushion assemblies, and temperature control/transfer assemblies.

BRIEF DESCRIPTION OF THE DRAWINGS

FIG. 101 is an exploded perspective view of the mesh body that defines a groove for receiving the tie down strip with the spiral retainer, and a guide comb used to align the spiral retainer with the holes defined in the tie down strip.

FIG. 110B illustrates a method in accordance with some embodiments.

FIG. 115 is a plan view of a polymer sheet showing a layout of the blank to be cutout to form two bladders and the dual conduit according to a second embodiment of this disclosure.

FIGS. 116 and 117 are elevation views of the bladders and the dual conduit in process according to the embodiment of FIG. 115.

FIG. 118 is an elevation view of the completed bladders and the dial conduit according to the embodiment of FIG. 115.

FIG. 119 is a process flowchart illustrating the steps performed to manufacture the embodiment of FIG. 115.

FIG. 120 is a fluid system for a seat assembly.

FIG. 121 is a top view of a first embodiment of a compression resistant support structure for facilitating fluid movement.

FIG. 122 is a bottom view of the first embodiment of the compression resistant support structure.

FIG. 123 is a side view of the first embodiment of the compression resistant support structure.

FIG. 124 is various embodiments of compression resistant support structures.

FIG. 125 is top view of a second embodiment of a compression resistant support structure for facilitating fluid movement.

FIG. 126 is a cross-sectional schematic view of a third embodiment of the compression resistant support structure.

FIG. 127 is a portion of the second or third embodiments of the compression resistant support structure.

Figure 128:
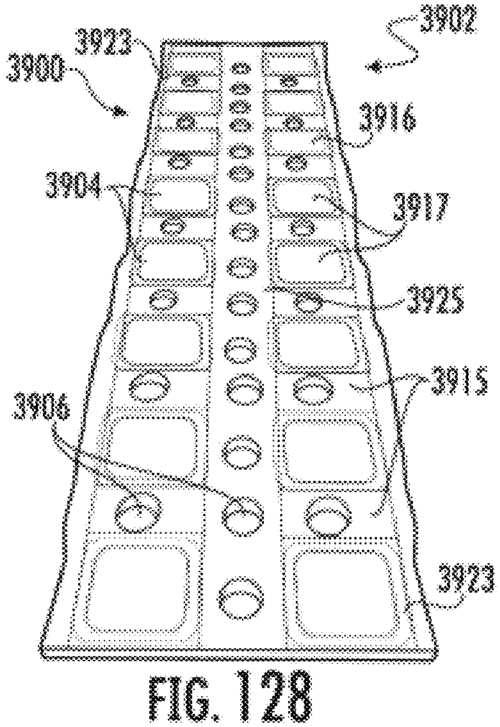

FIG. 128 is a top view of a fourth embodiment of a compression resistant support structure for facilitating fluid movement.

Figure 129:
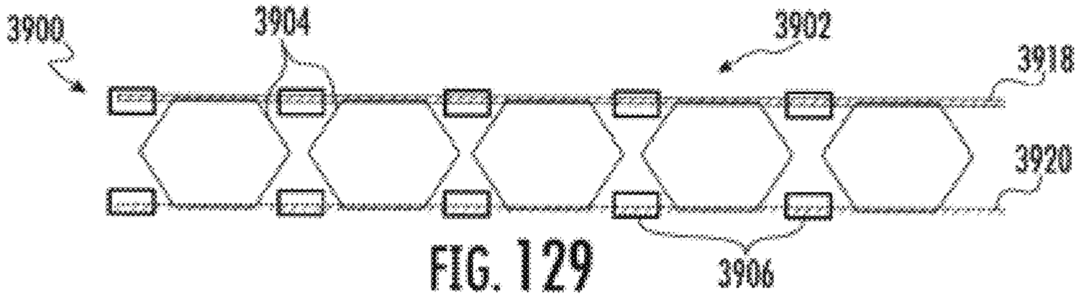
Figure 130:
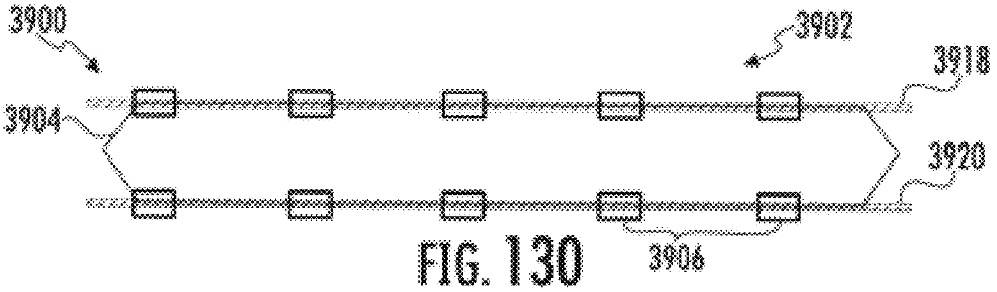

FIGS. 129-130 are cross-sectional schematic views of embodiments of a compression resistant support structure with cells for facilitating fluid movement such as in FIG. 128.

Figure 131:
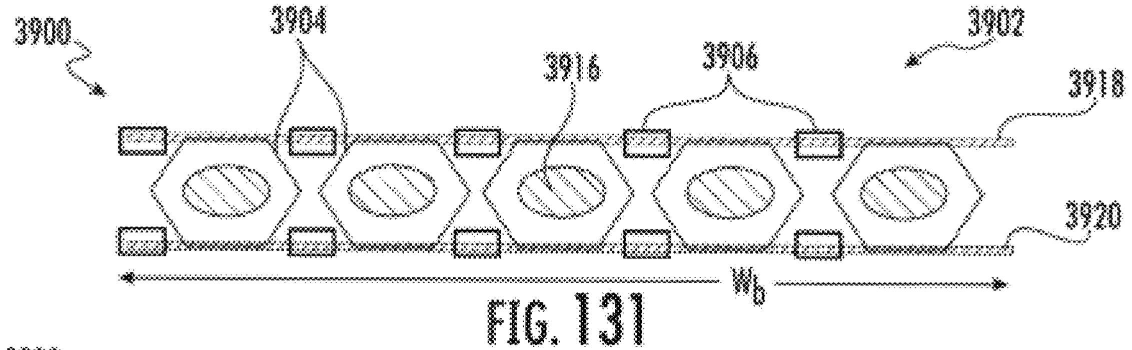
Figure 132:
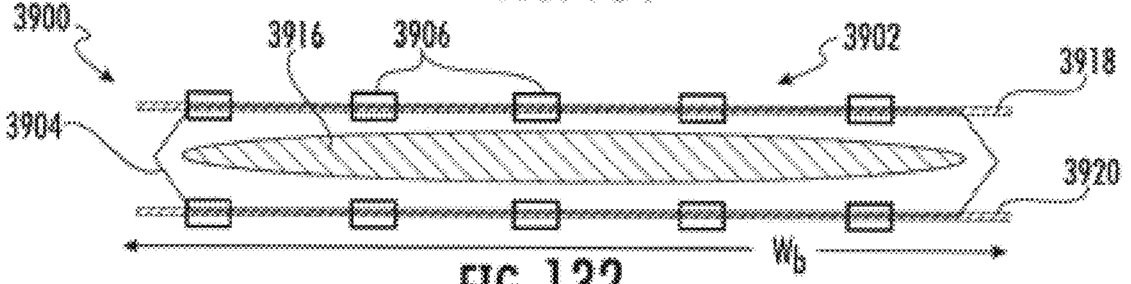

FIGS. 131-132 are cross-sectional schematic views of the embodiments of FIGS. 129-130 respectively where the cells are filled with foam.

Figure 133:
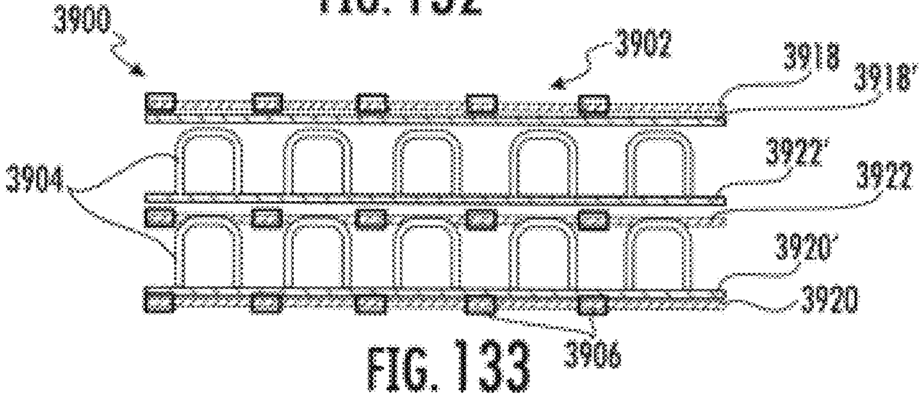

FIG. 133 is cross-sectional schematic view of some embodiments of a compression resistant support structure.

Figure 134:
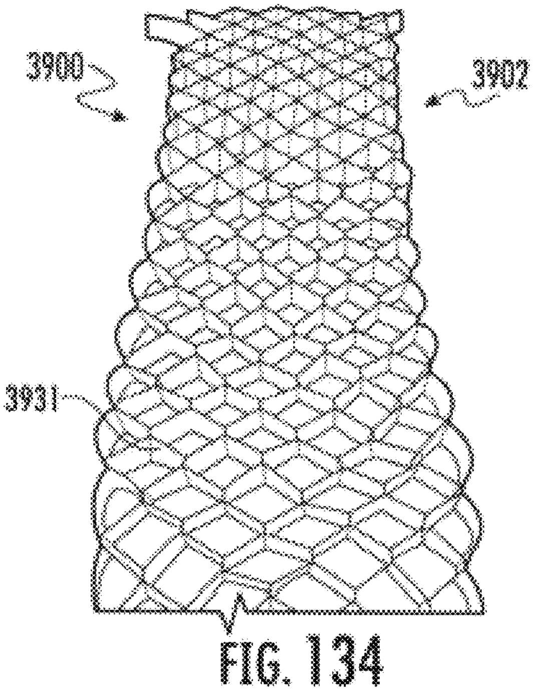

FIG. 134 is a top view of an embodiments of a compression resistant support structure having a honeycomb structure.

Figure 135:
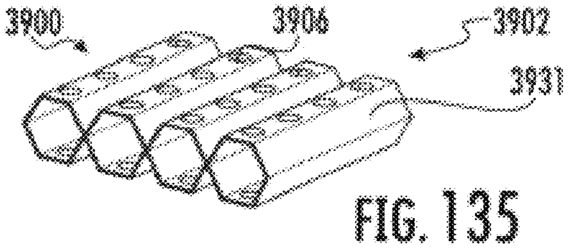

FIG. 135 is a side perspective view a sheet that is used to form a honeycomb structure.

Figure 136:
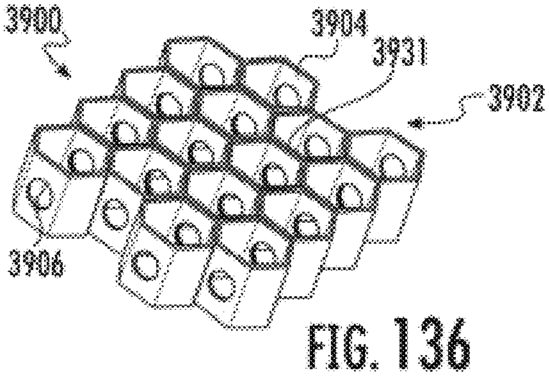

FIG. 136 is a top perspective view of a honeycomb structure using a plurality of sheets as shown in FIG. 135.

Figure 137:
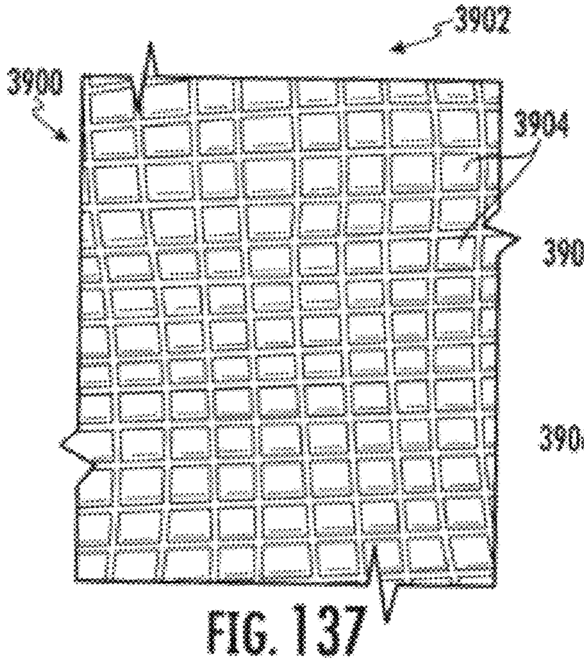
Figure 138:
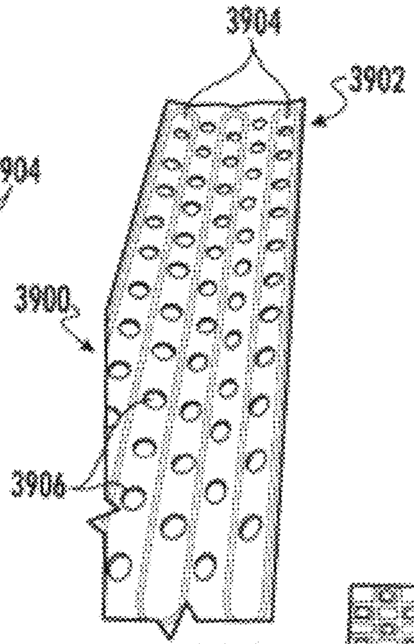
Figure 139:
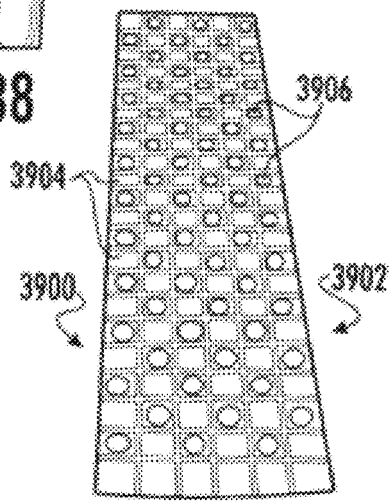

FIGS. 137-139 are top views of three additional embodiments of a compression resistant support structure.

Figure 140:
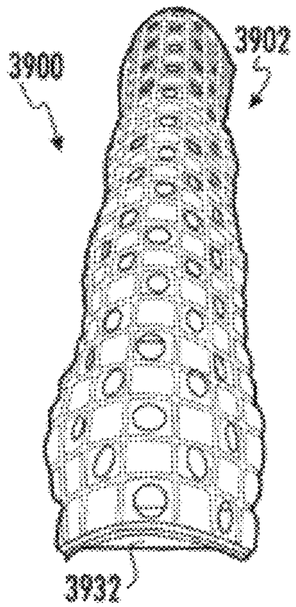

FIG. 140 is a top view of a bridged compression resistant support structure.

Figure 141:
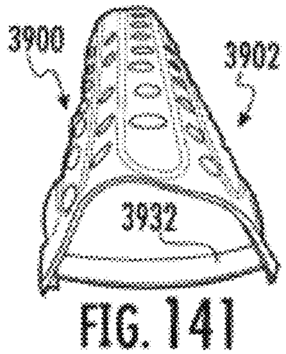
Figure 142:
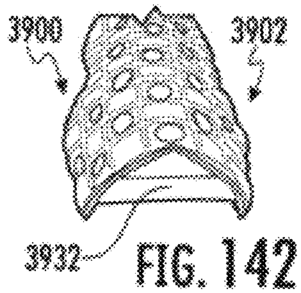

FIGS. 141-142 are perspective side view of bridged compression resistant support structures.

Figure 143:
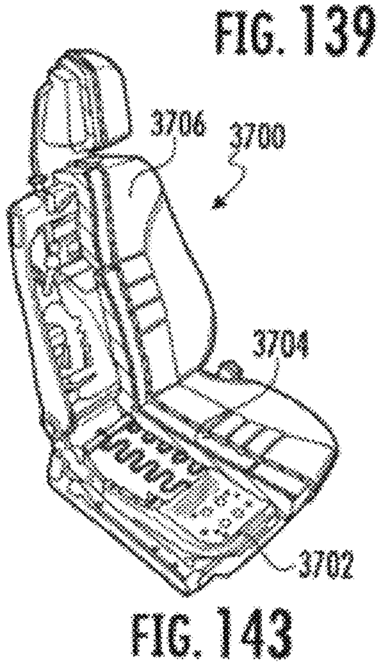

FIG. 143 is a perspective view of a seat assembly with a portion of the seat removed to provide a cross-sectional view.

Figure 144:
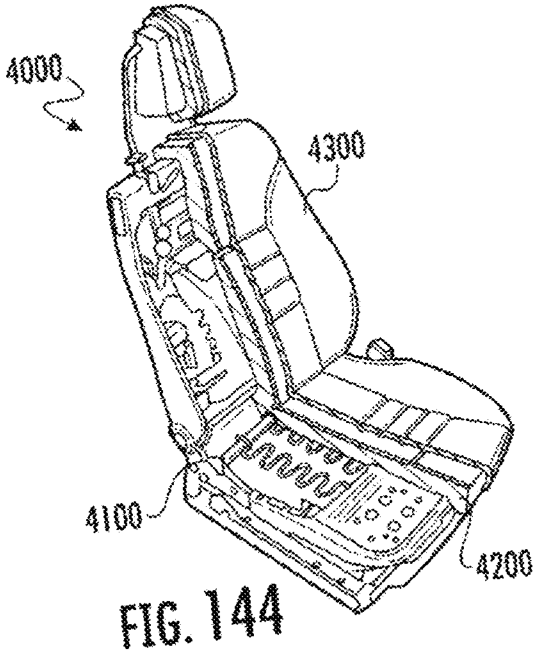

FIG. 144 is a perspective view of an embodiment of a seat assembly with a portion of the trim cover and cushion removed presenting a partial cross-sectional view.

Figure 145:
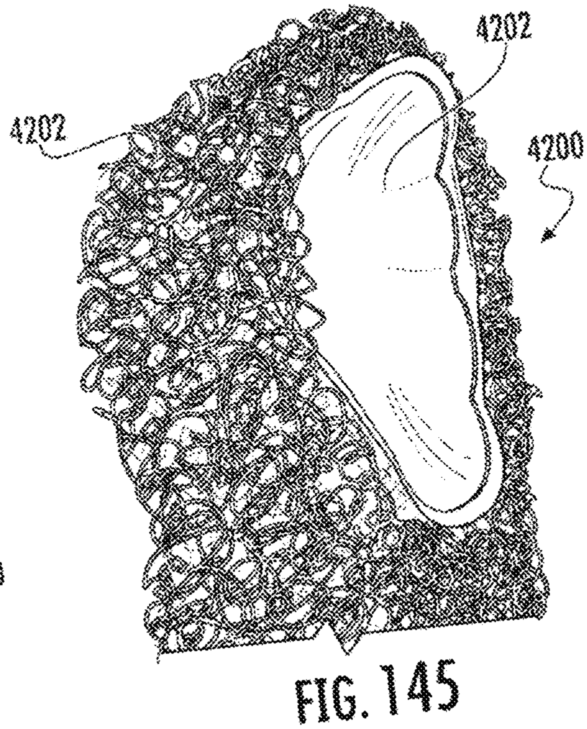

FIG. 145 is perspective view of an embodiment of a non-foam/foamless cushion having a portion of a fluid system disposed therein.

Figure 146:
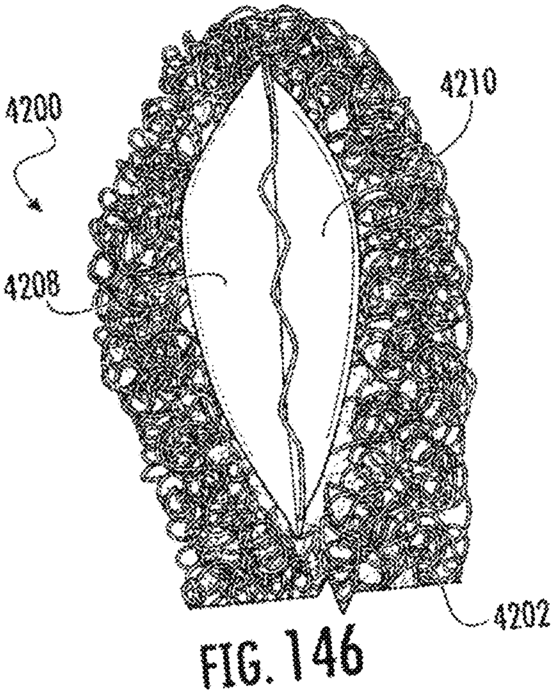

FIG. 146 is a side view of a non-foam/foamless cushion assembly having a portion of a fluid system disposed therein.

Figure 147:
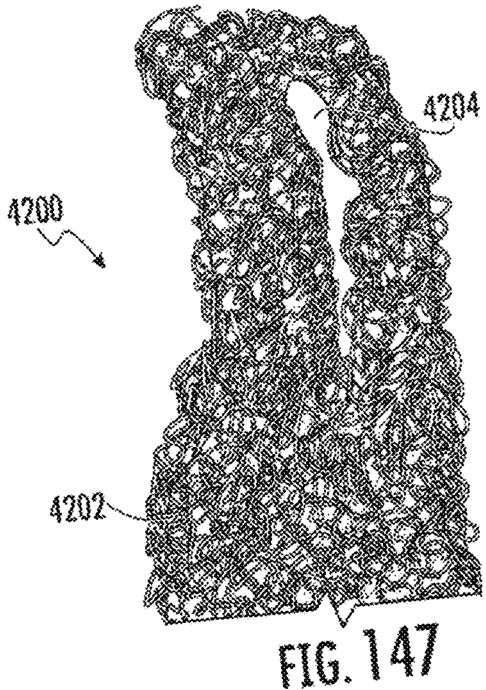

FIG. 147 is a side view of a non-foam/foamless cushion assembly of FIG. 146 with the fluid system removed.

Figure 148:
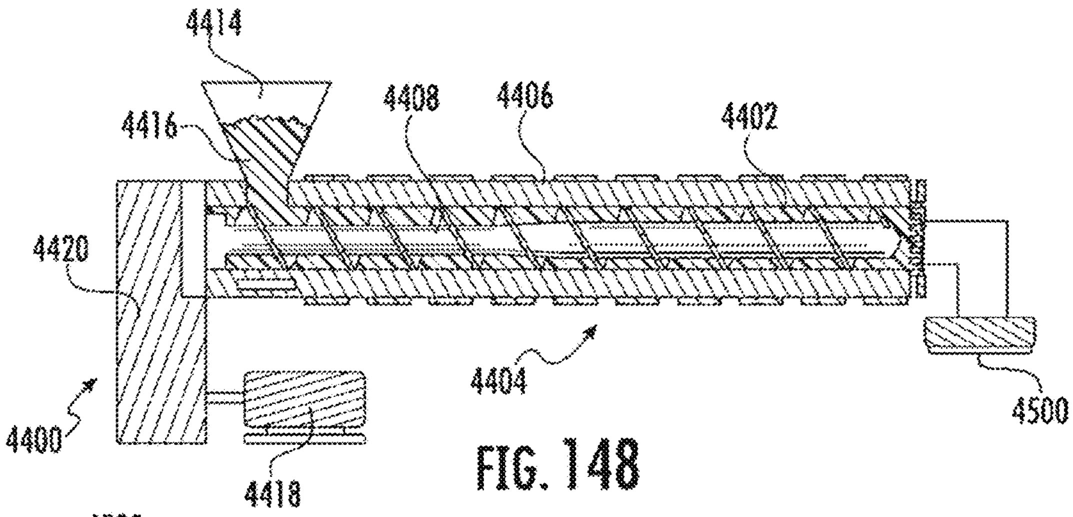

FIG. 148 is a cross-sectional side view of an embodiment of a system for making a non-foam/foamless cushion.

Figure 149:
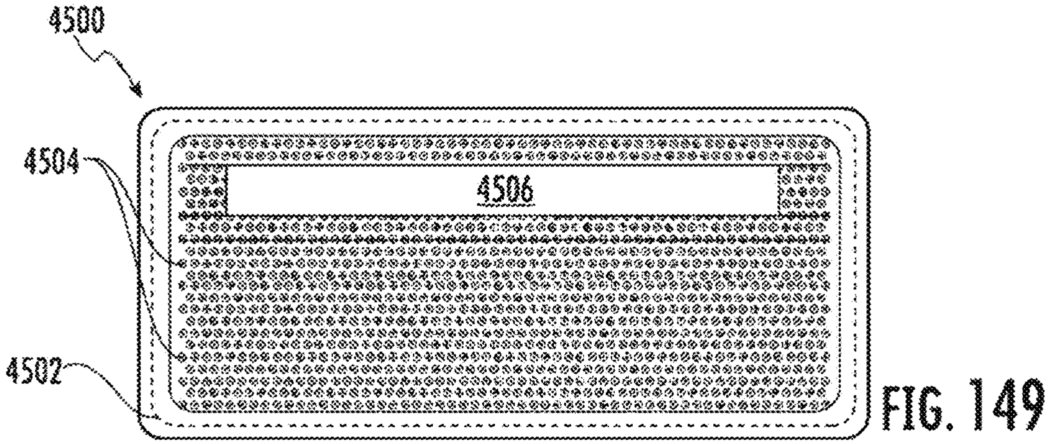

FIG. 149 is a bottom view of a die head (i.e., breaker plate).

Figure 150:
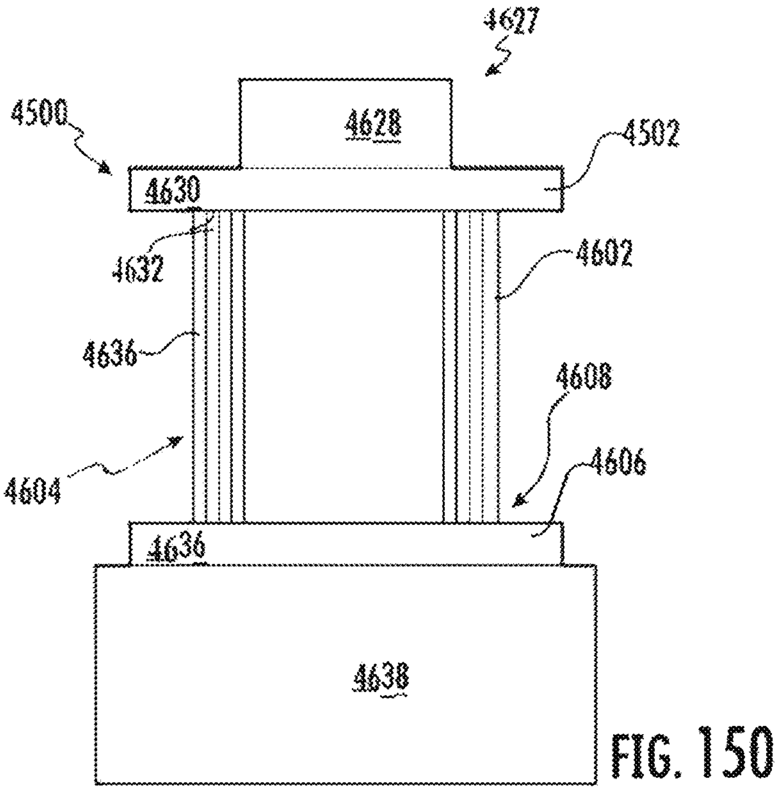

FIG. 150 is a schematic of a plurality of polymeric strands being dispensed from a die.

Figure 151:
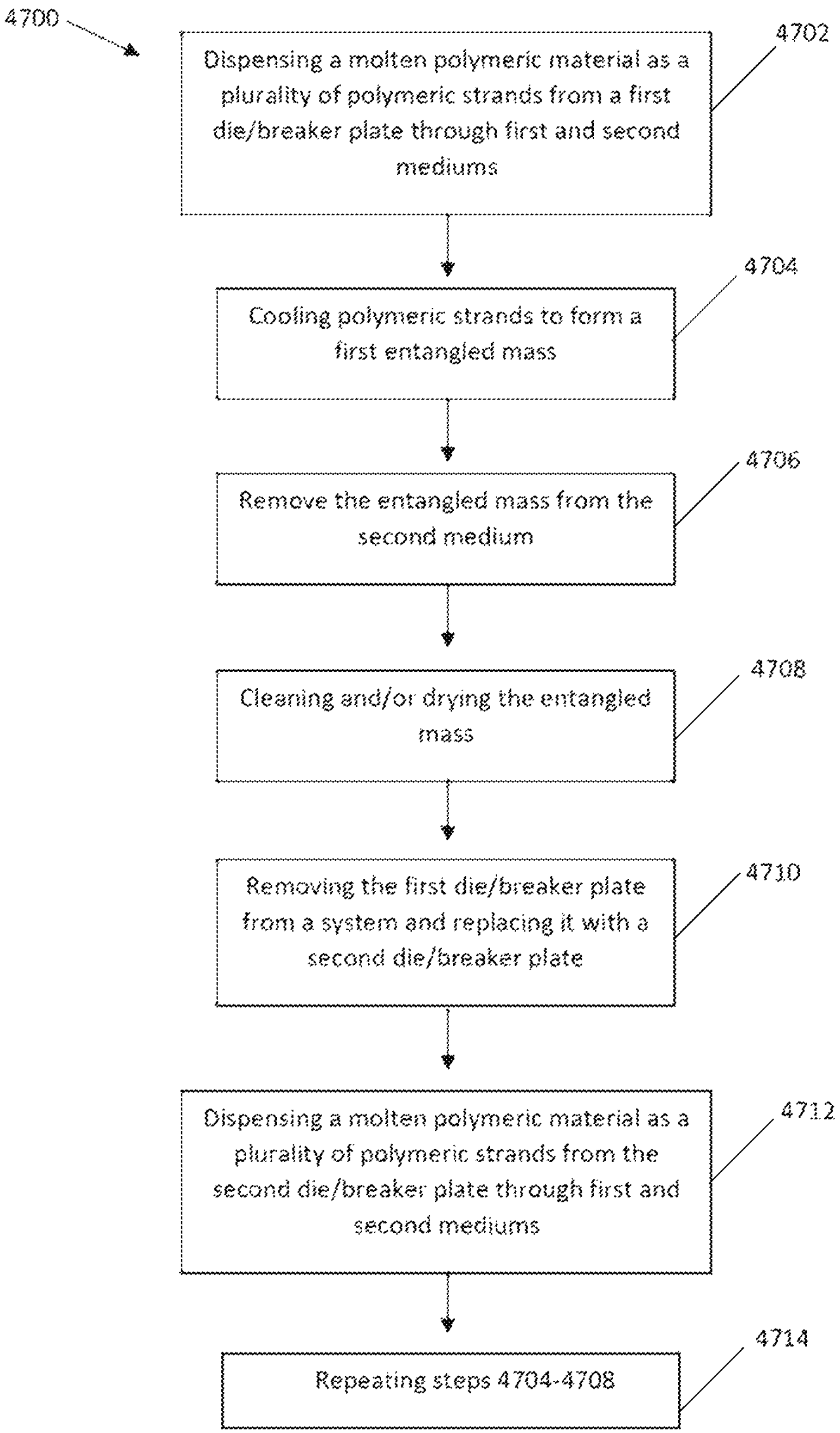

FIG. 151 is flowchart depicting a method of making a non-foam/foamless cushion.

Figure 152:
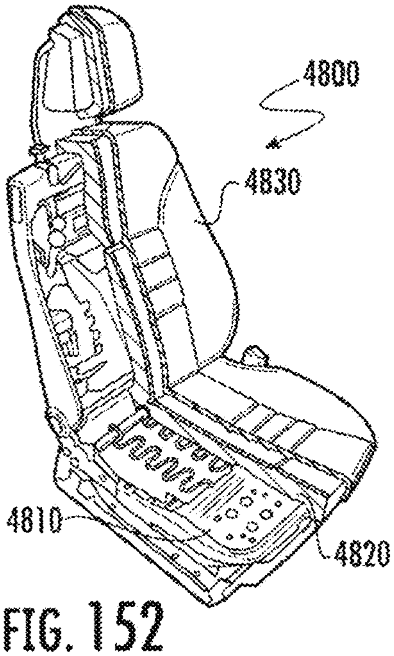

FIG. 152 is a perspective view of an embodiment of a seat assembly with a portion of the trim cover and cushion removed.

Figure 153:
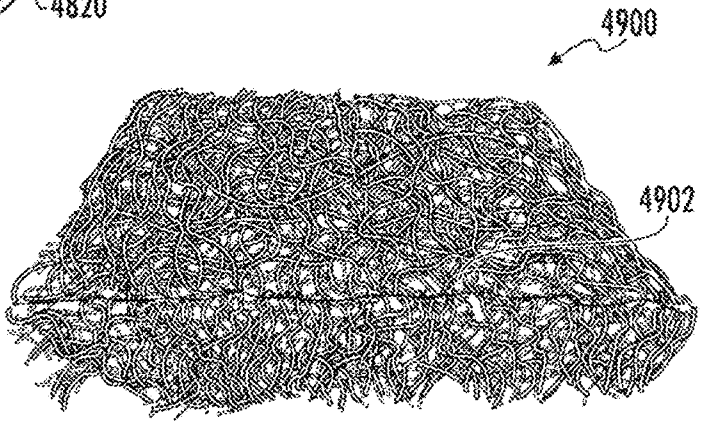

FIG. 153 is perspective view of an embodiment of a non-foam/foamless cushion.

Figure 154:
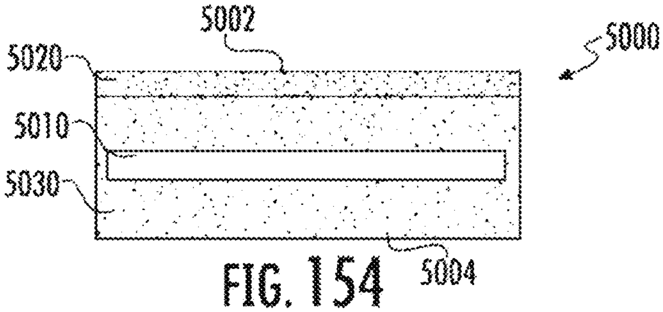

FIG. 154 is a cross-sectional schematic view of a non-foam/foamless cushion assembly.

Figure 155:
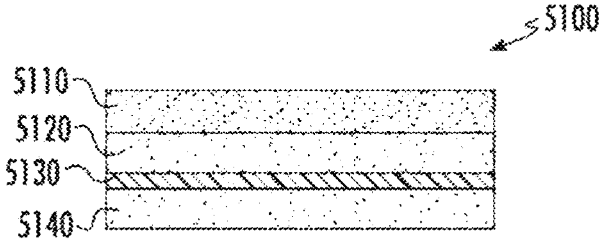

FIG. 155 is a cross-sectional schematic view of a conventional cushion assembly.

Figure 156:
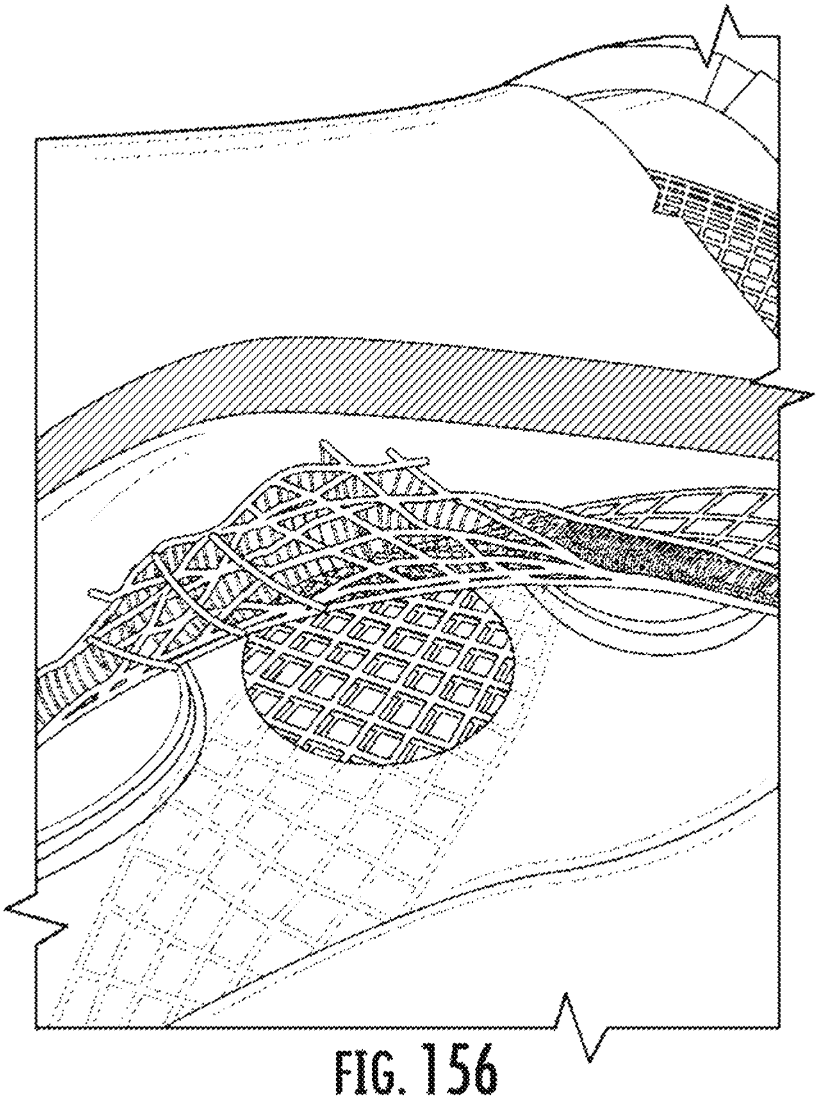

FIG. 156 is a perspective view of a portion of a non-foam/foamless cushion depicting a cavity and a fluid system disposed therein.

Figure 157:
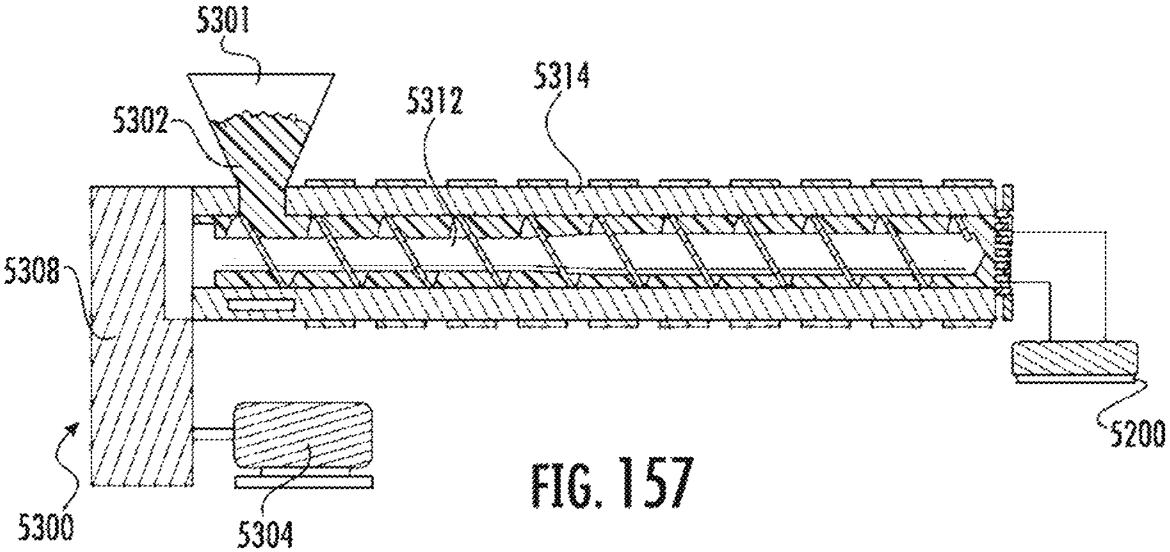

FIG. 157 is a cross-sectional side view of an embodiment of a manufacturing system.

Figure 158:
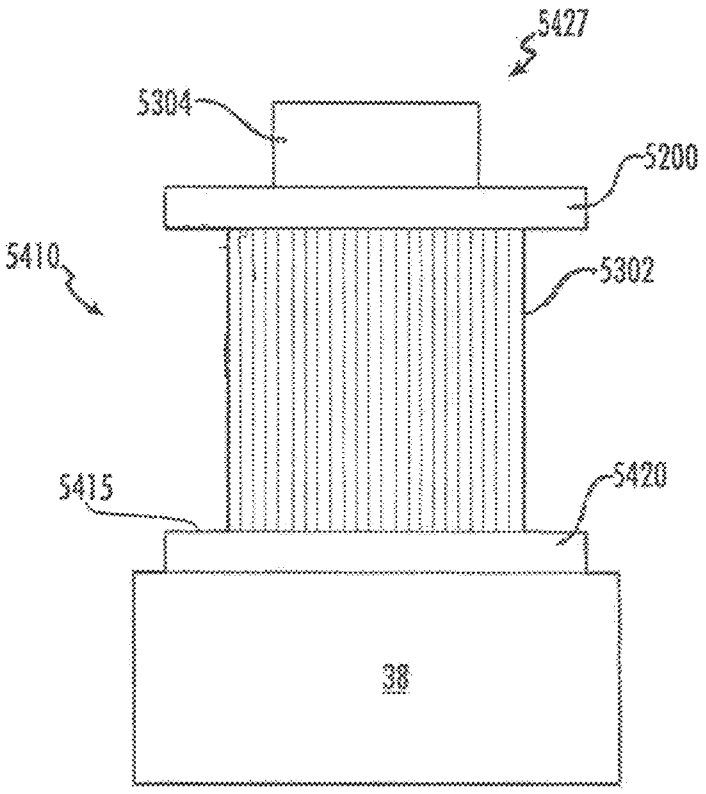

FIG. 158 is a schematic of a plurality of polymeric strands being dispensed.

Figure 159:
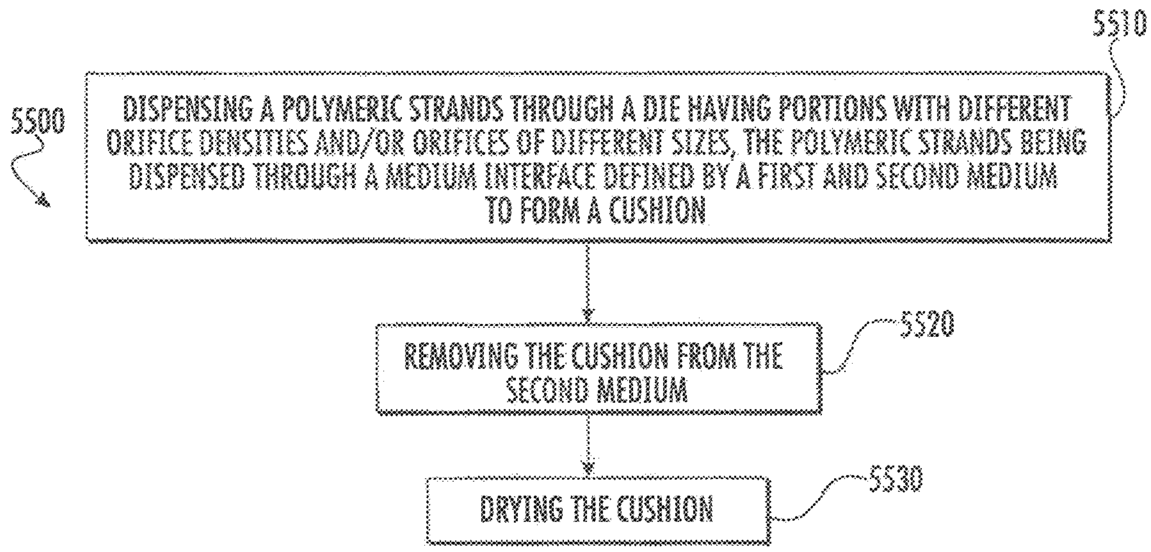

FIG. 159 is a flowchart illustrating an embodiment of a method of using the breaker plate die to produce the variable non-foam cushion.

Figure 160:
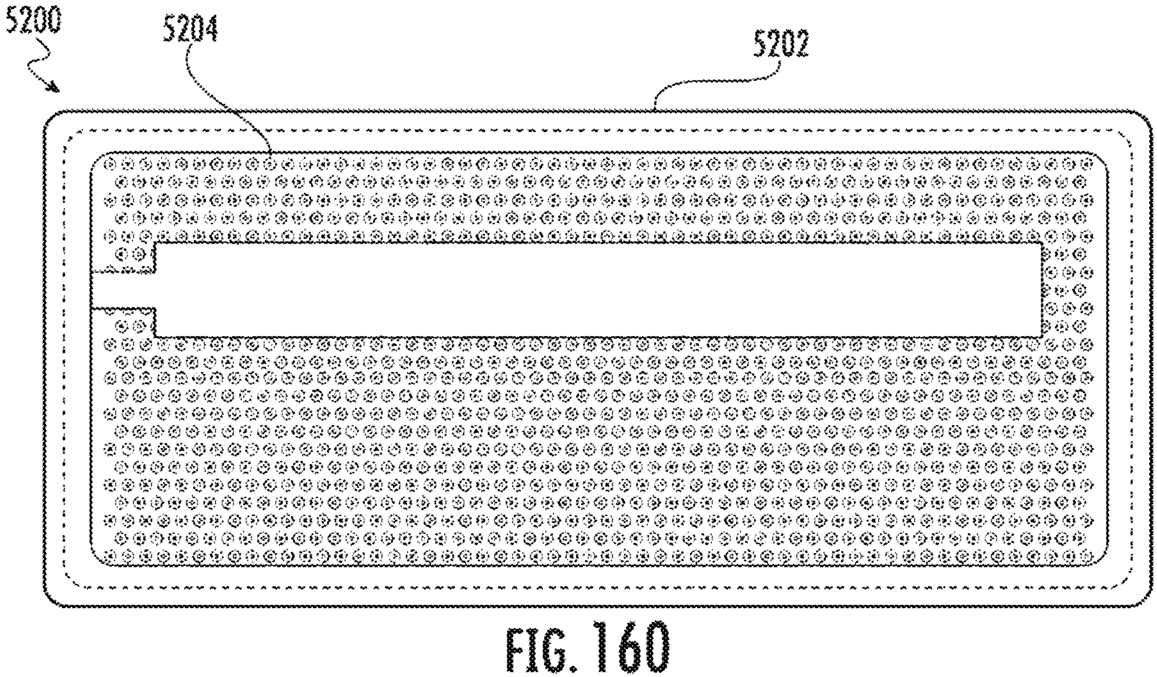

FIG. 160 is a top view of some embodiments of a breaker plate die for dispensing resin to manufacture non-foam/foamless cushions.

Figure 161:
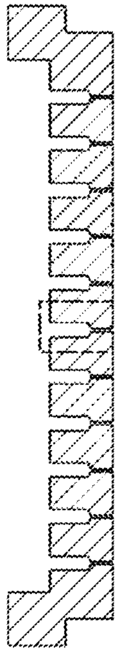

FIG. 161 is a cross-sectional view of a portion of the breaker plate of FIG. 160.

Figure 162:
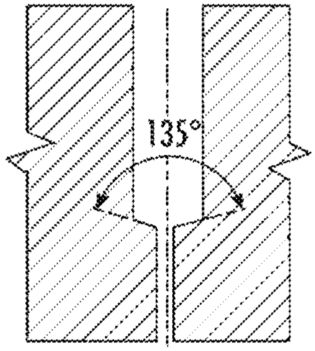

FIG. 162 is a zoomed in view of a single orifice from the breaker plate of FIG. 161.

Figure 163:
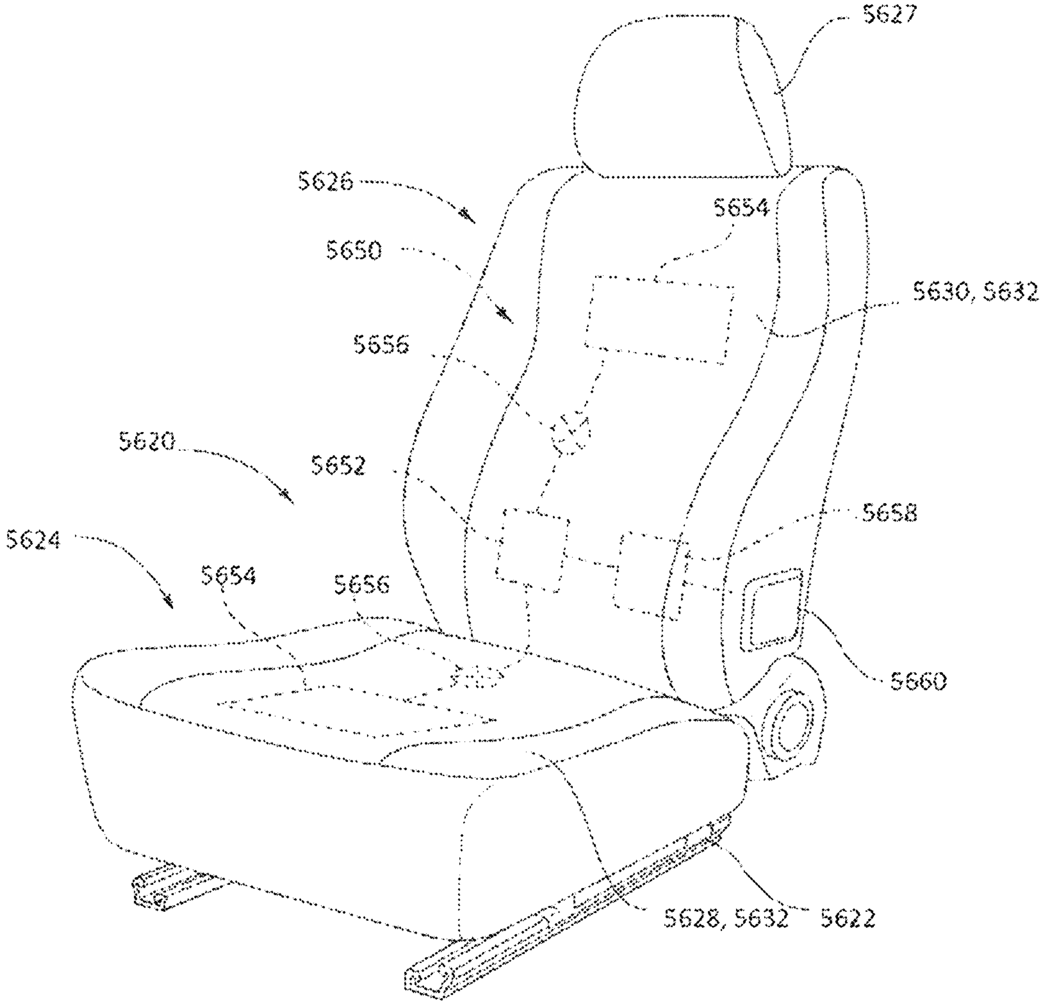

FIG. 163 illustrates a perspective schematic view of a seat assembly according to some embodiments.

Figure 164:
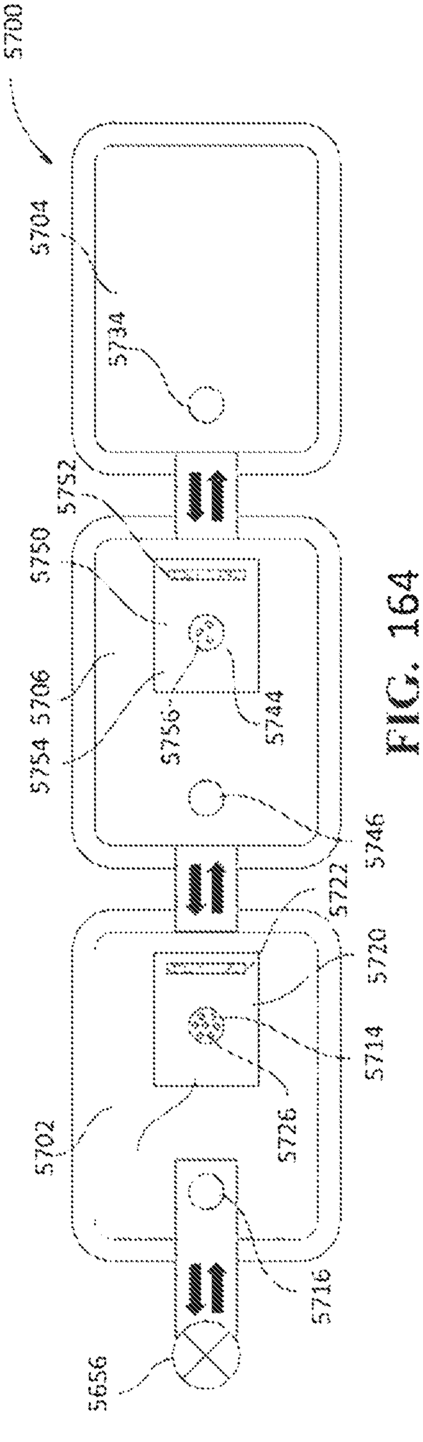

FIG. 164 illustrates a top view of a bladder assembly according to some embodiments and for use with the vehicle seat assembly of FIG. 163.

Figure 165:
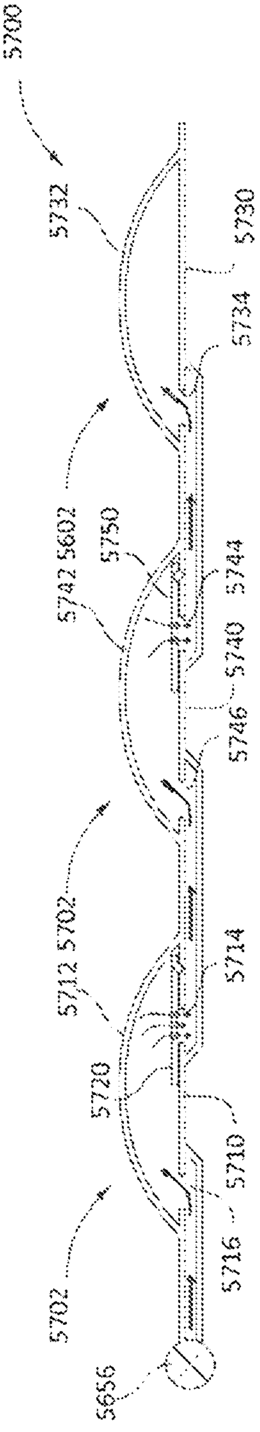

FIG. 165 illustrates a side schematic view of the bladder assembly of FIG. 164 during inflation.

Figure 166:
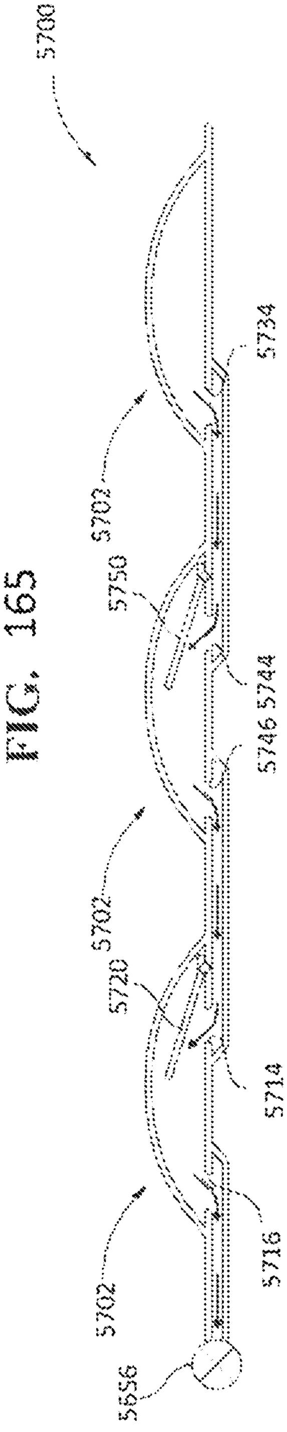

FIG. 166 illustrates a side schematic view of the bladder assembly of FIG. 164 during deflation.

Figure 167:
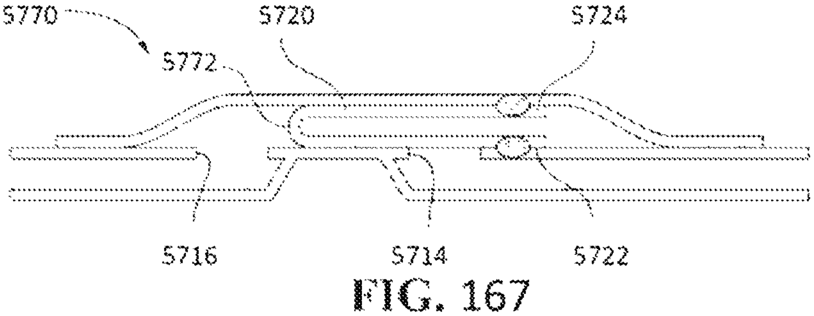

FIG. 167 illustrates a side schematic view of a bladder and valve for use with the bladder assembly of FIG. 164 according to an alternative embodiment, and with the valve in a closed position.

Figure 168:
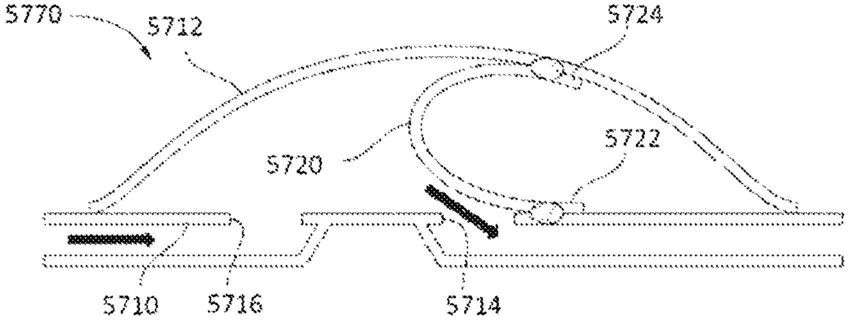

FIG. 168 illustrates a side schematic view of the bladder and valve of FIG. 167 with the valve in an open position.

Figure 169:
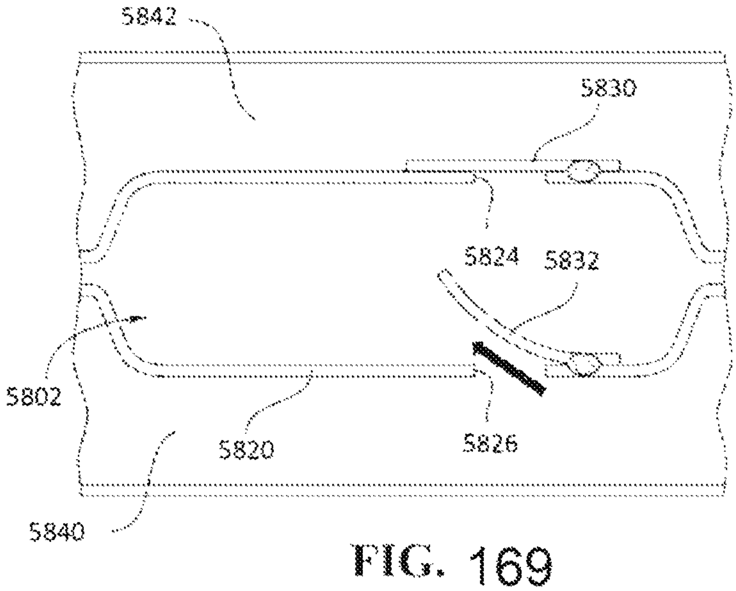

FIG. 169 illustrates a top view of a bladder assembly according to some embodiments and for use with the vehicle seat assembly of FIG. 163.

Figure 170:
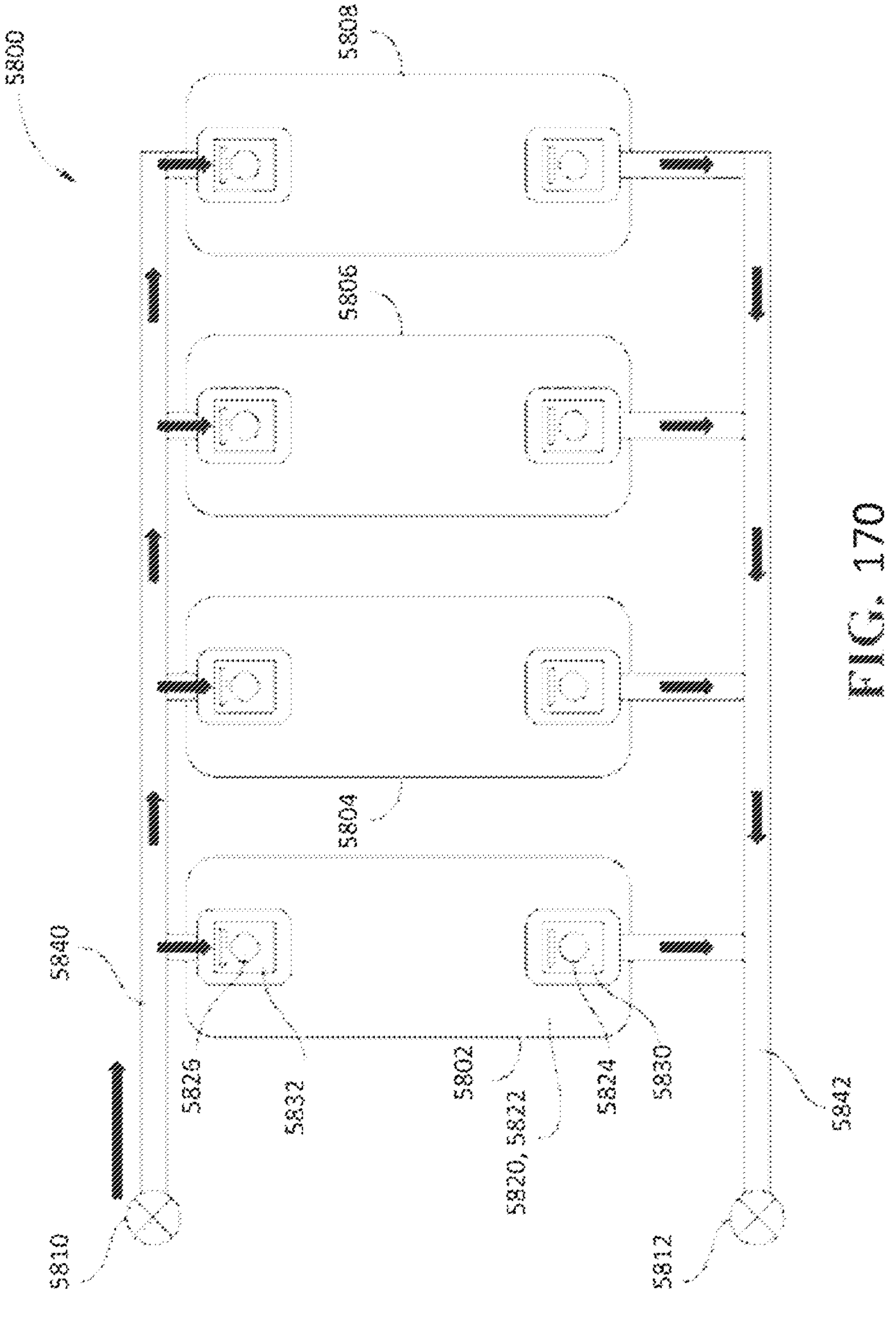

FIG. 170 illustrates a partial side schematic view of a bladder of the bladder assembly of FIG. 169.

Figure 171:
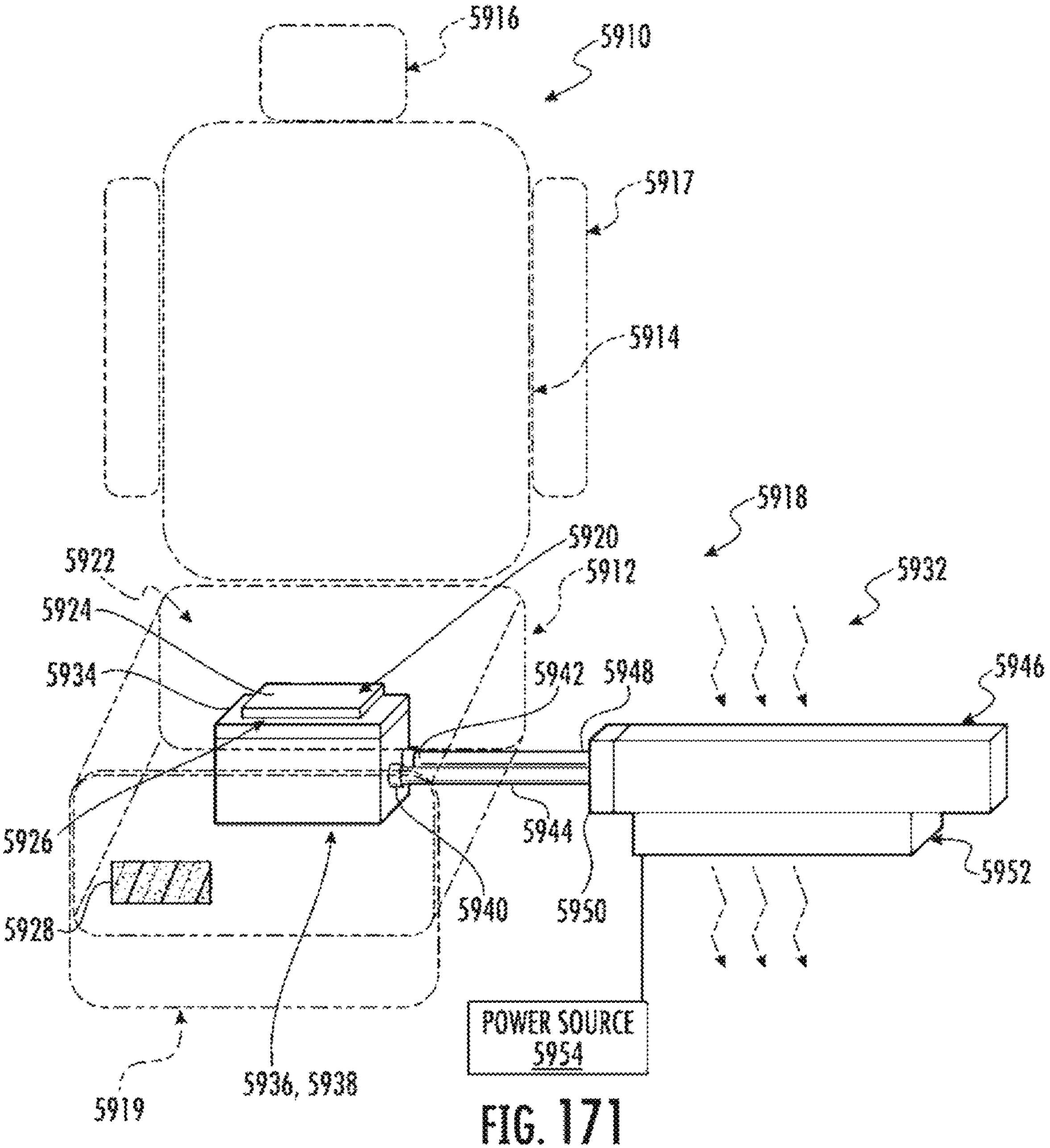

FIG. 171 illustrates a seat assembly with a heat transfer system according to some embodiments.

Figure 172:
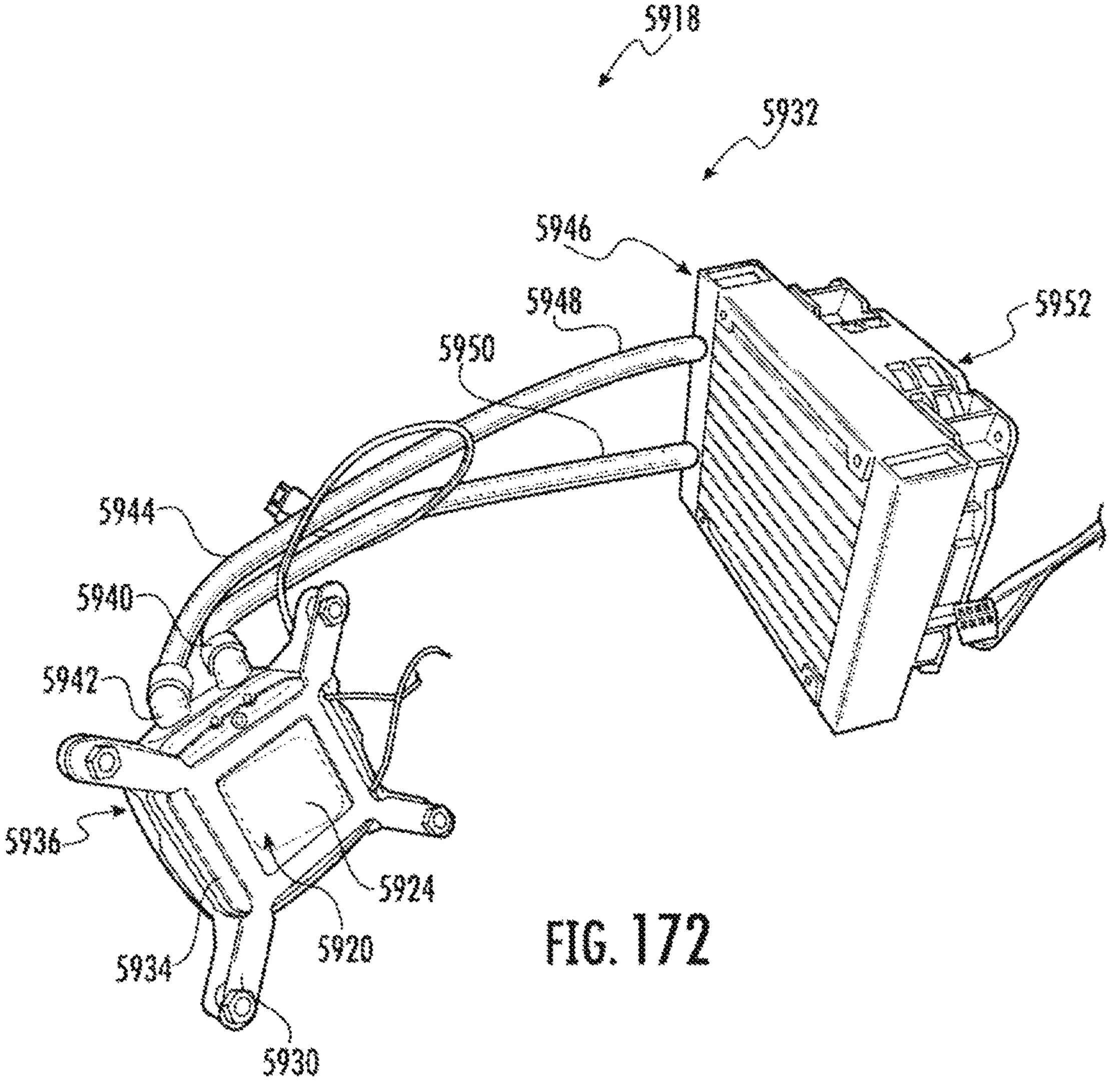

FIG. 172 illustrates the heat transfer system of FIG. 171.

Figure 173:
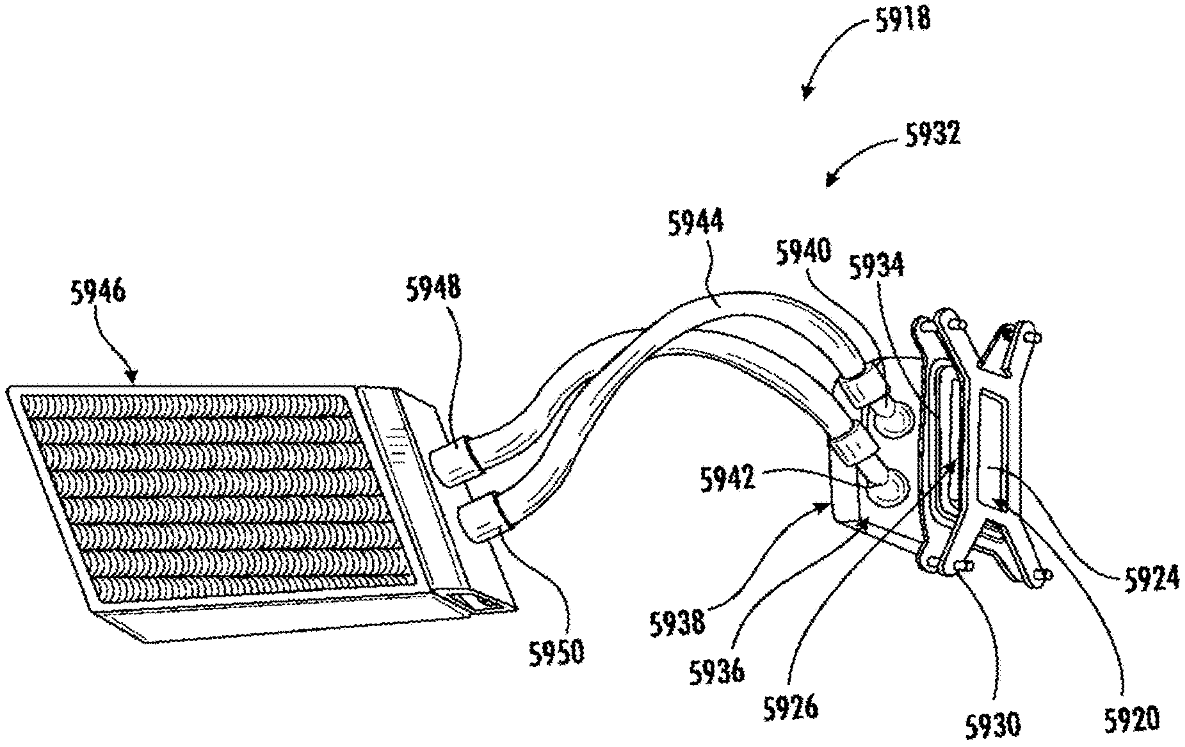

FIG. 173 illustrates another view of the heat transfer system of FIG. 171.

Figure 174:
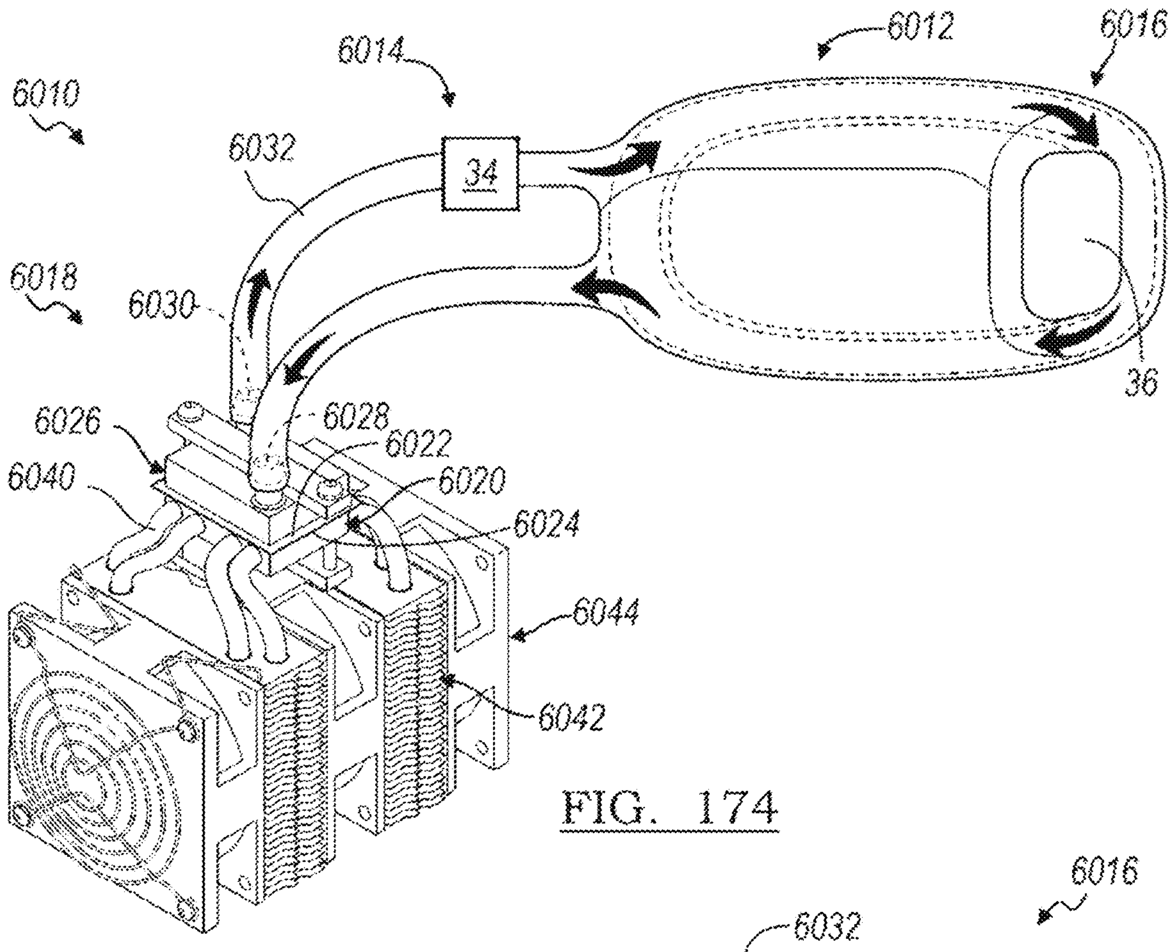

FIG. 174 illustrates a therapy device with a heat transfer system according to some embodiments.

Figure 175:
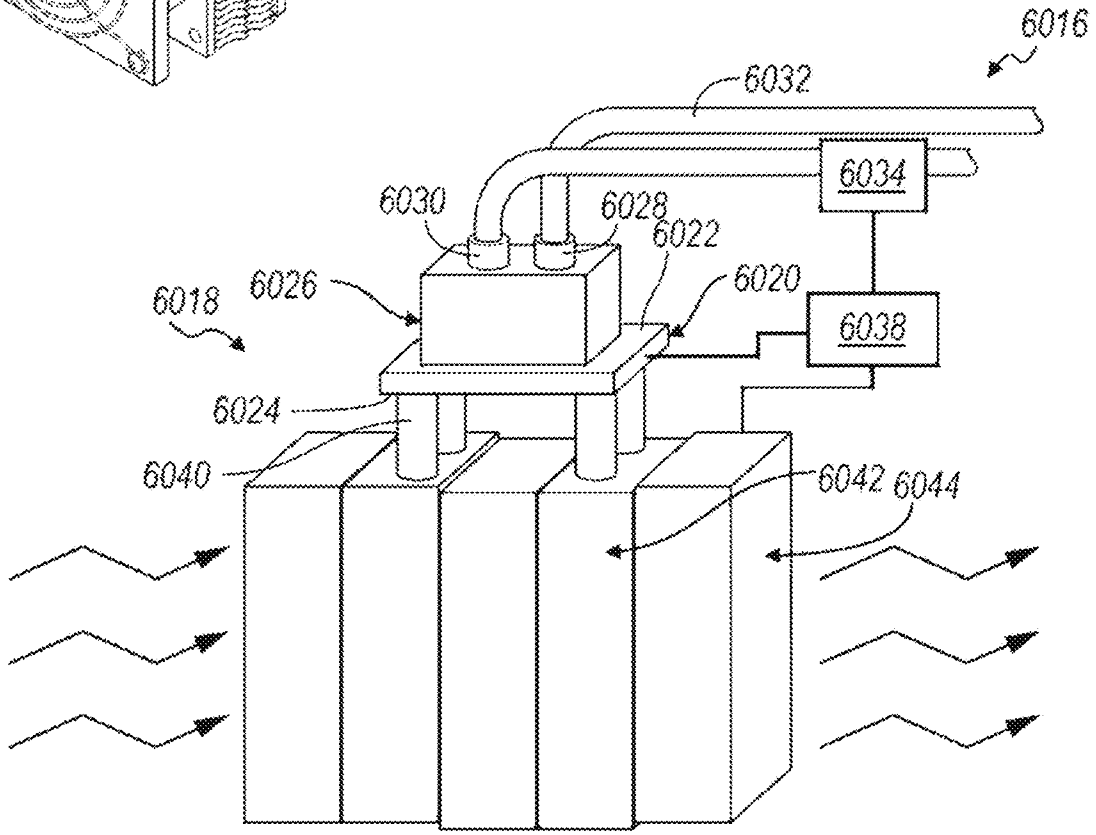

FIG. 175 illustrates a schematic of a portion of the heat transfer system of FIG. 174.

Figure 176:
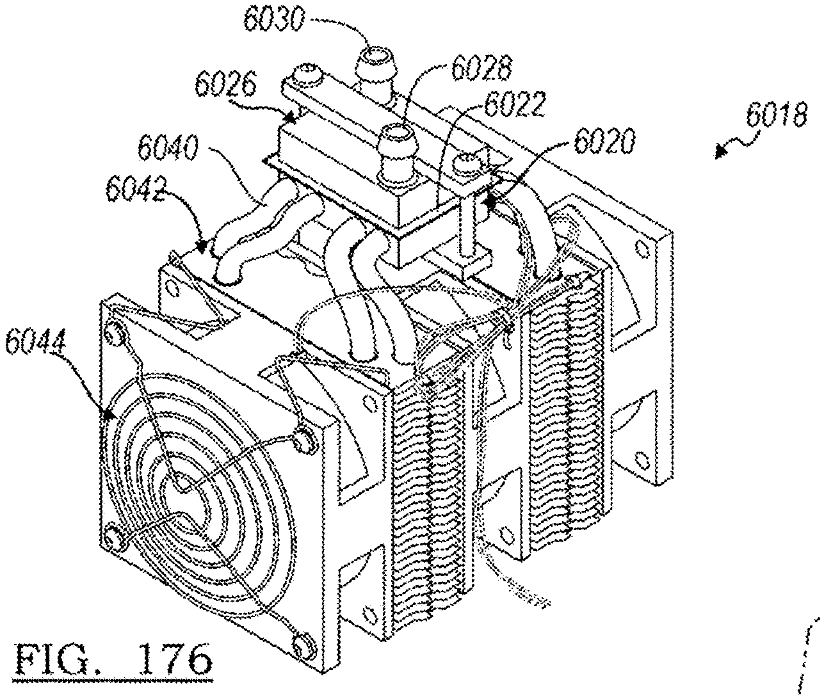

FIG. 176 illustrates a perspective view a portion of the heat transfer system of FIG. 174.

Figure 177:
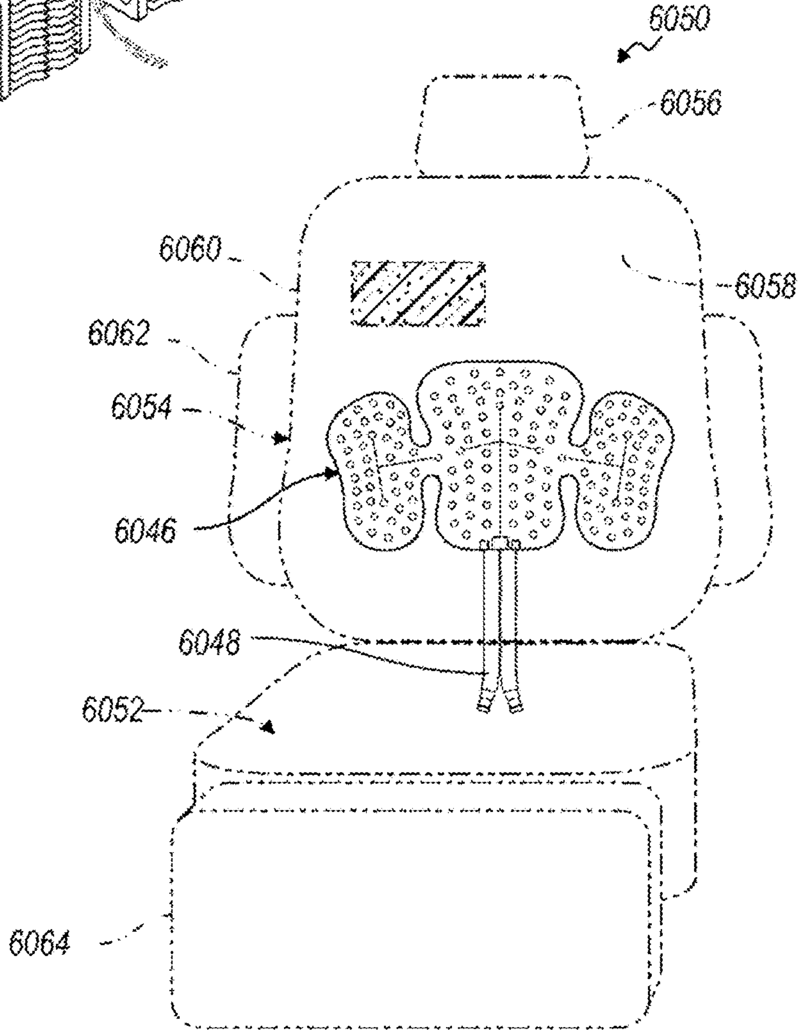

FIG. 177 illustrates a seat assembly with a heat transfer system according to some embodiments.

Figure 178:
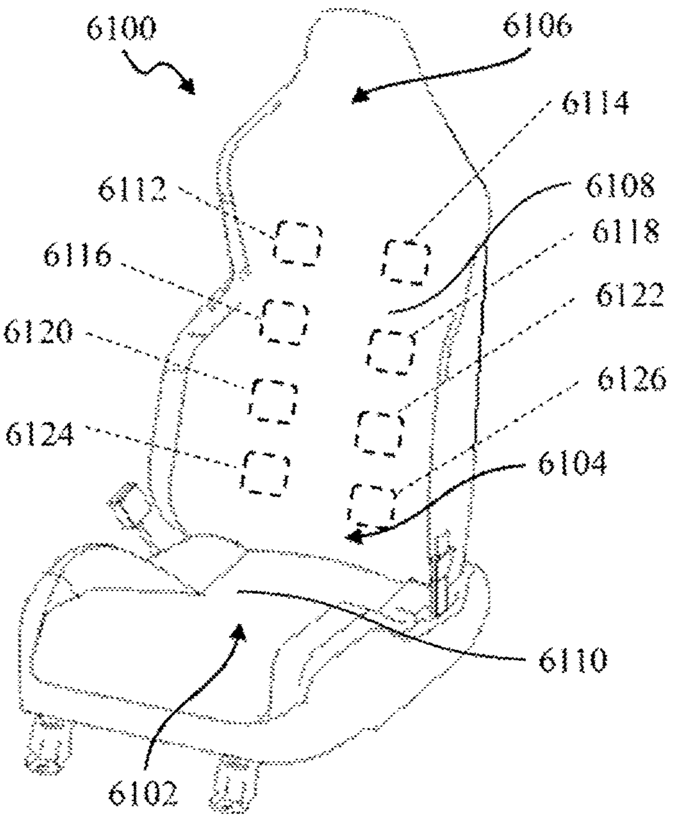

FIG. 178 is a front perspective view of a seat assembly.

Figure 179:
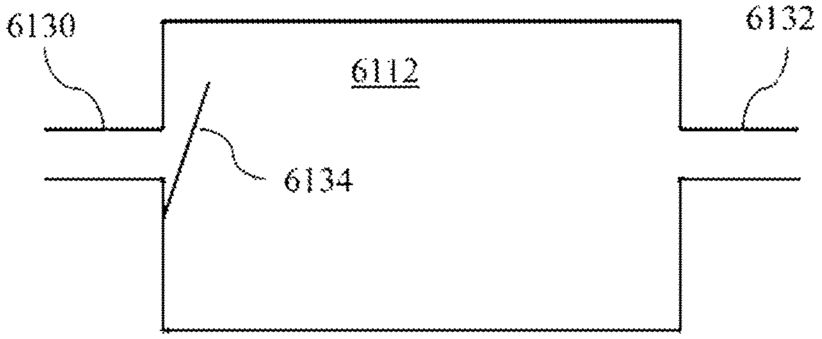

FIG. 179 is a schematic view of an actuator assembly for the seat assembly of FIG. 178.

Figure 180:
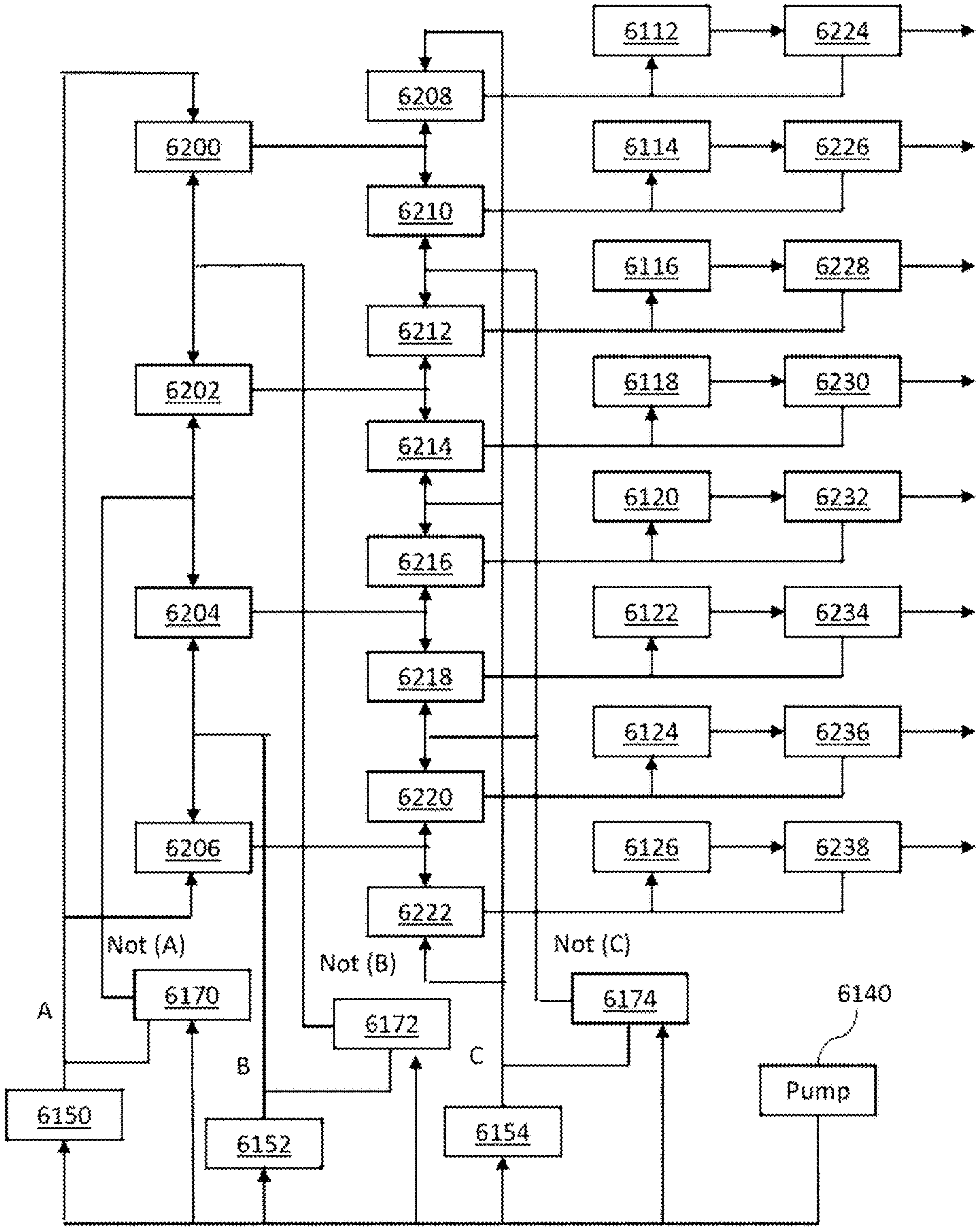

FIG. 180 is a schematic view of a first pneumatic network for the seat assembly of FIG. 178.

Figure 181:
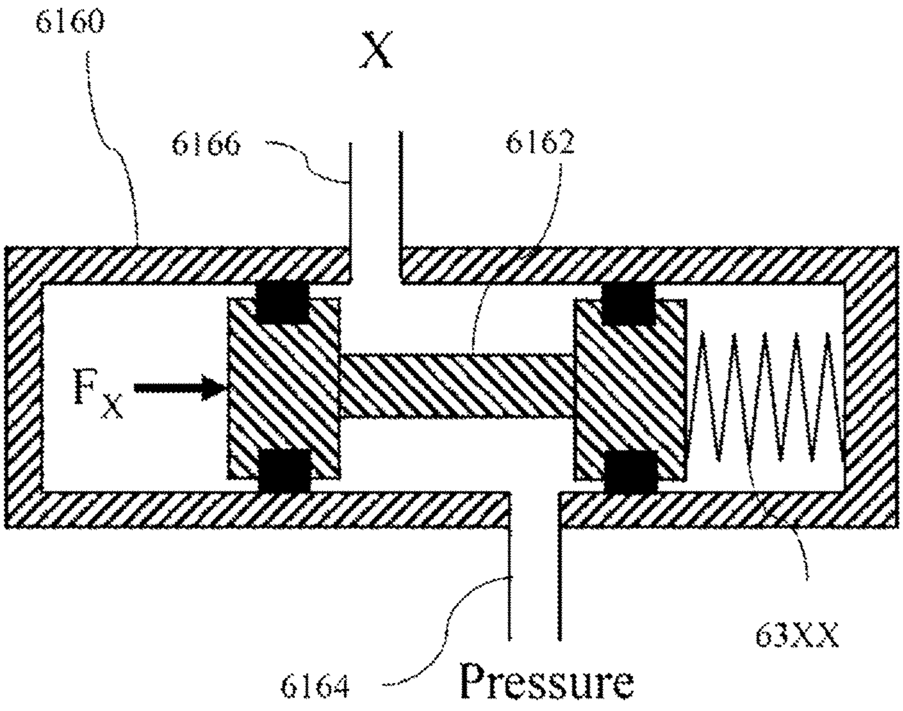

FIG. 181 is a schematic view of a signal valve for the network of FIG. 180 in a first state.

Figure 182:
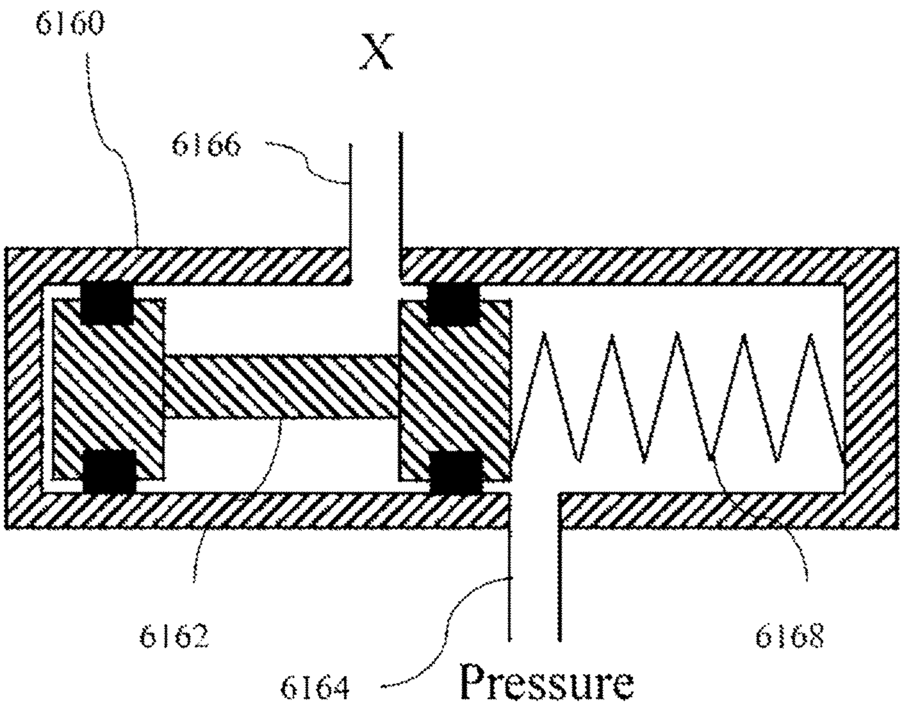

FIG. 182 is a schematic view of the signal valve of FIG. 181 in a second state.

Figure 183:
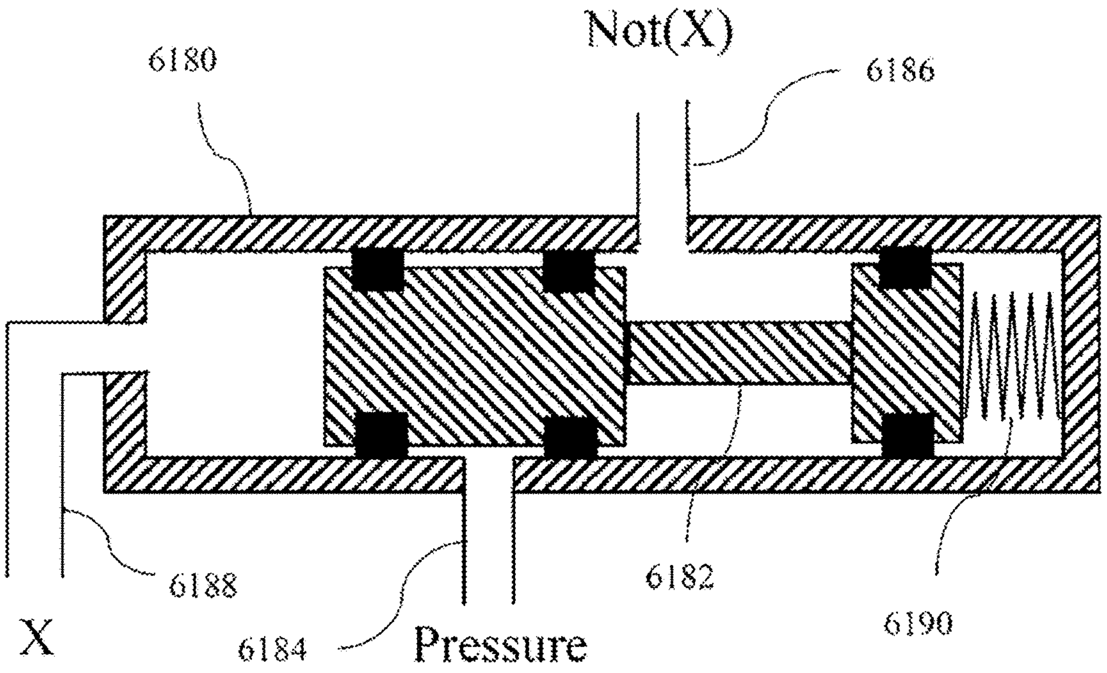

FIG. 183 is a schematic view of a NOT-type valve for the network of FIG. 180 in a first state.

Figure 184:
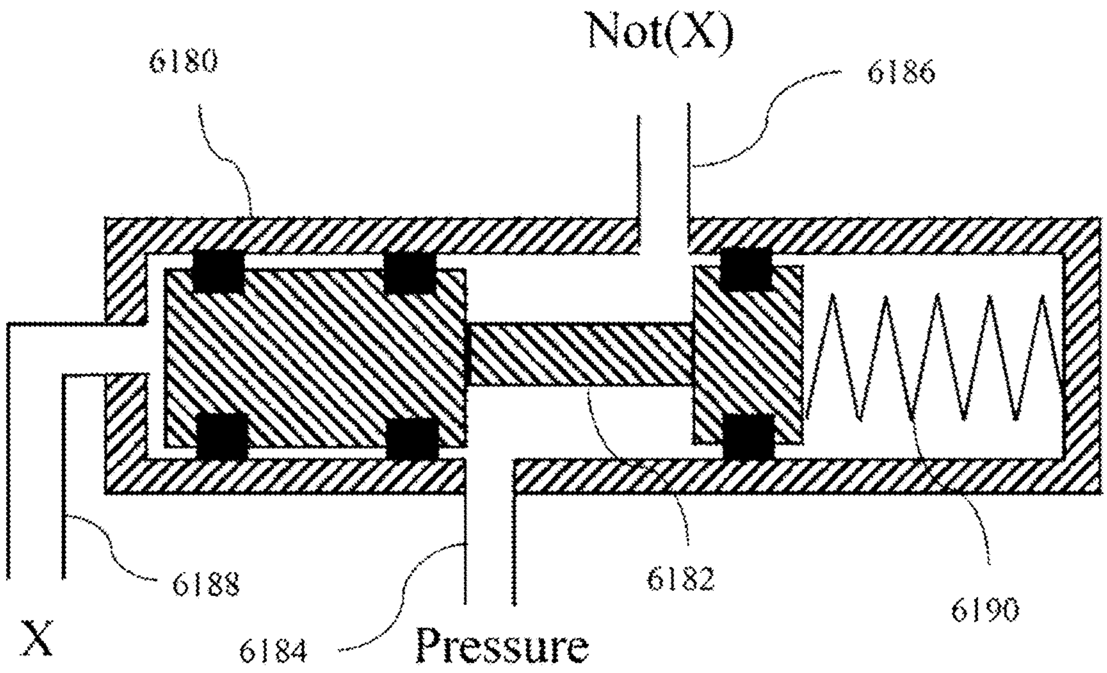

FIG. 184 is a schematic view of the NOT-type valve of FIG. 183 in a second state.

Figure 185:
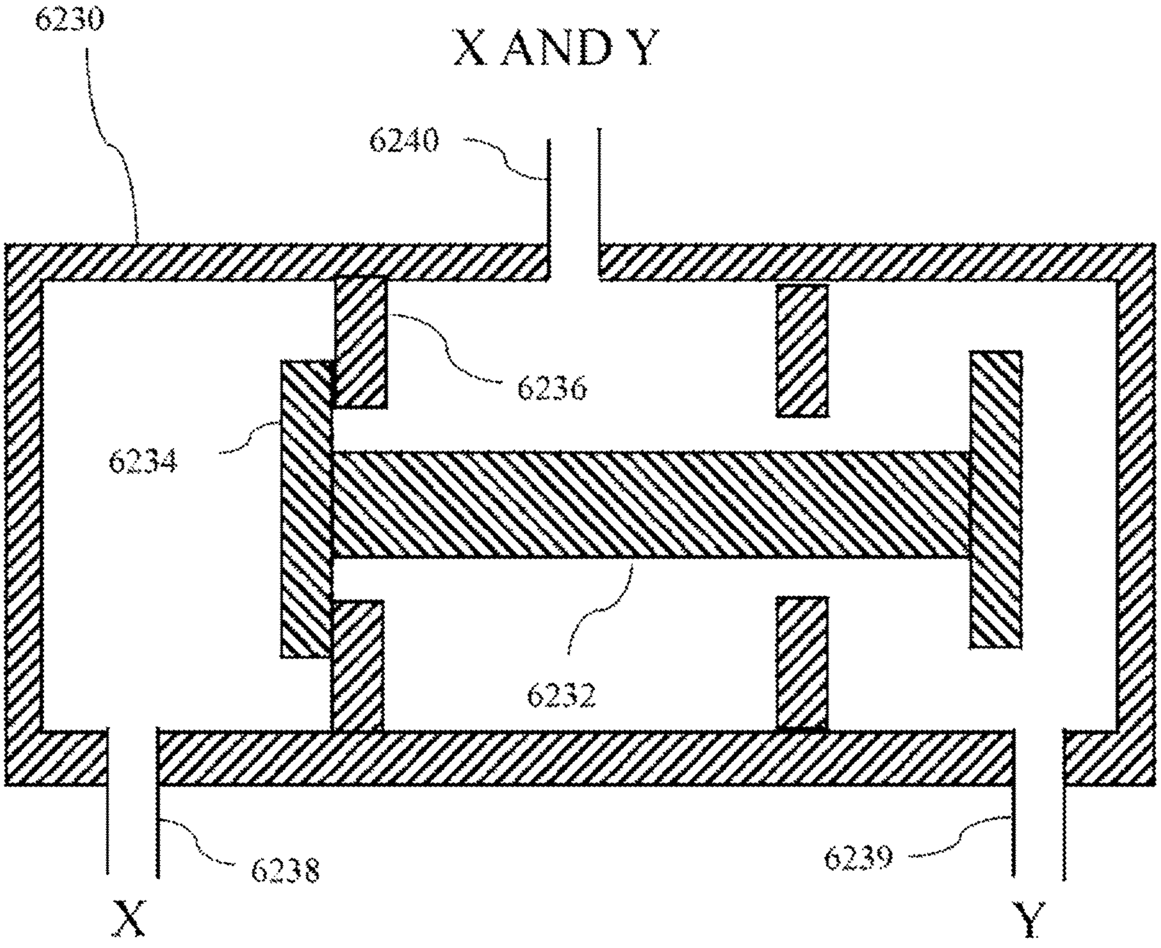

FIG. 185 is a schematic view of an AND-type valve for the network of FIG. 180.

Figure 186:
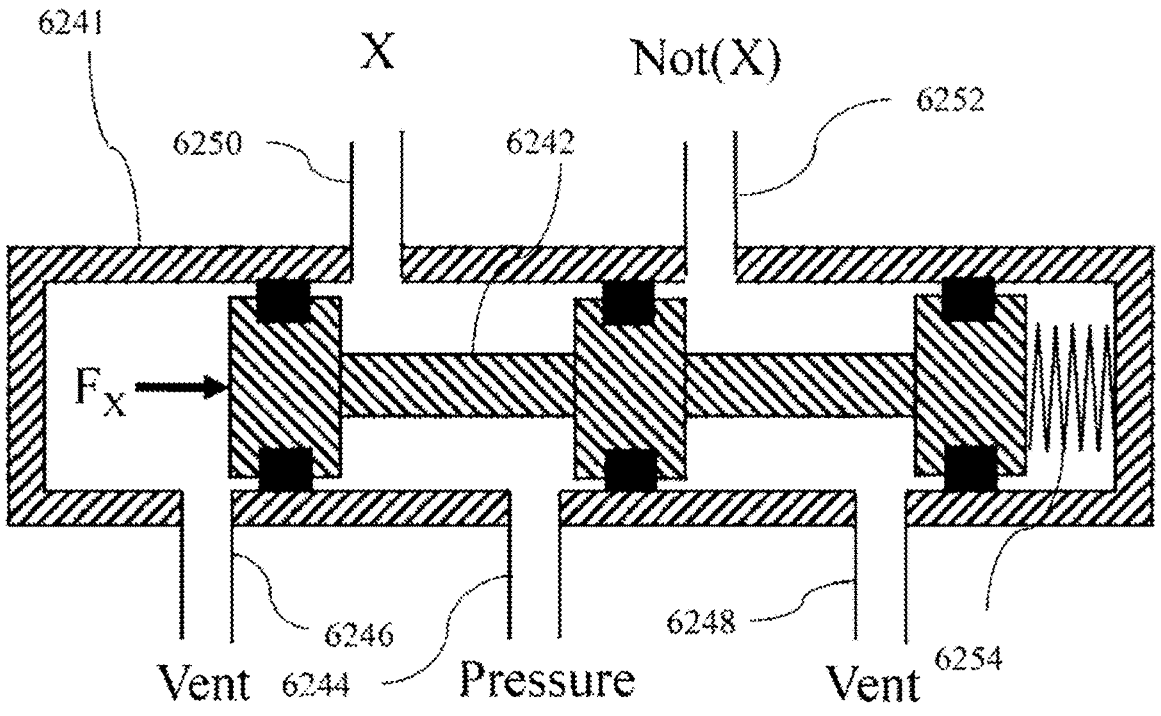

FIG. 186 is a schematic view of a second type of signal valve in a first state.

Figure 187:
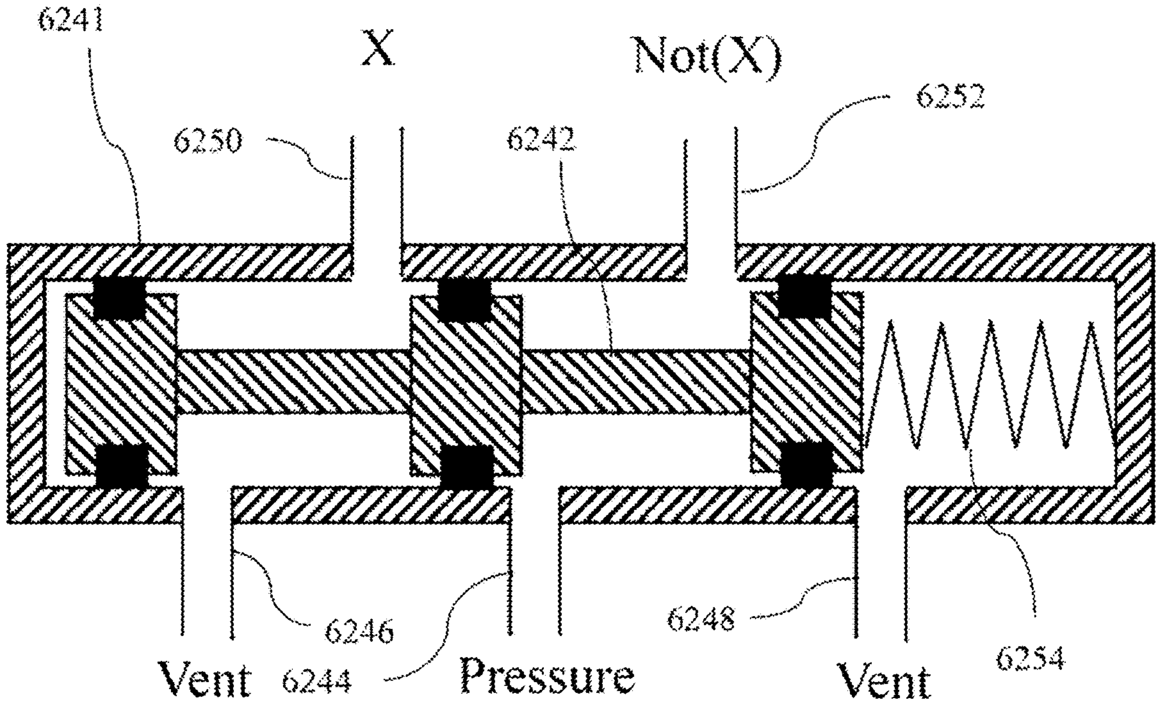

FIG. 187 is a schematic view of the second type of signal valve of FIG. 186 in a second state.

Figure 188:
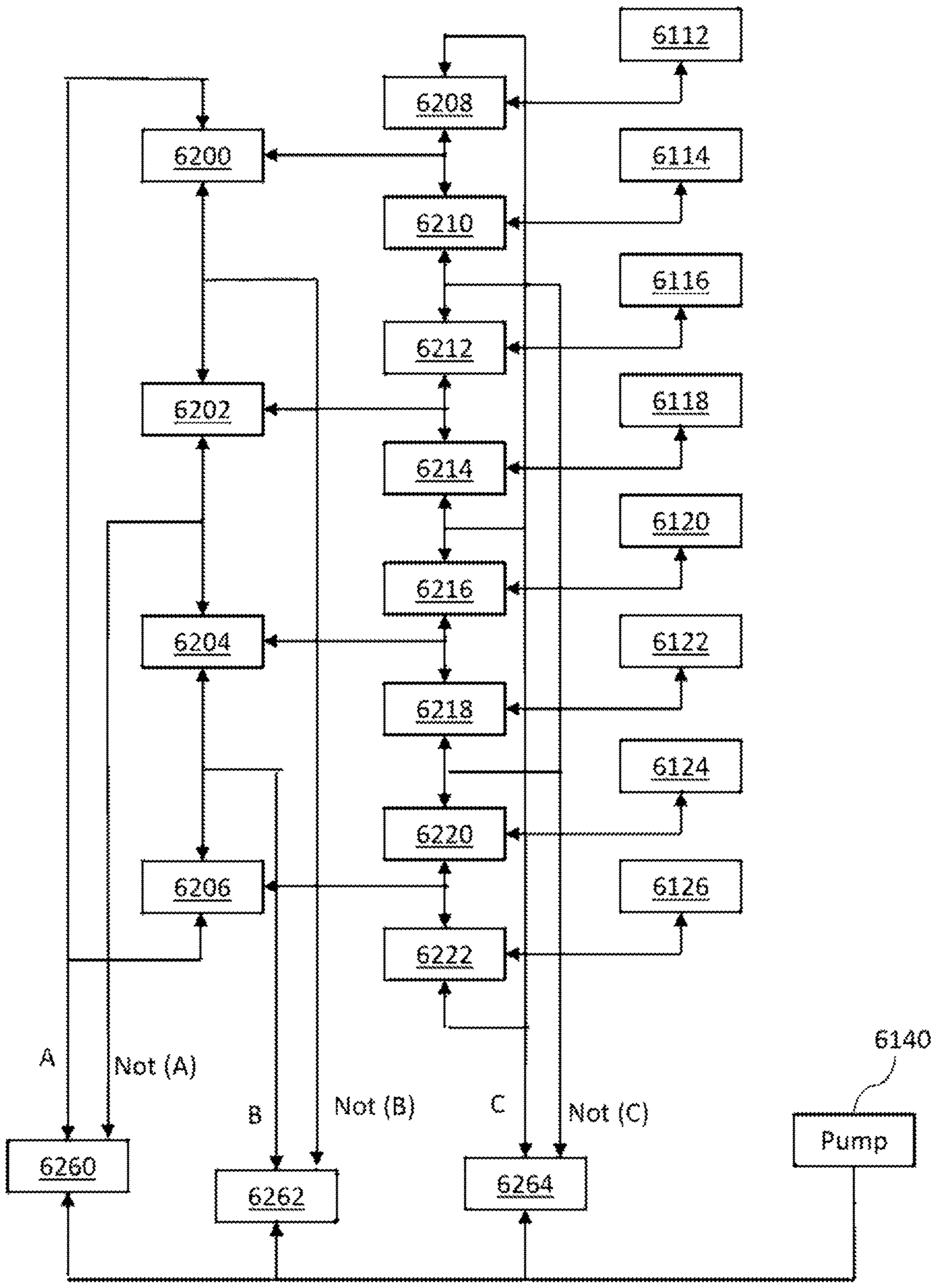

FIG. 188 is a schematic view of a second pneumatic network for the seat assembly of FIG. 178 utilizing the second type of signal valve of FIGS. 186 and 188.

Figure 189:
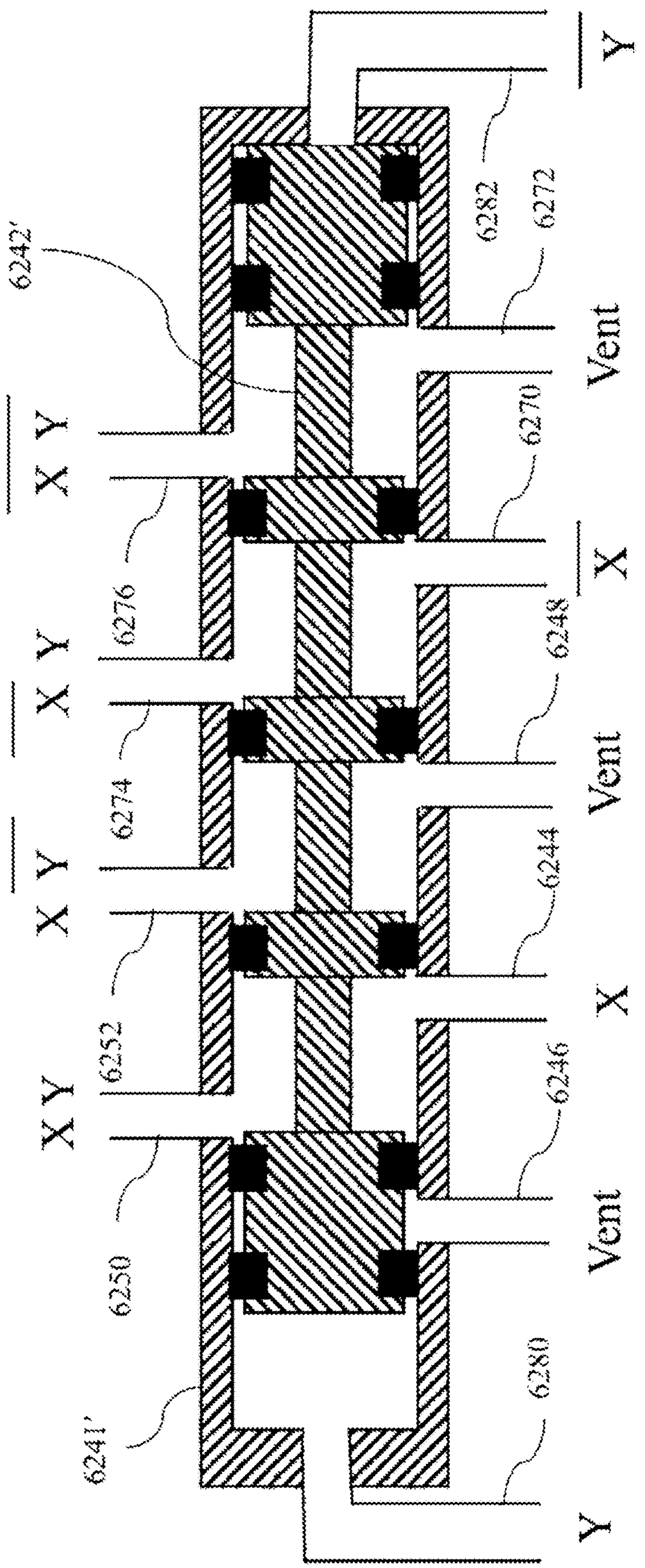

FIG. 189 is a schematic view of a third type of signal valve.

Figure 190:
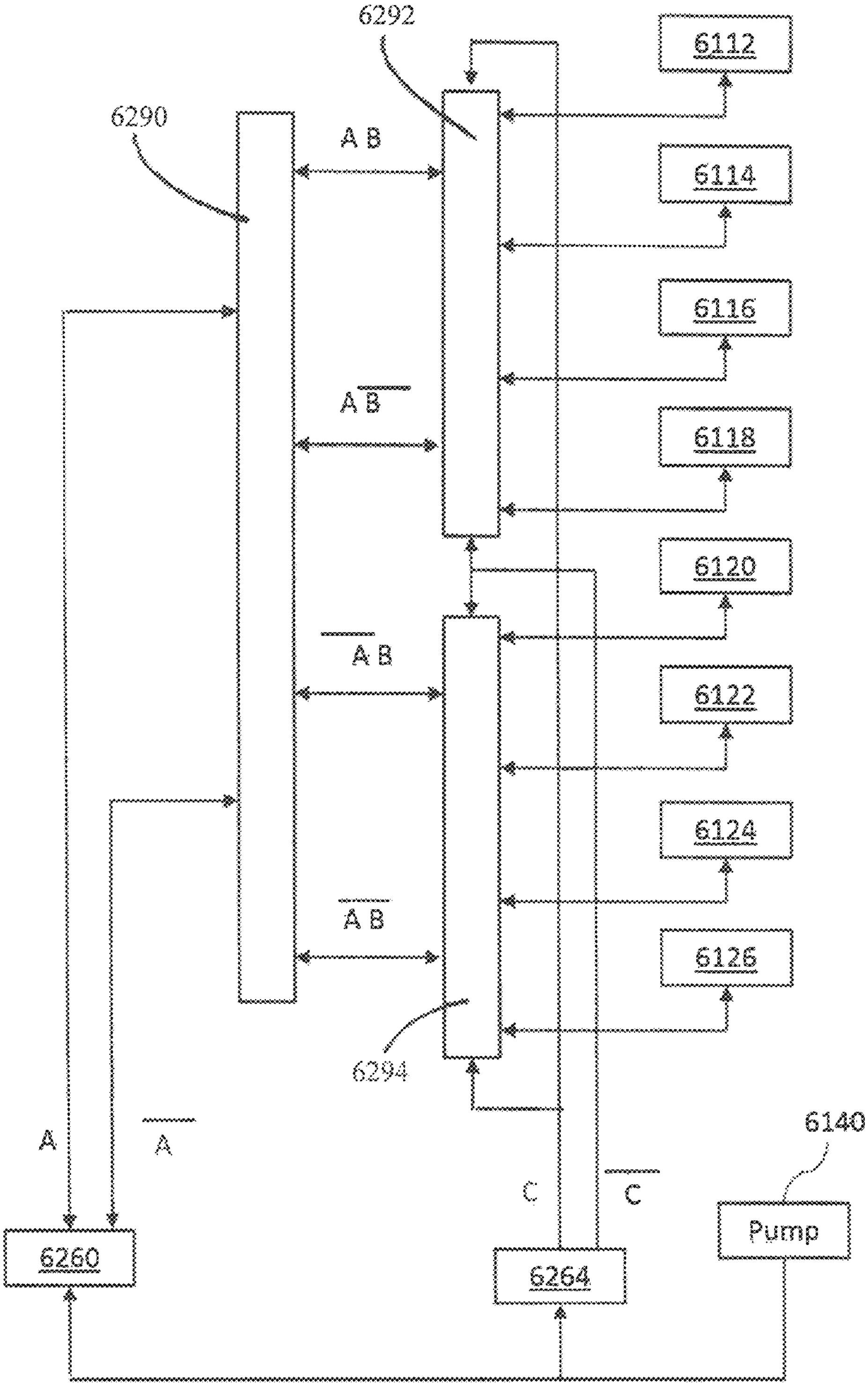

FIG. 190 is a schematic view of a third pneumatic network for the seat assembly of FIG. 178.

Figure 191:
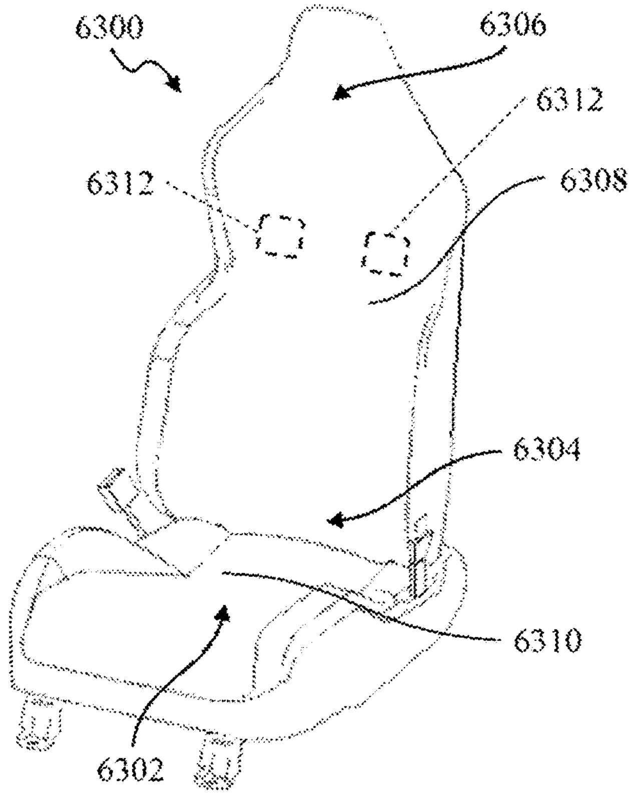

FIG. 191 is a front perspective view of a seat assembly according to some embodiments.

Figure 192:
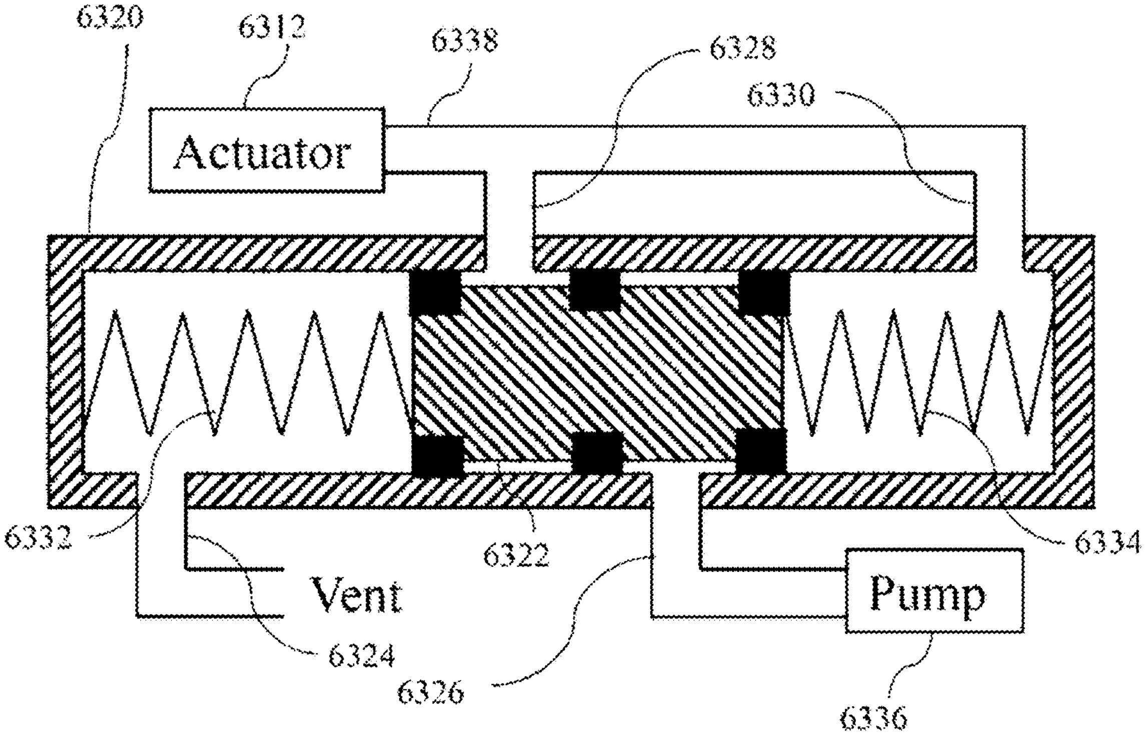

FIG. 192 is a schematic view of a pneumatic system, in a holding state, suitable for use in the seat assembly of FIG. 191.

Figure 193:
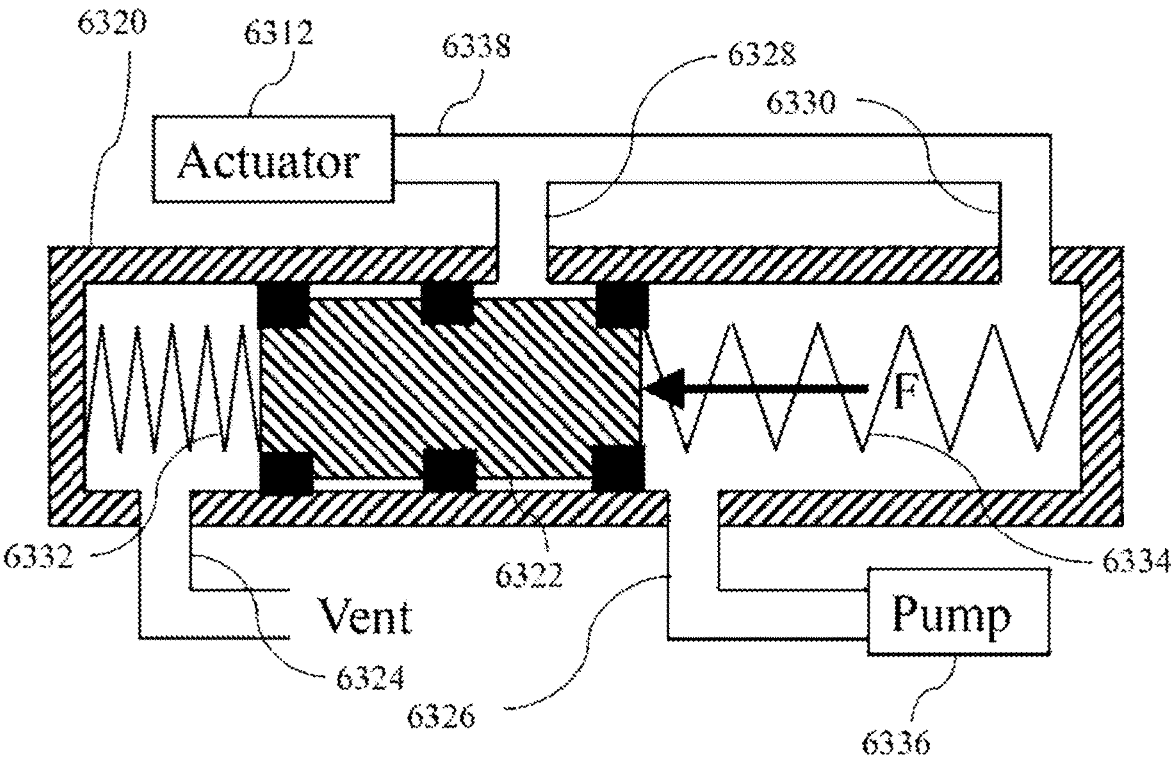

FIG. 193 is a schematic view of a pneumatic system of FIG. 192, in an inflation state.

Figure 194:
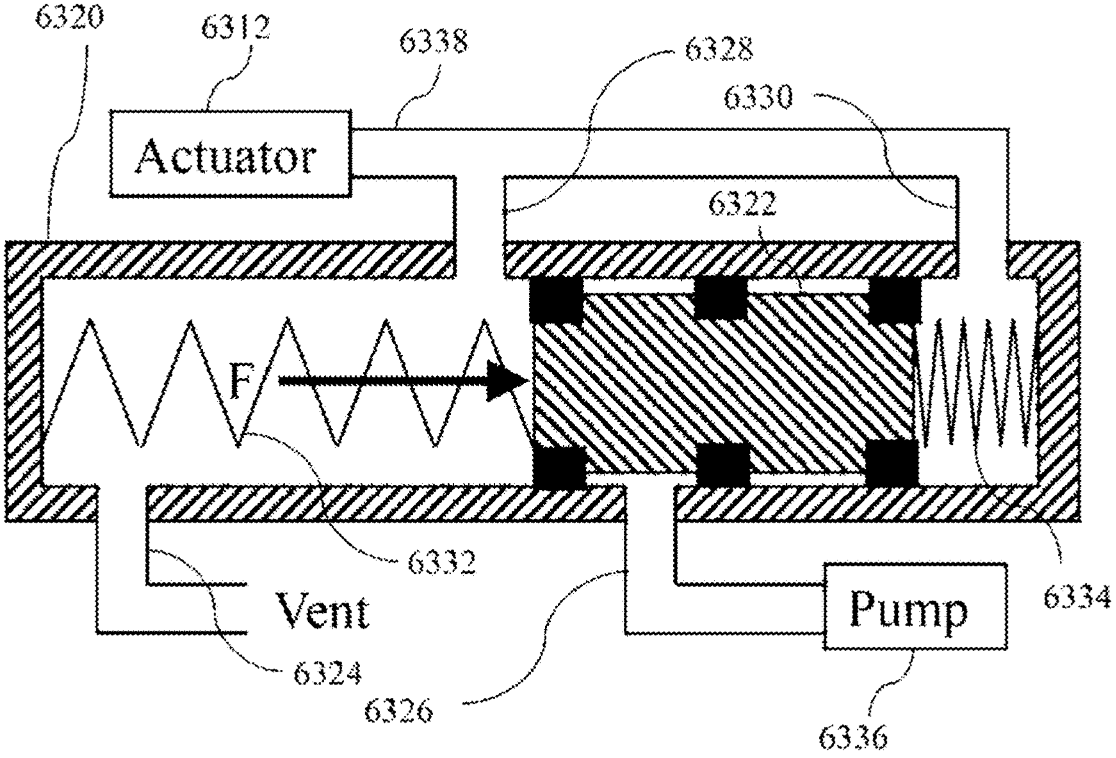

FIG. 194 is a schematic view of a pneumatic system of FIG. 192, in a deflation state.

Figure 195:
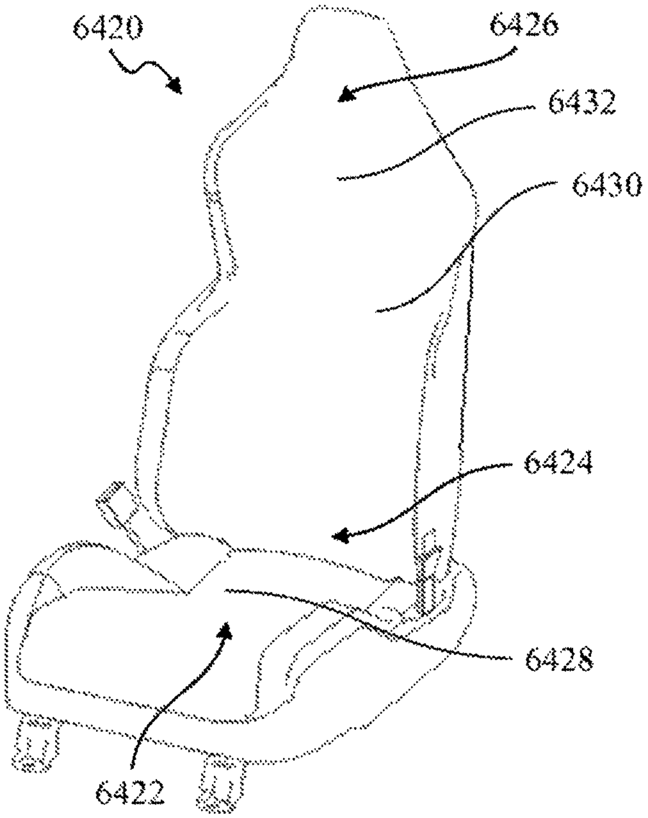

FIG. 195 is a pictorial view of a vehicle seat.

Figure 196:
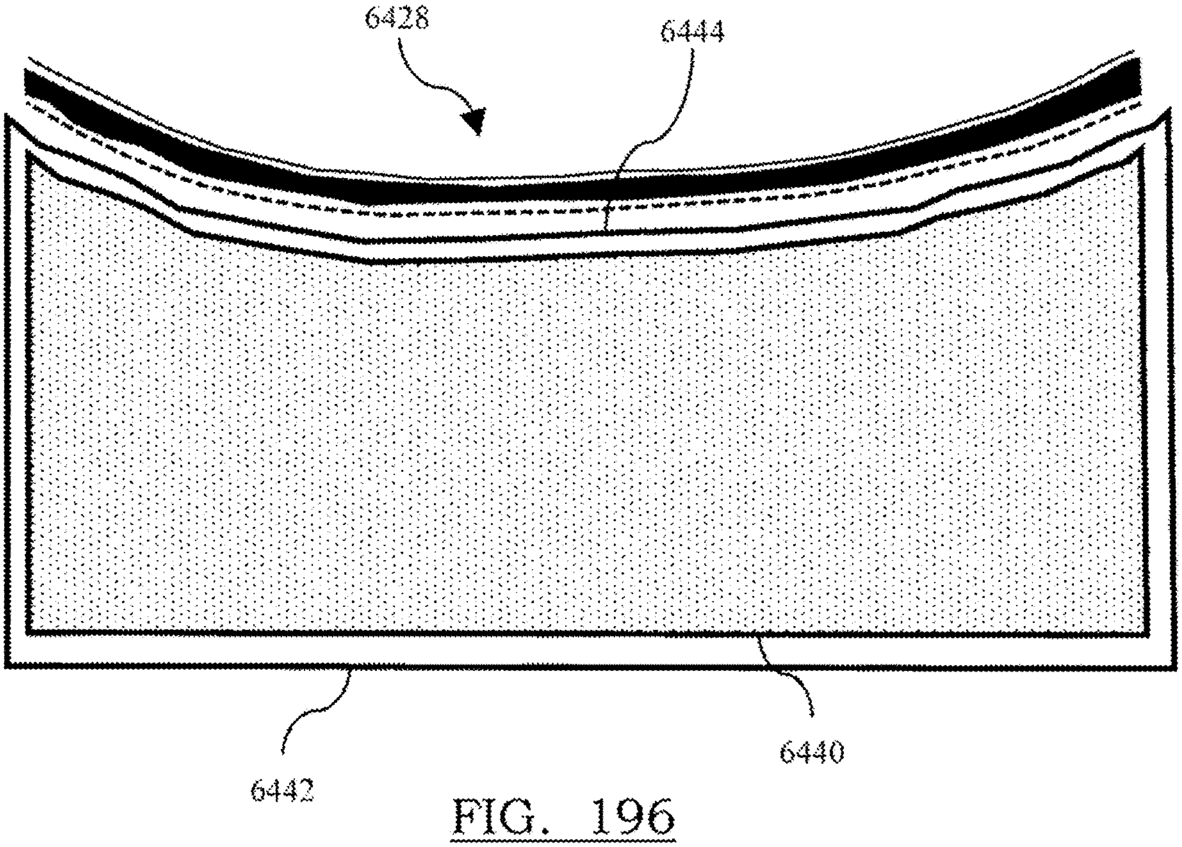

FIG. 196 is a cross-sectional view through a seat cushion assembly, such as the bottom seat cushion, of the seat of FIG. 195.

Figure 197:
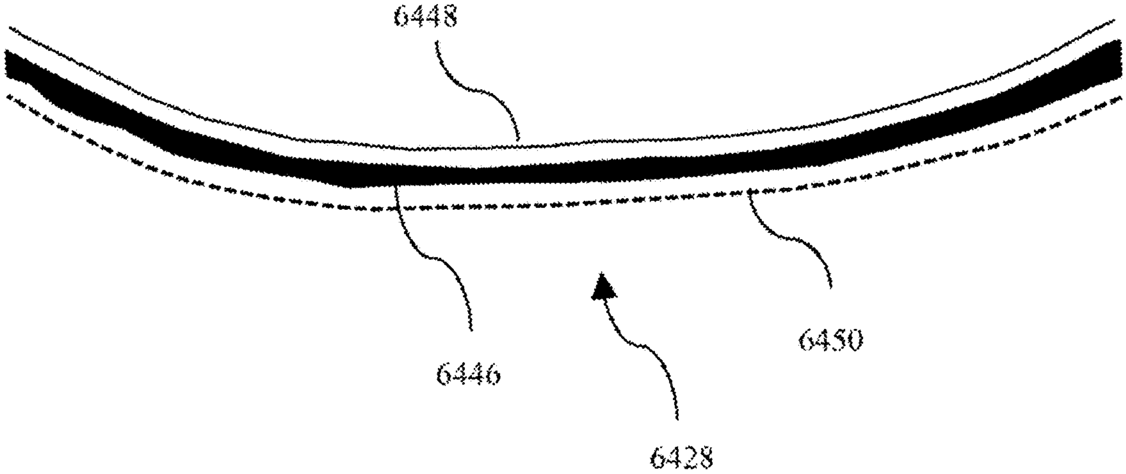

FIG. 197 is an exploded view of a multi-layer trim cover, such as the trim cover of the seat cushion assembly of FIG. 196.

Figure 198:
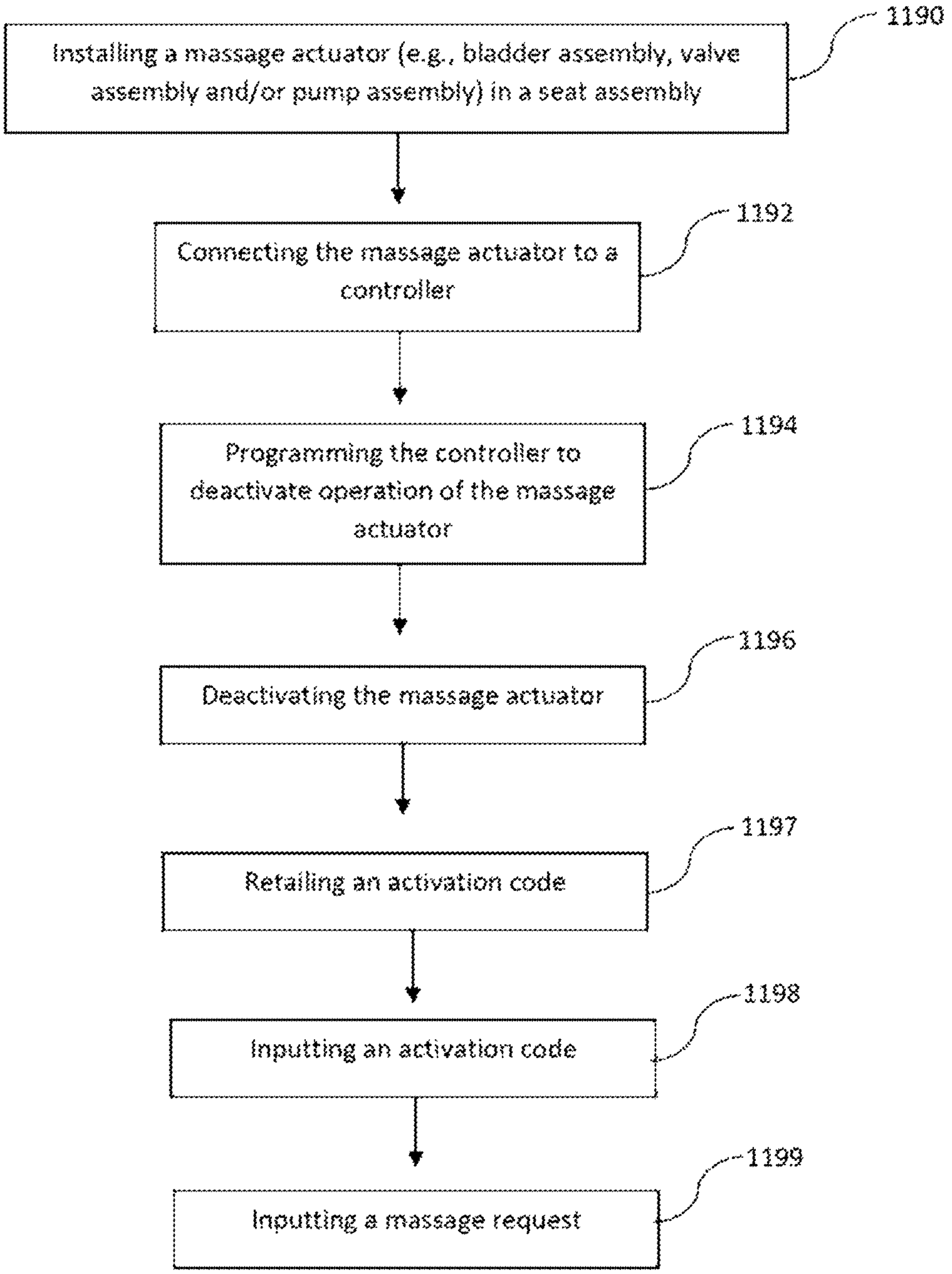

FIG. 198 is flow chart of a method of deactivating a massage actuator.

Figure 199:
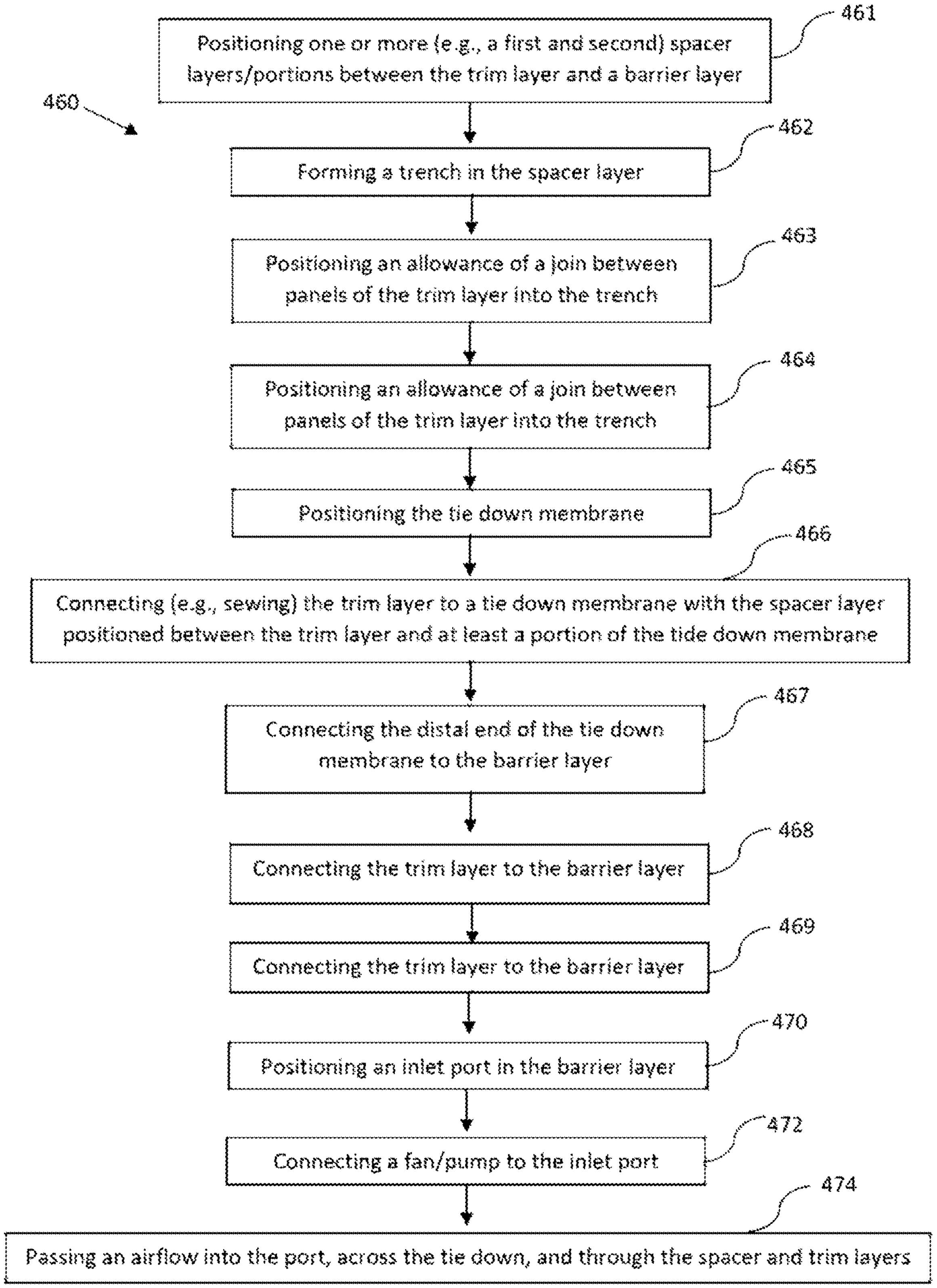

FIG. 199 is a flow chart of a method of assembling a trim assembly.

Figure 200:
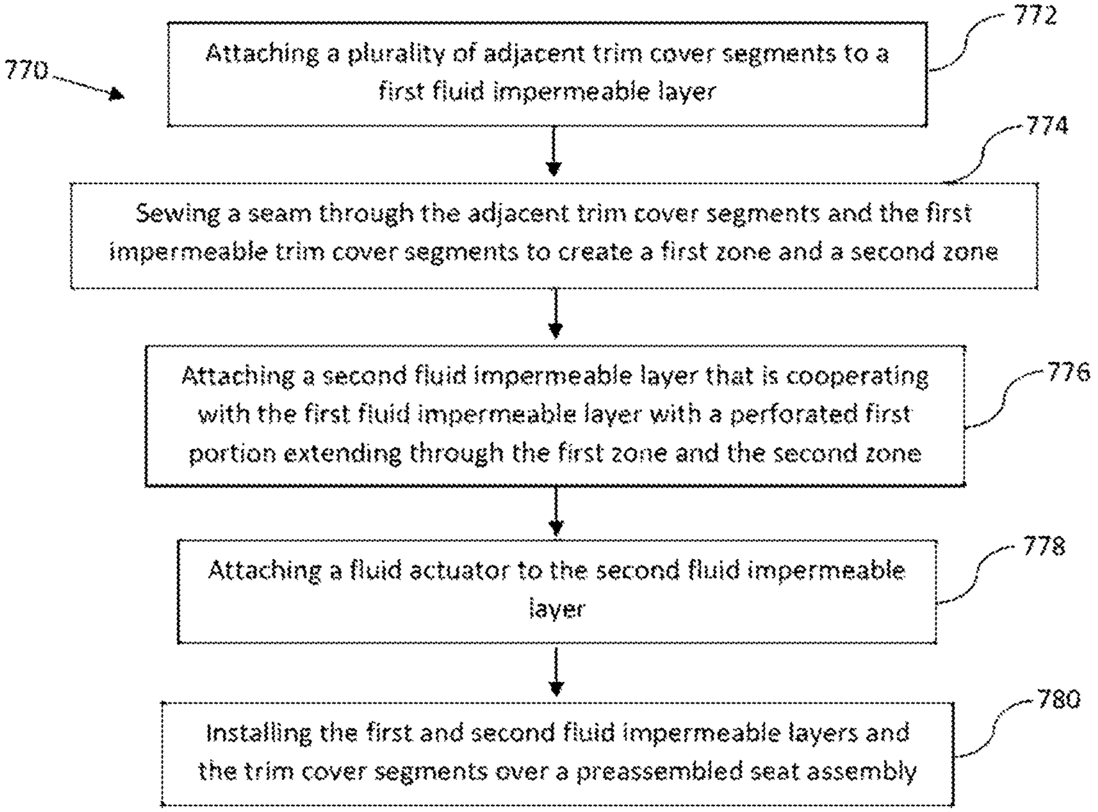

FIG. 200 is a flow chart of a method of producing a seat assembly.

Figure 201:
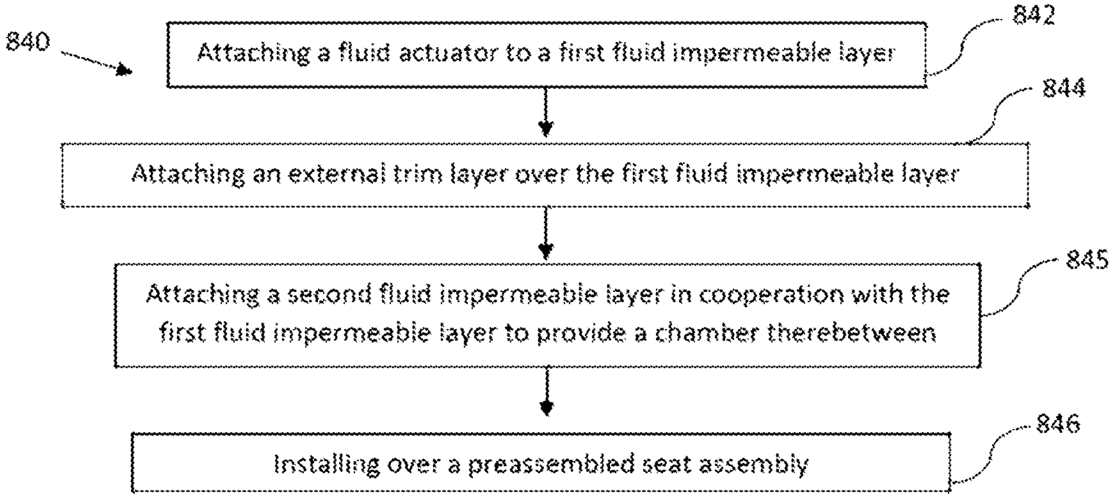

FIG. 201 is a flow chart of a method of assembling a seat assembly.

Figure 202:
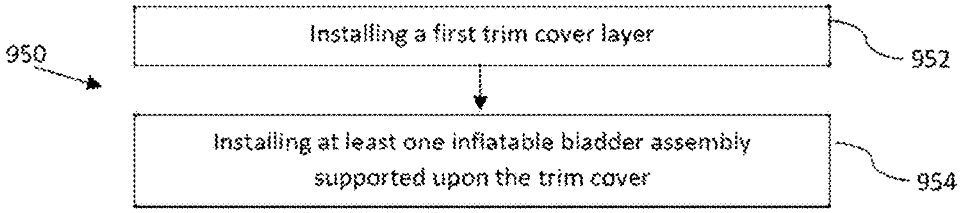

FIG. 202 is a flow chart of a method of assembling a seat.

Figure 203:
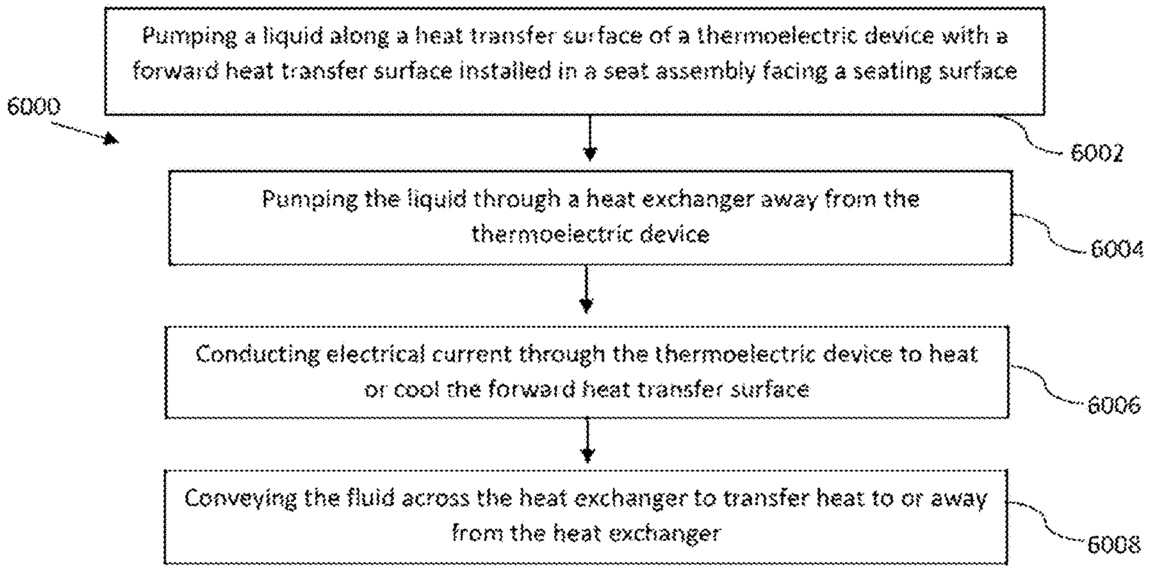

FIG. 203 is a flow chart of a method of operating a heat transfer system.

Figure 204:
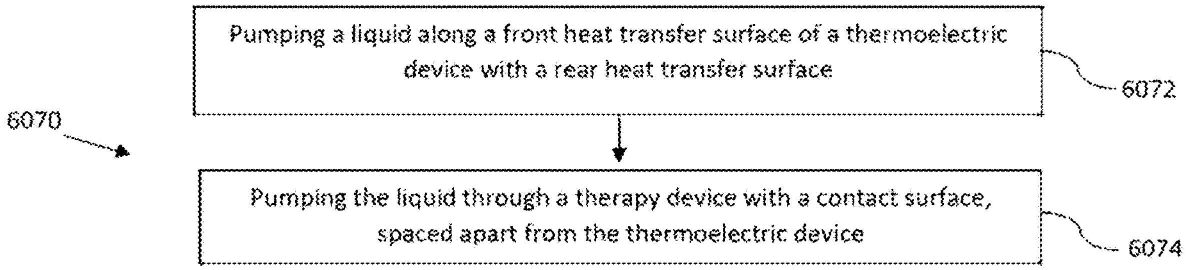

FIG. 204 is a flow chart of a method of operating a heat transfer system.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first surface could be termed a second surface, and, similarly, a second surface could be termed a first surface, without departing from the scope of the various described embodiments. The first surface and the second surface are both surfaces, but they are not the same surface.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight. The term "polymer" includes "oligomer," "copolymer," "terpolymer," and the like. The description of a group or class of materials as suitable or preferred for a given purpose implies the mixtures of any two or more of the members of the group or class are equally suitable or preferred unless stated otherwise. Molecular weights provided for any polymers refers to number average molecular weight. Description of constituents in chemical terms refers to the constituents at the time of addition to any combination specified in the description and does not necessarily preclude chemical interactions among the constituents of a mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

The term "substantially" or "generally" may be used herein to describe disclosed or claimed embodiments. The term "substantially" may modify a value or relative characteristic disclosed or claimed in the present disclosure. In such instances, "substantially" and "generally" may signify that the value or relative characteristic is within manufacturing tolerances thereof, or is within +0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The terminology controller may be provided as one or more controllers or control modules for the various components and systems. The controller and control system may include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
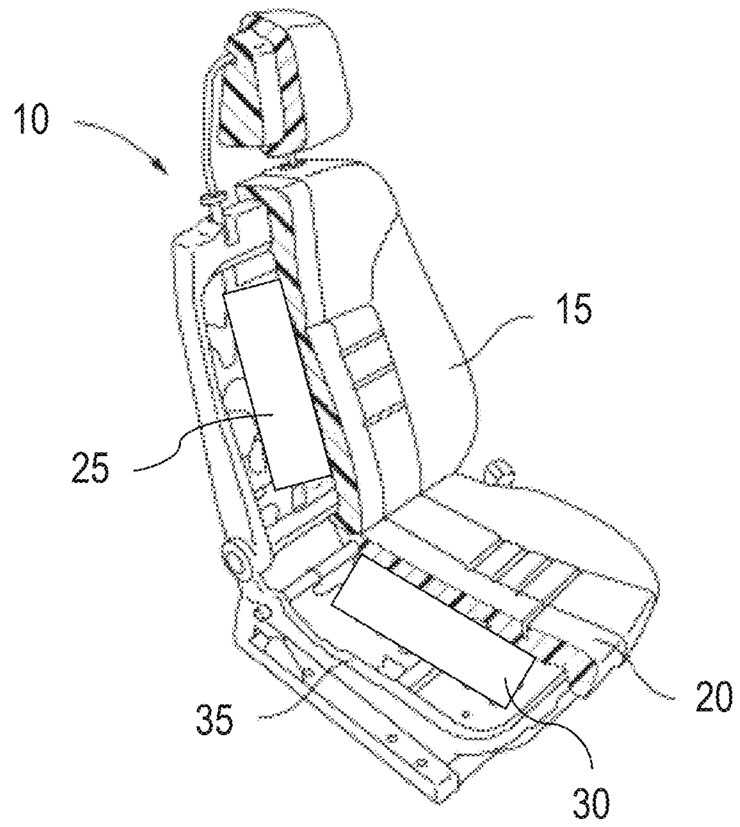
FIG. 1 is a perspective view schematic of a seat assembly.

Referring to FIG. 1, a seat assembly 10 including one or more subassemblies 15-35 is disclosed. For example, the seat assembly 10 includes trim assembly 15 disposed over a cushion assembly 20 which is supported by a frame assembly 35. In some embodiments, the trim assembly 15 includes ventilation. In some embodiments, the seat assembly 10 also includes a fluid assembly 20. In some embodiments, the seat assembly 10 includes a temperature control assembly 25, 30. In various embodiments, the fluid assembly 20 is a ventilation assembly and/or a massaging assembly. In some embodiments, the fluid assembly 20 cooperates with ventilation in the trim assembly 15, and in some embodiments, the fluid assembly 20 includes trim assembly 15 ventilation. The temperature control assembly 25, 30, for example, includes a heat transfer assembly. In some embodiments, a valve assembly is included to control a flow of fluid. In some embodiments a retainer or fastener may attach various components to a cushion.

According to some embodiments, the assemblies 10, 15, 20, 25, 30, 35 and subassemblies 10, 15, 20, 25, 30, 35 may each be provided separately. According to some embodiments, the assemblies 10, 15, 20, 25, 30, 35 and subassemblies 10, 15, 20, 25, 30, 35 may be provided as preassembled modules 10, 15, 20, 25, 30, 35. The assemblies 10, 15, 20, 25, 30 or subassemblies 10, 15, 20, 25, 30 may be preassembled to the frame assembly 35. The assemblies 10, 15, 25, 30, 35 or subassemblies 10, 15, 25, 30, 35 may also be preassembled to the cushion assembly 20. The assemblies 10, 15, 25, 30, 35 or subassemblies 10, 15, 25, 30, 35 may also be integrated into a material of the seat cushion assembly 20, e.g., integrated into foam or an extruded thermoplastic mesh. In some embodiments, the cushion assembly 20 may be formed from an additive manufacturing process, such as the processes disclosed in Migneco et al. U.S. Pat. No. 11,440,791 B2, which issued to Lear Corporation on Sep. 13, 2022, and is incorporated in its entirety by reference herein. Various options are available to preassemble the subassemblies 10, 15, 20, 25, 30, 35 or assemblies 10, 15, 20, 25, 30, 35 as modules, or to the frame assembly 35, or to the seat cushion assembly 20.

Figure 2:
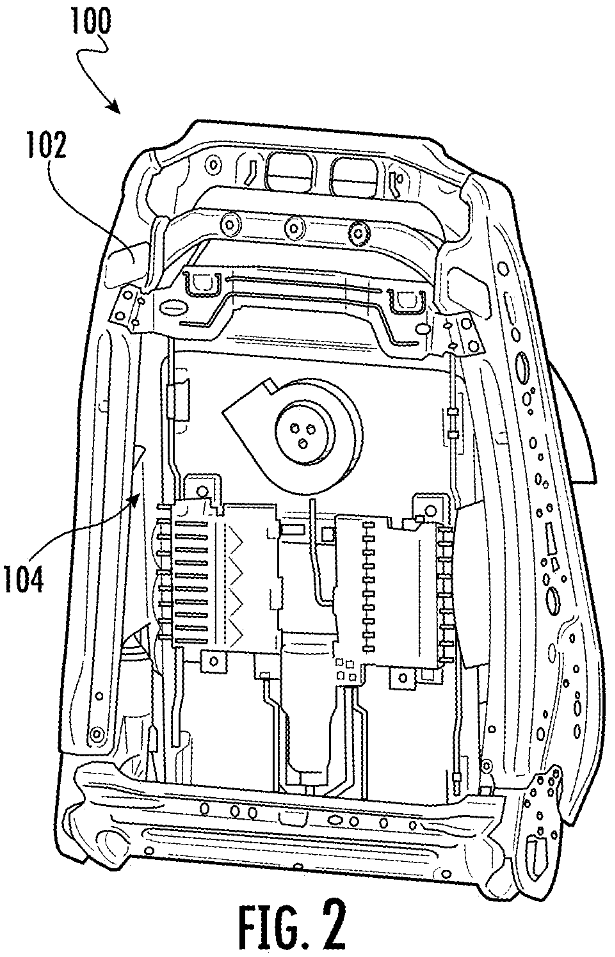
FIG. 2 is perspective view of a seat assembly.

Referring to FIG. 2, a seat assembly 100 such as a vehicle seat assembly is disclosed. The seat assembly 100 includes a seat frame 102 and a subassembly 104 such as a ventilation subassembly. The subassembly 104 may be supported by the seat frame 102. Referring to FIGS. 2-3, the subassembly 200 includes a trim cover 210 fixed to a membrane 220, one or more additional layers 240 such as a cushion, and/or a substrate 250.

The trim cover 210 is configured to be adjacent to a seat occupant, i.e., the trim cover may include the outermost layer or include a surface that is the outer most surface. The trim cover 210 may cover the remaining components of the seat assemble 100 and be the primary contact surface with the occupant. The trim cover 210 may be configured to provide ventilation to the occupant while seated and during operation. For example, the trim cover 210 may include one or more perforations 211 and/or be permeable to a fluid such as air. The trim cover 210 may include a first surface 212 (e.g., exposed surface) and a second surface 213 (e.g., unexposed surface) opposite the first surface 212. The first surface 212 may be the surface of a fabric, faux leather, or leather. For instance, the fabric or faux leather may be cotton, polyester, polyurethane, nylon, or any other suitable fabric. In a variation, the fabric or faux leather may be a polyester or polyurethane. The trim cover 210 may also include one or more layers such as an outer layer 214 and an inner layer 215. For example, the outer layer 214 may be a polyurethane faux leather or a polyester fabric and inner layer 215 may be a spacer fabric or a thin polyurethane foam cushion (e.g., 0.05 to 5 mm, or more preferably 0.1 to 3 mm, or even more preferably 0.25 to 1.25 mm). The inner layer 215 may be permeable to a fluid flow such as air but the outer layer 214 may be made of an impermeable material such as a faux leather or leather. If the outer layer 214 is an impermeable material, it may be perforated such that it can provide ventilation to an adjacent occupant when it receives a fluid flow from the inner layer 215.

The trim cover 210 may be fixed and/or sealed to the membrane 220 such that the membrane 220 cannot be removed without damaging the trim cover 210, membrane 220 or fixing/scaling medium (e.g., sewing or welding). In a variation, the trim cover 210 and membrane 220 may at least partially be fixed and/or sealed along or proximate to an outer periphery or perimeter of, for example, a seat face 218. In a variation, trim cover 210 may be fixed/scaled to the membrane 220 such that it is impermeable or does not leak a fluid flow such as air at the connection interface. In a refinement, fixed may refer to an immutably connection such that it excludes a peel and stick adhesive that may be easily disconnected without damaging the materials. The membrane 220 may be disposed between the trim cover 210 and the substrate 250. In a variation, the membrane 220 may be adjacent to the trim cover 210. The membrane 220 may also be disposed adjacent to one or more additional layers 240. The one or more additional layers 240 may be disposed between the membrane 220 and the substrate 250. Said differently, the assembly may include a trim cover 210 connected to and adjacent the membrane 220, which is adjacent the one or more additional layers that are opposite the trim cover 210.

Figure 3A:
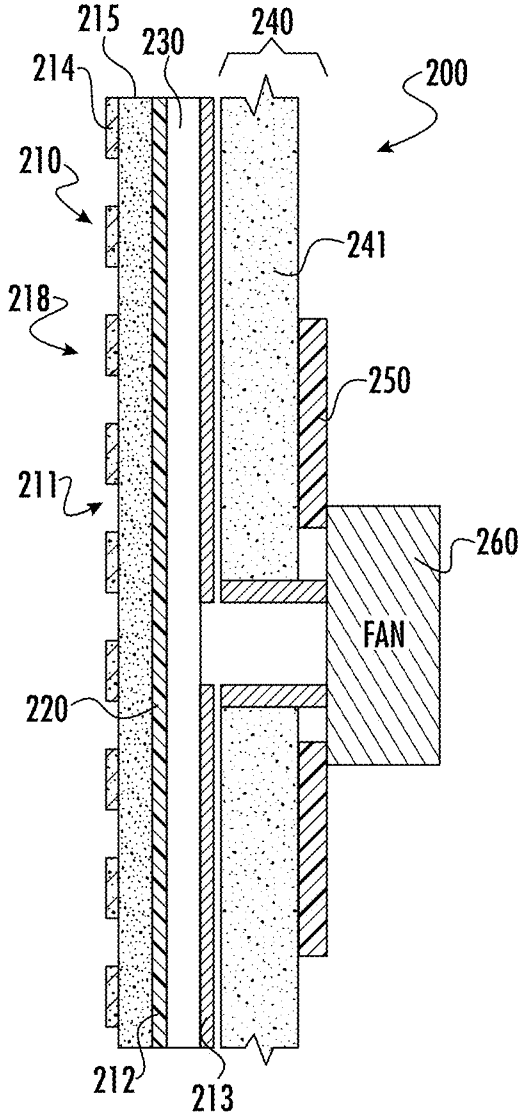
FIG. 3A is cross-sectional schematic of a ventilation assembly according to some embodiments.
Figure 3B:
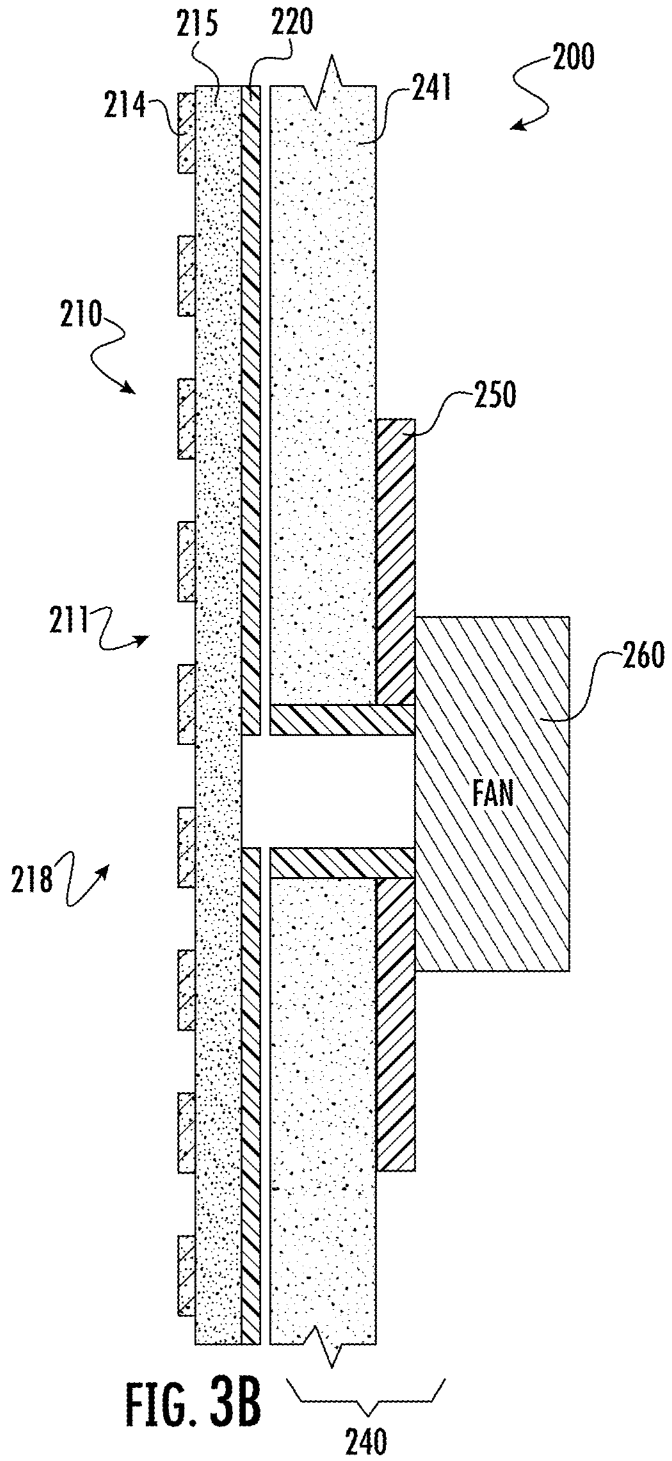
FIG. 3B is cross-sectional schematic of a ventilation assembly according to some embodiments.

In a refinement, the membrane 220 may form a ventilation bag 222 defining a cavity, as shown in FIGS. 3A-B. In yet another refinement, the membrane 220 and trim cover 210 may work together to form a cavity as shown in FIGS. 3A-B. The cavity may include a channel. Alternatively, the membrane 220 or ventilation bag may further define a channel in fluid communication with the cavity. Thus, the channel is disposed opposite the trim cover and extends away from the trim cover toward and proximate to an outlet of a blower 260. The channel is configured to receive a fluid flow from the blower 260. For example, in a variation, the channel may be disposed and sealed around an outlet of the blower 260 such as by a ring gasket or ring snap. Alternatively, the channel may be disposed in the outlet or engage the substrate 250.

The membrane 220 is made of an impermeable fabric that does not allow a fluid flow such as air to transfer through the fabric. For example, the membrane 220 may be plastic and/or fabric sheets such as polyethylene, polyurethane, thermoplastic polyurethane, and/or felt such as Tyvek®. The ventilation bag may have a spacer 230 disposed in the cavity defined by the ventilation bag. The spacer 230 may be any suitable structure that resist crushing that would impede a fluid flow permeating through it. For example, the spacer 230 may be a spacer fabric that is permeable to air. The ventilation bag may also be formed from one or more sheets.

For example, the membrane 220 may be formed from a first sheet 224 and a second sheet 225 that are fixed to one another to define the cavity. The first and second sheets 224, 225 may be fixed such that they form a seal. For example, the first and second sheets 224, 225 may be fixed to one another by stitching, heat-staking, ultrasonic staking, hot-plate welding, heat swaging, cold pressing, or the like such that they do not allow a fluid flow to escape except through one or more designated apertures. In a variation, the first sheet 224 may be permeable to a fluid flow such as air. Thus, the ventilation bag 222 may be configured to provide fluid communication the trim cover 210. In a refinement, the first sheet 224 may be disposed adjacent to the trim cover 210 and the second sheet 225 may be disposed opposite the trim cover 210 such that the first sheet 224 is disposed between the trim cover 210 and the second sheet 225.

The one or more additional layers 240 may include a cushion or comfort material 241. The cushion or comfort material 241 can may provide comfort to an occupant while seated. For example, the cushion or comfort material may be a foam. In a variation, the cushion or comfort material 241 may be a foamless mesh. In a refinement, the ventilation assembly 200 and/or seat assembly 100 may be foamless. In a refinement, the ventilation assembly may be foamless such that it does not include a foam cushion. Said differently, seat assembly may be foamless.

Foamless may refer to one or more stacked layers of a non-foam material. Each layer may be formed from a knitted monofilament textile material. An example of the material is a polyester, such as polyethylene terephthalate. The material may also be formed from a recycled material to reduce material costs, and to reduce waste. The material may be non-woven, woven, and/or knitted to provide structure, while also spaced out to provide porosity, ventilation, and compliancy. The non-foam material may be made of a monofilament textile. For example, additional details of a non-foam or foamless material can be found in the application identified by Ser. No. 17/218,663 filed on Mar. 31, 2021, the entirety of which is hereby incorporated by reference.

In a variation, the non-foam or foamless material may be a non-woven thermoplastic resin mesh. The mesh may be formed by extruding a pressurized molten thermoplastic resin from an extruder through an extrusion die. The extrusion die may include a plurality of outlet ports or nozzles to dispense a plurality of strands of the molten thermoplastic resin. The strands are dispensed into a fluid chamber having a fluid (e.g., water) to resist and cool the strands. The fluid resists the flow of the strands causing the strands to buckle, loop, and/or intersect with adjacent strands. The solidified and intertwined strands form a unitary non-woven thermoplastic mesh cushion. For example, additional details of this process are disclosed in the application identified by Ser. No. 17/741,639 filed on May 11, 2022, the entirety of which is hereby incorporated by reference.

The one or more additional layers 240 may define an orifice such that the membrane 220 may pass through the one or more additional layers 240 from the trim cover 210 to the blower 260 for receiving a fluid flow from the blower 260 during operation.

The one or more additional layers 240 may also include the substrate 250 may support multiple components such as the blower 260, a pump, electrical circuitry, the ventilation assembly 200, and/or a massaging/bladder assembly, in which case it may be referred to as a carrier. The substrate 250 may be suspended such as by a suspension system (e.g., suspension wires) to the seat frame 102 of a seat assembly 100. The substrate 250 may be a rigid board such a plastic board. The substrate 250 or carrier may define an orifice such that a fluid flow can be received through the orifice from the blower 260 during operation. Alternatively, the blower 260 may be directly connected to the ventilation bag.

The blower 260 may include a motor in mechanical communication with a fan such that it is configured to provide a fluid flow during operation. The blower 260 may include an inlet for receiving a fluid such as air and an outlet for delivering a fluid flow during operation. Thus, in one or more embodiments, the ventilation assembly 200 may be configured to receive or deliver a fluid flow from or to the blower 260 such that the fluid flow may travel along the membrane 220 or through the ventilation bag formed by the membrane 220 to the trim cover 210 and through the trim cover 210 or vice versa to provide ventilation to a seated occupant during operation and when assembled in a seat assembly. In other words, the blower may be configured to provide an air flow to the occupant or draw an air flow from the occupant to provide ventilation (i.e., the blower may be configured to pull or push air).

In some embodiments, a ventilation assembly e.g., 200 for a seat e.g., 100 such as for a vehicle (e.g., motorcycle, automobile, locomotive, watercraft, aircraft) comprising a trim cover e.g., 210, a subassembly e.g., 200 (e.g., ventilation bag 222), and a spacer e.g., 230 such as a spacer fabric. The trim cover e.g., 210 is configured to contact an occupant and provide ventilation from a fluid flow such as an airflow when assembled in a seat e.g., 100 during operation. The ventilation bag e.g., 222 defining a cavity and a channel in fluid communication with the cavity and disposed opposite the trim cover e.g., 210, the channel being configured to connect with a blower e.g., 260 through one or more additional layers e.g., 240 such as a cushion/comfort material e.g., 241 (which may be a foamless mesh), a substrate e.g., 250 such as a carrier board, a rigid board, a plastic board. The ventilation bag e.g., 222 fixed to the trim cover e.g., 210 such that a fluid flow (e.g., airflow) travels from the ventilation bag e.g., 222 to the trim cover e.g., 210 or vice versa. The spacer e.g., 230 such as a spacer fabric is disposed in the cavity.

In various embodiments, the ventilation bag e.g., 222 is sewn or welded to the trim cover e.g., 210.

In one or more embodiments, the ventilation bag e.g., 222 is fixed to the trim cover e.g., 210 at least partially along an outer periphery.

In some embodiments, the one or more additional layers e.g., 240 comprise a substrate e.g., 250 such as a carrier board, a rigid board, a plastic board configured to support a blower e.g., 260.

In various embodiments, the one or more additional layers e.g., 240 comprise a foamless mesh such as a foamless mesh cushion e.g., 241. The subassembly e.g., 200 such as a ventilation assembly further comprises the blower e.g., 260 supported by the substrate e.g., 250 such as a carrier board, a rigid board, a plastic board.

In one or more embodiments, the ventilation bag e.g., 222 comprises a first sheet e.g., 224 (e.g., plastic and/or fabric sheets such as polyethylene, polyurethane, thermoplastic polyurethane, and/or felt such as Tyvek®) adjacent to the trim cover e.g., 210 and a second sheet e.g., 225 (e.g., plastic and/or fabric sheets such as polyethylene, polyurethane, thermoplastic polyurethane, and/or felt such as Tyvek®) cooperating with (e.g., fixedly sealed such as by stitching, heat-staking, ultrasonic staking, hot-plate welding, heat swaging, cold pressing, or the like such that they do not allow a fluid flow to escape except through one or more designated apertures) to the first sheet e.g., 224 (e.g., plastic and/or fabric sheets such as polyethylene, polyurethane, thermoplastic polyurethane, and/or felt such as Tyvek®) and opposite the trim cover e.g., 210 such that the first and second sheets e.g., 224, 225 (e.g., plastic and/or fabric sheets such as polyethylene, polyurethane, thermoplastic polyurethane, and/or felt such as Tyvek®) define the cavity and the channel.

In some embodiments, the one or more additional layers e.g., 240 do not include a foam cushion.

In one or more embodiments, the outer periphery is the outer periphery of a face e.g., 218 of the seat assembly.

In one or more embodiments, a vehicle seat e.g., 100 comprising the subassembly e.g., 200 such as a ventilation assembly and a seat frame e.g., 102 supporting the subassembly (e.g., ventilation assembly).

A seat subassembly e.g., 100 comprising a trim cover e.g., 210, a carrier e.g., 250 (e.g., rigid plastic board), a first sheet e.g., 224 (e.g., plastic and/or fabric sheets such as polyethylene, polyurethane, thermoplastic polyurethane, and/or felt such as Tyvek®), a second sheet e.g., 225 (e.g., plastic and/or fabric sheets such as polyethylene, polyurethane, thermoplastic polyurethane, and/or felt such as Tyvek®), a spacer e.g., 230 such as a spacer fabric, and one or more additional layer e.g., 240.

In one or more embodiments, the trim cover e.g., 210 has a first surface e.g., 212 (e.g., an exposed surface) and a second surface e.g., 213 (e.g., an unexposed surface) opposite the first surface e.g., 212 (e.g., exposed surface).

In various embodiments, the trim cover e.g., 210 is configured to provide ventilation to an occupant adjacent to the first surface e.g., 212 (e.g., exposed surface) when a fluid flow (e.g., air flow) is received at the second surface e.g., 213 (e.g., unexposed surface).

In some embodiments, the carrier e.g., 250 is configured to support a blower e.g., 260.

In various embodiments, the carrier e.g., 250 defining an orifice for receiving the fluid flow (e.g., airflow) from the blower e.g., 260. The first sheet e.g., 224 (e.g., plastic and/or fabric sheets such as polyethylene, polyurethane, thermoplastic polyurethane, and/or felt such as Tyvek®) cooperates with (e.g., is fixed to such as by stitching, heat-staking, ultrasonic staking, hot-plate welding, heat swaging, cold pressing, or the like such that they do not allow a fluid flow to escape except through one or more designated apertures) the trim cover e.g., 210 and between the trim cover e.g., 210 and the carrier e.g., 250 (e.g., rigid plastic board). The second sheet e.g., 225 (e.g., plastic and/or fabric sheets such as polyethylene, polyurethane, thermoplastic polyurethane, and/or felt such as Tyvek®) between the first sheet e.g., 224 (e.g., plastic and/or fabric sheets such as polyethylene, polyurethane, thermoplastic polyurethane, and/or felt such as Tyvek®) and the carrier e.g., 250 (e.g., rigid plastic board).

In various embodiments, the second sheet e.g., 225 (e.g., plastic and/or fabric sheets such as polyethylene, polyurethane, thermoplastic polyurethane, and/or felt such as Tyvek®) cooperates with (e.g., is sealed to such as by stitching, heat-staking, ultrasonic staking, hot-plate welding, heat swaging, cold pressing, or the like such that they do not allow a fluid flow e.g., airflow to escape except through one or more designated apertures) the first sheet e.g., 224 (e.g., plastic and/or fabric sheets such as polyethylene, polyurethane, thermoplastic polyurethane, and/or felt such as Tyvek®) such that the first and second sheets e.g., 224, 225 (e.g., plastic and/or fabric sheets such as polyethylene, polyurethane, thermoplastic polyurethane, and/or felt such as Tyvek®) define a cavity including a channel.

In various embodiments, the channel configured to receive a fluid flow (e.g., airflow) from the blower e.g., 260 through the orifice. In some embodiments, the spacer e.g., 230 (e.g., spacer fabric) disposed in the cavity.

In various embodiments, one or more additional layers e.g., 240 disposed between the second sheet e.g., 225 (e.g., plastic and/or fabric sheets such as polyethylene, polyurethane, thermoplastic polyurethane, and/or felt such as Tyvek®) and the carrier e.g., 250 (e.g., rigid plastic board) such that the channel provides a passage through the one or more additional layers e.g., 240 (e.g., such as a cushion/comfort material e.g., 241 such as a foamless mesh) wherein ventilation is provided to or from the blower e.g., 260 through the cavity and to or from the occupant adjacent to the trim cover e.g., 210.

In one or more embodiments, the first sheet e.g., 224 is fixed to the trim cover e.g., 210 by being sewn or welded.

In some embodiments, the spacer e.g., 230 (e.g., spacer fabric) is disposed between the first and second sheets e.g., 224, 225 (e.g., plastic and/or fabric sheets such as polyethylene, polyurethane, thermoplastic polyurethane, and/or felt such as Tyvek®).

In some embodiment, a seat frame e.g., 102 supports one of the subassemblies described herein.

In one or more embodiments, a subassembly e.g., 200 such as a ventilation assembly for a seat e.g., 100 comprises a trim cover e.g., 210, a carrier e.g., 250, a cushion e.g., 241 and a membrane e.g., 220.

In various embodiment, the carrier e.g., 250 (e.g., rigid plastic board) configured to support a blower e.g., 260.

In some embodiments, the carrier e.g., 250 defines a first orifice configured to receive a fluid flow (e.g., airflow) from the blower e.g., 260 during operation.

In one or more embodiments, the cushion e.g., 241 (such as a foamless fiber nonwoven mesh cushion) is disposed between the trim cover e.g., 210 and the carrier e.g., 250.

In some embodiments, the cushion e.g., 241 is adjacent to the carrier e.g., 250 and defines a second orifice.

In various embodiments, the membrane e.g., 220 is disposed between the cushion e.g., 241 and the trim cover e.g., 210 and extends through the second orifice.

In one or more embodiments, the membrane e.g., 220 fixed to the trim cover e.g., 210 such that the fluid flow (e.g., airflow) is received or delivered through the first orifice to the trim cover e.g., 210 and provides ventilation through the trim cover e.g., 210 to an occupant adjacent to the trim cover e.g., 210 during operation.

In some embodiments, the membrane e.g., 220 is fixed to the trim cover e.g., 210 along an outer periphery.

In various embodiments, the membrane e.g., 220 is sewn or welded to the trim cover e.g., 210.

In some embodiments, the membrane e.g., 220 is sewn to the trim cover e.g., 210. In other embodiment, the membrane e.g., 220 welded to the trim cover e.g., 210.

In one or more embodiments, a vehicle seat e.g., 100 comprises a seat frame e.g., 102 and the subassembly e.g., 200 such as the ventilation assembly that is supported by the seat frame e.g., 102.

Figure 4:
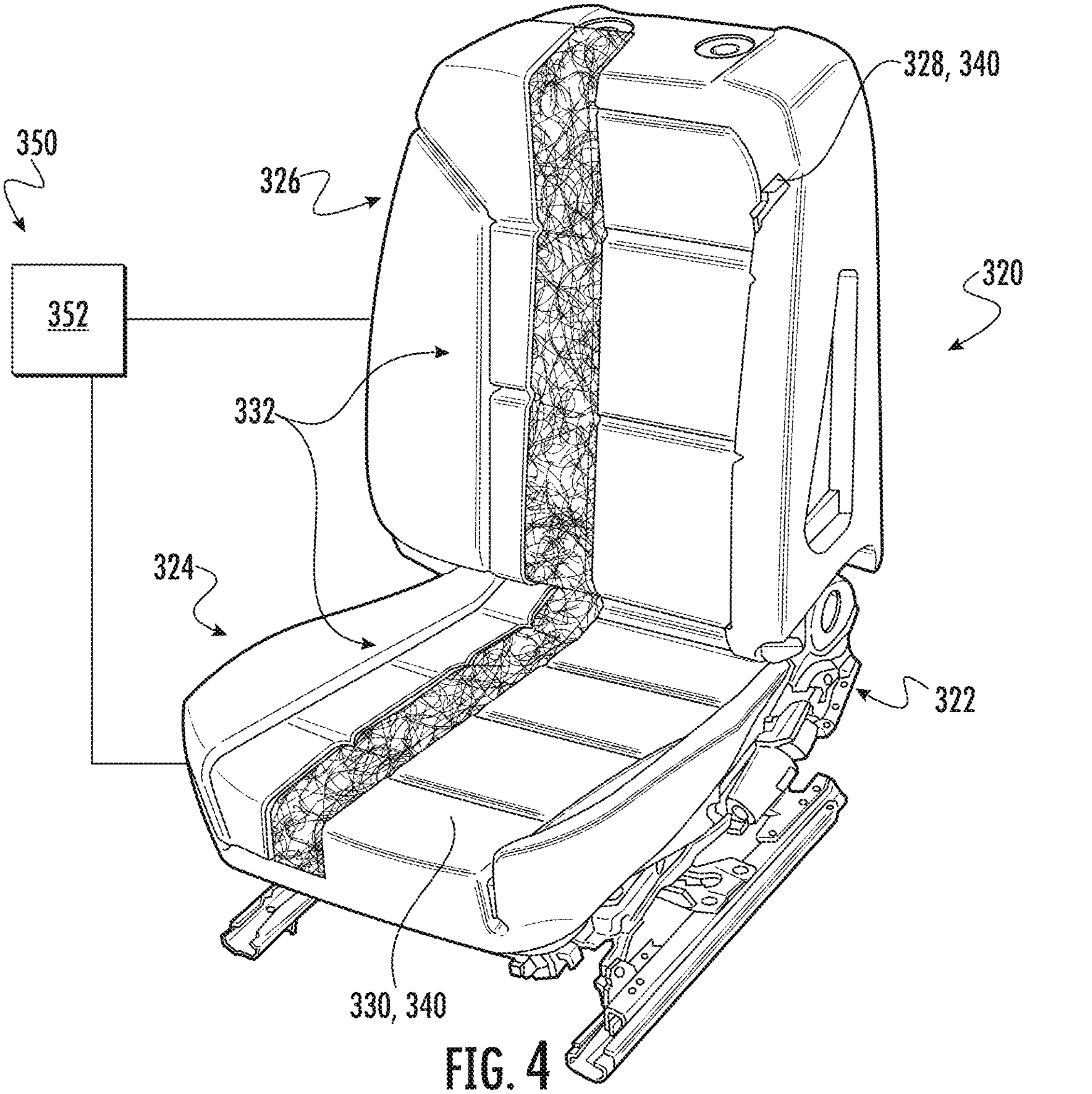
FIG. 4 illustrates a perspective view of a seat assembly according to some embodiments.

Referring to FIG. 4, a seat assembly 320, such as a vehicle seat assembly 320 is illustrated. In other examples, the seat assembly 320 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 320 may be configured for use with other non-vehicle applications.

The seat assembly 320 has a support structure 322 that may be provided by one or more support members. A support member may be provided by a frame and/or a substrate. The seat assembly has seat components, and these seat components include at least a seat bottom 324 and a seat back 326. The seat bottom 324 may be sized to receive a seated occupant to support a pelvis and thighs of the occupant. The seat back 326 may be sized to extend upright from the seat bottom 324 to support a back of the occupant. The seat assembly may additionally have a head restraint (not shown). The seat bottom 324 has a seat bottom cushion 328. The seat back 326 has a seat back cushion 330. The frame 322 may include wire suspension mats or other structure to support the cushions 328, 330.

The support structure 322 provides rigid structural support for the seat components, e.g., the seat bottom 324 and seat back 326, and may be provided as multiple frame members and/or substrates or panels that are moveable relative to one another to provide adjustments for the seat assembly. The support structure 322 may be formed from a stamped steel alloy, a fiber reinforced polymer, or any suitable structural material.

One or more trim assemblies 332 are used to cover the seat bottom cushion 328 and/or the seat back cushion 330 and provide a seating surface for the seat assembly 320. The vehicle seat assembly 320 is shown with the trim cover assembly 332 partially cutaway. In one example, the trim cover assembly 332 covers both of the cushions 328, 330. In other examples, multiple trim cover assemblies are provided to cover the seat bottom cushion and the seat back cushion. Trim cover assemblies 332 according to various embodiments are described below in further detail. The trim assemblies 332 provide the trim surface, or visible surface or A surface of the seat assembly 320. The trim assemblies 332 also incorporate additional material layers as described below, and furthermore may provide ventilation for the seat. The seat assemblies 332 may be provided as modular components for assembly onto the seat assembly 320.

In one example, and as shown, one or more of the trim assemblies 332 are in fluid communication with a fluid system 350, such as an air system, to provide air flow through the trim assembly for ventilation. The air system 350 is provided with a fan 352 and/or an air pump 352 to provide pressurized air flow to the trim assembly 332.

A seating cushion 340 is described in further detail below, and the description may similarly be applied to the seat bottom cushion 328 or the seat back cushion 330. According to various examples, the seating cushion 340 may be formed from a foam material, such as a molded polyurethane foam, or a nonfoam material, or a combination thereof. In alternative examples, the seat assembly 320 may be provided without any cushions 340 such that the trim assembly is supported directly on the support member 322, e.g., as a panel or substrate.

In one non-limiting example, the nonfoam component or member of the seating cushion 340 is formed by a stranded mesh material, also known as an entangled three-dimensional filament structure. The stranded-mesh material is made from a polymeric mesh having a plurality of integrated polymeric strands. The stranded-mesh material may be made from, for example, a linear low-density polyethylene (LLPDE) material, although other polymers and materials effective to provide the desired properties and functionality are contemplated. The stranded-mesh material may be formed using extruded filaments of linear low-density polyethylene (LLDPE) that are randomly entangled, bent, looped, or otherwise positioned and oriented, and directly bonded to each other to provide a porous mesh structure.

Figure 5:
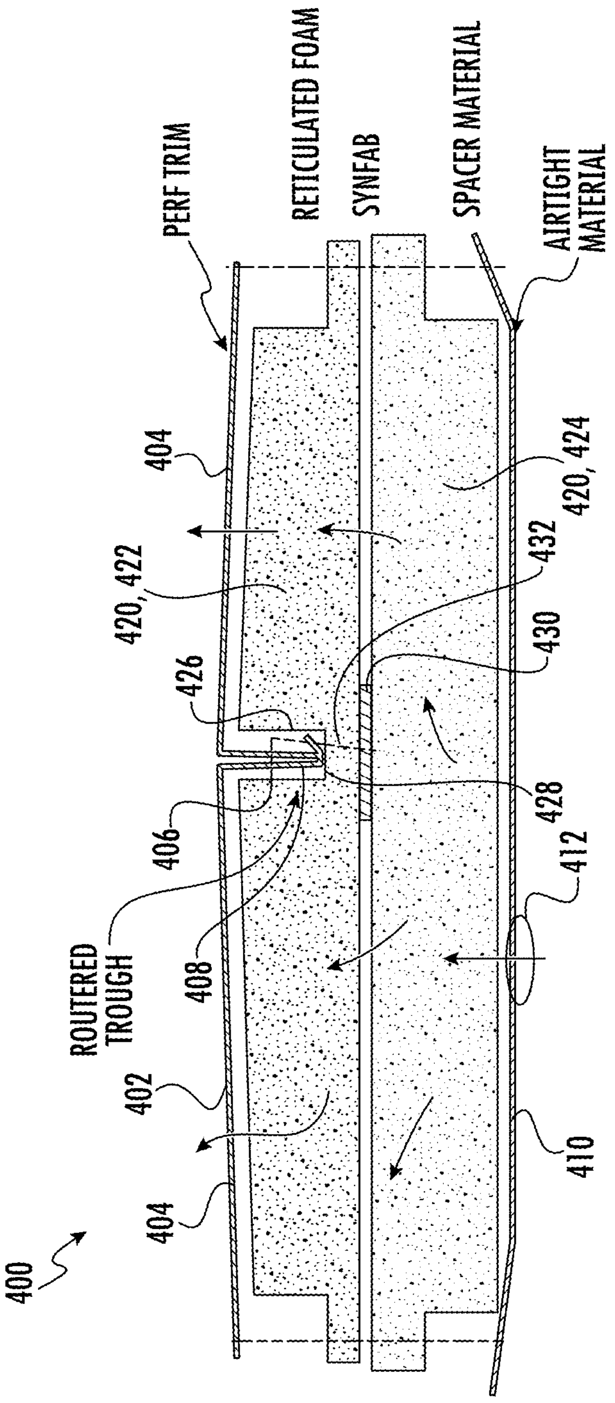
FIG. 5 illustrates a sectional view of a trim assembly according to some embodiments and for use with the seat assembly of FIG. 4.
Figure 6:
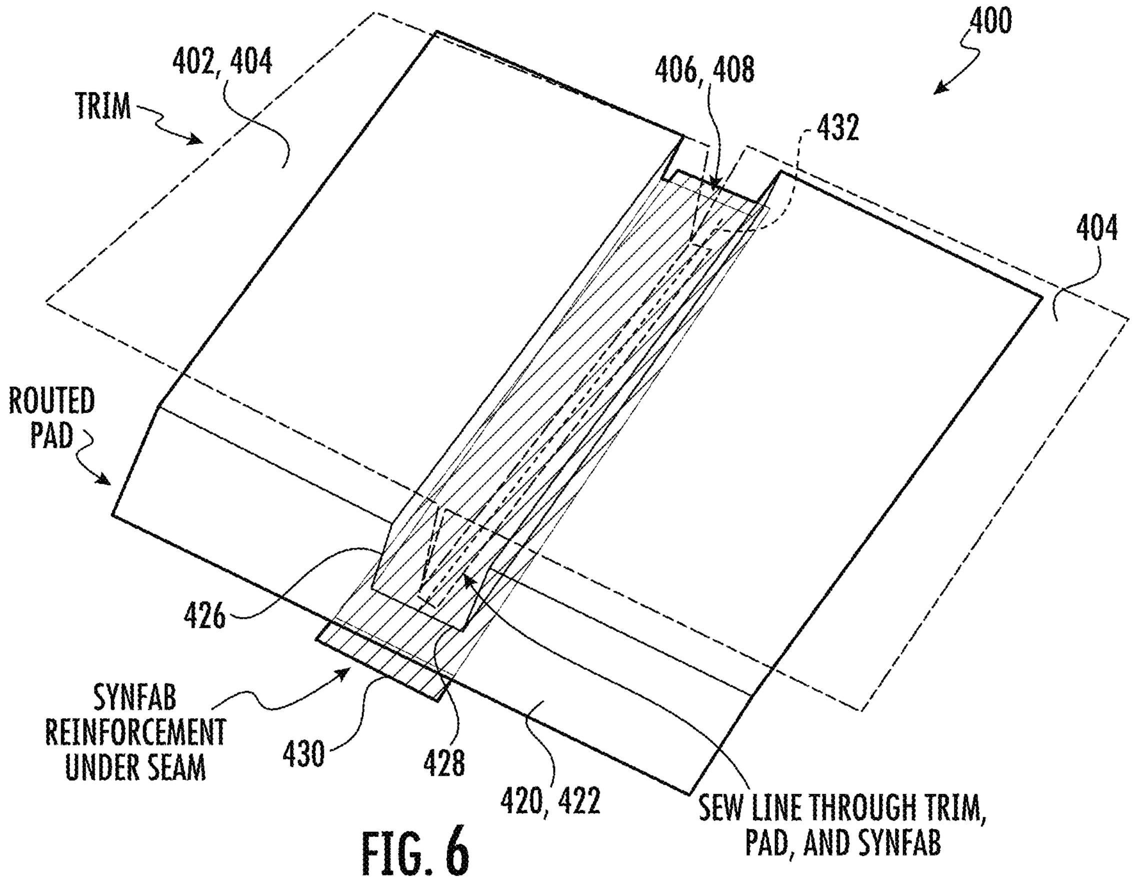
FIG. 6 illustrates a partial schematic view of the trim assembly of FIG. 5.

Referring to FIGS. 5-6, a trim assembly 400 is illustrated according to various examples of the present disclosure. The trim assembly 400 may be formed from multiple layers of material as described below. The trim assembly 400 may be used as the trim assembly 332 with the vehicle seat assembly 320 of FIG. 4 or may be used with another seat as described above, or another vehicle or other application.

The trim assembly 400 has a perforated trim cover layer 402. The trim cover layer 402 may provide the A-surface for the trim assembly 400, or the seating surface that is visible to the seat occupant. The perforated trim cover layer 402 may be formed from one or more panels 404 of leather, leatherette, vinyl, woven fabric, knitted fabric, or other material. The perforations in the panels 404 of the trim cover layer 402 allow for air to flow across the trim cover layer 402. The perforations may be provided as small holes or apertures formed through the trim cover layer. The knit or weave pattern in a fabric trim cover layer may act as perforations and provide for air flow across the fabric layer.

The various panels 404 of the trim cover layer 402 are connected to one another via a join 406. The join 406 may be provided by sewing, welding, bonding, laminating, or another process, to connect two adjacent trim panels 404 and form the trim cover layer. In the example shown, the trim panels 404 are connected to one another via a seam formed by sewing to provide the join 406. An allowance 408 is provided in the trim cover layer 402, with the allowance 408 being the area between the edge and the join region or stitching line on the two panels being connected together.

The trim assembly 400 has a barrier layer 410 connected to the trim cover layer 402. The barrier layer 410 is non-permeable to air. In one example, the barrier layer 410 is formed from a continuous plastic layer, such as a thermoplastic polyurethane sheet or film. A ventilation port 412 may be connected to or formed in the barrier layer 410, e.g., using one or more of the techniques described above with respect to the join, and may be connected to the air system 350 described above with respect to FIG. 4 via a hose or tube.

One or more porous spacer material layers 420 are positioned between the trim cover layer 402 and the barrier layer 410. Each of the spacer layers 420 are formed from breathable materials or contain perforation or other features to allow air to pass through and across the layer. In the example shown, first and second spacer material layers 422, 424 are provided. In other examples, three or more spacer material layers 420 are provided. The spacer material layers 420 may be formed from the same material or from different materials.

In the example shown, the first spacer layer 422 is formed from a reticulated foam layer, e.g., a urethane or other foam material, and may further be known as a soft touch material that provides a cushion feel for the seat occupant. In one non-limiting example, the reticulated foam is provided with a range of 25-45 pores per inch, although other ranges of pores per inch are also contemplated. The second spacer layer 424 is formed a spacer fabric, such as a knit or mesh spacer fabric. The spacer fabric may be a knit or otherwise formed fabric layer that forms a mesh structure to allow air to pass through it and provides a firm support surface. In other examples, the first and second spacer material layers 422, 424 may be formed from other materials that allow air flow therethrough.

The first spacer layer 422 is in contact with the trim cover layer 402, and the second spacer layer 424 is positioned between the first spacer layer 422 and the barrier layer 410. The first spacer layer 422 has a trench 426 or trough formed therein. As used herein, a trench 426 may refer to an open channel or groove that is formed in a spacer layer 420 and that intersects one of the faces. In one example, the trench 426 has a floor 428. As shown, the trench 426 may be formed in the face that engages or contacts the B-surface of the trim cover layer 402. The allowance 408 between two adjacent panels of the trim cover layer is received within the trench, and the join 406 may additionally be received within the trench 426.

In further examples, a perforated heating pad or mat (not shown) may be positioned between the trim cover layer 402 and the barrier layer 410 and layered with the spacer layers 420. The heating pad may be selectively operated to provide heat from the trim assembly 400 to a seat occupant.

The trim cover layer 402 is connected to the barrier layer 410 about a perimeter of the trim assembly as shown in FIG. 4, and the spacer material layers 420 are enclosed by the trim cover layer and the barrier layer. The trim cover layer 420 may be sewn, bonded, welded, laminated, or otherwise connected to the barrier layer about the perimeter. Additional trim panels may be connected to the trim assembly, e.g., adjacent to the perimeter to cover other portions of the seat or its surroundings, as shown with respect to FIGS. 3-5 below by way of example. Furthermore, the additional trim panels may be provided as described with respect to trim assembly 400 or may be provided without the barrier layer or other layers. Additional tie downs may be provided about or adjacent to the perimeter of the trim assembly 400 for use in connecting the trim assembly to the seat 320.

The trim assembly 400 has a tic down membrane 430, which may act as a reinforcement layer or material 430, connected to the trim cover layer 402. Note that in FIG. 9, the membrane 430 is shown with a partial transparency underneath the spacer layer 420 for illustrative purposes. In one example, the tie down membrane 430 is formed from a non-woven fabric. A porous spacer material layer, such as the first spacer layer 422, is positioned between the trim cover layer 402 and at least a portion of the tie down membrane 430. The tic down membrane 430 may be layered between the first and second spacer material layers 422, 424 as shown, and such that the tie down membrane 430 is separated from the trim cover layer 402 by the first porous spacer material layer 422. The tie down membrane 430 may contact the first spacer layer 422 opposite to the trench 426.

The tie down membrane 430 is connected to the trim cover layer 402 and is connected to the join 406 and/or the allowance 408 of the first and second panels 404. In the example shown, the allowance 408 is sewn to the tie down membrane 430 through the first spacer material layer 422, e.g., through the floor 428 of the trench 426 in the first spacer layer via seam 432.

The tension in the stitching in the seam 432 that connects the allowance 408 to the tie down membrane 430, as well as the depth of the trench 426 and thickness of the layer 422, helps to define the shape of the trim cover layer 402 and the appearance of the trim assembly 400, as it forms a tie down effect or visual appearance for the join 406 or seam between the panels 404 of the trim assembly.

In various examples, the first spacer material layer 422 and/or the tie down membrane 430 are each connected to the second spacer material layer 424. For example, the first spacer material layer 422 and the tie down membrane 430 are each connected to the second spacer material layer 424 via bonding and/or laminating.

The trim assembly 400 may be formed or assembled prior to connection to the cushion 340 or seat assembly 320. In a further example, the trim cover assembly 400 may be assembled at a first facility or in a first production line, and then shipped or moved to the location or assembly line for the vehicle seat assembly 320. As the trim assembly 400 may contain components for features such as ventilation and/or heating that are pre-assembled within the assembly 400, the seat 320 may be more easily assembled with fewer steps.

Figure 7:
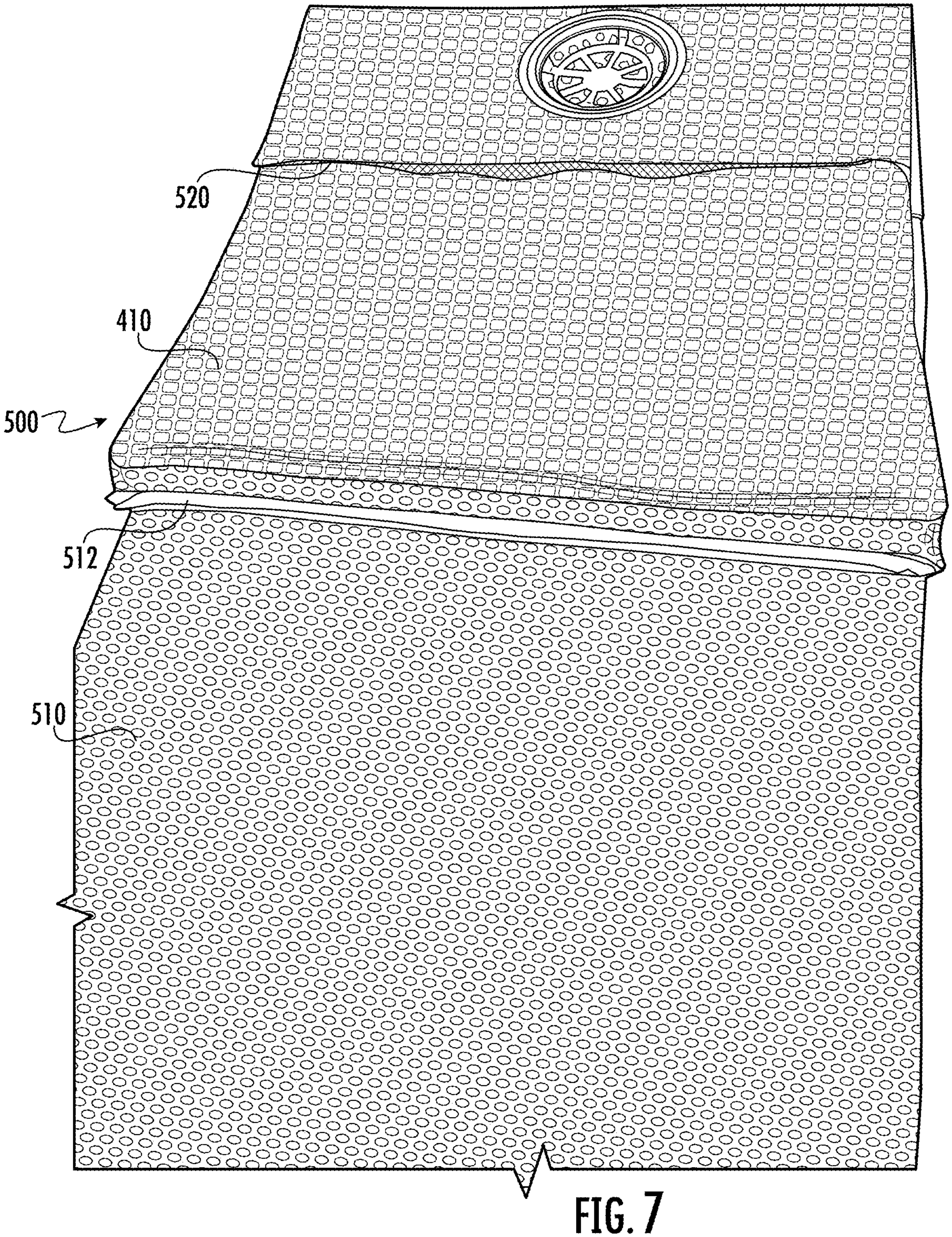
FIG. 7 illustrates a perspective view of a trim assembly according to some embodiments and for use with the seat assembly of FIG. 4.
Figure 8:
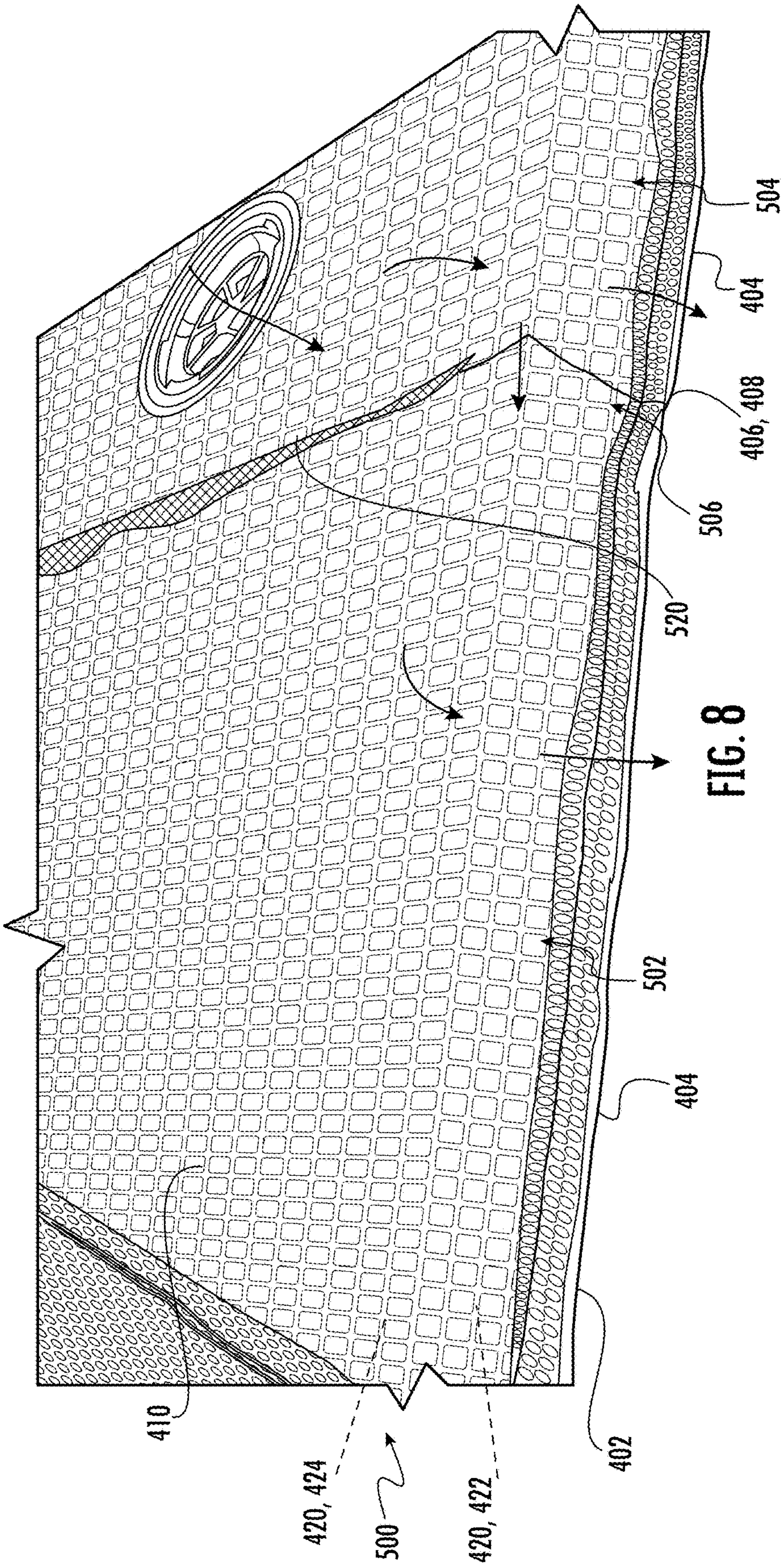
FIG. 8 illustrates another perspective view of the trim assembly of FIG. 7.
Figure 9:
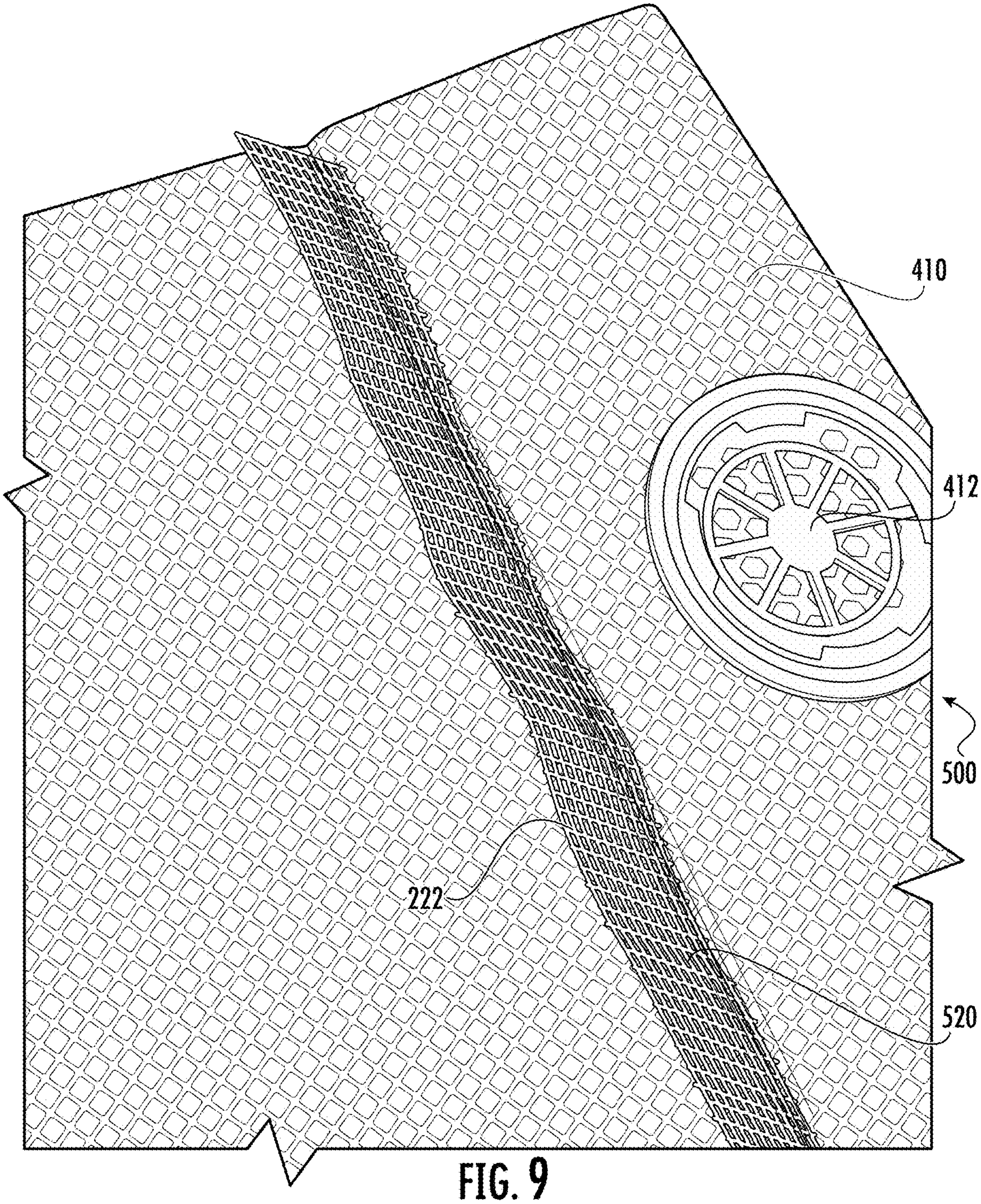
FIG. 9 illustrates yet another perspective view of the trim assembly of FIG. 7.
Figure 10:
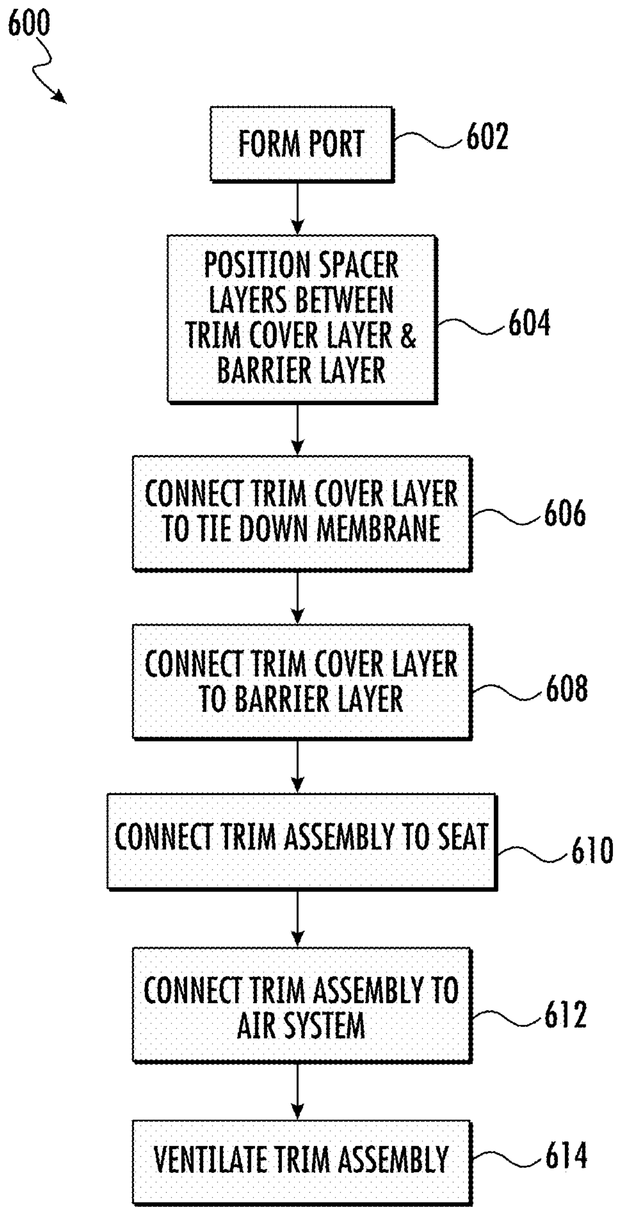
FIG. 10 illustrates a method of forming a trim assembly and assembling a seat according to some embodiments.

Referring to FIGS. 7-9, a trim assembly 500 is illustrated according to various examples of the present disclosure. The trim assembly 500 may be formed from multiple layers of material as described below. The trim assembly 500 may be used as the trim assembly 332 with the vehicle seat assembly 320 of FIG. 4 or may be used with another seat as described above, or another vehicle or other application. Elements that are the same as or similar to those described above with respect to FIGS. 2-3 are given the same reference numbers for simplicity, and a description of these elements may be found above according to various examples.

The trim assembly 500 has a perforated trim cover layer 402 as described above and formed from one or more panels 404. In one example, two panels 404 are connected via a join 406 with an allowance 408. In other examples, a single panel 404 may be provided.

The trim assembly 500 has a barrier layer 410 connected to the trim cover layer 402. The barrier layer 410 has a ventilation port 412 and may be connected to the air system 350 described above with respect to FIG. 4 via a hose or tube.

One or more porous and breathable spacer material layers 420 are positioned between the trim cover layer 402 and the barrier layer 410. In the example shown, first and second spacer material layers 422, 424 are provided. In other examples, three or more spacer material layers 420 are provided. In the non-limiting example shown, the first spacer layer 422 is formed from a reticulated foam layer, and the second spacer layer 424 is formed a spacer fabric, such as a knit or mesh spacer fabric.

The first spacer layer 422 may be provided with a first portion and a second portion. The second spacer layer may likewise be provided with a first portion and a second portion. The first portions of the layers form a first stack 502, and the second portions of the layers form a second stack 504. The first and second stacks 502, 504 may be positioned adjacent to one another, and in a non-overlapping manner. In other examples, additional stacks of spacer layers may also be provided. An allowance 408 between panels 404 of the trim cover layer may be positioned between adjacent stacks, e.g., in a gap 506 therebetween.

The trim cover layer 402 is connected to the barrier layer 410 about a perimeter of the trim assembly as shown in FIGS. 7-9, and the spacer material layers 420 are enclosed by the trim cover layer and the barrier layer. The trim cover layer 420 may be sewn, bonded, welded, laminated, or otherwise connected to the barrier layer about the perimeter. Additional trim panels 510 may be connected to the trim assembly 500, e.g., adjacent to the perimeter to cover other portions of the seat or its surroundings. Furthermore, the additional trim panels may be provided as described with respect to trim assembly 400, 500, or may be provided without the barrier layer or other layers as shown. Additional tie downs may be provided about or adjacent to the perimeter of the trim assembly 400, e.g., along seam or other join 512, or at another location along the perimeter, for use in connecting the trim assembly to the seat 320.

The trim assembly 500 has a tie down membrane 520 connected to the trim cover layer 402. In one example, the tic down membrane 520 is formed from a breathable or porous material, and in the example shown, is formed from a screen or a coated mesh. In one non-limiting example, the coated mesh is a vinyl covered fiberglass screen. In other examples, the tic down membrane 520 may be formed from a plastic material, such as a thermoplastic polyurethane sheet or film, and is perforated or otherwise formed to provide air flow thereacross.

The tie down membrane 520 is connected to the trim cover layer 402. In one example, the tie down membrane 520 is connected to the join 406 and/or the allowance 408 of the first and second panels 404. In another example, the tie down membrane 520 is connected to a single panel 404, e.g., in a central region of the panel away from an edge or join, via decorative stitching, bonding, and/or laminating.

The tie down membrane 520 extends outwardly from the B-surface of the trim cover layer 402 to a distal end 522. The tie down membrane 520 extends between the first and second portions of each of the porous spacer material layers, or through the gap 506 between the stacks 502, 504 to the barrier layer. The tie down membrane 520 is positioned between adjacent stacks 502, 504 of spacer layers 420. The tie down membrane 520 therefore extends transversely though the spacer material layers 420 to the distal end 522. In one example, and as shown, the tic down membrane 520 extends through the barrier layer 410 and to the distal end 522, with the distal end therefore being positioned outboard of the barrier layer, and with the barrier layer positioned between the distal end and the spacer layers. In other examples, the distal end 522 of the tic down membrane may remain internal to the barrier layer.

The tie down membrane 520 is connected to the barrier layer 410, e.g., adjacent to the distal end 522. The tic down membrane 520 may be connected to the barrier layer 410 via any of the techniques described above with respect to a join.

The distal end 522 of the tie down membrane 520 may be used as a tie down to a cushion and/or frame of the seat 320, e.g., using clips, hog rings, hook and loop fasteners, or the like. The distal end of the tie down membrane may further be provided with a bead or apertures for use with these attachment features.

The distance between connection points of the trim cover layer 402 and the barrier layer 410 to the tie down membrane 520 helps to define the shape of the trim cover layer 402 and the appearance of the trim assembly 500, as it forms a tie down effect or visual appearance for the join or seam between the panels of the trim assembly.

FIG. 7 illustrates a method 600 of forming a trim cover assembly 332, and a method of assembling the trim cover assembly 332 and a seat assembly, such as a vehicle seat assembly 320 are also provided. In various examples, the steps may be performed in another order, or may be performed sequentially or simultaneously. Furthermore, additional steps may be added, or steps may be omitted. The method 600 may be used to form trim assembly 400 or trim assembly 500 according to various embodiments.

At step 602, a port 412 is inserted or formed in a barrier layer 410.

At step 604, one or more porous spacer material layers 420 are positioned between a perforated trim cover layer 402 and the barrier layer 410.

In one example, a first spacer material layer 422 and a second spacer material layer 424 are positioned between the perforated trim cover layer 402 and the barrier layer 410. In a further step, a trench 426 may be formed in the first spacer layer 422 in the face that engages or faces the trim cover layer 402. The trim cover layer may be formed with a join 406 between two panels 404. In one example, the join 406 is a seam, a weld, or a lamination, and there is an allowance 408 formed by the two panels. The allowance 408 is positioned into the trench 426 of the spacer layer.

In another example, a first portion and a second portion of each spacer material layer 420 are positioned between the perforated trim cover layer 402 and the barrier layer 410. The first portions of the spacer layers may be stacked upon one another in a first stack 502, and the second portions of the spacer layers may be stacked upon one another in a second stack 504 offset from and non-overlapping with the first stack.

At step 606, the perforated trim cover layer 402 is connected to a tie down membrane 430, 520 with the spacer layer 422 positioned between the trim cover layer 402 and at least a portion of the tie down membrane.

In one example, the tie down membrane 430 is layered below the first spacer material layer 422 and opposite to the trench 426. In a further example, the tie down membrane 430 is positioned between the first and second spacer material layers 422, 424. The allowance 408 of the trim cover panel is sewn to the tie down membrane 430 through the spacer material layer 422 along the trench 426. The first spacer layer 422 and tie down membrane 430 may then be connected to the second spacer layer 424, e.g., via bonding, welding, lamination, or another technique.

In another example, the tie down membrane 520 is positioned such that it extends transversely to the trim cover layer 402 and extends between the first and second portions of each spacer material layer, or between the stacks 502, 504, to a distal end 522. The tie down membrane 520 is connected, e.g., sewn or otherwise connected, to the trim cover layer 402, and may be connected via a join 406 between two panels, such as a seam. Alternatively, the tie down membrane 520 may be connected via a decorative stitch or seam, or via lamination, bonding, or welding. The tie down membrane 520 is also connected to the barrier layer 410. In one example, the distal end 522 of the tie down membrane extends outwardly from the barrier layer 410 such that the barrier layer is positioned between the distal end 522 and the spacer layer(s) 420. The distal end 522 of the tie down membrane may then be additionally used as a tie down for the trim assembly to the frame and/or a cushion of a seat, such as seat 320.

At step 608, the perforated trim cover layer 402 is connected to the barrier layer 410 to assemble the trim assembly 400, 500. In one example, the trim cover layer 402 is sewn to the barrier layer 410. The spacer layer(s) 420 are encapsulated by the trim cover layer and the barrier layer.

At step 610, the trim assembly 400, 500 is connected to a frame 322 of a seat assembly. In one example, the trim assembly 400, 500 may be connected directly to the frame 322 and/or to a cushion 340. Various tie downs, such as the perimeter tie down(s) for the trim assembly 332 may be used to connect the trim assembly 332 to the seat 320, and additional trim panels 510 may be connected to the seat 320.

At step 612, the trim assembly is connected to an air system 350 by connecting a fan and/or a pump to the inlet port 412 in the barrier layer 410.

At step 614, the trim assembly 332 of the seat 320 is ventilated by providing air flow from the air system 350 into the port 412 of the barrier layer 410 from a fan and/or an air pump of the air system. Air flow is illustrated schematically with arrows in FIGS. 2 and 5. As the barrier layer 410 is non-permeable to air, the air may only exit the trim assembly 332 via the perforated trim cover layer 402. The air flows into the trim assembly 332 and flows up through the second and first spacer layers 422, 424 as each layer is porous and breathable. For a trim assembly 400 with a tie down 430, the air generally flows around the tie down, although some air may flow through the tie down. For a trim assembly 500 with a tic down 520, the air may flow transversely in the trim assembly 500 and across the tic down 520 such that air flows into the various portions of the spacer layers, through the stacks 502, 504, and to the different regions of the trim assembly 500. Note that with either trim assembly, the structure of the porous spacer layers 420 is such that the air is dispersed and diffused across the trim assembly 400, 500 and to the different areas of the trim cover layer 402. The air then flows through the perforated trim cover layer 402 and to a seat occupant.

In other examples, elements such as a heating layer within the trim assembly 332 may be operated to provide heat from the trim assembly to the seat occupant.

In one or more embodiment, an assembly e.g., 400 comprises a perforated trim cover layer e.g., 402, a tie down membrane e.g., 430 (e.g., reinforcement layer) connected to the trim cover layer e.g., 402, a barrier layer e.g., 410 (e.g., a non-permeable layer such as non-permeable to air, e.g., a continuous plastic layer such as a thermoplastic polyurethane sheet or film) connected to the trim cover layer e.g., 402, and a porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) positioned between the trim cover layer e.g., 402 and the barrier layer e.g., 410 (e.g., a non-permeable layer such as non-permeable to air, e.g., a continuous plastic layer such as a thermoplastic polyurethane sheet or film).

In some embodiments, the porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) is positioned between the trim cover layer e.g., 402 and at least a portion of the tie down membrane e.g., 430 (e.g., reinforcement layer).

In various embodiments, the assembly e.g., 400 further comprises a ventilation port e.g., 412 connected to the barrier layer e.g., 410 (e.g., a non-permeable layer such as non-permeable to air, e.g., a continuous plastic layer such as a thermoplastic polyurethane sheet or film).

In one or more embodiments, the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) is enclosed by the trim cover layer e.g., 402 and the barrier layer e.g., 410 (e.g., a non-permeable layer such as non-permeable to air, e.g., a continuous plastic layer such as a thermoplastic polyurethane sheet or film).

In various embodiments, the assembly e.g., 400 comprises a second porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric).

In some embodiments, the second porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) positioned between the first porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and the barrier layer e.g., 410 (e.g., a non-permeable layer such as non-permeable to air, e.g., a continuous plastic layer such as a thermoplastic polyurethane sheet or film).

In one or more embodiments, the first porous spacer material layer e.g., 420 comprises reticulated foam.

In various embodiments, the second porous spacer material layer e.g., 420 comprises a spacer fabric.

In some embodiments, the trim cover layer e.g., 402 is connected to the barrier layer e.g., 410 (e.g., a non-permeable layer such as non-permeable to air, e.g., a continuous plastic layer such as a thermoplastic polyurethane sheet or film) about a perimeter of the assembly e.g., 400.

In one or more embodiments, the assembly e.g., 400 further comprises one or more trim panels e.g., 404 connected to the assembly e.g., 400 adjacent to the perimeter thereof.

In one or more embodiments, the assembly e.g., 400 further comprises one or more tie downs connected to the assembly e.g., 400 adjacent to the perimeter thereof.

In various embodiments, the assembly e.g., 400 further comprising a perforated heating pad positioned between the trim cover layer e.g., 402 and the barrier layer e.g., 410 (e.g., a non-permeable layer such as non-permeable to air, e.g., a continuous plastic layer such as a thermoplastic polyurethane sheet or film).

In some embodiments, the perforated trim cover layer e.g., 402 comprises a first panel e.g., 404 connected to a second panel e.g., 404 along a join e.g., 406 (e.g., seam) with an allowance e.g., 408 (e.g., area between the edge and the join region or stitching line on the two panels being connected together).

In one or more embodiments, the join e.g., 406 (e.g., seam) comprises a seam e.g., 432.

In various embodiments, the tie down membrane e.g., 430 (e.g., reinforcement layer) is connected to the join e.g., 406 (e.g., seam) and/or the allowance e.g., 408 (e.g., area between the edge and the join region or stitching line on the two panels being connected together) of the first and second panels e.g., 404.

In some embodiments, the porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) defines a trench e.g., 426 and the allowance e.g., 408 (e.g., area between the edge and the join region or stitching line on the two panels being connected together) is received within the trench e.g., 426.

In one or more embodiments, the allowance e.g., 408 (e.g., area between the edge and the join region or stitching line on the two panels being connected together) is sewn to the tie down membrane e.g., 430 through the porous spacer material e.g., 420 (e.g., a breathable layer or perforated layer or layer with other features to allow air to pass through and across the layer such as a reticulated foam, e.g., a urethane or other foam material or spacer fabric e.g., knit or mesh spacer fabric).

In various embodiments, the tie down membrane e.g., 430 (e.g., reinforcement layer) is connected to the trim cover layer e.g., 402 in a central region of a panel e.g., 404 thereof via decorative stitching, bonding, and/or laminating.

In some embodiments, the perforated trim cover layer e.g., 402 comprises leather, leatherette, vinyl, and/or fabric.

In one or more embodiments, the barrier layer e.g., 410 (e.g., a non-permeable layer such as non-permeable to air, e.g., a continuous plastic layer such as a thermoplastic polyurethane sheet or film) comprises a non-permeable layer.

In various embodiments, the barrier layer e.g., 410 comprises plastic.

In some embodiments, the tie down membrane e.g., 430 (e.g., reinforcement layer) is layered between the first and second porous spacer material layers e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) such that the tie down membrane e.g., 430 (e.g., reinforcement layer) is separated from the trim cover layer by the first porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric).

In one or more embodiments, the first spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and the tie down membrane e.g., 430 (e.g., reinforcement layer) are each connected to the second spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric).

In various embodiments, the first spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and the tie down membrane e.g., 430 (e.g., reinforcement layer) are each connected to the second spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) via bonding and/or laminating.

In some embodiments, the tie down membrane e.g., 430 (e.g., reinforcement layer) comprises a nonwoven fabric.

In one or more embodiments, the porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) comprises a first portion and a second portion and the tie down membrane e.g., 430 (e.g., reinforcement layer) extends between the first and second portions of the porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) to the barrier layer e.g., 410 (e.g., a non-permeable layer such as non-permeable to air, e.g., a continuous plastic layer such as a thermoplastic polyurethane sheet or film).

In various embodiments, the second porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) comprises a first portion and a second portion and the tic down membrane e.g., 430 (e.g., reinforcement layer) extends between the first and second portions of the second porous spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) to the barrier layer e.g., 410 (e.g., a non-permeable layer such as non-permeable to air, e.g., a continuous plastic layer such as a thermoplastic polyurethane sheet or film).

In some embodiments, the tie down membrane e.g., 430 (e.g., reinforcement layer) extends transversely through the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and the barrier layer e.g., 410 (e.g., a non-permeable layer such as non-permeable to air, e.g., a continuous plastic layer such as a thermoplastic polyurethane sheet or film) to a distal end.

In one or more embodiments, the barrier layer e.g., 410 (e.g., a non-permeable layer such as non-permeable to air, e.g., a continuous plastic layer such as a thermoplastic polyurethane sheet or film) is positioned between the distal end of the tie down membrane 430 (e.g., reinforcement layer) and the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) such that the distal end of the tie down membrane e.g., 430 (e.g., reinforcement layer) is outboard of the barrier layer e.g., 410 (e.g., a non-permeable layer such as non-permeable to air, e.g., a continuous plastic layer such as a thermoplastic polyurethane sheet or film).

In various embodiment, the barrier layer e.g., 410 (e.g., a non-permeable layer such as non-permeable to air, e.g., a continuous plastic layer such as a thermoplastic polyurethane sheet or film) is connected to the tie down membrane e.g., 430 (e.g., reinforcement layer).

In some embodiments, the tie down membrane e.g., 430 (e.g., reinforcement layer) is perforated.

In one or more embodiments, the tie down membrane e.g., 430 (e.g., reinforcement layer) comprises a screen.

In one or more embodiments, a seat assembly e.g., 320 comprises a support structure e.g., 322 such as frame and the assembly e.g., 400 supported by the support structure e.g., 322 (e.g., frame).

In various embodiments, a seat assembly e.g., 320 further comprises a cushion member covered by the assembly e.g., 400.

In some embodiments, the assembly e.g., 400 is connected to the frame and/or the cushion member e.g., 328, 330.

In various embodiments, the seat assembly e.g., 400 further comprises an air pump e.g., 352 and/or a fan e.g., 352 connected to the barrier layer e.g., 410 (e.g., a non-permeable layer such as non-permeable to air, e.g., a continuous plastic layer such as a thermoplastic polyurethane sheet or film).

In one or more embodiments, a method e.g., 460 comprises positioning (i.e., step 461) one or more porous spacer material layers e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) between a perforated trim cover layer e.g., 402 and a barrier layer e.g., 410 (e.g., a non-permeable layer such as non-permeable to air, e.g., a continuous plastic layer such as a thermoplastic polyurethane sheet or film), connecting (i.e., step 466) the perforated trim cover layer 402 e.g., to a tie down membrane e.g., 430 (e.g., reinforcement layer) with the spacer layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) positioned between the trim cover layer e.g., 402 and at least a portion of the tie down membrane e.g., 430 (e.g., reinforcement layer), and connecting (i.e., step 468) the perforated trim cover layer e.g., 402 to the barrier layer e.g., 410 (e.g., a non-permeable layer such as non-permeable to air, e.g., a continuous plastic layer such as a thermoplastic polyurethane sheet or film) to assemble a trim assembly.

In various embodiments, the positioning step 461, i.e., positioning the one or more spacer layers e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) between the perforated trim cover layer e.g., 402 and the barrier layer e.g., 410 (e.g., a non-permeable layer such as non-permeable to air, e.g., a continuous plastic layer such as a thermoplastic polyurethane sheet or film) further comprises positioning a first spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and a second spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) between the perforated trim cover layer e.g., 402 and the barrier layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric).

In some embodiments, the method e.g., 460 further comprises forming (i.e., step 462) a trench e.g., 426 in the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) and positioning (i.e., step 463) an allowance e.g., 408 (e.g., area between the edge and the join region or stitching line on the two panels being connected together) of a join e.g., 406 (e.g., seam) between two panels e.g., 404 of the trim cover layer e.g., 402 into the trench e.g., 426.

In one or more embodiments, the method e.g., 460 further comprises layering (i.e., step 464) the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) between the tic down membrane e.g., 430 (e.g., reinforcement layer) and the trim cover layer 402, and sewing (e.g., step 466) the allowance e.g., 408 (e.g., area between the edge and the join region or stitching line on the two panels being connected together) to the tie down membrane 430 (e.g., reinforcement layer) through the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) along the trench e.g., 426.

In various embodiments, the positioning step 461, i.e., positioning the one or more porous spacer material layers e.g., 420 (e.g., a breathable layer or perforated layer or layer with other features to allow air to pass through and across the layer such as a reticulated foam, e.g., a urethane or other foam material or spacer fabric e.g., knit or mesh spacer fabric) between the perforated trim cover layer e.g., 402 and the barrier layer e.g., 410 (e.g., a non-permeable layer such as non-permeable to air, e.g., a continuous plastic layer such as a thermoplastic polyurethane sheet or film) further comprises positioning a first portion and a second portion of the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric), and positioning (i.e., step 465) the tie down membrane e.g., 430 (e.g., reinforcement layer) such that it extends transversely to the trim cover layer 402 and extends between the first and second portions of the spacer material layer 420 (e.g., a breathable layer or perforated layer or layer with other features to allow air to pass through and across the layer such as a reticulated foam, e.g., a urethane or other foam material or spacer fabric e.g., knit or mesh spacer fabric) to a distal end e.g., 522.

In some embodiments, method e.g., 460 further comprises connecting (i.e., step 467) the distal end e.g., 522 to the barrier layer e.g., 410 (e.g., a non-permeable layer such as non-permeable to air, e.g., a continuous plastic layer such as a thermoplastic polyurethane sheet or film).

In one or more embodiments, the method e.g., 460 further comprises connecting (i.e., step 469) the trim assembly e.g., 500 to a frame of a seat assembly 320.

In various embodiments, the method e.g., 460 further comprises positioning (i.e., step 470) an inlet port e.g., 412 in the barrier layer e.g., 410 (e.g., a non-permeable layer such as non-permeable to air, e.g., a continuous plastic layer such as a thermoplastic polyurethane sheet or film).

In some embodiments, the method e.g., 460 further comprises connecting (i.e., step 472) a fan and/or a pump e.g., 352 to the inlet port e.g., 412.

In one or more embodiments, the method e.g., 460 further comprises passing (i.e., step 474) an airflow into the inlet port e.g., 412, through the spacer material layer e.g., 420 (e.g., a breathable layer or perforated layer or layer with other features to allow air to pass through and across the layer such as a reticulated foam, e.g., a urethane or other foam material or spacer fabric e.g., knit or mesh spacer fabric), and through the perforated trim cover layer e.g., 402 to ventilate the trim assembly e.g., 400.

In various embodiments, the method 460 e.g., further comprises passing (i.e., step 474) the airflow across the tie down membrane e.g., 430 (e.g., reinforcement layer).

Figure 11:
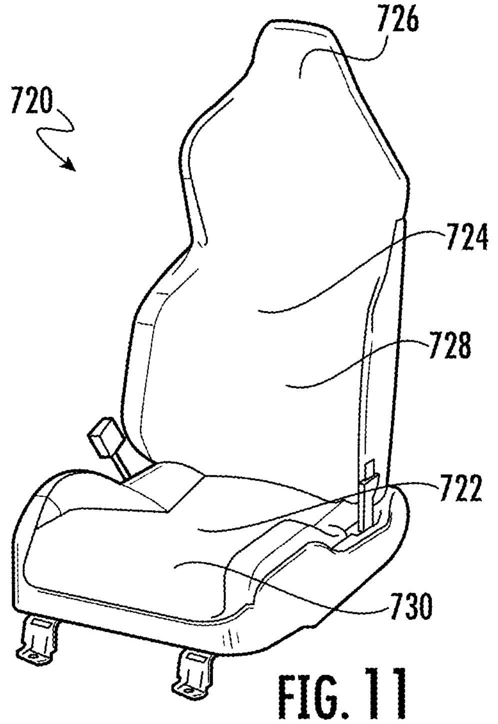
FIG. 11 is a front perspective view of a vehicle seat assembly according to some embodiments.

FIG. 11 illustrates a vehicle seat assembly 720 according to some embodiments. The vehicle seat assembly 720 is provided with a seat bottom 722 adapted to be mounted to a vehicle floor. The vehicle seat assembly 720 may be provided in any row of a vehicle. The vehicle seat assembly 720 includes a seat back 724 extending upright from the seat bottom 722. The vehicle seat assembly 720 also includes a head restraint 726 extending above the seat back 724. The vehicle seat assembly 720 may be employed in any type of vehicle, including land vehicles, watercrafts, aircrafts, or the like. The vehicle seat assembly 720 may be any seat assembly such as an office chair, furniture, or the like.

The vehicle seat assembly 720 is provided with a plurality of adjacent trim cover segments 728, 729 over the seat bottom 722, seat back 724, and head restraint 726 to conceal a frame, cushioning, and functional components. The seat bottom 722 is provided with a seat cushion 730. The seat cushion 730 may be composed of a stranded thermoplastic mesh or foam.

Figure 12:
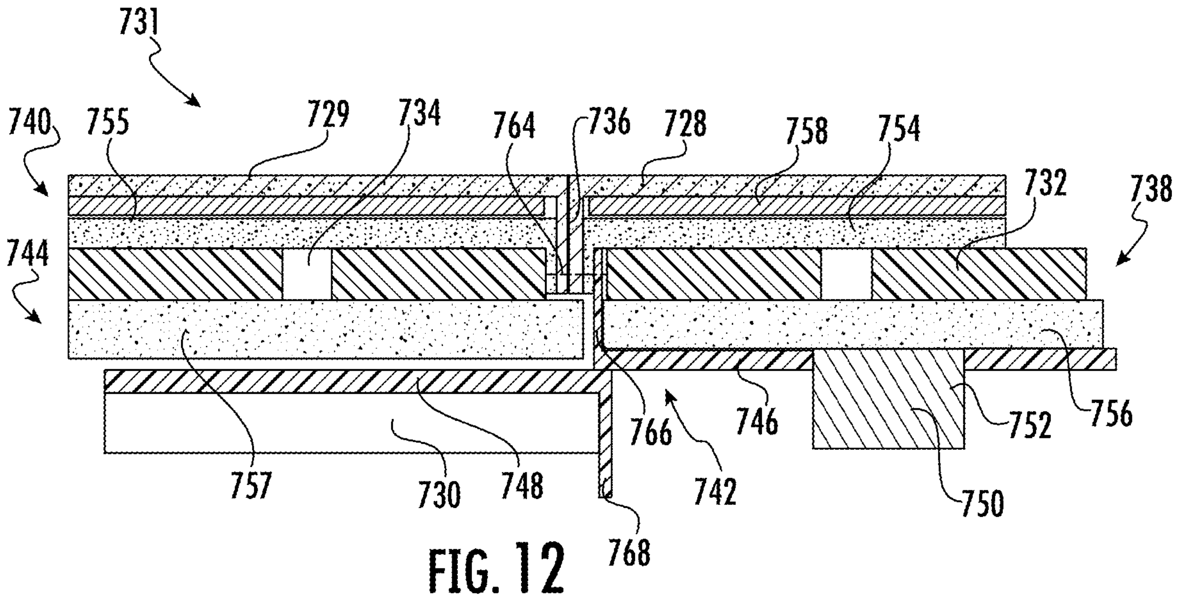
FIG. 12 is a partial section view of a trim cover assembly of the vehicle seat assembly of FIG. 11.

FIG. 12 illustrates a trim cover assembly 731 according to some embodiments. The trim cover assembly 731 is provided with a first fluid impermeable layer 732 and a second fluid impermeable layer 742 sized to be placed over a seat cushion 730. The first fluid impermeable layer 732 may be composed of a cushioning material, such as a foam. The first fluid impermeable layer 732 may also be composed of any non-breathable material or impermeable polymeric material, such as polyethylene. According to one embodiment, the first fluid impermeable layer 732 may be sewn to the plurality of adjacent trim cover segments 728, 729. According to some embodiments, the first fluid impermeable layer 732 may be glued or welded to the plurality of adjacent trim cover segments 728, 729.

Additionally, the plurality of adjacent trim cover segments 728 is provided with a seam 736 extending through the first impermeable layer 732 thereby defining a first zone 738 and a second zone 740. The second fluid impermeable layer 742 may be formed from an impermeable polymeric material, such as thermoplastic polyurethane (TPU) film, polyvinyl chloride (PVC) film, polyethylene, or the like. The first fluid impermeable layer 732 is provided with a plurality of vents 734 formed therethrough, according to some embodiments. Although a plurality of vents 734 is illustrated and described, any quantity of vents 734 may be utilized. The vents 734 direct airflow through the trim cover assembly 731. The plurality of vents 734 are optional if the plurality of adjacent trim cover segments 738, 729 are impermeable with holes formed therethrough. Additionally, the first fluid impermeable layer 732 is thermally insulative.

The second fluid impermeable layer 742 is in cooperation with the first fluid impermeable layer 732 to provide a fluid chamber 744 therebetween. The second fluid impermeable layer 742 is provided with a first portion 746 and a second portion 748. The first portion 746 extends through the first zone 738 and the second portion 748 extends through the second zone 740. The first portion 746 of the second fluid impermeable layer 742 is provided with a first flap 766 extending between the first zone 738 and the second zone 740 and sewn into the seam 736. The second portion 748 of the second fluid impermeable layer 742 is further provided with a second flap 768 extending in a direction opposite of the first flap 766 for connection to the seat cushion 730. The second fluid impermeable layer 742 is perforated, such as along the first flap 766, to allow air to pass through the first zone 738 and the second zone 740.

With continued reference to FIG. 12, the trim cover assembly 731 is further provided with a first fluid permeable layer 754, 755 and a second fluid permeable layer 756, 757. The fluid permeable layers 754, 755, 756, 757 are formed from a resilient and porous material, such as porous foam, an extruded thermoplastic resin mesh, a knitted, three-dimensional spacer material, or the like. The first fluid permeable layer 754, 755 is displaced along the first fluid impermeable layer 732. The first fluid permeable layer 754, 755 extends through the first zone 38 and the second zone 740, and is separated at the seam 736 as first fluid permeable layer portions 754, 755, each within one of the zones 738, 740. The first fluid permeable layer 754, 755 is sewn to the seam 736, according to some embodiments. According to some embodiments, the first fluid permeable layer 754, 755 is laminated and may not be sewn to the seam 736.

The second fluid permeable layer 756, 757 is a spacer fabric sized to be received within the fluid chamber 44 and is spaced apart from the first fluid permeable layer 754, 755. The second fluid permeable layer 756, 757 extends through the first zone 738 and the second zone 740, and is separated at the seam 736 as second fluid permeable layer portions 756, 757, each within one of the zones 738, 740. The second fluid permeable layer 756, 757 is also displaced along the perforated second fluid impermeable layer 742 allowing air to flow through the first zone 738 and the second zone 740. Without the permeable layers 754, 755, 756, 757, the impermeable layers 732, 742 could be compressed when weight from an occupant is applied which may cut off airflow when using a fan 752. When the trim cover assembly 731 utilizes a compressor as opposed to the fan 752, the permeable layers 754, 755, 756, 757 may be omitted.

The trim cover assembly 731 is also provided with a heat transfer layer 758 displaced along the first fluid impermeable layer 732, and spaced apart from the second fluid impermeable layer 742. In some embodiments, the heat transfer layer 758 may be displaced along the trim cover segments 728, 729 or alternatively displaced between the second fluid permeable layer 756, 757 and the fan 752. In some embodiments, the heat transfer layer 758 may be displaced between the first fluid permeable layer 754, 755 and the first fluid impermeable layer 732. The heat transfer layer 758 is provided with an electrically conductive heater mat. The trim cover assembly 731 is further provided with the external trim cover segments 728, 729 disposed over the first fluid impermeable layer 732 and the second fluid impermeable layer 742. The trim cover segments 728, 729 are perforated to permit the fluid to pass through the external trim cover 728. The trim cover segments 728, 729 are also provided with apertures 764 along the seam 736 to allow air to pass through the first zone 738 and the second zone 740. Further, the trim cover segments 728, 729 are sewn to the first fluid impermeable layer 732 without an adhesive. According to some embodiments, the trim layer segments 728, 729 are glued to the first fluid impermeable layer 732.

In reference to FIG. 12, the trim cover assembly 731 is provided with a fluid actuator 750, such as a fan 752. The fluid actuator 750 is welded directly to the second fluid impermeable layer 742 to seal a connection around the fluid actuator 750 according to some embodiments. The fan 752 is connected to the second fluid impermeable layer 742 with a retention ring according to some embodiments. The fan 752 is installed between the trim cover 728 and the seat cushion 730. The seat cushion 730 includes a receptacle sized to receive the fan 752. Traditional fans are installed beneath a vehicle seat cushion and outside of a trim cover assembly. Installing the fan 752 above the seat cushion 730 allows the fan 752 to be displaced within the trim cover assembly 731.

Prior art seat assemblies with heating and cooling features, often orient the fan beneath the cushion. Fluid ducting is then assembled through the cushion and the trim cover of the conventional seat assemblies. The fluid impermeable layers 732, 742, the permeable layers 754, 755, 756, 757, the heat transfer layer 758, and the fluid actuator 750 are all preassembled within the trim cover assembly 731 so the trim cover assembly 731 can be installed as a whole onto a seat frame. This cuts down manufacturing cost and time in comparison to the prior art.

The trim cover assembly 731 is operable with an air permeable nonfoam seat cushion 730 formed from thermoplastic mesh. The second fluid impermeable layer 742 provides a barrier between the fluid chamber 744 and the seat cushion 730. When utilized with a foam cushion 730, the second fluid impermeable layer 742 can be omitted if the cushion 730 is air impermeable. In this case, the fluid actuator 750 may be welded directly to the first fluid impermeable layer 732 to convey a fluid through the plurality of vents 734 of the fluid impermeable layer 732. Alternatively, the fluid actuator 750 may be separate from the trim cover 728.

Figure 13:
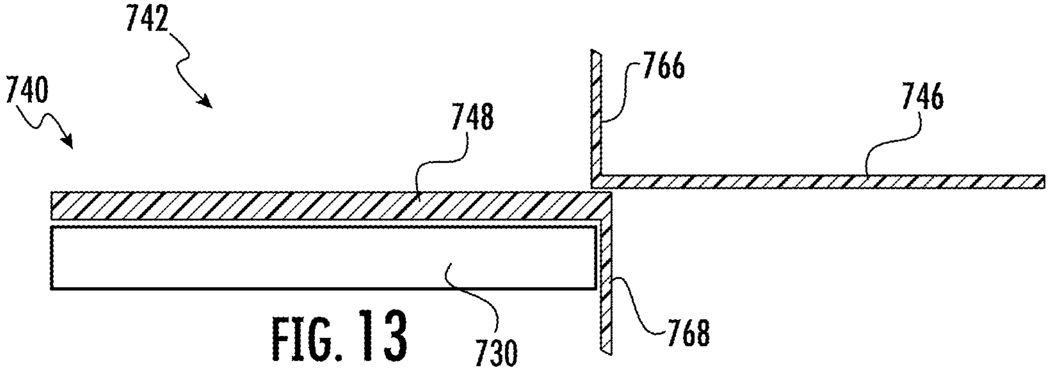
FIG. 13 is a partial section view of the trim cover assembly of the embodiments shown in FIG. 11.

FIG. 13 illustrates the second fluid impermeable layer 742 according to some embodiments. The second fluid impermeable layer 742 is provided with a first portion 746 and a second portion 748. The first portion 746 extends through the first zone 738 of the trim cover assembly 731. The second portion 748 extends through the second zone 740 of the trim cover assembly 731. The first portion 746 is further provided with a first flap 766 extending between the first zone 738 and the second zone 740. In one embodiment, the first flap 766 is perforated to allow air flow between the first zone 738 and the second zone 740. In some embodiments, the first flap 766 may be segmented to allow air flow between the first zone 738 and the second zone 740. The second portion 748 is further provided with a second flap 768 extending in a direction opposite of the first flap 766 and is connected to the seat cushion 730. The first portion 746 and the second portion 748 may be sewn, welded, adhered, or otherwise fastened together.

Figure 14:
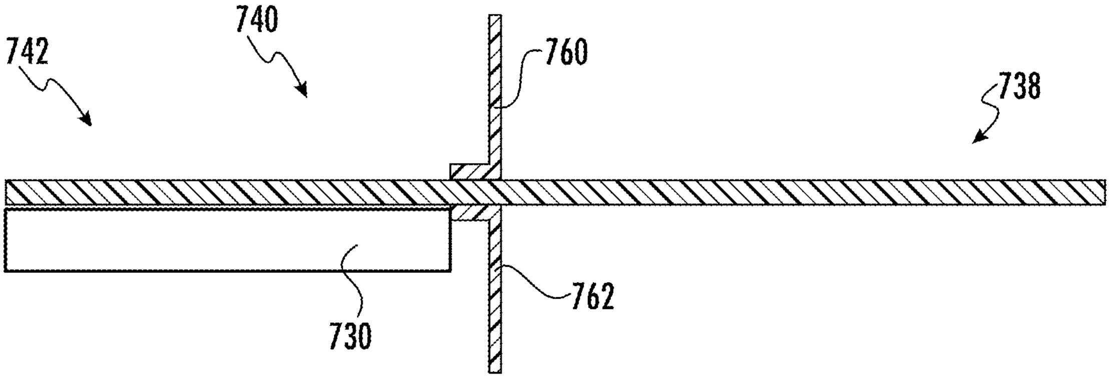
FIG. 14 is a partial section view of a trim cover assembly according to some embodiments.

FIG. 14 illustrates the second fluid impermeable layer 742 according to some embodiments as a continuous sheet. The second fluid impermeable layer 742 extends through the first zone 738 and the second zone 740. The second fluid impermeable layer 742 is provided with a first flap 760 and a second flap 762. The first flap 760 extends between the first zone 738 and the second zone 740. Additionally, the first flap 760 is perforated to allow air to pass through the first zone 738 and the second zone 740. The second flap 762 extends in a direction opposite of the first flap 760 and may be attached to the seat cushion 730. The first and second flaps 760, 762 may be sewn, welded, adhered, or otherwise fastened to the second fluid impermeable layer 742.

In one or more embodiments, an assembly e.g., 731 comprises a first fluid impermeable layer e.g., 732 (e.g., any non-breathable material or impermeable polymeric material such as thermoplastic polyurethane (TPU), polyvinyl chloride (PVC), polyethylene) sized to be placed over a seat cushion e.g., 730 such as a foam or strands of thermoplastic mesh, a plurality of adjacent trim cover segments e.g., 728, 729 for concealing a frame, the cushioning, and other functional components sewn to the first fluid impermeable layer e.g., 732 (e.g., any non-breathable material or impermeable polymeric material such as thermoplastic polyurethane (TPU), polyvinyl chloride (PVC), polyethylene), and a seam e.g., 736 extending through the plurality of adjacent trim cover segments e.g., 728, 729 for concealing a frame, the cushioning, and other functional components and the first fluid impermeable layer e.g., 732 (e.g., any non-breathable material or impermeable polymeric material such as polyethylene).

In various embodiments, the first fluid impermeable layer e.g., 732 (e.g., any non-breathable material or impermeable polymeric material such as polyethylene) further comprises a plurality of vents e.g., 734 formed therethrough.

In some embodiments, the seam e.g., 736 extends through the first impermeable layer e.g., 732 (e.g., any non-breathable material or impermeable polymeric material such as thermoplastic polyurethane (TPU), polyvinyl chloride (PVC), polyethylene) thereby defining a first zone e.g., 738 and a second zone e.g., 740 of the trim cover segment e.g., 728.

In one or more embodiments, the assembly e.g., 731 further comprises a second fluid impermeable layer e.g., 742 (e.g., any non-breathable material or impermeable polymeric material such as thermoplastic polyurethane (TPU), polyvinyl chloride (PVC), polyethylene) in cooperation with the first fluid impermeable layer e.g., 732 (e.g., any non-breathable material or impermeable polymeric material such as thermoplastic polyurethane (TPU), polyvinyl chloride (PVC), polyethylene) to provide a fluid chamber e.g., 744 therebetween.

In various embodiments, the second fluid impermeable layer e.g., 742 (e.g., any non-breathable material or impermeable polymeric material such as thermoplastic polyurethane (TPU), polyvinyl chloride (PVC), polyethylene) further comprises a first portion e.g., 746 extending through the first zone e.g., 738 and the second zone e.g., 740.

In some embodiments, the second fluid impermeable layer e.g., 742 (e.g., any non-breathable material or impermeable polymeric material such as thermoplastic polyurethane (TPU), polyvinyl chloride (PVC), polyethylene) further comprises a second portion e.g., 748 extending in a direction opposite of the first portion e.g., 746 to connect the seat cushion e.g., 730.

In one or more embodiments, the second fluid impermeable layer e.g., 742 (e.g., any non-breathable material or impermeable polymeric material such as thermoplastic polyurethane (TPU), polyvinyl chloride (PVC), polyethylene) is perforated to allow air to pass through the first zone e.g., 738 and the second zone e.g., 740.

In various embodiments, the assembly e.g., 731 further comprises a fluid actuator e.g., 750 (e.g., fan) attached to the second fluid impermeable layer e.g., 742 (e.g., any non-breathable material or impermeable polymeric material such as thermoplastic polyurethane (TPU), polyvinyl chloride (PVC), polyethylene) to convey a fluid (e.g., air) through the fluid chamber e.g., 744 and out of the first fluid impermeable layer e.g., 732 (e.g., any non-breathable material or impermeable polymeric material such as thermoplastic polyurethane (TPU), polyvinyl chloride (PVC), polyethylene).

In some embodiments, the fluid actuator e.g., 750 (e.g., fan) further comprises a fan attached to one of the first zone e.g., 738 or the second zone e.g., 740 to provide fluid communication through the first zone e.g., 738 and the second zone e.g., 740.

In one or more embodiments, the fluid actuator e.g., 750 (e.g., fan) conveys air through the first portion e.g., 746 of the second fluid impermeable layer e.g., 740 (e.g., any non-breathable material or impermeable polymeric material such as thermoplastic polyurethane (TPU), polyvinyl chloride (PVC), polyethylene), the fluid chamber e.g., 744, and the first fluid impermeable layer e.g., 733 (e.g., any non-breathable material or impermeable polymeric material such as thermoplastic polyurethane (TPU), polyvinyl chloride (PVC), polyethylene) such that the air passes from the first zone e.g., 738 to the second zone e.g., 740 through the second fluid impermeable layer e.g., 742 (e.g., any non-breathable material or impermeable polymeric material such as thermoplastic polyurethane (TPU), polyvinyl chloride (PVC), polyethylene).

In various embodiments, the assembly e.g., 731 further comprises a first fluid permeable layer e.g., 754, 755 (e.g., a resilient and porous material, such as porous foam, an extruded thermoplastic resin mesh, a knitted, three-dimensional spacer material) displaced along the first fluid impermeable layer e.g., 732 (e.g., any non-breathable material or impermeable polymeric material such as thermoplastic polyurethane (TPU), polyvinyl chloride (PVC), polyethylene).

In some embodiments, the first fluid permeable layer e.g., 754, 755 (e.g., a resilient and porous material, such as porous foam, an extruded thermoplastic resin mesh, a knitted, three-dimensional spacer material) extends through the first zone e.g., 738 and the second zone e.g., 740, and the first fluid permeable layer e.g., 754, 755 (e.g., a resilient and porous material, such as porous foam, an extruded thermoplastic resin mesh, a knitted, three-dimensional spacer material) is sewn to the seam e.g., 736.

In one or more embodiments, the assembly e.g., 731 further comprises a second fluid permeable layer e.g., 756, 757 (e.g., a resilient and porous material, such as porous foam, an extruded thermoplastic resin mesh, a knitted, three-dimensional spacer material) sized to be received within the fluid chamber e.g., 744 and spaced apart from the first fluid permeable layer e.g., 754, 755 (e.g., a resilient and porous material, such as porous foam, an extruded thermoplastic resin mesh, a knitted, three-dimensional spacer material).

In various embodiments, the fluid impermeable layer(s) e.g., 732/742 is/are insulative.

In some embodiments, the plurality of adjacent trim cover segments e.g., 728, 729 is perforated to permit the fluid (e.g., air) to pass through the trim cover segments e.g., 728, 729.

In one or more embodiments, the assembly e.g., 731 the second fluid impermeable layer e.g., 742 (e.g., any non-breathable material or impermeable polymeric material such as thermoplastic polyurethane (TPU), polyvinyl chloride (PVC), polyethylene) extends through the first zone e.g., 738 and the second zone e.g., 740, and the second fluid impermeable layer e.g., 742 (e.g., any non-breathable material or impermeable polymeric material such as thermoplastic polyurethane (TPU), polyvinyl chloride (PVC), polyethylene) further comprises a first perforated portion e.g., 746 extending to the seam e.g., 736 of the trim cover segments e.g., 728, 729 and a second portion e.g., 748 connected to the seat cushion e.g., 730 (foam or foamless thermoplastic filament mesh).

In various embodiments, a seat assembly e.g., 720 comprises a seat bottom e.g., 722 and a seat back e.g., 724 extending in an upright position from the seat bottom e.g., 722, a seat cushion e.g., 730 attached to the seat bottom e.g., 722 or the seat back e.g., 724, and the trim cover assembly e.g., 731 installed over the seat cushion e.g., 730.

In some embodiments, the seat cushion e.g., 730 is fluid permeable.

In one or more embodiments, a method e.g., 770 comprises attaching (i.e., step 772) a plurality of adjacent trim cover segments (e.g., 728, 729) to a first fluid impermeable layer 732 (e.g., any non-breathable material or impermeable polymeric material such as thermoplastic polyurethane (TPU), polyvinyl chloride (PVC), polyethylene), and sewing (i.e., step 774) a seam e.g., 736 through the adjacent trim cover segments (e.g., 728, 729) and the first fluid impermeable layer e.g., 732 (e.g., any non-breathable material or impermeable polymeric material such as thermoplastic polyurethane (TPU), polyvinyl chloride (PVC), polyethylene) to create a first zone e.g., 738 and a second zone e.g., 740.

In various embodiments, the method e.g., 770 further comprises attaching (i.e., step 776) a second fluid impermeable layer e.g., 742 (e.g., any non-breathable material or impermeable polymeric material such as thermoplastic polyurethane (TPU), polyvinyl chloride (PVC), polyethylene), in cooperation with (e.g., sewn, welded, adhered, or otherwise fastened) the first fluid impermeable layer e.g., 732 (e.g., any non-breathable material or impermeable polymeric material such as thermoplastic polyurethane (TPU), polyvinyl chloride (PVC), polyethylene), with a perforated first portion e.g., 746 extending through the first zone e.g., 738 and the second zone e.g., 740.

In some embodiments, the method e.g., 770 further comprises attaching (i.e., step 778) a fluid actuator e.g., 750 (e.g., a fan) to a second fluid impermeable layer e.g., 742 (e.g., any non-breathable material or impermeable polymeric material such as thermoplastic polyurethane (TPU), polyvinyl chloride (PVC), polyethylene).

In one or more embodiments, the method e.g., 770 further comprises installing (i.e., step 780) the first fluid impermeable layer e.g., 732 (e.g., any non-breathable material or impermeable polymeric material such as thermoplastic polyurethane (TPU), polyvinyl chloride (PVC), polyethylene), the second fluid impermeable layer e.g., 742 (e.g., any non-breathable material or impermeable polymeric material such as thermoplastic polyurethane (TPU), polyvinyl chloride (PVC), polyethylene), and the trim cover segments e.g., 728, 729 over a preassembled seat assembly e.g., 720 with a cushion e.g., 730 (e.g., foam or mesh of polymeric strands) and a frame (e.g., rigid structure such as steel or aluminum for supporting the subassemblies of the seat).

In various embodiments, an assembly e.g., 731 comprises a first fluid impermeable layer e.g., 732 (e.g., any non-breathable material or impermeable polymeric material such as thermoplastic polyurethane (TPU), polyvinyl chloride (PVC), polyethylene) sized to be received by a seat cushion e.g., 730 (e.g., foam or foamless mesh of polymeric strands), wherein the first fluid impermeable layer e.g., 732 (e.g., any non-breathable material or impermeable polymeric material such as thermoplastic polyurethane (TPU), polyvinyl chloride (PVC), polyethylene) is provided with at least one vent formed therethrough, a plurality of adjacent trim cover segments e.g., 728, 729 sewn to the first fluid impermeable layer e.g., 732 with a scam e.g., 736 extending through the trim cover segments e.g., 728, 729 and the first fluid impermeable layer e.g., 732 to create a first zone e.g., 738 and a second zone e.g., 740, a perforated second fluid impermeable layer e.g., 742 (e.g., any non-breathable material or impermeable polymeric material such as thermoplastic polyurethane (TPU), polyvinyl chloride (PVC), polyethylene) in cooperation with (e.g., sewn, welded, adhered, or otherwise fastened) the first fluid impermeable layer 732 e.g., (e.g., any non-breathable material or impermeable polymeric material such as thermoplastic polyurethane (TPU), polyvinyl chloride (PVC), polyethylene) to provide a fluid chamber 744 e.g., therebetween, wherein the second fluid impermeable layer e.g., 742 (e.g., any non-breathable material or impermeable polymeric material such as thermoplastic polyurethane (TPU), polyvinyl chloride (PVC), polyethylene) is provided with a first portion e.g., 746 extending vertically through the first zone e.g., 738 and the second zone e.g., 740 and a second portion e.g., 748 connected to the seat cushion e.g., 730, a first fluid permeable layer e.g., 754, 755 (e.g., a resilient and porous material, such as porous foam, an extruded thermoplastic resin mesh, a knitted, three-dimensional spacer material) sized to be received by the first fluid impermeable layer e.g., 732 (e.g., any non-breathable material or impermeable polymeric material such as thermoplastic polyurethane (TPU), polyvinyl chloride (PVC), polyethylene), a fluid actuator e.g., 750 (e.g., a fan) directly attached to the first portion e.g., 746 of the second fluid impermeable layer e.g., 742 (e.g., any non-breathable material or impermeable polymeric material such as thermoplastic polyurethane (TPU), polyvinyl chloride (PVC), polyethylene), a second fluid permeable layer e.g., 756, 757 (e.g., a resilient and porous material, such as porous foam, an extruded thermoplastic resin mesh, a knitted, three-dimensional spacer material) displaced along the first fluid impermeable layer e.g., 732 (e.g., any non-breathable material or impermeable polymeric material such as thermoplastic polyurethane (TPU), polyvinyl chloride (PVC), polyethylene), and a heat transfer layer e.g., 758 (e.g., an electrically conductive heater mat) along the second fluid permeable layer e.g., 756, 757 (e.g., a resilient and porous material, such as porous foam, an extruded thermoplastic resin mesh, a knitted, three-dimensional spacer material). The heat transfer layer e.g., 758 is provided with an electrically conductive heater mat. The second fluid permeable layer e.g., 756, 757 (e.g., a resilient and porous material, such as porous foam, an extruded thermoplastic resin mesh, a knitted, three-dimensional spacer material) is spaced apart from the first fluid permeable layer e.g., 754, 757 (e.g., a resilient and porous material, such as porous foam, an extruded thermoplastic resin mesh, a knitted, three-dimensional spacer material).

Figure 15:
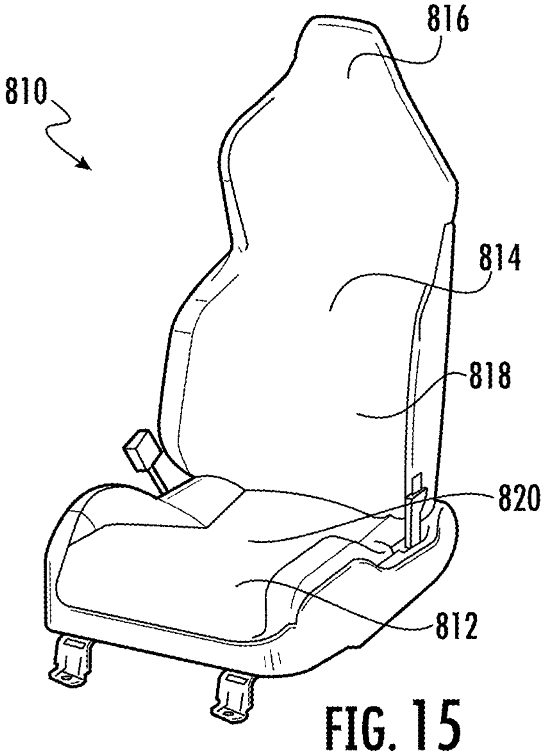
FIG. 15 is a front perspective view of a vehicle seat assembly according to some embodiments.

FIG. 15 illustrates a vehicle seat assembly 810 according to some embodiments. The vehicle seat assembly 810 is provided with a seat bottom 812 adapted to be mounted to a vehicle floor. The vehicle seat assembly 810 may be provided in any row of a vehicle. The vehicle seat assembly 810 includes a seat back 814 extending upright from the seat bottom 812. The vehicle seat assembly 810 also includes a head restraint 816 extending above the seat back 814. The vehicle seat assembly 810 may be employed in any type of vehicle, including land vehicles, watercrafts, aircrafts, or the like. The vehicle seat assembly 810 may be any seat assembly such as an office chair, furniture, or the like.

The vehicle seat assembly 810 is provided with a trim cover 818 over the seat bottom 812, seat back 814, and head restraint 816 to conceal a frame, cushioning, and functional components. The seat bottom 812 is provided with a seat cushion 820. The seat cushion 820 may be composed of a stranded thermoplastic mesh or foam.

Figure 16:
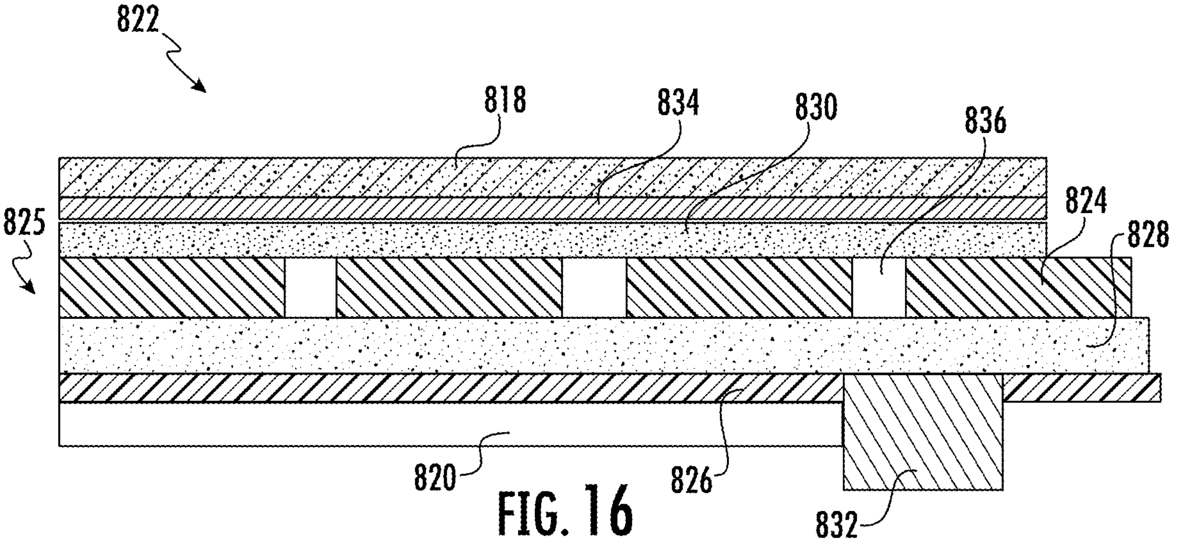
FIG. 16 is a partial section view of a trim cover assembly of the vehicle seat assembly of FIG. 15.

FIG. 16 illustrates a trim cover assembly 822 according to some embodiments. The trim cover assembly 822 is provided with a first fluid impermeable layer 824 and a second fluid impermeable layer 826 sized to be placed over the seat cushion 820. The first fluid impermeable layer 824 may be composed of a cushioning material, such as a foam. The second fluid impermeable layer 826 may be formed from an impermeable polymeric material, such as thermoplastic polyurethane (TPU) film, polyvinyl chloride (PVC) film, polyethylene, or the like. The first fluid impermeable layer 824 is provided with a plurality of vents 836 formed therethrough. Although a plurality of vents 836 is illustrated and described, any quantity of vents 836 may be utilized. The vents 836 direct airflow through the trim cover assembly 822. Additionally, the first fluid impermeable layer 824 is thermally insulative.

The second fluid impermeable layer 826 is in cooperation with the first fluid impermeable layer 824 to provide a fluid chamber 825 therebetween. The trim cover assembly 822 is further provided with a first fluid permeable layer 828 and a second fluid permeable layer 830. The fluid permeable layers 828, 830 are formed from a resilient and porous material, such as porous foam or an extruded thermoplastic resin mesh. The first fluid permeable layer 828 is sized to be received within the fluid chamber 825 between the first fluid impermeable layer 824 and the second fluid impermeable layer 826. The second fluid permeable layer 830 is displaced along the first fluid impermeable layer 824 and spaced apart from the first fluid permeable layer 828. The first fluid permeable layer 828 and the second fluid permeable layer 830 ensure that the first fluid impermeable layer 824 and the second fluid impermeable layer 826 aren't compressed together by the weight of an occupant. Without the permeable layers 828, 830, the impermeable layers 824, 826 could be compressed when weight from an occupant is applied which may cut off airflow when using a fan 832. When the trim assembly 822 utilizes a compressor as opposed to the fan 832, the permeable layers 828, 830 may be omitted.

The trim cover assembly 822 is also provided with a heat transfer layer 834 displaced along the first fluid impermeable layer 824, and spaced apart from the second fluid impermeable layer 826. In some embodiments, the heat transfer layer 834 may be displaced along the trim layer 818 or alternatively displaced between the second fluid permeable layer 830 and the fan 832. The heat transfer layer 834 is provided with an electrically conductive heater mat. The trim cover assembly 822 is further provided with the external trim layer 818 disposed over the first fluid impermeable layer 824 and the second fluid impermeable layer 826. The trim layer 818 is perforated to permit the fluid to pass through the external trim layer 818. Further, the trim layer 818 is sewn with stitching 838 to the first fluid impermeable layer 824, without an adhesive according to some embodiments. According to some embodiments, the trim layer 818 is glued to the first fluid impermeable layer 824.

With continued reference to FIG. 16, the trim cover assembly 822 is provided with a fluid actuator 832, such as a fan 832. The fluid actuator 832 is welded directly to the second fluid impermeable layer 826 to seal a connection around the fan 832 according to some embodiments. The fan 832 is connected to the second fluid impermeable layer 826 with a retention ring according to some embodiments. The fan 832 is installed between the trim cover 818 and the seat cushion 820. The seat cushion 820 includes a receptacle sized to receive the fan 832. Traditional fans are installed beneath a vehicle seat cushion and outside of a trim cover assembly. Installing the fan 832 above the seat cushion 820 allows the fan 832 to be displaced within the trim cover assembly 822.

Prior art seat assemblies with heating and cooling features, often orient the fan beneath the cushion. Fluid ducting is then assembled through the cushion and the trim cover of the conventional seat assemblies. The fluid impermeable layers 824, 826, the permeable layers 828, 830, the heat transfer layer 834, and the fluid actuator 832 are all preassembled within the trim cover assembly 822 so the trim cover assembly 822 can be installed as a whole onto a seat frame. This cuts down manufacturing cost and time in comparison to the prior art.

The trim cover assembly 822 is operable with an air permeable nonfoam seat cushion 820 formed from thermoplastic mesh. The second fluid impermeable layer 826 provides a barrier between the fluid chamber 825 and the seat cushion 820. When utilized with a foam cushion 820, the second fluid impermeable layer 826 can be omitted if the cushion 820 is air impermeable. In this case, the fluid actuator 832 may be welded directly to the first fluid impermeable layer 824 to convey a fluid through the vent 836 of the fluid impermeable layer 824. Alternatively, the fluid actuator 832 may be separate from the trim cover 818.

Figure 17:
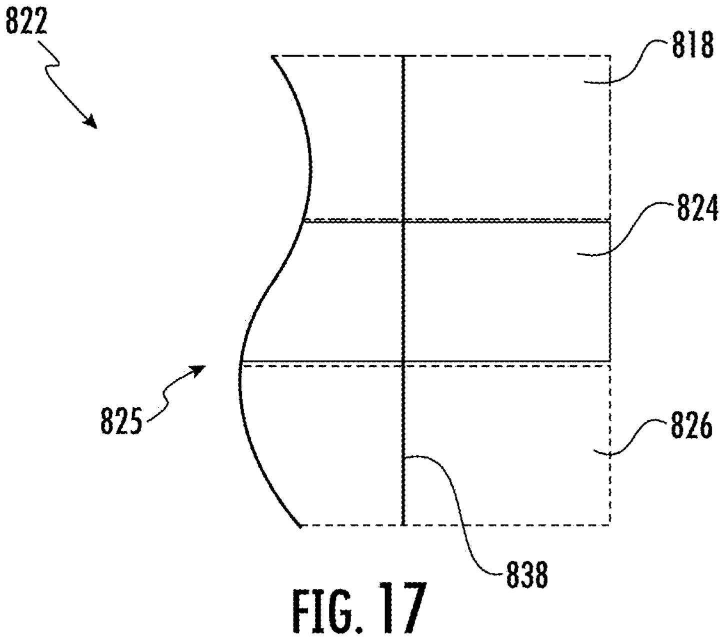
FIG. 17 is another partial section view of the trim cover assembly of FIG. 16.

FIG. 17 illustrates the external trim layer 818, the first fluid impermeable layer 824, and the second fluid impermeable layer 826 with stitching 838 along the perimeter. The stitching 838 seals the layers 818, 824, 826 so that air does not escape the fluid chamber 825. Alternatively, the layers 818, 824, 826 may be attached with an adhesive or welded together as opposed to utilizing the stitching 838.

In one or more embodiments, an assembly e.g., 822 comprises a first fluid impermeable layer e.g., 824 (e.g., an impermeable polymeric material, such as thermoplastic polyurethane (TPU) film, polyvinyl chloride (PVC) film, polyethylene) sized to be placed over a seat cushion e.g., 820 (e.g., foam or nonwoven mesh of polymeric filament) with at least one vent e.g., 836 formed therethrough, and a fluid actuator e.g., 832 such as a fan attached to the first fluid impermeable layer e.g., 824 (e.g., an impermeable polymeric material, such as thermoplastic polyurethane (TPU) film, polyvinyl chloride (PVC) film, polyethylene) to convey a fluid (e.g., air) through the vent e.g., 836 of the first fluid impermeable layer e.g., 826 (e.g., an impermeable polymeric material, such as thermoplastic polyurethane (TPU) film, polyvinyl chloride (PVC) film, polyethylene).

In various embodiments, the assembly e.g., 822 further comprises a second fluid impermeable layer e.g., 826 (e.g., an impermeable polymeric material, such as thermoplastic polyurethane (TPU) film, polyvinyl chloride (PVC) film, polyethylene) in cooperation with (e.g., sewn, welded, adhered, or otherwise fastened) the first fluid impermeable layer e.g., 824 (e.g., an impermeable polymeric material, such as thermoplastic polyurethane (TPU) film, polyvinyl chloride (PVC) film, polyethylene) to provide a fluid chamber e.g., 825 therebetween.

In some embodiments, the fluid actuator e.g., 832 such as a fan is attached directly to the second fluid impermeable layer e.g., 826 (e.g., an impermeable polymeric material, such as thermoplastic polyurethane (TPU) film, polyvinyl chloride (PVC) film, polyethylene) to covey the fluid (e.g., air) through the fluid chamber e.g., 825 and then out of the vent e.g., 836 of the first fluid impermeable layer e.g., 824 (e.g., an impermeable polymeric material, such as thermoplastic polyurethane (TPU) film, polyvinyl chloride (PVC) film, polyethylene).

In one or more embodiments, the assembly e.g., 822 further comprises a first fluid permeable layer e.g., 828 (e.g., a resilient and porous material, such as porous foam or an extruded thermoplastic resin mesh) sized to be received within the fluid chamber e.g., 825.

In various embodiments, the assembly e.g., 822 further comprises a second fluid permeable layer e.g., 830 (e.g., a resilient and porous material, such as porous foam or an extruded thermoplastic resin mesh) displaced along the first fluid impermeable layer e.g., 824 (e.g., an impermeable polymeric material, such as thermoplastic polyurethane (TPU) film, polyvinyl chloride (PVC) film, polyethylene) spaced apart from the first fluid permeable layer e.g., 828 (e.g., a resilient and porous material, such as porous foam or an extruded thermoplastic resin mesh).

In some embodiments, the fluid actuator e.g., 832 (e.g., a fan) is attached directly to the second fluid impermeable layer e.g., 826 (e.g., an impermeable polymeric material, such as thermoplastic polyurethane (TPU) film, polyvinyl chloride (PVC) film, polyethylene).

In one or more embodiments, the fluid actuator e.g., 832 (e.g., a fan) is welded to the second fluid impermeable layer e.g., 826 (e.g., an impermeable polymeric material, such as thermoplastic polyurethane (TPU) film, polyvinyl chloride (PVC) film, polyethylene).

In various embodiments, the assembly e.g., 822 further comprises a heat transfer layer 834 (e.g., an electrically conductive heater mat) displaced along the first fluid impermeable layer 824 (e.g., an impermeable polymeric material, such as thermoplastic polyurethane (TPU) film, polyvinyl chloride (PVC) film, polyethylene) spaced apart from the second fluid impermeable layer e.g., 826 (e.g., an impermeable polymeric material, such as thermoplastic polyurethane (TPU) film, polyvinyl chloride (PVC) film, polyethylene).

In some embodiments, the heat transfer layer e.g., 834 further comprises an electrically conductive heater mat.

In one or more embodiments, the assembly e.g., 822 further comprises an external trim layer e.g., 818 disposed over the first fluid impermeable layer e.g., 824 (e.g., an impermeable polymeric material, such as thermoplastic polyurethane (TPU) film, polyvinyl chloride (PVC) film, polyethylene) and the second fluid impermeable layer e.g., 826 (e.g., an impermeable polymeric material, such as thermoplastic polyurethane (TPU) film, polyvinyl chloride (PVC) film, polyethylene).

In various embodiments, the external trim layer e.g., 818 is perforated to permit the fluid (e.g., air) to pass through the external trim layer e.g., 818 such as through the perforations.

In some embodiments, the external trim layer e.g., 818 is sewn to the first fluid impermeable layer e.g., 824 (e.g., an impermeable polymeric material, such as thermoplastic polyurethane (TPU) film, polyvinyl chloride (PVC) film, polyethylene), without an adhesive.

In one or more embodiments, the fluid actuator e.g., 832 further comprises a fan.

In various embodiments, the first fluid impermeable layer e.g., 824 (e.g., an impermeable polymeric material, such as thermoplastic polyurethane (TPU) film, polyvinyl chloride (PVC) film, polyethylene) is insulative.

In some embodiments, a plurality of vents e.g., 836 is formed through the first fluid impermeable layer e.g., 824 (e.g., an impermeable polymeric material, such as thermoplastic polyurethane (TPU) film, polyvinyl chloride (PVC) film, polyethylene).

In one or more embodiments, a seat assembly e.g., 810 such as for a vehicle comprises a seat bottom e.g., 812, a seat back e.g., 814 extending in an upright position from the seat bottom e.g., 812, a seat cushion e.g., 820 attached to the seat bottom e.g., 812 or the seat back e.g., 814, and the trim cover assembly e.g., 822 installed over the seat cushion e.g., 820.

In various embodiments, the seat cushion e.g., 820 is fluid permeable.

In one or more embodiments, a method e.g., 840 comprises attaching (i.e., step 842) a fluid actuator e.g., 832 (e.g., a fan) to a first fluid impermeable layer e.g., 824 (e.g., an impermeable polymeric material, such as thermoplastic polyurethane (TPU) film, polyvinyl chloride (PVC) film, polyethylene), attaching (i.e., step 844) an external trim layer e.g., 818 over the first fluid impermeable layer e.g., 824 (e.g., an impermeable polymeric material, such as thermoplastic polyurethane (TPU) film, polyvinyl chloride (PVC) film, polyethylene), and installing (i.e., step 844) the first fluid impermeable layer e.g., 824 (e.g., an impermeable polymeric material, such as thermoplastic polyurethane (TPU) film, polyvinyl chloride (PVC) film, polyethylene), and the external trim layer 818 over a preassembled seat assembly e.g., 810 with a cushion e.g., 820 and a frame.

In various embodiments, the method e.g., 840 further comprises attaching (i.e., step 845) a second fluid impermeable layer in cooperation with the first fluid impermeable layer to provide a fluid chamber therebetween.

In one or more embodiments, an assembly e.g., 822 comprises a first fluid impermeable layer e.g., 824 (e.g., an impermeable polymeric material, such as thermoplastic polyurethane (TPU) film, polyvinyl chloride (PVC) film, polyethylene) sized to be received by a seat cushion e.g., 820 (e.g., foam or foamless such as a non-woven mesh of polymeric filaments), wherein the first fluid impermeable layer e.g., 824 (e.g., an impermeable polymeric material, such as thermoplastic polyurethane (TPU) film, polyvinyl chloride (PVC) film, polyethylene) is provided with at least one vent e.g., 836 formed therethrough, a second fluid impermeable layer e.g., 826 (e.g., an impermeable polymeric material, such as thermoplastic polyurethane (TPU) film, polyvinyl chloride (PVC) film, polyethylene) in cooperation with (e.g., sewn, welded, adhered, or otherwise fastened) the first fluid impermeable layer e.g., 824 (e.g., an impermeable polymeric material, such as thermoplastic polyurethane (TPU) film, polyvinyl chloride (PVC) film, polyethylene) to provide a fluid chamber e.g., 825 therebetween, a first fluid permeable layer e.g., 828 (e.g., a resilient and porous material, such as porous foam or an extruded thermoplastic resin mesh) sized to be received by the first fluid impermeable layer e.g., 824 (e.g., an impermeable polymeric material, such as thermoplastic polyurethane (TPU) film, polyvinyl chloride (PVC) film, polyethylene), a fluid actuator e.g., 832 (e.g., a fan) directly attached to the second fluid impermeable layer e.g., 826 (e.g., an impermeable polymeric material, such as thermoplastic polyurethane (TPU) film, polyvinyl chloride (PVC) film, polyethylene), a second fluid permeable layer e.g., 830 (e.g., a resilient and porous material, such as porous foam or an extruded thermoplastic resin mesh) displaced along the first fluid impermeable layer e.g., 824 (e.g., an impermeable polymeric material, such as thermoplastic polyurethane (TPU) film, polyvinyl chloride (PVC) film, polyethylene), a heat transfer layer e.g., 834 such as an electrically conductive heater mat along the second fluid permeable layer e.g., 830 (e.g., a resilient and porous material, such as porous foam or an extruded thermoplastic resin mesh), and a perforated external trim layer e.g., 818 disposed over the first fluid impermeable layer e.g., 824 (e.g., an impermeable polymeric material, such as thermoplastic polyurethane (TPU) film, polyvinyl chloride (PVC) film, polyethylene) and the second impermeable layer 826 (e.g., an impermeable polymeric material, such as thermoplastic polyurethane (TPU) film, polyvinyl chloride (PVC) film, polyethylene) to permit fluid to pass through the external trim layer 818. The heat transfer layer e.g., 834 is provided with an electrically conductive heater mat. The second fluid permeable layer e.g., 830 (e.g., a resilient and porous material, such as porous foam or an extruded thermoplastic resin mesh) is spaced apart from the first fluid permeable layer e.g., 828 (e.g., a resilient and porous material, such as porous foam or an extruded thermoplastic resin mesh).

Figure 18:
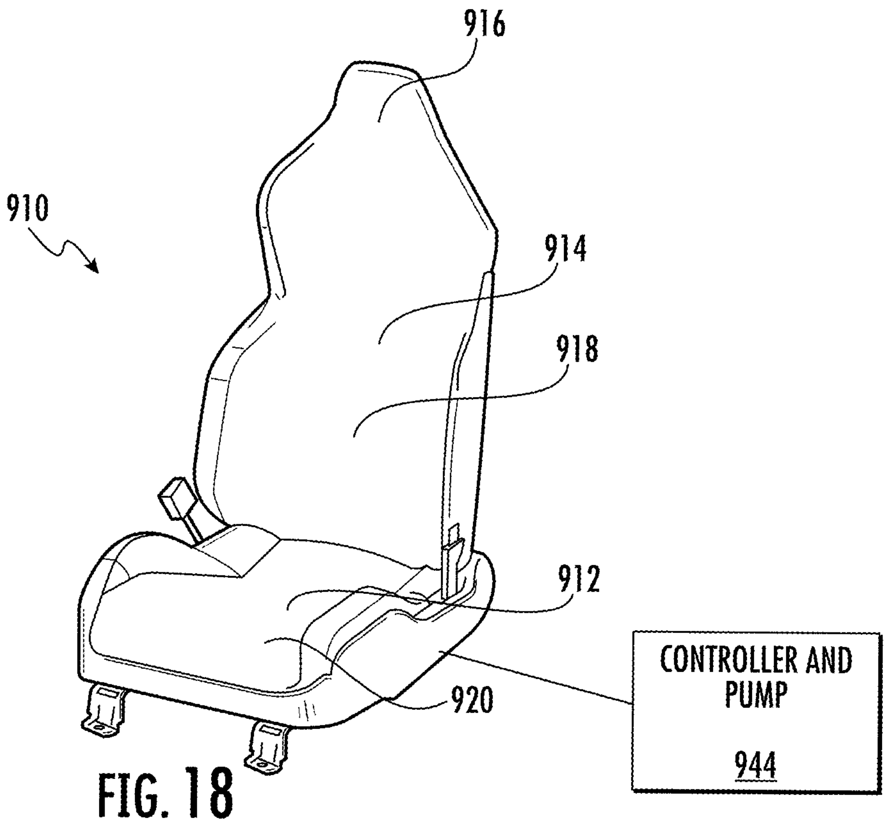
FIG. 18 is a front perspective view of a vehicle seat assembly according to some embodiments.

FIG. 18 illustrates a vehicle seat assembly 910 according to some embodiments. The vehicle seat assembly 910 is provided with a seat bottom 912 adapted to be mounted to a vehicle floor. The vehicle seat assembly 910 may be provided in any row of a vehicle. The vehicle seat assembly 910 includes a seat back 914 extending upright from the seat bottom 912. The vehicle seat assembly 910 also includes a head restraint 916 extending above the seat back 914. The vehicle seat assembly 910 may be employed in any type of vehicle, including land vehicles, watercrafts, aircrafts, or the like. The vehicle seat assembly 910 may be any seat assembly such as an office chair, furniture, or the like.

The vehicle seat assembly 910 is provided with a trim cover 918 over the seat bottom 912, seat back 914, and head restraint 916 to conceal a frame, cushioning, and functional components. The seat bottom 912 is provided with a seat cushion 920. The seat cushion 920 may be composed of a stranded thermoplastic mesh or foam. The vehicle seat assembly 910 is also provided with a controller and pump 944. The controller and pump 944 may be provided in a module under the seat cushion 920 and may be a multifunction controller that also controls other functions in the vehicle.

Figure 19:
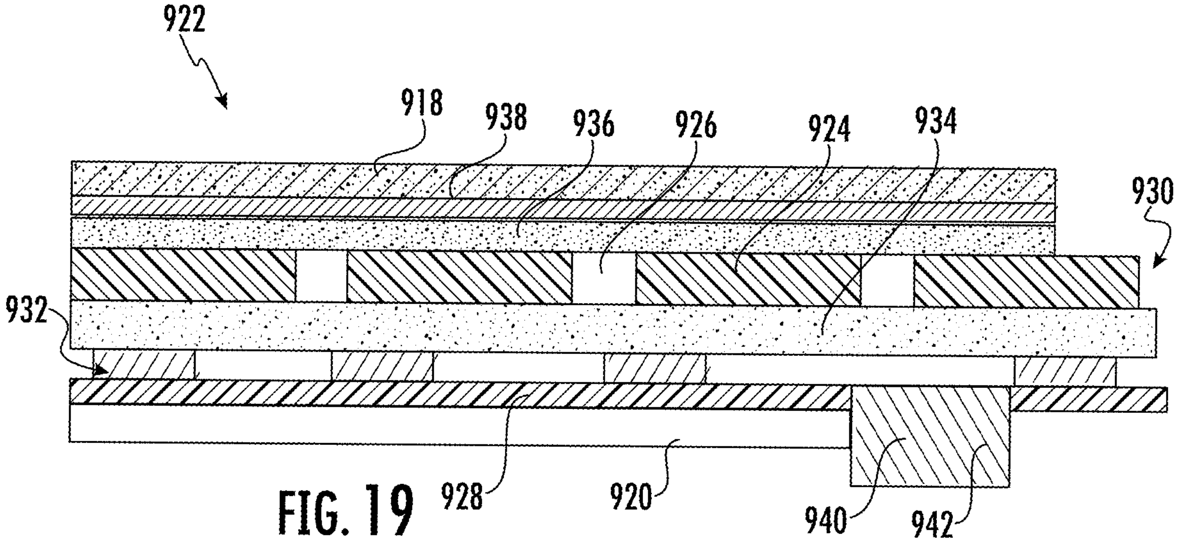
FIG. 19 is a partial section view of a trim cover assembly of the vehicle seat assembly of FIG. 18.

FIG. 19 illustrates a trim cover assembly 922 according to some embodiments. The trim cover assembly 922 is provided with a first trim cover layer 924 and a second fluid impermeable layer 928 sized to be placed over the seat cushion 920. The first trim cover layer 924 is referenced as the first fluid impermeable layer 924. The first fluid impermeable layer 924 may be composed of a cushioning material, such as a foam. The second fluid impermeable layer 928 may be formed from an impermeable polymeric material, such as thermoplastic polyurethane (TPU) film, polyvinyl chloride (PVC) film, polyethylene, or the like. The first fluid impermeable layer 924 is provided with a plurality of vents 926 formed therethrough, according to some embodiments. Although a plurality of vents 926 is illustrated and described, any quantity of vents 926 may be utilized. The vents 926 direct airflow through the trim cover assembly 922. According to some embodiments, the first fluid impermeable layer 924 and vents 926 may be optional if the trim cover 918 has a plurality of holes formed therethrough. Additionally, the first fluid impermeable layer 924 is insulative.

The second fluid impermeable layer 928 is in cooperation with the first fluid impermeable layer 924 to provide a fluid chamber 930 therebetween. The trim cover assembly 922 is further provided with an inflatable bladder assembly 932. The inflatable bladder assembly 932 is supported upon the first fluid impermeable layer 924 and oriented within the fluid chamber 930, according to some embodiments. According to some embodiments, the inflatable bladder assembly 932 may be displaced outside of the fluid chamber 930, such as between the second fluid impermeable layer 928 and the seat cushion 920.

The controller 944 is in electrical communication with the pump 944, which is in turn, in fluid communication with the inflatable bladder assembly 932 to inflate the assembly 932. The controller 944 is configured to receive input indicative of a manual adjustment and adjust the inflatable bladder assembly 932 to impart a pressure upon an occupant.

The trim cover assembly 922 is further provided with a first fluid permeable layer 934 and a second fluid permeable layer 936. The fluid permeable layers 934, 936 are formed from a resilient and porous material, such as porous foam or an extruded thermoplastic resin mesh. The first fluid permeable layer 934 is sized to be received within the fluid chamber 930, displaced upon the inflatable bladder assembly 932. The first fluid permeable layer and the inflatable bladder assembly 932 are oriented between the first fluid impermeable layer 924 and the second fluid impermeable layer 928. While a plurality of inflatable air bladder assemblies 932 are shown, there can be any quantity of air bladder assemblies 932.

The second fluid permeable layer 936 is displaced along the first fluid impermeable layer 924 and spaced apart from the first fluid permeable layer 934. The first fluid permeable layer 934 and the second fluid permeable layer 936 ensure that the first fluid impermeable layer 924 and second fluid impermeable layer 928 are not compressed together by the weight of an occupant. Without the permeable layers 934, 936, the impermeable layers 924, 928 could be compressed when weight from an occupant is applied which may cut off airflow when using a fan 942. When the trim assembly 922 utilizes a compressor as opposed to the fan 942, the permeable layers 934, 936 may be omitted.

The trim cover assembly 922 is also provided with a heat transfer layer 938 displaced along the first fluid impermeable layer 924 and spaced apart from the second fluid impermeable layer 928. In some embodiments, the heat transfer layer 938 may be displaced along the trim layer 918 or alternatively displaced between the second fluid impermeable layer 928 and the fan 942. In some embodiments, the heat transfer layer 938 may be displaced between the first fluid impermeable layer 924 and the first fluid permeable layer 934. The heat transfer layer 938 is provided with an electrically conductive heater mat. The trim cover assembly 922 is further provided with the external trim layer 918 disposed over the first fluid impermeable layer 924 and the second fluid impermeable layer 928. The trim layer 918 is perforated to permit the fluid to pass through the external trim layer 918. Further, the trim layer 918 is sewn to the first fluid impermeable layer 924, without an adhesive according to some embodiments. According to some embodiments, the trim layer 918 is glued to the first fluid impermeable layer 924.

With continued reference to FIG. 19, the trim cover assembly 922 is provided with a fluid actuator 940, such as a fan 942. The fluid actuator 940 is welded directly to the second fluid impermeable layer 928 to seal a connection around the fan 942. The fan 942 is connected to the second fluid impermeable layer 928 with a retention ring according to some embodiments. The fan 942 is installed between the trim cover 918 and the seat cushion 920. The seat cushion 920 includes a receptacle sized to receive the fan 942. Traditional fans are installed beneath a vehicle seat cushion and outside of a trim cover assembly. Installing the fan 942 above the seat cushion 920 allows the fan 942 to be displaced within the trim cover assembly 922.

Prior art seat assemblies with heating and cooling features, often orient the fan and the massage bladder assemblies beneath the cushion. Fluid ducting is then assembled through the cushion and the trim cover of the conventional seat assemblies. The fluid impermeable layers 924, 928, the permeable layers 934, 936, the heat transfer layer 938, the air bladder assemblies 932, and the fluid actuator 940 are all preassembled within the trim cover assembly 922 so the trim cover assembly 922 can be installed as a whole onto a seat frame. This preassembly cuts down manufacturing cost and time in comparison to the prior art.

The trim cover assembly 922 is operable with an air permeable nonfoam seat cushion 920 formed from thermoplastic mesh. The second fluid impermeable layer 928 provides a barrier between the fluid chamber 930 and the seat cushion 920. When utilized with a foam cushion 920, the second fluid impermeable layer 928 can be omitted if the cushion 920 is air impermeable. In this case, the fluid actuator 940 may be welded directly to the first fluid impermeable layer 924 to convey a fluid through the vent 926 of the fluid impermeable layer 924. Alternatively, the fluid actuator 940 may be separate from the trim cover.

In one or more embodiments, an assembly e.g., 922 comprises a first trim cover layer e.g., 924 sized to be placed over a seat cushion e.g., 920, and at least one inflatable bladder assembly e.g., 932 supported upon the first trim cover layer e.g., 924 to impart a pressure upon an occupant.

In various embodiments, the first trim cover layer e.g., 924 is fluid impermeable.

In some embodiments, the assembly e.g., 922 further comprises a first fluid impermeable layer e.g., 924 (e.g., a cushioning material or an impermeable polymeric material, such as thermoplastic polyurethane (TPU) film, polyvinyl chloride (PVC) film, polyethylene) that comprises at least one vent e.g., 926 formed therethrough.

In one or more embodiment, the assembly e.g., 922 further comprising a second fluid impermeable layer e.g., 928 (e.g., an impermeable polymeric material, such as thermoplastic polyurethane (TPU) film, polyvinyl chloride (PVC) film, polyethylene) in cooperation with (e.g., sewn, welded, adhered, or otherwise fastened) the first fluid impermeable layer e.g., 924 (e.g., an impermeable polymeric material, such as thermoplastic polyurethane (TPU) film, polyvinyl chloride (PVC) film, polyethylene) to provide a fluid chamber e.g., 930 therebetween.

In various embodiments, the assembly e.g., 922 further comprises a second fluid actuator e.g., 940 such as a fan attached directly to the second fluid impermeable layer e.g., 928 (e.g., an impermeable polymeric material, such as thermoplastic polyurethane (TPU) film, polyvinyl chloride (PVC) film, polyethylene).

In some embodiments, the second fluid actuator e.g., 940 (e.g., a fan) is welded to the second fluid impermeable layer e.g., 928 (e.g., an impermeable polymeric material, such as thermoplastic polyurethane (TPU) film, polyvinyl chloride (PVC) film, polyethylene).

In one or more embodiments, the second fluid actuator e.g., 940 further comprises a fan.

In various embodiments, the at least one inflatable bladder assembly e.g., 932 is oriented within the fluid chamber e.g., 930.

In some embodiments, the assembly e.g., 922 further comprises a first fluid permeable layer e.g., 934 (e.g., a resilient and porous material, such as porous foam or an extruded thermoplastic resin mesh) sized to be received within the fluid chamber e.g., 930, wherein the first fluid permeable layer e.g., 934 (e.g., a resilient and porous material, such as porous foam or an extruded thermoplastic resin mesh) is displaced upon the inflatable bladder assembly e.g., 932.

In one or more embodiments, the assembly e.g., 922 further comprises a second fluid permeable layer e.g., 936 (e.g., a resilient and porous material, such as porous foam or an extruded thermoplastic resin mesh) displaced along the first fluid impermeable layer e.g., 924 (e.g., an impermeable polymeric material, such as thermoplastic polyurethane (TPU) film, polyvinyl chloride (PVC) film, polyethylene) and spaced apart from the first fluid permeable layer e.g., 934 (e.g., a resilient and porous material, such as porous foam or an extruded thermoplastic resin mesh).

In various embodiments, the assembly e.g., 922 further comprises a heat transfer layer e.g., 938 (e.g., an electrically conductive heater mat) displaced along the first fluid impermeable layer spaced apart from the second fluid impermeable layer e.g., 924 (e.g., an impermeable polymeric material, such as thermoplastic polyurethane (TPU) film, polyvinyl chloride (PVC) film, polyethylene).

In some embodiments, the heat transfer layer e.g., 938 further comprises an electrically conductive heater mat.

In one or more embodiments, the assembly e.g., 922 further comprises an external trim layer e.g., 918 disposed over the first fluid impermeable layer e.g., 924 (e.g., an impermeable polymeric material, such as thermoplastic polyurethane (TPU) film, polyvinyl chloride (PVC) film, polyethylene) and the second fluid impermeable layer e.g., 926 (e.g., an impermeable polymeric material, such as thermoplastic polyurethane (TPU) film, polyvinyl chloride (PVC) film, polyethylene), wherein the external trim layer e.g., 918 is perforated to permit the fluid to pass through the external trim layer e.g., 918.

In one or more embodiments, the external trim layer e.g., 918 is sewn to the first fluid impermeable layer e.g., 924 (e.g., an impermeable polymeric material, such as thermoplastic polyurethane (TPU) film, polyvinyl chloride (PVC) film, polyethylene), without an adhesive.

In various embodiments, the assembly e.g., 922 further comprises a controller e.g., 944 in electrical communication with the at least one inflatable bladder assembly e.g., 932 configured to receive input indicative of a manual adjustment and adjust the at least one inflatable bladder assembly e.g., 932 to impart a pressure upon an occupant.

In various embodiments, the first fluid impermeable layer e.g., 924 (e.g., an impermeable polymeric material, such as thermoplastic polyurethane (TPU) film, polyvinyl chloride (PVC) film, polyethylene) is insulative.

In some embodiments, a plurality of vents e.g., 926 is formed through the first fluid impermeable layer e.g., 924 (e.g., an impermeable polymeric material, such as thermoplastic polyurethane (TPU) film, polyvinyl chloride (PVC) film, polyethylene).

In one or more embodiments, the at least one inflatable air bladder assembly e.g., 932 further comprises a plurality of inflatable air bladder assemblies e.g., 932 housed within the fluid chamber e.g., 930.

In various embodiments, a seat assembly e.g., 910 comprises a seat bottom e.g., 912, a seat back e.g., 914 extending in an upright position from the seat bottom e.g., 912, a seat cushion e.g., 920 attached to the seat bottom e.g., 912 or the seat back e.g., 914, and the assembly e.g., 922 installed over the seat cushion e.g., 920.

In some embodiments, the seat cushion e.g., 920 is fluid permeable.

In one or more embodiments, a method e.g., 950 comprises installing (i.e., 952) a first trim cover layer e.g., 918 sized to be placed over a seat cushion e.g., 920, and installing (i.e., 954) at least one inflatable bladder assembly e.g., 932 supported upon the first trim cover layer 918 to impart a pressure upon an occupant.

In various embodiments, an assembly e.g., 922 comprises an insulative first fluid impermeable layer e.g., 924 (e.g., an impermeable polymeric material, such as thermoplastic polyurethane (TPU) film, polyvinyl chloride (PVC) film, polyethylene) sized to be received by a seat cushion e.g., 920, wherein the first fluid impermeable layer e.g., 924 (e.g., an impermeable polymeric material, such as thermoplastic polyurethane (TPU) film, polyvinyl chloride (PVC) film, polyethylene) is provided with at least one vent e.g., 926 formed therethrough, a second fluid impermeable layer e.g., 928 (e.g., an impermeable polymeric material, such as thermoplastic polyurethane (TPU) film, polyvinyl chloride (PVC) film, polyethylene) in cooperation with (e.g., sewn, welded, adhered or otherwise fastened) the first fluid impermeable layer e.g., 924 (e.g., an impermeable polymeric material, such as thermoplastic polyurethane (TPU) film, polyvinyl chloride (PVC) film, polyethylene) to provide a fluid chamber e.g., 930 therebetween, a fluid actuator e.g., 940 (e.g., a fan) directly attached to the second impermeable layer e.g., 928 (e.g., an impermeable polymeric material, such as thermoplastic polyurethane (TPU) film, polyvinyl chloride (PVC) film, polyethylene), at least one inflatable bladder assembly e.g., 932 oriented within the fluid chamber e.g., 930 and supported upon the first fluid impermeable layer e.g., 924 (e.g., an impermeable polymeric material, such as thermoplastic polyurethane (TPU) film, polyvinyl chloride (PVC) film, polyethylene) to impart a pressure upon an occupant, a first fluid permeable layer e.g., 934 (e.g., a resilient and porous material, such as porous foam or an extruded thermoplastic resin mesh) displaced upon the inflatable bladder assembly e.g., 932, a second fluid permeable layer e.g., 936 (e.g., a resilient and porous material, such as porous foam or an extruded thermoplastic resin mesh) displaced along the first fluid impermeable layer e.g., 924 (e.g., an impermeable polymeric material, such as thermoplastic polyurethane (TPU) film, polyvinyl chloride (PVC) film, polyethylene), a heat transfer layer e.g., 938 (e.g., an electrically conductive heater mat) along the second fluid permeable layer e.g., 936 (e.g., a resilient and porous material, such as porous foam or an extruded thermoplastic resin mesh), and a perforated external trim layer e.g., 918 disposed over the first fluid impermeable layer e.g., 924 (e.g., an impermeable polymeric material, such as thermoplastic polyurethane (TPU) film, polyvinyl chloride (PVC) film, polyethylene) and the second impermeable layer e.g., 926 (e.g., an impermeable polymeric material, such as thermoplastic polyurethane (TPU) film, polyvinyl chloride (PVC) film, polyethylene) to permit fluid to pass through the external trim layer e.g., 918. The second fluid permeable layer e.g., 936 (e.g., a resilient and porous material, such as porous foam or an extruded thermoplastic resin mesh) is spaced apart from the first fluid permeable layer e.g., 934 (e.g., a resilient and porous material, such as porous foam or an extruded thermoplastic resin mesh). The heat transfer layer e.g., 938 is provided with an electrically conductive heater mat.

Figure 20:
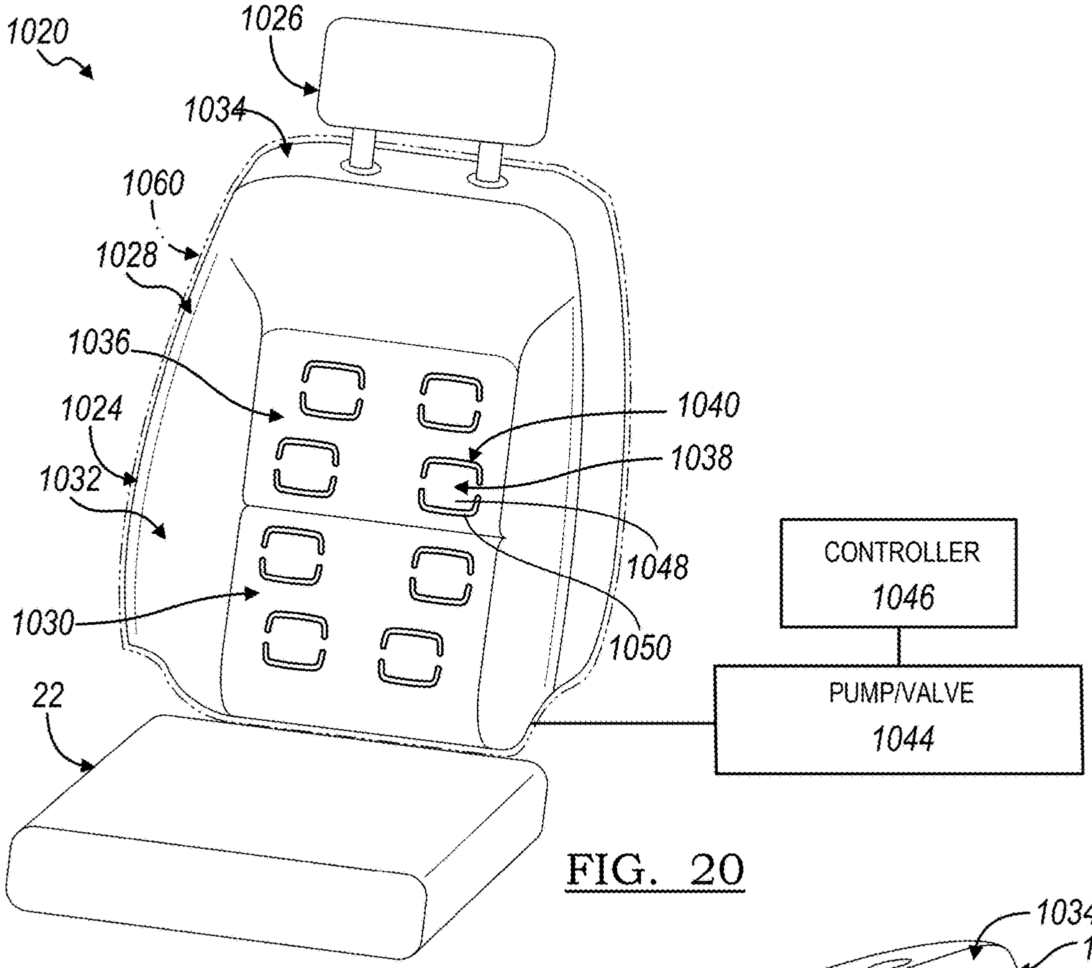
FIG. 20 is a front perspective view of a seat assembly according to some embodiments, illustrated with a seat cushion.

FIG. 20 illustrates a seat assembly 1020 according to some embodiments. The seat assembly 1020 is depicted as a vehicle seat assembly 1020. The seat assembly 1020 may be utilized in any vehicle, such as a land vehicle, aircraft, or watercraft. Although a vehicle seat assembly 1020 is disclosed, any seat assembly 1020 may be embodied, such as an office chair, or the like.

The seat assembly 1020 includes a seat bottom assembly 1022, which is adapted to be mounted to a vehicle floor. The seat bottom assembly 1022 is sized to receive and support a pelvis and thighs of an occupant seated upon the seat bottom assembly 1022. A seat back assembly 1024 extends in an upright direction from the seat bottom assembly 1022. The seat back assembly 1024 is sized to receive and support a back of the seated occupant. A head restraint assembly 1026 extends above the seat back assembly 1024 to support a head of the seated occupant.

The seat back assembly 1024 includes a seat support member of cushioning material, such as cushion 1028, to provide compliant support to the occupant. The cushion 1028 is formed from a cushioning material, such as polyurethane foam or the like, that is sufficiently structural to support an occupant, yet compliant to also provide comfort to the occupant. The cushion 1028 includes a central region 1030 that is sized to support a lumbar region and a thoracic region of the occupant. A pair of bolsters 1032 each extend laterally outboard from the central region 1030, and forward from the central region 1030, in a fore and aft direction, to provide lateral support to the lumbar and thoracic regions of the occupant. The cushion 1028 also includes a shoulder region 1034 that extends above the central region 1030 and slightly forward to receive and support shoulders of the occupant. On a front surface of the cushion 1028, the central region 1030, the bolsters 1032, and the shoulder region 1034 collectively provide a support surface 1036 for contact and support of the occupant.

Figure 21:
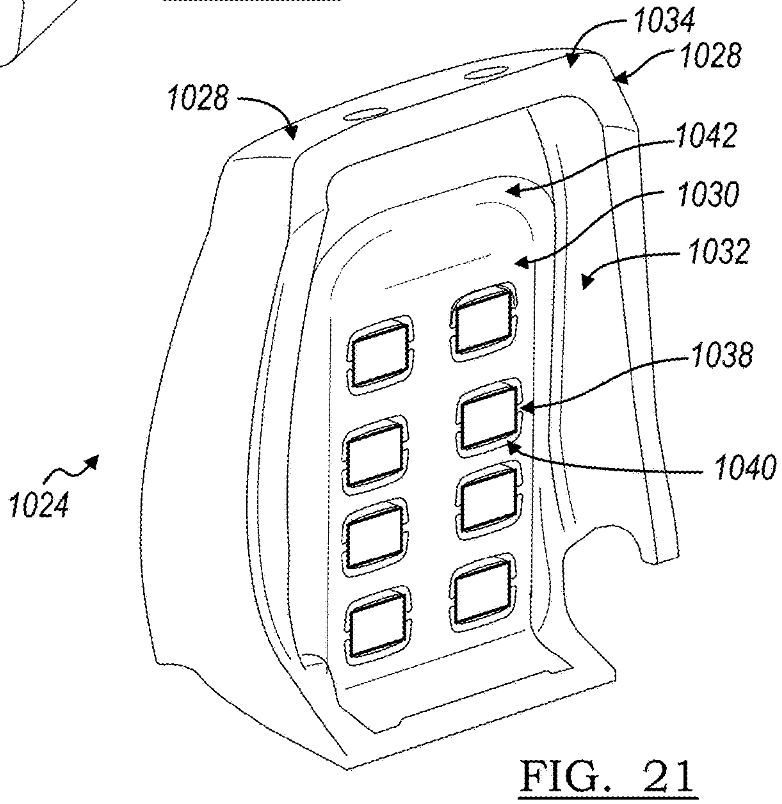
FIG. 21 is a rear perspective view of the seat cushion of FIG. 20, illustrated with a massage assembly.

Referring now to FIGS. 20 and 21, the seat assembly 1020 includes a local pressure assembly, such as a massage assembly 1038 for imparting a local pressure effect, such as a massage effect to the seated occupant. In order to impart the massage effect to various regions or zones in the seat assembly 1020, the massage assembly 1038 includes a plurality of local pressure devices, such as massage devices 1040, each located in one of a plurality of zones along the central region 1030 of the cushion 1028. Although the massage devices 1040 are oriented in the central region 1030, the massage devices 1040 may be utilized in any region of the seat assembly 1020. Although massage devices are illustrated and described, any local pressure device may be employed, such as a haptic device, lumbar adjustment, bolster adjustment, shoulder adjustment, or the like.

The massage devices 1040 are oriented on a rear surface 1042 of the seat cushion 1028 as illustrated in FIG. 21. The rear surface 1042 of the seat cushion 1028 is spaced apart from the support surface 1036 and is sized to be mounted to a frame or other structural support of the seat assembly 1020. The seat cushion 1028 may also be concave on the rear surface 1042 to partially conceal and enclose the massage devices 1040 and other functional or structural components of the seat assembly 1020.

For the depicted embodiment, the massage devices 1040 are inflatable air bladders 1040. To that end, the seat assembly 1020 includes a pump and valve bank 1044 in fluid cooperation with each of the air bladders 1040 to inflate and deflate the air bladders 1040. The seat assembly 1020 or the vehicle include a controller 1046 in communication with the pump and valves 1044 to control the operations of the pump and the valves 1044.

The prior art has provided seat assemblies with massage assemblies. The massage assemblies of the prior art often include massage devices oriented on the support surface of a seat cushion. The front surface placement of the massage devices permits direct distribution of a massage effect to the occupant. However, placement of the massage devices on the support surface often requires assembly of the massage assembly through the seat cushion. For example, the massage devices are pulled through apertures in the seat cushion with pneumatic tubing or wiring extending through the cushion to a rear surface of the seat cushion for connection to a pneumatic air source or an electrical power source. Orienting the massage devices on the support surface adds complexity, manufacturing time, and cost to the prior art massage assembly.

Placement of the massage devices 1040 on the rear surface 1042 of the seat cushion 1028 is typically avoided in the prior art. The seat cushion of the prior art inherently dampens the massage effect because actuation of massage devices compresses the foam of the seat cushion before providing a detectable pressure to the occupant. Additionally, massage effects from the rear surface of the cushion are often distributed through the entire support surface of the seat cushion. Displacement of the support surface of prior art seat cushions often requires displacement of the entire support surface resulting in a 'tenting' effect of the cushion.

In order to effectively impart an effective massage effect from the rear surface 1042 of the seat cushion 1028, a plurality of movable or articulatable portions 1048 are formed in the seat cushion 1028. The movable portions 1048 are translatable relative to the remainder of the seat cushion 1028 due to weakened regions 1050 formed between the movable portions 1048 and the seat cushion 1028. The weakened regions 1050 partially separate the movable portions 1048 relative to the central region 1030 to permit translation of the movable portions 1048 while maintaining a connection to the movable portions 1048 to the seat cushion 1028. The movable portions 1048 may be formed with a different material than the seat cushion 1028 for suitability for the applicable functions. For example, the seat cushion 1028 may be formed from a foam, such as polyurethane; whereas the movable portions 1048 may include compressed fibers or other materials for resiliency as articulating devices. Additional materials in the movable portions 1048 may be insert-molded into the foam of the movable portions 1048.

The seat assembly 1020 includes a trim cover 1060 over the seat cushion 1028 to conceal the cushion 1028 and the massage assembly 1038. According to various embodiments, a comfort layer, a spacer fabric, a reticulated foam, a dense material, or any suitable material may be provided between the trim cover 1060 and the seat cushion 1028.

Figure 22:
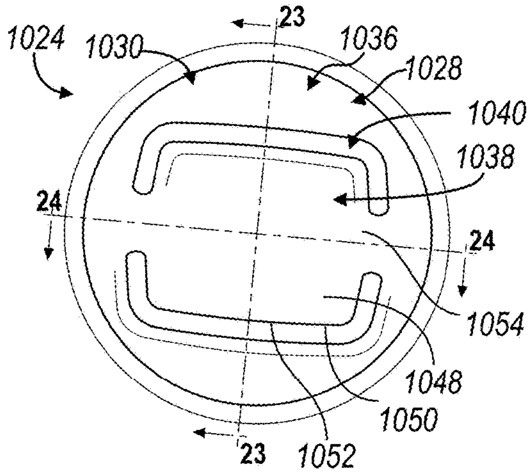
FIG. 22 is an enlarged front perspective view of a portion of the seat cushion of the seat assembly of FIG. 20.
Figure 23:
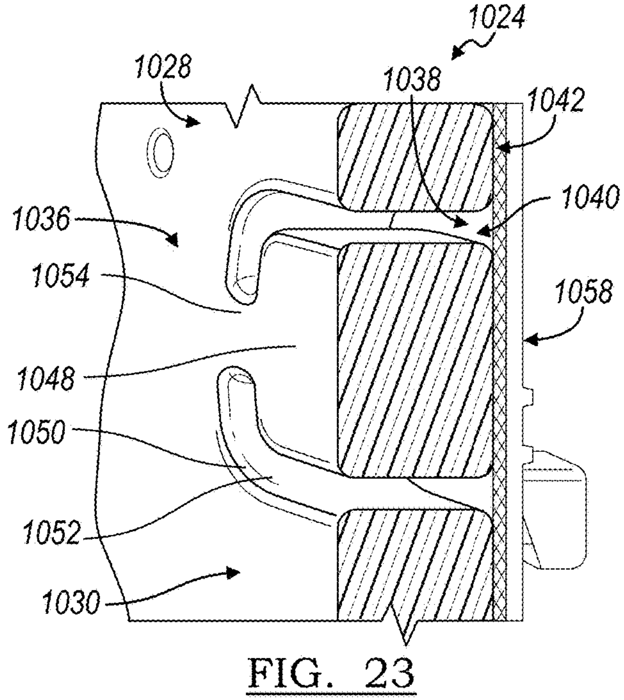
FIG. 23 is an enlarged partial section perspective view of a portion of the seat cushion taken along section line 23-23 in FIG. 22.
Figure 24:
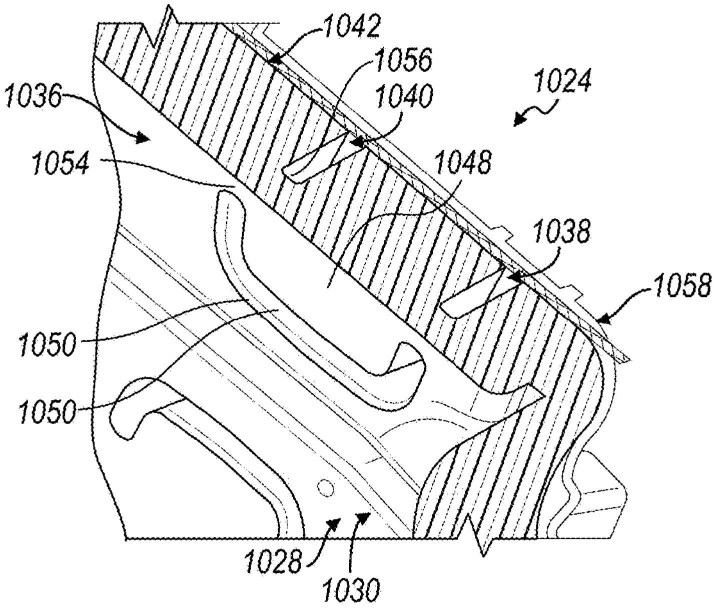
FIG. 24 is an enlarged partial section perspective view of a portion of the seat cushion taken along section line 24-24 in FIG. 22.

One of the movable portions 1048 is illustrated in greater detail in FIGS. 22-24. FIGS. 23 and 24 illustrate that the seat cushion 1028 is mounted to a seat frame 1058. The seat frame 1058 may be formed from stamped steel, a polymeric substrate, or any suitable material. The massage devices 1040 are oriented between the movable portions and the seat frame 1058. The massage devices 1040 may be adhered to a rear surface of the movable portions 1048 by an adhesive. The seat frame 1058 provides sufficient resiliency to provide a reaction force to the actuators 1040 so that the massage effect is efficiently distributed to the movable portions 1048 with focused energy and displacement.

FIGS. 22-24 illustrate that an overall shape of the movable portion 1048 is defined by the weakened region 1050. The movable portion 1048 is sized to correspond to the shape of the actuator, such as the massage bladder 1040. The weakened region 1050 includes a pair of slots 1052 that are formed through the seat support surface 1036. The slots 1052 collectively extend around a majority of a perimeter of the movable portion 1048. The slots 1052 also define a pair of tethers 1054 between the movable portion 1048 and the remainder of the seat support surface 1036 of the seat cushion 1028. The tethers 1054 are sized to connect the movable portion 1048 relative to the seat support surface 1036 for translation relative to the seat support surface 1036. Although two tethers 1054 are illustrated, any quantity and orientation of tethers 1054 may be employed.

The weakened region 1050 also includes recesses 1056 formed in the rear surface 1042 of the seat cushion 1028. The recess 1056 is formed to a blind depth as illustrated in FIG. 24, so that the tether 1054 has a reduced thickness relative to the movable portion 1048 and the central region 1030. The recess 1056 extends around the perimeter of the movable portion 1048 and intersects the slots 1052. According to some embodiments, the weakened region 1050 may be provided with the recess 1056 formed about the perimeter of the movable portion 1048 without the slots 1052 so that the tethers 1054 extend around the perimeter of the movable portion 1048 as a web. The weakened regions 1050 may be formed in the seat cushion 1028 by any forming operation of the seat cushion 1028, such as a molding operation.

According to some embodiments, the tethers 1054 may be sized to shear after initial operation of the massage devices 1040. For example, the tethers 1054 may be sized to maintain a position and orientation of the movable portions 1048 until the movable portions 1048 are adhered to the massage devices 1040. Then, after a few cycles of the massage devices 1040, the tethers 1054 may be torn to permit untethered translation of the movable portions 1048, thereby further improving travel performance.

Figure 25:
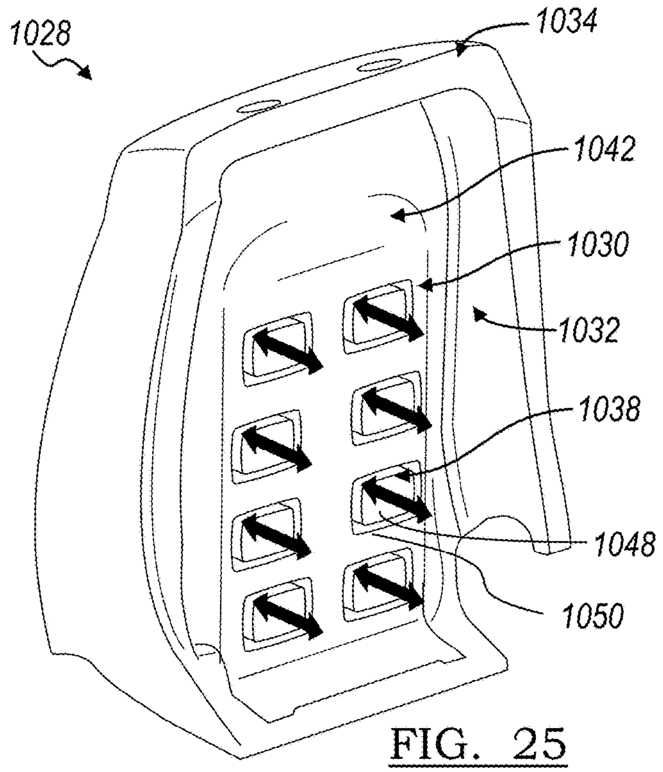
FIG. 25 is another rear perspective view of the seat cushion of FIG. 20.

As illustrated in FIG. 25, each of the movable portions 1048 are separately translatable in the fore and aft direction of the vehicle seat assembly 1020. The movable portions 1048 enhance the massage effect by effectively distributing the pressure and energy from the massage devices 1040 to the movable portions 1048 and to the occupant with increased intensity in comparison to the prior art.

With reference now to FIGS. 20-25, the massage assembly 1038 simplifies the massage assembly manufacturing process while minimizing an overall quantity of components. The massage assembly 1038 also minimizes energy losses by allowing the massage points 1048 of the foam to articulate fore and aft to the seated occupant. The massage devices 1040 and related components, such as tubing and connectors, are installed on the rear surface 1042 of the seat cushion 1028 without making connections through the foam of the seat cushion 1028. By placing the massage devices 1040 on the rear surface 1042, the massage assembly 1038 can be preassembled by installation upon the frame 1058.

Figure 26:
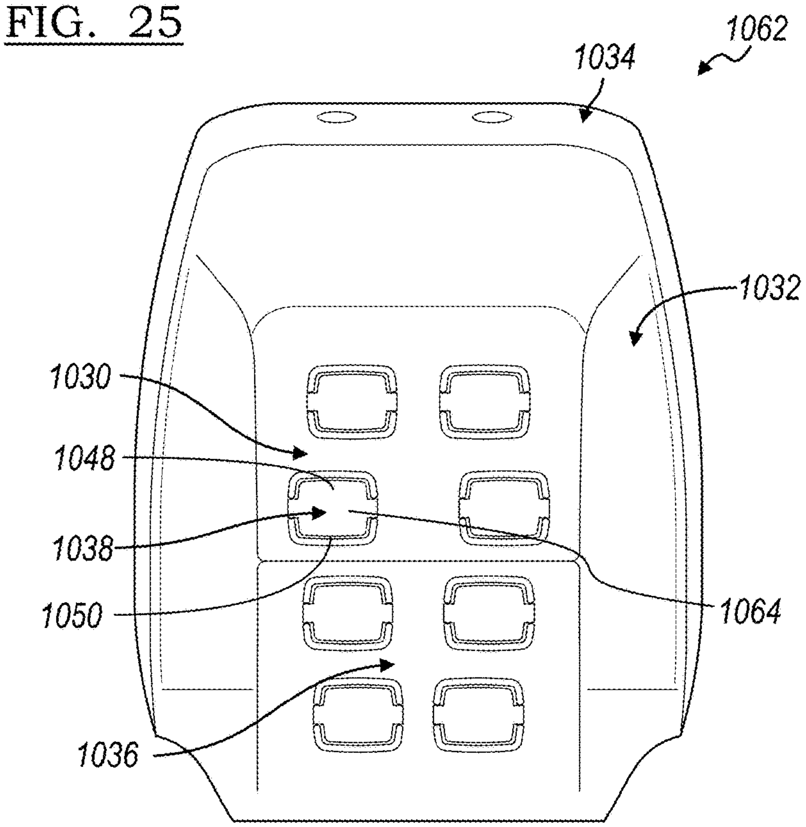
FIG. 26 is a front elevation view of the seat cushion of FIG. 20 according to some embodiments.

FIG. 26 illustrates a seat cushion 1062 according to some embodiments. The seat cushion 1062 is similar to the prior embodiments. The seat cushion 1062 also includes a strengthened portion 1064 on a forward surface of each of the movable portions 1048. The strengthened portion 1064 may embody the entire movable portion 1048. The strengthened portion 1064 may even embody the tethers 1054 depending on the displacement specifications of a particular application. The strengthened portion 1064 may be formed from a foam of a higher firmness than the remainder of the seat cushion 1028 to provide a firmer and consequently harder surface to increase the efficiency of transferring energy from the massage device 1040 to the occupant during massage actuation by mitigating damping and dissipation of the massage effect.

The strengthened portions 1064 may be formed from a higher density or durometer foam that is molded separately from the remainder of the seat cushion 1028. The strengthened portions 1064 may be molded separately as a gang, and then insert molded with a softer foam for the remainder of the seat cushion 1028. Alternatively, the strengthened portions 1064 and the seat cushion 1028 can be molded together in a common mold in a multistep process.

A vehicle seat assembly (e.g., 1020) including a support member (e.g., panel, substrate or frame) to support a cushion (e.g., 1028) including a cushioning material such as a polyurethane foam is provided. The support member defines a support surface (e.g., 1036) sized to support an occupant and includes a weakened region (e.g., 1050 such as a pair of slots 1052 formed through the support surface 1036). The weakened portion (e.g., 1050) provides a movable portion (e.g., 1048), which may be formed a material that is different than the cushioning material (e.g., the movable portion 1048 is formed of a compressed fiber whereas the cushioning material is a polyurethane foam) that translates relative to the seat support surface (e.g., 1036). In various embodiments, translation is from a local pressure effect such as a massage effect such as from a pressurized bladder imparted upon a rear surface of the movable portion (e.g., 1048) from a local pressure device (e.g., massage device 1040). The local pressure device (e.g., massage device 1040) provided on the rear surface of the support of cushioning material. In one or more embodiments, the rear surface (e.g., 1042) of the cushion (e.g., 1028) is spaced apart from the seat support surface (e.g., 1036).

In a variation, the weakened region (e.g., 1050 such as a pair of slots 1052 formed through the support surface 1036) extends around a perimeter of the movable section (e.g., 1048), such as around a majority of the perimeter. In various embodiments, the weakened region (e.g., 1050) is defined as a recess (e.g., 1056) formed into the support member to partially separate the movable portion (e.g., 1048) from the support surface (e.g., 1036). In some embodiments, the recess (e.g., 1056) is formed through the support member. In one or more embodiments, the recess (e.g., 1056) is formed to a blind depth with a tether (e.g., 1054) in the weakened region (e.g., 1050). In various embodiments, the weakened region (e.g., 1050) is defined as a plurality of recesses formed in the support member to partially separate the movable portion (e.g., 1048) from the remainder of the support member.

In one or more embodiments, the support member comprises at least one tether (e.g., 1054) connecting the movable portion (e.g., 1048) and the seat support surface (e.g., 1036). In a variation, the seat support surface (e.g., 1036) has a first thickness, and the tether has a second thickness that is less than the first thickness. In some embodiments, the at least one tether (e.g., 1054) is sized to tear during initial operation to permit untethered translation of the movable portion (e.g., 1048).

In one or more embodiments, the movable portion (e.g., 1048) is strengthened relative to the seat support surface (e.g., 1036) such as by being formed from a compressed fiber instead of a polyurethane foam or of a foam of a higher firmness, higher density, or hardness to distribute the local pressure effect imparted upon a strengthened portion (e.g., 1064) from the local pressure device (e.g., massage devices such as a fluid bladder e.g., air bladder). For example, the support member is formed with a first firmness and the movable portion (e.g., 1048) is formed with a second firmness that is greater than the first firmness.

A local pressure assembly (e.g., massage assembly 1038) for imparting a local pressure effect such as a massage effect to a seated occupant is provided. The local pressure assembly (e.g., massage assembly 1038) comprises a local pressure device (e.g., massage device 1040) and the support member described herein comprising a weakened region (e.g., 1050), a movable portion (e.g., 1048), a tether (e.g., 1054) and/or a strengthened portion (e.g., 1064).

In various embodiments, the local pressure device (e.g., massage device 1040) comprises an inflatable air bladder.

A seat assembly (e.g., 1020) is described. The seat assembly (e.g., 1020) comprises a seat frame (e.g., 1058, such as rigid material (e.g., metal, plastic wood or a combination thereof)), a local pressure device (e.g., a massage device 1040) provided on the seat frame (e.g., 1058), and the support member (e.g., described herein comprising a weakened region 1050, a movable portion 1048, a tether 1054 and/or a strengthened portion 1064) installed upon the seat frame (e.g., 1058) with the local pressure device (e.g., massage device 1040) aligned with the movable portion 1048.

A support member (e.g., a panel, substrate or the frame) of a cushion (e.g., 1028) comprising a cushioning material (e.g., polyurethane foam) is provided. The support member provides a seat support surface (e.g., 1036) sized to support an occupant with a strengthened portion (e.g., 1064 (e.g., compressed fiber or a foam with greater firmness, hardness and/or density)) within the seat support surface (e.g., 1036) to distribute a local pressure effect (e.g., massage effect) imparted upon the strengthened portion (e.g., 1064) from the local pressure device (e.g., massage device 1040).

In one or more embodiments, the support member is formed with a first firmness and the strengthened portion (e.g., 1064) is formed with a second firmness that is greater than the first firmness.

A local pressure assembly (e.g., massage assembly 1038) comprising a local pressure device (e.g., massage device 1040), and a support member as described herein is provided.

A seat assembly comprising a seat frame (e.g., 1058 (e.g., rigid material such as metal, plastic, wood, or a combination thereof)), a local pressure device (e.g., massage device 1040) provided on the seat frame (e.g., 1058), and a support member as described herein installed upon the seat frame (e.g., 1058) with the local pressure device (e.g., massage device 1040) aligned with the strengthened portion (e.g., 1064) is also provided.

In one or more embodiments, a seat support member of a cushioning material (e.g., polyurethane foam) is provided. The seat support member comprises a seat support surface (e.g., 1036) sized to support an occupant. The seat support surface (e.g., 1036) also includes a plurality of recesses formed through the seat support surface (e.g., 1036) and extending partially around a perimeter of a movable portion (e.g., 1048 (e.g., compressed fiber or a foam with higher firmness, hardness, and/or density)). The plurality of recesses permits translations from a local pressure effect (e.g., massage effect) imparted upon the movable portion (e.g., 1048) from a local pressure device (e.g., massage device 1040). The support member is formed with a first firmness and the movable portion (e.g., 1048) is formed with a second firmness that is greater than the first firmness. In a refinement, the seat support surface (e.g., 1036) has a first thickness. In some embodiments, the seat support member of cushioning material comprises at least one tether connecting the movable portion and the seat support surface, the tether having a second thickness that is less than the first thickness. The support member is formed with a first firmness and the movable portion is formed with a second firmness that is greater than the first firmness.

Figure 27:
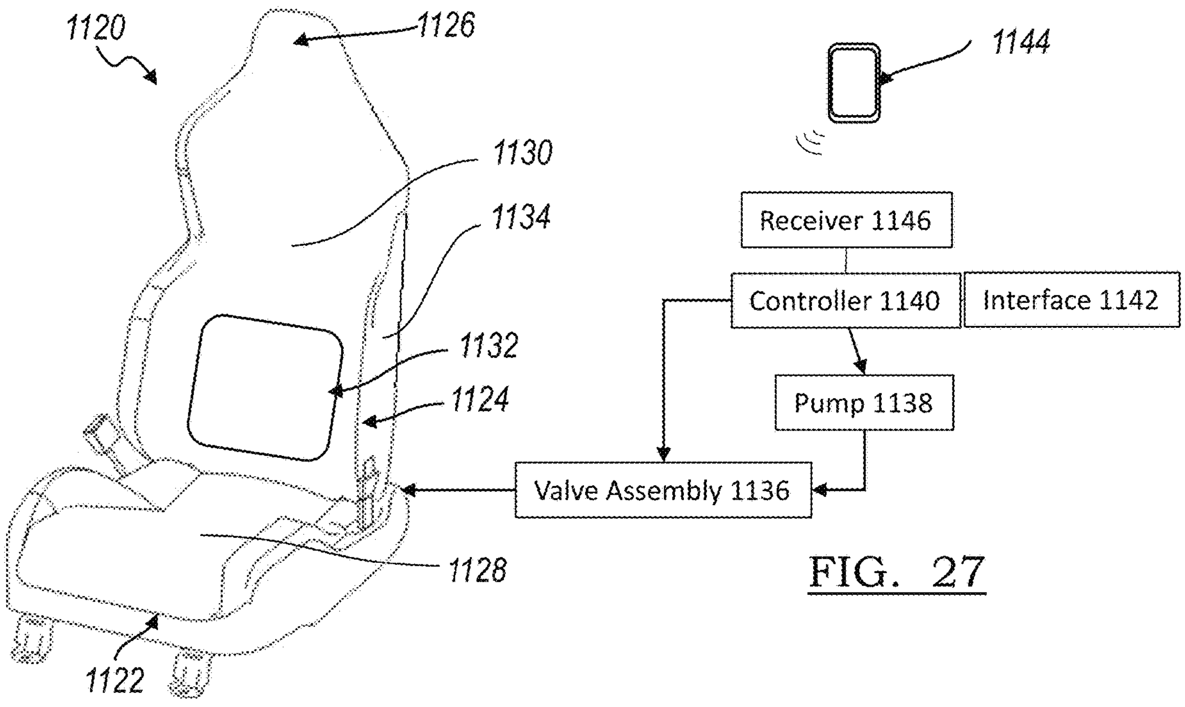
FIG. 27 is a schematic view of a seating system according to some embodiments.

FIG. 27 illustrates a seating system 1120 according to some embodiments. The seating system 1120 is a vehicle seating system 1120 for a land vehicle, watercraft, aircraft, or the like. The seating system 1120 may also be a seating system 1120 for a comfort chair, office chair, or the like. In the vehicle environment, the seating system 1120 may be a front row seating system 1120, or a subsequent middle or rear row seating system 1120.

The seating system 1120 includes a seat bottom 1122 sized to support a pelvis and thighs of an occupant. The seat bottom 1122 is adapted to be mounted to a vehicle floor. A seat back 1124 extends in an upright direction from the seat bottom 1122. The seat back 1124 is sized to receive and support a back of the occupant. The seat back 1124 may be supported by the seat bottom 1122 or the underlying support surface. A head restraint 1126 is also be provided upon the seat back 1124 to support a head of the occupant.

The seating system 1120 provides contact surfaces 1128, 1130 for receiving and comfortably supporting the occupant. The seating system 1120 includes at least one actuator assembly 1132 provided within the seating system 1120 within the contact surfaces 1128, 1130. Although one actuator assembly 1132 is illustrated and described, any number or location of actuator assemblies 1132 may be employed. The actuator assembly 1132 may be utilized to impart a tactile effect upon the occupant, such as a vibration for conveying an alert, vibration for imparting a massage, pressure for imparting a pressurized massage effect, support to the occupant, or the like.

In the depicted embodiment, the actuator assembly 1132 is a fluid bladder 1132, such as an air bladder 1132. The fluid bladder 1132 is for imparting a pressurized massage effect to the occupant. The fluid bladder 1132 may also be located in a side bolster 1134 of the seat back 1124 to provide adjustable support to the occupant.

The seating system 1120 includes a valve assembly 1136 in fluid communication with the fluid bladder 1132. A pump 1138, such as a compressor, is in fluid communication with the valve assembly 1136 to provide a source of pressurized fluid, such as compressed air, to the valve assembly 1136. Any quantity of pumps 1138 and electrically powered valves 1136 may be employed. Alternatively, a plurality of pumps 1138 may be employed without any electrically powered valves 1136.

A controller 1140 is in electrical communication with the pump 1138 to operate the pump 1138 to generate the source of pressurized air. The controller 1140 is also in electrical communication with the valve assembly 1136 to control the valve assembly 1136 and to regulate the flow of pressurized air to the valve assembly 1136. The valve assemblies 1136 are housed within the seat back 1124 or the seat bottom 1122 of the seating system 1120. The controller 1140 is housed within the vehicle, and according to some embodiments, within the seat back 1124 or the seat bottom 1122.

The system 1120 also includes an interface 1142 in electrical communication with the controller 1140. The interface 1142 receives a manual selection of a massage effect. The interface 1142 conveys the massage request to the controller 1140. The interface 1142 may be a mechanical selector switch or a plurality of switches. The interface 1142 may also be another human machine interface, such as a graphical user interface, for occupant selection of a massage effect. The interface 1142 may be integrated into the seat system 1120, or may be provided elsewhere within the vehicle. The interface 1142 may be integrated with the controller 1140.

The controller 1140 is programmed such that the massage assembly 1132 is initially deactivated. Therefore, the massage assembly 1132 is initially inoperable without activation. The operation of the massage assembly 1132 can be activated as a service, an incentive, a subscription, a promotion, or any other marketing or retail effort. For example, the hardware of the massage assembly 1132 is installed in the seating system 1120, but is not operable until after an activation of the operation.

An activation code may be provided in a software application that is accessible by a personal digital assistant (PDA) 1144, such as a smart phone, or the like. The PDA 1144 may be any controller that is configured to receive an activation code and transmit the code to the controller 1140. The PDA 1144 is in wireless communication with a receiver 1146 in the vehicle or the seating system 1120, which is in turn, in communication with the controller 1140. For example, an occupant may install an application on the PDA 1144 that is configured with the activation code. The occupant may subscribe to a service or otherwise access the activation code, which is communicated to the controller 1140 to activate or otherwise unlock the operation of the massage assembly 1132. The interface 42 may also be provided in the software application with the activation code in the PDA 1144.

Alternatively, the massage operation may be a vehicle package option. For example, a manufacture, a dealership, or other retailer may activate the massage operation based on a vehicle package that is purchased.

Figure 28:
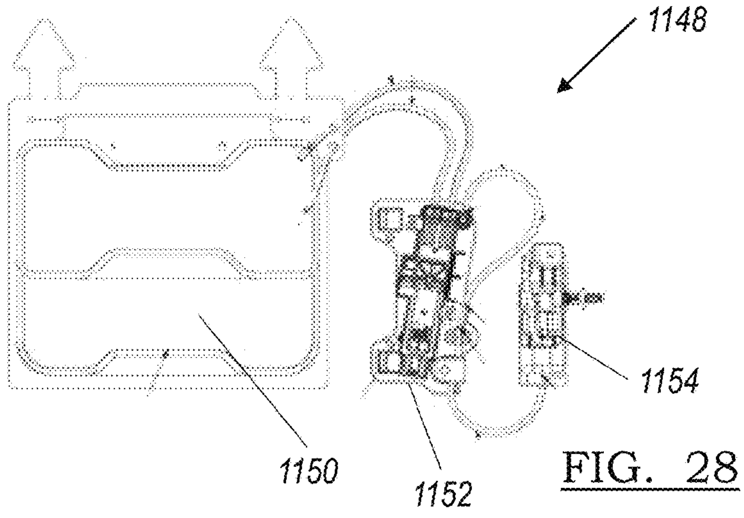
FIG. 28 is a schematic view of a massage assembly of the seating system of FIG. 27, according to some embodiments.

FIG. 28 illustrates a massage assembly 1148, which may be installed as the massage assembly 1132 in the seating system 1120. The massage assembly 1148 includes a pair of lumbar bladders 1150 that are oriented in a lumbar region of the seating surface 1130 to impart a pressurized massage effect upon the occupant. A valve assembly 1152 is in fluid communication with the lumbar bladders 1150 and a pump 1154 to convey pressurized air from the pump 1154, through the valve assembly 1152, and to the lumbar bladders 1150. According to some embodiments, the massage assembly 1148 provides one massage effect: inflation and deflation of the lumbar bladders 1150. Alternatively, the massage assembly 1148 could provide multiple massage effects with addition valves or additional massage programs.

Figure 29:
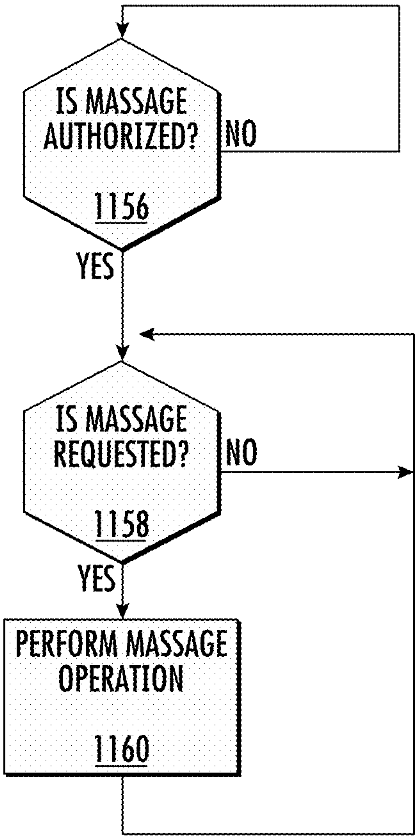
FIG. 29 is a flowchart of a method of the massage assembly of FIG. 28, according to some embodiments.

FIG. 29 illustrates an example method for operation of the massage assembly 1148 in the seat system 1120. At block 1156, the controller determines whether massage is authorized, such as upon receipt of an activation code from the PDA 1144. If the massage operation is not authorized, then block 1156 is repeated. If massage is authorized, then block 1158 determines whether the massage operation has been requested by selection at the interface 42. If a massage effect is not requested, the block 1158 is repeated. If the massage effect is requested, then the massage operation is performed at block 1160.

Figure 30:
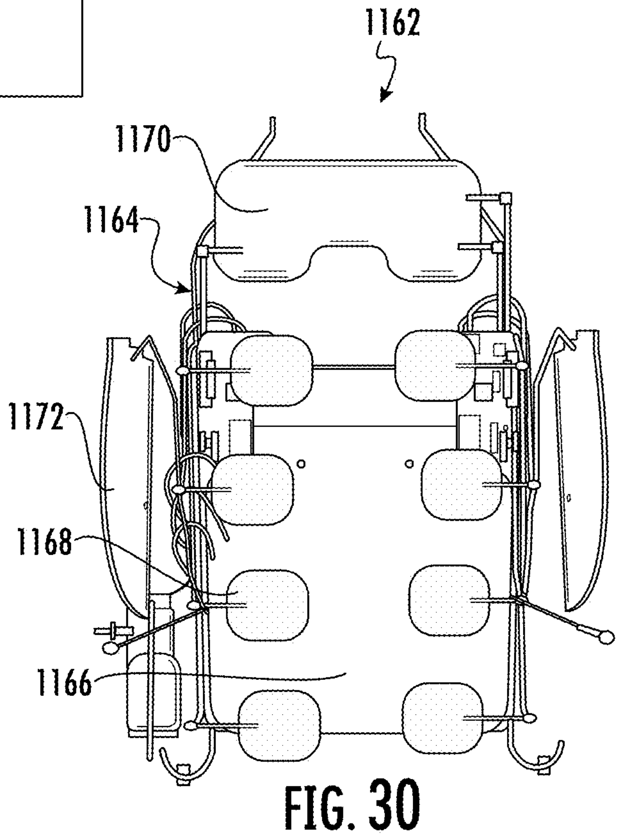
FIG. 30 is a front elevation view of a massage assembly of the seating system of FIG. 27, according to some embodiments.

FIG. 30 illustrates a massage assembly 1162 according to some embodiments. The massage assembly 1162 is illustrated mounted to a suspension 1164, which supports the massage assembly 1162 for installation to a seat frame. The massage assembly 1162 includes a plurality of inflatable air bladders, including lumbar bladders 1166, an array of incrementally spaced air bladders 1168, a neck bladder 1170, and a pair of side bolster air bladders 1172. Each of these air bladders 1166, 1168, 1170, 1172 may be separately inflatable for support of an occupant. Each the air bladders 1166, 1168, 1170, 1172 may also be separately inflatable, or inflatable in groups for performing more than one massage effect.

With various massage options, the massage assembly 1162 may provide more than one massage effect, by operation of various combinations of the air bladders 1166, 1168, 1170, 1172, and/or various patterns thereof. By offering multiple massage effects, various subscription or trim level options may be provided to the end user to obtain various authorization codes.

Figure 31:
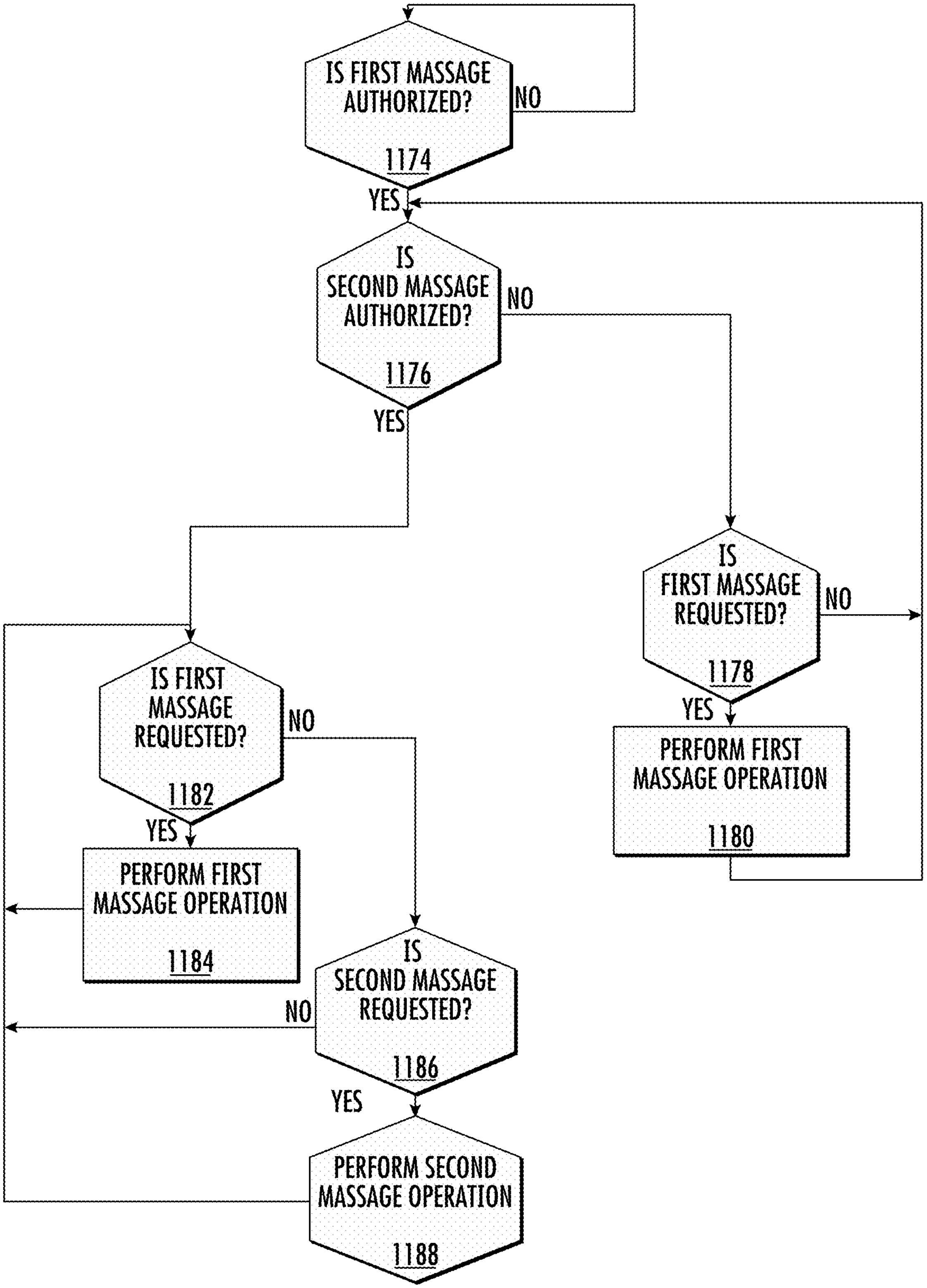
FIG. 31 is a flowchart of a method of the massage assembly of FIG. 30, according to some embodiments.

FIG. 31 illustrates a method for operating a massage assembly, such as the massage assembly 1162, that offers at least two massage effects. At block 1174, the controller determines whether the first massage is authorized. If not, the determination is repeated at block 1174. Once the first massage is authorized, then the controller determines at block 1176 whether the second massage effect is authorized. If the second massage effect is not authorized, then at block 1178, the controller determines if the first massage effect is requested. If not, then block 1176 is repeated. If the first massage effect is requested at block 1178, then the first massage operation is performed at block 1180. Next block 1176 is repeated.

At step 1176, if the second massage is authorized, then block 1182 determines if the first massage effect is requested. If the first massage effect is requested, then the first massage operation is performed at step 1184. Next, block 1182 is repeated. If the first massage effect is not requested at block 1182, then step 1186 is performed to determine if the second massage effect is requested. If the second massage effect is requested at block 1186, then the second massage operation is performed at step 1188.

In one or more embodiments, an assembly (e.g., 1132/1134) (e.g., including a pair of lumbar bladders 1150) is described. The assembly (e.g., 1132/1134) comprises a massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) operable to provide a massage effect (e.g., a pressurized massage effect or vibratory massage effect) to a seat assembly and a controller (e.g., 1140) in communication with the massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154). In various embodiments, the controller (e.g., 1140) is provided as one or more controllers or control modules for the various components and systems. The controller (e.g., 1140) and control system include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein. In various embodiments, the controller (e.g., 1140) is programmed to receive input indicative of an authorization such as an authorization code to operate the massage actuator (e.g., 1148) (e.g., a fluid bladder 1150 such as air bladder including but not limited to lumbar bladders, bolster bladders, and/or shoulder bladders, a valve assembly 1136/1152, and a pump 1138/1154), receive input indicative of a massage request (e.g., manual selection of a massage effect such as on an interface), and output a signal to operate the massage actuator (e.g., 1148) (e.g., a fluid bladder 1150 such as air bladder including but not limited to lumbar bladders, bolster bladders, and/or shoulder bladders, a valve assembly 1136/1152, and a pump 1138/1154) in response to the authorization (e.g., authorization code) and the massage request (e.g., manual selection of a massage effect such as on an interface).

In refinements, the massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) is operable to provide at least two massage effects (e.g., a pressurized tactile effect and a vibratory tactile effect) and the controller 1140 is programmed to receive input indicative of an authorization (e.g., authorization code) to operate a first massage effect (e.g., pressurized massage) of the massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154), receive input indicative of a request (e.g., manual selection on an interface) for the first massage effect (e.g., pressurized or vibratory massage), and output a first massage effect signal to operate the massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) to provide the first massage effect (e.g., pressurized or vibratory massage) in response to the first massage effect authorization (e.g., authorization code) and the first massage effect request (e.g., manual selection of interface).

In some embodiments, the controller (e.g., 1140) is programmed to receive input indicative of an authorization (e.g., authorization code) to operate a second massage effect of the massage actuator (e.g., 1148) (e.g., a fluid bladder 1150 such as air bladder including but not limited to lumbar bladders, bolster bladders, and/or shoulder bladders, a valve assembly 1136/1152, a pump 1138/1154), receive input indicative of a request (e.g., manual selection on an interface) for the second massage effect (e.g., pressurized or vibratory massage), and output a second massage effect signal to operate the massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) to provide the second massage effect (e.g., pressurized or vibratory massage) in response to the second massage effect authorization (e.g., authorization code) and the second massage effect request (e.g., manual selection on interface).

In some embodiments, the massage actuator (e.g., 1148) comprises at least one air bladder. In various embodiments, the massage actuator (e.g., 1148) comprises a valve assembly (e.g., 1136/1152) in fluid communication with a pump (e.g., 1138/1154) and the at least one air bladder assembly (e.g., 1150). In a refinement, the valve assembly (e.g., 1136/1152) is in electrical communication with the controller (e.g., 1140) to convey pressurized air from the pump (e.g., 1138/1154) to the at least one air bladder assembly (e.g., 1150) in response to the signal from the controller (e.g., 1140).

A seat assembly (e.g., 1120) is described, the seat assembly (e.g., 1120) comprising a seat bottom (e.g., 1122), a seat back (e.g., 1124) extending upright from the seat bottom (e.g., 1122), and an assembly (e.g., 1148/1162) as described herein comprising a massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) oriented in the seat bottom (e.g., 1122) or the seat back (e.g., 1124).

A system (e.g., 1120) comprising the assembly (e.g., 1148) described herein and an interface (e.g., 1142) in electrical communication with the controller (e.g., 1140) to output the input indicative of the massage request (e.g., manual selection of massage effect) to the controller (e.g., 1140).

In some embodiments, the system (e.g., 1120) comprises a second controller in communication with the controller to output the input indicative of the authorization.

A method comprising installing (i.e., step 1190) a massage actuator (e.g., 1148) (e.g., a fluid bladder 1150 such as air bladder including but not limited to lumbar bladders, bolster bladders, and/or shoulder bladders, a valve assembly 1136/1152, and/or a pump 1138/1154) in a seat assembly (e.g., 1120) to provide a massage effect (e.g., pressurized or vibratory massage) and deactivating (i.e., step 1196) the massage actuator 1148 to prevent operation of the massage actuator 1148 is also provided. In various embodiments, the method further comprises connecting (i.e., step 1192) the massage actuator (e.g., 1148) to a controller (e.g., 1140) that is programmed to control operation of the massage actuator (e.g., 1148), programming (i.e., step 1194) the controller (e.g., 1140) to deactivate operation of the massage actuator (e.g., 1148), retailing (i.e., step 1197) an activation code for activation of the massage actuator (e.g., 1148), inputting (i.e., step 1198) an activation code to activate the massage actuator (e.g., 1148 and/or such as by retailing a software application with an activation code to activate the massage actuator), inputting (i.e., step 1199), and/or inputting a massage request (e.g., manual selection of a massage effect) to the massage actuator 1148 to impart the massage effect (e.g., pressurized or vibratory massage) from the activated massage actuator 1148. In various embodiment, the massage actuator (e.g., 1148) is activated with a wireless device (e.g., 1144). In refinements, the method comprises activating the massage actuator (e.g., 1148) to perform a first massage effect with a first activation code. In some embodiments, the method may further comprise activating the massage actuator (e.g., 1148) to perform a second massage effect with a second activation code. In one or more embodiments, the method comprises installing at least one air bladder assembly (e.g., 1150) and at least one valve assembly (e.g., 1153) in the seat assembly (e.g., 1120).

A seat assembly (e.g., 1120) comprising a seat bottom (e.g., 1122), a seat back (e.g., 1134) extending upright from the seat bottom (e.g., 1122), a massage assembly, and a controller (e.g., 1140) in communication with the massage actuator is also provided. The massage assembly comprises a massage actuator (e.g., 1148) oriented in the seat bottom (e.g., 1122) or the seat back (e.g., 1124) that is operable to provide a massage effect (e.g., pressurized or vibratory massage). The controller (e.g., 1140) is programmed to receive input indicative of an authorization (e.g., authorization code) to operate the massage actuator, receive input indicative of a massage request (e.g., manual selection of massage effect), and output a signal to operate the massage actuator (e.g., 1148) in response to the authorization (e.g., authorization code) and the massage request (e.g., manual selection of massage effect). In various embodiments, the massage actuator (e.g., 1148) is operable to provide at least two massage effects (e.g., pressurized and vibratory massage effect). In some embodiments, the controller is programmed to receive input indicative of an authorization (e.g., authorization code) to operate a first massage effect (e.g., pressurized or vibratory massage) of the massage actuator (e.g., 1148), receive input indicative of a request (e.g., manual selection of a massage effect) for the first massage effect (e.g., pressurized or vibratory massage), output a first massage effect signal to operate the massage actuator (e.g., 1148) to provide the first massage effect (e.g., pressurized or vibratory massage) in response to the first massage effect authorization (e.g., authorization code) and the first massage effect request (e.g., manual selection of a massage effect), receive input indicative of an authorization (e.g., authorization code) to operate a second massage effect (e.g., pressurized or vibratory) of the massage actuator (e.g., 1148), receive input indicative of a request (e.g., manual selection of a massage effect) for the second massage effect (e.g., pressurized or vibratory massage effect), and output a second massage effect signal to operate the massage actuator (e.g., 1148) to provide the second massage effect (e.g., pressurized or vibratory massage effect) in response to the second massage effect authorization (e.g., authorization code) and the second massage effect request (e.g., manual selection of a massage effect).

Figure 32:
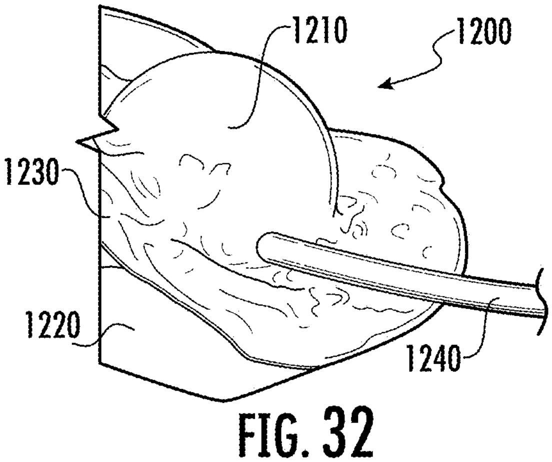
FIG. 32 is a side perspective view of a first embodiment of a massage bladder.
Figure 33:
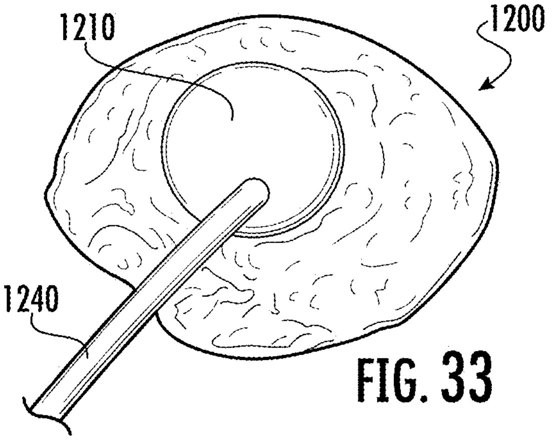
FIG. 33 is a top perspective view of the first embodiment of a massage bladder.

Referring to FIGS. 32-33 a massage bladder 1200 with a round portion 1210 is disclosed. In a refinement, the bladder 1200 includes a first sheet 1220 that cooperates with a second sheet 1230 to define a bladder chamber having a round shape that may be filled with a fluid. In a refinement, the first and second sheets 1220, 1230 may cooperate such as by an adhesive, heat staking, and/or ultrasonic welding, hot-plate welding, heat swaging, cold pressing, or the like. Heat-staking, for example, may form localized bonding between the two sheets 1220, 1230 that forms a seal. In a refinement, the sheets 1220, 1230 may be fixed by heat-staking along the perimeter of the round portion and/or the fluid passages forming a continuous heat-staked line. The seal allows the passages to be inflated when a fluid such as an airflow passes through above a threshold pressure.

In a variation, the chamber is a sphere, a hemisphere, spherical, cylindrical, or an ellipsoid. In one or more embodiments, the round/curved shape may be molded into the first and/or second sheets 1220, 1230 such that the first and/or second sheets 1220, 1230 are not flat under ambient conditions. For example, the first sheet 120 may be flat and the second sheet 1230 has half of a round shape (e.g., hemisphere) molded into it as shown in FIGS. 32-33 or vice versa. The bladder 1200 also includes a fluid passage 1240 for allowing fluid to enter and exit the chamber.

The sheets 1202, 1204 are made of a material that is generally impermeable to a fluid such as air. In a variation, the sheets are an organic polymeric material (i.e., plastic) such as polyethylene, polypropylene, polyvinyl chloride, polyurethane, acrylic, polycarbonate, or combinations thereof. The sheets may be thermoplastic or thermoset. For example, the sheets may be thermoplastic polyurethane. In a refinement, the shape and size of the sheets 1202, 1204 may be any suitable size for fitting in a seat such as a vehicle seat. In a variation, the shape and size may be suitable for providing a massaging effect to a human body such as a human back and/or neck. In another refinement, the shape and size of the first and second sheets are substantially similar or the same. In one or more embodiments, the plastic sheet has a thickness of less than 5 mm, or more preferably less than 1, or even more preferably less than 0.5 mm. In a variation, the thickness is 0.01 to 5 mm, or more preferably 0.1 to 1 mm, or even more preferably 0.2 to 0.5 mm.

In one or more embodiments, the round portion sharply protrudes from a plane X-X defined by the sheet, as shown in FIG. 33. In a variation, the round portion of a sheet defines a cavity that is at least 30% of a round shape, or more preferably at least 50%, or even more preferably at least 60%. For example, the round portion defines a chamber having a shape that is at least 30% of a sphere, or more preferably at least 50% of a sphere, or even more preferably at least 60% of a sphere. In a refinement, the chamber is have the shape of a hemisphere (i.e., 50% of a sphere).

Figure 36:
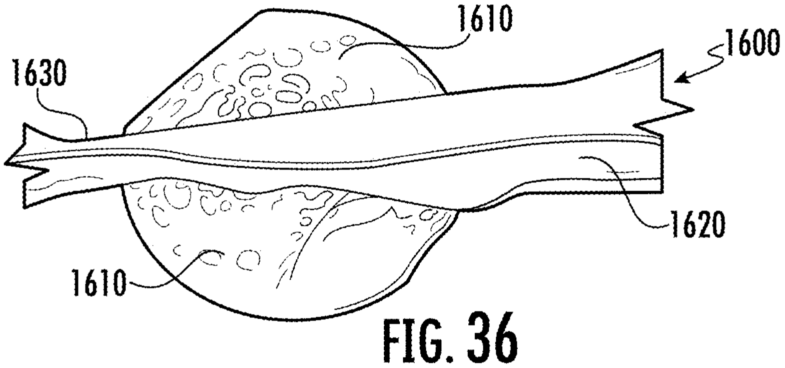
FIG. 36 is a side view of a second embodiment of a massage bladder.

In yet some embodiments, as shown in FIG. 36, the bladder 1600 includes a first sheet 1620 and second sheet 1630 and each have a round shape 1610 (e.g., a hemisphere) molded into them. In a variation, the round shapes molded therein are aligned such that the chamber they form is a different shape than the shape molded into either one. Aligning the molded portions of the sheets provides a chamber embodying at least 60% of a round shape, or more preferably at least 75% of the round shape or even more preferably at least 90% of a round shape. For example, the first sheet 1620 and second sheet 1630 each have a hemisphere molded into them that when aligned together define a sphere-shaped chamber. In a refinement, the hemisphere or sphere has a radius of 5 to 35 mm, or more preferably 10 to 30 mm, or even more preferably 15 to 25 mm. For example, the radius is 21.335 mm.

Figure 34:
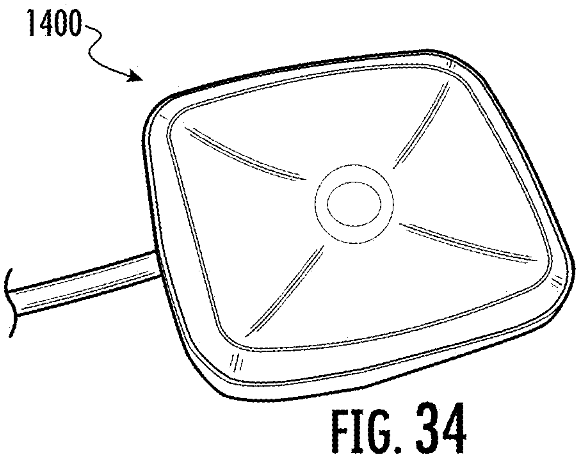
FIG. 34 is a top perspective view of a conventional massage bladder.
Figure 35:
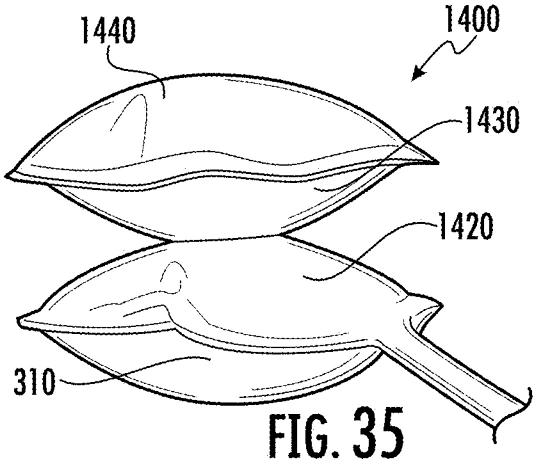
FIG. 35 is a side view of the conventional massage bladder.

Flatter structures, such as the conventional accordion or bellows shaped bladders are less efficient and more expensive. Often these bladders are formed by a plurality of flat (unmolded) sheets. For example, the conventional bladder 1400, as shown in FIGS. 34-35 requires at least four sheet cooperating to define a chamber—this requires additional material and processing. In other words, the bladder 1200 described herein has a greater volume to surface area ratio-so it uses less material. Further, flatter shapes have greater areas of contact such that the pressure felt or experienced by an occupant is less whereas round or more pointed shapes (i.e., shapes having shaper apexes) have a smaller contact area about the apex which exerts a greater pressure resulting in a greater shiatsu effect or massage as illustrated by FIGS. 37-42.

Figure 37:
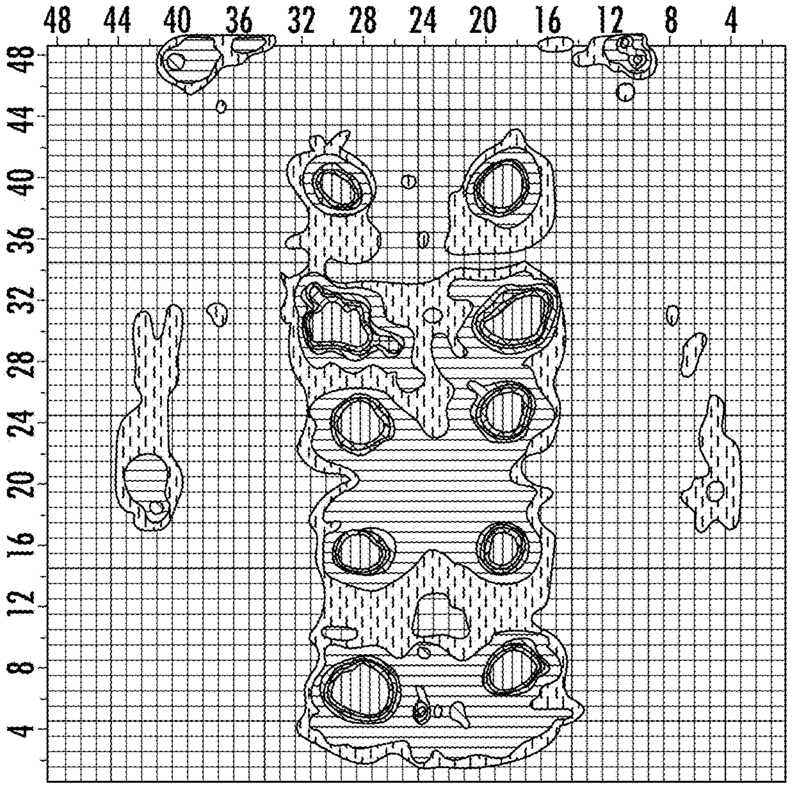
FIG. 37 is a body pressure distribution (PBD) chart for the first embodiment of a massage assembly for the fifth percentile of occupants.
Figure 38:
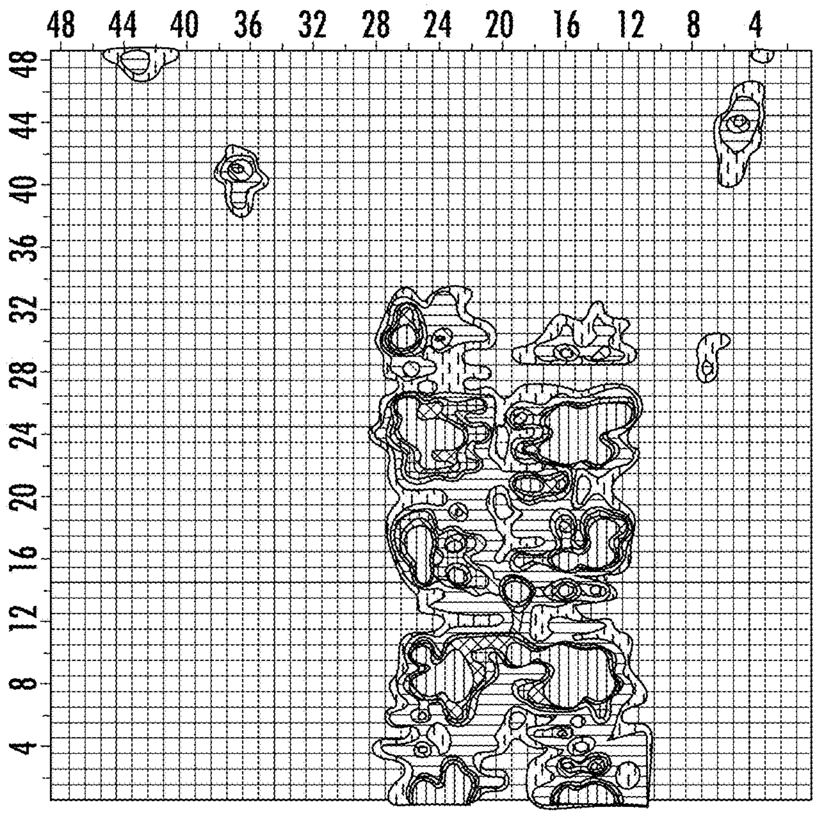
FIG. 38 is a PBD chart for the convention massage assembly for the fifth percentile of occupants.
Figure 39:
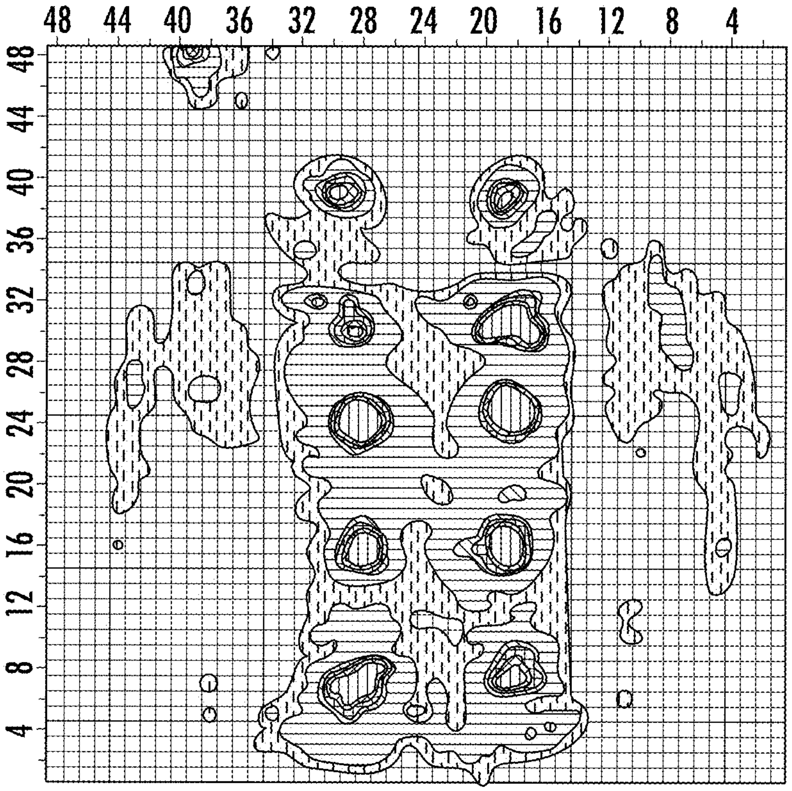
FIG. 39 is a PBD chart for the first embodiment of a massage assembly for the fiftieth percentile of occupants.
Figure 40:
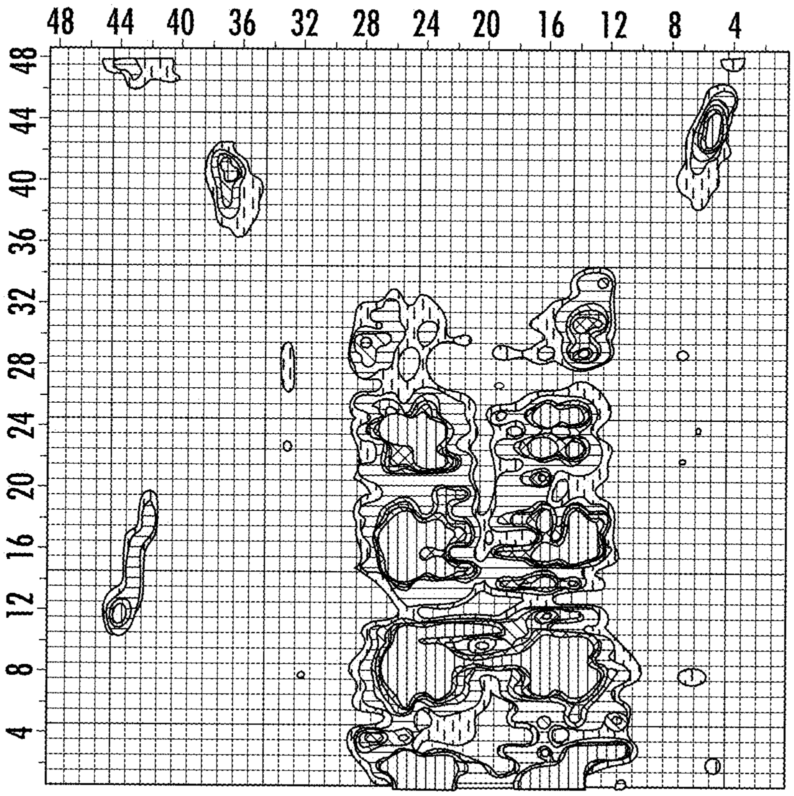
FIG. 40 is a PBD chart for the convention massage assembly for the fiftieth percentile of occupants.
Figure 41:
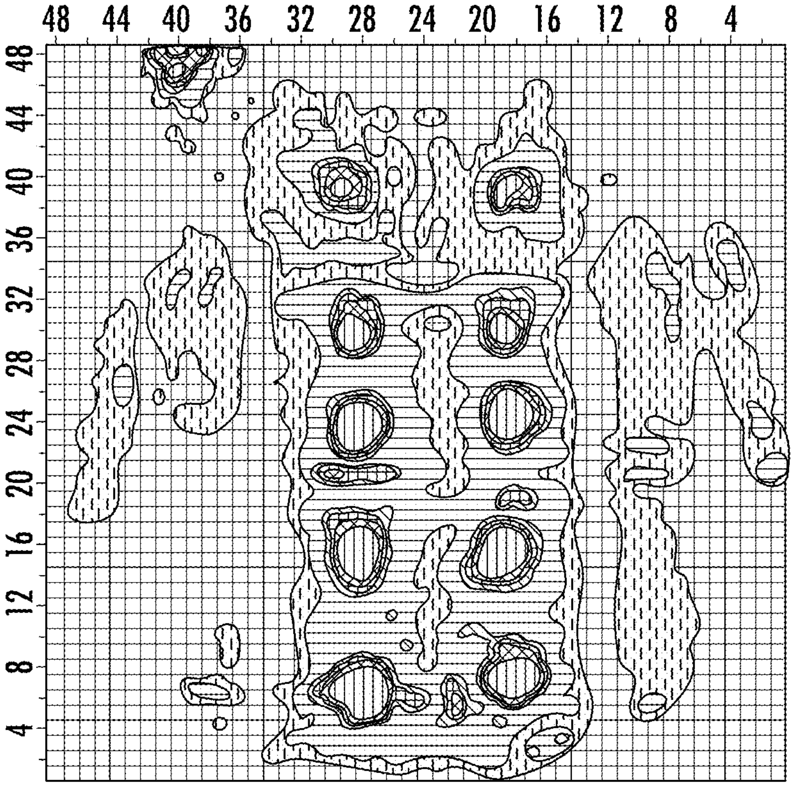
FIG. 41 is a PBD chart for the first embodiment of a massage assembly for the ninety-fifth percentile of occupants.
Figure 42:
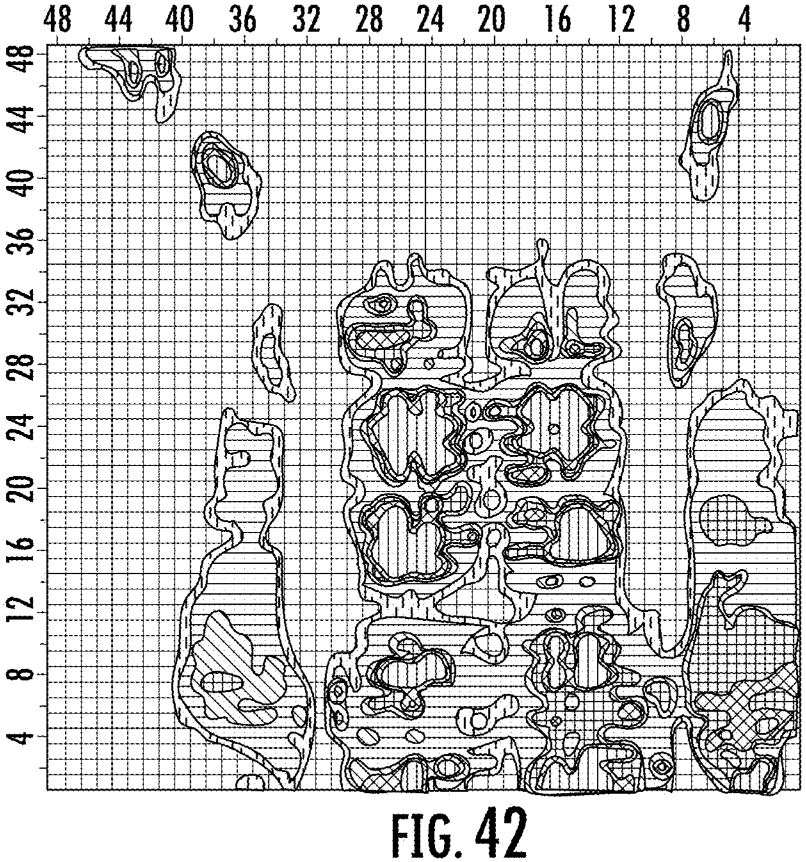
FIG. 42 is a PBD chart for the convention massage assembly for the ninety-fifth percentile of occupants.

FIGS. 37-42 illustrate a body pressure distribution when a maximum pressure is exerted. The charts are obtained by placing a pressure sensitive mat between occupants and a bladder assembly and measuring the pressure as the bladders are filled and released. A pool of occupants is tested to obtain pressure data such as the average maximum pressure exerted. The red areas illustrate the highest-pressure regions, and the blue areas illustrate the lowest-pressure regions. FIGS. 37, 39, and 41 illustrate the massage assembly with the bladders described herein such as those depicted in FIGS. 32-33 whereas the FIGS. 38, 40, and 42 illustrate a conventional massage assembly with the conventional accordion bladders such as those depicted in FIGS. 34-35. As shown, the conventional bladders are less focused and exert lower pressure on the occupant. FIGS. 37 and 38 depict average maximum pressures exerted on occupants in the 5th percentile, FIGS. 39 and 40 depict average maximum pressures exerted on occupants in the 50th percentile, and FIGS. 41 and 42 depict average maximum pressures exerted on occupants in the 95th percentile. In one or more embodiments, a bladder may apply a pressure of at least 1.8 PSI, or more preferable at least 2.0 PSI, or even more preferably at least 2.5 PSI to an occupant.

Table 1 (below) provides the average maximum pressure based on the body pressure distribution testing data.

TABLE 1

| | Disclosed Bladders (PSI) | Conventional Bladders (PSI) |
|---|---|---|
| 5th percentile | 2.567 | 1.4 |
| 50th percentile | 1.98 | 1.75 |
| 95th percentile | 2.675 | 1.78 |

The average maximum pressure exerted on occupants with massage assemblies having the bladders disclosed herein is significantly greater than with assemblies using conventional bladders. The more focused bladders described herein also provide a greater massaging effects with smaller chamber volumes that inflate and deflated faster. Similar results were obtained for the bladder depicted in FIG. 36.

Figure 43:
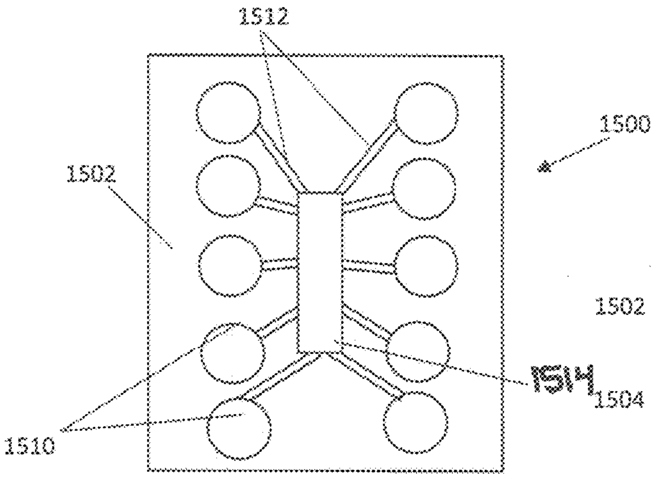
FIG. 43 is a schematic of a massage assembly according to some embodiments.
Figure 45:
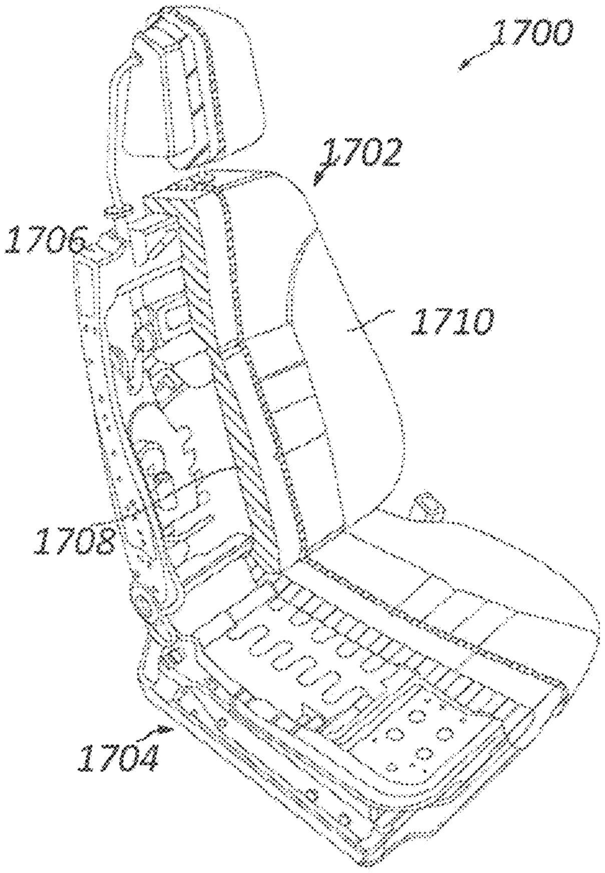
FIG. 45 is a perspective view of a seat assembly such as for a vehicle with a partial cross-section view of the outer layers.
Figure 46:
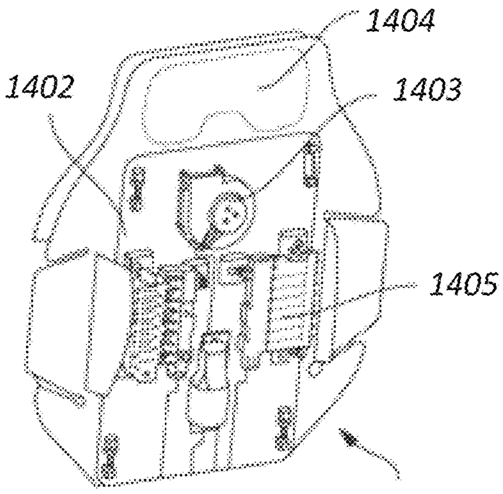
FIG. 46 is a perspective view of a carrier board with a massage assembly disposed thereon.

Referring to FIG. 43, a massage assembly 1500 such as for a seat 1700, shown in FIG. 45 is disclosed. In a refinement, the seat 1700 includes a seat back 1700 and/or a seat bottom 1704. The massage assembly 1500 is disposed in the seat back 1702 and/or the seat bottom 1704. In addition to the massage assembly 1500, the seat also includes a seat frame 1706 for supporting the assembly 1500 and a cushion 1708. In a refinement, seat 1700 also includes trim cover 1710 disposed over the cushion 1708. In a variation, the seat 600 is a seat for a vehicle such as an automobile, motorcycle, watercraft, aircraft, and/or locomotive.

Figure 44:
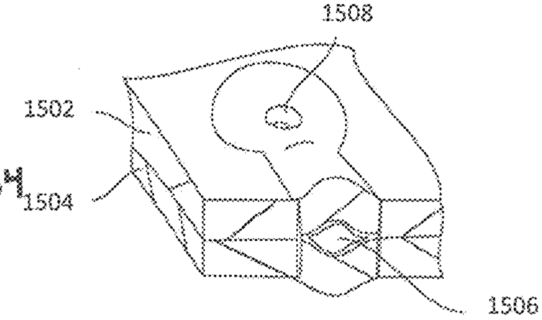
FIG. 44. is a perspective cross-sectional view of a portion of an inflatable passage defined by a first sheet and a second sheet.

The massage assembly 1500 includes a plurality of the bladders 1510 as described herein and a plurality of fluid passages 1512 with a first end terminating at the chambers of the plurality of bladders 1510. The second end of the passages 1512 may cooperate with a flow-inducing device such as a compressor or a pump such that they can receive a fluid from the compressor or pump. In a refinement, the second end of the passage 1512 may cooperate with a valve assembly 1514 for coordinating a massaging effect. In other words, a valve assembly may be disposed between the fluid passage and the flow-inducing device. In a variation, a first sheet 1502 and a second sheet cooperate to form the plurality of bladders and/or passages. For example, in FIG. 44 a first sheet 1502 and a second sheet 1504 cooperate to form passage 1506 and first sheet 1502 has a port 1508 that may be connected to a bladder. Alternatively, the first sheet may have a molded round shape instead of port 1508. In another variation, each bladder may be connected to the valve assembly which provides selective fluid communication between the flow-inducing device and the chambers via a tube forming the fluid passage 1512 as shown in FIGS.

32-33. In a variation, the plurality of bladders is 2 to 20 bladders, or more preferably 4 to 16, or even more preferably 6 to 12.

Figure 47:
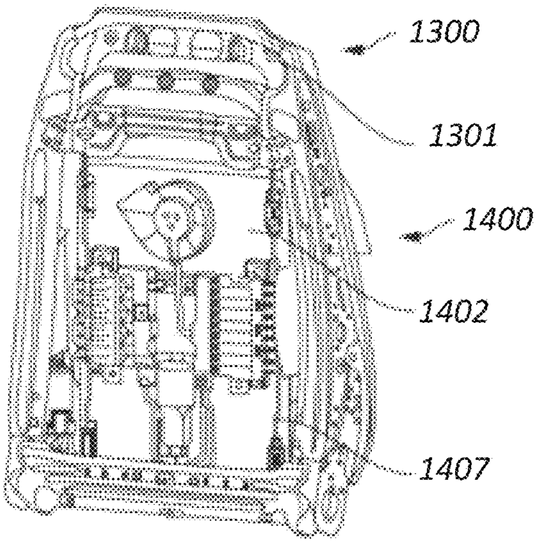
FIG. 47 is a perspective view of the carrier board assembled in a seat back and supported by a seat frame.
Figure 48:
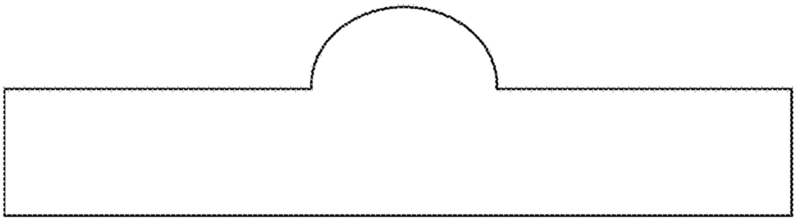
FIG. 48 is a cross-sectional view of a mold according to some embodiments.

In one or more embodiments, the massage assembly 1500 is disposed on a carrier board 1800 as shown in FIG. 47. The carrier board 1800 is supported by the frame 1706 such as the frame 1706 of the seat back 1702 as shown in FIG. 48. In a refinement, the carrier board 1800 is generally flat and rigid. For example, the carrier board 1800 is a rigid plastic such as polyethylene, polycarbonate, polyurethane, polyvinyl chloride, or a combination thereof. In a variation, the thickness of the carrier board 700 is at least 0.5 mm, or more preferably at least 2 mm, or even more preferably at least 2.5 mm. In a refinement, the carrier board 700 has thickness of 0.5 to 20 mm, or more preferably 1 to 10 mm, or even more preferably 2 to 3.5 mm. In one or more embodiments, the carrier board 1800 includes a plurality of fasteners/retainers for securing various other components such as the flow inducing devices, valve assemblies, inflatable subassemblies, electronics, or a combination thereof to the carrier board 1800. In a variation, the carrier board 1800 includes a suspensions system to secure it to the seat assembly 1300 such as to the frame.

In one or more embodiments the massage assembly 1500 may be arranged in the seat such that the round portion defines a contact area with an occupant when seated. It should be understood that direct contact is not required to define the contact area and one or more layers such as a trim cover, cushion, and/or foam layer may be disposed between the occupant and the bladder. In a refinement, the contact area may be about the apex of the round portion. In other words, the round portion may protrude into the occupant when inflated.

Figure 49:
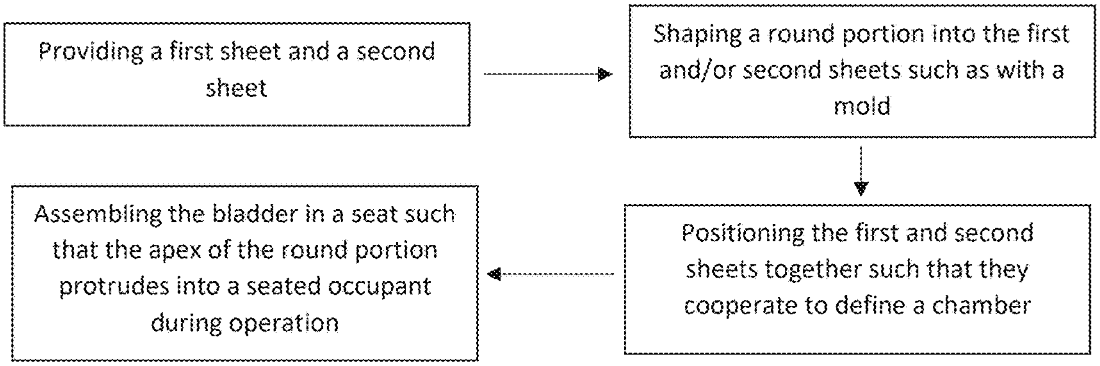
FIG. 49 is a flowchart for a method of making the bladders described herein.

A method 1900 of making a bladder having a round portion is also disclosed, as shown in FIG. 49. The method 1900 includes providing a first sheet and second sheet (i.e., step 1910), shaping a round portion into the first sheet and/or second sheet (i.e., step 1920), positioning the first and second sheets together such that they cooperate to define a chamber (i.e., step 1930), assembling the bladder in a seat such that the apex of the round portion may protrude into a seated occupant during operation (i.e., 1940). For example, FIG. 48 depicts an embodiment of a mold used to shape the first and/or second sheet. The mold has a round shape such that it is molded into the sheet applied to it. In a refinement, the mold and/or sheet is heated to soften the sheet and assist molding. For example, the sheet is heated to at least 500° F., or more preferably at least 650° F., or even more preferably at least 750° F. In a variation, the round portions of the first and second sheets are aligned to define the chamber. In a yet another refinement, the first and second sheets are adhered together with an adhesive, heat staked, and/or ultrasonically welded or otherwise cooperate around the round portion to create a seal. In some embodiments, the sheets are adhered together with an adhesive, heat staked, and/or ultrasonically welded to define a fluid passage to the chamber. In other embodiments, a tube may be sealed to the bladder such that a fluid may enter and exit the chamber of the bladder via the tube.

A bladder (e.g., 1200/1600 such as a fluid bladder (e.g., pneumatic bladder)) is provided. The bladder (e.g., 1200/1600) comprises a first sheet (e.g., 1220/1620) and a second sheet (e.g., 1230/1630) cooperating together (e.g., the sheets 1220/1620, 1230/1630 are heat-staked together, fused together, bonded together, weld together, thermally welded together, ultrasonically welded together, hot-plate welded together, heat swagged, cold pressed, adhered together by an adhesive, laser welded together, glued together, high frequency welded together, sewn together, chemically welded together) to define a round chamber. In some embodiments, the bladder (e.g., 1200/1600) also comprises a fluid passage (e.g., 1240) having a terminating end at the chamber such that fluid (e.g., water or air) is transported through the fluid passage (e.g., 1240) to the chamber. The first and/or second sheet (e.g., 1220/1620, 1230/1630) has a round portion (e.g., 1210/1610) molded therein. In refinements, the sheets (e.g., 1220/1620, 1230/1630) are formed of an elastic material. In one or more embodiments, the polymeric material is thermoplastic. For example, the sheets (e.g., 1220/1620, 1230/1630) are fabric, plastic, polyethylene, polypropylene, polyvinyl, polyvinyl chloride, polyurethane, acrylic, polycarbonate, felt, and/or Tyvek®. In one or more embodiments, the round portion (e.g., 1210/1610) and round chamber are spherical (e.g., hemispherical). For example, the chamber may be a sphere or a hemisphere. In variations, the round portion (e.g., 1210/1610) is a hemisphere. In various embodiments, the round chamber is a sphere.

A seat assembly comprising a frame supporting a massaging assembly comprising the bladder (e.g., 1200/1600) is also provided. For example, a subassembly for massaging an occupant may be supported by the frame.

The subassembly comprises a plurality of bladders and a fluid actuator such as a pump (e.g., compressor). Each bladder (e.g., 1200/1600) includes a fluid passage (e.g., 1240) to a round chamber defined by a first sheet (e.g., 1220/1620) cooperating with a second sheet (e.g., 1230/1630) (e.g., the sheets 1220/1620, 1230/1630 are heat-staked together, fused together, bonded together, weld together, thermally welded together, ultrasonically welded together, hot-plate welded together, heat swagged, cold pressed, adhered together by an adhesive, laser welded together, glued together, high frequency welded together, sewn together, chemically welded together). In various embodiments, the first and/or second sheets (e.g., 1220/1620, 1230/1630) individual define a molded round portion (e.g., 1210/1610). The fluid actuator moves the fluid through one or more of the fluid passages (e.g., 1240) to one or more of the chambers. In refinements, the round portion (e.g., 1210/1610) of each bladder (e.g., 1200/1600) includes a hemisphere. In variations, the round chamber is spherical.

In various embodiments, at least one round portion (e.g., 1210/1610) is configured to protrude into a seat occupant. In one or more embodiments, a contact area with the occupant is defined about an apex of the at least one round portion (e.g., 1210/1610) such that the bladder (e.g., 1200/1600) applies a pressure of at least 2 PSI to the occupant and/or at least 2.5 PSI to the occupant.

Figure 50:
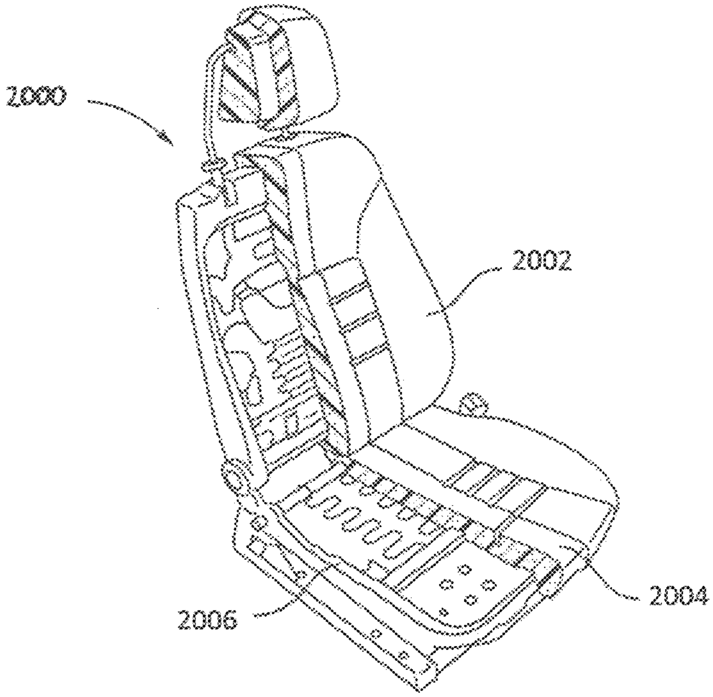
FIG. 50 is a partial cross-sectional side perspective view of a seat assembly.
Figure 51:
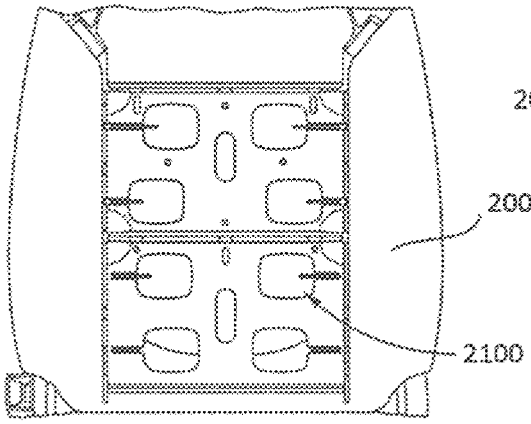
FIG. 51 is a front view of a conventional fluid system for a seat assembly.

Referring to FIG. 50, a seat assembly 2000 such as for a vehicle is provided. For example, the seat assembly 2000 is used for a motorcycle, automobile, watercraft, aircraft, or train. In one or more embodiments, the seat assembly includes a trim cover 2002 disposed over a cushion assembly 2004, and a seat frame 2006. As shown in FIGS. 51-53 and 5, the seat assembly 2000 also includes a fluid system 2100 such as for massaging and/or adjusting the seat.

In various embodiments, the fluid system 2100 is disposed in, on, and/or adjacent to the cushion assembly 2004. In a variation, the cushion assembly 2004 includes a plurality of cushions. For example, the cushion assembly 2004 includes a seat bottom and seat back each having a center or middle cushion which may be sandwiched between bolster cushions. In a refinement, the fluid system 2100 is disposed in, on, and/or adjacent to one or more of the cushions. For example, as shown in FIGS. 51-55 the fluid system 2100 is disposed in the seat back of the cushion assembly 2004. In a refinement, the cushions of the cushion assembly 2004 are foam and/or a plurality of polymeric strands.

Figure 53:
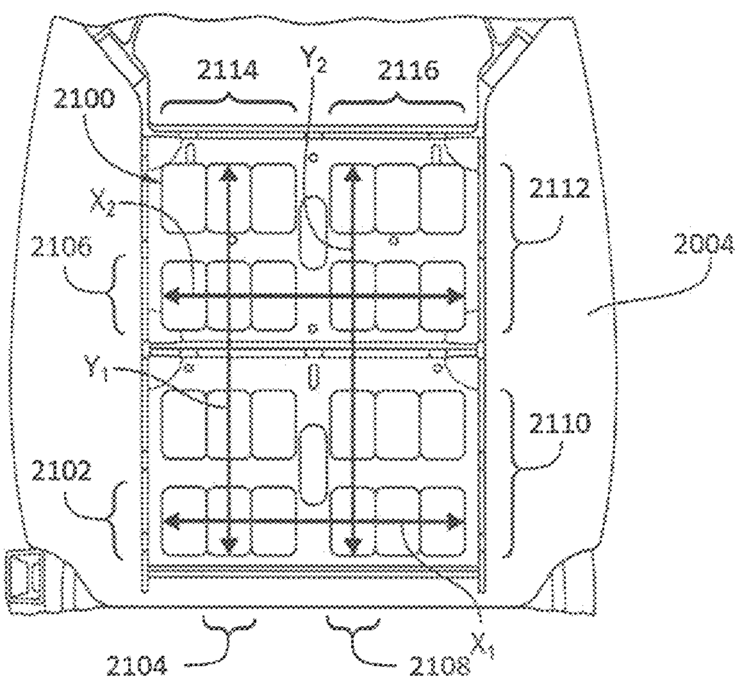
FIG. 53 is a front view of a second embodiment of a fluid system for a seat assembly.
Figure 54:
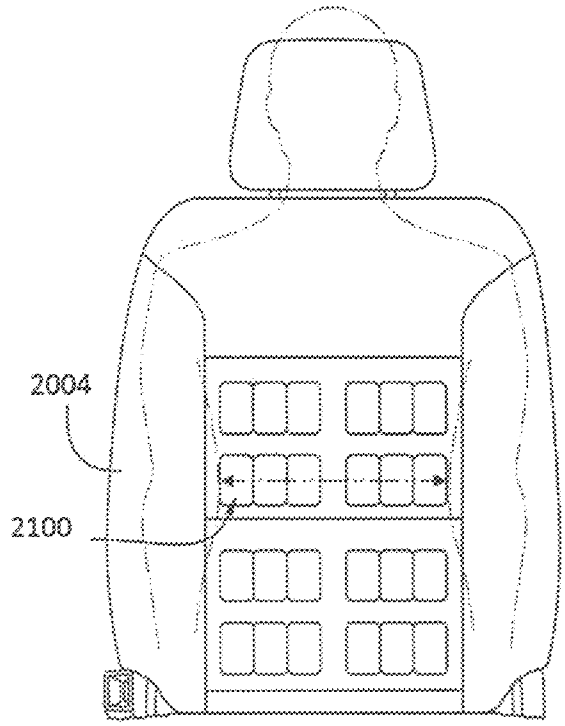
FIG. 54 is a front view of a larger occupant seated in a seat assembly with the second embodiment of the fluid system.
Figure 55:
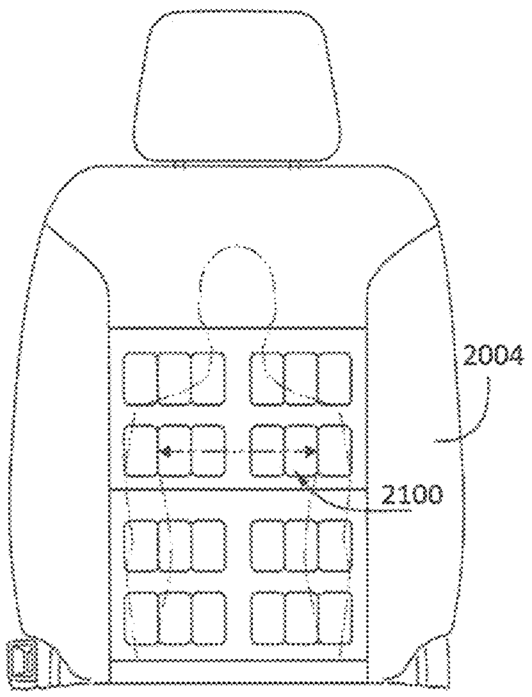
FIG. 55 is a front view of a smaller occupant seated in the seat assembly with the second embodiment of the fluid system.

In one or more embodiments, the fluid system 2100 includes a fluid displacing device such as a pump, blower, compressor and/or fan. During operation the fluid displacing device moves the fluid or causes a fluid flow. In a variation, the fluid system 2100 includes a first plurality of fluid bladders 2102 arranged along a first direction and/or dimension and a second plurality of fluid bladders 2104 arranged along a second direction and/or dimension such as, for example, $X_1$ and $Y_1$ respectively, as shown in FIG. 53. For example, the first direction and/or dimension is defined by a transverse axis and the second direction and/or dimension is defined by a longitudinal axis. In a refinement, the $X_1$ and $Y_1$ are different, not parallel, intersecting, and/or substantially orthogonal or perpendicular (e.g., defining an angle that is 15 to 165 degrees, or more preferably 45 to 135 degrees, or even more preferably 60 to 120 degrees, or still even more preferably 90 degrees). When the first and second plurality of bladders are arranged in this manner it employs a greater range and capacity for different size individuals, support, massage procedures, and/or configurations. In various embodiments, the bladders or each plurality of bladders includes 4 to 20 bladders, or more preferably 6 to 16 bladders, or even more preferably 8 to 12 bladders.

In yet some embodiments, a third plurality of bladders 2106 and a fourth plurality of bladders 2108 are arranged along a third direction and/or dimension (e.g., $X_2$) and a fourth direction and/or dimension (e.g., $Y_2$). In a refinement, $X_2$ is parallel or substantially parallel to $X_1$. (e.g., within 20% of parallel, or more preferably within 10% of parallel, or even more preferably within 5% of parallel). A greater number of bladders provides for greater customization to the size, shape, and comfort of different occupants. In another variation, the bladders are arranged in at least a 4×4 grid pattern, or more preferably at least a 4×6 grid pattern, or even more preferably at least 6×6 grid pattern corresponding to numerous groups of bladders along different dimensions, directions, and/or axes. In a refinement, the fluid system 2100 includes at least 16 bladders, or more preferably at least 20 bladders, or even more preferably at least 24 bladders.

Figure 52:
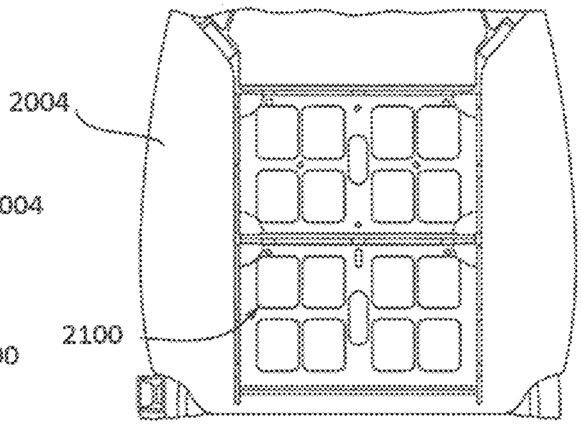
FIG. 52 is a front view of a first embodiment of a fluid system for a seat assembly.

In some embodiments, a plurality of bladders such as the first/second/third/fourth plurality of bladders 2102/2104/2106/2108 is disposed within a specific region of the cushion assembly and may correspond to a region of an occupant (e.g., back, lower back, upper back, mid-back, bottom, thighs, left side, right side, center section, etc.). For example, the first plurality of bladders 2102 (or third plurality of bladders 2106) is disposed at a lower region 2110 (or upper region 2112) of, for example, the seat back corresponding to the lower (or upper) back of an occupant. In yet another example, the second plurality of bladders 2104 (or fourth plurality of bladders 2108) is disposed on a first side or half 2114 (or second side or half 2116) of the seat assembly 2000. It should be understood, as shown in FIGS. 52-53, that multiple groups or pluralities of bladders may be disposed in the same region (e.g., lower back, upper back, left side, right side).

In one or more embodiments, the dimension upon which the plurality of bladders is disposed corresponds to an occupant dimension such as the width and/or height of the occupant (e.g., lower back dimension, shoulders dimension, neck dimension, thighs dimension, etc.). In a refinement, the dimension is greater than the 10th percentile of an occupant dimensions, or more preferably greater than the average dimension of occupants, or even more preferably is a dimension in the 75th percentile or greater of occupants, still more preferably is a dimension in the 85th percentile or greater of occupants, or yet more preferably is a dimension in the 90th percentile or greater of occupants.

For example, the dimension corresponds to a shoulder width such that the plurality of bladders extend along a dimension that corresponds to a shoulder width greater than the 10th percentile of occupants, or more preferably greater than the average shoulder width of occupants, or even more preferably a shoulder width in the 75th percentile of occupants or greater, or still more preferably a shoulder width in the 85th percentile of occupants or greater, or yet more preferably a shoulder width in the 90th percentile of occupants or greater.

In yet another variation, different groups of bladders in a plurality of bladders are arranged to accommodate various populations of occupants. For example, a first group of bladders (e.g., inner most columns of bladders including 2108) corresponds to a population of occupants having a smaller dimension (e.g., shoulder width) than average, a second group of bladders (e.g., the inner most columns and second inner most columns of bladders including 2108 and 2104) corresponds to a second population of occupants having about an average dimension (e.g., shoulder width), and a third group of bladders (e.g., all columns of bladders) corresponds to a third population of occupants having a larger dimension (e.g., shoulder width) than average.

In one or more embodiments, the first plurality of bladders is arranged along a dimension, direction, or axis corresponding to the width, height, or length of the seat bottom or seat back and the second plurality of bladders is arranged along a different dimension, direction, or axis corresponding to the width, height, or length of the seat bottom or seat back.

Figure 56:
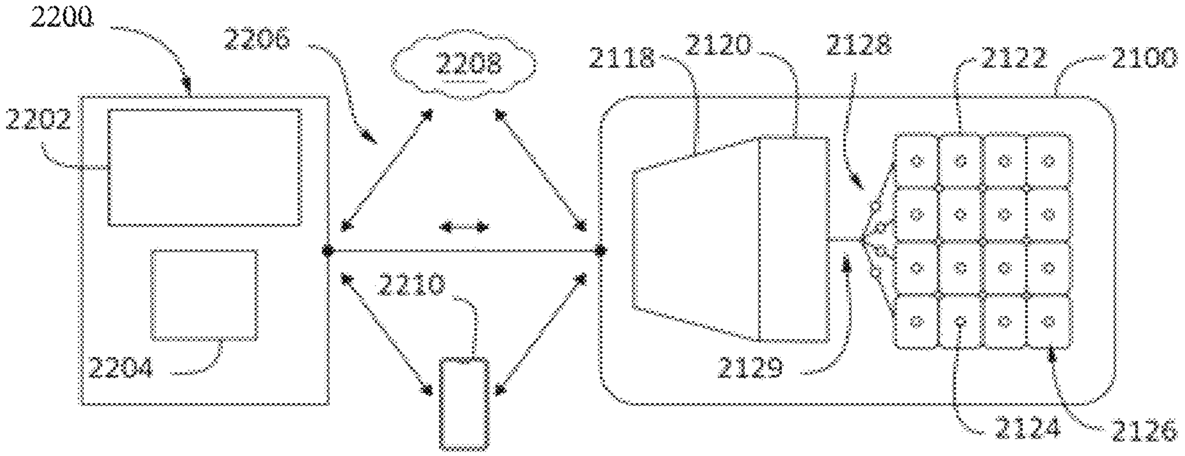
FIG. 56 is a schematic of a seat assembly including a controller and a fluid system.
Figure 58:
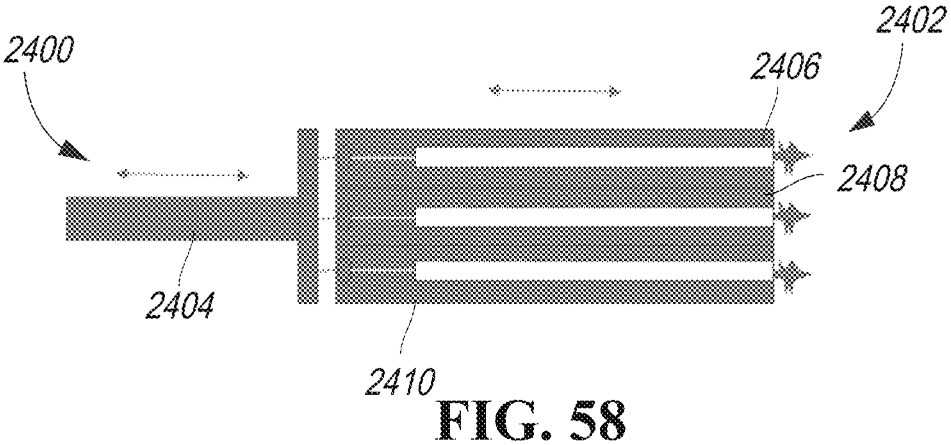
FIG. 58 is a schematic of a valve actuator.

In still other embodiments, the seat assembly 2000 include a controller 2200 in cooperating and in communication with the fluid system 2100, as shown in FIG. 56. In a variation, the controller 2200 includes memory 2202 and a processor 2204. For example, the memory 2202 stores computer executable code or instructions that are executed by the processor 2204 to carry out the various functions described herein. In a refinement, the controller 2200 cooperates with and is in communication with the fluid displacing device 2118 and/or a valve assembly 2120 such that fluid (e.g., air or water) displaced by the fluid displacing device 2118 (e.g., compressor or pump) through the valve assembly 2120 to fill/inflate or release/deflate one or more of the bladders 2122. In one or more embodiments, an actuator such as a valve actuator 2400, as shown in FIG. 58, cooperates with a plurality of valves 2402 that open and close together. For example, the actuator head 2404 opens and closes a first valve 2406, a second valve 2408, and a third valve 2410. In various embodiments, the valve actuator 2400 is used, for example, with the fluid system of FIG. 53, such that the first valve 2406 services a large dimension (e.g., outer), the second valve 2408 services a mid-dimension, and the third valve 2410 services a small dimension (e.g., inner). Using valve actuators of this kind reduces cost while still providing efficient customization to occupants.

In a variation, the system 2100 also includes one or more sensors 2124 such as pressure sensors to detect a pressure associated with one or more of the bladders 2122. In a refinement, the pressure is measured directly by a pressure sensor. In other embodiments, a proxy variable is used to detect the pressure. Sensors may additionally or alternatively be located in or proximate each bladder to detect a pressure associated with of that bladder. For example, a sensor is located in a position configured to detect a pressure associated with a group or a plurality of bladders. For instance, a sensor is located in a passage (e.g., supply and/or exhaust passages) associated with the first plurality of bladders and each corresponding plurality of bladders. In a refinement, the various plurality or groups of bladders may be filled/inflated, and the fluid is released through an exhaust passage such that a sensor in the exhaust passage determines a pressure associated with the plurality or group of bladders. In short, sensors are arranged in and/or proximate the bladders to determine pressures associated with respective bladders or groups of bladders. For example, an air pressure sensor such as a board mounted air pressure is used. In yet another example, the sensors measure stretch or pressure of the sheet. In still another example, a thin film and/or push-button type sensor is used. In some embodiments, a combination of sensors is used.

In one or more embodiments, the controller 2200 cooperates with and is in communication with the one or more sensors 2124. In a refinement, the controller 2200 performs a scan to determine the size and/or dimensions of an occupant. In a variation, the scan is performed by filling/inflating one or more bladders, emptying/deflating the one or more bladders and detecting a (first) pressure associated with the one or more bladders. In various embodiments, the (first) pressure is indicative of the occupant's size or dimension. For example, if the occupant's dimension exceeds a threshold pressure it indicates the occupant is adjacent the one or more bladders.

In another or the same embodiment, if the (first) pressure is greater than a (second) pressure associated with one or more other bladders it indicates the occupant is adjacent the one or more bladders. For example, if a first pressure associated with an inner group of bladder is 2.00 PSI while an occupant is seated, any pressure that is less than a threshold amount relative to the inner group of bladders may indicate an occupant is not adjacent that group of bladders. In other words, a drop in pressure of at least 10%, or more preferably at least 25%, or even more preferably at least 50% indicates the occupant is not adjacent the group of bladders. For instance, a second pressure associated with an exterior group of bladders having a pressure of greater than 1.0 PSI, or more preferably greater than 1.5 PSI, or even more preferably greater than 1.8 PSI may indicate the occupant is adjacent the exterior group of bladders, i.e., the occupant's dimension extends to at least the exterior group of bladders. However, if the second pressure associated with the exterior group of bladders is 1.8 PSI or less, or more preferably 1.5 PSI or less, or even more preferably 1.0 PSI or less the occupant is not adjacent the exterior group of bladders, i.e., the occupant's dimension does not extend to the exterior group of occupants. In one or more embodiments, a pressure associated with each group, or every bladder is detected to determine the occupant's size or dimension. In some embodiments, the scan works inward by determining pressures associated with outer groups or bladders first. The scan progresses inward until an occupant's size or dimension is determined. In a refinement, the scan determines a pressure associated with a particular bladder or group such as the inner most group before working inward to establish a threshold pressure or reference pressure.

In the example above, the first (inner) group and second (outer) group are described for exemplary purposes. However, it should be understood that numerous groups are included in a scan and different groups may overlap or share bladders. For example, the inner and outer groups may refer to inner and outer columns along the back, but the scan may also include lower and upper groups of the back that include portions of the inner and outer groups to determine dimensions across an occupant's back in two different directions (e.g., width and height).

In various embodiments, the scan determines numerous dimensions of an occupant. For example, in at least one embodiment, the scan determines a first dimension of an occupant such as corresponding to a shoulder width of the occupant and a second dimension such as corresponding to a lower back width of the occupant. Additionally, or alternatively, the scan determines a height dimension of the occupant's back.

In one or more embodiments, the controller 2200 cooperates with and is in communication with the bladders 2122, sensors 2124, fluid displacing device 2118, valve assembly 2120, and/or a control unit 2210 such as a mobile phone over a wired and/or wireless network 2206. For example, the network 2206 includes the internet 2208. In various embodiments, different networks such as a wired and wireless network are used to communicate with different components. In a refinement, the control unit 2210 is used to control the subassembly such as the massaging system 2100. For example, an occupant can initiate a scan from the control unit 2210, turn on or off a massaging unit, select specific conditions such as desire support and/or massaging procedures. Additionally, or alternatively, scanning is initiated automatically once an occupant is seated and the vehicle is in operation.

In various embodiments, after determining or acquiring one or more (e.g., one, two, three, four, five, etc.) occupant dimensions, the controller 2200 uses the occupant dimension(s) to perform custom task such as providing support and/or massaging protocols. For example, the system 2100 employs a massage using all 24 bladders given the occupants size in FIG. 54 but may only use 16 bladders to massage the occupant of FIG. 55. In other words, the controller 2200 employs a massage that does not use the exterior columns of bladders given the occupants dimensions do not extend beyond those bladders. In a refinement, this selectivity provides a more comfortable and custom massage. Energy is also not wasted on bladders that are not in contact with the occupant.

In yet some embodiments, the scan detects "hot spots" or one or more points where an unusual or high amount of pressure is applied by an occupant. In various embodiments, the support or massage employed thereafter by the controller 2200 is targeted or directed to the one or more points. For example, additional support is provided in other regions to alleviate the pressure in the hot spots. In one or more embodiments, the bladders are used to provide support as well as massaging effects. In such embodiments, the amount of support, i.e., pressure of the bladders corresponds to the amount of pressure exerted upon the bladders or groups of bladders by the occupant as determined by the scan.

In one or more embodiments, the controller 2200 cooperates with and is in communication with fluid passages 2128, 2129, the fluid displacing device 2118, the valve assembly 2120 and one or more bladders 2122 such that the bladders can be filled/inflated individually or simulated such that one or more scans can be performed as well as different massaging functions. For example, the scan includes filing various columns and rows of bladders to determine an occupant dimension but after determining an occupant's dimension individual bladders may be filled to provide a massage effect such as a shiatsu effect within the dimensions.

Various massaging effects are known including shiatsu, Swedish, deep tissue, trigger point and others as well as various techniques for simulating such massages. For example, a shiatsu massage effect is provided by filling/inflating a bladder to a pressure such that it pushes into the occupant and then relieving the bladder to mitigate the pressure. This may be repeated numerous times and at different locations to simulate pressure from hands and/or fingers being applied to the occupant. Regardless, a massaging effect refers to applying and alleviating pressure by filling/inflating and releasing/deflating one or more bladders. As described above, the massaging effect is based on the occupant's dimensions. For example, bladders outside or extending beyond the occupant's dimension(s) are excluded from massages or support procedures. In other words, pressure changes within the bladders are within the bounds of the occupant's dimensions.

In various embodiments, the seat frame 2006 is any suitable material to support the subassemblies and an occupant. In a variation, the seat frame 2006 includes a rigid material such as metal, plastic, wood, or a combination thereof. For example, a steel and/or aluminum seat frame 2006 is used. The cushion assembly 2004 includes one or more cushions. In various embodiments, the trim cover 2002 is configured to be adjacent a seated occupant, i.e., the trim cover 2002 includes the outermost layer defining an outermost surface. In a variation, the trim cover 2002 is disposed over one or more subassemblies, as shown in FIGS. 51-55. In a refinement, the trim cover 2002 includes a fabric, woven fabric, faux leather, or leather surface. For example, trim cover 2002 includes cotton, polyester, polyurethane, nylon, or any other suitable material.

As stated above, the system includes computer executable code or instructions which, in various embodiments, is stored on a non-transitory computer readable medium on local device or in the cloud via the network 2206. A non-transitory computer readable medium having computer readable instructions configured to be executed by a processor provides for carrying out various functions for operation of the systems and seat assembly 2000 such as actuating the fluid-displacing device and determining a pressure associated with one or more bladders via the sensors. A sensor may be used to measure the pressure directly or a proxy parameter for determining the pressure may be used. For example, a force (upon on known area) may be measured to determine the pressure.

In one or more embodiments, the processor includes one or more devices selected from high-performance computing systems including high-performance cores, microprocessors, micro-controllers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory. In variations, the memory includes a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. In a refinement, the non-volatile memory/storage includes one or more persistent data storage devices such as a hard drive, optical drive, tape drive, non-volatile solid state device, cloud storage or any other device capable of persistently storing information.

In one or more embodiment, the executable code/instructions may reside in a software module. In a refinement, the software module includes operating systems and applications. In various embodiments, the software module is compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL. Non-volatile storage may also include data supporting the functions, features, calculations, and processes.

In some embodiments, the systems described above include computer readable storage media, which is inherently non-transitory, and in various refinements includes volatile or non-volatile, and removable and non-removeable tangible media implemented in any method or technology for storage of information, such as computer-readable instructions, data structures, program modules, or other data. In a variation, computer readable storage media further includes RAM, ROM, erasable programable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. In various embodiments, the computer readable program instructions may be downloaded to a computer, another type of programmable data processing apparatus, or another device form of a computer readable storage medium or to an external computer or external storage device via a network.

In one or more embodiments, the computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

Figure 57:
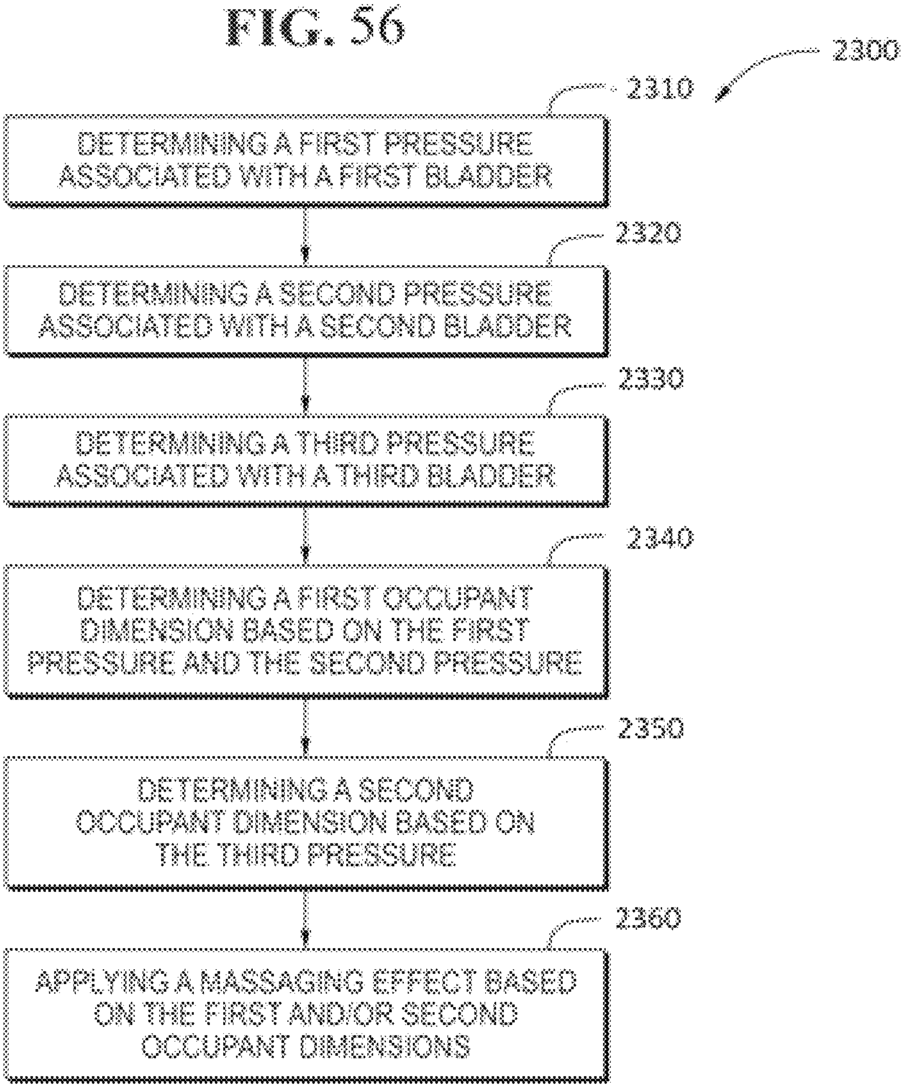
FIG. 57 is a flowchart of method of applying a massage.

Referring to FIG. 57 a method 2300 of scanning and/or applying a massage is also disclosed. In one or more embodiments, the method 2300 includes determining a first pressure 410 and a second pressure 420 respectively associated a first bladder and a second bladder, and determining a first occupant dimension based on the first and/or second pressures 440. For example, a sensor detects or measures the pressure associated with the bladders. The first and second pressures are compared to each other or to a threshold pressure to determine the first occupant dimension. In a refinement, the method 2300 includes determining a third pressure associated with a third bladder 430. In various embodiments, the method 2300 includes determining a second occupant dimension based on the third pressure 450. In a variation, the third pressure is compared the first and/or second pressures or a threshold pressure to determine the second occupant dimension. The method also includes applying a massage or massaging effect based on the first and/or second occupant dimensions. For example, the massage or massaging effect utilizes bladders that extend within the occupant dimension(s) but not bladders extending beyond or outside the occupant dimension(s).

A seat massage assembly (e.g., 2000 as in a vehicle seat such as for a motorcycle, automobile, watercraft, aircraft, or train) comprising a first plurality of bladders (e.g., 2102 such as fluid bladders (e.g., pneumatic bladders) arranged along a first direction $X_1$ such as a horizontal direction (e.g., along the width of a seat back) or vertical direction (e.g., along a height of a seat back)) and a controller 2200 cooperating with the first plurality of bladders (e.g., 2102) is provided. For example, the first plurality of bladders (e.g., 2102) is the top row of bladders, middle row of bladders 2106, bottom row of bladders 2102, left column of bladder 2104, middle column of bladders 2108, or right column of bladders. In some embodiments, the first plurality of bladders (e.g., 2114) is the outer or inner rows or columns of bladders. In various embodiments, the controller (e.g., 2200) is configured to scan an occupant by filling one or more bladders (e.g., 2122 (e.g., each bladder individually or outside bladders and inside bladders, etc.) with a fluid (e.g., air or water) and determine an associated pressure (e.g., such as the pressure applied by an occupant on the one or more bladders 2122 or the pressure of a fluid flow (e.g., airflow) released from the one or more bladders 2122). The controller 2200 may be provided as one or more controllers or control modules for the various components and systems. The controller 2200 and control system may include any number of controllers, and may be integrated into a single controller, or have various modules. Some or all the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein. In variations, the scan determines an occupant size such as by determining an occupant dimension (e.g., shoulder width, waist width, shoulder height, back length, neck height, neck length, head height, thigh width, thigh length, etc.). In refinements, the scan is configured to determine a first dimension of an occupant (see FIGS. 54-55) and, optionally, a second dimension of an occupant. In one or more embodiments, the controller 2200 is configured to control the first plurality of bladders (e.g., 2114) to massage an occupant according to a first dimension (e.g., such as a shoulder width, waist width, back length, should height, neck length, neck height, head height, thigh width, or thigh length). In some embodiments, the scan includes filling each bladder (e.g., 2122) and determining a corresponding pressure (e.g., such as the pressure applied by an occupant on the one or more bladders 2122 or the pressure of a fluid flow (e.g., airflow) released from the one or more bladders 2122). In one or more embodiments, the scan comprises filling a first group of bladders (e.g., the outside bladders, middle bladders, inner bladders, left bladders, right bladders, top bladders, bottom bladders such as 2104) of the first plurality of bladders (e.g., 2114) and determining a first pressure corresponding to the first group of bladders (e.g., 2104) and filling a second group of bladders (e.g., the outside bladders, middle bladders, inner bladders, left bladders, right bladders, top bladders, bottom bladders) from the first plurality of bladders that is different than the first group of bladders (e.g., 2104) and determining a second pressure corresponding to the second group (e.g., the pressure applied by an occupant on the one or more bladders 2122 or the pressure of an fluid flow released from the one or more bladders 2122). In variations, the assembly (e.g., 2000) also comprises one or more sensors (e.g., 2124) corresponding to each bladder (e.g., 2122) of the first plurality of bladders (e.g., 2114) and/or one or more sensors (e.g., 2124) corresponding to different groups of bladders such as one or more sensors being disposed in an exhaust pathway (e.g., 2128) of the first plurality of bladders to determine a pressure of the fluid (e.g., air) released from the first plurality of bladders 2114. A seat assembly (e.g., 2000 such as for a vehicle) comprising a frame (e.g., 2006) (e.g., rigid material such as metal, plastic, and/or wood) support the assembly (e.g., 2000) is also disclosed.

An assembly (e.g., a seat massaging assembly 2000, such as in vehicle seat) comprising a first bladders (e.g., 2106) arranged along a first axis (e.g., $X_1$) (e.g., horizontal axis, vertical axis, inner axis, outer axis, diagonal axis) and a second plurality of bladders (e.g., 2102) arranged along a second axis (e.g., $X_2$) (e.g., horizontal axis, vertical axis, inner axis, outer axis, diagonal axis) that is different than the first axis (e.g., $X_1$), and one or more sensors (e.g., 2124 such as pressure sensors) arranged to determine pressures associated with the different groups of bladders is also provided. For example, a sensor (e.g., 2124) may be arranged in a primary exhaust (e.g., 2129) servicing all the bladders (e.g., 2122) or a sensor (e.g., 2124) servicing an exhaust (e.g., 2128) for each column or row of bladders. In various embodiments, the bladders (e.g., 2122) are configured such as through a valve assembly (e.g., 2120) to be filled individually such as to scan an occupant and simultaneously such as to employ a massage effect. A seat component such as a seat back or a seat bottom comprising a frame (e.g., 2006) (e.g., rigid material such as metal, plastic, or wood) supporting the assembly is also provided. In various embodiments, the first plurality of bladder (e.g., 2106) is arranged along a width of the seat back at a first position (e.g., top, bottom, middle) and the second plurality of bladder (e.g., 2102) is arranged along the width of the seat back at a second position (e.g., top, bottom, middle) that is different than the first position. In some embodiments, the first plurality of bladders (e.g., 2106) is arranged along a width of the seat back and the second plurality of bladders (e.g., 2108) is arranged along a heigh of the seat back. In some embodiments, the first plurality of bladders (e.g., 2104) is arranged along a heigh of the seat back at a first portion (e.g., left, right, middle) and the second plurality of bladders (e.g., 2108) is arranged along the height of the seat back at a second position (e.g., left, right, middle) that is different than the first position. In one or more embodiments, the assembly (e.g., 2000) includes a controller (e.g., 2200) cooperating with the first plurality of bladders (e.g., 2106) to scan an occupant by filling one or more bladders (e.g., 2122) with fluid and determining an associated pressure such as the pressure applied by an occupant on the one or more bladders (e.g., 2122) or the pressure of a fluid flow (e.g., airflow) released from the one or more bladders (e.g., 2122). In various embodiments, the scan is configured to determine one or more dimension of an occupant.

A method 2300 to scan and massage an occupant is described. Method 2300 comprises determining a first pressure associated with a first bladder (i.e., step 2310), determining a second pressure associated with a second bladder (i.e., step 2320) and determining a first occupant dimensions based on the first and second pressures (i.e., step 2340) is also provided. In various embodiments, the first and second pressures are determined by releasing a fluid from the first and second bladders. In some embodiments, the method 2300 also comprises applying a massaging effect to an occupant based on the first occupant dimension (i.e., step 2360). In variations, the method 2300 also comprises determining a third pressure associated with a third bladder (i.e., step 2330) and determining a second occupant dimension based on the third pressure (i.e., step 2350) and the first and/or second pressures. In one or more embodiments, the method 2300 also comprises applying a massaging effect based on the first and second dimensions (i.e., step 2360).

Figure 59:
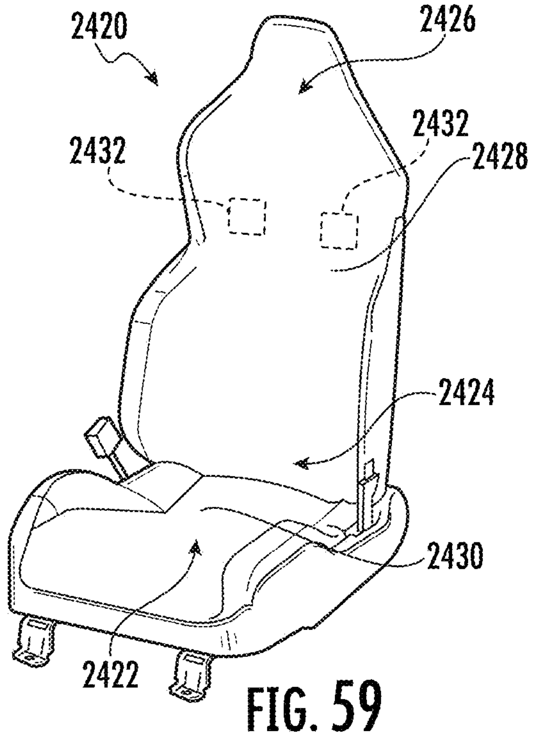
FIG. 59 is a front perspective view of a seat assembly according to some embodiments.

FIG. 59 illustrates a seat assembly 2420 according to some embodiments. The seat assembly 2420 may be a vehicle seat assembly for a land vehicle, watercraft, aircraft, or the like. Although a vehicle seat assembly 2420 is illustrated and disclosed, any seat assembly 2420 may be employed, such as an office chair, comfort chair, or the like.

The seat assembly 2420 includes a seat bottom 2422 for supporting a pelvis and thighs of an occupant. The seat bottom 2422 is supported upon an underlying support surface, such as a vehicle floor. A seat back 2424 extends in an upright direction from the seat bottom 2422 to support a back and shoulders of the occupant. The seat back 2424 may be supported by the seat bottom 2422 or the underlying support surface. A head restraint 2426 may also be provided upon the seat back 2424 to support a head of the occupant.

The seat assembly 2420 provides contact surfaces 2428, 2430 for receiving and comfortably supporting the occupant. The seat assembly 2420 includes a plurality of actuators 2432, 2434 provided within the seat assembly 2420 within the contact surfaces 2428, 2430. Although two actuators 2432, 2434 are illustrated and described, any number or location of actuators 2432, 2434 may be employed. The actuators 2432, 2434 may be utilized to impart a tactile effect upon the occupant, such as a vibration for conveying an alert, vibration for imparting a massage, pressure for imparting a pressurized massage effect, or the like.

Figure 60:
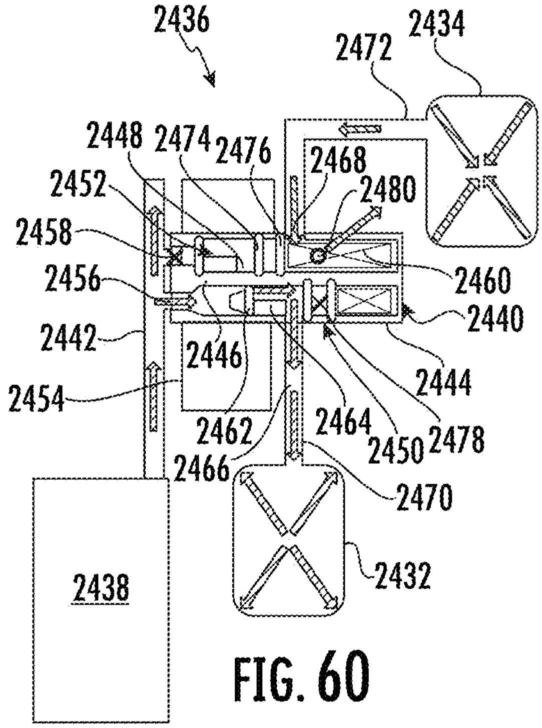
FIG. 60 is a schematic view of an actuator assembly for the seat assembly of FIG. 59, according to some embodiments.

In the depicted embodiment, the actuators 2432, 2434 are fluid bladders 2432, 2434, such as air bladders 2432, 2434 for imparting a pressurized massage effect to the occupant. FIG. 60 illustrates an actuator assembly 2436 for the seat assembly 2420 according to some embodiments. The actuator assembly 2436 is illustrated schematically and may be installed within the seat assembly 2420. The actuator assembly 2436 includes a fluid pump 2438, such as a pneumatic pump 2438 to provide a source of pressurized air. The actuator assembly 2436 also includes a valve assembly 2440 in fluid communication with the pump 2438. A first fluid line 2442 connects the pump 2438 to the valve assembly 2440 to deliver the pressurized air from the pump 2438 to the valve assembly 2440.

The valve assembly 2440 includes a housing 2444 with a plurality of fluid chambers 2446, 2448. Each fluid chamber 2446, 2448 receives a valve subassembly 2450, 2452 for translation within the fluid chamber 2446, 2448. The actuator assembly 2436 also includes a controller 2454 that cooperates with the valve subassemblies 2450, 2452 for actuation of each valve subassembly 2450, 2452. For example, the controller 2454 may include a plurality of solenoids to impart a linear actuation upon each of the valve subassemblies when a current is conducted through the solenoids.

The prior art utilizes separate valve subassemblies to inflate and deflate an air bladder in a seat assembly. In order to minimize the number of valve subassemblies 2450, 2452 in the valve assembly 2440, each of the valve subassemblies 2450, 2452 are bidirectional valves with three ports and two positions, known as 3-2 valves. Each valve subassembly 2450, 2452 is operable to inflate and deflate one of the air bladders 2432, 2434. By utilizing bidirectional valves, half of the number of valves are utilized, thereby reducing cost, weight, and size of the valve assembly 2440.

Each fluid chamber 2446, 2448 includes a first port 2456, 2458 at a distal end of the fluid chamber 2446, 2448 in fluid communication with the first fluid line 2442 to convey pressurized air through the first port 2456, 2458 and into the fluid chambers 2446, 2448. The first valve subassembly 2450 is illustrated at an actuated position by the controller 2454, whereby the first valve subassembly 2450 is actuated away from the first port 2456. Each valve subassembly 2450, 2452 includes a compression spring 2460 within the respective fluid chamber 2446, 2448. Each valve subassembly 2450, 2452 also includes an inlet seal 2462 on a translatable valve body 2464. Actuation of the first valve subassembly 2450 translates the valve body 2464 away from the first port 2456 thereby compressing the spring 2460 to remove the inlet seal 2462 from the first port 2456 and permit pressurized air to pass through the first port 2456 and into the fluid chamber 2446. As illustrated with reference to the second valve subassembly 2452, removal of current by the controller 2454 from the solenoid for the second valve subassembly 2452 results in expansion of the spring 2460 thereby pressing the inlet seal 2462 against the first port 2458 thereby closing the first port 2458.

A second port 2466, 2468 is provided in the housing 2444 into each fluid chamber 2446, 2448. An outlet fluid line 2470, 2472 connects each of the second ports 2466, 2468 to one of the air bladders 2432, 2434. In the actuated or inflate position of the first valve subassembly 2450, air passes through the first port 2456, into the fluid chamber 2446, around the valve body 2464, out of the second port 2466, through the outlet line 2470, to inflate the air bladder 2432.

Each of the valve subassemblies 2450, 2452 include a second seal 2474 and a third seal 2476 on the valve body 2464 spaced apart sequentially from the first seal 2462. The housing 2444 also includes a third port 2478, 2480 formed through the housing and into each fluid chamber 2446, 2448 as an exhaust port. In the inflate position of the first valve subassembly 2450, the third port 2478 is sealed off and isolated between the second and third seals 2474, 2476. In the deflate position of the second valve subassembly 2452, the first port 2458 is sealed to disconnect the fluid chamber 2448 from the pressurized air. In the deflate position, the spring 2460 extends the valve body 2464 such that the second and third seals 2474, 2476 are moved beyond the second port 2468. In the deflate position, the second port 2468 and the third port 2480 are in fluid communication such that pressurized air in the air bladder 2434 may decompress and pass through the second fluid line 2472, through the second port 2468, through the fluid chamber 2448, and out of the exhaust port 2480 to the atmosphere. Deflation of the air bladder 2434 may be further assisted by compression from the seated occupant against the air bladder 2434.

Figure 61:
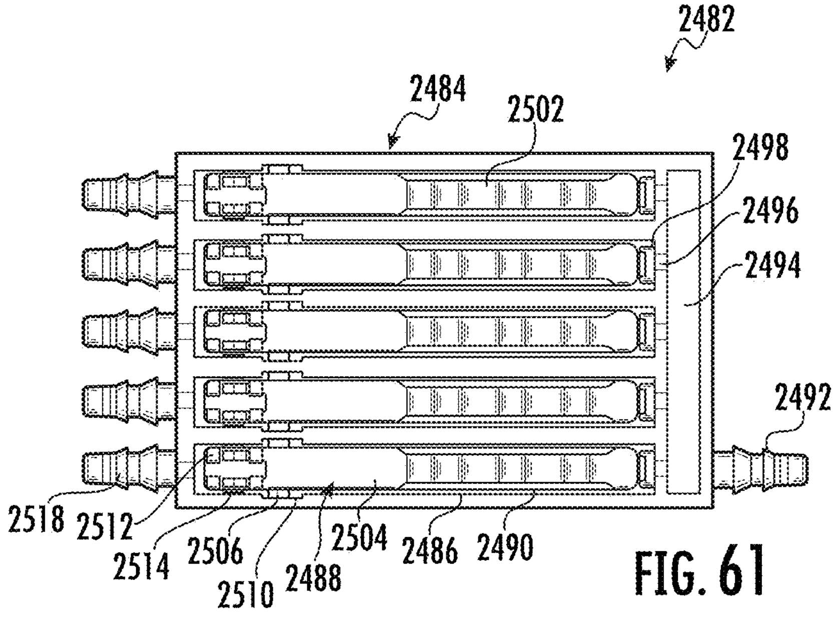
FIG. 61 is a top view of a valve assembly of the actuator assembly of FIG. 60, according to some embodiments.

FIG. 61 illustrates a valve assembly 2482 according to some embodiments, also referred to as a control module. The valve assembly 2482 includes a housing 2484 for enclosing a plurality of fluid chambers 2486. A plurality of valve subassemblies 2488 are provided, each in one of the fluid chambers 2486.

Figure 62:
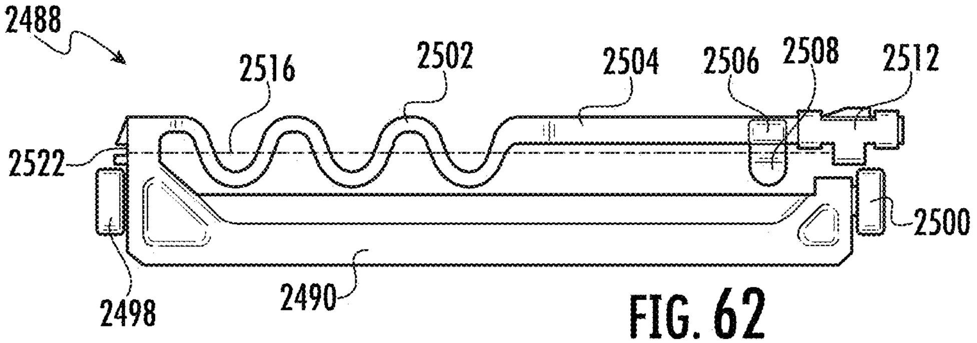
FIG. 62 is a side view of a valve subassembly of the valve assembly of FIG. 61, according to some embodiments.
Figure 63:
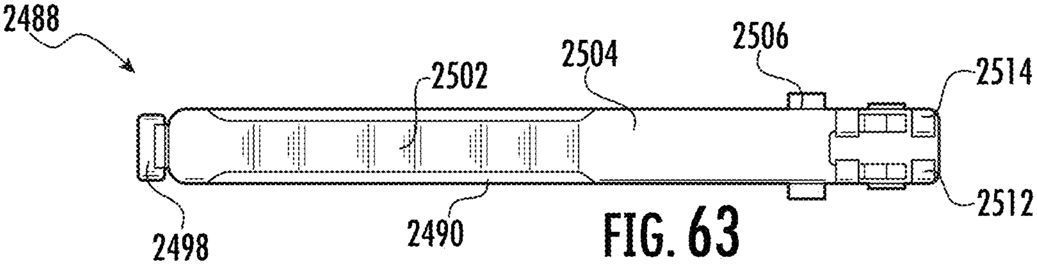
FIG. 63 is a top view of the valve subassembly of FIG. 62.

FIGS. 62 and 63 depict one of the valve subassemblies 2488 removed from the housing 2444. Each valve subassembly 2488 has an elongate valve body 2490. In order to minimize a weight and cost of the valve body 2490, the valve body 2490 is formed from a structurally resilient, yet lightweight material, such as a polymeric material, for example, polypropylene. According to some embodiments, the valve body 2490 may be reinforced with fiberglass or the like. The valve body 2490 is sized to translate within the fluid chamber 2486.

Referring again to FIG. 61, the housing 2484 includes a primary inlet port 2492. The primary inlet port 2492 is connected to the pump 2438 to receive pressurized air. The housing 2484 includes a pressure chamber 2494 in fluid communication with the primary inlet port 2492. The pressure chamber 2494 provides a reservoir for pressurized air storage to the plurality of valve subassemblies 2488. A plurality of first valve ports 2496 provide fluid communication from the pressure chamber 2494 to each of the fluid chambers 2486.

Referring again to FIGS. 62 and 63, the valve subassembly 2488 includes a first seal 2498 and a second seal 2500 mounted to opposed, and spaced apart, distal ends of the valve body 2490. With reference again to FIG. 61, the valve bodies 2490 are extended to a deflate position. In the deflate position, the first seals 2498 each engage one of the first ports 2496 to seal the first ports 2496 and to disconnect each fluid chamber 2486 from the pressure chamber 2494.

FIGS. 62 and 63 illustrate that the valve subassembly 2488 includes an integral compression spring 2502. The spring 2502 extends from the distal end of the valve body 2490 adjacent to the first seal 2498, and extends partially towards the other distal end. The spring 2502 is sinusoidal with alternating curvature as a compression spring 2502. A beam 2504 extends from the spring 2502, generally parallel with the valve body 2490. The beam 2504 may be formed integrally with the spring 2502 and the valve body 2490. The beam 2504 has a thickness, that is observable in FIG. 63, that is greater than a thickness of the spring 2502, to control deformation to the spring 2502. Likewise, the valve body 2490 also has a thickness greater than the spring 2502 to limit deformation to the spring 2502.

The beam 2504 is designed to maintain a static position, while the valve body 2490 translates within the fluid chamber 2486 and the spring 2502 is compressed and expanded. The beam 2504 includes a plurality of projections 2506, 2508 extending outwardly from the beam 2504. Referring now to FIG. 61, the lateral projections 2506 are received in slots 2510 in the housing 2484 to prevent axial translation of the beam 2504. During installation of the valve subassembly 2488 into the fluid chamber 2486, the first seal 2498 contacts the first port 2496, and then the spring 2502 is partially compressed to bias the first seal 2498 to close the first port 2496. The slots 2510 may be slightly tapered so that as the projections 2506 are installed into the slots 2510, the beam 2504 is positioned gradually toward the first port 2496 to slightly compress and preload the spring 2502. The projection 2508 extends toward the valve body 2490 in FIG. 62 and provides an alignment spacer between the valve body 2490 and the beam 2504 to maintain the valve body 2490 in alignment with the path of translation toward and away from the first port 2496.

As illustrated in FIGS. 62 and 63, a pair of electrically conductive terminals 2512, 2514 are mounted on the distal end of the beam 2504. The conductive terminals 2512, 2514 contact terminals (not shown) in a cover (also not shown) of the housing 2484. The conductive terminals 2512, 2514 are in electrical communication with the controller 2454. A linear actuator, such as a shape memory alloy (SMA) 2516 is connected to both terminals 2512, 2514. The SMA 2516 extends from the terminals 2512, 2514, along the beam 2504, along the spring 2502, and around a distal end of the valve body 2490 adjacent to the first seal 2498.

The SMA 2516 is formed from a material that is actuated in response to an electrical current is conducted through the SMA 2516. For example, the SMA 2516 may be formed from a Nickel Titanium alloy that constricts when a current is passed through the material. When an electrical current is conducted through the SMA 2516, the SMA 2516 shortens in length, thereby compressing the spring 2502 and moving the valve body 2490 away from the first port 2496.

Figure 64:
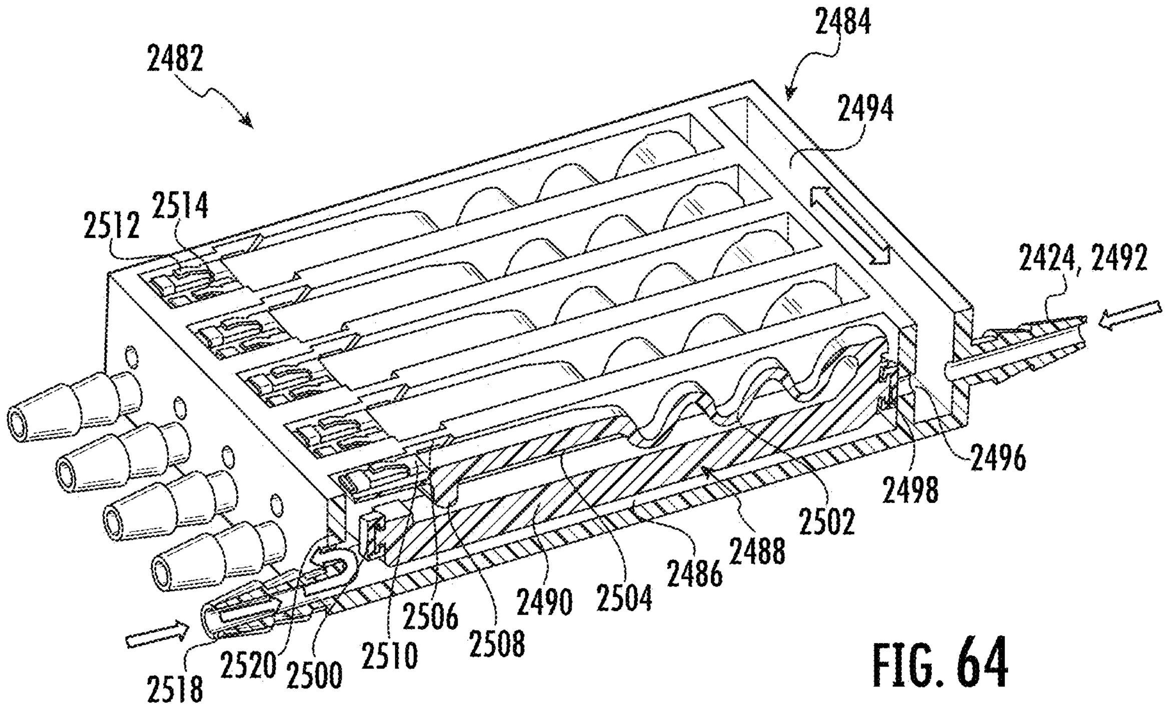
FIG. 64 is a fragmentary perspective view of the valve assembly of FIG. 60, illustrating the valve subassemblies of FIG. 62 in a deflate position.

FIG. 64 illustrates the valve assembly 2482 partially fragmentary with one of the valve subassemblies 2488 sectioned. All of the valve bodies 2490 in FIG. 64 are illustrated in the deflate position. The housing 2484 includes a plurality of second ports 2518 that are each connected to one of the fluid chambers 2486, and to one of a plurality of air bladders 2432, 2434. The second ports 2518 are parallel with the first ports 2496. The housing 2484 also includes a plurality of third ports 2520 provided on a distal end of the fluid chamber 2486 to vent each fluid chamber 2486 to an external atmosphere. The third ports 2520 are axially aligned with the first ports 2496. In the deflate position of FIG. 64, air can be deflated from the air bladders 2432, 2434 through the second ports 2518, into the fluid chambers 2486, and out of the exhaust ports 2520. As discussed above, in the deflate position, the first seal 2498 seals the first port 2496 to prevent pressurized air from entering the fluid chamber 2486.

Figure 65:
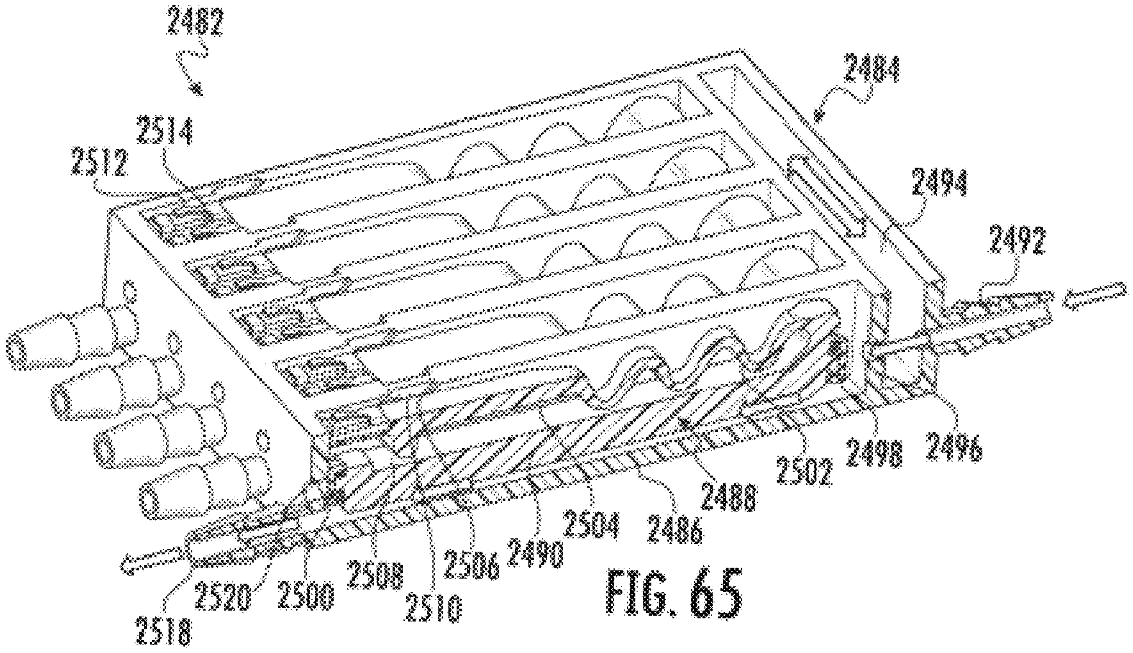
FIG. 65 is another fragmentary perspective view of the valve assembly of FIG. 60, illustrating one of the valve subassemblies in a fill position.

Referring now to FIG. 65, the sectioned valve subassembly 2488 is illustrated in the inflate position. In this FIG., the controller 2454 conducts a current through the terminals 2512, 2514 and the SMA 2516. The current through the SMA 2516 causes the SMA to reduce in length, thereby actuating the valve body 2490, while compressing the spring 2502. The valve body 2490 is translated in the fluid chamber 2486 such that the second seal 2500 engages and seals off the exhaust port 2520. In this inflate position, the movement of the valve body 2490 removes the first seal 2498 from the first port 2496. In this position, the pressurized air enters the first port 2496 from the pressure chamber 2494, passes through the fluid chamber 2486 and out of the second port 2518 to one of the air bladders 2432, 2434 to inflate the air bladder 2432, 2434.

Once the controller 2454 interrupts the current to the SMA 2516, the SMA 2516 extends, permitting the spring 2502 expand. The expansion of the spring 2502 presses against the beam 2504 and the valve body 2490, to translate the valve body back to the deflate position of FIG. 64. In absence of a signal to the SMA 2516, the air bladder 2432, 2434 is deflated. This condition is often referred to as constant deflation.

Figure 66:
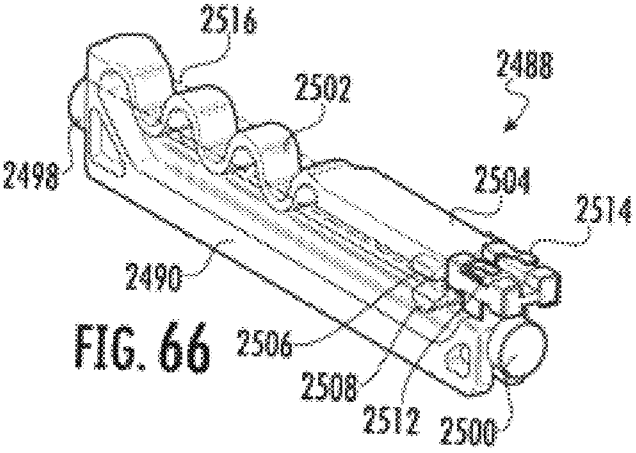
FIG. 66 is a front perspective view of the valve subassembly of FIG. 62.
Figure 67:
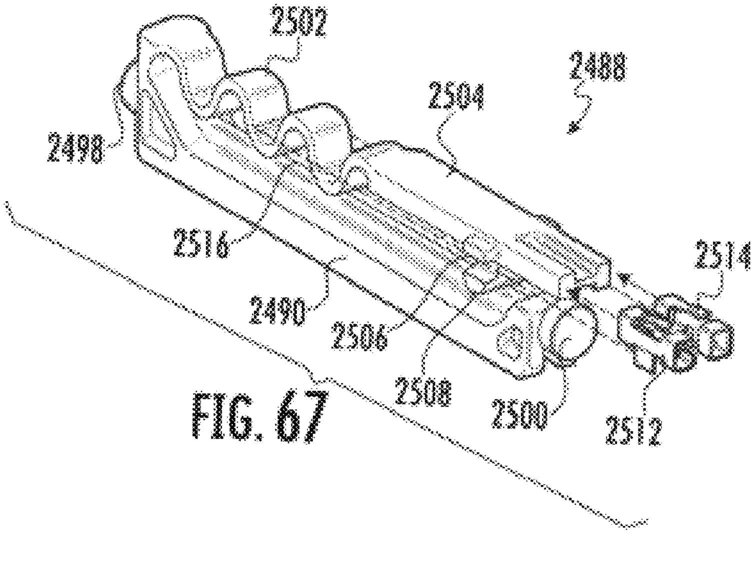
FIG. 67 is an exploded front perspective view of the valve subassembly of FIG. 62.
Figure 68:
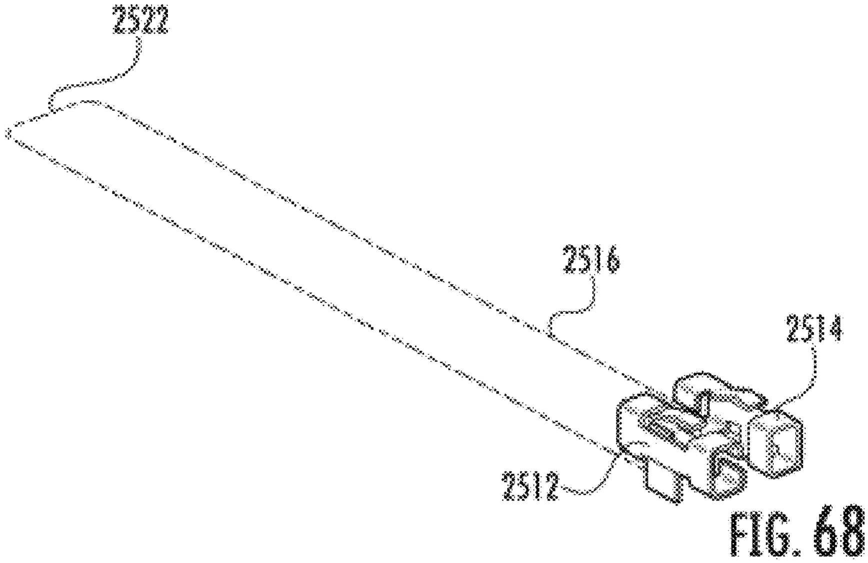
FIG. 68 is a front perspective view of a conductive subassembly of the valve subassembly of FIG. 62.

FIG. 66 illustrates the assembled valve subassembly 2488. FIG. 67 illustrates the valve subassembly 2488 during an assembly step. In FIG. 67, the terminals 2512, 2514 are slid onto the beam 2504. FIG. 68 illustrates the conductive components 2512, 2514, 2516 of the valve subassembly 2488. The SMA 2516 includes an intermediate loop 2522 spaced apart from the terminals 2512, 2514.

Figure 69:
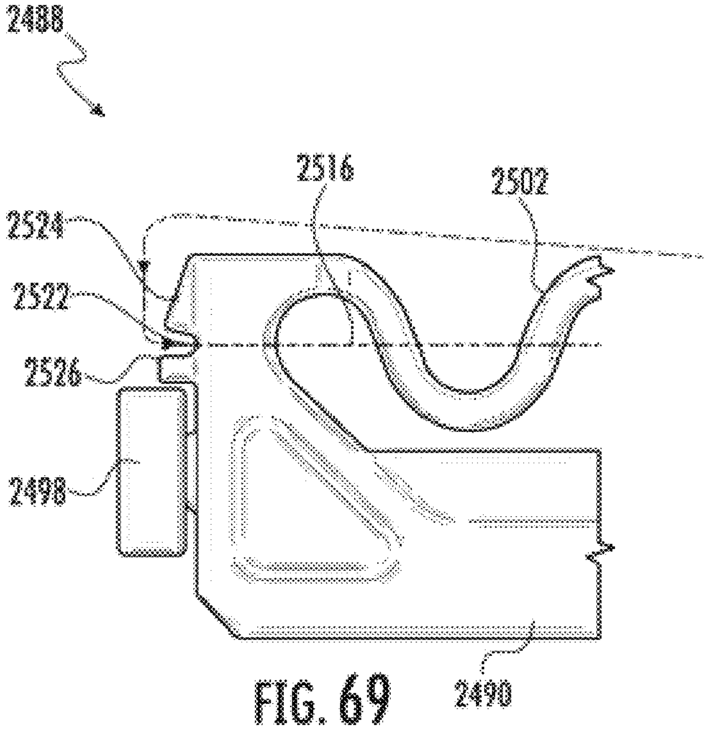
FIG. 69 is an enlarged partial front elevation view of the valve subassembly of FIG. 62 illustrating an assembly step.

FIG. 69 illustrates an assembly step of attaching the SMA 2516 to the valve body 2490. As the terminals 2512, 2514 are slid onto the beam 2504 in FIG. 67, the intermediate loop 2522 of the SMA 2516 is slid over the distal end of the valve body 2490. The valve body 2490 includes an inclined retainer 2524 and a retention slot 2526 so that the loop 2522 is slid over the retainer 2524 and into the slot 2526 to retain the SMA 2516 upon the distal end of the valve body 2490.

The valve subassembly 2488 operates to inflate and permit deflation of the air bladders 2432, 2434, thereby reducing the quantity of valves. The integrated spring 2502 further reduces component quantities. Only one signal is required to operate each valve subassembly 2488, thereby simplifying controller 2454 programming and cost. The translatable valve body 2490 also eliminates flexible hinges of the prior art, which often require tighter, and more costly manufacturing tolerances.

An assembly is described (e.g., seat assembly 2420, actuator assembly 2436, valve assembly 2440, 2482, valve subassembly 2450, 2452, 2488) with a valve body (e.g., valve body 2464, 2490) sized for translation within a fluid chamber (e.g., fluid chamber 2446, 2448). The valve body may be elongate, may be formed from a lightweight and resilient material such as a polymeric material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The fluid chamber may be of a housing with a first port formed therein, a second port parallel with the first port, and a third port to vent to an external atmosphere axially aligned with the first port and in fluid communication with the fluid chamber. The valve body may be oriented in the fluid chamber for translation to an inflate position whereby fluid passes from a source of pressurized fluid into the first port, through the fluid chamber and out of the second port to inflate a fluid bladder, such as lumbar bladders, bolster bladders, shoulder bladders, while the third port is sealed from the fluid chamber, and translatable to a deflate position whereby fluid passes from the fluid bladder into the second port, through the fluid chamber and out of the third port to deflate the fluid bladder, while the first port is sealed from the fluid chamber. The housing may be formed from a lightweight and structurally resilient material such as a polymeric material, or a lightweight metallic alloy, with gaskets, covers, fasteners, laser welds, friction welds, and/or adhesives. A pair of opposed seals (e.g., seals 2462, 2474, 2476, 2498, 2500) are oriented on the valve body (e.g., valve body 2464, 2490) to seal a pair of ports (e.g., ports 2456, 2458, 2466, 2468, 2478, 2480, 2492, 2496, 2518, 2520). The seals may be elastomeric and spaced apart and oriented on distal ends of the elongate valve body. A linear actuator (e.g., solenoid, shape memory alloy 2516) is mounted on the valve body (e.g., valve body 2464, 2490) to actuate the valve body (e.g., valve body 2464, 2490). The linear actuator may be a shape memory alloy with an electrical terminal mounted on a distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. The linear actuator may be to translate the valve body in response to an electrical current conducted through the shape memory alloy, such that the SMA shortens in length, thereby compressing the spring and moving the valve body away from the first port.

In some embodiments, the linear actuator (e.g., solenoid, shape memory alloy 2516) further comprises a shape memory alloy (e.g., shape memory alloy 2516) to translate the valve body (e.g., valve body 2464, 2490) in response to an electrical current conducted through the shape memory alloy (e.g., shape memory alloy 2516). The shape memory alloy may be provided with an electrical terminal mounted on the distal end of the beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material, such that the SMA shortens in length, thereby compressing the spring and moving the valve body away from the first port.

In some embodiments, the valve body (e.g., valve body 2464, 2490) is elongate, and each of the pair of opposed seals (e.g., seals 2462, 2474, 2476, 2498, 2500) are spaced apart and oriented on distal ends of the elongate valve body (e.g., valve body 2464, 2490).

In some embodiments, a housing (e.g., housing 2444, 2484) is provided with the fluid chamber (e.g., fluid chamber 2446, 2448) formed therein with a first port (e.g., first port 2456, 2458, 2496), a second port (e.g., second port 2466, 2468, 2518), and a third port (e.g., third port 2478, 2480, 2520) in fluid communication with the fluid chamber (e.g., fluid chamber 2446, 2448). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The valve body (e.g., valve body 2464, 2490) is oriented in the fluid chamber (e.g., fluid chamber 2446, 2448) for translation relative thereto.

In some embodiments, the valve body (e.g., valve body 2464, 2490) is translatable to an inflate position whereby fluid passes from a source of pressurized fluid (e.g., pump 2438) into the first port (e.g., first port 2456, 2458, 2496), through the fluid chamber (e.g., fluid chamber 2446, 2448) and out of the second port (e.g., second port 2466, 2468, 2518) to inflate a fluid bladder (e.g., fluid bladder 2432, 2434), while the third port (e.g., third port 2478, 2480, 2520) is sealed from the fluid chamber (e.g., fluid chamber 2446, 2448). The fluid bladder may impart a tactile effect upon the occupant, such as a vibration for conveying an alert, vibration for imparting a massage, pressure for imparting a pressurized massage effect, such as air bladders, such as lumbar bladders, bolster bladders, and/or shoulder bladders. The valve body (e.g., valve body 2464, 2490) is translatable to a deflate position whereby fluid passes from the fluid bladder (e.g., fluid bladder 2432, 2434) into the second port (e.g., second port 2466, 2468, 2518), through the fluid chamber (e.g., fluid chamber 2446, 2448) and out of the third port (e.g., third port 2478, 2480, 2520) to deflate the fluid bladder (e.g., fluid bladder 2432, 2434), while the first port (e.g., first port 2456, 2458, 2496) is sealed from the fluid chamber (e.g., fluid chamber 2446, 2448).

In some embodiments, an actuator (e.g., fluid bladder 2432, 2434) is connected to the second port (e.g., second port 2466, 2468, 2518). The actuator may impart a tactile effect upon the occupant, such as a vibration for conveying an alert, vibration for imparting a massage, pressure for imparting a pressurized massage effect, such as fluid bladders, such as air bladders, such as lumbar bladders, bolster bladders, and/or shoulder bladders.

In some embodiments, a housing (e.g., housing 2444, 2484) with a plurality of fluid chambers (e.g., fluid chamber 2446, 2448) formed therein, each with a first port (e.g., first port 2456, 2458, 2496), a second port (e.g., second port 2466, 2468, 2518), and a third port (e.g., third port 2478, 2480, 2520). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. A plurality of valve assemblies (e.g., valve assembly 2440, 2482, valve subassembly 2450, 2452, 2488) is provided. The valve body (e.g., valve body 2464, 2490) of each valve assembly (e.g., valve assembly 2440, 2482, valve subassembly 2450, 2452, 2488) is oriented for translation in one of the plurality of fluid chambers (e.g., fluid chamber 2446, 2448).

An assembly is described (e.g., seat assembly 2420, actuator assembly 2436, valve assembly 2440, 2482, valve subassembly 2450, 2452, 2488) with a valve body (e.g., valve body 2464, 2490) formed from a polymeric material. The valve body may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The valve body (e.g., valve body 2464, 2490) is sized for translation within a fluid chamber (e.g., fluid chamber 2446, 2448). The fluid chamber may be of a housing with a first port formed therein, a second port parallel with the first port, and a third port to vent to an external atmosphere axially aligned with the first port and in fluid communication with the fluid chamber. The valve body may be oriented in the fluid chamber for translation to an inflate position whereby fluid passes from a source of pressurized fluid into the first port, through the fluid chamber and out of the second port to inflate a fluid bladder, such as lumbar bladders, bolster bladders, shoulder bladders, while the third port is sealed from the fluid chamber, and translatable to a deflate position whereby fluid passes from the fluid bladder into the second port, through the fluid chamber and out of the third port to deflate the fluid bladder, while the first port is scaled from the fluid chamber. The housing may be formed from a lightweight and structurally resilient material such as a polymeric material, or a lightweight metallic alloy, with gaskets, covers, fasteners, laser welds, friction welds, and/or adhesives. A spring (e.g., spring 2460, 2502) is formed integrally with the valve body (e.g., valve body 2464, 2490) and extends from the valve body (e.g., valve body 2464, 2490) to bias the valve body (e.g., valve body 2464, 2490) in one direction. The spring may be a compression spring. The spring may be sinusoidal with alternating curvature. The spring may have a second thickness that is reduced relative to the first thickness, to limit deformation to the spring. A linear actuator (e.g., solenoid, shape memory alloy 2516) is mounted on the valve body (e.g., valve body 2464, 2490) to actuate the valve body (e.g., valve body 2464, 2490) to actuate the valve body (e.g., valve body 2464, 2490) and compress the spring (e.g., spring 2460, 2502). The linear actuator may be a shape memory alloy with an electrical terminal mounted on a distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. The linear actuator may be to translate the valve body in response to an electrical current conducted through the shape memory alloy, such that the SMA shortens in length, thereby compressing the spring and moving the valve body away from the first port. The linear actuator may translate the valve body in response to an electrical current conducted through the shape memory alloy, such that the SMA shortens in length, thereby compressing the spring and moving the valve body away from the first port.

In some embodiments, the linear actuator (e.g., solenoid, shape memory alloy 2516) further comprises a shape memory alloy (e.g., shape memory alloy 2516) to translate the valve body (e.g., valve body 2464, 2490) in response to an electrical current conducted through the shape memory alloy (e.g., shape memory alloy 2516). The shape memory alloy may be provided with an electrical terminal mounted on the distal end of the beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material, such that the SMA shortens in length, thereby compressing the spring and moving the valve body away from the first port.

In some embodiment, a beam (e.g., beam 2504) extends from the valve body (e.g., valve body 2464, 2490). The beam may generally parallel with the valve body. The beam may be formed integral with the spring. The beam may have a first thickness. The beam may include a plurality of lateral projections extending outwardly from the beam and received in slots in a housing to prevent axial translation of the beam, the slots may be slightly tapered so that as the projections are installed into the slots, the beam is positioned gradually toward the first port to slightly compress and preload the spring. The projection may extend toward the valve body and provide an alignment spacer between the valve body and the beam to maintain the valve body in alignment with the path of translation toward and away from the first port.

In some embodiments, the beam (e.g., beam 2504) has a first thickness. The spring (e.g., spring 2460, 2502) has a second thickness that is reduced relative to the first thickness. The reduced thickness may limit deformation to the spring.

In some embodiments, the spring (e.g., spring 2460, 2502) further comprises a compression spring. The spring may be sinusoidal with alternating curvature.

In some embodiments, an electrical terminal (e.g., terminal 2512, 2514) is mounted on the beam (e.g., beam 2504) in electrical communication with the shape memory alloy (e.g., shape memory alloy 2516). The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material.

In some embodiments, a housing (e.g., housing 2444, 2484) is provided with the fluid chamber (e.g., fluid chamber 2446, 2448) formed therein with a first port (e.g., first port 2456, 2458, 2496), a second port (e.g., second port 2466, 2468, 2518), and a third port (e.g., third port 2478, 2480, 2520) in fluid communication with the fluid chamber (e.g., fluid chamber 2446, 2448). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The valve body (e.g., valve body 2464, 2490) is oriented in the fluid chamber (e.g., fluid chamber 2446, 2448) for translation relative thereto.

In some embodiments, the valve body (e.g., valve body 2464, 2490) is translatable to an inflate position whereby fluid passes from a source of pressurized fluid (e.g., pump 2438) into the first port (e.g., first port 2456, 2458, 2496), through the fluid chamber (e.g., fluid chamber 2446, 2448) and out of the second port (e.g., second port 2466, 2468, 2518) to inflate a fluid bladder (e.g., fluid bladder 2432, 2434), while the third port (e.g., third port 2478, 2480, 2520) is sealed from the fluid chamber (e.g., fluid chamber 2446, 2448). The fluid bladder may impart a tactile effect upon the occupant, such as a vibration for conveying an alert, vibration for imparting a massage, pressure for imparting a pressurized massage effect, such as air bladders, such as lumbar bladders, bolster bladders, and/or shoulder bladders. The valve body (e.g., valve body 2464, 2490) is translatable to a deflate position whereby fluid passes from the fluid bladder (e.g., fluid bladder 2432, 2434) into the second port (e.g., second port 2466, 2468, 2518), through the fluid chamber (e.g., fluid chamber 2446, 2448) and out of the third port (e.g., third port 2478, 2480, 2520) to deflate the fluid bladder (e.g., fluid bladder 2432, 2434), while the first port (e.g., first port 2456, 2458, 2496) is sealed from the fluid chamber (e.g., fluid chamber 2446, 2448).

In some embodiments, an actuator (e.g., fluid bladder 2432, 2434) is connected to the second port (e.g., second port 2466, 2468, 2518). The actuator may impart a tactile effect upon the occupant, such as a vibration for conveying an alert, vibration for imparting a massage, pressure for imparting a pressurized massage effect, such as fluid bladders, such as air bladders, such as lumbar bladders, bolster bladders, and/or shoulder bladders. A source of pressurized fluid (e.g., pump 2438) is connected to the first port (e.g., first port 2456, 2458, 2496).

In some embodiments, a housing (e.g., housing 2444, 2484) with a plurality of fluid chambers (e.g., fluid chamber 2446, 2448) formed therein, each with a first port (e.g., first port 2456, 2458, 2496), a second port (e.g., second port 2466, 2468, 2518), and a third port (e.g., third port 2478, 2480, 2520). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. A plurality of valve assemblies (e.g., valve assembly 2440, 2482, valve subassembly 2450, 2452, 2488) is provided. The valve body (e.g., valve body 2464, 2490) of each valve assembly (e.g., valve assembly 2440, 2482, valve subassembly 2450, 2452, 2488) is oriented for translation in one of the plurality of fluid chambers (e.g., fluid chamber 2446, 2448).

An assembly (e.g., seat assembly 2420, actuator assembly 2436, valve assembly 2440, 2482, valve subassembly 2450, 2452, 2488) is described with a housing (e.g., housing 2444, 2484) provided with a fluid chamber (e.g., fluid chamber 2446, 2448) formed therein with a first port (e.g., first port 2456, 2458, 2496), a second port (e.g., second port 2466, 2468, 2518), and a third port (e.g., third port 2478, 2480, 2520) in fluid communication with the fluid chamber (e.g., fluid chamber 2446, 2448). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The first port (e.g., first port 2456, 2458, 2496) or the third port (e.g., third port 2478, 2480, 2520) is formed at a distal end of the fluid chamber (e.g., fluid chamber 2446, 2448). A valve (e.g., valve body 2464, 2490) is oriented in the fluid chamber (e.g., fluid chamber 2446, 2448) for translation to: an inflate position whereby fluid passes from a source of pressurized fluid (e.g., pump 2438) into the first port (e.g., first port 2456, 2458, 2496), through the fluid chamber (e.g., fluid chamber 2446, 2448) and out of the second port (e.g., second port 2466, 2468, 2518) to inflate a fluid bladder (e.g., fluid bladder 2432, 2434), while the third port (e.g., third port 2478, 2480, 2520) is scaled from the fluid chamber (e.g., fluid chamber 2446, 2448). The fluid bladder may impart a tactile effect upon the occupant, such as a vibration for conveying an alert, vibration for imparting a massage, pressure for imparting a pressurized massage effect, such as air bladders, such as lumbar bladders, bolster bladders, and/or shoulder bladders. The valve (e.g., valve body 2464, 2490) is also translatable to a deflate position whereby fluid passes from the fluid bladder (e.g., fluid bladder 2432, 2434) into the second port (e.g., second port 2466, 2468, 2518), through the fluid chamber (e.g., fluid chamber 2446, 2448) and out of the third port (e.g., third port 2478, 2480, 2520) to deflate the fluid bladder (e.g., fluid bladder 2432, 2434), while the first port (e.g., first port 2456, 2458, 2496) is sealed from the fluid chamber (e.g., fluid chamber 2446, 2448). The valve body may be elongate, may be formed from a lightweight and resilient material such as a polymeric material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

Figure 70:
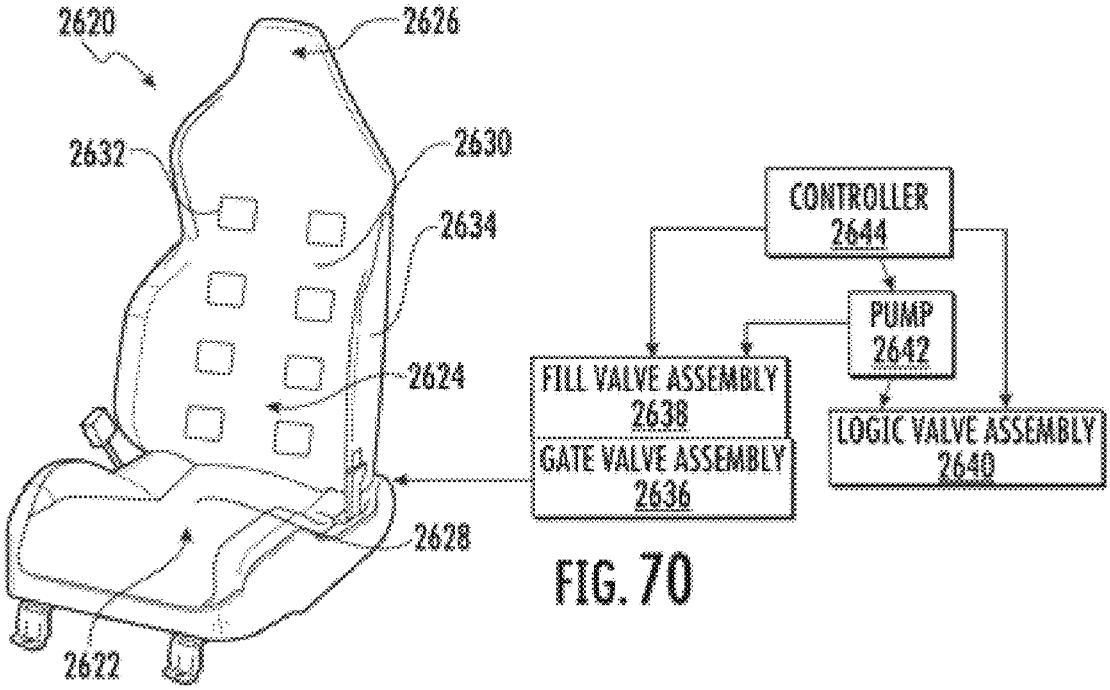
FIG. 70 is a schematic view of a seating system according to some embodiments.

FIG. 70 illustrates a seating system 2620 according to some embodiments. The seating system 2620 is a vehicle seating system 2620 for a land vehicle, watercraft, aircraft, or the like. The seating system 2620 may also be a seating system 2620 for a comfort chair, office chair, or the like. In the vehicle environment, the seating system 2620 may be a front row seating system 2620, or a subsequent middle or rear row seating system 2620.

The seating system 2620 includes a seat bottom 2622 sized to support a pelvis and thighs of an occupant. The seat bottom 2622 is adapted to be mounted to a vehicle floor. A seat back 2624 extends in an upright direction from the seat bottom 2622. The seat back 2624 is sized to receive and support a back of the occupant. The seat back 2624 may be supported by the seat bottom 2622 or the underlying support surface. A head restraint 2626 is also be provided upon the seat back 2624 to support a head of the occupant.

The seating system 2620 provides contact surfaces 2628, 2630 for receiving and comfortably supporting the occupant. The seating system 2620 includes a plurality of actuators 2632, 2634 provided within the seating system 2620 within the contact surfaces 2628, 2630. Although an arrangement of actuators 2632, 2634 are illustrated and described, any number or location of actuators 2632, 2634 may be employed. The actuators 2632, 2634 may be utilized to impart a tactile effect upon the occupant, such as a vibration for conveying an alert, vibration for imparting a massage, pressure for imparting a pressurized massage effect, support to the occupant, or the like.

In the depicted embodiment, the actuators 2632, 2634 are fluid bladders 2632, 2634, such as air bladders 2632, 2634. The fluid bladders 2632 are for imparting a pressurized massage effect to the occupant. The fluid bladders 2634 are located in side bolsters of the seat back 2624 to provide adjustable support to the occupant.

The seating system 2620 includes a gate valve assembly 2636 in fluid communication with the fluid bladders 2632, 2634. The gate valve assembly 2636 is in fluid communication with a fill valve assembly 2638 and a logic valve assembly 2640. A pump 2642, such as a compressor, is in fluid communication with the fill valve assembly 2638 and the logic valve assembly 2640 to provide a source of pressurized fluid, such as compressed air, to the fill valve assembly 2638 and the logic valve assembly 2640. Any quantity of pumps 2642 and electrically powered valves 2638, 2640 may be employed. Alternatively, a plurality of pumps 2642 may be employed without any electrically powered valves 2638, 2640.

A controller 2644 is in electrical communication with the pump 2642 to operate the pump 2642 to generate the source of pressurized air. The controller 2644 is also in electrical communication with the fill valve assembly 2638 and the logic valve assembly 2640 to control the fill valve assembly 2638 and the logic valve assembly 2640 to regulate the flow of pressurized air to the gate valve assembly 2636. The valve assemblies 2636, 2638, 2640 are housed within the seat back 2624 or the seat bottom 2622 of the seating system 2620. The controller 2644 is housed within the vehicle, and according to some embodiments, within the seat back 2624 or the seat bottom 2622. The fill valve assembly 2638 and the logic valve assembly 2640 can be manufactured as a single unit. In which case, the controller 2644 could be preassembled and integral into this single unit. If the fill valve assembly 2638 and the logic valve assembly 2640 are manufactured as two separate units, the controller 2644 could also be split into two units, with each respective unit attached to the respective valve assembly 2638, 2640.

Figure 71:
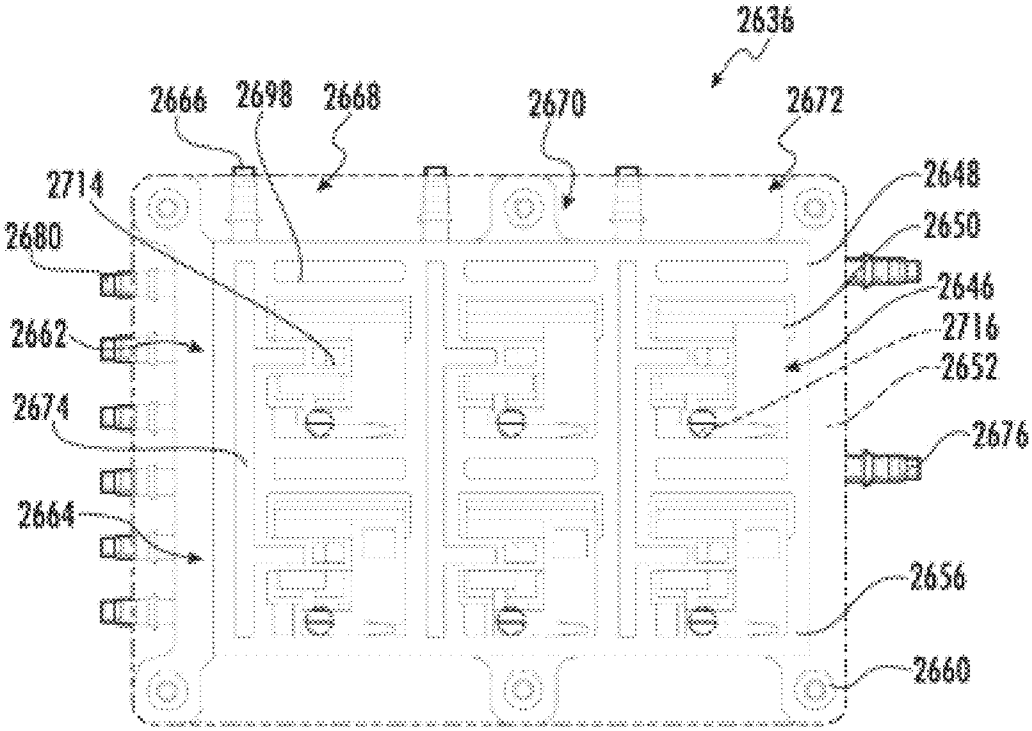
FIG. 71 is a front elevation view of a gate valve assembly of the seating system of FIG. 70 according to some embodiments.

The gate valve assembly 2636 is illustrated in greater detail in FIG. 71. The gate valve assembly 2636 includes a matrix of gate valve subassemblies 2646. Each gate valve subassembly 2646 is utilized for inflating one of the fluid actuators 2632, 2634. The gate valve assembly 2636 employs a matrix or linear array of two by three gate valve subassemblies 2646. Although a two by three matrix is illustrated and described, any arrangement and quantity of gate valve subassemblies 2646 may be employed, e.g., two by three, one by four, four by four, six by nine, etc.

The gate valve assembly 2636 utilizes the gate valve subassemblies 2646 and pneumatic logic to inflate and deflate a large quantity of fluid actuators, while minimizing a quantity of electrically controlled valves 2638, 2640. Electrically controlled valves 2638, 2640 are typically costly, heavy, and occupy volume within the seating system 2620. In comparison, the gate valve subassemblies 2646 are mechanically controlled, cost less, are compact, and weigh less. In the depicted example, five electrically operated valves are utilized to operate a two by three matrix of six gate valve subassemblies 2646 for actuation of six fluid actuators 2632, 2634 for a reduction of one electrical valve assembly. According to another example, nine electrical valves may be employed for a three by six matrix of gate valve subassemblies 2646 for actuation of eighteen fluid actuators 2632, 2634 for a reduction of nine electrical valves.

Figure 72:
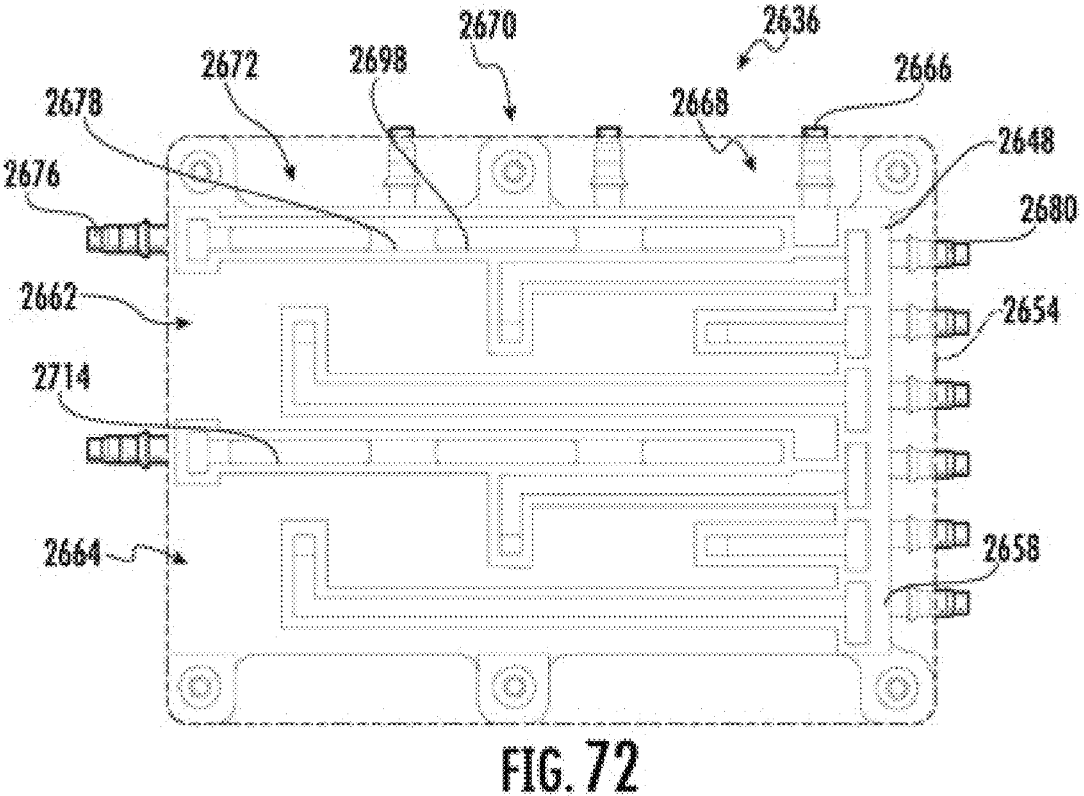
FIG. 72 is a rear elevation view of the gate valve assembly of FIG. 71.

The gate valve assembly 2636 includes a housing 2648. The housing 2648 is formed from a lightweight and structurally resilient material such as a polymeric material, or a lightweight metallic alloy. The housing 2648 includes a matrix of fluid chambers 2650 with one gate valve subassembly 2646 within each fluid chamber 2650. Referring now to FIGS. 71 and 72, a pair of covers 2652, 2654 (illustrated in phantom lines) are attached to the housing 2648. Gaskets 2656, 2658 are provided between the covers 2652, 2654 and the housing 2648. Fasteners 2660 attach the covers 2652, 2654 and gaskets 2656, 2658 to the housing 2648. According to some embodiments, the covers 2652, 2654 may be laser welded, friction welded, glued, or otherwise attached directly to the housing 2648 to omit the gaskets 2656, 2658 and fasteners 2660.

Referring again to FIG. 71, the matrix 2636 of gate valve subassemblies 2646 includes two subsets 2662, 2664 of gate valve subassemblies 2646, which are oriented in rows 2662, 2664 in the figures. The first row 2662 of gate valve subassemblies 2646 is configured to operate the fluid actuators 2634 in a constant inflation condition, as will be explained in further detail below. The constant inflation condition is utilized for bladders 2634 that maintain pressure, such as lumbar bladders, bolster bladders, shoulder bladders, and the like. The second row 2664 of gate valve subassemblies 2646 is configured to operate the fluid actuators 2632 in a constant deflation condition, as will also be explained in further detail below. The constant deflation condition is employed for bladders 2632 that are inflated and deflated rapidly, such as massage bladders 2632.

The housing 2648 includes a plurality of inflate connectors 2666, which each provide an inflate pressure inlet to a subset or column 2668, 2670, 2672 of gate valve subassemblies 2646, which each include one gate valve subassembly 2646 from the rows 2662, 2664. Each of the three inflate connectors 2666 is connected to a pressure chamber reservoir or bus 2674. The buses 2674 extend along the length of each column 2668, 2670, 2672 for fluid communication with each fluid chamber 2650 in the respective column 2668, 2670, 2672. The buses 2674 are also enclosed and sealed by the cover 2652 and the gasket 2656. The connectors 2666 are barbed for connection to hoses for receipt of pressurized air from the fill valve assemblies 2638.

The housing 2648 also includes a plurality of control connectors 2676, which each provide a control pressure inlet to one of the rows 2662, 2664 of gate valve subassemblies 2646. Each of the two control connectors 2676 is connected to a bus 2678 as illustrated in FIG. 72. The buses 2678 extend along the length of each row 2662, 2664 for fluid communication with each fluid chamber 2650 within the respective row 2662, 2664. The buses 2678 are enclosed and sealed by the cover 2654 and the gasket 2658. The control connectors 2676 receive pressurized air from the logic valve assembly 2640.

FIGS. 71 and 72 illustrate that the housing 2648 includes a plurality of port connectors 2680, each in fluid connection to one of the fluid chambers 2650. Each of the port connectors 2680 are also in fluid communication with one of the fluid actuators 2632, 2634 to convey pressurized fluid from the fluid chamber 2650 to the fluid actuator 2632, 2634 to inflate the fluid actuator 2632, 2634.

Figure 73:
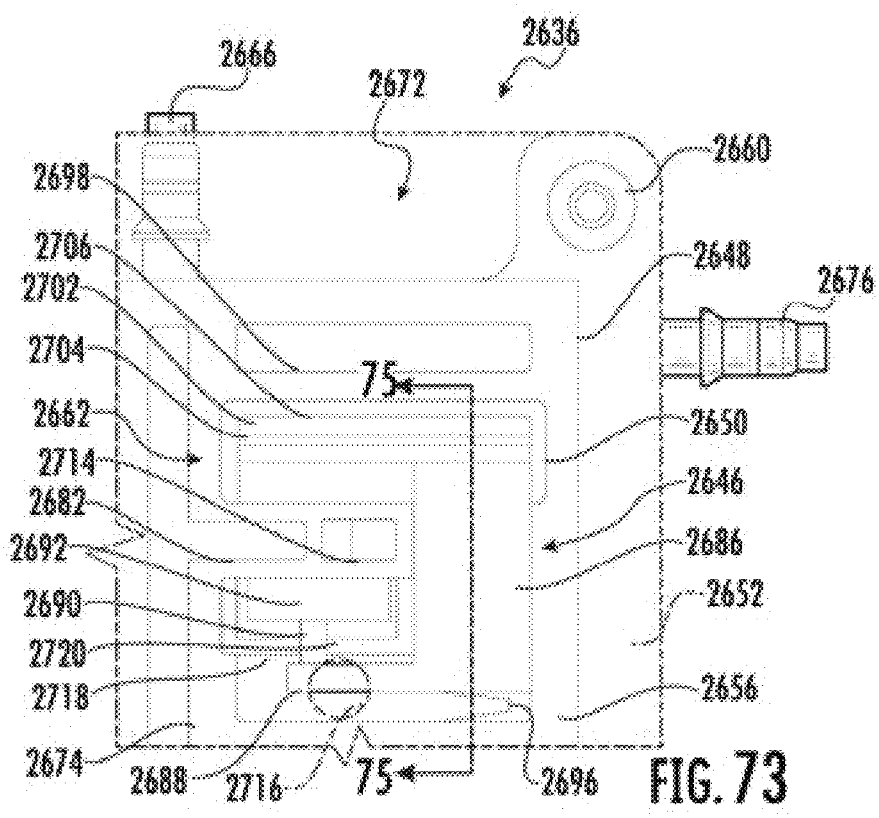
FIG. 73 is an enlarged front elevation view of a gate valve subassembly of the gate valve assembly of FIG. 71, illustrated in a first condition.
Figure 74:
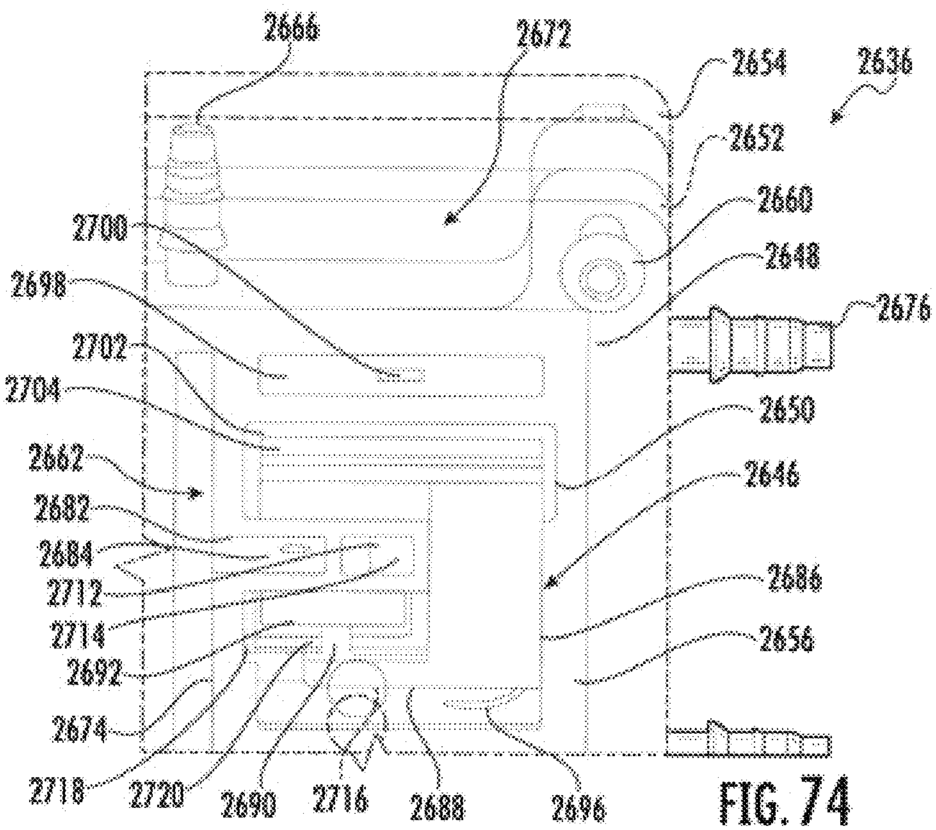
FIG. 74 is an enlarged front perspective view of the gate valve subassembly of FIG. 73.

Referring again to FIG. 70, during operation of the gate valve subassemblies 2646 of row 2662, the controller 2644 operates the pump 2642 to provide the source of pressurized air. The controller 2644 also operates the fill valve assembly 2638 to permit the pressurized air to pass into the connectors 2666 (FIG. 71) into the buses 2674 of the gate valve assembly 2636. Referring to FIGS. 73 and 74, a lateral fluid line 2682 is provided for each gave valve subassembly 2646, which branches from the corresponding bus 2674 toward the corresponding fluid chamber 2650. A fill inlet 2684 is illustrated in FIG. 74, formed through the lateral fluid line 2682 to the fluid chamber 2650.

Figure 75:
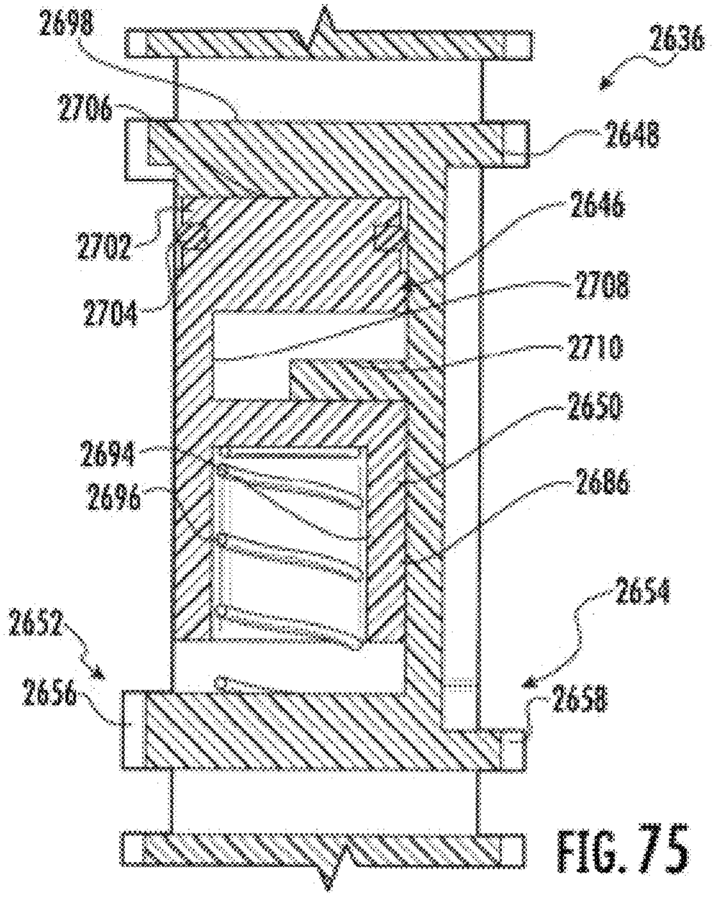
FIG. 75 is a section view of the gate valve subassembly taken along section line 75-75 in FIG. 73.

Referring again to FIGS. 73 and 74, each gate valve subassembly 2646 includes a valve body 2686 for translation within the fluid chamber 2650, towards and away from the fill inlet 2684. The valve body 2686 is formed from a lightweight and resilient material such as a polymeric material or an aluminum alloy. The valve body 2686 includes a lateral extension 2688 at one distal end supporting a longitudinal extension 2690 that is offset from, and shorter than, the valve body 2686. An elastomeric valve seal 2692 is provided on the longitudinal extension 2690. FIG. 75 illustrates a cross section of the valve body 2686 depicting a receptacle 2694 for receipt of a compression spring 2696. The spring 2696 engages an internal surface of the fluid chamber 2650 to press the valve seal 2692 against the fill inlet 2684 to seal the fill inlet 2684.

Referring again to FIG. 70, the controller 2644 also controls the logic valve assembly 2640 to permit pressurized fluid to pass into the control connectors 2676 and into the buses 2678 of the gate valve assembly 2636. Transverse channels 2698 extend from each bus 2678 to one of the fluid chambers 2650. With reference now to FIG. 74, a control inlet 2700 is formed through each transverse channel 2698 to the corresponding fluid chamber 2650. The control inlet 2700 permits pressurized fluid to pass from the transverse channel 2698 to the fluid chamber 2650.

Figure 76:
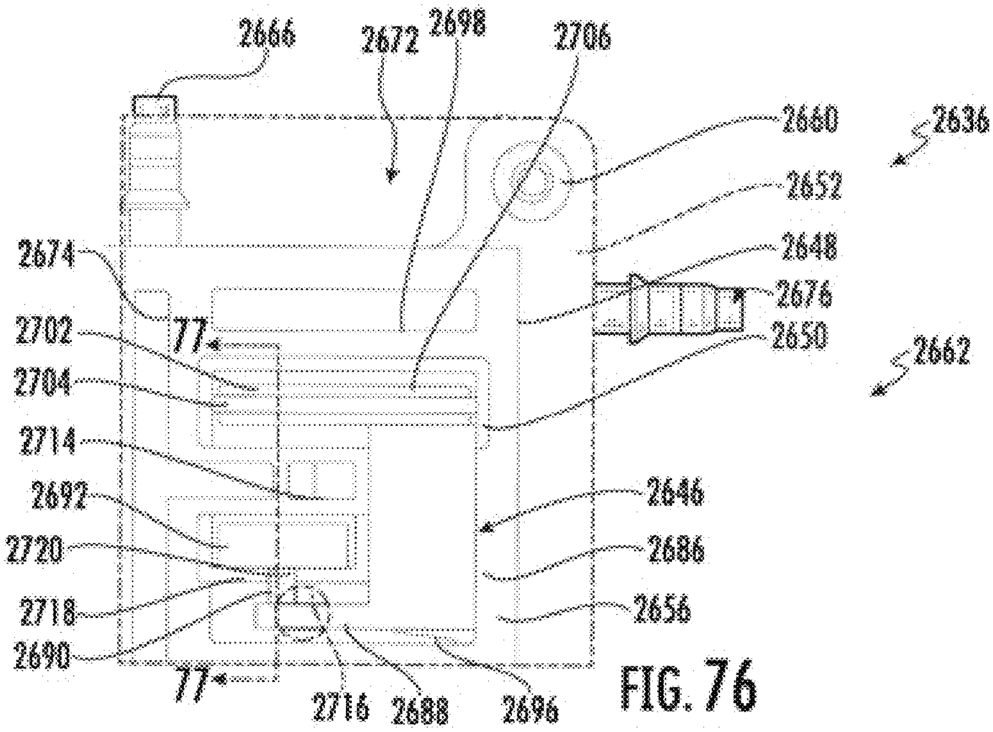
FIG. 76 is an enlarged front elevation view of the gate valve subassembly of FIG. 73, illustrated in a second condition.
Figure 77:
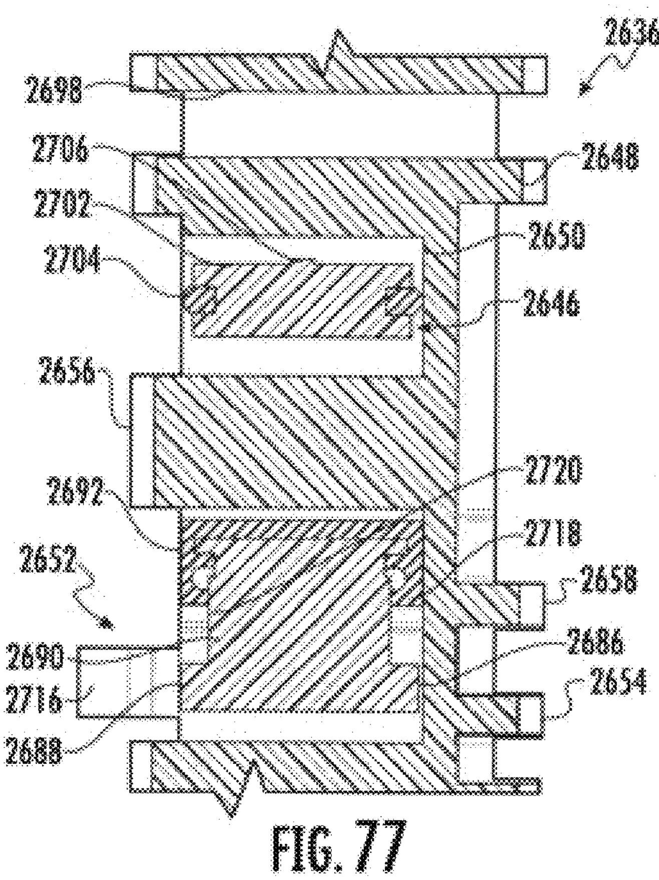
FIG. 77 is a section view of the gate valve subassembly taken along section line 77-77 in FIG. 76.

As depicted in FIGS. 73-75, the valve body 2686 includes a piston 2702 facing the control inlet 2700. The piston 2702 has a rectangular cross section and a rectangular surface area for receipt of the pressurized air from the control inlet 2700. A seal 2704 is formed about the piston body 2702 spaced apart from the distal end of the piston body 2702 to engage an inner wall of the fluid chamber 2650. The seal 2704 is tapered to narrow away from the piston body 2702 like a wiper, to provide firm, yet minimized, contact with the fluid chamber 2650. The taper of the seal 2704 minimizes friction between the seal 2704 and the fluid chamber 2650 to optimize efficiency of the piston 2702. Projections 2706 are formed upon the piston 2702 surface to provide a gap, or an open volume for receipt of the pressurized air. As illustrated in FIG. 75, a receptacle 2708 is formed into the valve body 2686. A locator 2710 extends from the housing 2648 into the receptacle 2708 to ensure installation of the correct valve body 2686. Likewise, the lateral extension 2688 is larger for the constant inflation piston 2702 so that the constant inflation piston 2702 cannot be installed in fluid chamber 2650 for one of the constant deflation valve subassemblies 2646. Pressurized air upon the piston 2702 actuates the valve body 2686 thereby releasing the valve seal 2692 from the fill inlet 2684 as illustrated in FIGS. 76 and 77.

With reference now to FIG. 74, during an inflation operation, pressurized air is conveyed through the control connectors 2676, the buses 2678, the transverse channels 2698, the control inlets 2700, and upon the piston body 2702 to actuate the valve body 2686 to release the valve seal 2692 from the fill inlet 2684. Likewise, during the inflation operation, pressurized air is also conveyed through the fill connectors 2666, the buses 2674, the lateral fluid lines 2682, and through the fill inlets 2684 into the fluid chamber 2650. Ports 2712 are formed through the fluid chamber 2650 to permit the pressurized air to pass through the fluid chamber 2650. Each port 2712 is connected to one of the port connectors 2680 by a port channel 2714 to convey the pressurized air along the port channel 2714 and out of the port connector 2680. The valve seal 2692 is sized to seal the port 2712 with the fill inlet 2684 in the closed condition, and to open the port 2712 in the open condition.

A plurality of vents 2716 are formed through the cover 2652 to vent a region of the fluid chamber 2650 to the atmosphere. The vents 2716 prevent a backpressure within the air chamber 2650 as the valve body 2686 is actuated, which may otherwise inhibit translation of the valve body 2686. The housing 2648 includes a region divider 2718 for separating the vent 2716 from the fill inlet 2684 and the port 2712. An aperture 2720 is formed through the divider 2718 to permit the longitudinal extension 2690 of the valve body 2686 to pass through. In the inflate position, the valve seal 2692 engages the divider 2718 to seal the aperture 2720 to prevent the pressurized air from the fill inlet 2684 from exiting through the vent 2716.

For the constant inflation row 2662, pressurized air is provided to the piston 2702 to actuate the valve body 2686 to remove the seal 2692 from the fill inlet 2684 and the port 2712. The pressurized air is also provided through the fill inlet 2684, into the fluid chamber 2650, and through the port 2712 to the actuator 2634. If pressure is discontinued at the fill valve assemblies 2638, the logic valve assemblies 2640, or both, then inflation of the actuators 2634 is discontinued.

Figure 78:
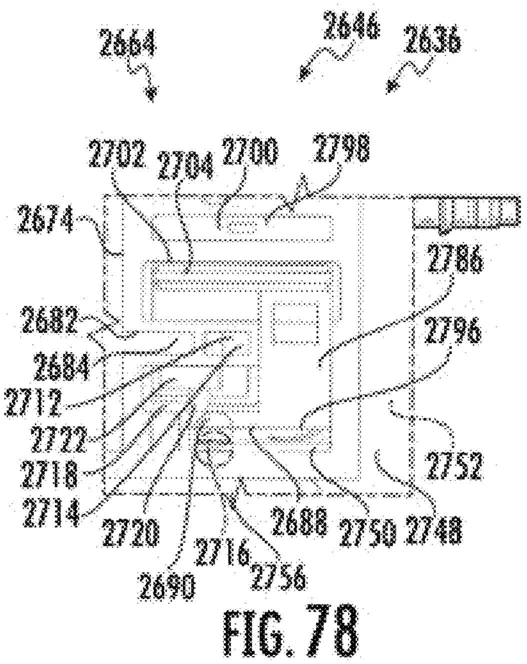
FIG. 78 is an enlarged front perspective view of another gate valve subassembly of the gate valve assembly of FIG. 71, illustrated in a first condition.

FIG. 78 illustrates a gate valve subassembly 2646 from the constant deflation row 2664. The gate valve subassembly 2646 is similar to the prior embodiment of the constant inflation row 2662. However, the gate valve subassembly 2646 includes a seal 2722 that only seals the fill inlet 2684, while not engaging the port 2712. Therefore, when pressurized fluid is not presented to the fluid chamber 2650, then the pressurized fluid is permitted to exit the fluid actuator 2632, back through the port 2712 into the fluid chamber 2650, and out of the vent 2716 to deflate the actuator 2632.

When compressed air is conveyed through the control inlet 2700, the piston 2702 is pressed and actuated with the valve body 2686, thereby compressing the spring 2696 and removing the seal 2722 from the fill inlet 2684 and sealing the aperture 2720 to prevent the pressurized fluid from egressing through the vent 2716. If forced air is also conveyed through the bus 2674, through the lateral fluid line 2682, through the fill inlet 2684, then the air passes through the fluid chamber 2650, and out of the port 2712 to the fluid actuator 2632.

If pressurized fluid is presented through the bus 2674 and the lateral fluid line 2682 only, the fluid does not pass the fluid inlet 2684 due to the seal 2722, thereby permitting deflation of the fluid actuator 2632 through the port 2712 and the vent 2716. If pressurized fluid is presented to actuate the valve body 2686 only, then the seal 2722 is moved from the fill inlet 2684 to the aperture 2720, whereby the fluid actuators 2632 are not inflated or deflated without pressurized air in the bus 2674 and the lateral fluid line 2682.

An assembly is described (e.g., seating system 2620, gate valve assembly 2636) with a housing (e.g., housing 2648) with a matrix (e.g., matrix 2636) of fluid chambers (e.g., fluid chambers 2650). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The matrix may be a linear array of two by three, e.g., two by three, one by four, three by six, four by four, six by nine. A plurality of gate valves (e.g., gate valve subassemblies 2646) is each provided in one of the matrix (e.g., matrix 2636) of fluid chambers (e.g., fluid chambers 2650). The gate valves may each include a valve body for translation within the fluid chamber, towards and away from the fill inlet. The valve body may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A plurality of inflate pressure inlets (e.g., inflate connectors 2666) is each in fluid cooperation with a subset (e.g., subset 2662, 2664, 2668, 2670, 2672) of the fluid chambers (e.g., fluid chambers 2650) and a first source of pressurized fluid (e.g., fill valve assembly 2638, logic valve assembly 2640, pump 2642). The connector may be barbed for connection to hoses for receipt of pressurized air. The subset may be a plurality of inflate pressure valves, each in fluid cooperation with one of the plurality of inflate pressure inlets and in electrical communication with the controller to regulate a flow of the first source of pressurized fluid into each of the plurality of inflate pressure inlets. Each of the connectors may be connected to a bus that extends along the length of each column or row for fluid communication with each fluid chamber within the respective row. A plurality of control pressure inlets (e.g., control connectors 2676) is each in fluid cooperation with one fluid chamber (e.g., fluid chambers 2650) of each subset (e.g., subset 2662, 2664, 2668, 2670, 2672) of the fluid chambers (e.g., fluid chambers 2650) and a second source of pressurized fluid (e.g., fill valve assembly 2638, logic valve assembly 2640, pump 2642). The connector may be barbed for connection to hoses for receipt of pressurized air. The subset may be a plurality of control pressure valves, each in fluid cooperation with one of the plurality of control pressure inlets and in electrical communication with the controller to regulate a flow of the second source of pressurized fluid into each of the plurality of control pressure inlets. Each of the connectors may be connected to a bus that extends along the length of each column or row for fluid communication with each fluid chamber within the respective row. A plurality of ports (e.g., port connectors 2680) is each in fluid cooperation with one of the matrix (e.g., matrix 2636) of fluid chambers (e.g., fluid chambers 2650) to inflate a fluid actuator (e.g., actuators 2632, 2634) when pressurized fluid is conveyed through the corresponding inflate pressure inlet (e.g., inflate connectors 2666) and the corresponding control pressure inlet (e.g., control connectors 2676) of the corresponding fluid chamber (e.g., fluid chambers 2650), and to deflate the fluid actuator (e.g., actuators 2632, 2634) when pressurized fluid is not conveyed through at least one of the corresponding inflate pressure inlet (e.g., inflate connectors 2666) and the corresponding control pressure inlet (e.g., inflate connectors 2666) of the corresponding fluid chamber (e.g., fluid chambers 2650). The connector may be barbed for connection to hoses for receipt of pressurized air. A controller (e.g., controller 2644) is in communication with the first source of pressurized fluid (e.g., fill valve assembly 2638, logic valve assembly 2640, pump 2642) and the second source of pressurized fluid (e.g., fill valve assembly 2638, logic valve assembly 2640, pump 2642) so that a first subset (e.g., subset 2662, 2664, 2668, 2670, 2672) of the plurality of gate valves (e.g., gate valve subassemblies 2646) is operated in a constant inflation position. At least one of the first subset of the plurality of gate valves may have a first condition wherein the corresponding vent is closed, and the corresponding port is closed, a second condition wherein the corresponding vent is closed, and the corresponding port is open, and a third condition wherein the corresponding vent is open, and the corresponding port is closed to contain the pressurized fluid in the corresponding fluid actuator. A second subset (e.g., subset 2662, 2664, 2668, 2670, 2672) of the plurality of gate valves (e.g., gate valve subassemblies 2646) is operated in a constant deflation position. At least one of the second subset of the plurality of gate valves may have a first condition wherein the corresponding vent is open, and the corresponding port is closed, and a second condition wherein the corresponding vent is closed, and the corresponding port is open.

In some embodiments, a plurality of inflate pressure valves (e.g., fill valve assembly 2638, logic valve assembly 2640), is each in fluid cooperation with one of the plurality of inflate pressure inlets (e.g., inflate connectors 2666) and in electrical communication with the controller (e.g., controller 2644) to regulate a flow of the first source of pressurized fluid (e.g., fill valve assembly 2638, logic valve assembly 2640, pump 2642) into each of the plurality of inflate pressure inlets (e.g., inflate connectors 2666).

In some embodiments, a plurality of control pressure valves (e.g., fill valve assembly 2638, logic valve assembly 2640), is each in fluid cooperation with one of the plurality of control pressure inlets (e.g., control connectors 2676) and in electrical communication with the controller (e.g., controller 2644) to regulate a flow of the second source of pressurized fluid (e.g., fill valve assembly 2638, logic valve assembly 2640, pump 2642) into each of the plurality of control pressure inlets (e.g., control connectors 2676).

In some embodiments, a source of pressurized air (e.g., pump 2642) is in fluid communication with the plurality of inflate pressure valves (e.g., fill valve assembly 2638, logic valve assembly 2640) and the plurality of control pressure valves (e.g., fill valve assembly 2638, logic valve assembly 2640, pump 2642).

In some embodiments a plurality of vents (e.g., vent 2716), is each in fluid cooperation with one of the matrix (e.g., matrix 2636) of fluid chambers (e.g., fluid chambers 2650).

In some embodiments, at least one of the first subset (e.g., subset 2662, 2664, 2668, 2670, 2672) of the plurality of gate valves (e.g., gate valve subassemblies 2646) has a first condition wherein the corresponding vent (e.g., vent 2716) is closed and the corresponding port (e.g., port connectors 2680) is closed, a second condition wherein the corresponding vent (e.g., vent 2716) is closed and the corresponding port (e.g., port connectors 2680) is open, and a third condition wherein the corresponding vent (e.g., vent 2716) is open and the corresponding port (e.g., port connectors 2680) is closed to contain the pressurized fluid in the corresponding fluid actuator (e.g., actuator 2632, 2634).

In some embodiments, at least one of the second subset (e.g., subset 2662, 2664, 2668, 2670, 2672) of the plurality of gate valves (e.g., gate valve subassemblies 2646) has a first condition wherein the corresponding vent (e.g., vent 2716) is open, and the corresponding port (e.g., port connectors 2680) is closed, and a second condition wherein the corresponding vent (e.g., vent 2716) is closed and the corresponding port (e.g., port connectors 2680) is open.

In some embodiments, a plurality of air bladders (e.g., actuators 2632, 2634), is each in fluid communication with one of the plurality of ports (e.g., port connectors 2680). The air bladders may be lumbar bladders, bolster bladders, and/or shoulder bladders.

In some embodiments, a seat bottom (e.g., seat bottom 2622) and a seat back (e.g., seat back 2624) are provided. The fluid actuator (e.g., actuators 2632, 2634) may be oriented in the seat bottom (e.g., seat bottom 2622) or the seat back (e.g., seat back 2624). The seat bottom may have a contact surface to support a pelvis and thighs of an occupant. The seat back may have a contact surface to support a back and shoulders of the occupant. The fluid actuator may impart a tactile effect upon the occupant, such as a vibration for conveying an alert, vibration for imparting a massage, pressure for imparting a pressurized massage effect, such as fluid bladders, such as air bladders, such as lumbar bladders, bolster bladders, and/or shoulder bladders.

An assembly is described (e.g., seating system 2620, gate valve assembly 2636) with a piston body (e.g., piston 2702) with a rectangular cross section, and a seal (e.g., seal 2704) oriented about the piston body (e.g., piston 2702) to engage an inner wall of a fluid chamber (e.g., fluid chamber 2650). The valve body may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The seal may be elastomeric and may be tapered to narrow away from the piston body, spaced apart from a distal end of the piston body.

In some embodiments, the piston seal (e.g., seal 2704) is tapered to narrow away from the piston body (e.g., piston 2702).

In some embodiments, the piston seal (e.g., seal 2704) is spaced apart from a distal end of the piston body (e.g., piston 2702). A projection (e.g., projection 2706) is provided on the distal end to maintain a gap between the distal end and the fluid chamber (e.g., fluid chamber 2650).

In some embodiments, a housing (e.g., housing 2648) is provided with the fluid chamber (e.g., fluid chambers 2650), wherein the piston body (e.g., piston 2702) and piston seal (e.g., seal 2704) are oriented in the fluid chamber (e.g., fluid chamber 2650). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere.

In some embodiments, an inlet (e.g., inflate connectors 2666) is in the housing (e.g., housing 2648) into the fluid chamber (e.g., fluid chamber 2650) for receipt of a pressurized fluid on a distal end of the piston body (e.g., piston 2702). The connector may be barbed for connection to hoses for receipt of pressurized air. The subset may be a plurality of inflate pressure valves, each in fluid cooperation with one of the plurality of inflate pressure inlets and in electrical communication with the controller to regulate a flow of the first source of pressurized fluid into each of the plurality of inflate pressure inlets. Each of the connectors may be connected to a bus that extends along the length of each column or row for fluid communication with each fluid chamber within the respective row.

In some embodiments a valve body (e.g., valve body 2686) extends from the piston body (e.g., piston 2702) to be actuated by the piston body (e.g., piston 2702). The valve body may be formed from a lightweight and resilient material such as a polymeric material, such as polypropylene and may be reinforced with fiberglass, or formed from an aluminum alloy, with an elastomeric valve seal.

In some embodiments, a valve seal (e.g., valve seal 2692) is on the valve body (e.g., valve body 2686). The valve seal may be elastomeric.

In some embodiments, an inflate pressure inlet (e.g., inflate connectors 2666) is formed in the housing (e.g., housing 2648) into the fluid chamber (e.g., fluid chamber 2650). The connector may be barbed for connection to hoses for receipt of pressurized air. A port (e.g., port connectors 2680) is formed in the housing (e.g., housing 2648) into the fluid chamber (e.g., fluid chamber 2650). The connector may be barbed for connection to hoses for receipt of pressurized air. The valve seal (e.g., valve seal 2692) engages the port (e.g., port connectors 2680) in a closed position of the port (e.g., port connector 2680).

In some embodiments, a biasing member (e.g., spring 2696) such as a compression spring, cooperates with the housing (e.g., housing 2648) and the valve body (e.g., valve body 2686) to bias the valve seal (e.g., valve seal 2692) into engagement with the port (e.g., port connector 2680).

In some embodiments, a vent (e.g., vent 2716) is formed in the housing (e.g., housing 2648) to vent the fluid chamber (e.g., fluid chamber 2650).

In some embodiments, the valve seal (e.g., valve seal 2692) engages the vent (e.g., vent 2716) in an open position of the port (e.g., port connector 2680) to permit pressurized fluid to pass from the inflate pressure inlet (e.g., inflate connectors 2666) to the port (e.g., port connector 2680).

In some embodiments, a seat bottom (e.g., seat bottom 2622) and a seat back (e.g., seat back 2624) are provided. The fluid actuator (e.g., actuators 2632, 2634) may be oriented in the seat bottom (e.g., seat bottom 2622) or the seat back (e.g., seat back 2624) in fluid communication with the fluid chamber (e.g., fluid chamber 2650).

An assembly is described (e.g., seating system 2620, gate valve assembly 2636) with a housing (e.g., housing 2648) with a matrix (e.g., matrix 2636) of fluid chambers (e.g., fluid chambers 2650). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The matrix may be a linear array of two by three, e.g., two by three, one by four, three by six, four by four, six by nine. An assembly is described (e.g., seating system 2620, gate valve assembly 2636) with a housing (e.g., housing 2648) with a matrix (e.g., matrix 2636) of fluid chambers (e.g., fluid chambers 2650). The housing may be formed from a lightweight and structurally resilient material such as a polymeric material, or a lightweight metallic alloy, with gaskets, covers, fasteners, laser welds, friction welds, and/or adhesives. The second port may be parallel with the first port. The third port may be axially aligned with the first port. The fluid chamber may vent to an external atmosphere. The matrix may be a linear array of two by three, e.g., two by three, one by four, three by six, four by four, six by nine. Each gate valve comprises a piston body (e.g., piston 2702) with a rectangular cross section. The valve body may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A seal (e.g., seal 2704) is oriented about the piston body (e.g., piston 2702) to engage an inner wall of a fluid chamber (e.g., fluid chamber 2650). The seal may be elastomeric and may be tapered to narrow away from the piston body, spaced apart from a distal end of the piston body. A valve body (e.g., valve body 2686) extends from the piston body (e.g., piston 2702) to be actuated by the piston body (e.g., piston 2702). A valve seal (e.g., valve seal 2692) is on the valve body (e.g., valve body 2686). The valve seal may be elastomeric. A plurality of inflate pressure inlets (e.g., inflate connectors 2666) is each in fluid cooperation with a subset (e.g., subset 2662, 2664, 2668, 2670, 2672) of the fluid chambers (e.g., fluid chambers 2650) and a first source of pressurized fluid (e.g., fill valve assembly 2638, logic valve assembly 2640, pump 2642). The connector may be barbed for connection to hoses for receipt of pressurized air. Each of the connectors may be connected to a bus that extends along the length of each column or row for fluid communication with each fluid chamber within the respective row. A plurality of inflate pressure valves (e.g., fill valve assembly 2638, logic valve assembly 2640), is each in fluid cooperation with one of the plurality of inflate pressure inlets (e.g., inflate connectors 2666) to regulate a flow of the first source of pressurized fluid (e.g., fill valve assembly 2638, logic valve assembly 2640, pump 2642) into each of the plurality of inflate pressure inlets (e.g., inflate connectors 2666). A plurality of control pressure inlets (e.g., control connectors 2676) is each in fluid cooperation with one fluid chamber (e.g., fluid chambers 2650) of each subset (e.g., subset 2662, 2664, 2668, 2670, 2672) of the fluid chambers (e.g., fluid chambers 2650) and a second source of pressurized fluid (e.g., fill valve assembly 2638, logic valve assembly 2640, pump 2642). The connector may be barbed for connection to hoses for receipt of pressurized air. Each of the connectors may be connected to a bus that extends along the length of each column or row for fluid communication with each fluid chamber within the respective row. A plurality of control pressure valves (e.g., fill valve assembly 2638, logic valve assembly 2640), is each in fluid cooperation with one of the plurality of control pressure inlets (e.g., control connectors 2676) to regulate a flow of the second source of pressurized fluid (e.g., fill valve assembly 2638, logic valve assembly 2640, pump 2642) into each of the plurality of control pressure inlets (e.g., control connectors 2676). A plurality of ports (e.g., port connectors 2680) is each in fluid cooperation with one of the matrix (e.g., matrix 2636) of fluid chambers (e.g., fluid chambers 2650) to inflate a fluid actuator (e.g., actuators 2632, 2634) when pressurized fluid is conveyed through the corresponding inflate pressure inlet (e.g., inflate connectors 2666) and the corresponding control pressure inlet (e.g., control connectors 2676) of the corresponding fluid chamber (e.g., fluid chambers 2650), and to deflate the fluid actuator (e.g., actuators 2632, 2634) when pressurized fluid is not conveyed through at least one of the corresponding inflate pressure inlet (e.g., inflate connectors 2666) and the corresponding control pressure inlet (e.g., inflate connectors 2666) of the corresponding fluid chamber (e.g., fluid chambers 2650). The connector may be barbed for connection to hoses for receipt of pressurized air. The valve seal (e.g., valve seal 2692) engages the port (e.g., port connectors 2680) in a closed position of the port (e.g., port connector 2680). A controller (e.g., controller 2644) is in communication with the plurality of inflate pressure valves (e.g., fill valve assembly 2638, logic valve assembly 2640) and the plurality of control pressure valves (e.g., fill valve assembly 2638, logic valve assembly 2640) to regulate operation of the plurality of inflate pressure valves (e.g., fill valve assembly 2638, logic valve assembly 2640) and the plurality of control pressure valves (e.g., fill valve assembly 2638, logic valve assembly 2640) so that a first subset (e.g., subset 2662, 2664, 2668, 2670, 2672) of the plurality of gate valves (e.g., gate valve subassemblies 2646) is operated in a constant inflation position. The constant inflation position may be wherein at least one of the first subset of the plurality of gate valves has a first condition wherein the corresponding vent is closed and the corresponding port is closed, a second condition wherein the corresponding vent is closed and the corresponding port is open, and a third condition wherein the corresponding vent is open and the corresponding port is closed to contain the pressurized fluid in the corresponding fluid actuator. A second subset (e.g., subset 2662, 2664, 2668, 2670, 2672) of the plurality of gate valves (e.g., gate valve subassemblies 2646) is operated in a constant deflation position. The constant deflation position may be wherein at least one of the second subset of the plurality of gate valves has a first condition wherein the corresponding vent is open and the corresponding port is closed, and a second condition wherein the corresponding vent is closed and the corresponding port is open.

Figure 79:
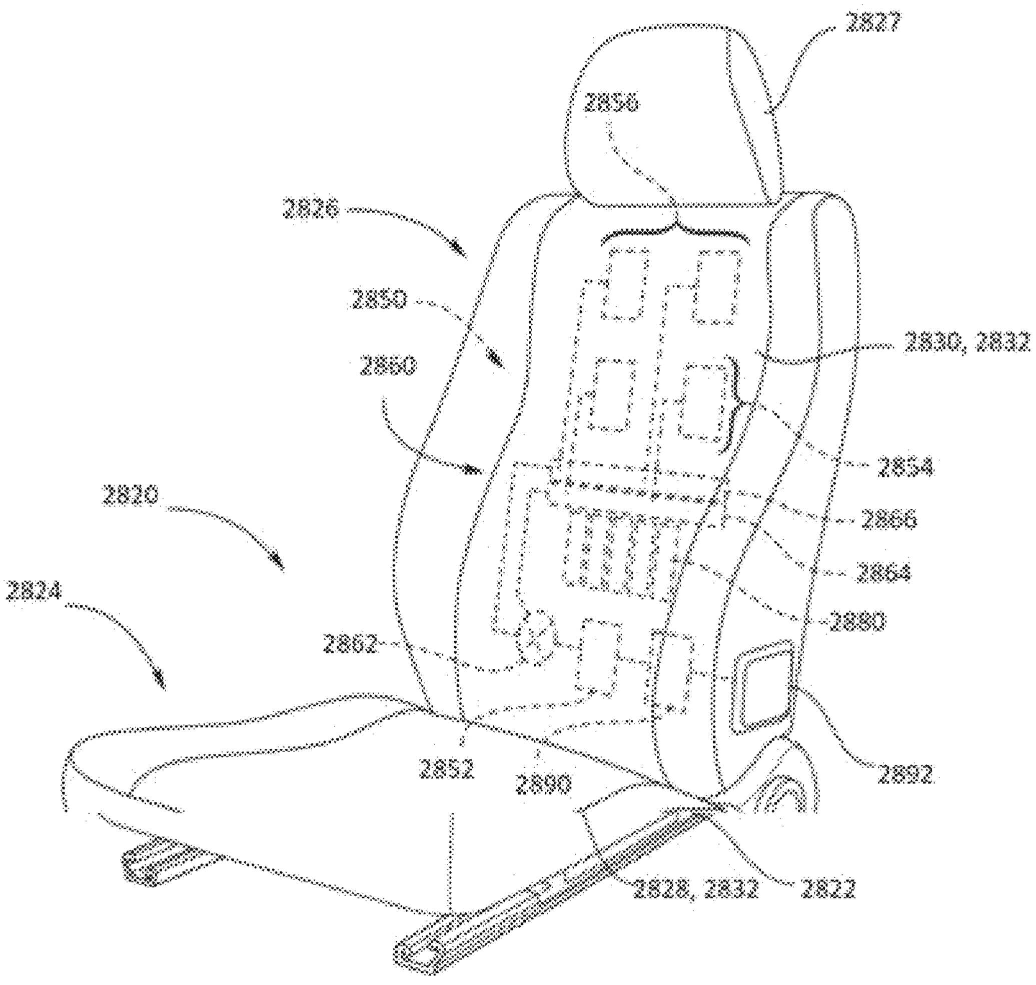
FIG. 79 illustrates a perspective schematic view of a seat assembly according to some embodiments.

Referring to FIG. 79, a seat assembly 2820, such as a vehicle seat assembly 2820 is illustrated. In other examples, the seat assembly 2820 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 2820 may be configured for use with other non-vehicle applications.

The seat assembly 2820 has a support structure 2822 that may be provided by one or more support members. A support member may be provided by a frame and/or a substrate. The seat assembly has seat components, and these seat components include at least a seat bottom 2824 and a seat back 2826. The seat bottom 2824 may be sized to receive a seated occupant to support a pelvis and thighs of the occupant. The seat back 2826 may be sized to extend upright from the seat bottom 2824 to support a back of the occupant. The seat assembly may additionally have a head restraint 2827. The seat bottom 2824 has a seat bottom cushion 2828. The seat back 2826 has a seat back cushion 2830. The support structure 2822 provides rigid structural support for the seat components, e.g., the seat bottom 2824 and seat back 2826, and the associated cushions 2828, 2830. One or more trim assemblies 2832 are used to cover the seat bottom cushion 2828 and/or the seat back cushion 2830, and provide a seating surface for the seat assembly 2820.

The seat assembly 2820 has one or more fluid systems 2850, such as an air system. Although only one fluid system 2850 is shown, it is also contemplated that the seat assembly 2820 may have two or more fluid systems 2850. The fluid system 2850 has a fluid transfer device 2852 to provide pressurized fluid flow or air flow to one or more series of bladder assemblies 2854, 2856 in the seat assembly 2820. Each series of bladder assemblies 2854, 2856 may be associated with a separate fluid sub-system. The fluid transfer device 2852 may be a fan, air pump, compressor, blower, pump, or the like to provide flow of a fluid. The seat assembly 2820 is shown with two series of bladder assemblies 2854, 2856. However, the seat assembly 2820 may have more than two series of bladder assemblies, and may have any number of bladders within each series. Although the bladders 2854, 2856 are only shown in the seat back 2826, they may additionally or alternatively be located in the seat base 2824.

The fluid system 2850 may provide a massage function, for example via bladders 2856 positioned within the seating component(s); a lumbar control function with one or more bladders 2854 positioned within the seating component(s); or other seat position controls with bladders, such as bladders 2854, appropriately positioned in the seating component(s), e.g., to control the angle or tilt of cushion and associated support pan of the seat component relative to its associated frame 2822. In other examples, the fluid system 2850 may be used for other seat functions and/or features as are known in the art. The fluid system 2850 may provide fluid flow to one or more of the bladder assemblies 2854 for static inflation where the bladder holds its position at a selected inflation level, e.g., for lumbar or seat position functions, or may provide fluid flow to one or more of the bladder assemblies 2856 for dynamic inflation where the bladder inflation or position changes, e.g., for massage functions.

With reference to FIGS. 79-82, the fluid system 2850 is provided with a system 2860 as described below in greater detail to connect the fluid transfer device 2852 to the bladders 2854, 2856. Generally, a control valve 2862 connects the fluid transfer device to either a first rail 2864 in fluid communication with the first series of bladders 2854, or to a second rail 2866 in fluid communication with the second series of bladders 2856 depending on the valve 2862 position. Valves 2868, 2870 as described below are provided in each of the first and second rails 2864, 2866 to control fluid flow to and from the first and second bladders 2854, 2856, respectively. The valves 2868, 2870 are stacked or otherwise arranged to be adjacent to one another, and furthermore may be directly coupled to one another. In further examples, additional valves may be stacked onto valves 2868, 2870, and controlled using the same actuator as described below.

Two actuators 2880 are provided for each pair of valves 2882, with each pair of valves 2882 including one valve 2868 and two valves 2870. The actuator 2880 has an actuator member 2884. The actuator 2880 may be provided by a solenoid, or other actuator, and in various examples, the actuator member 2884 is a rod of a linear actuator, such as in a linear solenoid actuator or a shape-memory alloy (SMA) linear actuator. Each actuator member 2884 moves between a first position and a second position, and is coupled to the first and second valves 2868, 2870 in a pair of valves 2882. In various non-limiting examples, the system 2860 therefore has at least twice as many valves 2868, 2870 as actuators 2880 and actuator members 2884. Each actuator 2880 and actuator member 2884 is uniquely paired with a valve 2868 and one of the valves 2870 in an associated pair of valves 2882, or pair of ports. As such, the number of actuators 2880 in the seat assembly 2820 may be reduced, or halved, which allows for installation in a reduced packaging space and reduced cost. As the same actuator is used to control the valves 2868, 2870 in two separate fluid subsystems, unique challenges arise in controlling the inflation and deflation of bladders in each of these subsystems, as an actuator 2880 may open both valves 2868, 2870 or closes both valves 2868, 2870 simultaneously.

The systems 2850, 2860 according to various embodiments are described in further detail below, and may be used to control fluid flow from the fluid transfer device 2852 to and from one or more of the bladder assemblies 2854, 2856 via control of the control valve 2862 and the actuators 2880.

The actuators 2880, the control valve 2862, and the fluid transfer device 2852 may each be in communication with a controller 2890 for control of the operation of the fluid system 2850 and valve system 2860, and the inflation or deflation of the bladder assemblies 2854, 2856. The controller 2890 may further be in communication with a user input 2892 to allow a seat occupant to control operation of the fluid system, or to select various functions, e.g., massage, massage speed, lumbar level, seat position angle, or the like.

Figure 80:
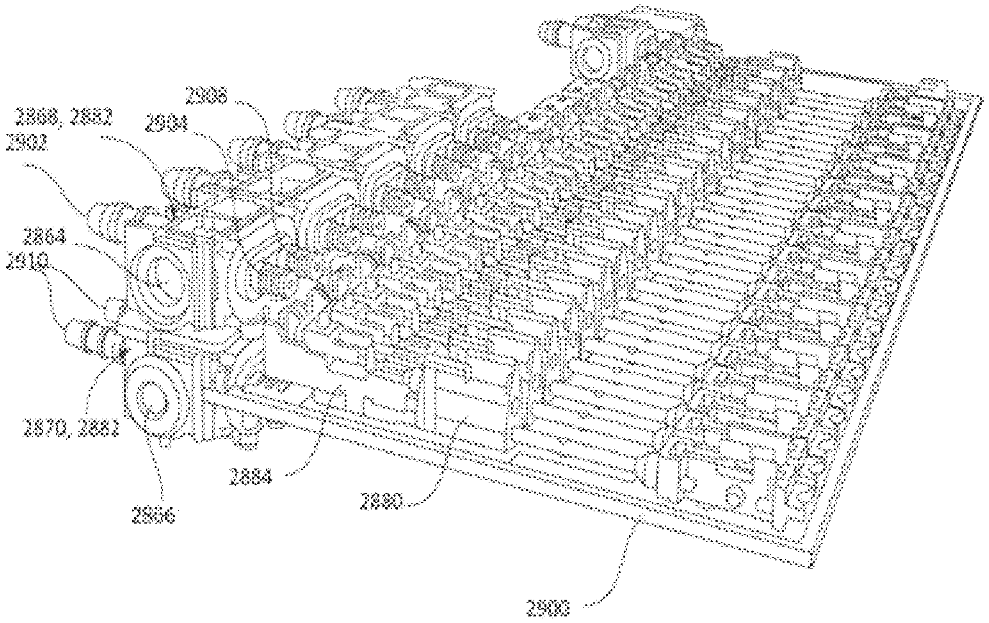
FIG. 80 illustrates a partially assembled valve system according to some embodiments and for use with the seat assembly of FIG. 79.
Figure 81:
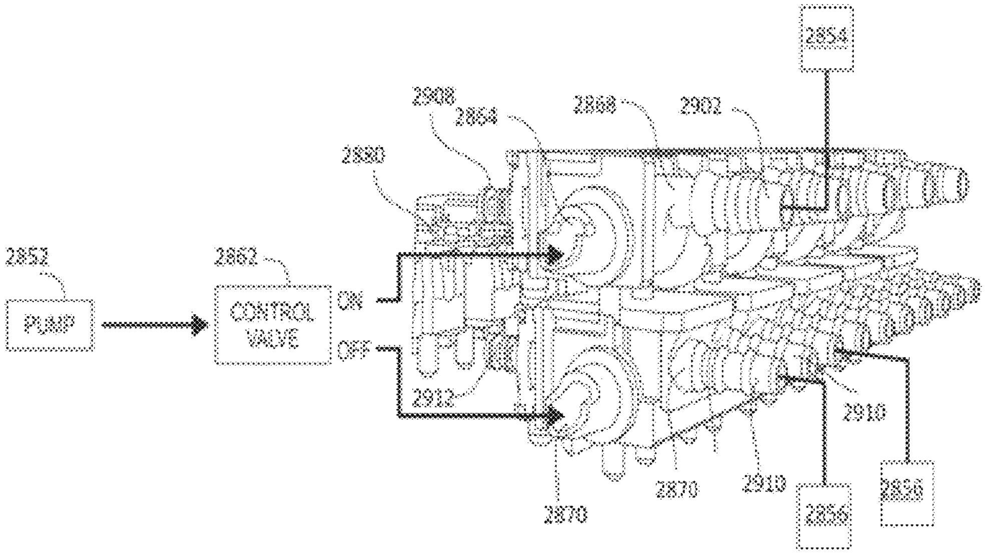
FIG. 81 illustrates a schematic view of the system of FIG. 80 integrated into a fluid system according to some embodiments and for use with the seat assembly of FIG. 79.
Figure 82:
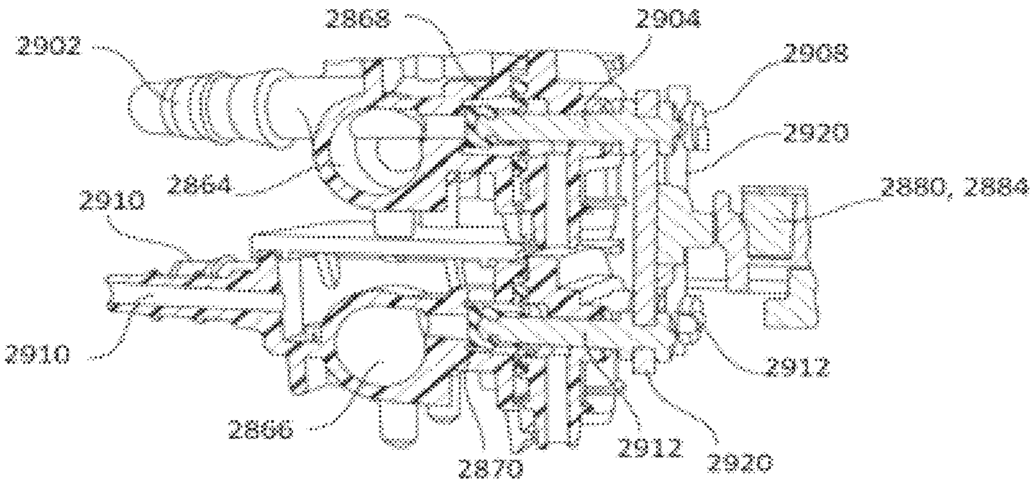
FIG. 82 illustrates a partial sectional view of the system of FIG. 80 illustrating a pair pf valves and an associated actuator.
Figure 83:
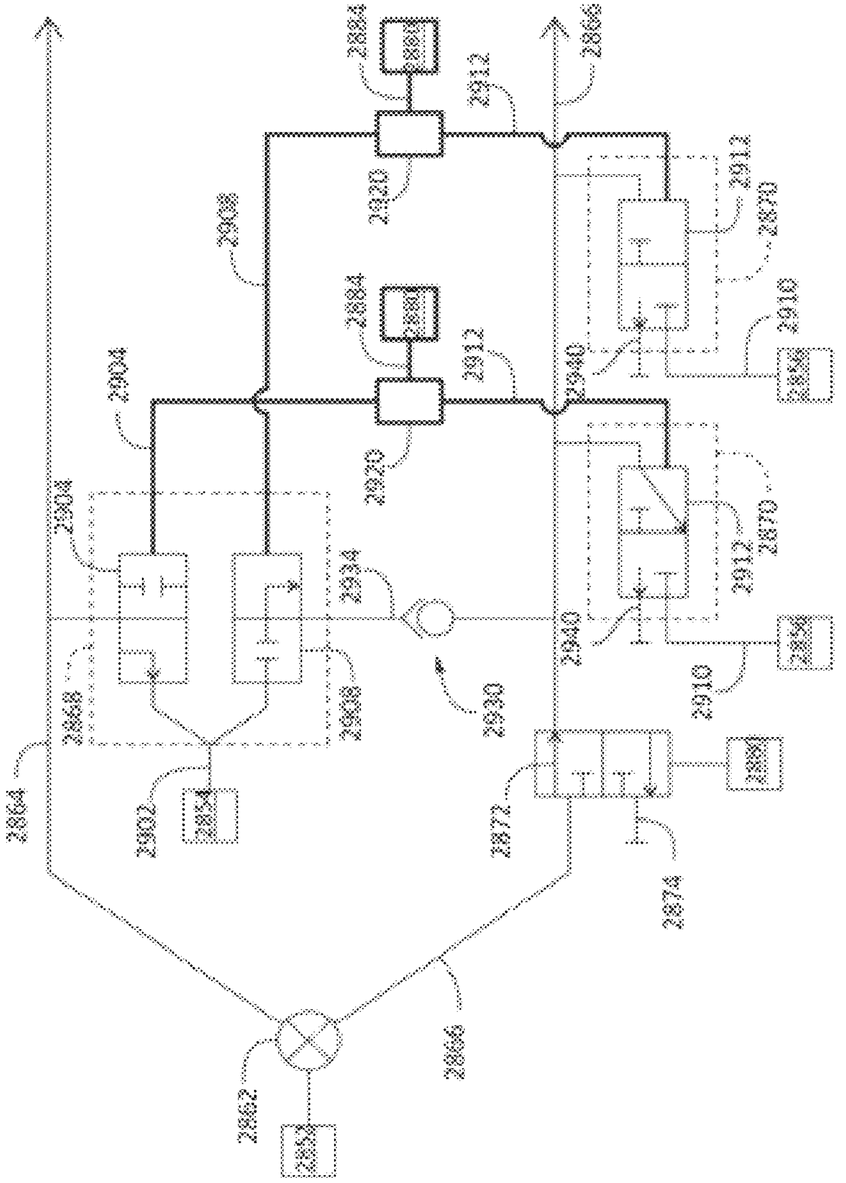
FIG. 83 illustrates a partial schematic view of the valve system of FIG. 80.

FIGS. 80-82 illustrate the valve system 2860 and fluid system 2850 according to some embodiments. FIG. 83 illustrates a schematic of the valve system 2860 with one valve 2870 and two valves 2868, and two actuators 2880, with additional series of valves 2870, 2868 contemplated with additional bladders 2854, 2856. In FIG. 80, the system 2860 is illustrated as being partially assembled in that not all of the valves 2868, 2870 have been installed, and the actuators 2880 have not been connected to all of the valves, e.g., the connector plate described below is omitted.

A first rail 2864 with a first series of valves 2868 is provided. A second rail 2866 with a second series of valves 2870 is provided. There is one valve 2868 for every two valves 2870, with the valves paired as described above and as shown in FIG. 83. The first rail 2864 and first series of valves 2868 may be stacked with, and furthermore, may be mounted to the second rail 2866 and the second series of valves 2870. Furthermore, the first and second rails 2864, 2866 may be mounted to a substrate 2900 as shown.

The first rail 2864 is connected to the pump 2852 via one or more control valves 2862, with a single control valve shown. The control valve 2862 may be a two-position valve in an example, and controllable between a first position to fluidly connect the pump 2852 with only the first rail 2864 to provide pressurized fluid flow thereto, and a second position to fluidly connect the pump 2852 with only the second rail 2866 to provide pressurized fluid flow thereto. The one or more control valves 2862 therefore control fluid flow from the pump 2852 to either the first rail 2864 or the second rail 2866. In other examples, there may be two pumps connected to and providing fluid flow to each of the associated rails 2864, 2866 separately. An additional vent valve 2872 may be provided in the second rail 2866 as shown to selectively fluidly couple the rail 2866 to atmosphere in order to vent or depressurize the rail 2866 by connecting the second rail 2866 to a vent line 2874. An actuator 2880 may be provided to control the vent valve 2874 position, or the vent valve 2874 may be otherwise controlled, e.g., pneumatically. The valve 2872 may be provided similarly to that described for valve 2870 in various non-limiting examples.

The series of first valves 2868 is connected to a series of first bladders 2854, such as lumbar bladders. Each first valve 2868 has a first port 2902 with an associated first valve element 2904 and an associated second valve element 2908. The first and second valve elements 2904, 2908 may each be provided with a valve stem and valve end that cooperates with the valve body to control fluid flow through the first valve 2868 and through the first port 2902. Each first valve 2868 connects to a first bladder 2854, with the first port 2902 fluidly coupled to the same first bladder 2854. The first bladder 2854 may be provided as static bladder, e.g., as a lumbar bladder, a bladder for controlling a seat position, or the like.

The first port 2902 of each of the first valves 2868 receives pressurized fluid from the first rail 2864 to inflate the bladder 2854, and the first valve element 2904 controls fluid flow between the first rail 2864 and the first port 2902, e.g., fluid flows from the first rail 2864 and into the first port 2902 to fill the bladder 2854 when the first valve element 2904 is in one position, or open position, and fluid is prevented from flowing from the first rail 2864 into the first port 2902 when the second valve element 2908 is in the other position. The first port 2902 of each of the first valves 2868 receives fluid flow from the associated bladder 2854 to deflate the bladder, with the first port 2902 fluidly connecting the first bladder 2854 to a vent line 2934 or to atmosphere, as described below. The second valve element 2908 controls fluid flow between the first port 2902 and atmosphere, e.g., fluid flows out of the first bladder 2854 through the first port 2902 when the second valve element 2908 is in one, open position, and fluid is prevented from flowing out of the first bladder 2854 and through the first port 2902 when the second valve element 2908 is in the other, closed position, e.g., to maintain inflation of the bladder 2854. The first valve element 2904 therefore controls fluid flow between the first rail 2864 and the first port 2902, and the second valve element 2908 controls fluid flow between the first port 2902 and atmosphere, e.g., via a vent line 2934 in the valve 2868. Two valve elements 2904, 2908 are therefore provided for each first valve 2868 to separately control flow to the associated bladder 2854 and from the associated bladder 2854.

The series of second valves 2870 is connected to a series of second bladders 2856, such as massage bladders. As shown, there may be two second valves 2870 associated with each first valve 2868. Each second valve 2870 has a second port 2910 with an associated third valve element 2912. The third valve element 2912 may be provided as a valve stem and valve end that cooperates with the valve body of the second valve 2870 to control fluid flow through the second valve 2870, and into or out of the associated second bladder 2856. Each second valve 2870 connects to a respective second bladder 2856, with the second port 2910 fluidly connected to the second bladder 2856. In other examples, multiple bladders may be connected to the second port 2910, e.g., in a serial and/or parallel flow arrangement. The second bladder 2856 may be provided as dynamic bladder, e.g., as a massage bladder, or the like. The second port 2910 of each of the second valves 2870 receives pressurized fluid from the second rail 2866 to inflate the bladder 2856, and also receives fluid flow from the associated bladder 2856 to deflate the bladder 2856.

Each third valve element 2912 controls fluid flow between the second rail 2866 and the second port 2910, and also between the second port 2910 and atmosphere via a vent port 2940 in the second valve 2870. For example, the third valve element 2912 may be in a first, open position to allow fluid flow from the second rail 2866 and into the second port 2910 to inflate the second bladder 2856, and the valve element 2912 blocks the port 2910 from the valve vent 2940 such that venting the second bladder 2856 is blocked. When the valve element 2912 is in a second, closed position, the port 2910 is in fluid communication with vent port 2940 or line that may be provided within the valve 2870 body, and fluid flows from the second bladder 2856 and to atmosphere, to deflate the second bladder 2856, and the valve element 2912 blocks inflation of the second bladder 2856 as the third valve element 2912 prevents flow between the second rail 2866 and the second port 2910. Therefore, the third valve element 2912 of the second valve 2870 moves between a first, open position to allow fluid flow from the second rail 2866 into the port 2910 and associated bladder 2856, and a second, closed position to allow fluid flow from the bladder 2856 and port 2910 to vent to atmosphere, e.g., via a vent line 2940 in the valve 2870 body.

A series of pairs of actuators 2880 are also provided. The actuator 2880 has an actuator member 2884, and may be a linearly actuated solenoid or an SMA actuator as described above in various examples. Each actuator member 2884 is movable between a first actuator position and a second actuator position. In the example shown, the actuator member 2884 moves linearly towards and away from the valves 2868, 2870.

One actuator 2880 in each pair of actuators has its actuator member 2884 coupled to both a first valve element 2904 of a first valve 2868, and a third valve element 2912 of a second valve 2870 for movement therewith. Another actuator 2880 in each pair of actuators has its actuator member 2884 coupled to both a second valve element 2908 in the first valve 2868, and a third valve element 2912 of another, adjacent second valve 2870 for movement therewith, with the another adjacent second valve 2870 fluidly coupled to another second bladder 2856 in the series of second bladders.

The actuator member 2884 of each actuator 2880 is therefore directly coupled to two valve elements of two different valves 2868, 2870 and associated bladders such that the two valve elements move directly with the associated actuator member. A connector plate 2920 or other connector element may be used to connect the actuator member to the two valve elements, and the connector plate 2920 may include keys or slots to engage the valve elements or stems, and the coupling plate pushes or pulls the valve elements as the actuator member is moved by the actuator. As shown in FIG. 82, one connector plate 2920 for one actuator 2880 is coupled to only valve element 2904 and the near valve element 2912, and another connector plate 2920 for another actuator 2880 is coupled to only valve element 2908 and the far valve element 2912.

In other examples, two series of first valves and first bladders may be provided for use in the system 2860, or two series of second valves and second bladders may be provided for use in the system 2860.

When one, first actuator 2880 in the pair of actuators is in a first position with associated valve elements 2904, 2912 in open positions, the first port 2902 of the first valve 2868 and the second port 2910 of one of the second valves 2870 is therefore open and in fluid communication with their associated first and second rail 2864, 2866. The first or second rail 2864, 2866 is selectively pressurized via the control valve 2862 to control which bladders 2854, 2856, are inflated. When the first actuator is in a second position, with associated valve elements 2904, 2912 in closed positions, the first port 2902 of the first valve 2868 is fluidly decoupled from the first rail 2864, and the third port 2910 of the one of the second valves 2870 also closed (e.g., permitting venting to atmosphere via vent 2940 in the valve body 2870).

When the other, second actuator in the pair of actuators is in a second position with associated valve elements 2908, 2912 in closed positions, the first port 2902 of the first valve 2868 is closed to prevent fluid flow from the port 2902 to the valve vent line 2934 and maintain inflation of the first bladder 2854, and the third port 2910 of the other of the second valves 2870 is in fluid communication with the vent line 2934 of the valve 2870 to deflate the other second bladder 2856. When the second actuator is in a first open position, with associated valve elements 2908, 2912 in open positions, the first port 2902 of the first valve 2868 is in fluid communication with the valve vent line 2934 to vent to atmosphere, and the third port 2910 of the other of the second valves 2870 also open to fluidly connect the second rail 2866 to the port 2910 (e.g., permitting inflation when the second rail 2866 is pressurized).

Therefore, the control valve 2862 is used in conjunction with the actuators 2880 to control the fluid flow pathway and control whether the first or second bladder 2854, 2856 is inflated, and how the first and second bladders 2854, 2856 are deflated. Using the system 2850 as described, the first bladder(s) 2854 and the second bladder(s) 2856 may not be able to be inflated at the same time, as only one of the two rails 2864, 2866 is pressurized.

In order to inflate one or more first bladders 2854 in the series of first bladders, the control valve 2862 is controlled to a first valve position such that fluid flows from the pump 2852, and to the first rail 2864, and does not flow to the second rail 2866. The actuators 2880 are controlled to the positions based on the selected first bladders 2854 for inflation. For a first bladder 2854 that is selected to be inflated, one associated actuator 2880 is controlled to move valve element 2904 to the open position to open the first port 2902 of the first associated valve 2868, such that fluid flows from the first rail 2864, through the port 2902, and into the first bladder 2854 (note that this likewise opens the valve element 2912 for the paired valve 2870, however, the bladder 2856 does not inflate as the second rail 2866 is not pressurized). The other associated actuator 2880 for the first bladder 2854 is controlled to move the valve element 2908 to a closed position to fluidly disconnect the first port 2902 of the first associated valve from the valve vent line 2934, such that fluid cannot flow from the first bladder 2854 and vent to atmosphere and the inflation is maintained (note that this likewise closes the valve element 2912 for the paired valve 2870, which places the bladder 2856 in fluid communication with atmosphere via the vent 2934 in the valve 2868, which deflates the bladder 2856 to the extent that there is any air present in it).

In order to inflate one or more second bladders 2856 in the series of second bladders, the control valve 2862 is controlled to a second valve position such that fluid flows from the pump 2852, and to the second rail 2866, and does not flow to the first rail 2864. The actuator 2880 associated with each second bladder 2856 are controlled between their two positions in a controlled manner to inflate and deflate the second bladder 2856, e.g., to provide a dynamic inflation and deflation, or massage effect, by selectively fluidly coupling the second port 2910 of the second valve with the pressurized second rail 2866 or with atmosphere, e.g., with a vent port 2940 within the valve 2870. For a second bladder 2856 that selected to be inflated, the associated actuator 2880 is controlled to move the valve element 2912 to an open position to open the second port 2910 of the associated second valve, such that fluid flows from the second rail 2866 and into the second bladder 2856. For a second bladder 2856 that selected to be deflated, the associated actuator 2880 is controlled to move to the other position to move the valve element 2912 to a closed position to close off the second port 2910 of the associated second valve from the second rail 2866, and open a pathway between the second port 2910 and atmosphere such that fluid flows from the second bladder 2856, through the third port 2910 and valve 2870, and to atmosphere. Note that valve elements 2904, 2908 may be moved depending on which valve element 2904, 2908 of the first valve 2868 is paired with the valve element 2912 via connector plate 2920.

In order to deflate the series of first bladders 2854, the actuator 2880 associated with the second valve element 2908 of the first valve 2868 is moved to a position to open the first port 2902 and allow fluid flow to exit the first bladder 2854 via the first port 2902, with the first valve element 2904 in a closed position to disconnect the port 2902 from the first rail 2864. In this configuration, the first port 2902 vents to atmosphere, examples of which are provided schematically in FIGS. 83-86. The second valve element 2908 may be moved to deflate the associated bladder 2854 with the first actuator 2880 closed and the first rail 2864 pressurized, or with the first rail 2864 unpressurized.

In one example, and for deflation of the series of first bladders 2854, the system 2850 has a check or relief valve 2930 associated with each first valve 2868 to fluidly connect the vent line 2934 of the valve 2868 to the second rail 2866 and second valve(s) 2870, either directly from the first valve 2868 or from a vent rail to the second rail 2866. In one example, the check valve 2930 is a passive valve, with the check valve 2930 opening when the pressure in the second rail 2866 is lower than the pressure in the vent line 2934, and closing when the pressure in the second rail 2866 is greater than the pressure in the vent line 2934. The first port 2902 of the first valve is placed in fluid communication with the vent line 2934 with the valve element 2908 in an open position such that is receives pressurized fluid from the first bladder 2854 and fluid flows to the vent line 2934 of the valve 2868. The vent valve 2872 may also be controlled to a position to fluidly connect the second rail 2866 to atmosphere. Therefore, the first bladder 2854 vents through the first port 2902 of the first valve with the valve element 2908 in an open position, through the vent line 2934 and check valve 2930, to the second rail 2866, and then to atmosphere via the vent port 2874 in the vent valve 2872.

When the first rail 2864 is pressurized for selective inflation of the first bladders 2854, the vent valve 2872 may be controlled to a vent position such that the second rail 2866 is unpressurized and in fluid communication with atmosphere via the vent line 2874, which also allows for selective deflation of the first bladders 2854. When the second rail 2866 is pressurized for selective inflation of the second bladders 2856, the vent valve 2872 may be controlled to a closed position such that the second rail 2866 is pressurized and the vent line 2874 is decoupled from the second rail 2866, which also allows for selective inflation and deflation of the first bladders 2854 via their respective valves 2870. When the system 2850, 2860 is inoperative, the valve 2872 may be in a vent position to allow for selected deflation of the first bladders 2854 to the extent that any are inflated.

In another example, and for deflation of the series of first bladders 2854, the system 2850 has a third vent rail 2936 fluidly coupled to each of the vent lines 2934 of the first valves to receive fluid flow therefrom depending on the position of the second valve element 2908. The third vent rail would be positioned between vents 2934 for each of the valves 2868 in the system 2860 and a single, common check valve 2930 in FIG. 83, with the check valve 2930 connecting the third rail 2936 to the second rail 2866. The third rail 2936 therefore provides a common vent rail for all of the first bladders 2854. The third vent rail 2936 is fluidly coupled to the second rail 2866 and second valves 2870 via a check valve 2930 or relief valve. In one example, the check valve 2930 is a passive valve, with the check valve 2930 opening when the pressure in the second rail 2866 is lower than the pressure in the third rail 2936, and closing when the pressure in the second rail 2866 is greater than the pressure in the third rail 2936. The first port 2902 is fluidly connected to the vent line 2934 of the first valve 2868 by opening valve element 2908 such that is receives pressurized fluid from the first bladder 2854. The vent valve 2872 may also be controlled to a position to fluidly connect the second rail 2866 to atmosphere. Therefore, the first bladder 2854 vents through the first port 2902 of the first valve with the valve element 2908 in an open position, through the vent line 2934 and common vent rail (along with fluid flow from any other deflating first bladders 2854), through check valve 2930, to the second rail 2866, and then to atmosphere via the vent port 2874 in the vent valve 2872. Therefore, the first bladder 2854 vents through the first port 2902 of the first valve 2868, past the valve element 2908 and through the vent line 2934 to the third rail 2936, through the check valve 2930, to the second rail 2866, and then to atmosphere via the vent 2874 in the vent valve 2872.

In other examples, the vent line 2934 of the first valve 2868 may be directly connected to atmosphere, e.g., such that the check valve 2930 and fluid connection to the second rail 2866 and the vent valve 2872 are not present.

By venting the first bladders 2854 into the second rail 2866, the time to pressurize the second rail 2866 may be reduced, leading to a reduced lag time for inflation of the second bladders 2856 after a request for operation. The first bladders 2854 may also maintain inflation or have reduced deflation as the pressure in the second rail 2866 limits opening of the check valve(s) 2930 to vent the bladder 2854. For individual check valves 2930 for each bladder 2854, cross-flow that may be otherwise permitted by the vent rail 2936 is prevented.

In either instance, when the second rail 2866 is pressurized, e.g., to inflate the second bladder(s) 2856, then the check valve 2930 is closed, and vent line 2934 or the third rail 2936 remains pressurized such that fluid flow does not flow from the port 2902 with the valve element 2908 in an open position, and the first bladder 2854 may not rapidly deflate.

Figure 84:
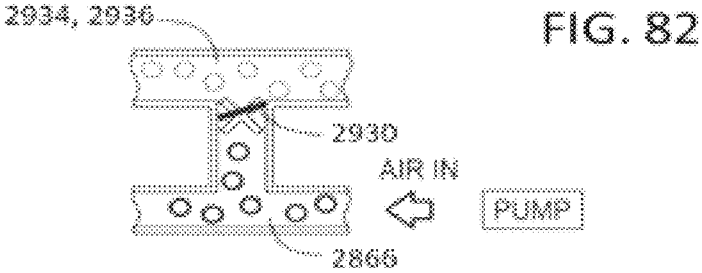
FIG. 84 illustrates a schematic view of a check valve in the system of FIGS. 80 and 83 in a first configuration.
Figure 85:
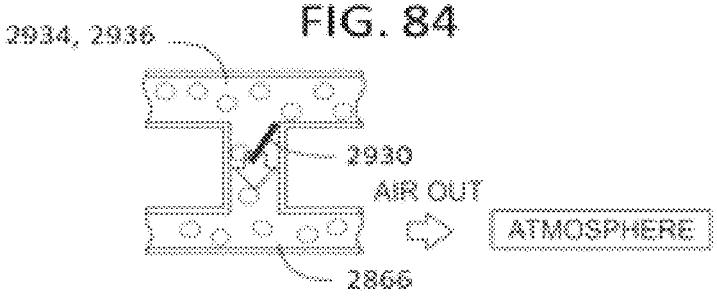
FIG. 85 illustrates a schematic view of a check valve in the system of FIGS. 80 and 83 in a second configuration.
Figure 86:
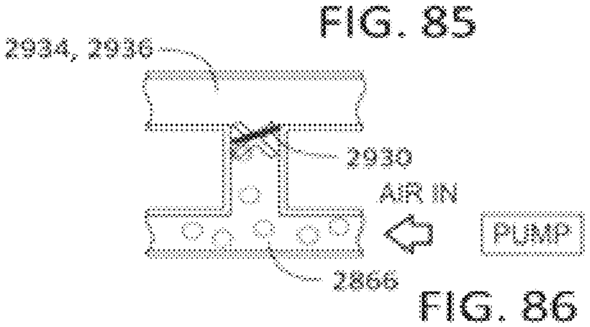
FIG. 86 illustrates a schematic view of a check valve in the system of FIGS. 80 and 83 in a third configuration.

FIGS. 84-86 illustrate schematic views of a check valve 2930 connecting the two fluid sub-systems of the fluid system 2850. In FIGS. 84-86, the vent line 2934 of the first valve 2868 (or the third vent rail 2936 if one is optionally provided) is connected to the second rail 2866 via the check valve 2930 or relief valve.

In FIG. 83, the check valve 2930 is closed as the pressure in the second rail 2866 is greater than the pressure in the vent line 2934, for example, when the pump 2852 is operating and the control valve 2862 fluidly couples the pump 2852 to the second rail 2866 in order to inflate the second bladder(s) 2856. As the check valve 2930 is closed, the first bladder(s) 2854 do not vent to atmosphere and maintain their inflation, even when the actuator 2880 connected to the second valve element 2908 and the other third valve element 2912 is moved to inflate the second bladder 2856 associated with the other third valve element, which causes the valve element 2908 to open and fluidly connect the first port 2902 of the first valve 2868 with the vent line 2934.

In FIG. 84, the check valve 2930 is opened as the pressure in the vent line 2934 is greater than the pressure in the second rail 2866, for example, when the pump 2852 is operating and the control valve 2862 fluidly couples the pump 2852 to the first rail 2864 in order to inflate the first bladder(s) 2854, or when the pump 2852 is off, such that the second rail 2866 is not pressurized by the pump 2852 via valve 2862. As the pump 2852 is not providing pressurized fluid to the second rail 2866, the pressure in the vent line 2934 is greater than the pressure in the second rail 2866, and the check valve 2930 opens to allow the first bladder 2854 to deflate. The actuator 2880 associated with the second valve element 2908 and the other third valve element 2912 is moved to allow the first bladder 2854 to deflate, which fluid flow from the vent line 2934, through the valve 2930, into the second rail 2866, and then to atmosphere via a vent passage 2874 in a vent valve 2872.

In FIG. 85, the pump 2852 is operating and the control valve 2862 is controlled to provide pressurized fluid to the second rail 2866; however, the actuator 2880 associated with the vent valve 2872 has not been actuated to connect the second rail 2866 to atmosphere via the vent line 2874. As such, the pressure in the second rail 2866 is greater than the pressure in the vent line 2934, and the check valve 2930 is closed.

In order to provide for deflation of one or more of the first bladder(s) 2854 when the second rail 2866 is pressurized and the second bladder(s) 2856 are being inflated, either (i) the actuators 2880 may be controlled to open the valve element(s) 2908 and deflate the first bladders 2854 prior to pressurizing the second rail 2866, or (ii) the first bladders 2854 may be deflated over time based on fluid flow through the check valve 2930 and the pressure differential across the check valve 2930.

Generally, the disclosure invention relates to a valve system 2860 for use with two separate fluid or air subsystems in a fluid system 2850 in a seat such as a vehicle seat assembly 2820, and these systems may include massage and lumbar systems. A series of first valves 2868 are connected to the first bladders 2854 and a series of second valves 2870 are connected to the second bladders 2856. The first and second valves 2868, 2870 may be stacked. A series of actuators 2880 are used to control the valve 2868, 2870 positions, with each actuator 2880 connected to two different valves 2868, 2870. For example, a single actuator 2880 is connected to both a first valve 2868 in a first rail 2864, and a second valve 2870 in a second rail 2866 to control air flow to air bladders 2854, 2856 connected to those respective rails. A control valve 2862 upstream of the rails is used to control or switch air flow between one of the two rails. A relief or check valve 2930 may be provided between the two rails or between first and second valves to vent one rail into the other, for example, to allow for deflating the lumbar bladders while operating massage with the second rail pressurized. An additional vent valve may be provided to selectively vent the second rail to atmosphere, for example, when venting the first bladders 2854. The number of actuators is therefore reduced providing for reduced package size and cost.

Figure 86B:
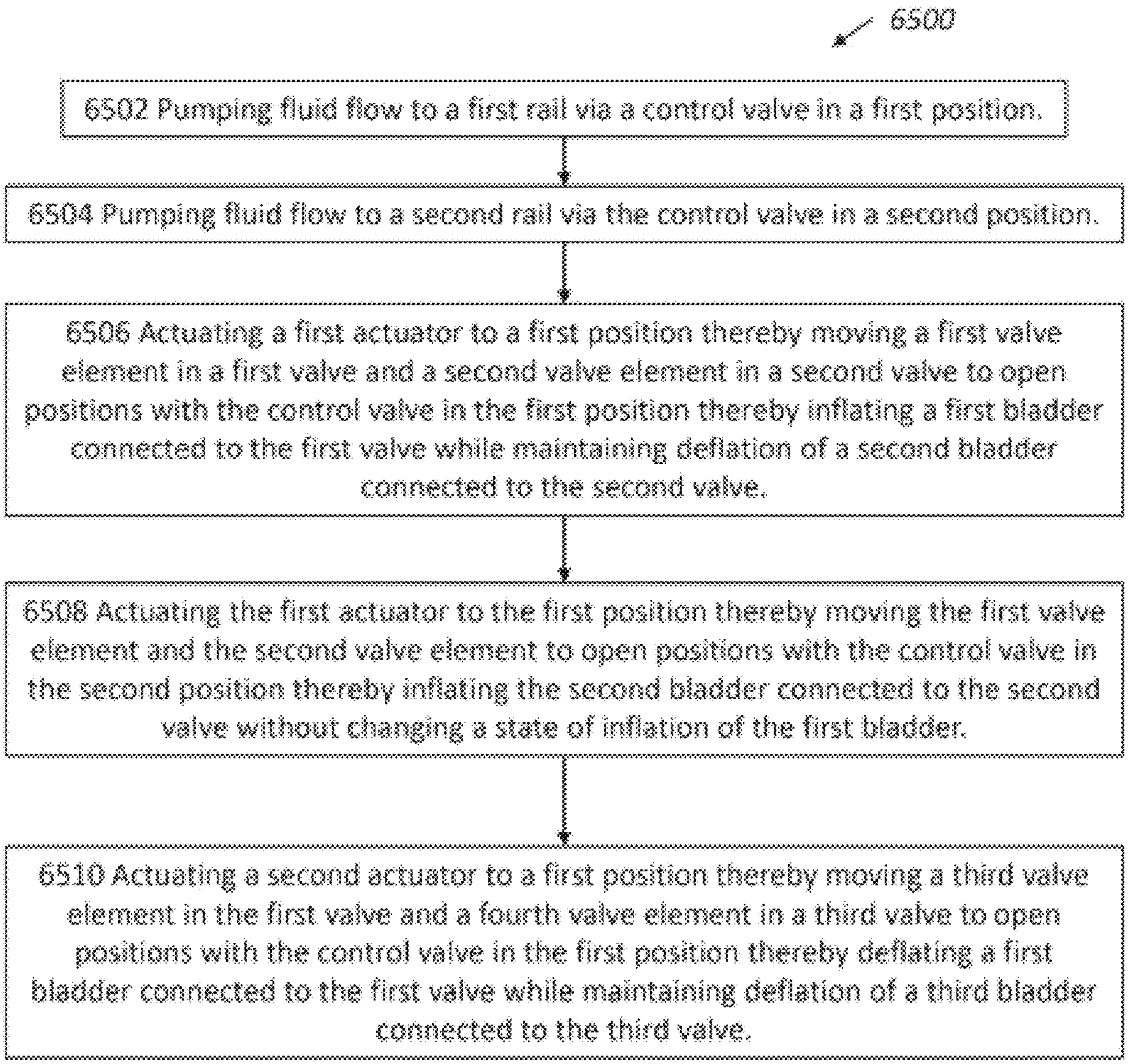
FIG. 86B illustrates a method in accordance with some embodiments.

FIG. 86B illustrates a method 6500 in accordance with some embodiments. Method 6500 is used to actuate a seat assembly (e.g., seat assembly 2820), which may be a vehicle seat, office chair, individual chair, and/or the like. In various examples, method 6500 may have greater or fewer steps than described below, and various steps may be performed in another order, sequentially, or simultaneously.

Method 6500 includes pumping (6502) fluid flow to a first rail (e.g., 2864) via a control valve (e.g., 2862) in a first position. The rail may be formed from a lightweight and structurally resilient material such as a polymeric material, or a lightweight metallic alloy, with gaskets, covers, fasteners, laser welds, friction welds, and/or adhesives. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. Method 6500 includes pumping (6504) fluid flow to a second rail (e.g., 2866) via the control valve (e.g., 2862) in a second position. The rail may be formed from a lightweight and structurally resilient material such as a polymeric material, or a lightweight metallic alloy, with gaskets, covers, fasteners, laser welds, friction welds, and/or adhesives. Method 6500 includes actuating (6506) a first actuator (e.g., 2880) to a first position thereby moving a first valve element in a first valve and a second valve element in a second valve to open positions with the control valve in the first position thereby inflating a first bladder connected to the first valve while maintaining deflation of a second bladder connected to the second valve. The actuation may be lumbar inflation. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders. Method 6500 includes actuating 6508 the first actuator (e.g., 2880) to the first position thereby moving the first valve element (e.g., valve element 2904, valve element 2908, valve element 2912) and the second valve element (e.g., valve element 2904, valve element 2908, valve element 2912) to open positions with the control valve in the second position thereby inflating the second bladder connected to the second valve without changing a state of inflation of the first bladder. The actuation may be massage inflation. Method 6500 includes actuating (6510) a second actuator (e.g., 2880) to a first position thereby moving a third valve element in the first valve and a fourth valve element in a third valve to open positions with the control valve in the first position thereby deflating a first bladder connected to the first valve while maintaining deflation of a third bladder connected to the third valve. The actuation may be lumbar deflation. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. The valves may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders.

In some embodiments, method 6500 includes opening a vent valve to a vent position thereby fluidly coupling the second rail to atmosphere. A check valve is opened in response to a pressure in the second rail being less than a pressure in the first valve thereby deflating the first bladder with the second actuator (e.g., 2880) in the first position. The valves may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

An assembly (e.g., seat assembly 2820, fluid system 2850, fluid transfer device 2852, system 2860) is described with a first valve (e.g., control valve 2862, valves 2868, valves 2870, vent valve 2872, vent valve 2874, valves 2882, check valve 2930) having a first valve element (e.g., valve element 2904, valve element 2908, valve element 2912). The first valve may actuate a lumbar operation. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A second valve (e.g., control valve 2862, valves 2868, valves 2870, vent valve 2872, vent valve 2874, valves 2882, check valve 2930) has a second valve element (e.g., valve element 2904, valve element 2908, valve element 2912). The second valve (e.g., control valve 2862, valves 2868, valves 2870, vent valve 2872, vent valve 2874, valves 2882, check valve 2930) is positioned adjacent to the first valve (e.g., control valve 2862, valves 2868, valves 2870, vent valve 2872, vent valve 2874, valves 2882, check valve 2930). The second valve may actuate a massage operation. A first actuator (e.g., actuator 2880) has an actuator member (e.g., actuator member 2884) movable between a first actuator position and a second actuator position. The actuator member (e.g., actuator member 2884) is coupled to each of the first valve element (e.g., valve element 2904, valve element 2908, valve element 2912) and the second valve element (e.g., valve element 2904, valve element 2908, valve element 2912) for movement therewith. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. Each of the first and second valves may be in a closed position when the actuator member is in the first actuator position and in an open position when the actuator member is in the second actuator position.

In some embodiments, each of the first and second valves (e.g., control valve 2862, valves 2868, valves 2870, vent valve 2872, vent valve 2874, valves 2882, check valve 2930) are in a closed position when the actuator member (e.g., actuator member 2884) is in the first actuator position and in an open position when the actuator member (e.g., actuator member 2884) is in the second actuator position.

In some embodiments, a third valve (e.g., control valve 2862, valves 2868, valves 2870, vent valve 2872, vent valve 2874, valves 2882, check valve 2930) has a third valve element (e.g., valve element 2904, valve element 2908, valve element 2912). The third valve may actuate a second massage operation. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The first valve (e.g., control valve 2862, valves 2868, valves 2870, vent valve 2872, vent valve 2874, valves 2882, check valve 2930) has a fourth valve element (e.g., valve element 2904, valve element 2908, valve element 2912). The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

In some embodiments, a second actuator (e.g., actuator 2880) has a second actuator member (e.g., actuator member 2884) coupled to each of the third and fourth valve elements (e.g., valve element 2904, valve element 2908, valve element 2912) for movement therewith. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material.

In some embodiments, the first actuator (e.g., actuator 2880) is a solenoid actuator (e.g., actuator 2880) or a shape-memory alloy actuator (e.g., actuator 2880).

In some embodiments, a connector plate (e.g., connector plate 2920) is connected to the actuator member (e.g., actuator member 2884), and the first and second valve elements (e.g., valve element 2904, valve element 2908, valve element 2912). The connector plate may include keys or slots to engage the valve elements or stems, and the connector plate may push or pull the valve elements as the actuator member is moved by the actuator.

In some embodiments, a pump (e.g., pump 2852) is positioned upstream of the first and second valves (e.g., control valve 2862, valves 2868, valves 2870, vent valve 2872, vent valve 2874, valves 2882, check valve 2930). The pump may be a fluid pump, such as a pneumatic pump. A control valve (e.g., control valve 2862, valves 2868, valves 2870, vent valve 2872, vent valve 2874, valves 2882, check valve 2930) fluidly connects the pump to the first and second valves. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A second valve (e.g., control valve 2862, valves 2868, valves 2870, vent valve 2872, vent valve 2874, valves 2882, check valve 2930) has a second valve element (e.g., valve element 2904, valve element 2908, valve element 2912). The second valve (e.g., control valve 2862, valves 2868, valves 2870, vent valve 2872, vent valve 2874, valves 2882, check valve 2930) is positioned adjacent to the first valve (e.g., control valve 2862, valves 2868, valves 2870, vent valve 2872, vent valve 2874, valves 2882, check valve 2930). The second valve may actuate a massage operation. The pump (e.g., pump 2852) is fluidly coupled to the first valve (e.g., control valve 2862, valves 2868, valves 2870, vent valve 2872, vent valve 2874, valves 2882, check valve 2930) with the control valve (e.g., control valve 2862, valves 2868, valves 2870, vent valve 2872, vent valve 2874, valves 2882, check valve 2930) in a first valve position, and wherein the pump (e.g., pump 2852) is fluidly coupled to the second valve (e.g., control valve 2862, valves 2868, valves 2870, vent valve 2872, vent valve 2874, valves 2882, check valve 2930) with the control valve (e.g., control valve 2862, valves 2868, valves 2870, vent valve 2872, vent valve 2874, valves 2882, check valve 2930) in a second valve position.

In some embodiments, a first fluid rail (e.g., rail 2864, rail 2866) provides pressurized fluid from the pump (e.g., pump 2852) to the first valve (e.g., control valve 2862, valves 2868, valves 2870, vent valve 2872, vent valve 2874, valves 2882, check valve 2930) via the control valve (e.g., control valve 2862, valves 2868, valves 2870, vent valve 2872, vent valve 2874, valves 2882, check valve 2930), and a second fluid rail (e.g., rail 2864, rail 2866) providing pressurized fluid from the pump (e.g., pump 2852) to the second valve (e.g., control valve 2862, valves 2868, valves 2870, vent valve 2872, vent valve 2874, valves 2882, check valve 2930) via the control valve (e.g., control valve 2862, valves 2868, valves 2870, vent valve 2872, vent valve 2874, valves 2882, check valve 2930). The fluid rails may be formed from a lightweight and structurally resilient material such as a polymeric material, or a lightweight metallic alloy, with gaskets, covers, fasteners, laser welds, friction welds, and/or adhesives.

In some embodiments, a first bladder (e.g., bladder 2854, 2856) is in fluid communication with the first valve (e.g., control valve 2862, valves 2868, valves 2870, vent valve 2872, vent valve 2874, valves 2882, check valve 2930) to receive pressurized fluid therefrom. The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders.

In some embodiments, the first valve (e.g., control valve 2862, valves 2868, valves 2870, vent valve 2872, vent valve 2874, valves 2882, check valve 2930) has a first port (e.g., port 2874, 2902) in fluid communication with the first bladder (e.g., bladder 2854, 2856), wherein the first port (e.g., port 2874, 2902) fluidly couples the first fluid rail (e.g., rail 2864, rail 2866) to the first bladder (e.g., bladder 2854, 2856) via the first valve element (e.g., valve element 2904, valve element 2908, valve element 2912), and wherein the first port (e.g., port 2874, 2902) fluidly couples the first bladder (e.g., bladder 2854, 2856) to atmosphere via a third valve element (e.g., valve element 2904, valve element 2908, valve element 2912) of the first valve (e.g., control valve 2862, valves 2868, valves 2870, vent valve 2872, vent valve 2874, valves 2882, check valve 2930). The first valve may actuate a lumbar function. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

In some embodiments, a second bladder (e.g., bladder 2854, 2856) is in fluid communication with a second port (e.g., port 2874, 2902) of the second valve (e.g., control valve 2862, valves 2868, valves 2870, vent valve 2872, vent valve 2874, valves 2882, check valve 2930) to receive pressurized fluid therefrom. The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders.

In some embodiments, a third valve (e.g., control valve 2862, valves 2868, valves 2870, vent valve 2872, vent valve 2874, valves 2882, check valve 2930) with a fourth valve element (e.g., valve element 2904, valve element 2908, valve element 2912), wherein the third valve (e.g., control valve 2862, valves 2868, valves 2870, vent valve 2872, vent valve 2874, valves 2882, check valve 2930) is in fluid communication with the second fluid rail (e.g., rail 2864, rail 2866). The third valve may actuate another massage operation. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A second actuator (e.g., actuator 2880) has a second actuator member (e.g., actuator member 2884) coupled to each of the third and fourth valve elements (e.g., valve element 2904, valve element 2908, valve element 2912) for movement therewith. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. A third bladder (e.g., bladder 2854, 2856) is in fluid communication with the third valve (e.g., control valve 2862, valves 2868, valves 2870, vent valve 2872, vent valve 2874, valves 2882, check valve 2930) to receive pressurized fluid therefrom. The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders.

In some embodiments, the second fluid rail (e.g., rail 2864, rail 2866) is in fluid communication with atmosphere with the second valve element (e.g., valve element 2904, valve element 2908, valve element 2912) in a closed position, and wherein the second fluid rail (e.g., rail 2864, rail 2866) is in fluid communication with the second port (e.g., port 2874, 2902) and the second bladder (e.g., bladder 2854, 2856) with the second valve element (e.g., valve element 2904, valve element 2908, valve element 2912) in an open position.

In some embodiments, a vent valve (e.g., control valve 2862, valves 2868, valves 2870, vent valve 2872, vent valve 2874, valves 2882, check valve 2930) is fluidly connected to the second rail (e.g., rail 2864, rail 2866) to atmosphere in a vent position. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

In some embodiments, a check valve (e.g., control valve 2862, valves 2868, valves 2870, vent valve 2872, vent valve 2874, valves 2882, check valve 2930) fluidly connects the first port (e.g., port 2874, 2902) of the first valve (e.g., control valve 2862, valves 2868, valves 2870, vent valve 2872, vent valve 2874, valves 2882, check valve 2930) to the second fluid rail (e.g., rail 2864, rail 2866) via the third valve element (e.g., valve element 2904, valve element 2908, valve element 2912), wherein the check valve (e.g., control valve 2862, valves 2868, valves 2870, vent valve 2872, vent valve 2874, valves 2882, check valve 2930) is positioned to be closed when a pressure in the second fluid rail (e.g., rail 2864, rail 2866) is greater than a pressure in first port (e.g., port 2874, 2902) with the third valve element (e.g., valve element 2904, valve element 2908, valve element 2912) in an open position. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

In some embodiments, a third fluid rail (e.g., rail 2864, rail 2866) receives fluid from the first port (e.g., port 2874, 2902) of the first valve (e.g., control valve 2862, valves 2868, valves 2870, vent valve 2872, vent valve 2874, valves 2882, check valve 2930). The fluid rails may be formed from a lightweight and structurally resilient material such as a polymeric material, or a lightweight metallic alloy, with gaskets, covers, fasteners, laser welds, friction welds, and/or adhesives. A check valve (e.g., control valve 2862, valves 2868, valves 2870, vent valve 2872, vent valve 2874, valves 2882, check valve 2930) fluidly connects the third fluid rail (e.g., rail 2864, rail 2866) to the second fluid rail (e.g., rail 2864, rail 2866), wherein the check valve (e.g., control valve 2862, valves 2868, valves 2870, vent valve 2872, vent valve 2874, valves 2882, check valve 2930) is positioned to be closed when a pressure in the second fluid rail (e.g., rail 2864, rail 2866) is greater than a pressure in the third fluid rail (e.g., rail 2864, rail 2866). The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

An assembly (e.g., seat assembly 2820, fluid system 2850, fluid transfer device 2852, system 2860) is described with a pump (e.g., pump 2852). The pump may be a fluid pump, such as a pneumatic pump. A first rail (e.g., rail 2864, rail 2866) is connected to the pump (e.g., pump 2852) via at one or more control valves (e.g., control valve 2862, valves 2868, valves 2870, vent valve 2872, vent valve 2874, valves 2882, check valve 2930). The fluid rails may be formed from a lightweight and structurally resilient material such as a polymeric material, or a lightweight metallic alloy, with gaskets, covers, fasteners, laser welds, friction welds, and/or adhesives. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. A second rail (e.g., rail 2864, rail 2866) is connected to the pump (e.g., pump 2852) via the one or more control valves (e.g., control valve 2862, valves 2868, valves 2870, vent valve 2872, vent valve 2874, valves 2882, check valve 2930), wherein the one or more control valves (e.g., control valve 2862, valves 2868, valves 2870, vent valve 2872, vent valve 2874, valves 2882, check valve 2930) control fluid flow from the pump (e.g., pump 2852) to one of the first rail (e.g., rail 2864, rail 2866) and the second rail (e.g., rail 2864, rail 2866), a series of first valves (e.g., control valve 2862, valves 2868, valves 2870, vent valve 2872, vent valve 2874, valves 2882, check valve 2930), each first valve (e.g., control valve 2862, valves 2868, valves 2870, vent valve 2872, vent valve 2874, valves 2882, check valve 2930) having a first port (e.g., port 2874, 2902) with an associated first valve element (e.g., valve element 2904, valve element

2908, valve element 2912), an associated second valve element (e.g., valve element 2904, valve element 2908, valve element 2912), and a vent line (e.g., vent line 2874, 2934). The fluid rails may be formed from a lightweight and structurally resilient material such as a polymeric material, or a lightweight metallic alloy, with gaskets, covers, fasteners, laser welds, friction welds, and/or adhesives. The valves may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The first port (e.g., port 2874, 2902) of each of the first valves (e.g., control valve 2862, valves 2868, valves 2870, vent valve 2872, vent valve 2874, valves 2882, check valve 2930) receives pressurized fluid from the first rail (e.g., rail 2864, rail 2866) via the first valve element (e.g., valve element 2904, valve element 2908, valve element 2912). A series of first bladders (e.g., bladder 2854, 2856) are each fluidly coupled to the first port (e.g., port 2874, 2902) of one of the first valves (e.g., control valve 2862, valves 2868, valves 2870, vent valve 2872, vent valve 2874, valves 2882, check valve 2930), a series of pairs of second valves (e.g., control valve 2862, valves 2868, valves 2870, vent valve 2872, vent valve 2874, valves 2882, check valve 2930), each second valve (e.g., control valve 2862, valves 2868, valves 2870, vent valve 2872, vent valve 2874, valves 2882, check valve 2930) having a second port (e.g., port 2874, 2902) with an associated third valve element (e.g., valve element 2904, valve element 2908, valve element 2912). The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore. The second port (e.g., port 2874, 2902) of each of the second valves (e.g., control valve 2862, valves 2868, valves 2870, vent valve 2872, vent valve 2874, valves 2882, check valve 2930) receives pressurized fluid from the second rail (e.g., rail 2864, rail 2866). A series of second bladders (e.g., bladder 2854, 2856) are each fluidly coupled to the second port (e.g., port 2874, 2902) of one of the second valves (e.g., control valve 2862, valves 2868, valves 2870, vent valve 2872, vent valve 2874, valves 2882, check valve 2930), and a series of pairs of actuators (e.g., actuator 2880). The bladders may impart a tactile effect upon the occupant, such as a vibration for conveying an alert, vibration for imparting a massage, pressure for imparting a pressurized massage effect, fluid bladders, such as air bladders, such as lumbar bladders, bolster bladders, and/or shoulder bladders. The actuator may be a solenoid actuator to move the spool to a first position in response to an electrical current in a first direction and to move the spool to a second position in response to an electrical current in a second direction, or a shape-memory alloy actuator with an electrical terminal mounted on the distal end of a beam in electrical communication with the shape memory alloy. The shape memory alloy may extend from the terminals, along the beam, along the spring, and around a distal end of the valve body adjacent to the first seal. The shape memory alloy may be formed from a material that is actuated in response to an electrical current, such as a Nickel Titanium alloy that constricts when a current is passed through the material. One of the actuators (e.g., actuator 2880) in each pair of actuators (e.g., actuator 2880) is coupled to the first valve element (e.g., valve element 2904, valve element 2908, valve element 2912) and third valve element (e.g., valve element 2904, valve element 2908, valve element 2912) of one of the second valves (e.g., control valve 2862, valves 2868, valves 2870, vent valve 2872, vent valve 2874, valves 2882, check valve 2930) in each pair for movement therewith, and the other of the actuators (e.g., actuator 2880) in each pair of actuators (e.g., actuator 2880) is coupled to the second valve element (e.g., valve element 2904, valve element 2908, valve element 2912) and third valve element (e.g., valve element 2904, valve element 2908, valve element 2912) of the other of the second valves (e.g., control valve 2862, valves 2868, valves 2870, vent valve 2872, vent valve 2874, valves 2882, check valve 2930) in each pair for movement therewith.

In some embodiments, one or more check valves (e.g., control valve 2862, valves 2868, valves 2870, vent valve 2872, vent valve 2874, valves 2882, check valve 2930) fluidly couple the vent line (e.g., vent line 2874, 2934) of the at least one of the first ports (e.g., port 2874, 2902) to the second rail (e.g., rail 2864, rail 2866), wherein the one or more check valves (e.g., control valve 2862, valves 2868, valves 2870, vent valve 2872, vent valve 2874, valves 2882, check valve 2930) are positioned to be closed when a pressure in the second rail (e.g., rail 2864, rail 2866) is greater than a pressure in the at least one of the first ports (e.g., port 2874, 2902) with the second valve element (e.g., valve element 2904, valve element 2908, valve element 2912) in an open position. The valve may be elongate, may be formed from a lightweight and resilient material, such as polypropylene, may be reinforced with fiberglass, or formed from an aluminum alloy. The valve body may include a beam extending from the valve body generally parallel with the valve body. The beam may be formed integral with a spring. The beam may have a first thickness. The beam may include a plurality of lateral projections extending outwardly from the beam and received in slots in a housing, to prevent axial translation of the beam, the slots may be slightly tapered so that as the projections are installed into the slots, and the beam may be positioned gradually toward the first port to slightly compress and preload the spring. The projection may extend toward the valve body and provide an alignment spacer between the valve body and the beam to maintain the valve body in alignment with the path of translation toward and away from the first port. The valve body may include a valve stem and valve end. The valve body may be sealed at three axial locations against an interior surface of a bore.

Figure 87:
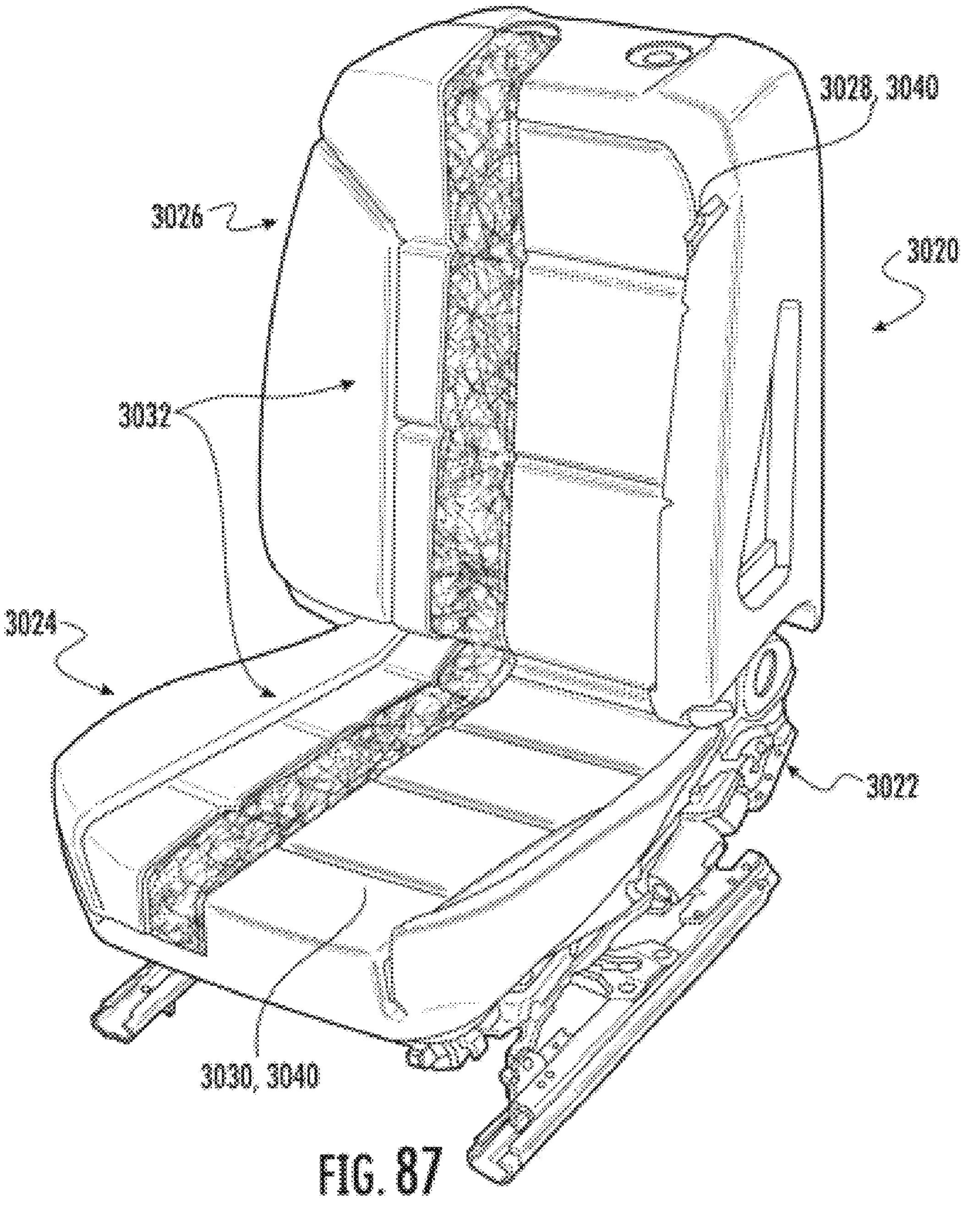
FIG. 87 illustrates a perspective view of a seat assembly according to some embodiments.

Referring to FIG. 87, a seat assembly 3020, such as a vehicle seat assembly 3020 is illustrated. In other examples, the seat assembly 3020 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 3020 may be configured for use with other non-vehicle applications.

The seat assembly 3020 has a support structure 3022 that may be provided by one or more support members. A support member may be provided by a frame and/or a substrate. The seat assembly has seat components, and these seat components include at least a seat bottom 3024 and a seat back 3026. The seat bottom 3024 may be sized to receive a seated occupant to support a pelvis and thighs of the occupant. The seat back 3026 may be sized to extend upright from the seat bottom 3024 to support a back of the occupant. The seat assembly may additionally have a head restraint (not shown). The seat bottom 3024 has a seat bottom cushion 3028. The seat back 3026 has a seat back cushion 3030. The frame 3022 may include wire suspension mats or other structure to support the cushions 3028, 3030.

The support structure 3022 provides rigid structural support for the seat components, e.g., the seat bottom 3024 and seat back 3026, and may be provided as multiple frame members and/or substrates or panels that are moveable relative to one another to provide adjustments for the seat assembly. The support structure 3022 may be formed from a stamped steel alloy, a fiber reinforced polymer, or any suitable structural material.

A trim cover assembly 3032 is used to cover the seat bottom cushion 3028 and the seat back cushion 3030, and provide a seating surface for the seat assembly 3020. The vehicle seat assembly 3020 is shown with the trim cover assembly 3032 partially cutaway. In one example, the trim cover assembly 3032 covers both of the cushions 3028, 3030. In other examples, multiple trim cover assemblies are provided to cover the seat bottom cushion and the seat back cushion. Trim cover assemblies 3032 according to various embodiments are described below in further detail.

A seating cushion 3040 is described in further detail below, and the description may similarly be applied to the seat bottom cushion 3028 or the seat back cushion 3030. According to one example, and as shown, the seating cushion 3040 may be formed from a foam material, such as a molded polyurethane foam.

In another example, the seating cushion 3040 includes at least one nonfoam component or member. In one example, and as shown, the seating cushion 3040 is formed solely from the nonfoam component, such that the nonfoam component provides all of the cushioning for the seat component between the frame 3022 and the trim cover 3032. In other examples, the seating cushion 3040 may be formed from a nonfoam component as well as one or more foam components, such as a component formed from molded polyurethane foam. The seating cushion 3040 may have the non-foam and foam components positioned to provide different regions of the cushion 3040 for the seating component, e.g., a central region, and side bolster regions. Alternatively, or additionally, the seating cushion 3040 may have a thin foam or other material layer positioned between the nonfoam component and the trim cover 3032 to provide additional cushioning for one or more regions of the seating component. Furthermore, the seat assembly 3020 may have a heating pad or heating mat positioned between the cushion 3040 and the trim cover 3032. By removing some or all of the traditional foam from the seating cushion 3040, the seat assembly 3020 may be provided with improved support and comfort, and reduced weight.

Figure 88:
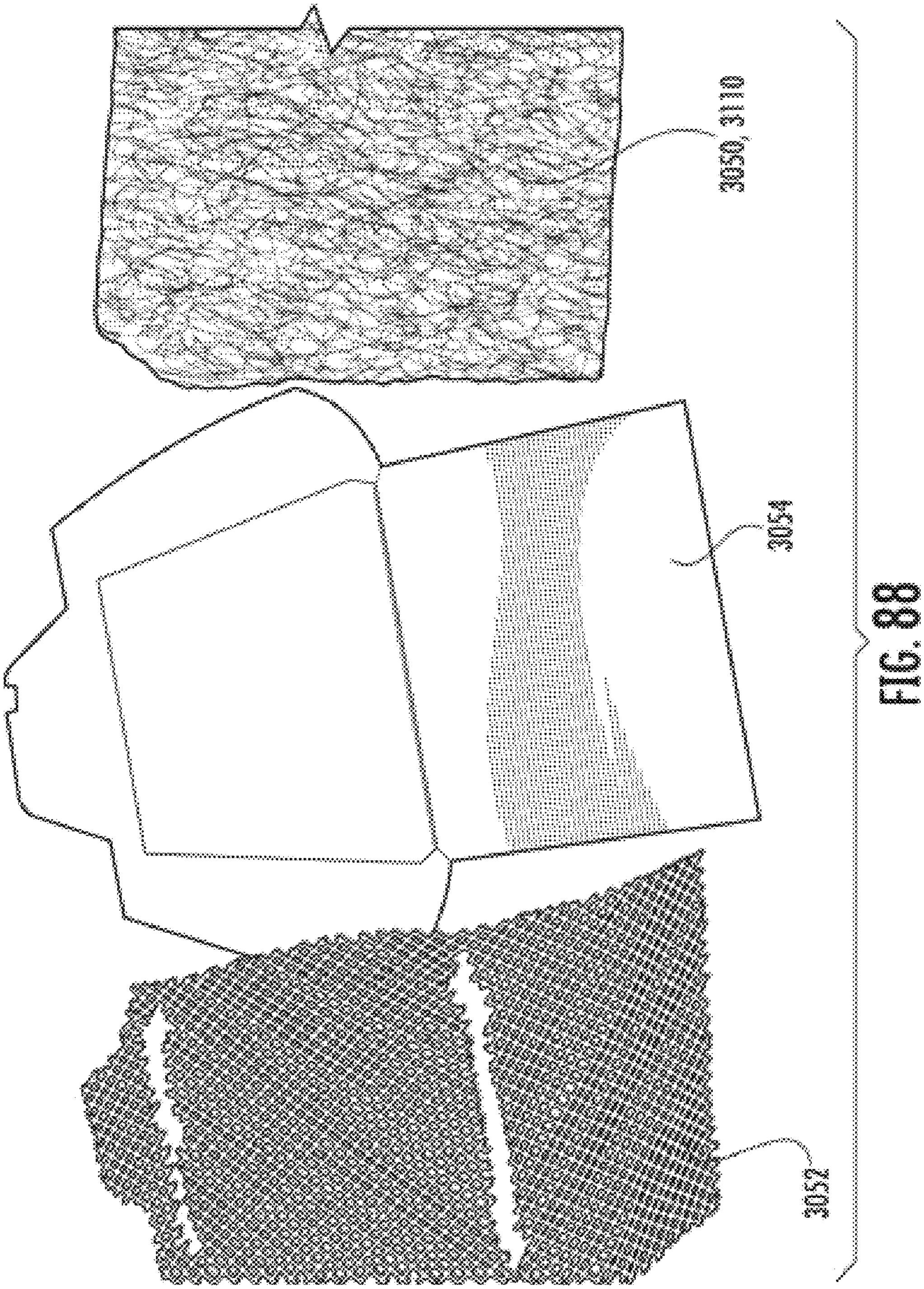
FIG. 88 illustrates a perspective view of various materials used in trim assemblies.

In one non-limiting example, the nonfoam component or member of the seating cushion 3040 is formed by a stranded mesh material, also known as an entangled three-dimensional filament structure. The stranded-mesh material is made from a polymeric mesh having a plurality of integrated polymeric strands. The stranded-mesh material may be made from, for example, a linear low-density polyethylene (LLPDE) material, although other polymers and materials effective to provide the desired properties and functionality are contemplated. The stranded-mesh material may be formed using extruded filaments of linear low-density polyethylene (LLDPE) that are randomly entangled, bent, looped, or otherwise positioned and oriented, and directly bonded to each other to provide a porous mesh structure, an example of which is shown in a closer view in FIG. 88 with stranded mesh material 3050.

Referring to FIGS. 89-93 and 95, a trim assembly 3032 is shown in greater detail according to various examples of the present disclosure. Furthermore, it is envisioned that features of one example may be interchanged with or used in addition to various features of another example. The trim assembly 3032 may be formed from multiple layers of material as described below. The trim assembly 3032 may be used with the vehicle seat assembly 3020 of FIG. 87, or may be used with another seat as described above, or another vehicle or other application.

The trim assembly 3032 has a trim cover layer 3100. The trim cover layer 3100 may provide the A-surface for the trim assembly 3032, or the seating surface that is visible to the seat occupant. The trim cover layer 3100 may be formed from one or more panels of a woven fabric, knitted fabric, other fabric, leather, leatherette, vinyl, and/or other material. The various panels of the trim cover layer 3100 are connected to one another, e.g., via sewing or another process, to form the trim cover layer.

In various examples, the trim assembly 3032 is provided with a fastener that includes a tie down 3102, and the tie down may be connected directly to the trim cover layer 3100, or to another layer as described below. The tie down 3102 may be formed as a nonwoven fabric, or other material layer that extends outwardly from the B-surface of the trim cover layer 3100 or another layer to a distal free end 3104, and may be used to connect the trim assembly 3032 to the cushion 3040 or support member 3022 as described below. The tie down 3102 may be sewn or otherwise connected to the trim assembly 3032 or trim cover layer 3100. Alternatively, the tie down 3100 may be provided as an elastic element that extends outwardly from the trim cover assembly 3032, e.g., as a band or cord. In other examples, the trim assembly 3032 is provided without any tie downs.

The trim cover assembly 3032 also has a nonfoam layer 3110. In one example, and as shown, the nonfoam layer 3110 may be formed from a stranded mesh material 3050 or an entangled three-dimensional filament structure as described above and as shown in FIG. 88. In another example, the nonfoam layer 3110 may be provided as a plastic spacer material, similar to that shown in FIG. 89, and furthermore may be formed from a thermoplastic polyurethane according to one example. The plastic spacer material may include two films 3112 separated by spacer inserts 3114 to form air cushion pockets therebetween. The plastic spacer material 3110 may further define apertures 3116 extending through the two films to allow air to pass across the material, e.g., for ventilation.

The nonfoam layer 3110 has a first surface 3120 and a second surface 3122 opposite to the first surface. The first surface 3120 is positioned to be in contact with the B-surface or back surface of the trim cover layer 3100. The first surface and/or the second surface defines at least one trench 3124. As used herein, a trench 3124 may refer to an open channel or groove that is formed in the nonfoam layer 3110 and that intersects the first and/or second surface 3120, 3122 to extend through the member. A trench 3124 may additionally refer to a recess or blind hole that is formed in the stranded-mesh material member 3110, or a through hole in the member. In one example, the trench 3124 has a floor 3126 that is positioned between the first and second surfaces 3120, 3122 of the stranded-mesh material member. As shown with respect to FIG. 90 by way of example, the nonfoam layer 3110 therefore has a first thickness (t1) between the first and second surfaces 3120, 3122 adjacent to the trench, and a second thickness (t2) between the floor 3126 and one of the first and second surfaces 3120, 3122, with the second thickness (t2) being less than the first thickness (t1).

Figure 89:
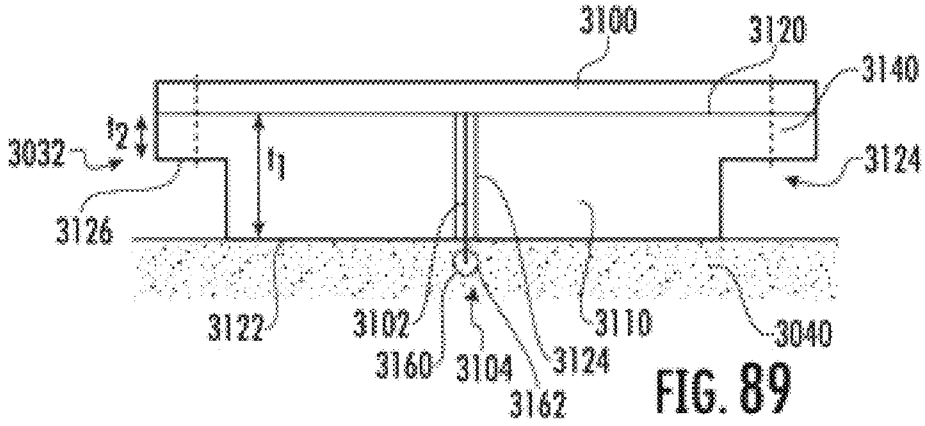
FIG. 89 illustrates a partial schematic view of a nonfoam layer for use with the trim assembly.
Figure 90:
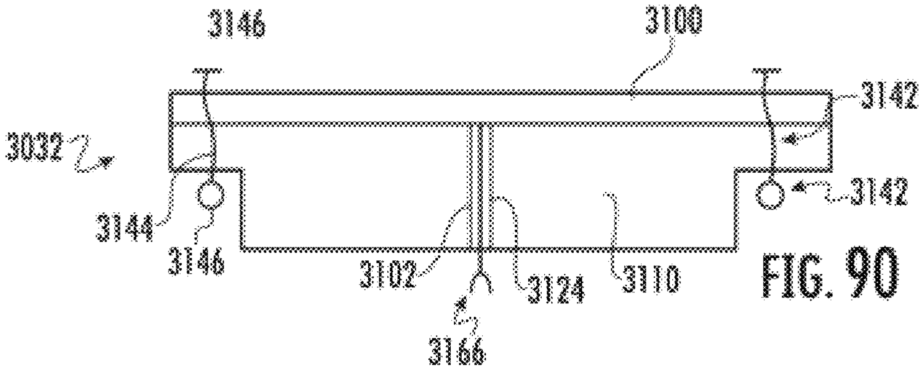
FIG. 90 illustrates a sectional schematic view of a trim assembly according to some embodiments.
Figure 91:
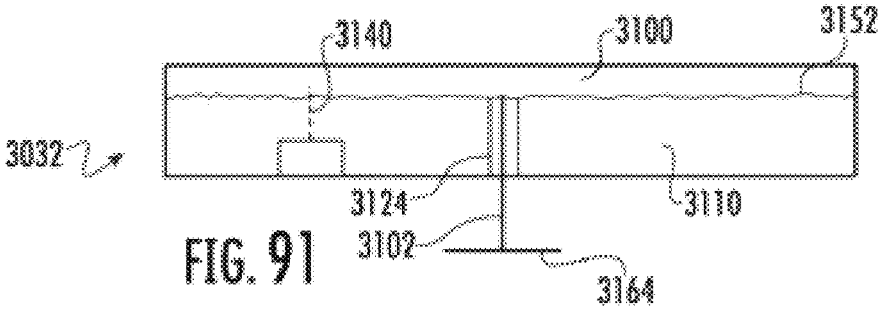
FIG. 91 illustrates a sectional schematic view of a trim assembly according to some embodiments.

For a trim assembly 3032 with a tie down 3102, the nonfoam layer 3110 may be cut or formed with the trench 3124 as an associated slit or through hole for the tic down as shown by way of example in FIGS. 89-91. The tie down 3102 may extend from the B-surface of the trim cover layer, and through the slit or trench 3124 in the nonfoam layer 3110. The distal free end of the tie down 3102 may be positioned such that the nonfoam layer 3110 is between the distal free end of the tie down 3102 and the trim cover layer 3100.

A conventional seat assembly may utilize a spacer fabric 3052 and/or a cushion layer 3054 positioned between the seat cushion 3040 and the trim cover layer 3100. In one example, the spacer fabric 3052 may be a knit or otherwise formed fabric layer that forms a mesh structure to allow air to pass through it, and provides a firm support surface. The cushion layer 3054 may be a foam layer, e.g., a urethane or other foam material, and may further be known as a soft touch material that provides a cushion feel for the seat occupant.

In various examples of the present disclosure, the nonfoam layer 3110 replaces the spacer fabric 3052 and/or the cushion layer 3054 positioned between the seat cushion 3040 and the trim cover layer 3100. In one example, the nonfoam layer 3110 may be on the order of 10-40 mm thick, and in a further example, is approximately 20 mm thick. This allows for preassembly of the trim cover assembly 3032, results in fewer components to assemble to the support member 3022 and/or cushion 3040 for the vehicle seat assembly 3020, and provides for a modular seating system and assembly thereof.

The trim assembly 3032 may further be provided with various fasteners or other components that provide for direct assembly to the vehicle seat assembly in addition to the tic down 3102 or instead of the tie down 3102 described. Furthermore, and prior to assembly with the vehicle seat assembly 3020, the trim assembly 3032 may be provided with components or layers, e.g., the nonfoam layer 3110, that would otherwise be connected to the seat cushion 3040 or support member 3022 prior to installation of the trim cover, or installed during a separate step to the vehicle seat assembly.

The trim cover assembly 3032 may be formed or assembled prior to connection to the cushion 3040 or seat assembly 3020. In one example, the trim cover layer 3100 and the nonfoam layer 3110 are connected to one another to form the trim cover assembly 3032 prior to attachment to the cushion 3040 or seat assembly 3020. In a further example, the trim cover assembly 3032 may be assembled at a first facility or in a first production line, and then shipped or moved to the location or assembly line for the vehicle seat assembly 3020.

Figure 96:
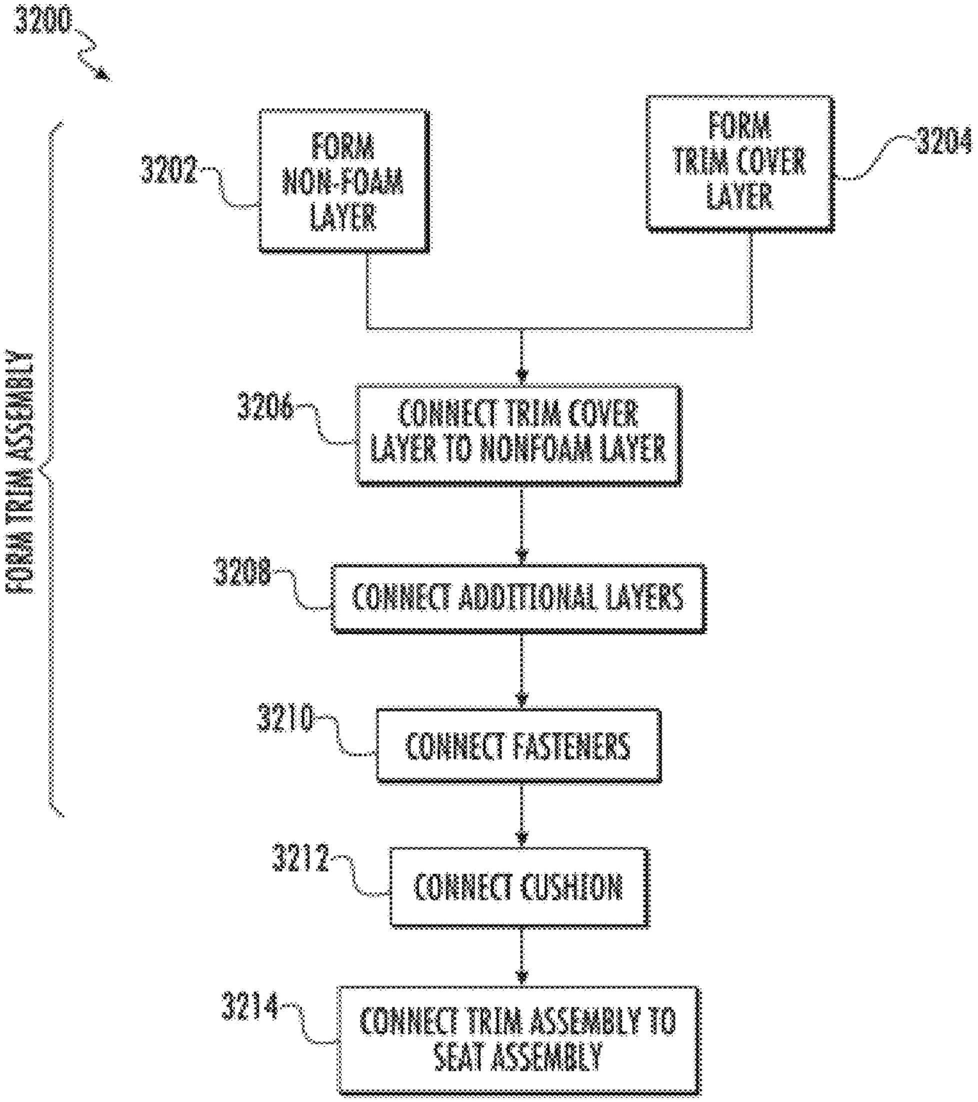
FIG. 96 illustrates a sectional schematic view of a trim assembly according to some embodiments.

A method 3200 of forming a trim cover assembly 3032, and a method of assembling the trim cover assembly 3032 and a seat assembly, such as a vehicle seat assembly 3020 are also provided, and is shown in FIG. 96. In various examples, the steps may be performed in another order, or may be performed sequentially or simultaneously. Furthermore, additional steps may be added, or steps may be omitted.

In a first step 3202, the nonfoam layer 3110 is formed or otherwise provided. According to one example, and for a stranded-mesh material member, the member 3110 may be formed by extruding thin filaments of linear low-density polyethylene, or another suitable material through a die plate from a hopper or other source of material. The thin filaments may be heated as they are extruded such that they exit the die plate in a molten state. The filaments are then consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure is then dried and cut into the appropriate shape for the nonfoam layer. Furthermore, during the forming process, one or more trenches 3124 or other shapes may be formed into the filament structure. If no trenches or other shapes are formed into the structure during the forming process, e.g., in the cooling system, then trenches 3124 may be machined, or otherwise provided in the stranded mesh material member after it has been dried, and before or after it is cut into the selected shape.

In other examples, a GPU layer is formed and cut to a desired shape and size for the nonfoam layer 3110 based on the trim assembly 3032.

In a second step 3204, the trim cover layer 3100 is formed. In one example, panels for the trim cover layer 3100 are cut from a fabric or other material, and then sewn, welded, glued, or otherwise connected to one another to form the trim cover layer 3100.

In a third step 3206, the trim cover layer 3100 and the nonfoam layer 3110 are connected to one another to form the trim cover assembly 3032, or the nonfoam layer is otherwise supported by the trim cover layer 3100.

Figure 93:
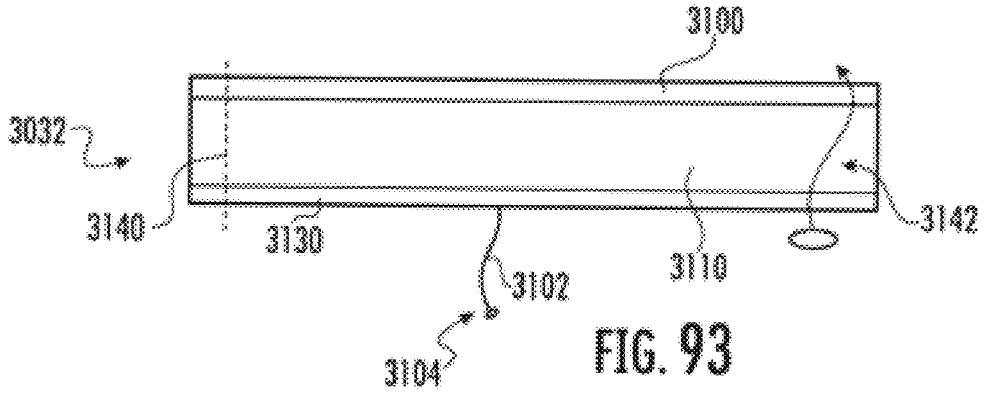
FIG. 93 illustrates a sectional schematic view of a trim assembly according to some embodiments.
Figure 94:
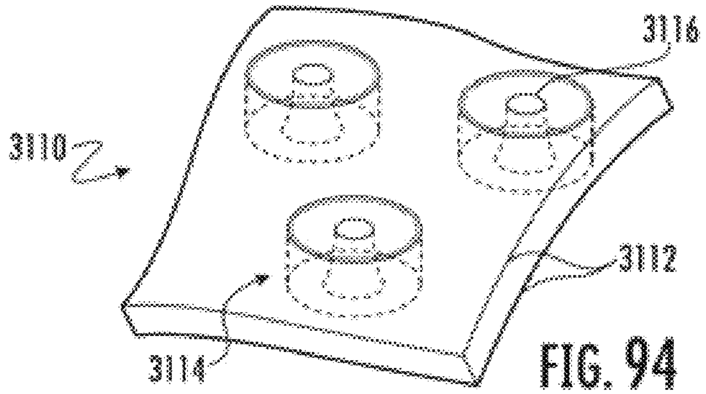
FIG. 94 illustrates a sectional schematic view of a trim assembly according to yet some embodiments.

In one example, the trim cover layer 3100 is sewn to the nonfoam layer 3110 with one or more seams 3140 connecting the trim cover layer to the nonfoam layer as shown in FIGS. 89, 91, and 93. In one example, the nonfoam layer 3110 may be provided with a trench 3124 or reduced thickness region, and the seam 3140 is positioned within this reduced thickness layer. The trench 3124 or reduced thickness region may be located adjacent to an edge of the nonfoam layer, or may be positioned away from the edges and in a central region of the nonfoam layer 3110. The seam 3140 may be provided as a joining seam and/or a decorative seam through the trim cover layer.

In another example, the trim cover layer 3100 is connected to the nonfoam layer 3110 with one or more tag fasteners 3142 or rivets as shown in FIGS. 90 and 93. The tag fasteners 3142 may be provided as a plastic or polypropylene tag fasteners, e.g., similar to tag fasteners that are used with retail or industrial tagging, and that are inserted using a tagging gun or other tag attaching tool. The tags 3142 may be inserted through the trim cover layer 3100 and nonfoam layer 3110. In one example, the tags 3142 are inserted through a trench 3124 or reduced thickness region of the nonfoam layer. The tag fasteners 3142 may each have a longitudinal strand 3144 or filament as a stem and widened heads 3146 at the opposite ends. The trim cover layer 3100 and nonfoam layer 3110 are positioned between the two widened heads 3146, with the stem 3144 extending through the two layers.

In a further example, the trim cover layer 3100 and the nonfoam layer 3110 are connected to one another first using tags 3142, and are then sewn together via one or more seams 3140 as shown in FIG. 93.

Figure 95:
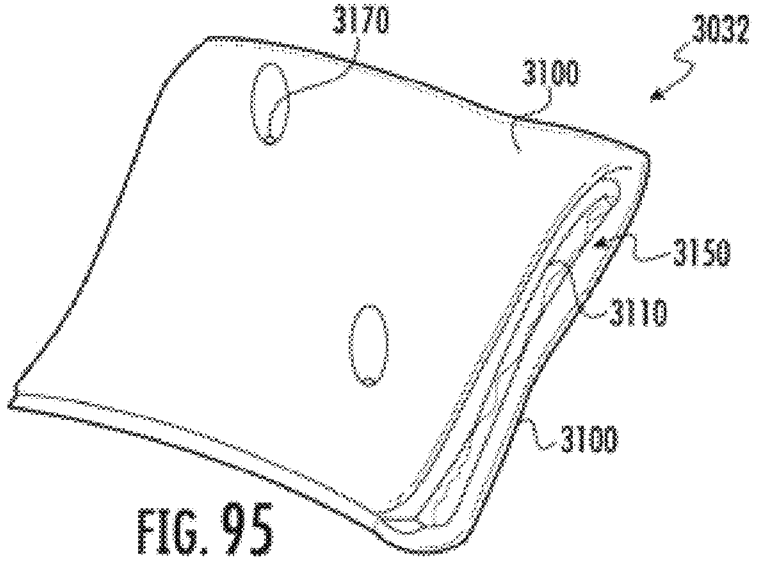
FIG. 95 illustrates a method according to some embodiments.

In yet another example, and as shown in FIG. 95, the trim cover is formed with pockets 3150, and the nonfoam layer 3110 is inserted into a corresponding pocket 3150, and then the pocket of the trim cover is then closed, e.g., via sewing or another process, to retain the nonfoam layer 3110 relative to the trim cover layer 3100. In one example, the trim cover layer 3100 and pocket 3150 may partially or entirely enclose the nonfoam layer 3110 after the pocket 3150 is closed.

Figure 92:
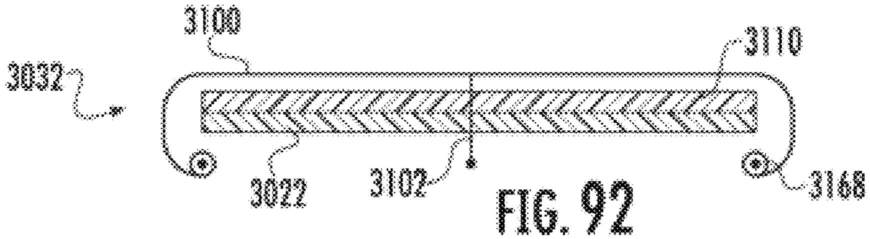
FIG. 92 illustrates a sectional schematic view of a trim assembly according to some embodiments.

In a further example, the nonfoam layer 3110 may be directly fastened to the trim cover layer 3100 as shown in FIG. 92, or encapsulated by the trim cover layer. For example, the trim cover layer 3100 may be laminated to the nonfoam layer 3110 via a process with heat that melts filaments or a film in the nonfoam layer 3110 in a localized region at the surface and adjacent to the trim cover layer 3100 to weld or connect the trim cover layer to the nonfoam layer as shown by the bond 3152 between the two layers 3100, 3110. Alternatively, the nonfoam layer 3110 may be bonded to the trim cover layer 3100 via an adhesive, or may be connected via an ultrasonic or high frequency welding process. Furthermore, the nonfoam layer 3110 may be connected to the trim cover layer 3100 in a foam tool during a foam-in-place process, or the trim cover layer 3100 itself may be provided by the foam in a foam-in-place process.

In a further step 3208, additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. An example of an additional layer 3130, or third layer, is shown in FIG. 93 by way of a non-limiting example.

In a further example, a third layer 3130 is provided, with the nonfoam layer 3110 positioned between the trim cover layer 3100 and the third layer 3130 as shown in FIG. 93. In one example, the third layer 3130 is provided as a sheet or layer of a nonwoven fabric. In other examples, the third layer 3130 may be provided as another material. In one non-limiting example, the third layer 3130 is provided for use with a vehicle seat assembly 3020 having a nonfoam cushion 3040, and may act as an air barrier between the cushion 3040 and the nonfoam layer 3110 of the trim assembly 3032. The third layer 3130 may be attached to the trim cover layer 3100 and/or nonfoam layer 3110 using the techniques described above.

Various fasteners may be connected to the trim assembly 3032 at step 3210. For any trim cover assemblies 3032 with tie downs 3102, the tie downs 3102 are positioned through the slits or trenches 3124 in the nonfoam layers if appropriate. Additionally, other fasteners may be provided as described below during step 3210, and attached to the trim cover assembly 3032. Alternatively, some fasteners may be provided and attached to the trim cover assembly 3032 when assembling it to the seat 3020 or cushion 3040.

The trim assembly 3032 may then be shipped or otherwise delivered to the assembly line for the seat assembly, such as for seat assembly 3020. In various examples, the trim assembly 3032 and seat assembly 3020 may occur at two distinct facilities, or at the same facility on two separate lines.

In a fifth step 3212, a cushion 3040 is connected to the frame or support member 3022 of the vehicle seat assembly. The cushion 3040 may be a seat back or a seat bottom cushion. The cushion 3040 may be formed from a foam material, or a nonfoam material, or a combination thereof as described above. In other examples, the seat assembly 3020 may be provided without a cushion 3040, such that this step is omitted.

In a sixth step 3214, the trim assembly 3032 is connected to the seat assembly 3020. The trim assembly 3032 may be connected to the vehicle seat assembly 3020 by directly connecting or attaching the trim assembly 3032 to the cushion 3040 and/or to the support member 3022, e.g., frame or substrate.

According to one example, and for a seat assembly with a foam cushion, the trim assembly 3032 is directly connected to the foam cushion 3040. For example, the tie down 3102 of the trim cover assembly may connect via hog rings 3160 to a wire 3162 in the foam cushion as shown in FIG. 89, or via the use of hook and loop fasteners to the foam cushion. The cushion 3040 may have a corresponding trench to receive the distal end of the tie down 3102. In another example, paddles 3164 are connected to the distal end of the tie down 3102 or to the trim cover layer 3100, and the paddles 3164 are inserted into slots in the cushion 3040 and then rotated, e.g., by ninety degrees, to retain the trim assembly 3032 to the cushion 3040 as shown. In a further example, corresponding clips 3166 such as push clips, retainer clips, or the like as shown in FIG. 90 may be used to connect the trim assembly 3032 to the cushion. In other examples, other fasteners may be used to connect the trim assembly to the foam cushion of the seat assembly. Alternatively, a drawstring 3168 around the perimeter of the trim assembly, e.g., sewn into the trim cover layer, may be used by inserting the cushion into the trim assembly and then cinching or tightening the drawstring as shown in FIG. 92. Furthermore, the trim assembly 3032 may be connected to a component during a foam-in-place process at the time of pouring the foam in a tool, where the trim assembly 3032 is positioned into the tool, and the component is then foamed in, along with other fasteners as desired.

According to another example, and for a seat assembly 3020 with a nonfoam cushion 3040, e.g., a stranded mesh material cushion, the trim assembly 3032 is connected directly to the nonfoam cushion 3040 via the use of one or more fasteners. For example, the tie down 3102 of the trim cover assembly may connect via hog rings 3160 to strands in the nonfoam cushion or to a wire 3162 embedded in the nonfoam cushion as shown in FIG. 89, or via the use of hook and loop fasteners to the foam cushion. In another example, paddles 3164 are connected to the distal end of the tic down 3102 or to the trim cover layer, and the paddles are inserted into slots in the nonfoam cushion 3040 and then rotated, e.g., by ninety degrees, to retain the trim assembly 3032 to the nonfoam cushion 3040. In a further example, corresponding clips 3166 such as push clips, retainer clips, or the like may be used to connect the trim assembly 3032 to the nonfoam cushion 3040. In other examples, other fasteners may be used to connect the trim assembly to the foam cushion of the seat assembly. In one example, the fasteners may be provided with barbs or other protrusions. The protrusions on the fastener may engage with the strands of the nonfoam layer 3110 and/or nonfoam cushion 3040 and limit or prevent movement of the fastener. Furthermore, the fasteners may be double ended such that one end engages with the nonfoam layer of the trim assembly and the other end engages with the nonfoam cushion. In a further example, the fastener may have a head, and the head may be positioned beneath the nonfoam cushion 3040 such that the fastener extends upwardly or outwardly towards the A-surface with a distal end engaging either the nonfoam layer 3110 of the trim assembly or a tie down 3102 of the trim assembly, or the head may be positioned such that the fastener extends through the nonfoam layer 3110 with a distal end embedded into the nonfoam cushion 3040 beneath. Alternatively, a drawstring 3168 around the perimeter of the trim assembly 3032, e.g., sewn into the trim cover layer 3100, may be used by inserting the cushion or support member 3022 (e.g., as a substrate) into the trim assembly 3032 and then cinching or tightening the drawstring 3168 with the nonfoam layer positioned beneath the trim cover layer 3100.

According to yet another example, the trim assembly 3032 is directly connected to the support member 3022 of the vehicle seat assembly. For example, the tie down 3102 of the trim cover assembly may connect to the frame or substrate via arrows, J-clips, or the like into a through hole or trough formed in the frame or substrate, with the arrow, J-clips, or the like provided similarly to clips 3166 in FIG. 91. In a further example, corresponding clips 3166 such as push clips, retainer clips, or the like may be used as shown in FIG. 90 to connect the trim assembly to the frame or substrate by engaging with surfaces or apertures therein. In other examples, other fasteners may be used to connect the trim assembly 3032 to the frame or substrate, such as staples. Alternatively, the trim assembly 3032 may be formed with loops 3170 as shown in FIG. 95 to engage with corresponding hooks on the frame or substrate, or the trim assembly may be formed with wires in the trim assembly, e.g., in the trim cover layer, to hook on the frame or substrate. Alternatively, a drawstring 3168 around the perimeter of the trim assembly, e.g., sewn into the trim cover layer, may be used by inserting the frame or substrate into the trim assembly and then cinching or tightening the drawstring.

Note that fixtures or other tools may be provided to locate the layers of the trim assembly 3032 relative to one another, and/or to locate the trim assembly 3032 relative to the cushion 3040 and/or support member 3022 when connecting the trim assembly 3032 thereto. The fixture may locate and orient the relative components, and also locate and orient any associated fasteners used.

Figure 96B:
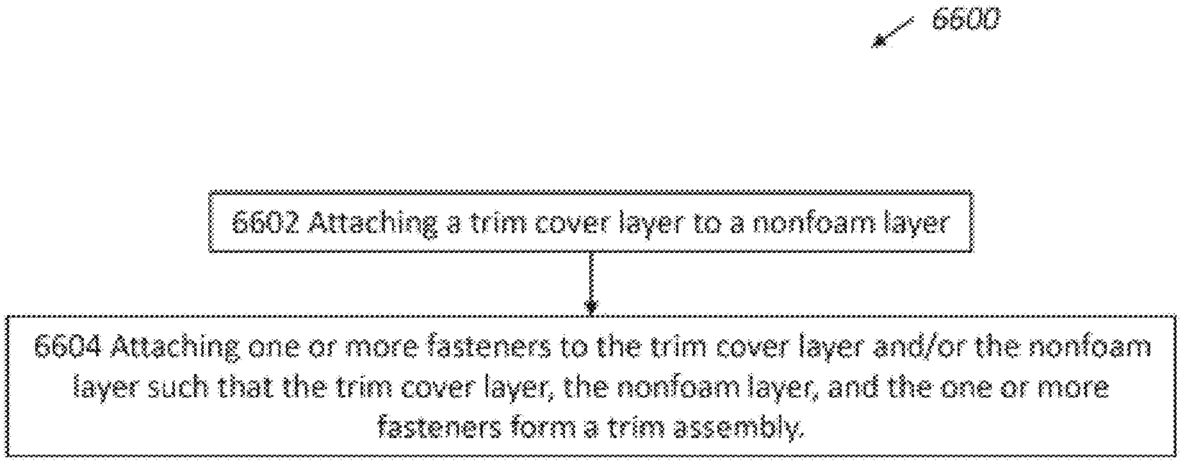
FIG. 96B illustrates a method in accordance with some embodiments.

FIG. 96B illustrates a method 6600 in accordance with some embodiments. Method 6600 is used to attach layers in a seat assembly (e.g., seat assembly 3020), which may be a vehicle seat, office chair, individual chair, and/or the like. In various examples, method 6600 may have greater or fewer steps than described below, and various steps may be performed in another order, sequentially, or simultaneously.

Method 6600 includes attaching (6602) a trim cover layer (e.g., trim cover layer 3100) to a nonfoam layer (e.g., nonfoam layer 3110). Method 6600 includes attaching (6604) one or more fasteners (e.g., tie down 3102, tie fasteners 3142, hog ring 3160, loops 3170, clips 3166, paddle 3164, drawstring 3168) to the trim cover layer (e.g., trim cover layer 3100) and/or the nonfoam layer (e.g., nonfoam layer 3110) such that the trim cover layer (e.g., trim cover layer 3100), the nonfoam layer (e.g., nonfoam layer 3110), and the one or more fasteners (e.g., tie down 3102, tie fasteners 3142, hog ring 3160, loops 3170, clips 3166, paddle 3164, drawstring 3168) form a trim assembly (e.g., trim cover assembly 3032). The steps may be performed in another order, or may be performed sequentially or simultaneously. Additional steps may be added, or steps may be omitted. The trim cover layer and the nonfoam layer may be connected to one another to form the trim cover assembly, or the nonfoam layer may be otherwise supported by the trim cover layer. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. The trim assembly may then be shipped or otherwise delivered to the assembly line for the seat assembly. The trim assembly and seat assembly may occur at two distinct facilities, or at the same facility on two separate lines. A seat assembly with a nonfoam cushion, e.g., a stranded mesh material cushion, the trim assembly may be connected directly to the nonfoam cushion via the use of one or more fasteners. The tic down of the trim cover assembly may connect via hog rings to strands in the nonfoam cushion or to a wire embedded in the nonfoam cushion, or via the use of hook and loop fasteners to the foam cushion. Paddles may be connected to the distal end of the tic down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tic down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tic down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. Fixtures or other tools may be provided to locate the layers of the trim assembly relative to one another, and/or to locate the trim assembly relative to the cushion and/or support member when connecting the trim assembly thereto. The fixture may locate and orient the relative components, and also locate and orient any associated fasteners used. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tic down strip may be attached by a spiral retainer. The tie down strip may define a plurality of equally spaced holes and may include a reinforcement bead. The spiral retainer may be rotated, or turned, as it is wound into the mesh pad, the holes in the tic down strip and around the reinforcement bead. The tic down strip may be retained in a groove by the spiral retainer to retain a seat cover on the seat structure. The spiral retainer may have looped through the polymer fibers of the mesh pad. The spiral retainer may also engage the tic down strip by being wound through the holes and also encircles the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tic down strip. The reinforcement bead may be disposed inside the spiral retainer. The mesh pad may be flexed to open the groove to facilitate inserting the tie down strip with the reinforcement bead in the predetermined location in the bottom of the groove. The tic down strip may be connected to the seat cover that is folded over to provide access to the groove. A machine for inserting the spiral retainer may include a fixture for holding the mesh pad. The spiral retainer may be engaged by a rotating tool that engages and rotates the radial leg. The guide comb may be aligned with the holes in the tic down strip and may receive the spiral retainer as it guides the spiral retainer into the holes. The spiral retainer may also wind through the polymer fibers of the mesh pad. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the method 6600 includes attaching the trim assembly (e.g., trim cover assembly 3032) to a support structure (e.g., frame or support member 3022) of a seat assembly (e.g., seat assembly 3020) subsequent to forming the trim assembly (e.g., trim cover assembly 3032). A cushion may connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate.

In some embodiments, the method 6600 includes forming a trim cover layer (e.g., trim cover layer 3100). The method 6600 also includes forming a nonfoam layer (e.g., nonfoam layer 3110). Panels for the trim cover layer may be cut from a fabric or other material, and then sewn, welded, glued, or otherwise connected to one another to form the trim cover layer. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly.

In some embodiments, the method 6600 includes sewing the trim cover layer (e.g., trim cover layer 3100) to the nonfoam layer (e.g., nonfoam layer 3110) to form the trim assembly (e.g., trim cover assembly 3032). The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer and the nonfoam layer may be connected to one another first using tags, and are then sewn together via one or more seams.

In some embodiments, the method 6600 includes forming a trench (e.g., trench 3124) in the nonfoam layer (e.g., nonfoam layer 3110). The method 6600 includes positioning a seam formed by sewing the trim cover layer (e.g., trim cover layer 3100) to the nonfoam layer (e.g., nonfoam layer 3110) into the trench (e.g., trench 3124). One or more trenches or other shapes may be formed into the filament structure. If no trenches or other shapes are formed into the structure during the forming process, e.g., in the cooling system, then trenches may be machined, or otherwise provided in the stranded mesh material member after it has been dried, and before or after it is cut into the selected shape. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer and the nonfoam layer may be connected to one another first using tags, and are then sewn together via one or more seams.

In some embodiments, the method 6600 includes forming a trench (e.g., trench 3124) in the nonfoam layer (e.g., nonfoam layer 3110). The method 6600 includes connecting the trim cover layer (e.g., trim cover layer 3100) to the nonfoam layer (e.g., nonfoam layer 3110) via one or more tag fasteners (e.g., tag fastener 3142) to form the trim assembly (e.g., trim cover assembly 3032). The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. A seat assembly with a nonfoam cushion, e.g., a stranded mesh material cushion, the trim assembly may be connected directly to the nonfoam cushion via the use of one or more fasteners. The tic down of the trim cover assembly may connect via hog rings to strands in the nonfoam cushion or to a wire embedded in the nonfoam cushion, or via the use of hook and loop fasteners to the foam cushion. Paddles may be connected to the distal end of the tic down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer.

In some embodiments, the method 6600 includes laminating the trim cover layer (e.g., trim cover layer 3100) to the nonfoam layer (e.g., nonfoam layer 3110) to form the trim assembly (e.g., trim cover assembly 3032). The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process.

In some embodiments, the method 6600 includes forming a pocket (e.g., pockets 3150) in the trim cover layer (e.g., trim cover layer 3100). The method 6600 includes inserting the nonfoam layer (e.g., nonfoam layer 3110) into the pocket (e.g., pockets 3150). The method 6600 includes closing the pocket (e.g., pockets 3150). The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed.

In some embodiments, the method 6600 includes attaching a third layer (e.g., additional layer 3130) to one of the trim cover layer (e.g., trim cover layer 3100) and the nonfoam layer (e.g., nonfoam layer 3110) to form the trim assembly (e.g., trim cover assembly 3032). Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer.

In some embodiments, the method 6600 includes positioning the nonfoam layer (e.g., nonfoam layer 3110) between the trim cover layer (e.g., trim cover layer 3100) and the third layer (e.g., additional layer 3130). Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer.

In some embodiments, the method 6600 includes connecting a cushion (e.g., seat bottom cushion 3028, seat back cushion 3030) to the support structure (e.g., support structure 3022) prior to attaching the trim assembly (e.g., trim cover assembly 3032). The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring.

In some embodiments, the method 6600 includes forming the cushion (e.g., seat bottom cushion 3028, seat back cushion 3030) from a stranded mesh material or a foam (e.g., stranded mesh material 3050). The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench.

An assembly is described (e.g., trim cover assembly 3032) with a trim cover layer (e.g., trim cover layer 3100), a nonfoam layer (e.g., nonfoam layer 3110) attached to the trim cover layer (e.g., trim cover layer 3100), and one or more fasteners (e.g., tie down 3102, tie fasteners 3142, hog ring 3160, loops 3170, clips 3166, paddle 3164, drawstring 3168) connected to the trim cover layer and/or the nonfoam layer. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tic down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tic down may be sewn or otherwise connected to the trim assembly or trim cover layer. The tie down may be provided as an elastic element that extends outwardly from the trim cover assembly, e.g., as a band or cord. The trim assembly may be provided without any tie downs. The nonfoam layer may be cut or formed with the trench as an associated slit or through hole for the tic down as shown. The tic down may extend from the B-surface of the trim cover layer, and through the slit or trench in the nonfoam layer. The distal free end of the tic down may be positioned such that the nonfoam layer is between the distal free end of the tic down and the trim cover layer. Various fasteners or other components may be provided for direct assembly to the vehicle seat assembly in addition to the tic down or instead of the tic down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The scam may be provided as a joining seam and/or a decorative seam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tic down of the trim cover assembly may connect via hog rings to a wire in the foam cushion, or via the use of hook and loop fasteners to the foam cushion. The cushion may have a corresponding trench to receive the distal end of the tic down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tic down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tic down strip may be attached by a spiral retainer. The tie down strip may define a plurality of equally spaced holes and may include a reinforcement bead. The spiral retainer may be rotated, or turned, as it is wound into the mesh pad, the holes in the tic down strip and around the reinforcement bead. The tie down strip may be retained in a groove by the spiral retainer to retain a seat cover on the seat structure. The spiral retainer may be looped through the polymer fibers of the mesh pad. The spiral retainer may also engage the tic down strip by being wound through the holes and may also encircle the reinforcement bead. The spiral retainer may include a radial leg that is engaged by a rotating tool to wind the spiral retainer into the mesh pad and the tie down strip. The tic down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tic down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tie down strips may be selected. The tie down strips may be inserted into grooves defined in predetermined locations within the mesh pad. The tie down strip may define a plurality of equally spaced holes above a reinforcement bead that is attached to the tie down strip. A spiral retainer may be turned through the welded polymer fibers of the mesh pad and around the reinforcement bead, through the tic down strips, and in the groove, wherein the spiral retainer may be wound through the plurality of equally spaced holes and the welded polymer fibers to hold the tie down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion. The seat cover may include tie down strips attached to the seat cover that define a plurality of holes. The spiral retainer may secure the tic down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tic down strips to the welded polymer fibers. The welded polymer fibers may hold the spiral retainer in the mesh body. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material. A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be scaled after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

In some embodiments, the nonfoam layer (e.g., nonfoam layer 3110) comprises a stranded-mesh material member (e.g., stranded mesh material 3050). The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench.

In some embodiments, the stranded mesh material member (e.g., stranded mesh material 3050) comprises a polymeric mesh having a plurality of integrated polymeric strands. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench.

In some embodiments, the nonfoam layer (e.g., nonfoam layer 3110) comprises a plastic spacer material (e.g., nonfoam layer 3110, plastic spacer material 3110, two films 3112, spacer inserts 3114, spacer fabric 3052). The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof.

In some embodiments, the nonfoam layer (e.g., nonfoam layer 3110) defines a trench (e.g., trench 3124) intersecting at least one of a first side (e.g., first surface 3120) and a second side (e.g., second surface 3122) of the nonfoam layer (e.g., nonfoam layer 3110). The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tic down may be connected directly to the trim cover layer, or to another layer. The tic down may be formed as a nonwoven fabric, or other material layer that extends outwardly from the B-surface of the trim cover layer or another layer to a distal free end, and may be used to connect the trim assembly to the cushion or support member. The tie down may be sewn or otherwise connected to the trim assembly or trim cover layer. The tic down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tic down may extend from the B-surface of the trim cover layer, and through the slit or trench in the nonfoam layer. The distal free end of the tic down may be positioned such that the nonfoam layer is between the distal free end of the tic down and the trim cover layer. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The scam may be provided as a joining seam and/or a decorative scam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. Various fasteners may be connected to the trim assembly. For any trim cover assemblies with tic downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. The trim assembly may be directly connected to the foam cushion. The tic down of the trim cover assembly may connect via hog rings to a wire in the foam cushion, or via the use of hook and loop fasteners to the foam cushion. The cushion may have a corresponding trench to receive the distal end of the tic down. In another example, paddles may be connected to the distal end of the tic down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired.

In some embodiments, the one or more fasteners (e.g., tic down 3102, tie fasteners 3142, hog ring 3160, loops 3170, clips 3166, paddle 3164, drawstring 3168) further comprises a tic down (e.g., tic down 3102) connected to the trim cover layer and extending into the trench of the nonfoam layer (e.g., nonfoam layer 3110) to a distal free end. The tic down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tic down may be sewn or otherwise connected to the trim assembly or trim cover layer. The tie down may be provided as an clastic element that extends outwardly from the trim cover assembly, e.g., as a band or cord. The trim assembly may be provided without any tic downs. The nonfoam layer may be cut or formed with the trench as an associated slit or through hole for the tic down as shown. The tie down may extend from the B-surface of the trim cover layer, and through the slit or trench in the nonfoam layer. The distal free end of the tie down may be positioned such that the nonfoam layer is between the distal free end of the tie down and the trim cover layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired.

In some embodiments, the one or more fasteners (e.g., tie down 3102, tie fasteners 3142, hog ring 3160, loops 3170, clips 3166, paddle 3164, drawstring 3168) further comprises a hog ring (e.g., hog ring 3160), a hook fastener, a loop fastener, an arrow, a loop (e.g., loops 3170), a clip (e.g., clips 3166), a paddle (e.g., paddle 3164), and/or a drawstring (e.g., drawstring 3168). The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tic down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tic down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring.

In some embodiments, the trim cover layer (e.g., trim cover layer 3100) is attached to the nonfoam layer (e.g., nonfoam layer 3110) via a seam (e.g., seams 3140). The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer.

In some embodiments, the trim cover layer (e.g., trim cover layer 3100) is attached to the nonfoam layer (e.g., nonfoam layer 3110) via a welded connection (e.g., bond 3152).

In some embodiments, the trim assembly further comprises a third layer (e.g., additional layer 3130) connected to the trim cover layer (e.g., trim cover layer 3100) and/or the nonfoam layer (e.g., nonfoam layer 3110). The nonfoam layer (e.g., nonfoam layer 3110) is positioned between the trim cover layer (e.g., trim cover layer 3100) and the third layer (e.g., additional layer 3130). The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer.

In some embodiments, the third layer (e.g., additional layer 3130) comprises a nonwoven fabric. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer.

In some embodiments, the trim assembly is provided without a spacer fabric (e.g., spacer fabric 3052). The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof.

In some embodiments, an assembly (e.g., seat assembly 3020) is described with a support member (e.g., support structure 3022), and a trim assembly (e.g., trim cover assembly 3032). The seat assembly may be shaped and sized as a front row driver or passenger seat, a second, third, or other rear row seat, and may include bench-style seats as shown, bucket seats, or other seat styles, may be a non-stowable seat or a stowable seat that may be foldable and stowable in a cavity in the vehicle floor, and may be configured for use with other non-vehicle applications. The support member may be provided by a frame and/or a substrate. The frame may include wire suspension mats or other structure to support the cushions. The support structure may provide rigid structural support for the seat components, e.g., the seat bottom and seat back, and may be provided as multiple frame members and/or substrates or panels that are moveable relative to one another to provide adjustments for the seat assembly. The support structure may be formed from a stamped steel alloy, a fiber reinforced polymer, or any suitable structural material. The seat assembly may have a heating pad or heating mat positioned between the cushion and the trim cover.

In some embodiments, the one or more fasteners (e.g., tie down 3102, tie fasteners 3142, hog ring 3160, loops 3170, clips 3166, paddle 3164, drawstring 3168) connect the trim assembly (e.g., trim cover assembly 3032) to the support member (e.g., support structure 3022). The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring.

In some embodiments, a seating cushion (e.g., seat bottom cushion 3028, seat back cushion 3030) defines a first surface to support an occupant and a second surface opposite to the first surface. The seating cushion (e.g., seat bottom cushion 3028, seat back cushion 3030) is supported by the support member (e.g., support structure 3022), and is positioned between the support member (e.g., support structure 3022) and the trim assembly (e.g., trim cover assembly 3032). The trim assembly (e.g., trim cover assembly 3032) is connected to the seating cushion (e.g., seat bottom cushion 3028, seat back cushion 3030) and/or the support member (e.g., support structure 3022) via the one or more fasteners. The seating cushion may be formed from a foam material, such as a molded polyurethane foam. The seating cushion may include at least one nonfoam component or member. The seating cushion may be formed solely from the nonfoam component, such that the nonfoam component provides all of the cushioning for the seat component between the frame and the trim cover. The seating cushion may be formed from a nonfoam component as well as one or more foam components, such as a component formed from molded polyurethane foam. The seating cushion may have the nonfoam and foam components positioned to provide different regions of the cushion for the seating component, e.g., a central region, and side bolster regions. The seating cushion may have a thin foam or other material layer positioned between the nonfoam component and the trim cover to provide additional cushioning for one or more regions of the seating component. The nonfoam component or member of the seating cushion may be formed by a stranded mesh material, also known as an entangled three-dimensional filament structure. The stranded-mesh material may be made from a polymeric mesh having a plurality of integrated polymeric strands. The stranded-mesh material may be made from, for example, a linear low-density polyethylene (LLPDE) material, although other polymers and materials effective to provide the desired properties and functionality are contemplated. The stranded-mesh material may be formed using extruded filaments of linear low-density polyethylene (LLDPE) that are randomly entangled, bent, looped, or otherwise positioned and oriented, and directly bonded to each other to provide a porous mesh structure.

In some embodiments, the seating cushion (e.g., seat bottom cushion 3028, seat back cushion 3030) comprises a nonfoam member (e.g., nonfoam layer 3110) and/or a foam member.

In some embodiments, the support member (e.g., support structure 3022) comprises at least one of a frame and a substrate (e.g., support structure 3022).

Figure 97:
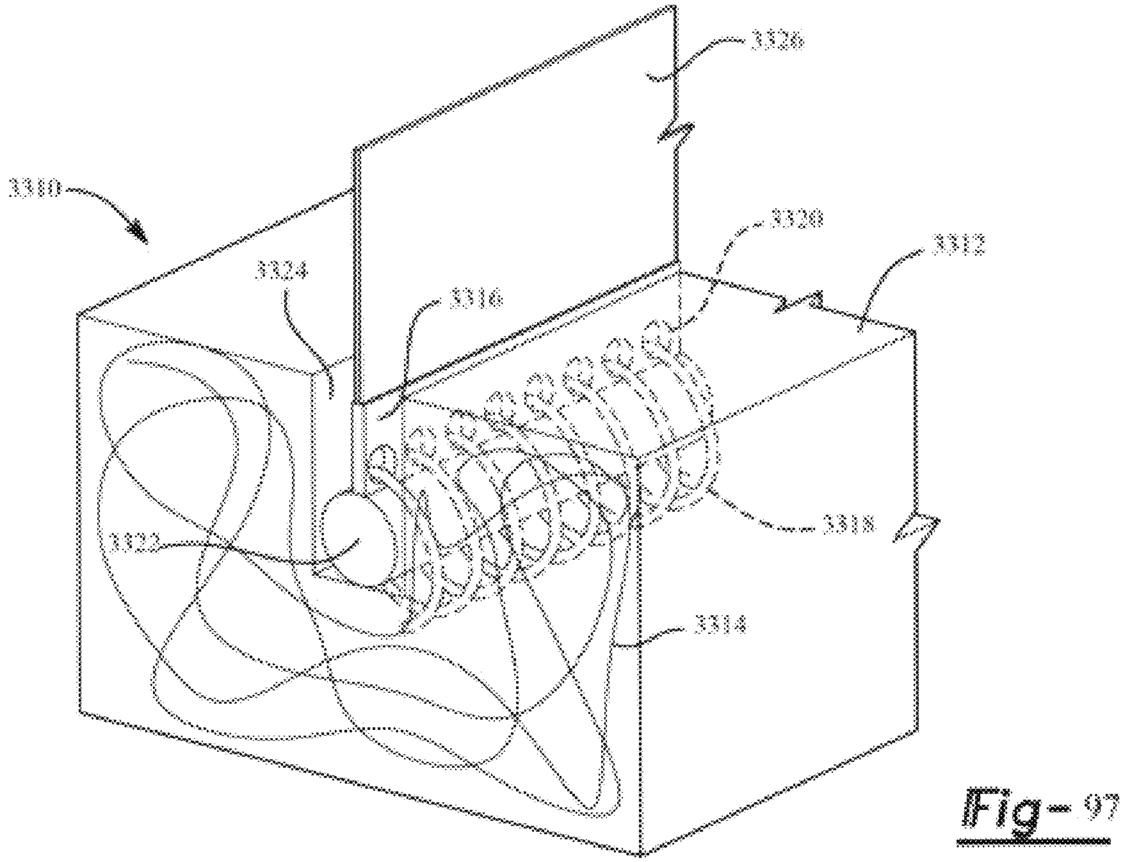
FIG. 97 is a fragmentary perspective view of a mesh body with a seat cover tie down strip retained by a spiral retainer.

Referring to FIG. 97, a portion of a seat structure 3310 is illustrated that includes a mesh pad 3312 that is made up of polymer fibers 3314. The polymer fibers are thermoplastic fibers that are, in one embodiment, polyethylene fibers. The polymer fibers are spun and heated in a mold or die and formed into the shape of a seat base, seat back, or another padded trim piece.

A tie down strip 3316 is attached by a spiral retainer 3318. The tie down strip 3316 defines a plurality of equally spaced holes 3320 and includes a reinforcement bead 3322. The spiral retainer 3318 is rotated, or turned, as it is wound into the mesh pad 3312, the holes 3320 in the tic down strip 3316 and around the reinforcement bead 3322. The tic down strip 3316 is retained in a groove 3324 by the spiral retainer 3318 to retain a seat cover 3326 on the seat structure 3310.

Figure 98:
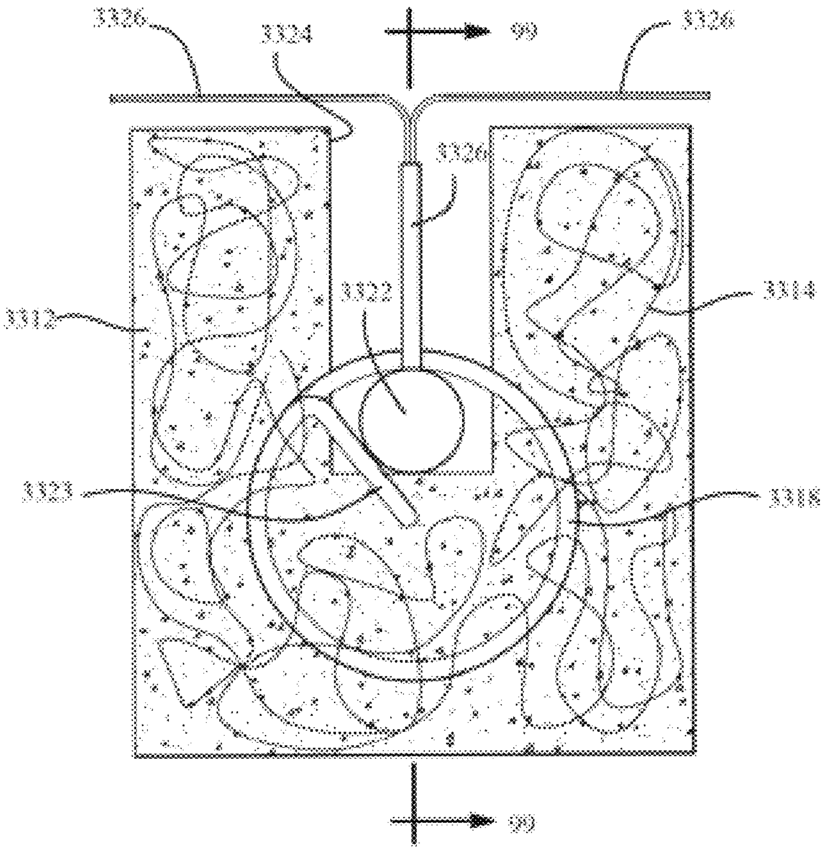
FIG. 98 is a diagrammatic elevation view of a portion of a seat cover retained with a tie down strip that is held with a spiral retainer in the mesh body.

Referring to FIG. 98, the seat structure 3310 is shown in cross section the spiral retainer 3318 is shown to have looped through the polymer fibers of the mesh pad. The spiral retainer 3318 also engages the tie down strip 3316 by being wound through the holes 3320 and also encircles the reinforcement bead 3322. The spiral retainer 3318 includes a radial leg 3323 that is engaged by a rotating tool to wind the spiral retainer 3318 into the mesh pad 3312 and the tie down strip 3316. The tie down strip 3316 is disposed in the groove 3324 and is connected to the seat cover 3326 that is shown to be overlying the mesh pad 3312.

Figure 99:
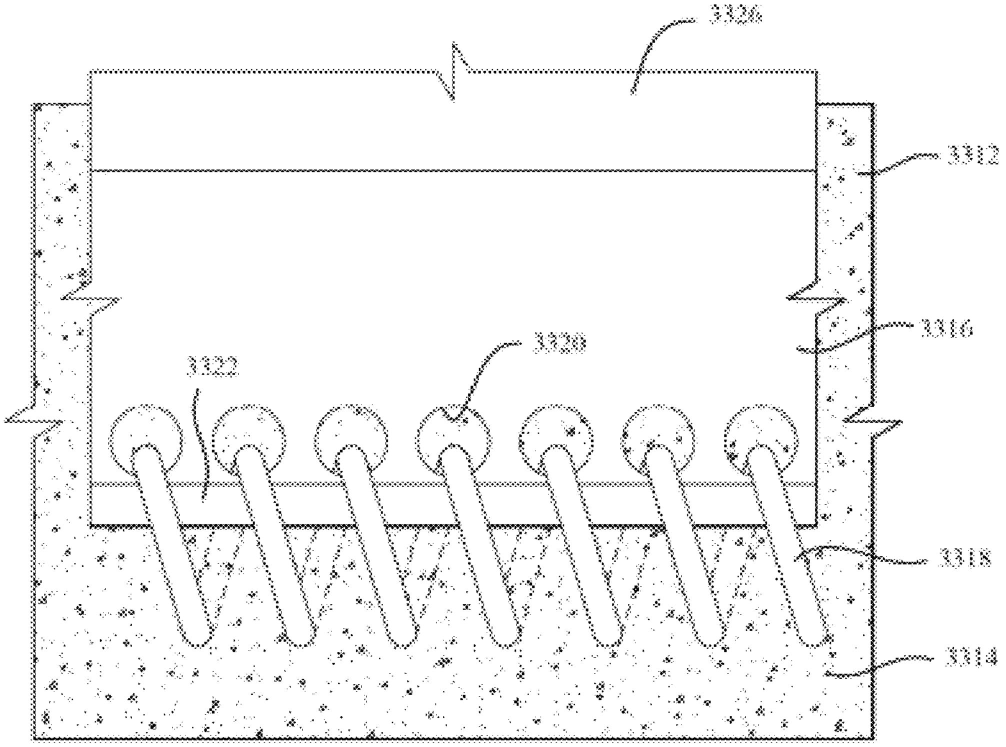
FIG. 99 is a cross section view taken along the line 99-99 in FIG. 98.

Referring to FIG. 99, that is a section through the tie down strip 3316 the spiral retainer 3318 is shown as it is looped through the welded polymer fibers 3314 and the holes 3320 defined by the tie down strip 3316. The reinforcement bead 3322 is disposed inside the spiral retainer 3316.

Figure 100:
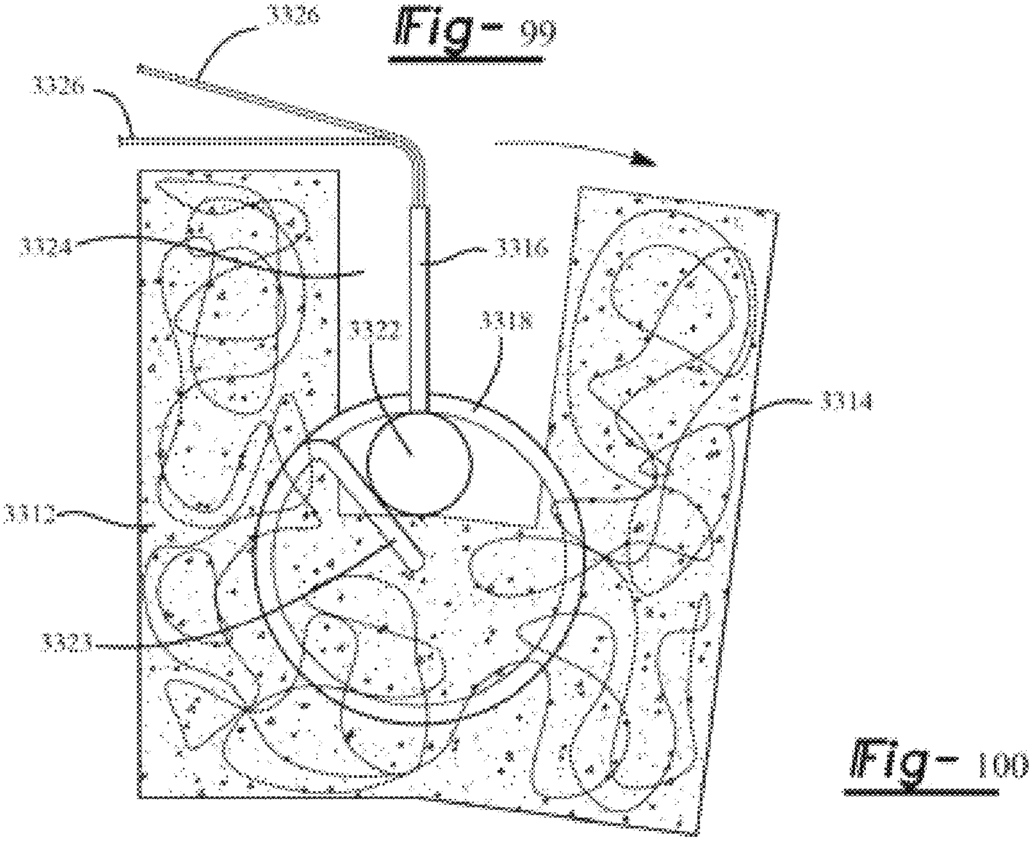
FIG. 100 is an elevation view showing the mesh body being flexed to open a groove to receive the tie down strip prior to insertion of the spiral retainer.

Referring to FIG. 100, the mesh pad 3312 is shown being flexed to open the groove 3324 to facilitate inserting the tie down strip 3316 with the reinforcement bead 3322 in the predetermined location in the bottom of the groove 3324. The tie down strip is connected to the seat cover 3326 that is folded over to provide access to the groove 3324.

Referring to FIG. 101, the component parts of the apparatus are shown. The mesh pad 3312 is made up of the polymer fibers 3314 and defines a groove 3324. The spiral retainer 3318 is shown adjacent to a guide comb 3328 that includes a plurality of equally spaced teeth 3330 that are separated by gaps 3332. The gaps 3332 correspond to the spacing between the holes 3320 formed in the tie down strip 3316. When the guide comb 3328 and the tie down strip 3316 are placed in the groove 3324, the gaps 3332 defined between the teeth 3330 are aligned with the holes 3320. The helical wraps of the spiral retainer have the same spacing as the gaps 3332 and holes 3320 so that once the spiral retainer begins to be wound through the holes 3320 it is fed through the holes. The spiral retainer 3318 is also wound through the polymer fibers 3314 that are randomly located in the mesh pad 3312 but sufficiently packed together to firmly retain the tie down strip in the groove 3324 defined by the mesh pad 3312.

A machine for inserting the spiral retainer 3318 is partially illustrated in FIG. 101. The machine includes a fixture 3334 for holding the mesh pad 3312. The spiral retainer 3318 is shown to be engaged by a rotating tool 3336 that engages and rotates the radial leg 3323. The guide comb 3328 is aligned with the holes 3320 in the tie down strip 3316 and receives the spiral retainer 3318 as it guides the spiral retainer 3318 into the holes 3320. At the same time, the spiral retainer winds through the polymer fibers 3314 of the mesh pad 3312.

According to one aspect of this disclosure, a method is disclosed for attaching a seat cover to a seat structure including a resilient seat cushion. The method includes the steps of selecting a mesh pad of welded polymer fibers and selecting a cover including tie down strips. The tie down strips are inserted into grooves defined in predetermined locations within the mesh pad. The tie down strip defines a plurality of equally spaced holes above a reinforcement bead that is attached to the tie down strip. A spiral retainer is turned through the welded polymer fibers of the mesh pad and around the reinforcement bead, through the tie down strips, and in the groove, wherein the spiral retainer is wound through the plurality of equally spaced holes and the welded polymer fibers to hold the tie down strips in the predetermined locations.

The above method in some embodiments includes forming the mesh pad into the shape of a seat cushion. According to one embodiment the tie down strips are sewn to the seat cover. One approach includes inserting a guide comb in the groove to align the equally spaced holes with gaps defined by the guide comb and a plurality of turns of the spiral retainer. The method further comprises guiding the spiral retainer as the spiral retainer is turned into the mesh body, the holes and the groove.

According to another aspect of this disclosure, an apparatus is disclosed that includes a mesh pad, a seat cover, and a spiral retainer. The mesh pad is made of polymer fibers bonded together by melted portions of the polymer fibers and the mesh pad is formed into a seat cushion. The seat cover includes tie down strips attached to the seat cover that define a plurality of holes. The spiral retainer secures the tie down strips to the polymer fibers with the spiral retainer being wound through the holes and the spiral retainer being looped into the welded polymer fibers.

The seat cover in one embodiment is formed by sewing together a plurality of sections of cover material and attaching the plurality of sections of cover material to the tie down strips. The mesh pad of polymer fibers defines a plurality of grooves recessed into the mesh pad. In some embodiments the tie down strips are plastic strips that include a bead reinforcement. The tie down strips each include a bead reinforcement and a flexible flange that are sewn or ultrasonically welded to an edge of the seat cover. The tie down strips in some embodiments each include a bead reinforcement and a flexible flange that are formed as a combination.

The mesh pad defines grooves, the seat cover includes segments of flexible sheet material that are sewn together with the tie down strips that are received in the grooves and the tic down strips are disposed in the grooves with a guide comb when the spiral retainer is wound through the groove to secure the tie down strips to the welded polymer fibers. The welded polymer fibers hold the spiral retainer in the mesh body.

According to another aspect of this disclosure, a machine is disclosed for attaching a seat cover to a seat structure that includes a mesh pad of polymer fibers. The machine includes a fixture that receives the mesh pad of polymer fibers bonded together in a form of a seat cushion, a seat cover including tie down strips defining a plurality of holes, and a guide. A rotary tool includes a spiral retainer that is rotated into the fixture and a groove defined by the mesh pad. The spiral retainer is wound into the plurality of holes and through the welded polymer fibers of the mesh pad to hold the tie down strip in a predetermined location in the mesh pad.

Other potential features of the machine are that the machine also includes a guide comb including a plurality of teeth that define tooth gaps. The guide comb includes a plurality of teeth that define tooth gaps that are spaced apart by the distance between each of the plurality of holes. The tie down strips include a plastic reinforcement bead and a flexible flange that are attached to the seat cover.

Figure 101B:
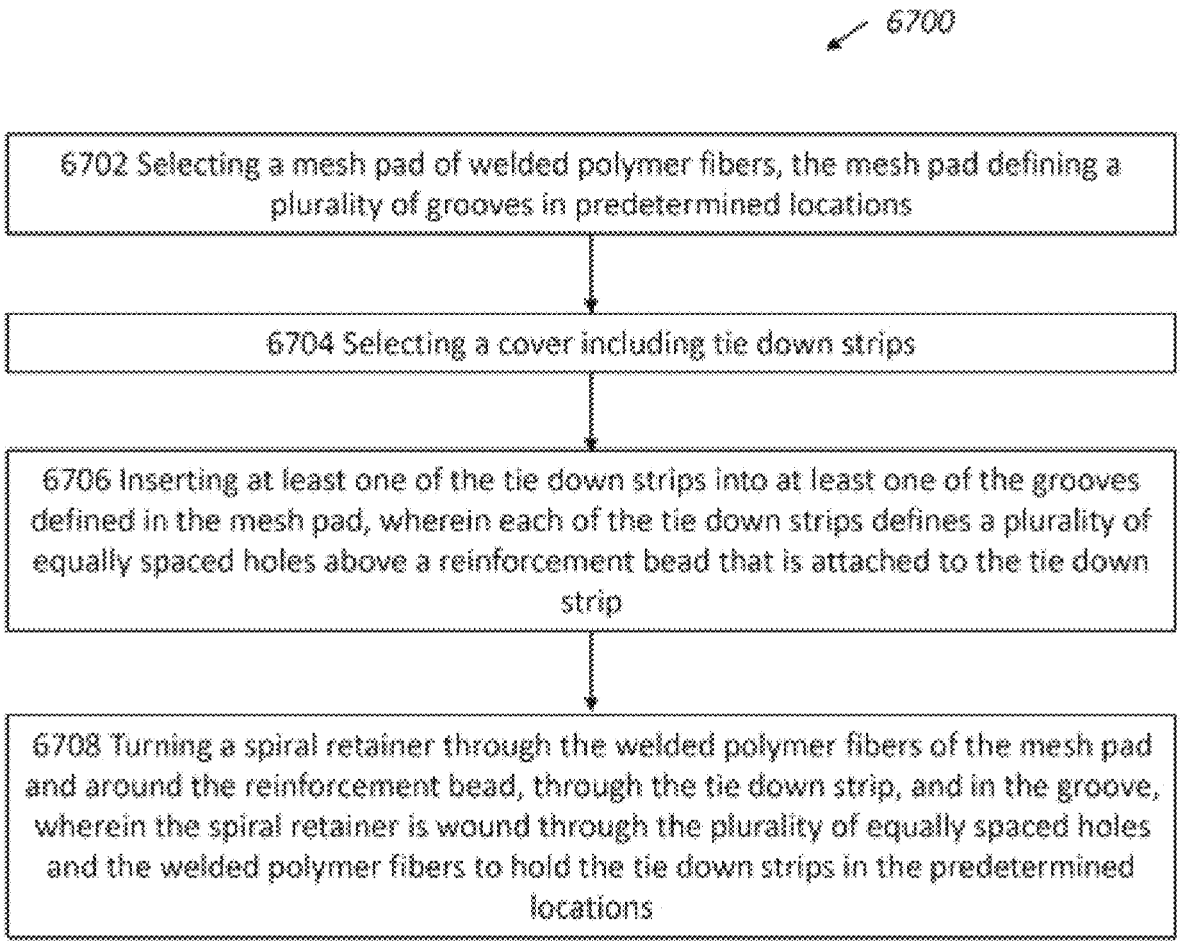
FIG. 101B illustrates a method in accordance with some embodiments.

FIG. 101B illustrates a method 6700 in accordance with some embodiments. Method 6700 is used to assemble a seat structure (e.g., seat structure 3310), which may be a vehicle seat, office chair, individual chair, and/or the like. In various examples, method 6700 may have greater or fewer steps than described below, and various steps may be performed in another order, sequentially, or simultaneously.

Method 6700 includes selecting (6702) a mesh pad (e.g., mesh pad 3312) of welded polymer fibers (e.g., polymer fibers 3314), the mesh pad (e.g., mesh pad 3312) defining a plurality of grooves (e.g., groove 3324) in predetermined locations. Method 6700 includes selecting (6704) a cover including tie down strips (e.g., tie down strip 3316). Method 6700 includes inserting (6706) at least one of the tic down strips (e.g., tic down strip 3316) into at least one of the grooves (e.g., groove 3324) defined in the mesh pad (e.g., mesh pad 3312), wherein each of the tie down strips (e.g., tie down strip 3316) defines a plurality of equally spaced holes (e.g., spaced holes 3320) above a reinforcement bead (e.g., reinforcement bead 3322) that is attached to the tie down strip (e.g., tic down strip 3316). Method 6700 includes turning (6708) a spiral retainer (e.g., spiral retainer 3318) through the welded polymer fibers (e.g., polymer fibers 3314) of the mesh pad and around the reinforcement bead (e.g., reinforcement bead 3322), through the tie down strip (e.g., tie down strip 3316), and in the groove (e.g., groove 3324), wherein the spiral retainer (e.g., spiral retainer 3318) is wound through the plurality of equally spaced holes (e.g., spaced holes 3320) and the welded polymer fibers (e.g., polymer fibers 3314) to hold the tie down strips (e.g., tic down strip 3316) in the predetermined locations. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tic down strip may define a plurality of equally spaced holes and may include a reinforcement bead. The spiral retainer may be rotated, or turned, as it is wound into the mesh pad, the holes in the tic down strip and around the reinforcement bead. The tie down strip may be retained in a groove by the spiral retainer to retain a seat cover on the seat structure. The spiral retainer may have looped through the polymer fibers of the mesh pad. The spiral retainer may also engage the tic down strip by being wound through the holes and also encircles the reinforcement bead. The spiral retainer may include a radial leg that is engaged by a rotating tool to wind the spiral retainer into the mesh pad and the tie down strip. The tic down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. The steps may be performed in another order, or may be performed sequentially or simultaneously. Additional steps may be added, or steps may be omitted. The trim cover layer and the nonfoam layer may be connected to one another to form the trim cover assembly, or the nonfoam layer may be otherwise supported by the trim cover layer. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. The trim assembly may then be shipped or otherwise delivered to the assembly line for the seat assembly. The trim assembly and seat assembly may occur at two distinct facilities, or at the same facility on two separate lines. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tic down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. Fixtures or other tools may be provided to locate the layers of the trim assembly relative to one another, and/or to locate the trim assembly relative to the cushion and/or support member when connecting the trim assembly thereto. The fixture may locate and orient the relative components, and also locate and orient any associated fasteners used. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the method 6700 includes forming the mesh pad (e.g., mesh pad 3312) into the shape of a seat cushion. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes, and the groove.

In some embodiments, the method 6700 includes sewing the tie down strips (e.g., tie down strip 3316) to the cover, wherein the cover is a seat cover (e.g., seat cover 3326). The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tic down strips in some embodiments may each include a bead reinforcement and a flexible flange that are formed as a combination.

In some embodiments, the method 6700 includes inserting a guide comb (e.g., guide comb 3328) in the groove (e.g., groove 3324) to align the equally spaced holes (e.g., spaced holes 3320), with gaps (e.g., gaps 3332) defined by the guide comb, and a plurality of turns of the spiral retainer (e.g., spiral retainer 3318). The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tic down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad.

In some embodiments, the method 6700 includes inserting a mandrel (e.g., tool 3336) into the spiral retainer (e.g., spiral retainer 3318), and guiding the spiral retainer (e.g., spiral retainer 3318) as the spiral retainer (e.g., spiral retainer 3318) is turned into the mesh body (e.g., mesh pad 3312).

In some embodiments, a vehicle seat (e.g., seat structure 3310) is made according to the method 6700.

An apparatus (e.g., seat structure 3310) is described with a mesh pad (e.g., mesh pad 3312) of polymer fibers (e.g., polymer fibers 3314) bonded together by melted portions of the polymer fibers (e.g., polymer fibers 3314), wherein the mesh pad (e.g., mesh pad 3312) is formed into a seat cushion (e.g., seat structure 3310). A seat cover (e.g., seat cover 3326) includes tic down strips (e.g., tic down strip 3316) attached to the seat cover (e.g., seat cover 3326), wherein the tic down strips (e.g., tic down strip 3316) define a plurality of holes (e.g., spaced holes 3320). A spiral retainer (e.g., spiral retainer 3318) secures the tie down strips (e.g., tie down strip 3316) to the polymer fibers (e.g., polymer fibers 3314) with the spiral retainer (e.g., spiral retainer 3318) being wound through the holes (e.g., spaced holes 3320) and the spiral retainer (e.g., spiral retainer 3318) being looped into the welded polymer fibers (e.g., polymer fibers 3314).

A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tie down strip may define a plurality of equally spaced holes and may include a reinforcement bead. The spiral retainer may be rotated, or turned, as it is wound into the mesh pad, the holes in the tic down strip and around the reinforcement bead. The tic down strip may be retained in a groove by the spiral retainer to retain a seat cover on the seat structure. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tic down strip. The tic down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tic down strip with the reinforcement bead in the predetermined location in the bottom of the groove. The tic down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tic down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tic down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tic down strips may be selected. The tic down strips may be inserted into grooves defined in predetermined locations within the mesh pad. The tic down strip may define a plurality of equally spaced holes above a reinforcement bead that is attached to the tie down strip. A spiral retainer may be turned through the welded polymer fibers of the mesh pad and around the reinforcement bead, through the tie down strips, and in the groove, wherein the spiral retainer may be wound through the plurality of equally spaced holes and the welded polymer fibers to hold the tic down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion. The seat cover may include tic down strips attached to the seat cover that define a plurality of holes. The spiral retainer may secure the tic down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tic down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tie down strips to the welded polymer fibers. The welded polymer fibers may hold the spiral retainer in the mesh body. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant.

The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tic down may be connected directly to the trim cover layer, or to another layer. The tic down may be formed as a nonwoven fabric, or other material layer that extends outwardly from the B-surface of the trim cover layer or another layer to a distal free end, and may be used to connect the trim assembly to the cushion or support member. The tic down may be sewn or otherwise connected to the trim assembly or trim cover layer. The tic down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tic down may extend from the B-surface of the trim cover layer, and through the slit or trench in the nonfoam layer. The distal free end of the tic down may be positioned such that the nonfoam layer is between the distal free end of the tie down and the trim cover layer. Various fasteners or other components may be provided for direct assembly to the vehicle seat assembly in addition to the tic down or instead of the tic down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative scam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tic down of the trim cover assembly may connect via hog rings to a wire in the foam cushion, or via the use of hook and loop fasteners to the foam cushion. The cushion may have a corresponding trench to receive the distal end of the tic down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tic down of the trim cover assembly may connect via hog rings to strands in the nonfoam cushion or to a wire embedded in the nonfoam cushion, or via the use of hook and loop fasteners to the foam cushion. Paddles may be connected to the distal end of the tic down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tic down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material. A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

In some embodiments, the seat cover (e.g., seat cover 3326) is formed by sewing together a plurality of sections of cover material and attaching the plurality of sections of cover material to the tie down strips (e.g., tie down strip 3316). The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination.

In some embodiments, the mesh pad (e.g., mesh pad 3312) of polymer fibers (e.g., polymer fibers 3314) defines a plurality of grooves (e.g., groove 3324) recessed into the mesh pad (e.g., mesh pad 3312). A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure.

In some embodiments, the tie down strips (e.g., tie down strip 3316) are plastic strips that include a bead reinforcement (e.g., reinforcement bead 3322). A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure.

In some embodiments, the tie down strips (e.g., tie down strip 3316) each include a bead reinforcement (e.g., reinforcement bead 3322) and a flexible flange that are sewn to an edge of the seat cover (e.g., seat cover 3326). A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure.

In some embodiments, the tie down strips (e.g., tie down strip 3316) each include a bead reinforcement (e.g., reinforcement bead 3322) and a flexible flange that are formed as a combination. A tie down strip may be attached by a spiral retainer. The tie down strip may define a plurality of equally spaced holes and may include a reinforcement bead.

The spiral retainer may be rotated, or turned, as it is wound into the mesh pad, the holes in the tie down strip and around the reinforcement bead. The tie down strip may be retained in a groove by the spiral retainer to retain a seat cover on the seat structure.

In some embodiments, the mesh pad (e.g., mesh pad 3312) defines grooves (e.g., groove 3324), the seat cover (e.g., seat cover 3326) includes segments of flexible sheet material that are sewn together with the tie down strips (e.g., tie down strip 3316), wherein the tie down strips (e.g., tie down strip 3316) are received in the grooves (e.g., groove 3324) and the tie down strips (e.g., tie down strip 3316) are disposed in the grooves (e.g., groove 3324) with a guide comb (e.g., guide comb 3328) when the spiral retainer is wound through the groove (e.g., groove 3324) to secure the tie down strips (e.g., tie down strip 3316) to the welded polymer fibers (e.g., polymer fibers 3314). A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tic down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tic down strip in the groove defined by the mesh pad. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad.

In some embodiments, the welded polymer fibers (e.g., polymer fibers 3314) hold the spiral retainer (e.g., spiral retainer 3318) in the mesh body. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tic down strip. The tic down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer.

In some embodiments, the polymer fibers (e.g., polymer fibers 3314) are polyethylene. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece.

A machine (e.g., tool 3336) is described with a fixture (e.g., fixture 3334) that receives a mesh pad (e.g., mesh pad 3312) of polymer fibers (e.g., polymer fibers 3314) bonded together in a form of a seat cushion (e.g., seat structure 3310), a seat cover (e.g., seat cover 3326) including tie down strips (e.g., tie down strip 3316) defining a plurality of holes (e.g., spaced holes 3320), and a guide (e.g., guide comb 3328). A rotary tool (e.g., tool 3336) includes a spiral retainer (e.g., spiral retainer 3318) that is rotated into the fixture (e.g., fixture 3334) and a groove (e.g., groove 3324) defined by the mesh pad (e.g., mesh pad 3312), wherein the spiral retainer (e.g., spiral retainer 3318) is wound into the plurality of holes (e.g., spaced holes 3320) and through the welded polymer fibers (e.g., polymer fibers 3314) of the mesh pad (e.g., mesh pad 3312) to hold the tie down strip (e.g., tie down strip 3316) in a predetermined location in the mesh pad (e.g., mesh pad 3312). A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tic down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may have looped through the polymer fibers of the mesh pad. The spiral retainer may also engage the tie down strip by being wound through the holes and also encircles the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. A machine for inserting the spiral retainer may include a fixture for holding the mesh pad. The spiral retainer may be engaged by a rotating tool that engages and rotates the radial leg. The guide comb may be aligned with the holes in the tic down strip and may receive the spiral retainer as it guides the spiral retainer into the holes. The spiral retainer may also wind through the polymer fibers of the mesh pad. A machine may attach a seat cover to a seat structure that includes a mesh pad of polymer fibers. The machine may include a fixture that receives the mesh pad of polymer fibers bonded together in a form of a seat cushion, a seat cover including tie down strips defining a plurality of holes, and a guide. A rotary tool may include a spiral retainer that is rotated into the fixture and a groove defined by the mesh pad. The spiral retainer may be wound into the plurality of holes and through the welded polymer fibers of the mesh pad to hold the tic down strip in a predetermined location in the mesh pad. The machine may also include a guide comb including a plurality of teeth that define tooth gaps. The guide comb may include a plurality of teeth that define tooth gaps that are spaced apart by the distance between each of the plurality of holes. The tic down strips may include a plastic reinforcement bead and a flexible flange that are attached to the seat cover.

In some embodiments, a guide comb (e.g., guide comb 3328) includes a plurality of teeth (e.g., teeth 3330) that define tooth gaps (e.g., gaps 3332). The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tic down strip in the groove defined by the mesh pad. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad.

In some embodiments, the guide comb (e.g., guide comb 3328) includes a plurality of teeth (e.g., teeth 3330) that define tooth gaps (e.g., gaps 3332) that are spaced apart by the distance between each of the plurality of holes (e.g., spaced holes 3320). The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. The machine may also include a guide comb including a plurality of teeth that define tooth gaps. The guide comb may include a plurality of teeth that define tooth gaps that are spaced apart by the distance between each of the plurality of holes. The tie down strips may include a plastic reinforcement bead and a flexible flange that are attached to the seat cover.

In some embodiments, the tie down strip (e.g., tic down strip 3316) includes a plastic reinforcement bead (e.g., reinforcement bead 3322) and a flexible flange that are attached to the seat cover (e.g., seat cover 3326). A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The machine may also include a guide comb including a plurality of teeth that define tooth gaps. The guide comb may include a plurality of teeth that define tooth gaps that are spaced apart by the distance between each of the plurality of holes. The tie down strips may include a plastic reinforcement bead and a flexible flange that are attached to the seat cover.

In some embodiments, the polymer fibers (e.g., polymer fibers 3314) are thermoplastic polymer fibers (e.g., polymer fibers 3314). A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece.

Figure 102:
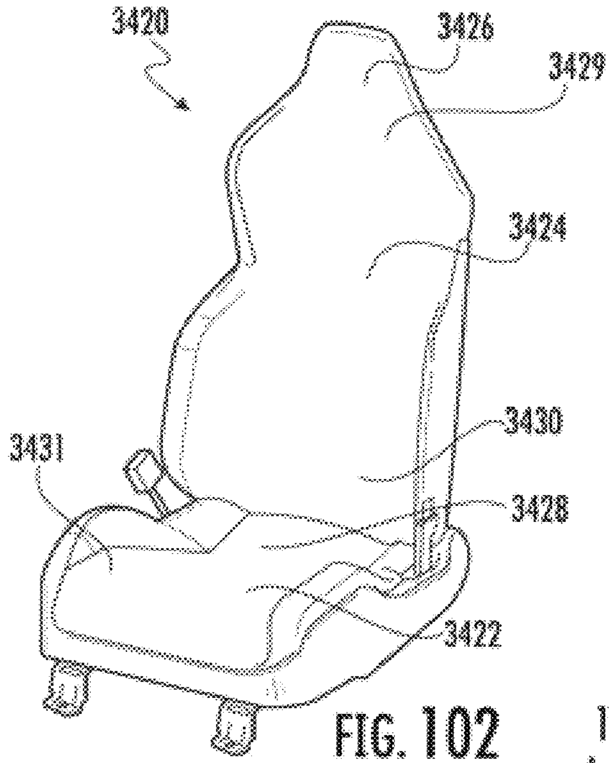
FIG. 102 is a front perspective view of a vehicle seat assembly according to some embodiments.

FIG. 102 illustrates a vehicle seat assembly 3420 according to some embodiments. The vehicle seat assembly 3420 is provided with a seat bottom 3422 adapted to be mounted to a vehicle floor. The vehicle seat assembly 3420 may be provided in any row of a vehicle. The vehicle seat assembly 3420 includes a seat back 3424 extending upright from the seat bottom 3422. The vehicle seat assembly 3420 also includes a head restraint 3426 extending above the seat back 3424. The vehicle seat assembly 3420 may be employed in any type of vehicle, including land vehicles, watercrafts, aircrafts, or the like. The vehicle seat assembly 3420 may be any seat assembly such as an office chair, furniture, or the like.

Figure 103:
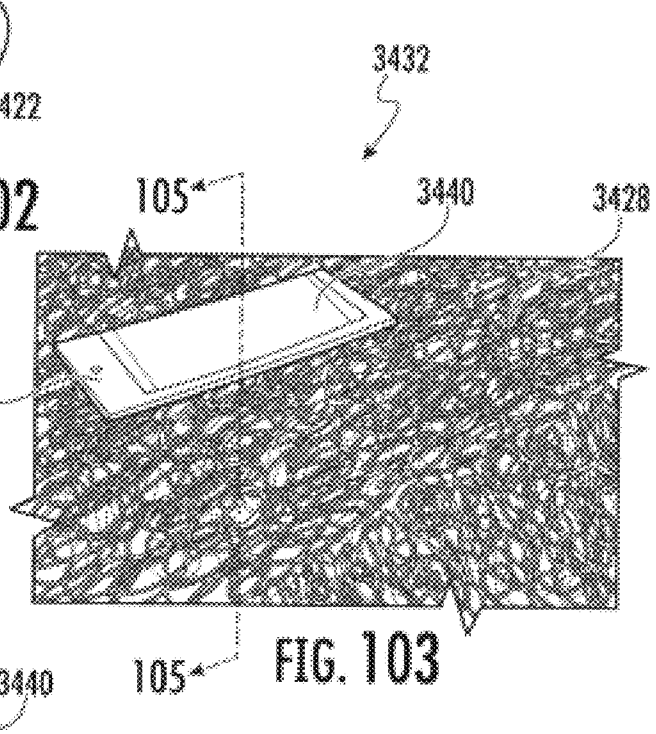
FIG. 103 is a top perspective view of a seat cushion and a retainer of the vehicle seat assembly of FIG. 102.

The vehicle seat assembly 3420 is provided with a trim cover 3429, 3430, 3431 over the seat bottom 3422, seat back 3424, and head restraint 3426 respectively, to conceal a frame, cushioning, and functional components. As illustrated in FIG. 103, the seat bottom 3422 is provided with a seat cushion 3428. The seat cushion 3428 is made out of a stranded thermoplastic mesh. Traditional seat cushions are made out of a foam material, which creates a high surface area allowing a trim cover, actuator, or heat transfer layer to be adhered to the cushion. Thermoplastic mesh cushions provide the comfort and stability of a foam cushion, with increased porosity, while reducing weight, cost, and manufacturing tooling. The stranded thermoplastic mesh cushion 3428 (or foamless cushion) has a low surface area since the surface area is defined by a collection of extruded strands.

Figure 104:
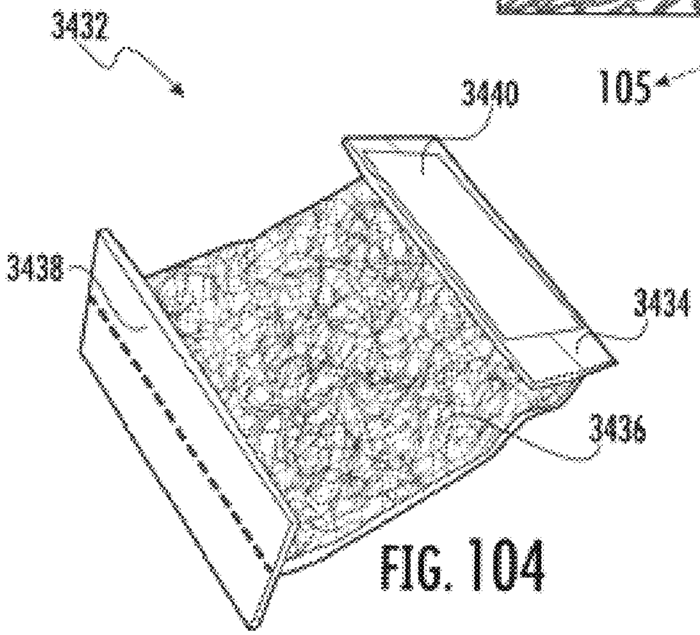
FIG. 104 is a perspective view of the retainer of FIG. 103.

Referring to FIGS. 103 and 104, a retainer assembly 3432 is illustrated. The retainer assembly 3432 is installed in the seat cushion 3428. The retainer assembly 3432 is provided with a base 3434 with a contact surface to provide a planar contact surface upon the cushion 3428. The base 3434 of the retainer assembly 3432 is also provided with a surface fastener 3440. The surface fastener 3440 can be a hook and loop fastener, an adhesive material, or the like. The base 3434 is provided with the fastener 3440 to attach a seat trim cover 3431, an actuator such as a massage bladder assembly, and/or a heat transfer layer such as a heating pad or ventilation layer to the cushion 3428. The base 3434 is composed of a polymeric material.

Figure 105:
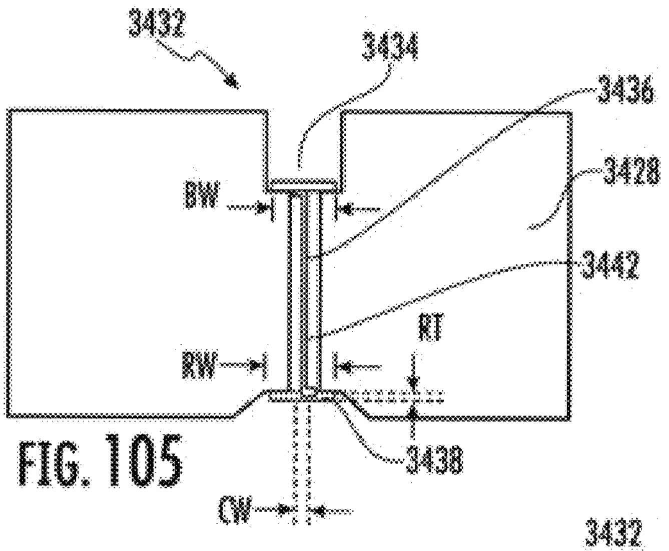
FIG. 105 is a cross-sectional view of the retainer of FIG. 103 installed in the seat cushion of the vehicle seat assembly of FIG. 102, taken along line 105-105 of FIG. 103.

With reference to FIGS. 104 and 105, the retainer assembly 3432 is further provided with a connector 3436 and a retainer 3438. The connector 3436 is sewn to a surface of the base 3434 opposite to the contact surface with the surface fastener 3440. The connector 3436 is also sewn to the retainer 3438. The connector 3436 is provided with a width CW in a material thickness direction of the connector 3436. The connector width CW is smaller than a width BW of the base 3434. The retainer 3438 has a thickness RT less than a width RW of the retainer 3438. The connector 3436 extends through a slot 3442 in the seat cushion 3428. The connector 3436 is composed of a textile material such as fabric, cloth, or the like.

The retainer 3438 width RW is greater than the width CW of the connector 3436. The retainer 3438 is pivotally attached to the connector 3436 spaced apart from the base 3434 of the retainer assembly 3432. The retainer 3438 can pivot externally to the seat cushion 3428 so that the width RW of the retainer 3438 engages the seat cushion 3428. The retainer 3438 retains the base 3434 upon the seat cushion 3428. The retainer 3438 is composed of a polymeric material.

Figure 106:
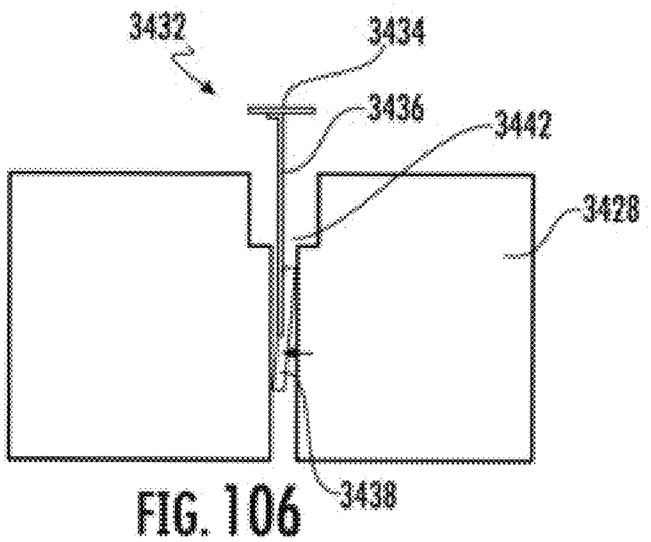
FIG. 106 is a cross-sectional view of the retainer of FIG. 103 partially inserted in the seat cushion of the vehicle seat assembly of FIG. 102.

FIG. 106 illustrates the retainer assembly 3432 partially inserted in the seat cushion 3428. The retainer 3438 of the retainer assembly 3432 collapses along the connector 3436 of the retainer assembly 3432. The retainer 3438 and the connector 3436 are then inserted into the slot 3442 formed through the seat cushion 3428. The retainer 3438 is translated through the seat cushion 3428 with the connector 3436 still at least partially within the slot 3442 of the seat cushion 3428. The retainer 3438 is then expanded relative to the connector 3436 into contact with a region of the seat cushion 3428 adjacent to the slot 3442 to retain the connector 3436 within the slot 3442 of the seat cushion 3428. FIG. 105 illustrates the retainer assembly 3432 fully installed in the seat cushion 3428.

Figure 107:
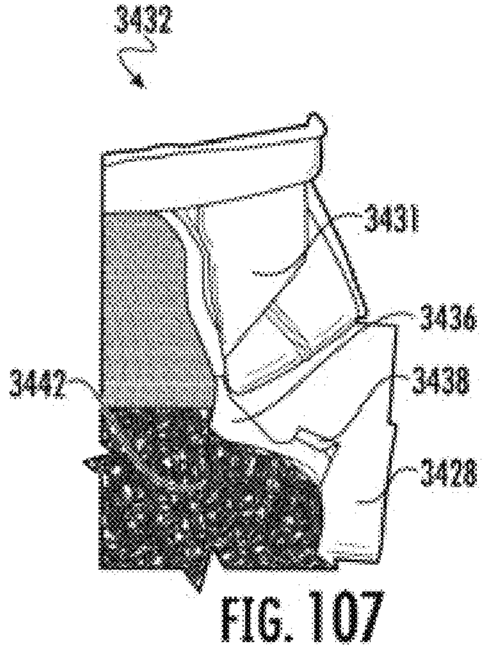
FIG. 107 is a side perspective view of the vehicle seat assembly of FIG. 102, partially assembled.
Figure 108:
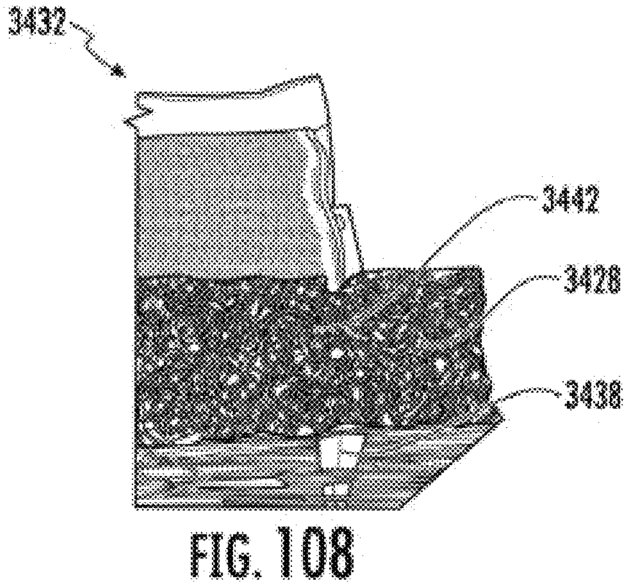
FIG. 108 is a side perspective view of the vehicle seat assembly of FIG. 102 partially assembled, illustrating the retainer of FIG. 103 inserted in the seat cushion.

FIG. 107 illustrates the trim cover 3431 attached to the base 3434 of the retainer assembly 3432. FIG. 108 illustrates the retainer assembly 3432 once it has been inserted through the slot 3442 of the seat cushion 3428. The slot 3442 extends the entire thickness of the seat cushion 3428, allowing the retainer 3438 to be exposed on one end of the seat cushion 3428. The base 3434 of the retainer assembly is exposed on one end of the seat cushion 3428 opposite to the retainer 3438.

Figure 109:
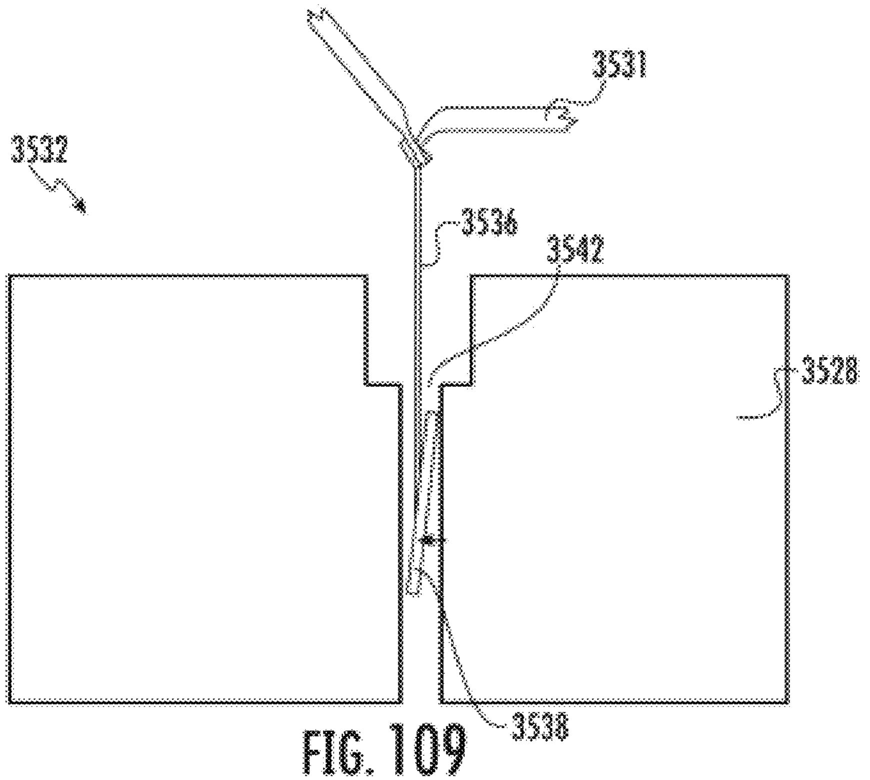
FIG. 109 is a cross section of a seat assembly according to some embodiments, with a retainer assembly partially interested in a seat cushion.
Figure 110:
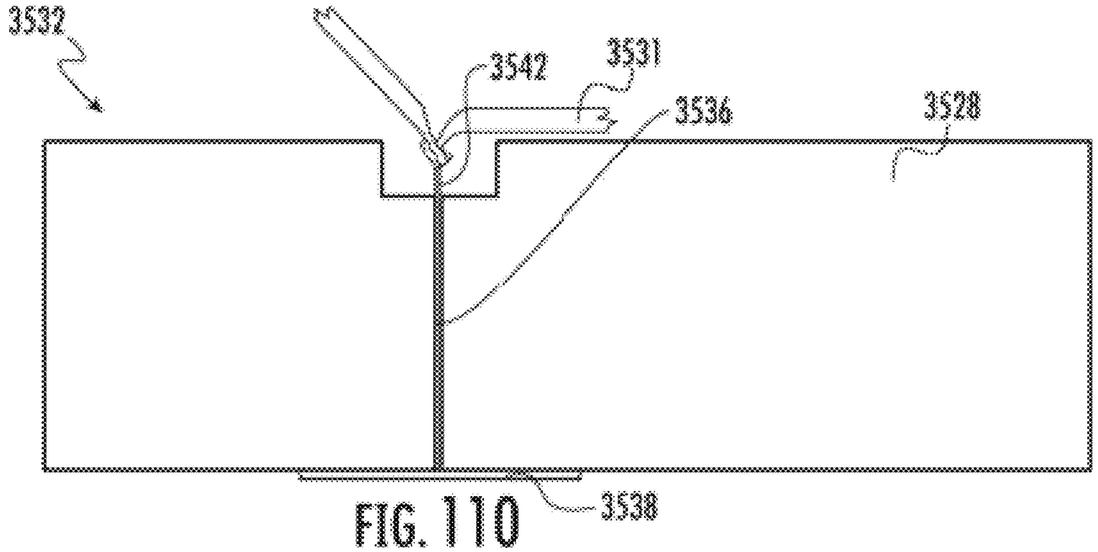
FIG. 110 is another cross-section view of the seat assembly of FIG. 109, illustrated further assembled.

FIGS. 109-110 illustrate a retainer assembly 3532 in some embodiments. The retainer assembly 3532 may be placed in the seat cushion 3528. In the illustrated embodiment, the retainer assembly 3532 may be provided with a trim cover 3531 which acts as a base whereby the trim cover 3531 may be anchored upon the cushion 3528. In some embodiments, the retainer assembly 3532 may be provided with an actuator as opposed to the trim cover 3531 which acts as a base whereby the actuator may be anchored upon the cushion 3528. In yet some embodiments, the retainer assembly 3532 may be provided with a heat transfer layer in place of the trim cover 3531 which acts as a base whereby the heat transfer layer may be anchored upon the cushion 3528. The retainer assembly 3532 may be further provided with a connector 3536 and a retainer 3538. The connector 3536 may be sewn to the trim cover 3531. The connector 3536 may be also sewn to the retainer 3538. The connector 3536 may be provided with a width smaller than the width of the trim cover 3531. The retainer 3538 includes a thickness less than the width of the retainer 3538. The connector 3536 extends through a slot 3542 in the seat cushion 3528. The connector 3536 may be composed of a textile material such as fabric, cloth, or the like.

The retainer 3538 may be provided with a width greater than the width of the connector 3536. The retainer 3538 may be pivotally attached to the connector 3536 spaced apart from the trim cover 3531 of the retainer assembly 3532. The retainer 3538 can pivot externally to the seat cushion 3528 so that the width of the retainer 3538 engages the seat cushion 3528. The retainer 3538 retains the trim cover 3531 upon the seat cushion 3528. The retainer 3538 may be composed of a polymeric material.

With reference to FIG. 109, the retainer assembly 3532 is shown partially inserted in the seat cushion 3528. The retainer 3538 of the retainer assembly 3532 collapses along the connector 3536 of the retainer assembly 3532. The retainer 3538 and the connector 3536 are then inserted into the slot 3542 formed through the seat cushion 3528. The retainer 3538 may be translated through the seat cushion 3528 with the connector 3536 still at least partially within the slot 3542 of the seat cushion 3528. The retainer 3538 may be then expanded relative to the connector 3536 into contact with a region of the seat cushion 3528 adjacent to the slot 3542 to retain the connector 3536 within the slot 3542 of the seat cushion 3528. FIG. 110 illustrates the retainer assembly 3532 fully installed in the seat cushion 3528.

FIG. 110B illustrates a method 6800 in accordance with some embodiments. Method 6800 is used to assemble a retainer assembly (e.g., retainer assembly 3432, retainer assembly 3532) to a seat cushion (e.g., seat cushion 3428, cushion 3528). In various examples, method 6800 may have greater or fewer steps than described below, and various steps may be performed in another order, sequentially, or simultaneously.

Method 6800 includes collapsing (6802) a retainer (e.g., retainer 3438, 3538) along a connector (e.g., connector 3436, 3536) of a retainer assembly (e.g., retainer assembly 3432, retainer assembly 3532). Method 6800 includes inserting (6804) the retainer (e.g., retainer 3438, 3538) and the connector (e.g., connector 3436, 3536) of the retainer assembly into a slot (e.g., slot 3442) formed through a seat cushion (e.g., seat cushion 3428, cushion 3528). Method 6800 includes translating (6806) the retainer (e.g., retainer 3438, 3538) through the seat cushion (e.g., seat cushion 3428, cushion 3528) with the connector (e.g., connector 3436, 3536) still at least partially within the slot (e.g., slot 3442). Method 6800 expands the retainer (e.g., retainer 3438, 3538) relative to the connector (e.g., connector 3436, 3536) into contact with a region of the cushion (e.g., seat cushion 3428, cushion 3528) adjacent the slot (e.g., slot 3442) to retain the connector (e.g., connector 3436, 3536) within the slot (e.g., slot 3442). The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material. The steps may be performed in another order, or may be performed sequentially or simultaneously. Additional steps may be added, or steps may be omitted. The trim cover layer and the nonfoam layer may be connected to one another to form the trim cover assembly, or the nonfoam layer may be otherwise supported by the trim cover layer. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tic downs may be positioned through the slits or trenches in the nonfoam layers. Other fasteners may be provided and attached to the trim cover assembly. Some fasteners may be provided and attached to the trim cover assembly when assembling it to the seat or cushion. The trim assembly may then be shipped or otherwise delivered to the assembly line for the seat assembly. The trim assembly and seat assembly may occur at two distinct facilities, or at the same facility on two separate lines. A seat assembly with a nonfoam cushion, e.g., a stranded mesh material cushion, the trim assembly may be connected directly to the nonfoam cushion via the use of one or more fasteners. The tic down of the trim cover assembly may connect via hog rings to strands in the nonfoam cushion or to a wire embedded in the nonfoam cushion, or via the use of hook and loop fasteners to the foam cushion. Paddles may be connected to the distal end of the tic down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tic down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tic down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. Fixtures or other tools may be provided to locate the layers of the trim assembly relative to one another, and/or to locate the trim assembly relative to the cushion and/or support member when connecting the trim assembly thereto. The fixture may locate and orient the relative components, and also locate and orient any associated fasteners used. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tic down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may have looped through the polymer fibers of the mesh pad. The spiral retainer may also engage the tic down strip by being wound through the holes and also encircles the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tic down strip. The reinforcement bead may be disposed inside the spiral retainer. The mesh pad may be flexed to open the groove to facilitate inserting the tie down strip with the reinforcement bead in the predetermined location in the bottom of the groove. The tic down strip may be connected to the seat cover that is folded over to provide access to the groove. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad.

In some embodiments, method 6800 includes connecting a base (e.g., base 3434, trim cover 3531) to the connector (e.g., connector 3436, 3536) spaced apart from the retainer (e.g., retainer 3438, 3538) to engage a region of the cushion (e.g., seat cushion 3428, cushion 3528) adjacent the slot (e.g., slot 3442) and spaced apart from the retainer (e.g., retainer 3438, 3538). A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like.

In some embodiments, method 6800 includes fastening at least one of a seat trim (e.g., trim cover 3429, 3430, 3431, 3531), an actuator, and a heat transfer layer to the base (e.g., base 3434, trim cover 3531). A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material.

A retainer assembly (e.g., retainer assembly 3432, retainer assembly 3532) is described with a base (e.g., base 3434, trim cover 3531), the base (e.g., base 3434, trim cover 3531) comprising a contact surface. A connector (e.g., connector 3436, 3536) is attached to the base (e.g., base 3434, trim cover 3531), the connector (e.g., connector 3436, 3536) comprising a width smaller than a width of the base (e.g., base 3434, trim cover 3531), the connector (e.g., connector 3436, 3536) sized to extend through a slot in a cushion (e.g., seat cushion 3428, cushion 3528). A retainer (e.g., retainer 3438, 3538) comprises a width greater than the width of the connector (e.g., connector 3436, 3536), the retainer (e.g., retainer 3438, 3538) comprising a thickness less than the retainer width, the retainer (e.g., retainer 3438, 3538) pivotally attached to the connector (e.g., connector 3436, 3536) spaced apart from the base (e.g., base 3434, trim cover 3531) and configured to be inserted into the slot in the cushion (e.g., seat cushion 3428, cushion 3528) in a thickness direction, and further configured to be pivoted externally to the cushion (e.g., seat cushion 3428, cushion 3528) so that the retainer width engages the cushion (e.g., seat cushion 3428, cushion 3528), the retainer (e.g., retainer 3438, 3538) retaining the base (e.g., base 3434, trim cover 3531) upon the cushion (e.g., seat cushion 3428, cushion 3528). A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tie down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tie down may be sewn or otherwise connected to the trim assembly or trim cover layer. The tie down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tie down may extend from the B-surface of the trim cover layer, and through the slit or trench in the nonfoam layer. The distal free end of the tie down may be positioned such that the nonfoam layer is between the distal free end of the tie down and the trim cover layer. Various fasteners or other components may be provided for direct assembly to the vehicle seat assembly in addition to the tie down or instead of the tie down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tie down strips may be selected. The tie down strips may be inserted into grooves defined in predetermined locations within the mesh pad. The tie down strip may define a plurality of equally spaced holes above a reinforcement bead that is attached to the tie down strip. A spiral retainer may be turned through the welded polymer fibers of the mesh pad and around the reinforcement bead, through the tie down strips, and in the groove, wherein the spiral retainer may be wound through the plurality of equally spaced holes and the welded polymer fibers to hold the tie down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion.

The seat cover may include tie down strips attached to the seat cover that define a plurality of holes. The spiral retainer may secure the tie down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tie down strips to the welded polymer fibers. The welded polymer fibers may hold the spiral retainer in the mesh body. A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

In some embodiments, a surface fastener (e.g., surface fastener 3440) is provided on the base contact surface. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material.

In some embodiments, the base (e.g., base 3434, trim cover 3531) provides a planar surface. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material.

In some embodiments, the connector (e.g., connector 3436, 3536) comprises a textile material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like.

In some embodiments, the base (e.g., base 3434, trim cover 3531) comprises a polymeric material. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like.

In some embodiments, the retainer comprises a polymeric material. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the connector (e.g., connector 3436, 3536) is sewn to a surface of the base (e.g., base 3434, trim cover 3531) opposite to the contact surface. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like.

In some embodiments, the connector (e.g., connector 3436, 3536) is sewn to the retainer (e.g., retainer 3438, 3538). The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like.

In some embodiments, a vehicle seat assembly (e.g., vehicle seat assembly 3420) comprises a seat bottom (e.g., seat bottom 3422) adapted to be attached to a vehicle floor. A seat back (e.g., seat back 3424) extends in an upright position. A seat cushion (e.g., seat cushion 3428, cushion 3528) is connected to the seat bottom or the seat back. The retainer assembly (e.g., retainer assembly 3432, retainer assembly 3532) is attached to a portion of the seat cushion (e.g., seat cushion 3428, cushion 3528). A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom may be provided with a seat cushion. The seat cushion may be made from a stranded thermoplastic mesh. Thermoplastic mesh cushions may provide the comfort and stability of a foam cushion, with increased porosity, while reducing weight, cost, and manufacturing tooling. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like.

In some embodiments, the seat cushion (e.g., seat cushion 3428, cushion 3528) further comprises a stranded thermoplastic mesh. The vehicle seat assembly may be provided with a trim cover over the seat bottom, seat back, and head restraint respectively, to conceal a frame, cushioning, and functional components. The seat bottom may be provided with a seat cushion. The seat cushion may be made from a stranded thermoplastic mesh. Thermoplastic mesh cushions may provide the comfort and stability of a foam cushion, with increased porosity, while reducing weight, cost, and manufacturing tooling.

In some embodiments, a slot (e.g., slot 3442) is formed through the cushion (e.g., seat cushion 3428, cushion 3528) sized to receive the retainer assembly. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer.

In some embodiments, a seat trim (e.g., trim cover 3429, 3430, 3431, 3531), an actuator, and/or a heat transfer layer is/are attached to the contact surface of the base (e.g., base 3434, trim cover 3531). A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material.

In some embodiments, the base (e.g., base 3434, trim cover 3531) further comprises a seat trim (e.g., trim cover 3429, 3430, 3431, 3531), an actuator, and/or a heat transfer layer. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like.

In some embodiments, the seat cushion (e.g., seat cushion 3428, cushion 3528) further comprises a stranded thermoplastic mesh seat cushion (e.g., seat cushion 3428, cushion 3528) connected to the seat bottom (e.g., seat bottom 3422) or the seat back (e.g., seat back 3424), wherein a slot (e.g., slot 3442) is formed through the cushion (e.g., seat cushion 3428, cushion 3528) to receive the connector (e.g., connector 3436, 3536). The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer.

In some embodiments, a surface fastener (e.g., surface fastener 3440) is provided on the base contact surface. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, at least one of a seat trim (e.g., trim cover 3429, 3430, 3431, 3531), an actuator, and a heat transfer layer is/are attached to the contact surface of the base (e.g., base 3434, trim cover 3531). A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the base (e.g., base 3434, trim cover 3531) further comprises at least one of a seat trim (e.g., trim cover 3429, 3430, 3431, 3531), an actuator, and a heat transfer layer. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

Figure 111:
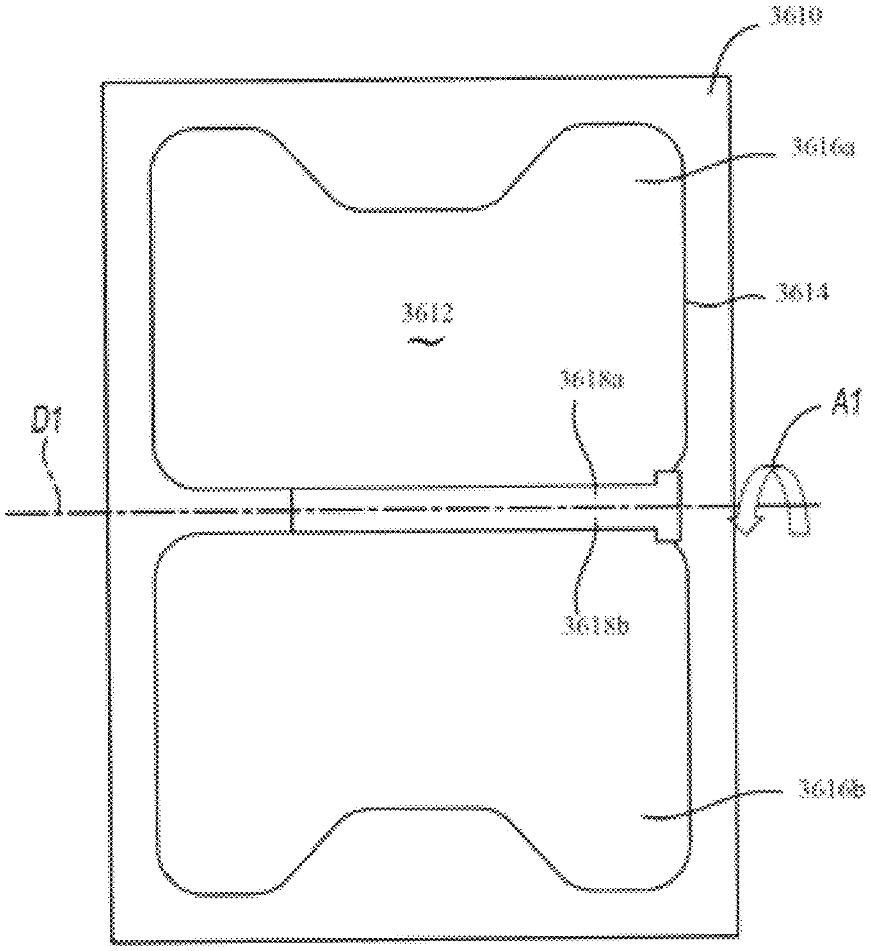
FIG. 111 is a plan view of a polymer sheet showing a layout of the blank to be cutout to form the bladder and the conduit according to one embodiment of this disclosure.

Referring to FIG. 111, a sheet 3610 of polymeric material is illustrated with a superimposed image 3612 of the blank 3614 that is cut to form a pneumatic bladder 3616 having two parts 3616*a* and 3616*b* and a conduit 3618 (shown in FIG. 113) having two parts 3618*a* and 3618*b*. The blank is cut from the sheet 3610 and is then folded over as indicated by the arcuate arrow "A1" at the dashed line "D1." If two sheets are used instead of folding the sheets, the sheets may be stacked together instead of folding them together.

Figure 112:
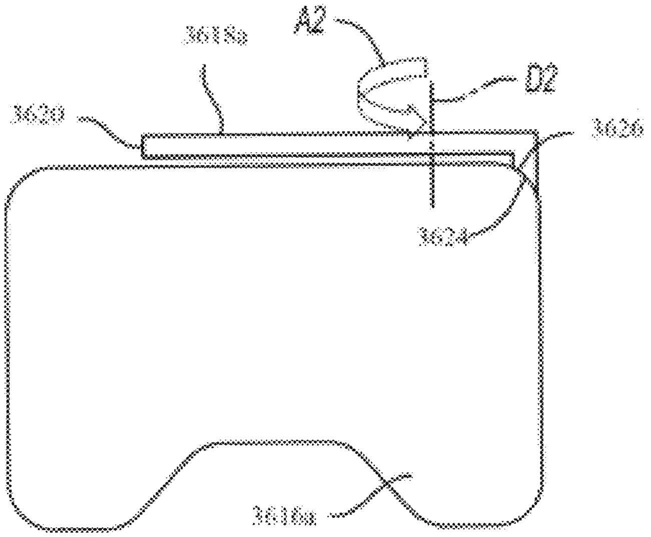
FIG. 112 is an elevation view of the bladder and the conduit in process according to the embodiment of FIG. 111.

Referring to FIG. 112, after folding over the blank the two parts of the bladder 3616 and the two parts of the conduit 3618 overlay each other. The two parts of the bladder 3616*a* and 3616*b* are welded about their periphery and the two parts of the conduit 3618*a* and 3618*b* are welded together along two sides. The distal end 3620 on the conduit 3618 is either not welded or may be welded and subsequently cut open. The term "welding" should be understood to include thermal welding, chemical welding, and adhesive welding processes. The attached end 3622 of the conduit 3618 and the opening 3624, or passageway, into the bladder 3616 are provided in an area 3626 defining the opening 3624, or passageway.

After the welding operation is performed, the conduit 3618 is folded in a reverse turn 3625 (shown in FIG. 113) at the dashed line "D2" back against itself to extend to a location spaced from the periphery of the first and second bladder portions 3616*a* and 3616*b*.

Figure 113:
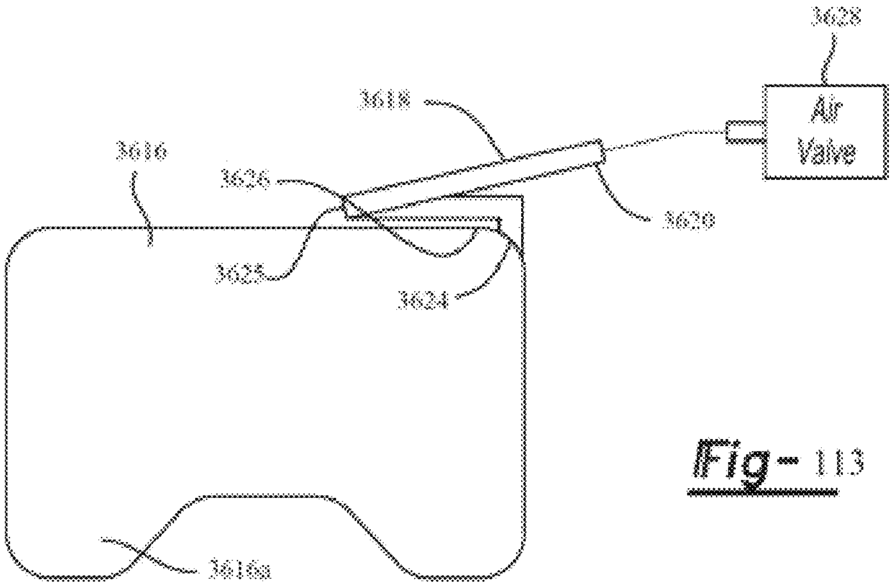
FIG. 113 is an elevation view of the completed bladder and the conduit according to the embodiment of FIG. 111.

Referring to FIG. 113, the completed bladder 3616 and conduit 3618 structure is shown. The distal end 3620 of the conduit 3618 is adapted to be connected to an air valve 3630 of the pneumatic inflation and deflation system (not shown).

Figure 114:
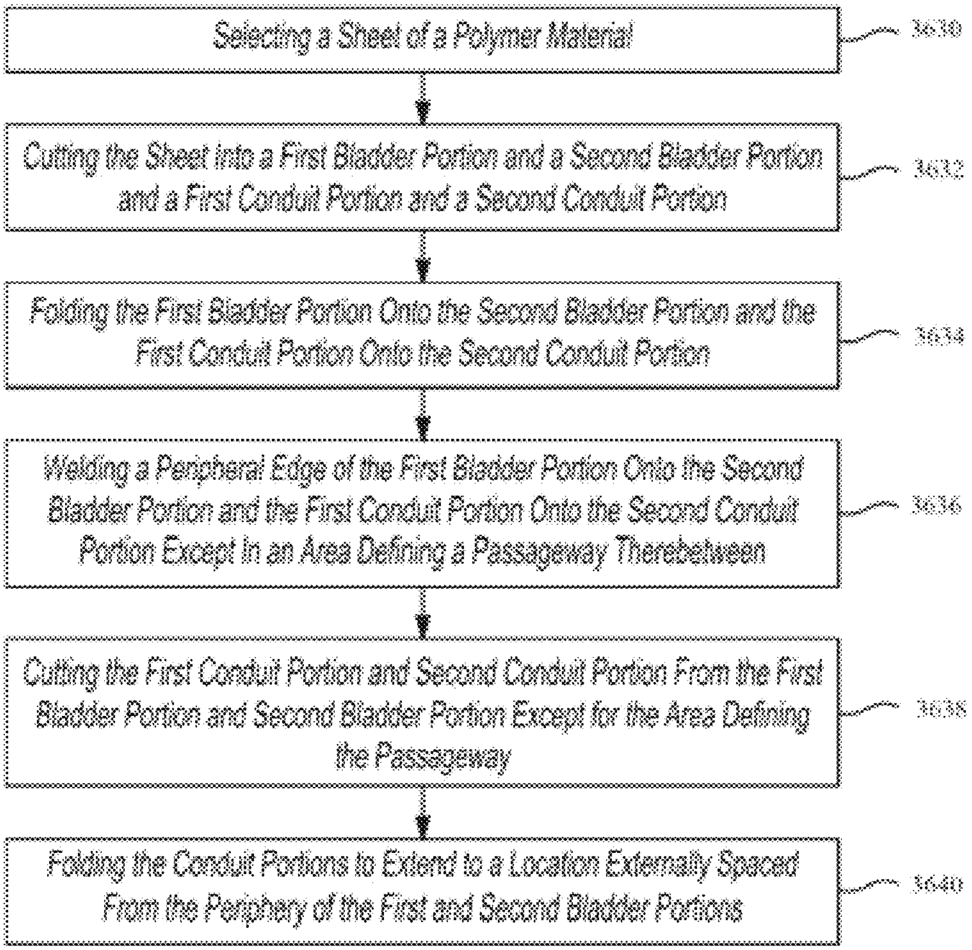
FIG. 114 is a process flowchart illustrating the steps performed to manufacture the embodiment of FIG. 111.

Referring to FIG. 114, the method of manufacturing the bladder 3616 and the conduit 3618 shown in FIGS. 111 and 113 begins by selecting a sheet 3610 of a polymer material, at 3630, and cutting the sheet 3610 into the first bladder portion 3616*a* and the second bladder portion 3616*b* and the first conduit portion 3618*a* and the second conduit portion 3618*b*, at 3632. Next, the first bladder portion 3616*a* is folded onto the second bladder portion 3616*b* and the first conduit portion 3618*a* is folded onto the second conduit portion 3618*b*, at 3634. A peripheral edge of the first bladder portion 3616*a* is welded onto the second bladder portion 3616*b* and the first conduit portion 3618*a* is welded onto the second conduit portion 3618*b*, at 3636. A port area 3626 between the first bladder portion 3616*a* and the second bladder portion 3616*b* and the first conduit portion 3618*a* and the second conduit portion 3618*b* is not welded and includes an area defining a passageway 3624 between the bladder portions 3616*a* and 3616*b* and the conduit portions 3618*a* and 3618*b*. The first conduit portion 3618*a* and the second conduit portion 3618*b* are then cut from the first bladder portion 3616*a* and second bladder portion 3616*b* except for the area defining the passageway, at 3638. The conduit portions 3618*a* and 3618*b* are folded to extend a distal end 3620 thereof to a location spaced from the periphery of the first and second bladder portions 3616*a* and 3616*b* and the conduit 3618 is adapted to be connected to an air valve, at 3640.

Figure 115:
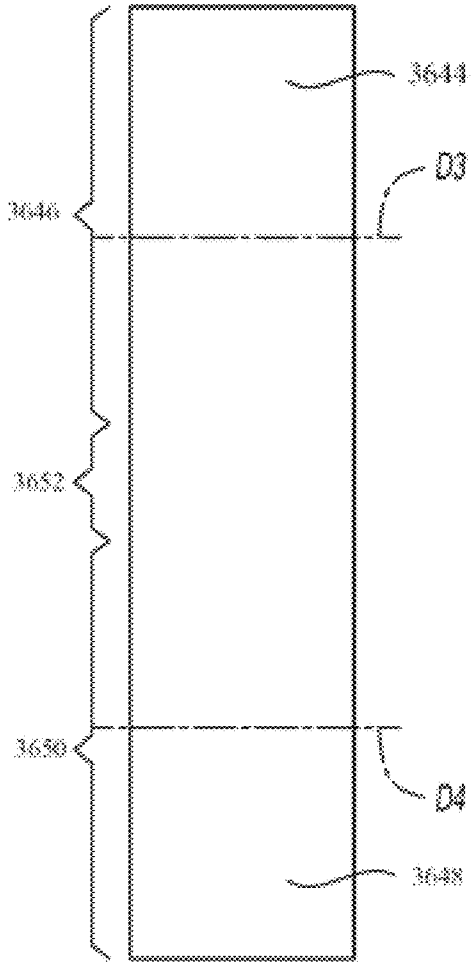

Referring to FIG. 115, a sheet of polymer material 3642 is illustrated that includes on a first end 3644 a first bladder portion 3646 and on a second end 3648 a second bladder portion 3650. The first bladder portion 3646 is folded at the dashed line "D3" and the second bladder portion 3650 is folded at the fourth dashed line "D4." A conduit portion 3652 is provided between the first bladder portion 3646 and the second bladder portion 3650.

Figure 116:
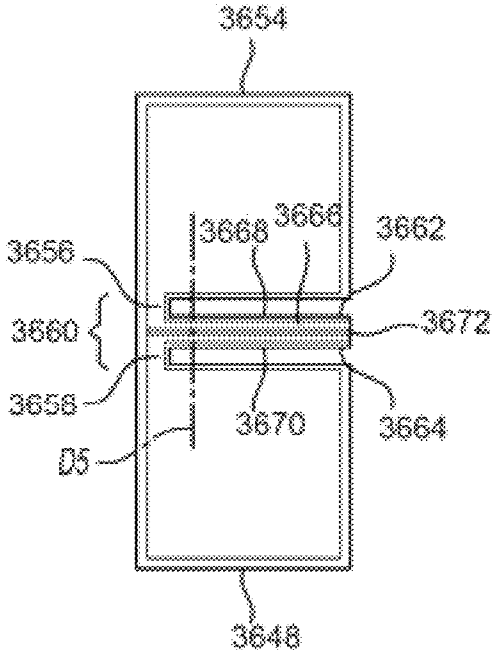

Referring to FIG. 116, a peripheral edge 3654 is welded to form the first bladder portion 3646 and the second bladder portion 3650. A first intermediate port 3656 and a second intermediate port 3658 are formed in an intermediate port area 3660 to provide a passage for air flow with the conduit portion 3652. The conduit portion 3652 is welded along a first edge 3662, a second edge 3664 and in an intermediate area 3666 to form a first passageway 3668 and a second passageway 3670. The conduit portion 3652 is folded back across the intermediate port area 3660 along dashed line "D5" to extend to a location spaced from the intermediate port area 3660.

Figure 117:
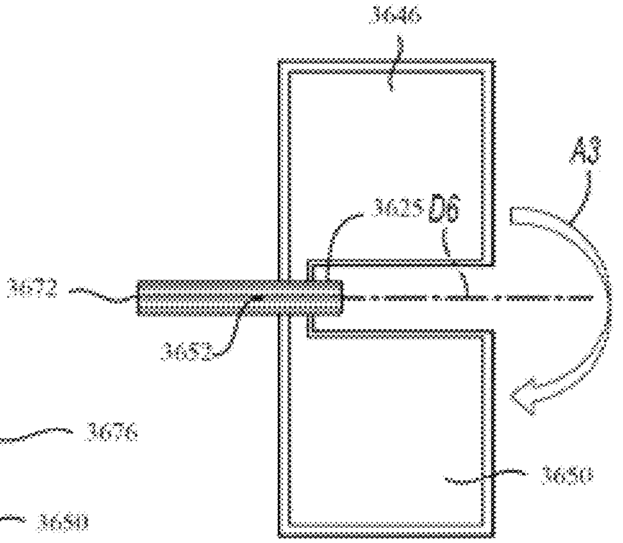

Referring to FIG. 117, the first bladder portion 3646 and the second bladder portion 3650 are folded along the line "D6" as shown by the arcuate arrow "A3" to locate the first bladder 3646 in a position adjacent the second bladder 3650. A distal end 3672 of the conduit portion 3652 is adapted to be connected to an air valve 3674 (as shown in FIG. 118).

Figure 118:
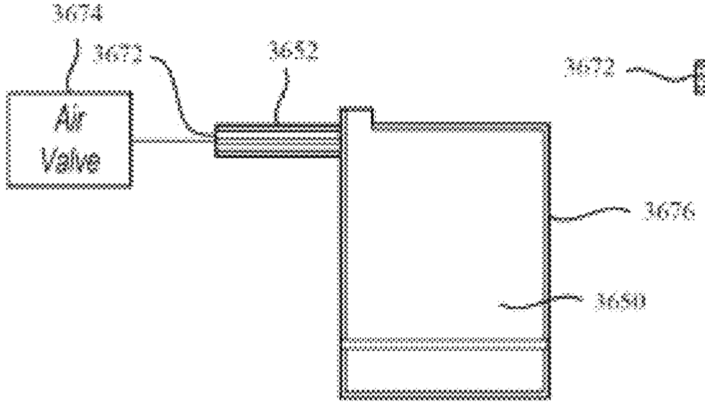

Referring to FIG. 118, a dual valve/dual passageway assembly 3676 is shown with the second bladder 3650 and the conduit portion 3652 connected to the air valve 3674.

Figure 119:
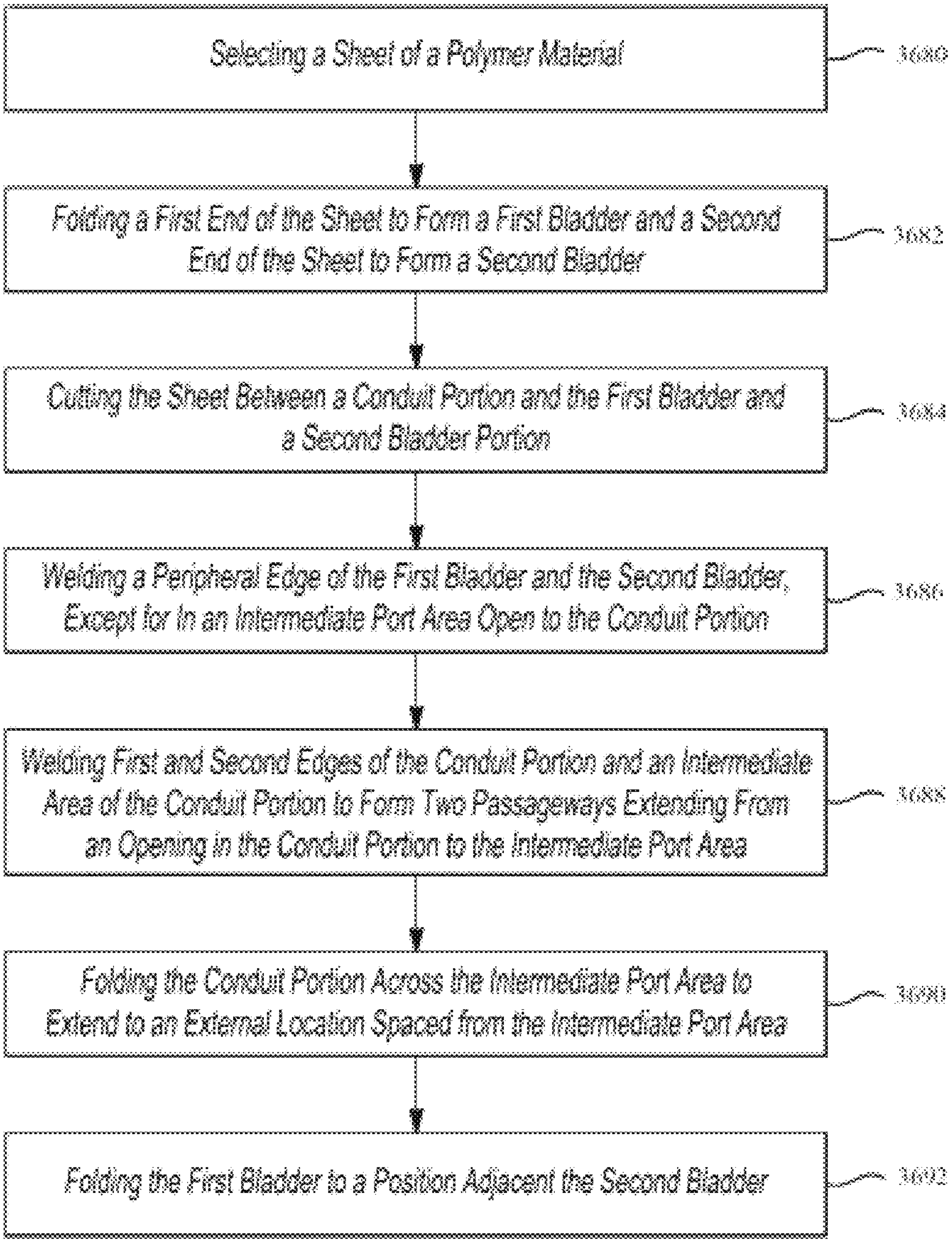

Referring to FIG. 119, the method of manufacturing the bladders 3646 and 3650 and the conduit portion 3652 shown in FIGS. 115 and 118 begins by selecting a sheet of a polymer material 3642, at 3680, and folding a first end 3644 of the sheet 3642 to form a first bladder 3646 and a second end 3648 of the sheet 3642 to form a second bladder 3650, at 3682. The sheet 3642 is cut between a conduit portion 3652 and the first bladder 3646 on one side and a second bladder portion 3650 on the other side, at 3684. Peripheral edges 3654 of the first bladder 3646 and the second bladder 3650 are welded together, except for in an intermediate port area 3660 that is open to the conduit portion 3652, at 3686. First and second edges 3662 and 3664 of the conduit portion 3652 and an intermediate area 3666 of the conduit portion 3652 are welded together to form two passageways 3668 and 3670 extending from an opening in the conduit portion on distal end 3672 to the intermediate port area 3660, at 3688. The conduit portion 3652 is then folded across the intermediate port area 3660 to extend to a location spaced from the intermediate port area 3660 and is adapted to be connected to an air valve, at 3690. The first bladder 3646 is folded to a position adjacent the second bladder 3650, at 3692.

In one or more embodiments, an apparatus comprises a pneumatic bladder 3616 formed from at least one sheet of polymer material 3610 (e.g., polyethylene, polypropylene, polyvinyl, polyvinyl chloride, polyurethane, acrylic, polycarbonate), and a conduit 3618 defining an opening 3624 into the pneumatic bladder 3616. The conduit 3618 is integrally formed from the at least one sheet of polymer material 3610 (e.g., polyethylene, polypropylene, polyvinyl, polyvinyl chloride, polyurethane, acrylic, polycarbonate). The conduit 3618 is partially separated from the pneumatic bladder 3616 and extends to a location externally spaced from a periphery of the pneumatic bladder 3616. The conduit 3618 is also adapted to be connected to a source of compressed air such as a pump (e.g., air compressor, blower, fan) to inflate and deflate the pneumatic bladder 3616.

In various embodiments, the pneumatic bladder 3616 includes two portions 3616*a*, 3616*b* of the sheet 3610 that are welded together about a periphery of the pneumatic bladder 3616 except in a port area 3626 that is open to the opening 3624 defined by the conduit 3618.

In some embodiments, the conduit 3618 includes a reverse turn 3625 between the opening 3624 in the pneumatic bladder 3616 and a distal end 3620 of the conduit 3618.

In one or more embodiments, the pneumatic bladder 3618 is adapted to be assembled to a vehicle seat to provide an adjustable lumbar support.

In various embodiments, the polymer material is polyurethane.

In some embodiments, the pneumatic bladder 3616 is adapted to be assembled to a vehicle seat to provide a massage system.

In one or more embodiments, a method comprises selecting (i.e., step 3630) a sheet of a polymer material 3610 (e.g., polyethylene, polypropylene, polyvinyl, polyvinyl chloride, polyurethane, acrylic, polycarbonate), cutting (i.e., step 3632) the sheet 3610 (e.g., polyethylene, polypropylene, polyvinyl, polyvinyl chloride, polyurethane, acrylic, polycarbonate) into a first bladder portion 3616*a* and a second bladder portion 3616*b* and a first conduit portion 3618*a* and a second conduit portion 3618*b*, folding (i.e., step 3634) the first bladder portion 3616*a* onto the second bladder portion 3616*b* and the first conduit portion 3618*a* onto the second conduit portion 3618*b*, welding (i.e., step 3636) a peripheral edge 3654 of the first bladder portion 3616*a* onto the second bladder portion 3616*b* and the first conduit portion 3618*a* onto the second conduit portion 3618*b*, wherein a port area 3626 between the first bladder portion 3616*a* and the second bladder portion 3616*b* and the first conduit portion 3618*a* and second conduit portion 3618*b* is not welded and defines an area defining a passageway 3624 therebetween, cutting (i.e., step 3638) the first conduit portion 3618*a* and the second conduit portion 3618*b* from the first bladder portion 3616*a* and second bladder portion 3616*b* except for the area defining the passageway 3624, and folding (i.e., step 3640) the conduit portions 3618*a*, 3618*b* to extend to a location spaced from the peripheral edge 3654 of the first and second bladder portions 3616*a*, 3616*b* and being adapted to be connected to an air valve 3628.

In various embodiments, the method the sheet of polymer material 3610 is a polyurethane sheet.

In some embodiments, the first conduit portion 3618*a* and the second conduit portion 3618*b* are disposed between the first bladder portion 3616*a* and the second bladder portion 3616*b* on the sheet 3610 (e.g., polyethylene, polypropylene, polyvinyl, polyvinyl chloride, polyurethane, acrylic, polycarbonate) before the step of cutting (i.e., steps 3632 and 3638) the sheet 3610 into the first bladder portion 3616*a* and the second bladder portion 3616*b* and the first conduit portion 3618*a* and the second conduit portion 3618*b*.

In one or more embodiments, step 3638, i.e., cutting the first conduit portion 3618*a* and the second conduit portion 3618*b* from the first bladder portion 3616*a* and the second bladder portion 3616*b* except for the area defining the passageway 3624 is performed after the welding step 3636.

In various embodiments, the welding step 3636 is performed after steps 3634 and 3640, i.e., folding the first bladder portion onto the second bladder portion and the first conduit portion onto the second conduit portion.

In some embodiments, folding (i.e., step 3640) the conduit portions 3618*a*, 3618*b* to extend to a location spaced from the peripheral edge 3654 of the first bladder portion 3616*a* and the second bladder portion 3616*b* is performed after step 3638, i.e., cutting the first conduit portion 3618*a* and the second conduit portion 3618*b* from the first bladder portion 3616*a* and the second bladder portion 3616*b*.

In one or more embodiments, a product is made according to the method.

In various embodiments, a method comprises selecting (i.e., step 3680) a sheet of a polymer material 3642 (e.g., polyethylene, polypropylene, polyvinyl, polyvinyl chloride, polyurethane, acrylic, polycarbonate), folding (i.e., step 3682) a first end 3644 of the sheet 3642 (e.g., polyethylene, polypropylene, polyvinyl, polyvinyl chloride, polyurethane, acrylic, polycarbonate) to form a first bladder 3646 and a second end 3648 of the sheet 3644 (e.g., polyethylene, polypropylene, polyvinyl, polyvinyl chloride, polyurethane, acrylic, polycarbonate) to form a second bladder 3650, cutting (i.e., step 3684) the sheet 3642 (e.g., polyethylene, polypropylene, polyvinyl, polyvinyl chloride, polyurethane, acrylic, polycarbonate) between a conduit portion 3652 and the first bladder 3646 and a second bladder 3650, welding (i.e., step 3686) a peripheral edge 3654 of the first bladder 3646 and the second bladder 3650, except for in an intermediate port area 3660 open to the conduit portion 3652, welding (i.e., step 3688) first and second edges of the conduit 3654 and an intermediate port area 3660 to form two passageways 3668, 3670 extending from a distal end 3672 of the conduit portion 3652 to the intermediate port area 3660, folding (i.e., step 3690) the conduit portion 3652 back across the intermediate port area 3660 to extend to a location spaced from the intermediate port area 3660, wherein the distal end 3672 is adapted to be connected to an air valve 3674, and folding (i.e., step 3692) the first bladder 3646 to a position adjacent the second bladder 3650.

In various embodiments, the sheet of polymer material 3642 is a polyurethane sheet.

In some embodiments, the conduit portion 3652 includes a first conduit portion and a second conduit portion that are disposed between the first bladder 3646 and the second bladder 3650 on the sheet 3642 before step 3684, i.e., cutting the sheet 3642 into the first bladder 3646 and the second bladder 3650 and the first conduit portion and the second conduit portion.

In one or more embodiments, step 3684, i.e., cutting the conduit portion 3652 from the first bladder 3646 and the second bladder 3650 except for the area defining the two passageways 3668, 3670 is performed after the welding step 3686/3688.

In various embodiments, the welding step 3686/3688 is performed after step 3682, i.e., folding the first bladder 3646 onto the second bladder 3650 and the conduit 3652.

In some embodiments, step 3690, i.e., folding the conduit 3652 to extend to a location spaced from the peripheral edge 3654 of the first and second bladders 3646, 3650 is performed after step 3684, i.e., cutting the conduit 3652 from the first bladder portion 3646 and second bladder portion 3650.

In one or more embodiments, a product is made according to the method.

Figure 120:
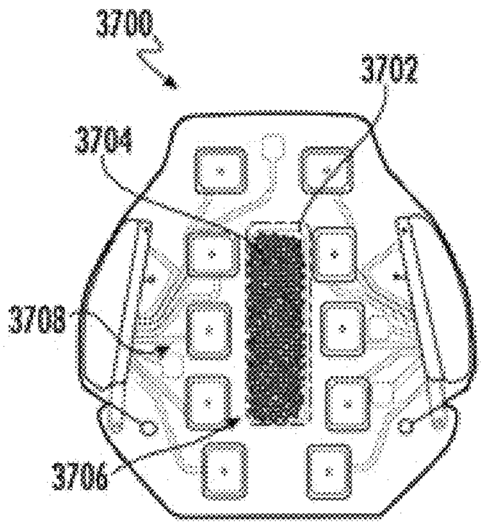

Referring to FIG. 120, a fluid system 3700 such as for providing temperature control, ventilation and/or massaging in a seat assembly. The fluid system 3700 includes one or more passageways defining a cavity 3702 and having a spacer 3704 disposed in or integrated with the cavity 3702. The passageways transport fluid from a first location to a second location during operation. In a variation, the fluid system 3700 cooperates with a flow-inducing device such as a pump and/or blower. In a refinement, the fluid system 3700 is a pneumatic system, i.e., the fluid is air. For example, the pneumatic system includes a ventilation assembly 106 and/or massage system 108. In one or more embodiments, the fluid system 3700 is disposed in a seat assembly 3800, as shown in FIG. 143. The seat assembly 3800 includes seat frame 3802, a cushion 3804 supported by the seat frame 3802, and a trim cover 3806 disposed over at least a portion of the seat frame 3802 and cushion 3804 such that it arranged to contact a seated occupant (i.e., the outer most layer). In a refinement, the fluid system 3700 is at least partially disposed in the cushion 3804 and/or disposed adjacent the cushion 3804. For example, the fluid system 3700 is disposed adjacent the cushion 3804 opposite a seated occupant. In a refinement, the seat assembly 3800 is vehicle seat assembly such as for an automobile, motorcycle, watercraft, locomotive, and/or aircraft.

In one or more embodiments, the spacer 3704 includes a compression resistant support structure 3900, as shown in FIGS. 121-142. In a variation, the compression resistant support structure 3900 includes a body 3902 such as a polymeric body. In a refinement, the body 3902 is a made of an clastic material that is impermeable to the fluid such as a thermoplastic polyurethane. The body 3902 includes a first side (shown in FIG. 121) and a second side (shown in FIG. 122) opposite the first side. In one or more embodiments, the body 3902 includes a plurality of cells 3904 and a plurality of orifices 3906. In a refinement, the plurality of orifices 3906 facilitates and/or allows a fluid such as air to travel from the first side to the second side or vice versa.

The plurality of cells 3904 is arranged such that the first side does not entirely collapse on the second side when under a load of, for example, ten kilograms or more, or more preferably fifteen kilograms or more, or even more preferably twenty-five kilograms per twenty square centimeter. A first side that collapses onto a second side such that no fluid can pass between the first and second side is understood to collapse entirely. In a refinement, the plurality of cells 3904 is arranged such that the compression resistant support structure 3900 maintains an air velocity of at least 250 mm/s, or more preferably at least 290 mm/s, or even more preferably at least 300 mm/s, or still even more preferably at least 325 mm/s according to ISO 9237 with a load of ten kilograms or more per twenty square centimeters.

In a variation, the plurality of cells 3904 is disposed between the first and second sides. In a refinement, a first group of cells 3912 from the plurality of cells 3904 cooperate with a second group of cells 3914 to form stabilizing columns 3908 between the first and second sides. For example, each cell of the first group of cells 3912 is aligned with a respective cell of the second group of cells 3914 to form bifurcated column and/or hourglass shape. In another refinement, the cells 3912 may not be aligned (i.e., may be misaligned) such that small half-sphere (e.g., hemispheres) like cells individually act as columns. In a variation, a first group of the cells may oriented in a first direction and a second group of cells may be oriented in a second direction opposite the first direction. In an embodiment, at least a portion of the plurality of orifices 3906 is defined by the plurality of cells 3904.

Figure 123:
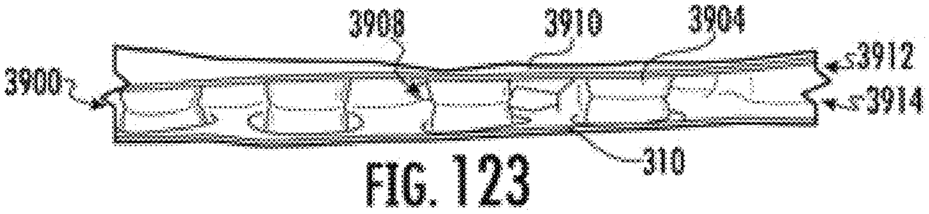

In a variation, one or more sheets/films 3910 are disposed at or along the first and/or second sides, as shown in FIG. 123. For example, a first sheet is disposed along the first side and a second sheet is disposed along the second side. In a refinement, the first group of cells 3912 is disposed at or along the first side while the second group of cells 3914 is disposed at the second side. For example, the first group of cells 3912 is attached to the first sheet and the second groups of cells 3914 is attached to the second sheet. The sheets and cells are arranged such that the plurality of cell 3904 are disposed between the first and second sheets. In a variation, the one or more sheets 3910 are generally planar. In a refinement, the one or more sheets 3910 define at least one orifice (e.g., multiple orifices). In a variation, the first and second sheets are defining the cavity (i.e., the cavity and spacer are integrated with one another).

Figure 125:
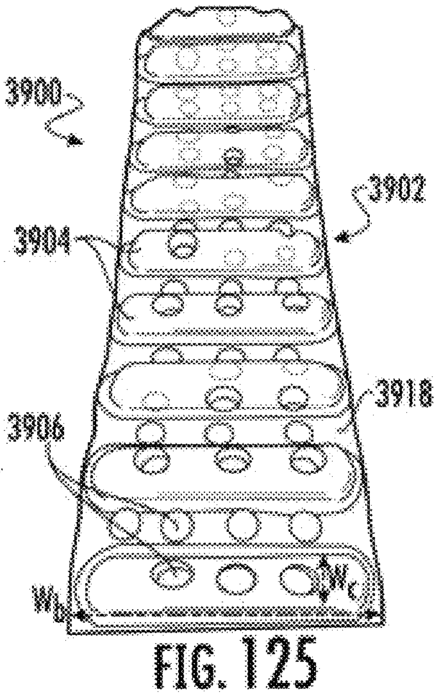

Referring to FIGS. 125 and 138, the plurality of cells 3904 are elongated along a width of the one or more sheets 3910. In a refinement, the compression resistant support structure 3900 includes a single generally planar sheet 3918 with elongated cells disposed thereon, as shown in FIG. 125. In one or more embodiments, the cells are formed from joining one or more sheets such as a first sheet and a second sheet. For example, the sheets are joined by welding such as ultrasonic welding and/or heat staking. In another refinement, each cell is isolated from the other cells such that they are not in immediate contact with one another or not directly adjacent one another (i.e., the cells are spaced apart). In one or more embodiments, the cells have a cell width Wc and the space between the cells is at least 50% of the cell width Wc, or more preferably at least 75% of the cell width Wc, or even more preferably at least 100% of the cell width Wc. In a variation, one or more orifices are disposed between each cell.

Figure 126:
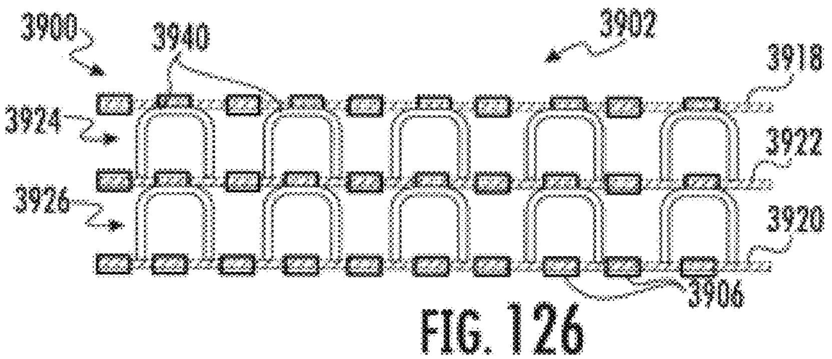
Figure 127:
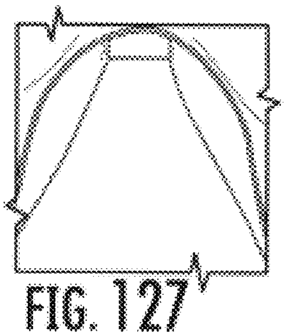

Referring to FIG. 126, the compression resistant support structure 3900 includes a plurality of generally planar sheets. For example, the compression resistant support structure 3900 includes a first sheet 3918 disposed along a first side, a second sheet 3920 disposed along a second side and an intermediate sheet 3922 disposed the first and second sheet. In a variation, the plurality of cells 3904 are disposed between the first and second sheets 3918, 3920 such that the first and second sheets are spaced apart from one another. In a refinement, a first portion 3924 of the plurality of cells 3904 is disposed between the first sheet 3918 and the intermediate sheet 3922 and a second portion 3926 of the plurality of cells 3904 is disposed between the intermediate sheet 3922 and the second sheet 3920. In one or more embodiments, the cells are arc-shaped (i.e., U-shaped) as shown in FIGS. 126-127. For example, the cells define an arc-shaped channel as shown in FIG. 127. In a refinement, all the arcs are aligned in the same direction.

Referring to FIG. 128, the compression resistant support structure 3900 includes a plurality of generally rectangular (e.g., square) cells 3904. In a refinement, the cells are arranged along an outer perimeter 3923 of the body 3902. In a variation, a central section 3925 is free of cells. In one or more embodiments, the central section 3925 includes at least one orifices (e.g., multiple orifices).

Referring to FIGS. 129-130, the cells have a polygonal shape such as hexagonal. In a refinement, the plurality of cells 3904 are disposed between the first sheet 3918 and the second sheet 3920. In some embodiments, one or more cells from the plurality of cells 3904 are filled with a filler such as air and/or foam 3916 as shown in FIGS. 124, 128, 131, 132, and 137-142. A sufficient volume of filler is used such that complete or entire collapse does not occur. Any other suitable filler may be used. For example, a filler volume is at least 60% of the cell volume, or more preferably at least 85%, or even more preferably at least 95%. In a refinement, a first set of cells 3915 from the plurality of cells 3904 is filed with a first filler such as air and a second set of cells 3917 from the plurality of cells 3904 is filed with a second filler such as foam.

In a variation, a number of cells are disposed along the width of the body Wb. For example, at least two cells are disposed along the width Wb, or more preferably at least three, or even more preferably at least five as shown in FIG.

129. Alternatively, a single elongated cells is disposed along the width Wb as shown in FIG. 130.

Referring to FIG. 133, the one or more sheets 3910 include sheets having a different characteristics such as different composition and/or thicknesses. In a refinement, a first set of sheets 3928 and a second set of sheets 3930 are used. For example, the first set of sheets 3928 includes a first sheet 3918 disposed along the first side, a second sheet 3920 disposed along the second side, and an intermediate sheet 3922 disposed between the first and second sheets 3918, 3920 The second set of sheets 3930, for example, includes a first sheet 3918' disposed along the first side, a second sheet 3920' disposed along a second side, and an intermediate sheet 3922' disposed between the first and second sheets 3918', 3920'. In a variation, each sheet of the first set of sheets 3928 is adjacent a respective sheet of the second set of sheets 3930. In a variation, the first set of sheets 3928 is an elastic polymeric material such as a thermoplastic polyurethane and the second set of sheets 3930 is a moldable nonwoven material such as polyester fiber. In a refinement, the moldable nonwoven material may be 100% polyester fiber.

Referring to FIGS. 134-136, the plurality of cells 3904 have shared sidewalls 3931 such that they form a honeycomb pattern. Each cell in honeycomb pattern forms a polygonal shape such as a triangular, rectangular (e.g., square), diamond shaped, pentagonal, hexagonal, or octagonal. In a refinement, the cells of the honeycomb pattern are open, i.e., the faces are not closed such that the fluid can easily pass from the first side to the second side or vice versa. In a variation, the shared sidewalls 3931 define one or more orifices (e.g., multiple orifices) therein. In a refinement, the honeycomb pattern is formed by overlapping folded sheets as shown in FIG. 136. A single folded sheet is shown in FIG. 135.

Referring to FIGS. 137 and 139, the plurality of cells 3904 form a grid pattern. In one or more embodiments, each cell is generally the same size (i.e., within manufacturing tolerances) as any other cell in the plurality of cells 3904. In a refinement, the grid pattern is made of generally rectangular cells. In yet another refinement, the grid pattern has alternating cells defining an orifice and cells not having an orifice as shown in FIG. 139.

Referring to FIGS. 140-142, the compression resistant support structures include one or more bridging members 3932 such as straps and/or bars. For example, a bridging member 3932 extends from a first edge 3934 of the body 3902 to a second edge 3936 of the body 3902. The bridging member 3932 is of a length such that the body 3902 does not rest in a planar state. For example, the bridging member 3932 has a length that is less than the width of the body/sheet(s). In a variation, the bridging members 3932 cause the generally planar sheets 3910 to rest in a non-planar position such as a curved position.

Figure 124:
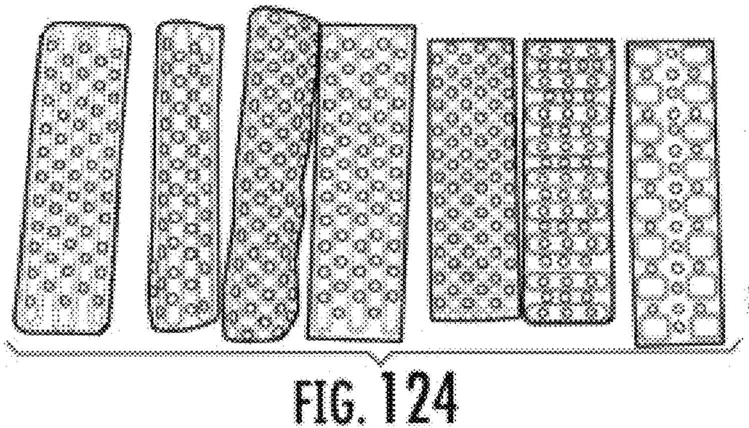

In a variation, the spacer 3704 is not entirely fabric and/or foam, as shown in FIG. 124 depicting various embodiments of compression resistant support structures that are not completely fabric or foam.

The compression resistant support structures as described herein permit a greater airflow when under pressure or a load. For example, representative compression resistant support structures as described here were tested relative to a conventional spacer material according to ISO 9237.

TABLE 2

| | Conventional Spacer | Spacer described herein | |
|---|---|---|---|
| Air flow in comfort module design carrier (no load) | 411 mm/s | 389 mm/s | 5% less |
| Air flow in comfort module design carrier (Load 10 kg) | 298 mm/s | 328 mm/s | 9% better |

As shown in Table 2. The air velocity of the spacers described herein have a greater air velocity than the conventional spacers when under pressure or a load. This indicates superior performance of the fluid systems under normal operating conditions (i.e., the pressure/load of a seated occupant). For example, the representative spacer of the instant disclosure had an air velocity of 328 mm/s under a ten kilograms load or more per twenty square centimeters while the air velocity of a conventional textile spacer was 298 mm/s. Although, the spacers described herein may have an inferior performance under no load this acceptable because the fluid system described herein have little or no benefit when being operated without a load (i.e., when an occupant is not seated on them). The spacers described herein also have better or similar deflections as a conventional spacer. For example, the spacers described herein have a deflection of at least 60% under a load of 525 N according to ISO 3386-1 with a sample size of 160 mm×160 mm and a speed of 100 mm/min.

In one or more embodiments, a compression-resistant support structure 3900 comprises a body 3902 (e.g., polymeric body, elastic material, and/or is impermeable to the fluid such as a thermoplastic polyurethane and/or moldable nonwoven material such as polyester fiber) having a first side (see FIG. 121) and a second side (see FIG. 122) opposite the first side (see FIG. 121), the body 3902 (e.g., polymeric body, elastic material, and/or is impermeable to the fluid such as a thermoplastic polyurethane and/or moldable nonwoven material such as polyester fiber) defining a plurality of orifices 3906 such that a fluid (e.g., air) can travel from the second side (see FIG. 122) to the first side (see FIG. 121) and having a plurality of cells 3904 disposed between the first side (see FIG. 121) and the second side (see FIG. 122), the cells 3904 being configured to maintain the first side (see FIG. 121) from collapsing entirely onto the second side (see FIG. 122) under a load of ten kilograms or more per twenty centimeters squared.

Figure 121:
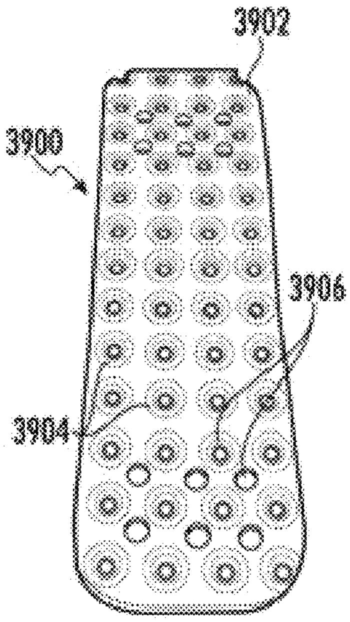
Figure 122:
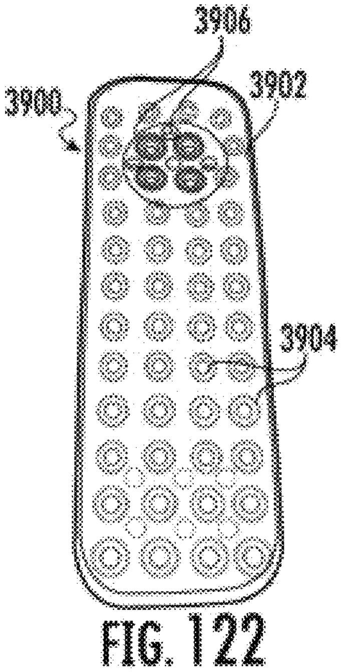

In various embodiments, the plurality of cells 3904 includes a first group of cells 3912 attached to the first side (see FIG. 121) and a second group of cells 3914 attached to the second side (see FIG. 122) and aligned with the first group of cells 3912 such that each cell of the first group of cells 3912 cooperates with a respective cell of the second group of cells 3914 to form a stabilizing column between the first and second sides (see FIGS. 121-122).

In some embodiments, one or more of the plurality of cells 3904 includes a foam 3916 disposed therein.

In one or more embodiments, the body 3902 (e.g., polymeric body, elastic material, and/or is impermeable to the fluid such as a thermoplastic polyurethane and/or moldable nonwoven material such as polyester fiber) includes a first planar sheet 3918 (e.g., polymeric, elastic, and/or is impermeable to the fluid such as a thermoplastic polyurethane) along the first side, a second planar sheet 3920 (e.g., polymeric, elastic, and/or is impermeable to the fluid such as a moldable nonwoven material such as polyester fiber) along the second side and an intermediate sheet 3922 (e.g., polymeric, clastic, and/or is impermeable to the fluid such as a thermoplastic polyurethane and/or moldable nonwoven material such as polyester fiber) disposed between the first and second sheets 3918, 3920 (e.g., polymeric, elastic, and/or is impermeable to the fluid such as a thermoplastic polyurethane and/or moldable nonwoven material such as polyester fiber) with a plurality of cells 3904 being disposed between the first sheet 3918 (e.g., polymeric, elastic, and/or is impermeable to the fluid such as a thermoplastic polyurethane) and the intermediate sheet 3922 (e.g., polymeric, clastic, and/or is impermeable to the fluid such as a thermoplastic polyurethane and/or moldable nonwoven material such as polyester fiber) and between the intermediate sheet 3922 (e.g., polymeric, elastic, and/or is impermeable to the fluid such as a thermoplastic polyurethane and/or moldable nonwoven material such as polyester fiber) and the second sheet 3920 (e.g., polymeric, elastic, and/or is impermeable to the fluid such as a moldable nonwoven material such as polyester fiber), and the first, intermediate, and second sheets 3918, 3920, 3922 (e.g., polymeric, elastic, and/or is impermeable to the fluid such as a thermoplastic polyurethane and/or moldable nonwoven material such as polyester fiber) each define a number of the plurality of orifices 3904.

In various embodiments, the plurality of cells 3904 includes arc shaped channels (see FIGS. 126-127).

In some embodiments, the support structure 3900 further comprises moldable nonwoven sheets disposed adjacent the first sheet 3918 (e.g., polymeric, elastic, and/or is impermeable to the fluid such as a thermoplastic polyurethane and/or moldable nonwoven material such as polyester fiber), the intermediate sheet 3922 (e.g., polymeric, elastic, and/or is impermeable to the fluid such as a thermoplastic polyurethane and/or moldable nonwoven material such as polyester fiber), and/or the second sheet 3920 (e.g., polymeric, elastic, and/or is impermeable to the fluid such as a thermoplastic polyurethane and/or moldable nonwoven material such as polyester fiber).

In one or more embodiments, the plurality of cells 3904 forms an open polygonal cell pattern.

In various embodiments, open polygonal cell pattern is a honeycomb pattern.

In some embodiments, the support structure 3900 further comprises a bridging member 3932 (e.g., bridging strap or bar) such that the body 3902 is held in a non-planar position.

In one or more embodiments, a seat assembly 3800 comprises a cushion 3804 and a fluid system 3700 (e.g., pneumatic ventilation assembly) at least partially disposed in the cushion 3804, the fluid system 3700 (e.g., pneumatic ventilation assembly) configured to transport a fluid (e.g., air) through a passageway from a first location to a second location during operation, the fluid system 3700 (e.g., pneumatic ventilation assembly) including a compression resistant support structure 3900 disposed in the passageway such that passageway does not collapse when under a load of ten kilograms or more per 20 centimeters squared, the compression resistant support structure 3900 includes a plurality of planar sheets made of an impermeable polymeric film (e.g., polymeric, elastic, and/or is impermeable to the fluid such as a thermoplastic polyurethane and/or moldable nonwoven material such as polyester fiber), the compression resistant support structure 3900 defining a plurality of orifices 3906 to facilitate travel of the fluid (e.g., air).

In various embodiments, the fluid system 3700 is a pneumatic ventilation assembly.

In some embodiments, the compression resistant support structure 3900 includes a plurality of cells 3904 including a first group of cells 3912 disposed at a first side and a second group of cells 3914 disposed at a second side and aligned with the first group of cells 3912 such that each cell of the first group of cells 3912 cooperates with a respective cell of the second group of cells 3914 to form a stabilizing column between the first and second sides.

In one or more embodiments, the compression resistant support structure 3900 has a plurality of cells 304 and one or more of the plurality of cells includes a foam 3916 disposed therein.

In various embodiments, the compression resistant support structure 3900 has a plurality of cells 3904 and includes a first planar sheet 3918 (e.g., polymeric, elastic, and/or is impermeable to the fluid such as a thermoplastic polyurethane and/or moldable nonwoven material such as polyester fiber) along a first side, a second planar sheet 3920 (e.g., polymeric, elastic, and/or is impermeable to the fluid such as a thermoplastic polyurethane and/or moldable nonwoven material such as polyester fiber) along a second side and an intermediate sheet 3922 (e.g., polymeric, elastic, and/or is impermeable to the fluid such as a thermoplastic polyurethane and/or moldable nonwoven material such as polyester fiber) disposed between the first and second sheets 3918, 3920 (e.g., polymeric, elastic, and/or is impermeable to the fluid such as a thermoplastic polyurethane and/or moldable nonwoven material such as polyester fiber) with the plurality of cells 3904 being disposed between the sheets 3918, 3920 (e.g., polymeric, elastic, and/or is impermeable to the fluid such as a thermoplastic polyurethane and/or moldable nonwoven material such as polyester fiber), and each sheet defines one or more orifices of the plurality of orifices 3906.

In some embodiments, the plurality of cells 3904 includes arc shaped channels.

In one or more embodiments, the structure 3900 further comprises moldable nonwoven sheets disposed adjacent the first sheet 3918 (e.g., polymeric, clastic, and/or is impermeable to the fluid such as a thermoplastic polyurethane and/or moldable nonwoven material such as polyester fiber), the intermediate sheet 3922 (e.g., polymeric, clastic, and/or is impermeable to the fluid such as a thermoplastic polyurethane and/or moldable nonwoven material such as polyester fiber), and/or the second sheet 3920 (e.g., polymeric, elastic, and/or is impermeable to the fluid such as a thermoplastic polyurethane and/or moldable nonwoven material such as polyester fiber).

In various embodiments, the compression resistant support structure 3900 includes a bridging strap and/or bar 3932 such that the compression resistant support structure 3900 is held in non-planar position.

In one or more embodiments, a seat assembly 3800 comprises a cushion 3804, a ventilation system 3700 defining a cavity 3702 disposed in the cushion 3804, and a honeycomb compression resistant support structure 3900 disposed in the cavity 3702 and defining a plurality of cells 3904, the support structure 3900 providing an air velocity of at least 290 mm/s under a 10 kg load according to ISO 9237.

In various embodiments, the support structure 3900 provides an air velocity of at least 300 mm/s under a 10 kg load on 20 centimeters squared according to ISO 9237.

In some embodiments, the cells 3904 have a rectangular or diamond shape.

Referring to FIG. 144, a seat assembly 4000 is disclosed. In an embodiment, the seat assembly 4000 includes a seat frame 4100, one or more seat cushions 4200, and a trim cover 4300. In a refinement, the seat assembly 4000 includes further components such as but not limited to a massaging assembly, a ventilation assembly, a temperature control assembly, and/or a sensor assembly. In a refinement, the seat assembly 4000 is a seat for a vehicle such as an automobile, motorcycle, aircraft, watercraft, and/or locomotive.

In one or more embodiments, the seat frame 4100 is made of rigid material such as metal, plastic, wood or a combination thereof. In a refinement, the seat frame 4100 supports the foamless cushion 4200, other seat assemblies (e.g., massage assembly, ventilation assembly, electronic assembly, etc.), and/or an occupant. For example, a steel and/or aluminum seat frame 4100 is used. In a variation, the trim cover 4300 is disposed over the one or more cushions 4200 and/or the seat frame 4100. The trim cover 4300 is arranged to contact an occupant. For example, the trim cover 4300 is made of leather, faux leather, polyurethane, and/or polyester.

In some embodiments, the one or more cushions 4200 include a seat bottom and/or seat back. Unlike conventional seat cushions which are generally molded foams, a seat cushion of the seat assembly 4000 is a non-foam, a foam free, a foamless, and/or a non-woven mesh cushion 4200 of intertwined and/or entangled polymeric strands 4202 (i.e., an entangled mass), as shown in FIG. 145-4. Portions of the various polymeric strands are entangled with portions of other polymeric strands such that the plurality of polymeric strands serves as a single unit, piece, cushion, pillow, pad, or mat. Hereinafter, this disclosure will refer to the entangled mass as a non-foam cushion or foamless cushion 4200.

The polymeric strands are any suitable polymeric material such as a thermoplastic polymer (e.g., polyolefins, polyethylene, polypropylene, polystyrene, polycarbonate, and/or polyvinyl chloride). For example, the application identified by Ser. No. 17/741,639 filed on May 11, 2022, describes foamless cushions and is attached herewith and hereby incorporated by reference in its entirety.

In a variation, the foamless cushion and/or entangled mass 4200 defines at least one cavity 4204, as shown in FIG. 147, such that a subassembly or plurality of subassemblies (e.g., fluid assemblies, pneumatic assemblies, massage assemblies, temperature control assemblies, ventilation assemblies, etc.) are at least partially disposed within the cavity 4204.

In one or more embodiments, at least a portion of a fluid assembly (e.g., pneumatic assembly) is disposed in the cavity 4204. For example, a bladder 4206 of a massage and/or ventilation assembly is disposed in the cavity 4204. In a refinement, the bladder 4206 is formed by joining a plurality of sheets together. For example, the bladder 4206 is formed by welding, ultrasonic welding or heat staking a first sheet 4208 to a second sheet 4210 along an outer perimeter of the sheets 4208, 4210.

In a variation, the entangled mass 4200 includes a plurality of cavities such that a plurality of bladder is disposed in the entangled mass 4200. In other words, each cavity houses a bladder of the fluid system. The plurality of bladders is part of a massage assembly.

Referring to FIG. 148, a dispensing system 4400 to make a non-foam/foamless cushion 4200 having a cavity 4204 such as for a bladder is disclosed. In one or more embodiments, the dispensing system 4400 includes a die/breaker plate 4500 to dispense a flowable polymeric material 4402 as a plurality of polymeric strands. In a refinement, the dispensing system 4400 includes an extruder 4404. For example, the extruder 4404 includes a chamber/barrel 4406 with an agitator for shearing such as a screw 4408 disposed therein. In a variation, the system 4400 includes a motor 4410 and a transmission 4412 for driving the screw 4408. In a refinement, the system 4400 includes an inlet such as a hopper 4414 for receiving a polymeric material into the barrel 4406. In one or more embodiments, the hopper 4414 receives the polymeric material as solid pellets 4416. In addition to the shearing screw 4408, the barrel 4406 is heated such that the solid pelletized polymeric material becomes a flowable molten material during operation (e.g., melts). In one or more embodiments, the extruder 4404 is driven by a motor 4418 and a transmission 4420. In a refinement, the die 4500 is disposed and/or arranged at a terminal end of the extruder 4404 such that it can easily be removed and replaced by another die/breaker plate 4500. Thus, different cushions can be made merely by changing the die or breaker plate 4500. Said differently, the die/breaker plate 4500 is interchangeable. For example, a first die is used to produce a cushion for a seat back defining a seat back cavity to receive a portion of a massaging assembly and ventilation assembly (i.e., one or more bladders) and a second die is used to produce a seat bottom defining a seat bottom cavity to receive a portion of ventilation assembly.

Referring to FIG. 149, the die/breaker plate 4500 includes a body 4502 defining a plurality of orifices 4504 to dispense the flowable polymeric material including a polymeric resin. In one or more embodiment, the plurality of orifices 4504 includes at least 100 orifices, or more preferably at least 500 orifices, or even more preferably at least 1000 orifices. The dispensing system 4400 applies pressure such that the flowable polymeric resin 4402 is dispensed through the orifices 4504 of the die 4500. In a variation, the die/breaker plate 4500 also include a solid section 4506. In a refinement, the solid section 4506 has no orifices or a very limited number of orifices such as less than 50, or more preferably less than 25, or even more preferably less than 10, or still more preferably less than 5. If the solid section 4506 has orifices the strands dispensed therefrom is easily removed and not be a part of the final cushion. For example, they are positioned such that they do not become entangled with the strands dispensed from the plurality of orifices 4504 and/or are easily severed for removal.

The solid section 4506 is surrounded by the plurality of orifices 4504 (i.e., the plurality of orifices 4504 is disposed around solid section 4506) such that it forms an entangled mass defining the one or more cavities. In a refinement, the one or more cavities are shaped to receive one or more subassemblies. In other words, the solid section 4506 results in a cavity in the non-foam/foamless cushion. Accordingly, the die/breaker plate 4500 has a number of solid sections corresponding to the number of cavities in the final cushion. For example, the die/breaker plate 4500 has one, two, three, four, five, six, seven, eight, nine or more solid sections (e.g., a plurality of solid sections).

In a variation, the solid section 4506 is more than just the limited area between orifices but instead a purposefully unbroken or holeless area to create a cavity in the cushion. In a refinement, the solid section 4506 has a surface area that is at least 10 times greater than a cross-sectional area of an orifice, or more preferably at least 50 times greater or even more preferably at least 100 times greater. In another example, the solid section 4506 is at least 1 to 20 square inches, or more preferably 2 to 12 square inches, or even more preferably 3 to 7 square inches.

In a refinement, a partition 4508 may be disposed adjacent the solid section 4506, as shown in FIG. 150. For example, the partition 4508 may ensure that the polymeric strands dispensed from the plurality or orifices form a gap or cavity for a portion of the fluid system such as a bladder. In one or more embodiments, the partition may have a column like structure having a profile that is the same as the solid section 4506. In a refinement, the partition 4508 may be an integrally joined with the solid section 4506. In other words, the solid section may extend from the body 4502 and beyond a terminal end of the orifices. Alternatively, the partition 4508 may close or impede one or more orifices of the plurality of orifices such that a gap or cavity is formed in the entangled mass and cushion.

Referring to FIG. 150, the flowable molten polymeric resin 4402 is dispensed from the die/breaker plate 4500 as strands 4602. In a refinement, a face of the die is generally perpendicular to the direction of gravity and the orifices each define an axis that is generally parallel with the direction of gravity. Thus, the strands are dispensed in aliment with the pull of gravity. The strands flow linearly into and through a first medium 4604 such as air and then into a second medium 4606 such as water. In a refinement, the first and second mediums 4604, 4606 have different densities such that deflection occurs at or proximate the medium interface 4608 (i.e., the linear strands change direction). For example, the second medium 4606 has a greater density than the first medium 4604. In a variation, the second medium 4606 is chilled to below the melting point and/or glass transition temperature of the polymeric resin. In a refinement, the second medium 4606 has a greater heat capacity than the first medium 4604. The deflection or changes in direction lead to entanglement and/or the intertwining of the polymeric strands and when accompanied by the cooling effect of the second medium 4606 the polymeric strands solidify such that the entangled/intertwining mass is a single piece, component, unit and/or generally holds its shape to, for example, to form a cushion. In a one or more embodiments, the entangled/intertwined mass of polymeric strands exhibits elastic properties similar to a foam and/or fabric. In a refinement, the entangled/intertwined mass is cleaned and/or dried after being removed from the second medium 4606. Once hardened the strands are generally fixed in position relative to one another such that they may become more proximal or distal depending on the pressure exerted upon them but generally don't change positions relative to one another.

A method 4700 of making a seat cushion is also disclosed, as shown in FIG. 151. In one or more embodiments, the method 4700 includes dispensing a plurality of polymeric strands from a die/breaker plate (i.e., step 4702), as described herein, into and through an interface between two mediums (i.e., a first medium and a second medium) to form a cushion, removing the cushion from the second medium (i.e., step 4704), and drying the cushion (i.e., step 4708). In a variation, the entangled mass (i.e., cushion) is removed from the second medium, cleaned, and dried (i.e., 4708). After one or more cushions are made with the die/breaker plate 4500, it is removed and replaced with another die/breaker plate 4500 (i.e., step 4710) to form different cushions and the above procedure is repeated such that the polymeric material is dispensed (e.g., extruded) through the second die/breaker plate into the interface between the two mediums (i.e., step 4712). For example, steps 4704-4708 are repeated after dispensing the strands through the second die/breaker plate to form different cushions (i.e., step 4714). Portions of a fluid system such as fluid bladders may then be disposed in the various cavities of the cushions and the cushions may be assembled or position in seat assemblies.

In one or more embodiments, a seat assembly 4000 comprises a plurality of intertwined polymeric strands 4202 forming an entangled mass 4200, the entangled mass 4200 defining one or more cavities 4204, and a fluid (e.g., pneumatic massage and/or ventilation system) system including one or more bladders 4206 wherein a portion of the fluid system (e.g., pneumatic massage and/or ventilation system) is disposed in the one or more cavities 4204.

In various embodiments, the fluid system is a pneumatic system massage and/or ventilation system.

In some embodiments, the one or more bladder 4206 is disposed in the one or more cavities 4204.

In one or more embodiments, the one or more cavities 4204 includes a plurality of cavities, and the one or more bladders 4206 includes a plurality of bladders.

In various embodiments, each bladder 4206 includes a first sheet 4208 joined to a second sheet 4210.

In one or more embodiments, a die 4500 (e.g., die plate/breaker plate) comprises a body 4502 defining a plurality of orifices 4504 disposed around a first solid section 4506, the first solid section 4506 having a surface area that is at least ten times a cross-sectional area of an orifice of the plurality of orifices 4504 such that when a flowable (e.g., polymeric) resin 4402 such as a thermoplastic is disposed through the plurality of orifices 4504 and hardened to form an entangled mass 4200 of polymeric strands 4202 defining a cavity 4204.

In various embodiments, the surface area is at least fifty times greater than the cross-sectional area of the orifice.

In some embodiments, the surface area is at least 100 times greater than the cross-sectional area of the orifice.

In one or more embodiments, the first solid section 4506 has a surface area of one to twenty square inches.

In various embodiments, the first solid section 4506 has a surface area of two to twelve square inches.

In some embodiments, the first solid section 4506 has a surface area of three to seven square inches.

In various embodiments, the body 4502 includes a second solid section 4506.

In one or more embodiments, a method 4700 of producing a seat cushion 4200 comprises dispensing (i.e., step 4702) a polymeric resin 4402 through a first breaker plate 4500 defining a plurality of orifices 4504 positioned around a first solid section 4506 such that the polymeric resin 4402 is dispensed from the plurality of orifices 4504 into an interface 4608 (air-water interface) between two mediums 4604, 4606 (e.g., air and water) forming a first entangled mass 4200 defining one or more cavities 4204, removing (i.e., step 4706) the entangled mass 4200 from a medium 4606 (e.g., water), and drying (i.e., step 4708) the entangled mass 4200.

In various embodiments, the first solid section 4506 is ten times a cross-sectional area of an orifice of the plurality of orifices 4504.

In some embodiments, the first solid section 4506 has a surface area of one to twenty square inches.

In one or more embodiments, the one or more cavities 4204 is a plurality of cavities.

In various embodiments, the method 4700 further comprises replacing (i.e., step 4710) the first breaker plate 4500 with a second breaker plate defining a plurality of orifices 4504 and dispensing (i.e., step 4712) the polymeric resin 4402 from the plurality of orifices 4504 into the interface 4608 to form a second entangled mass.

In some embodiments, the method 4700 further comprises disposing one or more bladder 4206 within the one or more cavities 4204.

In one or more embodiments, the method 4700 further comprises arranging the first entangled mass 4200 in a seat assembly 4000 as a cushion 4200.

In various embodiments, the one or more bladders 4206 are a portion of a massaging or ventilating system.

Referring to FIG. 152, a seat assembly 4800 is disclosed. In an embodiment, the seat assembly 4800 includes a seat frame 4810, one or more seat cushions 4820, and a trim cover 4830. In a refinement, the seat assembly 4800 may include further components such as but not limited to a massaging assembly, a ventilation assembly, a heating assembly, and/or a sensor assembly. In a refinement, the seat assembly 4800 is a seat for a vehicle such as an automobile, motorcycle, aircraft, watercraft, and/or train.

In one or more embodiments, the seat frame 4810 is made of rigid material such as metal, plastic, wood or a combination thereof. In a refinement, the seat frame 4810 supports the foamless cushion 4820, other seat assemblies (e.g., massage assembly, ventilation assembly, electronic assembly, etc.), and/or an occupant. For example, an aluminum seat frame 4810 may be used. In a variation, the trim cover 4830 is disposed over the one or more cushions 4820 and/or the seat frame 4810. The trim cover 4830 is arranged to contact an occupant. For example, the trim cover 5100 may be made of leather, faux leather, polyurethane, and/or polyester.

In some embodiments, the one or more cushions 4820 include a seat bottom and/or seat back. Unlike conventional seat cushions which are generally molded foams, a seat cushion of the seat assembly 4800 may be a non-foam, a foam free, a foamless, and/or a non-woven mesh cushion 4900 of intertwined and/or entangled polymeric strands 4902 (i.e., an entangled mass), as shown in FIG. 153. Portions of the various polymeric strands are entangled with portions of other polymeric strands such that the plurality of polymeric strands serves as a single unit, piece, cushion, pillow, pad, or mat. Hereinafter, this disclosure will refer to it as a non-foam cushion 4900 or foamless cushion 4900.

The polymeric strands are any suitable polymeric material such as a thermoplastic polymer (e.g., polyolefins, polyethylene, polypropylene, polystyrene, polycarbonate, and/or polyvinyl chloride). For example, the application identified by Ser. No. 17/741,639 filed on May 11, 2022, describes foamless cushions and is attached herewith and hereby incorporated by reference in its entirety.

In a variation, the foamless cushion and/or entangled mass 5000 defines one or more pockets or cavities 5010 such that a subassembly or plurality of subassemblies (e.g., fluid assemblies, pneumatic assemblies, massage assemblies, temperature control assemblies, ventilation assemblies, etc.) are disposed within the one or more pockets and/or cavities 5010. In a refinement, the entangled mass 5000 includes a first portion 5020 having a first hardness and a second portion 5030 having a second hardness that is different than the first hardness. In one or more embodiments, the hardness is determined according to ASTM 3574. For example, the first hardness is less than the second hardness (i.e., the second hardness is greater than the first hardness). Said differently, the second portion 5030 is harder than the first portion 5020. Although described herein as a portion, the portions may also be referred to zones, sections, regions, segments, or any other suitable term such that it refers to different portions of the same entangled mass, component, part, piece, unit and are not separate and distinct layers that are stacked on each other (and possibly fastened, glued, or sewed together) to form a multi-piece assembly such as conventional assemblies.

For example, FIG. 155 depicts a conventional cushion assembly 5100 including multiple layers: a soft topper foam pad layer 5110, a spacer and/or harder foam layer 5120 disposed below the topper layer 5110, a subassembly 5130 such as a massage assembly, temperature control assembly, and/or ventilation assembly disposed below the spacer/harder foam layer 5120, and another hard foam layer 5140 disposed below the subassembly layer 5130. Unlike, the conventional cushion the foamless cushion disclosed herein is a single piece which encased one or more subassemblies.

In one or more embodiments, first hardness is different than the second hardness by at least 0.5 kPa, or more preferably at least 2 kPa, or even more preferably at least 4 kPa. For example, the first hardness is no more than 5 kPa, or more preferably no more than 4.5 kPa, or even more preferably no more than 4.0 kPa and the second hardness is at least 5 kPa, or more preferably at least 7.5 kPa, or even more preferably at least 10 kPa. In a variation, the first hardness is 1 to 5 kPa, or more preferably 2 to 4.5 kPa, or even more preferably 3 to 4 kPa and the second hardness is 5 to 15 kPa, or more preferably 7 to 12 kPa, or even more preferably 8 to 10 kPa.

In still other embodiments, again referring to FIG. 154, the entangled mass 5000 has a first surface 5002 and a second surface 5004 opposite the first surface 5002. In a refinement, the first surface 5002 is arranged in the seat assembly 4800 such that it is more proximate to a seated occupant than the second surface 5004. In this refinement, the first portion 5020 is proximate the first surface 5002 such that the softer first portion 5020 provides the affect a soft comfortable cushion to a user but the more distal second portion 5030 having a greater hardness ensures durability and comfort during extended use. For example, the second portion 5030 has a hardness and/or firmness such that during extended use the second portion does not continually deform. In other words, the occupant has the sensation of immediate softness and/or comfort from the first portion 5020 without sacrificing long-term durability and comfort associated with the second portion 5030.

The different portions of the foamless cushion 5000 provides different degrees of hardness by having different attributes or characteristics. For example, the bulk densities of the different portions are different. In a refinement, bulk density is determined according to ISO 845. Any portion described above as having a greater hardness has a greater bulk density (i.e., any portion described above as having a lower hardness has a lower bulk density). Alternatively, or in combination, the average diameter of the strands may be different. For example, any portion described above as having a greater hardness may have a greater average diameter (i.e., any portion described above as having a lower hardness may have a lower average diameter).

In a refinement, the bulk densities is different by at least 5.0 kg/m3, or more preferably at least 10.0 kg/m3, or even more preferably at least 15.0 kg/m3, or still even more preferably at least 18.0 kg/m3. In a variation, the bulk density difference is 1 to 30 kg/m3, or more preferably 5 to 20 kg/m3, or even more preferably 10 to 18 kg/m3. For example, the first portion 5020 has a bulk density of no more than 40 kg/m3, or more preferably no more than 35 kg/m3, or even more preferably no more than 32 kg/m3 and the second portion 5030 has a bulk density of at least 40 kg/m3, or more preferably at least 45 kg/m3, or even more preferably at least 50 kg/m3. In other embodiments, the first portion 5020 has a bulk density of no more than 45 kg/m3, or more preferably no more than 32 kg/m3, or even more preferably no more than 25 kg/m3 and the second portion 5030 has a bulk density of at least 25 kg/m3, or more preferably at least 32 kg/m3, or even more preferably at least 45 kg/m3.

In a variation, the first portion 5020 has a density of 25 to 40 kg/m3, or more preferably 28 to 37 kg/m3, or even more preferably 30 to 34 kg/m3 and the second portion 5030 has a density of 40 to 60 kg/m3, or more preferably 46 to 54 kg/m3, or even more preferably 48 to 52 kg/m3.

In one more embodiments, each portion has an average strand diameter. The average strand diameter of the first portion 5020 is different than the average strand diameter of the second portion 5030. In a refinement, the difference is at least 0.2 mm, or more preferably at least 0.4 mm, or even more preferably 0.6 mm. In a variation, the difference is 0.1 to 3 mm, or more preferably 0.3 to 1.8 mm, or even more preferably 0.5 to 1.2 mm.

In an embodiment, the average strand diameter of the second portion 5030 may be at least 1.1 times larger than the average strand diameter of the first portion 5020, or more preferably at least 1.5 times larger, or even more preferably at least 2 times larger (i.e., at least 110% larger, or more preferably at least 150% larger, or even more preferably at least 200% larger).

For example, in an embodiment, the first portion 5020 has an average strand diameter of no more than 1.2 mm, or more preferably no more than 1.0 mm, or even more preferably no more than 0.8 mm and the second portion 5030 has an average strand diameter of at least 1.2 mm, or more preferably at least 1.4 mm, or even more preferably at least 1.6 mm. In a variation, the first portion 5020 may have an average strand diameter of 0.05 to 10 mm, or more preferably 0.1 to 5 mm, or even more preferably 0.5 to 1.2 mm and the second portion 5030 has an average strand diameter of 0.8 to 15 mm, or more preferably 1.2 to 13 mm, or even more preferably 1.6 to 10 mm.

In a refinement, a harder/firmer structure is necessary to sufficiently define or support a cavity. Accordingly, it is preferably to define a cavity with the harder section, i.e., second portion 5030 which is more structural sound. Alternatively, the first portion 5030 may be sufficiently hard enough such that the first portion 5020 and/or a combination of the first and second portions define the one or more cavities.

In yet some embodiments, the shape of the strands for the first and second portions are different. For example, the strands are round, square, triangular, star, or various other shapes. When the shape is not round, the diameter refers to the max diameter of a widthwise (as opposed to lengthwise) cross-section of the strand to distinguish the relative size of the various strands. For example, the strands of the first portion are round, and the strands of the second portion are polygonal (e.g., rectangular or triangular).

Referring to FIG. 156, a die 5200 such as a breaker plate is disclosed. The die 5200 is used to dispense a flowable polymeric resin as polymeric strands. In a refinement, the die 5200 is an interchangeable component of the dispensing system 5300, as shown in FIG. 157, such that different dies can be used to provide cushions having different characteristic and attributes (e.g., shapes, hardnesses, bulk densities, average strand diameters). For example, a first die is used to produce a cushion for a seat back defining a cavity to receive a massaging assembly and ventilation assembly and a second die is used to produce a seat bottom defining a cavity to receive a ventilation assembly.

Referring to FIG. 157, the die 5200 is arranged in the dispensing system 5300. In an embodiment, dispensing system 5300 includes an inlet 601 such as a hopper for receiving polymeric resin 5302 such as in a solid pelletized form. In a refinement, the polymeric resin 5302 is sheared and heated such as by an extruder 5304 which melts the solid polymeric resin 5302 into a flowable form such as a molten polymeric resin 5302 prior to dispensing it from the die 5200. In an embodiment, the extruder 5304 is driven by a motor 5306 and a transmission 5308. In a refinement, the extruder 5304 includes a screw 5312 disposed in a barrel 5314. In one or more embodiments, the die 5200 is disposed and/or arranged at a terminal end of the extruder 5304 such that it can easily be removed and replaced by another die.

Referring to FIG. 158, the flowable molten polymeric resin 5302 is dispensed from the die 5200 as strands and flows linearly into and through a first medium 5410 such as air and then into a second medium 5420 such as water. In a refinement, the first and second mediums 5410, 5420 have different densities such that deflection occur at or proximate the medium interface 5415 (i.e., the linear strands change direction). For example, the second medium 5420 has a greater density than the first medium 5410. In a variation, the second medium 5420 is chilled to below the melting point and/or glass transition temperature of the polymeric resin. In a refinement, the second medium 5420 also has a greater heat capacity than the first medium 5410. The deflection or changes in direction lead to entanglement and/or the intertwining of the polymeric strands when accompanied by the cooling effect of the second medium 5420 the polymeric strands solidify such that the entangled/intertwining mass is a single piece, component, unit and/or generally holds its shape to, for example, form a cushion. In a one or more embodiments, the entangled/intertwined mass of polymeric strands exhibit elastic properties similar to a foam and/or fabric. In a refinement, the entangled/intertwined mass is cleaned and/or dried after being removed from the second medium 5420. Once hardened the strands are generally fixed in position relative to one another such that they become more proximal or distal depending on the pressure exerted upon them but generally don't change positions relative to one another. Accordingly, portions having a greater bulk density and/or larger size are present a greater overall hardness and portions having a lesser bulk density and/or size are present a lesser overall hardness.

The die 5200 includes a body 5202 defining a plurality of orifices 5204. In one or more embodiment, the plurality of orifices 5204 includes at least 100 orifices, or more preferably at least 5200 orifices, or even more preferably at least 1000 orifices, as shown in FIG. 160. FIGS. 161-162 illustrate cross-sectional views of the breaker plate of FIG. 160. As shown, each orifice is tapered from a larger orifice to a smaller orifice which generates a greater pressure for dispensing the flowable polymeric strand from the die. The dispensing system 5300 applies pressure such that the flowable polymeric resin 5302 is dispensed through the orifices 5204 of the die 5200. Accordingly, the size, arrangement, distribution, and density of orifices 5204 will affect the characteristic and/or attributes of the cushion such as the overall shape, hardness, bulk density, average strand diameter, and strand shape.

In a variation, the die 5200 also include a solid section 5206. In a refinement, the solid section 5206 has no holes or a very limited number of holes such as less than 50, or more preferably less than 25, or even more preferably less than 10, or still more preferably less than 5. If the solid section 5206 has holes the strands dispensed therefrom are easily removed and not be a part of the cushion. For example, they are disposed such that they do not become entangled with the strands dispensed from the plurality of orifices 5204 and/or are easily severed for removal. The solid section 5206 is surrounded by the plurality of orifices 5204 (i.e., the plurality of orifices 5204 is disposed around solid section 5206) such that it forms an entangled mass defining one or more pockets and/or cavities. In a refinement, the one or more pockets and/or cavities are shaped to receive one or more subassemblies. In a variation, the plurality of orifices 5204 are include a first group of orifices having a different size, distribution, density, and/or shape than a second group of orifices.

Each group of orifices has an average diameter and orifice density (i.e., a first group of orifices having a first average diameter and first orifice density, and a second group of orifices having a second average diameter and second orifice density). In a refinement, the first average diameter is different than the second average diameter and/or the first orifice density is different than the second average density. For example, the differences are more than differences within manufacturing tolerance or different by at least 1%, 1.5%, 3%, 5%, or 10%. In another variation, the first average diameter is less than the second average diameter. Alternatively, or in combination, the first orifice density is less than the second orifice density.

In a refinement, the first average diameter is no more than 1.2 mm, or more preferably no more than 1.0 mm, or even more preferably no more than 0.8 mm. For example, the first average diameter is 0.05 to 1.2 mm, or more preferably 0.3 to 1.0 mm, or even more preferably 0.7 to 0.9 mm. In some embodiments, the first orifice density is no more than 11.5 orifices per square inch, or more preferably no more than 10 orifices per square inch, or even more preferably no more than 8 orifices per square inch. For example, the first orifice density is 1 to 11.5 orifices per square inch, or more preferably 3 to 10 orifices per square inch, or even more preferably 5 to 8 orifices per square inch.

In a variation, the second average diameter is at least 0.8 mm, more preferably at least 0.9 mm, or even more preferably at least 1.0 mm. For example, the second average diameter is 0.8 to 1.6 mm, or more preferably 0.9 to 1.5 mm, or even more preferably 1.0 to 1.4 mm. In some embodiments, the second orifice density is at least 9 orifices per square inch, or more preferably at least 10 orifices per square inch, or even more preferably at least 11 orifices per square inch and no more than 14 orifices per square inch, or more preferably no more than 13 orifices per square inch, or even more preferably 12 orifices per square inch. For example, the second orifice density is 9 to 14 orifices per square inch, or more preferably 10 to 13 orifices per square inch, or even more preferably 11 to 12 orifices per square inch.

In a variation, the solid section 5206 is more than just the limited area between orifices but instead a purposefully holeless area to create a hole, cavity, or pocket in the cushion. In a refinement, the solid section 5206 is at least 50% the length of the cushion, or more preferably at least 60% or even more preferably at least 80%. In yet another refinement, the solid section 5206 has a surface area that is at least 5 times greater than the cross-sectional area of an orifice, or more preferably at least 10 times greater or even more preferably at least 25 times greater.

In one or more embodiments, the solid section 5206 is surround by the second group of orifices (i.e., the second group of orifices from the plurality of orifices 5204 is disposed around the solid section 5206). In other words, the die 5200 is arranged such that the cavity is defined in the harder section of the cushion. For example, the orifices disposed around the solid section 5206 have a greater orifice density than other portions of the die 5200 and/or the orifices disposed around the solid section 5206 are larger than other portions of the die 5200.

A method 5500 of making a seat cushion or pad is also disclosed, as shown in FIG. 159. In one or more embodiments, the method 5500 includes dispensing a plurality of polymeric strands from a die, as described herein, into and through an interface between two mediums (i.e., a first medium and a second medium) to form a cushion (i.e., step 5510), removing the cushion from the second medium (i.e., step 5520), and drying the cushion (i.e., step 5530). In a refinement, dispensing occurs via an extruder as shown in FIG. 157. The extruder is configured to receive a polymeric resin such as a thermoplastic polymeric resin. In a variation, the extruder includes a hopper for receiving the polymer resin. For example, pellets or beads of the polymeric resin is loaded in the hopper. The hopper directs the polymeric resin into a chamber/barrel housing a mechanical agitator such as a screw that is engaged/driven to shear the polymeric resin. In a refinement, the chamber/barrel and/or portions thereof are heated. The shear and/or heat renders the solid pelletized polymeric resin into a flowable (molten) polymeric material. For example, the chamber/barrel is heated to a temperature that exceeds the melting point of the resin.

The molten polymeric strands is dispensed into the first medium such as air. In a refinement, the strands are dispensed from a die such as a breaker plate. In a variation, the die has solid section, different orifice densities, orifice sizes, and/or orifice shapes as described herein. In a refinement, the breaker plate die is an interchangeable component of an extruder such that a first die/breaker plate is used to make a first plurality of components and exchanged with a second die/breaker plate that is used to make a second plurality of components that are different than the first plurality of components. The die 5200 is arranged such that gravity further directs the polymeric strands in a linear motion into the second medium (e.g., water).

In a refinement, the second medium is denser than the first medium. The mediums define an interface therebetween. For instances, the first medium is a gas and the second medium is a liquid such as water. The difference results in deflection (e.g., bending) of the polymeric strands at or proximate the interface. The random deflection of the various polymeric strands results in entanglement of the plurality of polymeric strands granted the orifices are sufficient arranged next to one another. The intertwined and entangled polymeric strands also harden as they are cooled by the second medium and transition out of their molten state. In a refinement, the hardened intertwined/entangled mass of polymeric strands forms a non-foam/foamless cushion.

In a variation, the mass (e.g., cushion) is removed from the second medium and dried. Given the different characteristics of portions of the die the cushion has different attributes such as harder and softer regions and/or cavities. In a refinement, the different hardnesses are the result of different bulk densities and/or strand diameters.

In one or more embodiments, a cushion 4820 comprises a plurality of intertwined polymeric strands 4902 (e.g., thermoplastics such as polyolefins, polyethylene, polypropylene, polystyrene, polycarbonate, and/or polyvinyl chloride) forming an entangled mass 5000 having a first surface 5002 configured to be proximate an occupant when assembled in a seat 4800 and a second surface 5004 opposite the first surface 5002, the entangled mass 5000 defining one or more cavities 5010 configured to receive a fluid system.

In various embodiments, the entangled mass 5000 includes a first section having a first hardness and a second section having a second hardness that is greater than the first hardness.

In some embodiments, the second section has a greater bulk density and/or thicker average strand diameter than the first section.

In one or more embodiments, the first section is disposed proximate the first surface 5002 such that it is configured to be more proximate an occupant than the second section when assembled in the seat 4800.

In various embodiments, the one or more cavities 5010 are disposed in the second section.

In some embodiments, the second hardness is at least five kilopascals.

In one or more embodiments, the cushion 4820 further comprising the fluid system disposed in the one or more cavities 5010.

In various embodiments, the fluid system is a pneumatic ventilation and/or massage assembly.

In some embodiments, a seat assembly 4800 includes a seat frame 4810 for supporting the cushion 4820.

In one or more embodiments, a die 5200 comprises a body 5202 defining a plurality of orifices 5204 disposed around a solid section 5206, the solid section 5206 having a surface area that is at least ten times the area of an orifices of the plurality of orifices 5204 such that when a flowable resin 5302 is disposed through the plurality of orifices 5204 and hardened to form an entangled mass 4900 of polymeric strands 4902 (e.g., thermoplastics such as polyolefins, polyethylene, polypropylene, polystyrene, polycarbonate, and/or polyvinyl chloride) defining a cavity 5010.

In various embodiments, the plurality of orifices 5204 includes a first group of orifices and a second group of orifices, the first group of orifices being present at a first orifice density and having a first average diameter, the second group of orifices being present at a second orifice density and having a second average diameter wherein the second orifice density is greater than the first orifice density and/or the second average diameter is greater than the first average diameter.

In some embodiments, the second group of orifices is disposed around the solid section 5206 such that the cavity 5010 is defined by a harder section of the entangled mass 4900.

In one or more embodiments, the second orifice density is greater than the first orifice density.

In various embodiments, the second average diameter is greater than the first average diameter.

In some embodiments, first orifice density is no more than 11.5 orifices per square inch and the second orifice density is at least nine orifices per square inch.

In one or more embodiments, a method 5500 of producing a seat pad 4900 comprises dispensing (i.e., step 5510) a flowable resin 5302 through a die 5200 defining a plurality of orifices 5204 to dispense a plurality of polymeric strands 4902 (e.g., thermoplastics such as polyolefins, polyethylene, polypropylene, polystyrene, polycarbonate, and/or polyvinyl chloride) through an interface 5415 defined by a first medium 5410 and a second medium 5420 such that at least a portion of polymeric strands 4902 (e.g., thermoplastics such as polyolefins, polyethylene, polypropylene, polystyrene, polycarbonate, and/or polyvinyl chloride) are deflected, intertwines, and hardened to form a foamless cushion 4820 in the second medium 5420, removing the foamless cushion 4820 from the second medium 5420, and drying the foamless cushion 4820. The plurality of orifices 5204 is disposed around a solid section 5206 of die 5200 such that the foamless cushion 4820 defines a cavity 5010 configured to receive a subassembly.

In various embodiments, the plurality of orifices 5204 includes (i) a first group of orifices arranged at a first density and defining a first average diameter and (ii) a second group of orifices arranged at a second density and defining a second average diameter, the first density being different than the second density and/or the first average diameter being different than the second average diameter such the non-foam cushion 4820 has a first region with a first hardness and a second region with a second hardness that is different than the first hardness.

In some embodiments, the second group of orifices is disposed around the solid section 5206 such that the cavity 5010 is defined by the second region.

In one or more embodiments, the subassembly is a massage and/or ventilation assembly.

In various embodiments, the method 5500 further comprises exchanging the die 5200 with another die and dispensing the flowable resin 5302 through the other die 5200.

Referring to FIG. 163, a seat assembly 5620, such as a vehicle seat assembly 5620 is illustrated. In other examples, the seat assembly 5620 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 5620 may be configured for use with other non-vehicle applications.

The seat assembly 5620 has a support structure 5622 that may be provided by one or more support members. A support member may be provided by a frame and/or a substrate. The seat assembly has seat components, and these seat components include at least a seat bottom 5624 and a seat back 5626. The seat bottom 5624 may be sized to receive a seated occupant to support a pelvis and thighs of the occupant. The seat back 5626 may be sized to extend upright from the seat bottom 5624 to support a back of the occupant. The seat assembly may additionally have a head restraint 5627. The seat bottom 5624 has a seat bottom cushion 5628. The seat back 5626 has a seat back cushion 5630. The support structure 5622 provides rigid structural support for the seat components, e.g., the seat bottom 5624 and seat back 5626, and the associated cushions 5628, 5630. One or more trim assemblies 5632 are used to cover the seat bottom cushion 5628 and/or the seat back cushion 5630 and provide a seating surface for the seat assembly 5620.

The seat assembly 5620 has one or more fluid systems 5650, such as an air system. Although only one fluid system 5650 is shown, it is also contemplated that the seat assembly 5620 may have two or more fluid systems 5650. The fluid system 5650 has a fluid transfer device 5652 to provide pressurized fluid flow or air flow to one or more bladder assemblies 5654 in the seat assembly 5620. The fluid transfer device 5652 may be a fan, air pump, compressor, blower, pump, or the like to provide flow of a fluid. The seat assembly 5620 is shown with two bladder assemblies; however the seat assembly 5620 may have only one bladder assembly or more than two bladder assemblies.

The fluid system 5650 may provide a massage function, for example via bladders positioned within the seating component(s); a lumbar control function with one or more bladders positioned within the seating component(s); or other seat position controls with bladders appropriately positioned in the seating component(s), e.g., to control the angle or tilt of cushion and associated support pan of the seat component relative to its associated frame 5622. In other examples, the fluid system 5650 may be used for other seat functions and/or features as are known in the art. The fluid system 5650 may provide fluid flow to one or more of the bladder assemblies 5654 for static inflation where the bladder holds its position at a selected inflation level, e.g., for lumbar or seat position functions, or may provide fluid flow to one or more of the bladder assemblies 5654 for dynamic inflation where the bladder inflation or position changes, e.g., for massage functions. In further examples, the seat assembly 5620 may be provided with only a single fluid system, or with more than two fluid systems.

The fluid system 5650 may have various valve assemblies 5656 and other components. Valve assemblies 5656 in the fluid system 5650 according to various embodiments are described in further detail below, and may be used to control fluid flow from the fluid transfer device 5652 to one or more of the bladder assemblies 5654, as well as to control return flow or venting of the bladder assemblies 5654.

The valve assemblies 5656 and the fluid transfer device 5652 may each be in communication with a controller 5658 for control of the operation of the fluid system 5650, and the inflation or deflation of the bladder assemblies 5654. The controller 5658 may further be in communication with a user input 5660 to allow a seat occupant to control operation of the fluid system, or to select various functions, e.g., massage, massage speed, lumbar level, seat position angle, or the like.

FIGS. 164-166 illustrate a bladder assembly 5700 according to some embodiments. In various examples, the bladder assembly 5700 may be used with the seat assembly 5620 of FIG. 163, and as the bladder assembly 5654 in a fluid system 5650.

The bladder assembly 5700 is shown with a first bladder 5702, a third bladder 5706, and a second bladder 5704, and in sequential fluid arrangement. In other examples, the bladder assembly 5700 may be provided with one or two bladders, or with more than three bladders. Furthermore, the bladders 5702, 5704, 5706 may be arranged in other flow configurations, e.g., for parallel fluid flow, or for a combination of sequential and parallel fluid flow, e.g., with the third 5706 bladder replaced by two or more bladders in parallel arrangement with one another and sequentially positioned between the first and second bladders.

The bladder assembly 5700 is fluidly connected to the fluid transfer device 5652 via a valve assembly 5656. In one example, all of the flow into or out of the bladder assembly 5700 passes through the valve assembly 5656.

The first bladder 5702 has a first layer 5710 connected to a second layer 5712 to form a bladder and to define a cavity between the first and second layers. The first layer 5710 defines a first aperture 5714 therethrough. One of the first or second layers defines a second aperture 5716 therethrough. In the example shown, the first layer 5710 also defines the second aperture 5716. The first and second apertures 5714, 5716 are both in fluid communication with the cavity of the first bladder 5702. The second aperture 5716 may be provided without a flap valve as shown, e.g., may be provided as an open, unobstructed, or unrestricted aperture.

The first bladder has a third layer 5720 connected to the first layer 5710 and positioned between the first and second layers 5710, 5712 within the bladder and within the cavity. In the example shown, the third layer 5720 is connected to the first layer 5710 along a proximal end 5722 and extends to a distal free end 5724. The third layer 5720 provides a valve element for the first bladder and may be configured as a flap valve. The third layer 5720 is movable between a first position covering the first aperture 5714 to act as a closed valve element and prevent, limit, or restrict fluid flow through the first aperture 5714 as shown in FIG. 165, and a second position spaced apart from the first aperture 5714 to act as an open valve element and permit fluid flow through the first aperture as shown in FIG. 166.

According to the example shown, the third layer 5720 has one or more perforations 5726 therethrough, with the perforations 5726 overlapping the first aperture 5714 when the third layer 5720 is in the first, closed position. In one example, the perforations 5726 are provided as a single perforation, and in other examples, may be provided as a series or multiple perforations. The perforations 5726 have a collective cross-sectional area that is less than the cross-sectional area of the first aperture 5714, such that fluid flow (e.g., flow rate) through the first aperture 5714 with the third layer 5720 in the first, closed position is less than flow through the first aperture 5714 with the third layer 5720 in the second, open position. The perforations 5726 may be provided as a circular hole, or as a slot or other shape.

The second bladder 5704 has a fourth layer 5730 connected to a fifth layer 5732 to form a bladder and to define a cavity between the fourth and fifth layers 5730, 5732. The fourth layer 5730 defines a third aperture 5734 therethrough. The third aperture 5734 is in fluid communication with the cavity of the second bladder 5704. The fourth and fifth layers 5730, 5732 of the second bladder may be the same as the first and second layers of the first bladder, e.g., formed from the same layers or panels, or may be provided as separate panels or layers. In one example and as shown, the third aperture 5734 of the second bladder is the sole aperture in the second bladder. In a further example, the third aperture 5734 may be provided without a flap valve or is provided as an open, unobstructed, or unrestricted aperture.

The third aperture 5734 of the second bladder is fluidly connected to the first bladder 5702. The second bladder 5704 receives fluid flow into it from the first aperture 5714 of the first bladder.

The third bladder 5706 of the bladder assembly 5700 has a sixth layer 5740 connected to a seventh layer 5742 to define a cavity therebetween. The sixth layer 5740 defines a fourth aperture 5744, and the sixth or the seventh layer defines a fifth aperture 5746 therethrough. In the example shown, the sixth layer 5740 also defines the fifth aperture 5746. The fifth aperture 5746 may be provided similarly to aperture 5716 as described above. The third bladder 5706 has an eighth layer 5750 that is positioned between the sixth and seventh layers 5740, 5742 within the cavity. The eighth layer 5750 may be similar to that described above with respect to the third layer 5720 and extend from a proximal end 5752 connected to the layer 5740 to a distal free end 5754. The eighth layer 5750 is movable from a first position covering the fourth aperture 5744 as shown in FIG. 165 and a second position spaced apart from the fourth aperture 5744 as shown in FIG. 166.

According to the example shown, the eighth layer 5750 has one or more perforations 5756 therethrough, with the perforations 5756 overlapping the fourth aperture 5744 when the eighth layer 5750 is in the first, closed position. In one example, the perforations 5756 are provided as a single perforation, and in other examples, may be provided as a series or multiple perforations. The perforations 5756 have a collective cross-sectional area that is less than the cross-sectional area of the fourth aperture 5744, such that fluid flow (e.g., flow rate) through the fourth aperture 5744 with the eighth layer 5750 in the first, closed position is less than flow through the fourth aperture 5744 with the eighth layer 5750 in the second, open position. The collective cross-sectional area of the perforations 5756 in the eighth layer may be less than the collective cross-sectional area of the perforations 5726 in the third layer. In other examples, the collective cross-sectional area of the perforations 5756 in the eighth layer may be greater than or equivalent to the collective cross-sectional area of the perforations 5726 in the third layer The third bladder 5706 is positioned between and fluidly connects the first bladder 5702 to the second bladder 5704. The third bladder 5706 is fluidly connected to the first bladder 5702 via the first aperture 5714 of the first bladder and the fifth aperture 5746 of the third bladder. The second bladder 5704 is fluidly connected to the third bladder 5706 via the fourth aperture 5744 of the third bladder and the third aperture 5734 of the second bladder.

In various examples, the layers of the bladder assembly 5700, including the first, second, and/or third layers of the first bladder 5702, and layers of the other bladders 5704, 5706 are formed from a thermoplastic material. In other examples, one or more of the layers in the bladders 5702, 5704, 5706 of the bladder assembly 5700 may be formed from a thermoplastic polyurethane (TPU), another thermoplastic, or other materials such as rubber or latex.

The fourth and fifth layers 5730, 5732 of the second bladder may be the same as the first and second layers 5710, 5712 of the first bladder, e.g., formed from the same layers or panels, or may be provided as separate panels or layers. The sixth and seventh layers 5740, 5742 of the third bladder may likewise be the same as the first and second layers 5710, 5712 of the first bladder and/or the third and fourth layers 5730, 5732 of the second bladder, or may be provided as separate panels or layers. In other examples, the first and second layers 5710, 5712 of the first bladder may be formed form a single sheet or panel that is folded to form both of the first and second layers. The second and third bladders 5704, 5706 may likewise be formed. Additionally, layers of the bladders may at least partially form the connecting channels or passages between adjacent bladders, as shown. Additionally layers may be provided for the connecting channels or passage, or other tubing or flow connections may be provided between the bladders. The various layers of each of the bladders may be connected via adhesive, welding, bonding, or another technique as is known in the art. Note that welding may include a process for thermoplastics including heat and/or pressure, ultrasonic joining, or the like. The various layers of each of the bladders may be connected around an outer perimeter region to form the bladder and cavity.

The first bladder 5702 is in fluid communication with the pump or fluid transfer device via the second aperture 5716 and the valve assembly 5656. The controller 5658 is configured to control the valve 5656 between an open position and a closed position, wherein the first bladder 5702 inflates with the valve 5656 in the open position and the pump operating. The controller operates the pump and opens the valve to inflate the bladder assembly 5700. In one example, the bladder assembly 5700 is inflated by the pump to modify an orientation of seating surface of the seat member. In other examples, the bladder assembly 5700 is inflated by the pump to provide a massage effect to a seat occupant.

In one example, the bladder assembly 5700 provides a sequential pneumatic massage effect for the seat assembly, and is operated passively, e.g., sequential inflation and deflation of the bladders of the assembly 5700 occur based on the structure and connections between the bladders, and not due to active control of any valves interconnecting the individual bladders. The first bladder therefore inflates faster than the third bladder 5706, which in turn, inflates faster than the second bladder 5704. The first bladder 5702 may reach a fully inflated state before the third bladder 5706, and likewise, the third bladder 5706 may reach a fully inflated state before the second bladder 5704.

A schematic of the bladder assembly with flow for inflation is shown in FIG. 165. A schematic of the bladder assembly with flow for deflation is shown in FIG. 166. Once the valve 5656 is opened, the first bladder 5702 begins to fill or inflate. Flow continues through the first bladder 5702 and to the third bladder 5706, but is restricted by the perforations 5726 in the third layer 5720 in the closed position. The third bladder 5706 therefore also begins to inflate, but at a slower rate than the first bladder 5702. Likewise, as the third bladder 5706 begins to inflate, flow continues through the third bladder and to the second bladder 5704, but is restricted by the perforations 5756 in the eighth layer. The second bladder 5704 therefore also begins to inflate, but at a slower rate than the first bladder and the third bladder. The collective cross-sectional areas of the perforations 5726, 5756 in the third layer and the eighth layer controls or determines the inflation rate of the first bladder, third bladder, and second bladders. Likewise, the cross-sectional area of the apertures in each of the first, second, and third bladders may be varied to further control the inflation and deflation rates between the bladders. When the bladders in the assembly 5700 are to be deflated, the controller controls the valve 5656 to a vent position, or otherwise vents the flow from the bladder assembly 5700 at a point in the fluid system away from the bladder assembly 5700. The bladders 5702, 5704, 5706 rapidly deflate, generally simultaneously, as the third and eighth layers 5720, 5750 move from their first positions to their second positions, and act as open flap valves with pressure on the bladders in the assembly 5700 as shown in FIG. 166. This allows for rapid deflation and venting of the bladders, and avoids or limits sequential deflation of the assembly or slow deflation rates.

FIGS. 167-168 illustrate a bladder 5770 for use with the bladder assembly of FIG. 164 according to an alternative embodiment. Elements that are the same as or similar to those described above with reference to FIGS. 163-166 are given the same reference number for simplicity. Furthermore, the description of the bladder assembly and valve as provided with respect to FIGS. 163-166 may be applied to the bladder assembly and valve as shown in FIGS. 167-168 as appropriate. The bladder 5770 is described below for use as the first bladder 5702. In other non-limiting examples, the bladder 5770 be used as the first bladder 5702 or third bladder 5706 as described above, or may alternatively be used in another bladder assembly or as a standalone bladder.

The bladder 5770 has a first layer 5710 and a second layer 5712 defining a cavity. The first layer defines the first and second apertures 5714, 5716. The third layer 5720 is positioned between the first and second layers 5710, 5712 and within the cavity. The third layer has the proximal end 5722 connected to the first layer 5710, and the distal end 5724 connected to the second layer 5712. The third layer 5720 is movable between a first position covering the first aperture 5714 as shown in FIG. 167 and preventing flow from the bladder 5770 out through the aperture 5714, second position spaced apart from the first aperture 5714 to allow flow from the bladder 5770 to flow through the aperture 5714.

The layer 5720 may be folded in a central region 5772 between the ends 5722, 5724, and may unfold as the bladder 5770 inflates and the second layer 5712 moves away from the first layer 5710. As the layer 5720 is unfolded, the layer is moved away from the aperture 5714, thereby allowing flow from the bladder 5770 and out of the aperture 5714. The layer 5720 may be folded as shown, e.g., as a C-shaped or V-shaped fold, or may be folded multiple times, e.g., as a Z-shaped or other folded shape. The location of the fold 5772, or of the first and second ends 5722, 5724 may be moved relative to the aperture 5714 to control when the flap 5720 moves away from the aperture 5714 based on the inflation level of the bladder 5770. If the layer 5720 is positioned with the aperture 5714 closer to the fold 5772, the aperture 5714 will be uncovered at a lower bladder inflation level than if the layer 5720 is positioned with the aperture 5714 closer to the end 5722.

Note that the layer 5720 acts as a flap valve such that flow can enter the bladder 5770 via the aperture 5714, e.g., as described above with respect to a deflation process, although in certain examples it may act to slow the deflation of an adjacent bladder.

In the example shown, the layer 5720 is provided as a solid layer, or a layer without perforations described above according to various non-limiting examples. The layer 5720 may therefore completely block or prevent flow across the aperture 5714 in the closed position. The layer 5720 may then delay filling of a bladder downstream of aperture 5714 until the bladder 5770 opens sufficiently to move the layer 5720 away from the aperture 5714.

FIGS. 169-170 illustrates a bladder assembly 5800 according to some embodiments. In various examples, the bladder assembly 5800 may be used with the seat assembly 5620 of FIG. 163, and as the bladder assembly 5654 in a fluid system 50. Furthermore, the description of the bladder assembly 5654, 5700, 5770 as provided with respect to FIGS. 163-168 may be applied to the bladder assembly 5800 as shown in FIG. 169 as appropriate.

The bladder assembly 5800 is shown with a first bladder 5802, a second bladder 5804, a third bladder 5806, and a fourth bladder 5808 in parallel fluid flow arrangement. In other examples, the bladder assembly 5700 may be provided with one, two, or three bladders, or with more than four bladders. Furthermore, the bladders 5802-5808 may be arranged in other flow configurations, e.g., for a combination of sequential and parallel fluid flow, e.g., with the third bladder 5806 replaced by two or more bladders in sequential arrangement with one another.

The bladder assembly 5800 is fluidly connected to the fluid transfer device 5652 via one or more valve assemblies 5656. In one example, the bladder assembly 5800 has a first valve assembly 5810 and a second valve assembly 5812. The first and second valve assemblies 5810, 5812 may each be connected to a controller 5658 to control operation of the valve assemblies 5810, 5812. The first valve 5810 may connect the bladder assembly to the fluid transfer device. The second valve 5812 may vent to atmosphere according to various non-limiting examples.

The first bladder 5802 has a first layer 5820 connected to a second layer 5822 to form a bladder and to define a cavity between the first and second layers 5820, 5822. The first layer 5820 defines a first aperture 5824 therethrough. One of the first or second layers defines a second aperture 5824 therethrough. In the example shown in FIG. 169, the first layer 5820 also defines the second aperture 5826. In the example shown in FIG. 170, the second layer 5822 defines the second aperture 5826. The first and second apertures 5824, 5826 are both in fluid communication with the cavity of the first bladder 5802.

The first bladder 5802 has a third layer 5830 connected to the first layer 5820. In the example shown, the third layer 5830 is connected to the first layer 5820 along a proximal end, and extends to a distal free end. The third layer may be external to the cavity such that the first layer 5820 is positioned between the second layer 5822 and the third layer 5830.

The first bladder 5802 also has a fourth layer 5832 connected to the first layer 5820 and positioned between the first and second layers 5820, 5822 within the bladder and within the cavity. In the example shown, the fourth layer 5832 is connected to the first layer 5820 along a proximal end, and extends to a distal free end.

The third layer 5830 and the fourth layer 5832 each provide a valve element for the first bladder, and may be configured as flap valves. Each of the third and fourth layers 5830, 5832 is movable between a first position covering the associated aperture 5824, 5826 to act as a closed valve element and prevent, limit, or restrict fluid flow through the aperture 5824, 5826, and a second position spaced apart from the associated aperture 5824, 5826 to act as an open valve element and permit fluid flow through the associated aperture 5824, 5826.

Each of the layers 5830, 5832 may be provided as solid sheets or layers and without perforations in various non-limiting examples.

The second bladder 5804, third bladder 5806, and fourth bladder 5808 may each be constructed similarly to that described above with respect to bladder 5802 with associated layers.

The fluid transfer device or pump provides fluid flow to the valve 5810, and into the inlet passage 5840 when the valve 5810 is opened. Each of the bladders 5802-5808 is fluidly connected to the inlet passage 5840 via apertures 5826 such that fluid flows from the inlet passage 5840 and into the bladders via the apertures 5826 when the pressure in the inlet passage 5840 is greater than the pressure in the bladders 5802-5808 with the associated layer 5832 is opened via the pressure differential to allow flow into the respective bladders. Note that when the pressure in a bladder is higher than the pressure in the inlet passage 5840, the layer 5832 will remain closed and prevent flow across the aperture 5826.

Each of the bladders 5802-5808 is fluidly connected to an outlet passage 5842 via apertures 5824 such that fluid flows from the bladders 5802-5808 and into the outlet passage 5842 when the pressure in a bladder 5802-5808 is greater than the pressure in the outlet passage 5842 such that the associated layer 5830 is opened via the pressure differential to allow flow out of the respective bladders. Note that when the pressure in a bladder is less than the pressure in the outlet passage 5842, the layer 5830 will remain closed and prevent flow across the aperture 5824.

Each bladder 5802-5808 is therefore positioned between and fluidly connecting the first valve 5810 to the second valve 5812, with the bladders 5802-5808 arranged for parallel fluid flow relative to one another.

In order to inflate the bladders 5802-5808, the controller opens the first valve 5810 and closes the second valve 5812 while operating the fluid transfer device. Fluid flows into the inlet passage 5840, and into the bladders 5802-5808 via apertures 5826, and also into the outlet passage 5842 via apertures 5824. The layers 5830, 5832 are each moved to an open position while fluid flows from the inlet passage 5840, through the bladder, and into the outlet passage 5842. The layers 5830 move to a closed configuration when the pressure in the outlet passage is equivalent to or greater than the pressure in each bladder 5802-5808. The layers 5832 move to a closed position when the pressure in an associated bladder is equivalent to or greater than the pressure in the inlet passage 5840. Note that the layers 5830, 5832 move independently relative to one another and relative to the layers in adjacent bladders.

In order to deflate the bladders 5802-5808, the controller opens the second valve 5812, and may further close the first valve 5810 and/or stop the fluid transfer device. Fluid flows out of the bladders 5802-5808 via apertures 5824, and into the outlet passage 5842 and out of the valve 5812 and bladder assembly 5800. The layers 5830 move to an open configuration when the pressure in the outlet passage is less than the pressure in each bladder 5802-5808, thereby allowing the bladders to vent or deflate. Note that the layers 5832 may remain closed with pressure in the inlet passage 5840 while the bladders are deflating, and this may provide for a reduced time for reinflation at a later cycle, as some pressure remains in the assembly 5800.

In one example, the bladder assembly 5800 is inflated by the pump to modify an orientation of seating surface of the seat member. In other examples, the bladder assembly 5700 is inflated by the pump to provide a massage effect to a seat occupant.

The assembly 5800 also limits air or fluid shifting between adjacent bladders when the assembly 5800 is inflated, e.g., due to an increase of pressure on one bladder. If the pressure on one bladder increases, some fluid may leave that bladder and flow into the outlet passage 5842. The increased pressure in the outlet passage 5840 maintains the layers 5830 for the other bladders in the closed position, such that there is no backflow from the outlet passage into the other bladders, and likewise, no backflow from any of the bladders into the inlet passage 5840. If the pump is operating with valve 5810 open, the bladders may further inflate or reach a higher internal pressure based on the increased pressure in the outlet passage 5842. Furthermore, if there is a bladder with a lower pressure compared to the other bladders, that bladder may further inflate according to the assembly 5800 as described herein.

FIG. 170 illustrates a bladder 5802 during inflation or when the pressure in the outlet passage 5842 is greater than the pressure in the bladder 5802 such that the layer 5830 is in a closed configuration, and with the pressure in the inlet passage 5840 is greater than the pressure in the bladder 5802 such that the layer 5832 is in an open configuration.

In one or more embodiments, an assembly e.g., 5700 comprises a first layer e.g., 5710 (e.g., non-breathable material, non-woven fabric, impermeable polymeric material such as polyurethane, polyethylene, polyolefins, polyvinyl chloride, etc.) connected to a second layer e.g., 5712 (e.g., non-breathable material, non-woven fabric, impermeable polymeric material such as polyurethane, polyethylene, polyolefins, polyvinyl chloride, etc.) to form a bladder e.g., 5702, the first layer 5710 (e.g., non-breathable material, non-woven fabric, impermeable polymeric material such as polyurethane, polyethylene, polyolefins, polyvinyl chloride, etc.) defining a first aperture e.g., 5714 therethrough, and one of the first or second layers e.g., 5710, 5712 (e.g., non-breathable material, non-woven fabric, impermeable polymeric material such as polyurethane, polyethylene, polyolefins, polyvinyl chloride, etc.) defining a second aperture e.g., 5716 (e.g., non-breathable material, non-woven fabric, impermeable polymeric material such as polyurethane, polyethylene, polyolefins, polyvinyl chloride, etc.) therethrough, and a third layer e.g., 5720 (e.g., non-breathable material, non-woven fabric, impermeable polymeric material such as polyurethane, polyethylene, polyolefins, polyvinyl chloride, etc.) connected to the first layer e.g., 5710 (e.g., non-breathable material, non-woven fabric, impermeable polymeric material such as polyurethane, polyethylene, polyolefins, polyvinyl chloride, etc.) and positioned between the first and second layers e.g., 5710, 5712 (e.g., non-breathable material, non-woven fabric, impermeable polymeric material such as polyurethane, polyethylene, polyolefins, polyvinyl chloride, etc.) within the bladder e.g., 5702. The third layer e.g., 5720 (e.g., non-breathable material, non-woven fabric, impermeable polymeric material such as polyurethane, polyethylene, polyolefins, polyvinyl chloride, etc.) is movable between a first position covering the first aperture e.g., 5714, and a second position spaced apart from the first aperture e.g., 5714.

In various embodiments, at least one of the first, second, and third layers e.g., 5710, 5712, 5720 (e.g., non-breathable material, non-woven fabric, impermeable polymeric material such as polyurethane, polyethylene, polyolefins, polyvinyl chloride, etc.) comprise a thermoplastic.

In some embodiments, the third layer e.g., 5720 (e.g., non-breathable material, non-woven fabric, impermeable polymeric material such as polyurethane, polyethylene, polyolefins, polyvinyl chloride, etc.) comprises one or more perforations therethrough, the one or more perforations e.g., 5726 overlapping the first aperture e.g., 5714 when the third layer e.g., 5720 (e.g., non-breathable material, non-woven fabric, impermeable polymeric material such as polyurethane, polyethylene, polyolefins, polyvinyl chloride, etc.) is in the first position.

In one or more embodiments, the third layer e.g., 5720 (e.g., non-breathable material, non-woven fabric, impermeable polymeric material such as polyurethane, polyethylene, polyolefins, polyvinyl chloride, etc.) is connected to the first layer e.g., 5710 (e.g., non-breathable material, non-woven fabric, impermeable polymeric material such as polyurethane, polyethylene, polyolefins, polyvinyl chloride, etc.) along a proximal end e.g., 5752 and extends to a distal free end e.g., 5754.

In various embodiments, the third layer e.g., 5720 (e.g., non-breathable material, non-woven fabric, impermeable polymeric material such as polyurethane, polyethylene, polyolefins, polyvinyl chloride, etc.) is connected to the first layer e.g., 5710 (e.g., non-breathable material, non-woven fabric, impermeable polymeric material such as polyurethane, polyethylene, polyolefins, polyvinyl chloride, etc.) at a first end and is connected to the second layer e.g., 5712 (e.g., non-breathable material, non-woven fabric, impermeable polymeric material such as polyurethane, polyethylene, polyolefins, polyvinyl chloride, etc.) at a second end opposite thereto.

In some embodiments, the assembly e.g., 5700 further comprises a fourth layer e.g., 5830 (e.g., non-breathable material, non-woven fabric, impermeable polymeric material such as polyurethane, polyethylene, polyolefins, polyvinyl chloride, etc.) connected to one of the first or second layers e.g., 5710, 5712 (e.g., non-breathable material, non-woven fabric, impermeable polymeric material such as polyurethane, polyethylene, polyolefins, polyvinyl chloride, etc.), the fourth layer e.g., 5830 (e.g., non-breathable material, non-woven fabric, impermeable polymeric material such as polyurethane, polyethylene, polyolefins, polyvinyl chloride, etc.) movable between a first position covering the second aperture e.g., 5716, and a second position spaced apart from the second aperture e.g., 5716.

In one or more embodiments, the third and fourth layers e.g., 5720, 5830 (e.g., non-breathable material, non-woven fabric, impermeable polymeric material such as polyurethane, polyethylene, polyolefins, polyvinyl chloride, etc.) cover the first and second apertures e.g., 5714, 5716, respectively, in the first positions.

In various embodiments, an assembly e.g., 5700 comprises a first bladder e.g., 5702 comprising a first layer e.g., 5710 (e.g., non-breathable material, non-woven fabric, impermeable polymeric material such as polyurethane, polyethylene, polyolefins, polyvinyl chloride, etc.) connected to a second layer e.g., 5712 (e.g., non-breathable material, non-woven fabric, impermeable polymeric material such as polyurethane, polyethylene, polyolefins, polyvinyl chloride, etc.), and a third layer e.g., 5720 (e.g., non-breathable material, non-woven fabric, impermeable polymeric material such as polyurethane, polyethylene, polyolefins, polyvinyl chloride, etc.) connected to the first layer e.g., 5710 (e.g., non-breathable material, non-woven fabric, impermeable polymeric material such as polyurethane, polyethylene, polyolefins, polyvinyl chloride, etc.) and a second bladder e.g., 5704 (e.g., non-breathable material, non-woven fabric, impermeable polymeric material such as polyurethane, polyethylene, polyolefins, polyvinyl chloride, etc.) comprising a fourth layer e.g., 5730 (e.g., non-breathable material, non-woven fabric, impermeable polymeric material such as polyurethane, polyethylene, polyolefins, polyvinyl chloride, etc.) connected to a fifth layer e.g., 5732 (e.g., non-breathable material, non-woven fabric, impermeable polymeric material such as polyurethane, polyethylene, polyolefins, polyvinyl chloride, etc.) to form a cavity, the fifth layer e.g., 5732 (e.g., non-breathable material, non-woven fabric, impermeable polymeric material such as polyurethane, polyethylene, polyolefins, polyvinyl chloride, etc.) defining a third aperture e.g., 5734 therethrough. The first layer e.g., 5710 (e.g., non-breathable material, non-woven fabric, impermeable polymeric material such as polyurethane, polyethylene, polyolefins, polyvinyl chloride, etc.) defines a first aperture e.g., 5714 therethrough. One of the first or second layers e.g., 5710, 5712 (e.g., non-breathable material, non-woven fabric, impermeable polymeric material such as polyurethane, polyethylene, polyolefins, polyvinyl chloride, etc.) defines a second aperture e.g., 5716 therethrough. The first bladder e.g., 5702 is in fluid communication with a pump via the first aperture e.g., 5714. The third layer e.g., 5720 (e.g., non-breathable material, non-woven fabric, impermeable polymeric material such as polyurethane, polyethylene, polyolefins, polyvinyl chloride, etc.) is movable from a first position covering the first aperture 5714 and a second position spaced apart from the first aperture e.g., 5714.

In some embodiments, the assembly e.g., 5700 further comprises the pump, a valve fluidly connecting the pump to the second aperture e.g., 5716 of the first bladder e.g., 5702, and a controller e.g., 5658 configured to control the valve between an open position and a closed position, wherein the first bladder e.g., 5702 inflates with the valve in the open position.

In one or more embodiments, the assembly e.g., 5700 further comprises a second valve. The first bladder e.g., 5702 is positioned between and fluidly connects the first valve to the second valve. The second bladder e.g., 5704 is positioned between and fluidly connects the first valve to the second valve, and is arranged for parallel fluid flow (e.g., airflow) with the first bladder e.g., 5702. The controller e.g., 5658 is configured to control the second valve between a closed position and an open position, wherein the first bladder e.g., 5702 deflates with the second valve in the closed position.

In various embodiments, the third aperture e.g., 5734 of the second bladder e.g., 5704 is fluidly (e.g., pneumatically) connected to the first bladder e.g., 5702, the second bladder e.g., 5704 receiving fluid flow (e.g., air flow) from the first aperture e.g., 5714 of the first bladder e.g., 5702.

In some embodiments, the third aperture e.g., 5734 of the second bladder e.g., 5704 is the sole aperture in the second bladder e.g., 5704.

In one or more embodiments, the third layer e.g., 5734 (e.g., non-breathable material, non-woven fabric, impermeable polymeric material such as polyurethane, polyethylene, polyolefins, polyvinyl chloride, etc.) of the first bladder e.g., 5702 comprises one or more perforations e.g., 5726 therethrough, the perforations e.g., 5726 positioned to overlap the first aperture e.g., 5714 of the first bladder e.g., 5702 when the third layer e.g., 5720 (e.g., non-breathable material, non-woven fabric, impermeable polymeric material such as polyurethane, polyethylene, polyolefins, polyvinyl chloride, etc.) is in the first position.

In various embodiments, the third layer e.g., 5734 (e.g., non-breathable material, non-woven fabric, impermeable polymeric material such as polyurethane, polyethylene, polyolefins, polyvinyl chloride, etc.) of the first bladder e.g., 5702 is connected to the second layer e.g., 5712 (e.g., non-breathable material, non-woven fabric, impermeable polymeric material such as polyurethane, polyethylene, polyolefins, polyvinyl chloride, etc.) of the first bladder e.g., 5702.

In some embodiments, the assembly e.g., 5700 further comprises a third bladder e.g., 5806 comprising a sixth layer e.g., 5740 (e.g., non-breathable material, non-woven fabric, impermeable polymeric material such as polyurethane, polyethylene, polyolefins, polyvinyl chloride, etc.) connected to a seventh layer e.g., 5742 (e.g., non-breathable material, non-woven fabric, impermeable polymeric material such as polyurethane, polyethylene, polyolefins, polyvinyl chloride, etc.), and an eighth layer e.g., 5750 (e.g., non-breathable material, non-woven fabric, impermeable polymeric material such as polyurethane, polyethylene, polyolefins, polyvinyl chloride, etc.) connected to the sixth layer e.g., 5740 (e.g., non-breathable material, non-woven fabric, impermeable polymeric material such as polyurethane, polyethylene, polyolefins, polyvinyl chloride, etc.). The sixth layer e.g., 5740 (e.g., non-breathable material, non-woven fabric, impermeable polymeric material such as polyurethane, polyethylene, polyolefins, polyvinyl chloride, etc.) defines a fourth aperture e.g., 5744. The sixth or the seventh layer e.g., 5740, 5744 (e.g., non-breathable material, non-woven fabric, impermeable polymeric material such as polyurethane, polyethylene, polyolefins, polyvinyl chloride, etc.) defines a fifth aperture e.g., 5746 therethrough. The eighth layer e.g., 5750 (e.g., non-breathable material, non-woven fabric, impermeable polymeric material such as polyurethane, polyethylene, polyolefins, polyvinyl chloride, etc.) is movable from a first position covering the fourth aperture e.g., 5744 and a second position spaced apart from the fourth aperture e.g., 5744. The third bladder e.g., 5806 is fluidly connected to the first bladder e.g., 5702 via the first aperture e.g., 5714 of the first bladder e.g., 5702 and the fifth aperture e.g., 5746 of the third bladder e.g., 5706, and the second bladder e.g., 5704 is fluidly connected to the third bladder e.g., 5706 via the fourth aperture e.g., 5744 of the third bladder e.g., 5706 and the third aperture e.g., 5734 of the second bladder e.g., 5704.

In one or more embodiments, the eighth layer e.g., 5750 (e.g., non-breathable material, non-woven fabric, impermeable polymeric material such as polyurethane, polyethylene, polyolefins, polyvinyl chloride, etc.) of the third bladder e.g., 5706 defines one or more perforations e.g., 5756 therethrough, the perforations e.g., 5756 positioned to overlap the fourth aperture e.g., 5744 of the third bladder e.g., 5706 when the third layer e.g., 5720 (e.g., non-breathable material, non-woven fabric, impermeable polymeric material such as polyurethane, polyethylene, polyolefins, polyvinyl chloride, etc.) is in the first position.

In various embodiments, the first bladder e.g., 5702 further comprises a ninth layer positioned between the first and second layers e.g., 5710, 5712 (e.g., non-breathable material, non-woven fabric, impermeable polymeric material such as polyurethane, polyethylene, polyolefins, polyvinyl chloride, etc.) and connected to one of the first or second layers e.g., 5710, 5712 (e.g., non-breathable material, non-woven fabric, impermeable polymeric material such as polyurethane, polyethylene, polyolefins, polyvinyl chloride, etc.), the ninth layer (e.g., non-breathable material, non-woven fabric, impermeable polymeric material such as polyurethane, polyethylene, polyolefins, polyvinyl chloride, etc.) moveable from a first position covering the second aperture e.g., 5716, and a second position spaced apart from the second aperture e.g., 5716.

In some embodiments, the fourth layer e.g., 5730 (e.g., non-breathable material, non-woven fabric, impermeable polymeric material such as polyurethane, polyethylene, polyolefins, polyvinyl chloride, etc.) or the fifth layer e.g., 5732 (e.g., non-breathable material, non-woven fabric, impermeable polymeric material such as polyurethane, polyethylene, polyolefins, polyvinyl chloride, etc.) of the second bladder e.g., 5704 defines a sixth aperture therethrough and the second bladder e.g., 5704 comprises a tenth layer (e.g., non-breathable material, non-woven fabric, impermeable polymeric material such as polyurethane, polyethylene, polyolefins, polyvinyl chloride, etc.) positioned between the fourth and fifth layers e.g., 5730, 5732 (e.g., non-breathable material, non-woven fabric, impermeable polymeric material such as polyurethane, polyethylene, polyolefins, polyvinyl chloride, etc.). The tenth layer (e.g., non-breathable material, non-woven fabric, impermeable polymeric material such as polyurethane, polyethylene, polyolefins, polyvinyl chloride, etc.) is connected to the fourth layer e.g., 5730 (e.g., non-breathable material, non-woven fabric, impermeable polymeric material such as polyurethane, polyethylene, polyolefins, polyvinyl chloride, etc.) of the second bladder e.g., 5704 and movable from a first position covering the third aperture e.g., 5734 of the second bladder e.g., 5704. The second bladder e.g., 5704 comprises an eleventh layer (e.g., non-breathable material, non-woven fabric, impermeable polymeric material such as polyurethane, polyethylene, polyolefins, polyvinyl chloride, etc.) positioned between the fourth and fifth layers e.g., 5730, 5732 (e.g., non-breathable material, non-woven fabric, impermeable polymeric material such as polyurethane, polyethylene, polyolefins, polyvinyl chloride, etc.) and connected to one of the fourth or fifth layers e.g., 5730, 5732 (e.g., non-breathable material, non-woven fabric, impermeable polymeric material such as polyurethane, polyethylene, polyolefins, polyvinyl chloride, etc.). The eleventh layer (e.g., non-breathable material, non-woven fabric, impermeable polymeric material such as polyurethane, polyethylene, polyolefins, polyvinyl chloride, etc.) of the second bladder e.g., 5704 movable from a first position covering the sixth aperture of the second bladder e.g., 5704 to a second position spaced apart from the sixth aperture.

In one or more embodiments, a seat assembly e.g., 5620 comprises a seat member comprising a seating surface, a pump, and a bladder assembly e.g., 5700 supported by the seat member and in fluid communication with the pump to receive fluid flow (e.g., airflow) therefrom. The bladder assembly e.g., 5700 comprises a first bladder e.g., 5702 and a second bladder e.g., 5704. The first bladder e.g., 5702 comprises a first layer e.g., 5710 (e.g., non-breathable material, non-woven fabric, impermeable polymeric material such as polyurethane, polyethylene, polyolefins, polyvinyl chloride, etc.) connected to a second layer e.g., 5712 (e.g., non-breathable material, non-woven fabric, impermeable polymeric material such as polyurethane, polyethylene, polyolefins, polyvinyl chloride, etc.). The second bladder e.g., 5704 comprises a fourth layer e.g., 5720 (e.g., non-breathable material, non-woven fabric, impermeable polymeric material such as polyurethane, polyethylene, polyolefins, polyvinyl chloride, etc.) connected to a fifth layer e.g., 5732 (e.g., non-breathable material, non-woven fabric, impermeable polymeric material such as polyurethane, polyethylene, polyolefins, polyvinyl chloride, etc.). The first layer e.g., 5710 (e.g., non-breathable material, non-woven fabric, impermeable polymeric material such as polyurethane, polyethylene, polyolefins, polyvinyl chloride, etc.) defines a first aperture e.g., 5714 therethrough. One of the first or second layers e.g., 5710, 5712 (e.g., non-breathable material, non-woven fabric, impermeable polymeric material such as polyurethane, polyethylene, polyolefins, polyvinyl chloride, etc.) define a second aperture e.g., 5716 therethrough. The fourth layer e.g., 5730 (e.g., non-breathable material, non-woven fabric, impermeable polymeric material such as polyurethane, polyethylene, polyolefins, polyvinyl chloride, etc.) defines a third aperture e.g., 5734 therethrough. The first bladder e.g., 5702 is in fluid communication with the pump via the first aperture e.g., 5714. The first bladder e.g., 5702 further comprises a third layer e.g., 5720 (e.g., non-breathable material, non-woven fabric, impermeable polymeric material such as polyurethane, polyethylene, polyolefins, polyvinyl chloride, etc.) connected to the one of the first or second layers e.g., 5710, 5712 (e.g., non-breathable material, non-woven fabric, impermeable polymeric material such as polyurethane, polyethylene, polyolefins, polyvinyl chloride, etc.). The third layer e.g., 5720 (e.g., non-breathable material, non-woven fabric, impermeable polymeric material such as polyurethane, polyethylene, polyolefins, polyvinyl chloride, etc.) is movable from a first position covering the second aperture e.g., 5716 and a second position spaced apart from the second aperture e.g., 5716.

In various embodiments, the bladder assembly e.g., 5700 is inflated by the pump to modify an orientation of seating surface of the seat member.

FIG. 171 illustrates a seat assembly referenced generally by numeral 5910. The seat assembly 5910 is depicted as a vehicle seat assembly 5910 for a land vehicle, aircraft, or watercraft. The vehicle seat assembly 5910 may be utilized in any seating row of a vehicle. The seat assembly 5910 may also be utilized as any seating assembly, such as an office chair 5910 or comfort seat 5910.

The seat assembly 5910 includes a seat bottom assembly 5912 for supporting a pelvic and thigh region of an occupant. The seat bottom assembly 5912 is adapted to be supported upon an underlying support surface. According to the vehicle seat assembly 5910 embodiment, the seat bottom assembly 5912 is adapted to be mounted to a vehicle floor. A seat back assembly 5914 extends upright from the seat bottom assembly 5912 to support a back and shoulders of the occupant. A head restraint assembly 5916 is supported above the seatback assembly 5914.

The seat assembly 5910 is illustrated in cooperation with a heat transfer system 5918. The heat transfer system 5918 is also illustrated disassembled from the seat assembly 5910 in FIGS. 172 and 173. The heat transfer system 5918 includes a thermoelectric device 5920 to transfer heat to or from a seating surface 5922 of the seat assembly 5910. The thermoelectric device 5920 is an electrical device with high electrical conductivity, a low thermal conductivity, and a temperature difference across a material of the thermoelectric device 5920 in response to a thermoelectric voltage induced across the thermoelectric device 5920. The material of the thermoelectric device 5920 may include a conductive silicone or graphite interface for effective heat transfer.

The thermoelectric device 5920 has a first heat transfer surface 5924 and a second heat transfer surface 5926. In the depicted arrangement, the first heat transfer surface 5924 is a cooling surface 5924, and consequently, the second heat transfer surface 5926 is a waste heat surface 5926. The first heat transfer surface 5924 faces the seating surface 5922 to transfer heat from, and thereby cool, the seating surface 5922. According to some embodiments, discussed later, the heat transfer surfaces 5924, 5926 may be alternated.

As illustrated in FIG. 171, the thermoelectric device 5920 is installed in a cushion 5928 of the seat bottom assembly 5912. The thermoelectric device 5920 is concealed by a trim cover 5922 that conceals the cushion 5928 and the thermoelectric device 5920. The cooling surface 5924 may be installed for direct contact with a concealed, internal surface of the trim cover 5922. The trim cover 5922 may include conductive materials, such as mesh, ribbons, conductive foams, and the like for direct, conductive heat transfer. Likewise, if the cooling surface 5924 is oriented partially below the cushion 5928, the cushion 5928 may also employ thermally conductive foam or fibers for conductive heat transfer. Therefore, the thermoelectric device 5920 provides conductive cooling without relying on convection through the seat assembly 5910. The thermoelectric device 5920 may also include a bracket 5930 (FIGS. 172 and 173) for installation of the thermoelectric device to a secured position within the seat bottom assembly 5912 (FIG. 171).

According to some embodiments, the thermoelectric device 5920 is installed in the seatback assembly 5914. In some embodiments, the thermoelectric device 5920 is installed in the head restraint assembly 5916. In yet some embodiments, the thermoelectric device 5920 is installed in one or more armrests 5917, a leg rest 5919, or any contact surface within a vehicle interior.

Referring now to FIGS. 171-173, the heat transfer system 5918 also includes a liquid heat transfer system 5932 in fluid communication with the second heat transfer surface 5926 of the thermoelectric device 5920 to transfer heat to or from the second heat transfer surface 5926. The thermoelectric device 5920 generates significant waste heat at the second heat transfer surface 5926 in order to cool the cooling surface 5924. The liquid heat transfer system 5932 is employed to transfer the residual or waste heat form the second heat transfer surface 5926 of the thermoelectric device 5920.

A conductive plate 5934 is attached in direct conductive contact with the second heat transfer surface 5926 of the thermoelectric device 5920 to conduct heat from the thermoelectric device 5920. The conductive plate 5934 is formed from a thermally conductive material, such as copper. A manifold 5936 is attached to the conductive plate 5934 to convey a thermally conductive, heat transfer liquid along the conductive plate 5934. A pump 5938 is installed on the manifold 5936 to move the heat transfer liquid. The pump 5938 could be installed anywhere along the liquid heat transfer system 5932. Any thermally conductive fluid may be employed, such as water or coolant.

The manifold 5936 includes an inlet 5940 and an outlet 5942 for attaching tubing 5944 for conveying the heat transfer liquid in and out of the manifold 5936. The liquid heat transfer system 5932 includes a heat exchanger, such as a radiator 5946. The radiator 5946 includes an inlet 5948 and an outlet 5950 each connected to the tubing 5944 in fluid communication with the manifold 5936. Another fluid actuator, such as a fan 5952, is installed on the radiator 5946 to convey air across the radiator 5946 to transfer heat away from the radiator 5946.

During operation of the heat transfer system 5918, an electrical power source 5954 imparts a current through the thermoelectric device 5920, thereby cooling the cooling surface 5924. The power source 5954 is also utilized to operate the pump 5938 to pump the heat transfer liquid through the manifold 5936, out of the manifold outlet 5942, through the tubing 5944, into the radiator inlet 5948, through the radiator 5946, out of the radiator outlet 5950, through the other tubing 5944, into the manifold inlet 5940, and circulated back through the pump 5938 and the manifold 5936. This liquid circulation draws waste heat from the conductive plate 5934 and pumps the heated liquid to the radiator 5946. The power source 5954 also powers the fan 5952 to force air over the radiator 5946 to transfer heat away from the radiator 5946, thereby cooling the liquid. The cooled liquid is circulated back to the manifold 5936 to be heated again.

The tubing 5944 is utilized to space the radiator 5946 away from the thermoelectric device 5920 to remove heat from the area that is being cooled. The tubing 5944 is insulated to minimize heat loss at the cooled area.

The heat transfer system 5918 provides rapid and efficient thermoelectric cooling for seating, such as automotive seating 5910. The heat transfer system may also be employed in therapy devices, and any thermal comfort applications. The liquid heat transfer system 5932 pulls the waste heat away from the thermoelectric device 5920 to be dissipated by the radiator 5946 away from the cooling location. The liquid heat transfer system 5932 provides an efficient cooling of the thermoelectric device 5920 in comparison to convention cooling systems.

Various modifications can be made to the heat transfer system 5918 to adapt the system 5918 to various specifications and applications. For example, heat transfer rates at the radiator 5946 can be adjusted by adjusting the material, contact area, and size of the radiator 5946. Likewise, the fan 5952 can be adjusted by adjusting fan speed to balance heat dissipation and acoustic output of the fan 5952. The tubing 5944 can be adjusted by length and insulation material to direct the waste heat away from the cooling location and occupant. The pump 5938 can be adapted by changing the pump speed, size, and power to alter a time of contact of the heat transfer liquid within the manifold 5936. The heat transfer liquid can also be selected or changed to vary heat transfer by thermal conductivity properties of the liquid. The conductive plate 5934 can also be modified by material and size for a particular application. Variations for the thermoelectric device 5920 include changing power, voltage, and amperage to adjust the rate of heat transfer and cooling potential.

The radiator 5946 and fan 5952 may be located anywhere in the vehicle whereby the waste heat is removed from the cooling location. For example, and as depicted in FIG. 171, the radiator and fan 5952 may be positioned such that the waste heat is dissipated away from the seat assembly 5910. However, the radiator 5946 and fan 5952 may be oriented beneath the seat bottom assembly 5912 with the dissipated waste heat directed away from the cooling location and the occupant. According to some embodiments, the radiator 5946 and the fan 5952 may be oriented external from the vehicle interior to dissipate the waste heat external from the occupant environment.

Although one thermoelectric device 5920 is illustrated, any quantity of thermoelectric devices 5920 and conductive plates 5934 may be employed within the seat assembly 5910. Multiple thermoelectric devices 5920 may employ a common manifold 5936, or each thermoelectric device may have a dedicated manifold 5936 with dedicated tubing 5944 directed to a common radiator 5946. Multiple, smaller thermoelectric devices 5920 permit distributed cooling.

According to some embodiments, the thermoelectric device 5920 may be employed for heating the first heat transfer surface 5924, and consequently the occupant. The heating application may be provided by reversing the orientation of, or current through, the thermoelectric device 5920. In the heating application, the heat transfer liquid is cooled at the conductive plate 5934 and manifold 5936, thereby drawing waste cooling away from the thermoelectric device 5920 and then reheated at the radiator 5946.

In one or more embodiments, a system (e.g., 5918) comprises a thermoelectric device (e.g., 5920 such as an electrical device with high electrical conductivity, a low thermal conductivity, and a temperature difference across a material such as a conductive silicone or graphite interface) with a first heat transfer surface (e.g., 5924 such as a cooling surface) and a second heat transfer surface (e.g., 5926 such as a waste heat surface) adapted for installation in a seat assembly (e.g., 5910 such as for a vehicle, office chair, or comfort seat) with the first heat transfer surface (e.g., 5924 such as a cooling surface) oriented facing a seating surface (e.g., 5922 such as conductive materials, mesh, ribbons, conductive foams) to transfer heat to or from the seating surface (e.g., 5922 such as A-surface of trim cover including conductive materials, mesh, ribbons, conductive foams), and a liquid heat transfer system (e.g., 5932) in fluid communication with the second heat transfer surface (e.g., 5926 such as a waste heat surface) to transfer heat to or from the second heat transfer surface (e.g., 5926 such as a waste heat surface).

In various embodiments, the liquid heat transfer system (e.g., 5932) further comprises a conductor (e.g., 5934 such as a conductive plate) attached to the second heat transfer surface (e.g., 5926 such as a waste heat surface) to conduct heat to or from the second heat transfer surface (e.g., 5926 such as a waste heat surface), and the liquid heat transfer system (e.g., 5932) conveys liquid (e.g., thermally conductive liquid such as water, coolant, glycol, gel) along the conductor (e.g., 5934 such as a conductive plate) to transfer heat to or from the conductor (e.g., 5934 such as a conductive plate).

In some embodiments, the liquid heat transfer system (e.g., 5932) further comprises a heat exchanger (e.g., 5946 such as a radiator) to convey heat to or from the second heat transfer surface (e.g., 5926 such as a waste heat surface).

In one or more embodiments, the system (e.g., 5918) further comprises tubing (e.g., 5944) in fluid communication with the heat exchanger (e.g., 5946 such as a radiator) and the second heat transfer surface (e.g., 5926 such as a waste heat surface) to space the heat exchanger (e.g., 5946 such as a radiator) away from the second heat transfer surface (e.g., 5926 such as a waste heat surface).

In various embodiments, the system (e.g., 5918) further comprises insulation disposed about the tubing (e.g., 5944).

In some embodiments, the liquid heat transfer system (e.g., 5932) further comprises a pump to convey the liquid (e.g., thermally conductive liquid such as water, coolant, glycol, gel) through the heat exchanger (e.g., 5946 such as a radiator).

In one or more embodiments, the heat exchanger (e.g., 5946) further comprises a radiator.

In various embodiments, the system (e.g., 5918) further comprises a fluid actuator (e.g., 5952 such as a fan) in fluid communication with the heat exchanger (e.g., 5946 such as a radiator) to convey a fluid (e.g., a thermally conductive liquid such as water, coolant, glycol, gel) through the heat exchanger (e.g., 5946 such as a radiator) to transfer heat to or away from the heat exchanger (e.g., 5946 such as a radiator).

In some embodiments, the liquid heat transfer system (e.g., 5932) further comprises a thermally conductive liquid (e.g., water, coolant, glycol, gel).

In one or more embodiments, the thermally conductive liquid further comprises water or coolant.

In various embodiments, the system (e.g., 5918) further comprises a bracket (e.g., 5930) connected to the thermoelectric device (e.g., 5920 such as an electrical device with high electrical conductivity, a low thermal conductivity, and a temperature difference across a material such as a conductive silicone or graphite interface) and sized to be installed in the seat assembly (e.g., 5910 such as for a vehicle, office chair, or comfort seat) to support the thermoelectric device (e.g., 5920 such as an electrical device with high electrical conductivity, a low thermal conductivity, and a temperature difference across a material such as a conductive silicone or graphite interface) in the seat assembly (e.g., 5910 such as for a vehicle, office chair, or comfort seat).

In some embodiments, the thermoelectric device (e.g., 5920) further comprises a material with a high electrical conductivity, a low thermal conductivity, and a temperature difference across the material such as a conductive silicone or graphite interface in response to an induced thermoelectric voltage across the material (e.g., a conductive silicone or graphite interface).

In one or more embodiments, the material of the thermoelectric device (e.g., 5920) further comprises a conductive silicone or graphite.

In various embodiments, the system (e.g., 5918) further comprises a power source (e.g., 5954) in electrical communication with the thermoelectric device (e.g., 5920 such as an electrical device with high electrical conductivity, a low thermal conductivity, and a temperature difference across a material such as a conductive silicone or graphite interface) to cool the first heat transfer surface (e.g., 5924 such as a cooling surface).

In some embodiments, the system (e.g., 5918) further comprises a power source (e.g., 5954) in electrical communication with the thermoelectric device (e.g., 5920 such as an electrical device with high electrical conductivity, a low thermal conductivity, and a temperature difference across a material such as a conductive silicone or graphite interface) to heat the first heat transfer surface (e.g., 5924 such as a cooling surface).

In one or more embodiments, a seat assembly (e.g., 5910 such as for a vehicle, office chair, or comfort seat) comprises a seat bottom (e.g., 5912), a seat back (e.g., 5914), and the system (e.g., 5918).

In various embodiments, the liquid heat transfer system (e.g., 5932) further comprises a heat exchanger system (e.g., 5946 such as a radiator) to convey heat to or from the second heat transfer surface (e.g., 5926 such as a waste heat surface), and the heat exchanger (e.g., 5946 such as a radiator) is spaced apart from the first heat transfer surface (e.g., 5924 such as a cooling surface).

In some embodiments, a method (e.g., 6000) comprises pumping (i.e., step 6002) a liquid (e.g., water, coolant, glycol, gel) along a rear heat transfer surface (e.g., 5926 such as a waste heat surface) of a thermoelectric device (e.g., 5920 such as an electrical device with high electrical conductivity, a low thermal conductivity, and a temperature difference across a material such as a conductive silicone or graphite interface) with a forward heat transfer surface (e.g., 5924 such as a cooling surface) installed in a seat assembly (e.g., 5910 such as for a vehicle, office chair, or comfort seat) facing a seating surface (e.g., 5922 such as A-surface of trim cover including conductive materials, mesh, ribbons, conductive foams), and pumping (i.e., step 6004) the liquid (e.g., water coolant, glycol, gel) through a heat exchanger (e.g., 5946 such as a radiator) away from the thermoelectric device (e.g., 5920 such as an electrical device with high electrical conductivity, a low thermal conductivity, and a temperature difference across a material such as a conductive silicone or graphite interface).

In one or more embodiment, the method 6000 further comprises conducting (i.e., step 6006) electrical current through the thermoelectric device (e.g., 5920 such as an electrical device with high electrical conductivity, a low thermal conductivity, and a temperature difference across a material such as a conductive silicone or graphite interface) to heat or cool the forward heat transfer surface (e.g., 5924 such as a cooling surface).

In various embodiments, the method 6000 further comprises conveying (i.e., step 6008) a fluid (e.g., water, coolant, glycol, gel) across the heat exchanger (e.g., 5946 such as a radiator) to transfer heat to or away from the heat exchanger (e.g., 5946 such as a radiator).

FIG. 174 illustrates a therapy device referenced generally by numeral 6010. The therapy device 6010 is depicted including a therapeutic sleeve 6012. However, the therapy device 6010 may include any thermal comfort device for a user, such as a thermal therapy pad, a massager, a seat assembly, or the like.

The therapy device 6010 is illustrated in cooperation with a heat transfer system 6014. According to some embodiments, the heat transfer system 6014 is utilized to cool the therapeutic sleeve 6012. The heat transfer system 6014 includes two heat transfer subsystems 6016, 6018. The first heat transfer subsystem 6016 is utilized to cool the therapeutic sleeve 6012. The second heat transfer subsystem 6018 is utilized to dissipate waste heat generated in order to cool the therapeutic sleeve 6012.

The heat transfer system 6014 includes a thermoelectric device 6020. The thermoelectric device 6020 is an electrical device with high electrical conductivity, a low thermal conductivity, and a temperature difference across a material of the thermoelectric device 6020 in response to a thermoelectric voltage induced across the thermoelectric device 6020. The material of the thermoelectric device 6020 may include a conductive silicone or graphite interface for effective heat transfer.

The thermoelectric device 6020 has a first heat transfer surface 6022 and a second heat transfer surface 6024. In the depicted arrangement, the first heat transfer surface 6022 is a cooling surface 6022, and consequently, the second heat transfer surface 6024 is a waste heat surface 6024. The first heat transfer surface 6022 faces the first heat transfer subsystem 6016 to transfer heat from, and thereby cool, the therapeutic sleeve 6012. According to some embodiments, discussed later, the heat transfer surfaces 6022, 6024 may be alternated.

According to some embodiments, the heat transfer subsystem 6016 is a fluid heat transfer subsystem 6016. According to some embodiments, the heat transfer subsystem 6016 is a liquid heat transfer subsystem 6016. Referring now to FIGS. 174-176, the heat transfer subsystem 6016 includes a reservoir 6026 mounted directly to the first heat transfer surface 6022 of the thermoelectric device 6020. The reservoir 6026 retains a thermally conductive fluid in the heat transfer subsystem 6016. According to some embodiments, the thermally conductive fluid is water, coolant, glycol, gel, or the like. The reservoir 6026 includes an inlet 6028 and an outlet 6030 for ingress and egress of the fluid through the reservoir 6026.

As illustrated in FIGS. 174-175, the heat transfer subsystem 6016 also includes tubing 6032 in fluid communication with the inlet 6028 and outlet 6030 of the reservoir 6026 and the therapeutic sleeve 6012. A pump 6034 is installed in fluid communication with the heat transfer subsystem 6016, such as along the tubing 6032. The pump 6034 can be installed anywhere along the heat transfer subsystem 6016. The tubing 6032 is employed to space the therapeutic sleeve 6012 away from the thermoelectric device 6020, which generates a significant waste heat in order to cool the therapeutic sleeve 6012. Insulation is provided on the tubing 6032 to increase the efficiency of the first heat transfer subsystem 6016 and to minimize absorption of ambient heat to the liquid.

The therapeutic sleeve 6012 of FIG. 174 is a fluid bladder in fluid communication with the tubing 6032. The therapeutic sleeve 6012 includes a contact surface 6036 for contact with a user. A power source 6038 is depicted in FIG. 175 in electrical cooperation with the thermoelectric device 6020 for cooling the fluid. The power source 6038 is also in electrical cooperation with the pump 6034 for pumping the fluid.

The pump 6034 circulates the fluid in the first heat transfer subsystem 6016 to be cooled by the first heat transfer surface 6022 of the thermoelectric device 6020. The cooled liquid exits the outlet 6030 of the reservoir 6026, travels through the tubing 6032, and enters the therapeutic sleeve 6012. The cooled liquid applies a cooling thermal effect to the contact surface 6036, thereby absorbing heat from the user. The heated liquid is then pumped out of the therapeutic sleeve 6012, through the tubing 6032, and into the inlet 6028 of the reservoir 6026. In the reservoir 6026, the liquid is then cooled by the first heat transfer surface 6022, thereby continuing the cycle of cooling the therapeutic sleeve 6012.

Referring now to FIGS. 174-176, the second heat transfer subsystem 6018 is a conductive heat transfer subsystem 6018 according to some embodiments. The second heat transfer subsystem is a fluid heat transfer subsystem 6018 according to some embodiments. The second heat transfer subsystem 6018 is a liquid heat transfer subsystem 6018 according to yet some embodiments.

The second heat transfer subsystem 6018 includes a plurality of conductive pipes 6040 in conductive contact with the second heat transfer surface 6024 of the thermoelectric device 6020 to transfer heat to or from the second heat transfer surface 6024. The thermoelectric device 6020 generates significant waste heat at the second heat transfer surface 6024 in order to cool the cooling surface 6022. The second heat transfer subsystem 6018 is employed to transfer the residual or waste heat from the second heat transfer surface 6024 of the thermoelectric device 6020. The conductive pipes 6040 are formed from a thermally conductive material, such as copper.

The second heat transfer subsystem 6018 includes a heat exchanger, such as a radiator 6042, or as illustrated, a plurality of radiators 6042. The conductive pipes 6040 are in conductive contact with the radiators 6042 to transfer heat from the second heat transfer surface 6024 to the radiators 6042. A fluid actuator, such as a fan 6044, or a series of fans 6044, are installed on the radiators 6042 to convey air across the radiators 6042 to transfer heat away from the radiators 6042.

During operation of the second heat transfer subsystem 6018, the electrical power source 6038 imparts a current through the thermoelectric device 6020, thereby cooling the cooling surface 6022. The power source 6038 also powers the fans 6044 to force air over the radiators 6042 to transfer heat away from the radiators 6042, thereby cooling the radiators 6042. The radiators 6042 provide heat sinks for drawing the heat from the thermoelectric device 6020.

According to some embodiments, a fluid actuator, such as a fan may be provided in fluid communication with the pipes 6040 and the radiators 6042 to circulate air that is heated by the second heat transfer surface 6024 and cooled in the radiators 6042. According to yet some embodiments, a pump may be provided in fluid communication with the pipes 6040 and the radiators 6042 to pump a thermally conductive liquid that is heated by the second heat transfer surface 6024 and cooled in the radiators 6042.

The heat transfer system 6014 provides rapid and efficient thermoelectric cooling for therapy devices 6010. The first heat transfer subsystem 6016 pulls heat away from the therapeutic sleeve 6012 to be cooled by the thermoelectric device 6020 away from the therapeutic sleeve 6012. The liquid heat transfer subsystem 6016 provides an efficient cooling of the therapeutic sleeve 6012 from the thermoelectric device 6020 in comparison to conventional cooling systems.

Various modifications can be made to the heat transfer system 6014 to adapt the system 6014 to various specifications and applications. For example, heat transfer rates at the radiators 6042 can be adjusted by adjusting the material, quantity, contact area, and size of the radiators 6042. Likewise, the fans 6044 can be adjusted by adjusting fan speed, size and quantity, to balance heat dissipation and acoustic output of the fan 6044. The tubing 6032 can be adjusted by length and insulation material to avoid cooling loss from the cooling location and the user. The pump 6034 can be adapted by changing the pump speed, size, and power to alter a time of contact of the heat transfer liquid within the reservoir 6026. The heat transfer liquid can also be selected or changed to vary heat transfer by thermal conductivity properties of the liquid. The reservoir 6026 can also be modified by size for a particular application to affect how long or how much surface area, the liquid contacts of the thermoelectric device 6020. Variations for the thermoelectric device 6020 include changing power, voltage, and amperage to adjust the rate of heat transfer and cooling potential. The conductive pipes 6040 can be modified by material and size to balance cost and thermally conductive properties. Additionally, the tubing 6032 arrangement or configuration can be modified: for example, the tubing 6032 may be wound for a cooled seat, an arm band, or the like.

Although one thermoelectric device 6020 is illustrated, any quantity of thermoelectric devices 6020 may be employed with the therapy device 6010. Multiple, smaller thermoelectric devices 6020 permit distributed cooling.

According to some embodiments, the thermoelectric device 6020 may be employed for heating the first heat transfer surface 6022, and consequently the therapy device 6010. The heating application may be provided by reversing the orientation of, or current through, the thermoelectric device 6020. In the heating application, the heat transfer liquid is heated at the thermoelectric device 6020, thereby delivering heated fluid to the contact area 6036 of the therapy device. Cooling is consequently performed by drawing heat through the radiators 6042, and through the conductive pipes 6040 to the thermoelectric device 6020.

FIG. 177 illustrates a therapy device 6046 according to some embodiments. The therapy device 6046 is a fluid bladder 6046 sized to contact a user for thermal contact therapy. The fluid bladder 6046 includes tubing 6048 for fluid communication with the tubing 6032 of the first heat transfer subsystem 6016 to receive the cooled liquid for circulation through the fluid bladder 6046. The fluid bladder 6046 is sized to be oriented within a seat assembly 6050.

The seat assembly 6050 is depicted as a vehicle seat assembly 6050 for a land vehicle, aircraft, or watercraft. The vehicle seat assembly 6050 may be utilized in any seating row of a vehicle. The seat assembly 6050 may also be utilized as any seating assembly, such as an office chair 6050 or comfort seat 6050.

The seat assembly 6050 includes a seat bottom assembly 6052 for supporting a pelvic and thigh region of an occupant. The seat bottom assembly 6052 is adapted to be supported upon an underlying support surface. According to the vehicle seat assembly 6050 embodiment, the seat bottom assembly 6052 is adapted to be mounted to a vehicle floor. A seat back assembly 6054 extends upright from the seat bottom assembly 6052 to support a back and shoulders of the occupant. A head restraint assembly 6056 is supported above the seatback assembly 6054.

The therapy device 6046 is installed in a cushion 6058 of the seatback assembly 6054. The therapy device 6046 is concealed by a trim cover 60 that conceals the cushion 6058 and the therapy device 6046. The therapy device 6046 may be installed for direct contact with a concealed, internal surface of the trim cover 6060. The trim cover 6060 may include conductive materials, such as mesh, ribbons, conductive foams, and the like for direct, conductive heat transfer. Likewise, if the therapy device 6046 is oriented partially below the cushion 6058, the cushion 6058 may also employ thermally conductive foam or fibers for conductive heat transfer. Therefore, the thermoelectric device 6020 provides cooling without relying on convection through the seat assembly 6050.

For the seat assembly 6050, the second heat transfer subsystem 6018 is spaced apart from the therapy device 6046 to avoid discomfort, noise, and vibration at the therapy location. The second heat transfer subsystem 6018 can be installed beneath the seat bottom assembly 6052 or elsewhere on the vehicle, within the vehicle interior, or external of the passenger cabin.

According to some embodiments, the therapy device 6046 is installed in the seat bottom assembly 6052. In some embodiments, the therapy device 6046 is installed in the head restraint assembly 6056. In yet some embodiments, the therapy device 6046 is installed in one or more armrests 6062, a leg rest 6064, or any contact surface within a vehicle interior.

In one or more embodiments, a system (e.g., 6014) comprising a thermoelectric device (e.g., 6020 such as an electrical device with high electrical conductivity, a low thermal conductivity, and a temperature difference across a material such as a conductive silicone or graphite interface) with a first heat transfer surface (e.g., 6022 such as a cooling surface) and a second heat transfer surface (e.g., 6024 such as a waste heat surface) adapted for installation in a seat assembly (e.g., 6050 such as for a vehicle) with the first heat transfer surface (e.g., 6022 such as a cooling surface) oriented facing a seating surface (e.g., 6036) to transfer heat to or from the seating surface (e.g., 6036), and a fluid heat transfer system (e.g., 6018) in fluid communication with the second heat transfer surface (e.g. 6024 such as a waste heat surface) to transfer heat to or from the second heat transfer surface (e.g., 6024 such as a waste heat surface) such that and a fluid (e.g., water, coolant, glycol, gel) is not conveyed across the thermoelectric device (e.g., 6020 such as an electrical device with high electrical conductivity, a low thermal conductivity, and a temperature difference across a material such as a conductive silicone or graphite interface) and through the seating surface (e.g., 6036).

In some embodiments, a system (e.g., 6014) comprises a thermoelectric device (e.g., 6020 such as an electrical device with high electrical conductivity, a low thermal conductivity, and a temperature difference across a material such as a conductive silicone or graphite interface) with a first heat transfer surface (e.g., 6022 such as a cooling surface) and a second heat transfer surface (e.g., 6024 such as a waste heat surface) adapted for cooperation with a therapy device (e.g., 6010 such as a thermal comfort device, a therapeutic sleeve, a thermal therapy pad, a massager, a seat assembly) such that the first heat transfer surface (e.g., 6022 such as a cooling surface) is spaced apart from a contact surface (e.g., 6036) of the therapy device (e.g., 6010 such as a thermal comfort device, a therapeutic sleeve, a thermal therapy pad, a massager, a seat assembly) to transfer heat to or from the contact surface (e.g., 6036), and a fluid heat transfer system (e.g., 6018) in fluid communication with the thermoelectric device (e.g., 6020 such as an electrical device with high electrical conductivity, a low thermal conductivity, and a temperature difference across a material such as a conductive silicone or graphite interface) to transfer heat to or from the thermoelectric device (e.g., 6020 such as an electrical device with high electrical conductivity, a low thermal conductivity, and a temperature difference across a material such as a conductive silicone or graphite interface).

In one or more embodiments, the fluid heat transfer system (e.g., 6014) is further defined as a first fluid heat transfer system (e.g., 6016 such as to cool a therapeutic sleeve) in fluid communication with the first heat transfer surface (e.g., 6022 such as a cooling surface) to transfer heat to or from the contact surface (e.g., 6036) of the therapy device (e.g., 6010 such as a thermal comfort device, a therapeutic sleeve, a thermal therapy pad, a massager, a seat assembly).

In various embodiments, the first fluid heat transfer system (e.g., 6016 such as to cool the therapeutic sleeve) further comprises a fluid reservoir (e.g., 6026) in fluid communication with the first heat transfer surface (e.g., 6022 such as a cooling surface).

In some embodiments, the system (e.g., 6014) further comprises tubing (e.g., 6032) in fluid communication with the fluid reservoir (e.g., 6026) and the therapy device (e.g., 6010 such as a thermal comfort device, a therapeutic sleeve, a thermal therapy pad, a massager, a seat assembly) to space the thermoelectric device (e.g., 6020 such as an electrical device with high electrical conductivity, a low thermal conductivity, and a temperature difference across a material such as a conductive silicone or graphite interface) away from the therapy device (e.g., 6010 such as a thermal comfort device, a therapeutic sleeve, a thermal therapy pad, a massager, a seat assembly).

In one or more embodiments, the system (e.g., 6014) further comprises insulation disposed about the tubing (e.g., 6032).

In various embodiments, the system (e.g., 6014) further comprises a bladder (e.g., 6046) in fluid communication with the tubing (e.g., 6032), wherein the bladder (e.g., 6046) comprises the contact surface (e.g., 6036).

In some embodiments, the bladder (e.g., 6046) is sized to be oriented within a seat assembly (e.g., 6050 such as a vehicle seat).

In one or more embodiments, a seat assembly (e.g., 6050 such as a vehicle seat) comprises a seat bottom 6052, a seat back 6054, and the system (e.g., 6014).

In various embodiments, the bladder (e.g., 6046) is further defined as a sleeve (e.g., 6012).

In some embodiments, the first fluid heat transfer system (e.g., 6016 such as to cool the therapeutic sleeve) further comprises a pump (e.g., 6034) in fluid communication with the fluid reservoir (e.g., 6026) to pump (e.g., 6034) fluid (e.g., water, coolant, glycol, gel) from the fluid reservoir (e.g., 6026) to the contact surface (e.g., 6036).

In one or more embodiments, the system (e.g., 6014) further comprises a second fluid heat transfer system (e.g., 6018 such as to dissipate waste heat) in fluid communication with the second heat transfer surface (e.g., 6024 such as a waste heat surface) to transfer heat to or from the second heat transfer surface (e.g., 6024 such as a waste heat surface).

In various embodiments, the second fluid heat transfer system (e.g., 6018 such as to dissipate waste heat) further comprises a heat exchanger (e.g., 6042 such as a radiator) to convey heat to or from the second heat transfer surface (e.g., 6024 such as a waste heat surface).

In some embodiments, the system (e.g., 6014) further comprises conductive pipes (e.g., 6040) in conductive contact with the heat exchanger (e.g., 6042 such as a radiator) and the second heat transfer surface (e.g., 6024 such as a waste heat surface).

In one or more embodiments, the thermoelectric device (e.g., 6020) further comprises a material with a high electrical conductivity, a low thermal conductivity, and a temperature difference across the material in response to an induced thermoelectric voltage across the material such as a conductive silicone or graphite interface.

In various embodiments, the material of the thermoelectric device (e.g., 6020) further comprises a conductive silicone or graphite.

In some embodiments, the system (e.g., 6014) further comprises a power source (e.g., 6038) in electrical communication with the thermoelectric device (e.g., 6020 such as an electrical device with high electrical conductivity, a low thermal conductivity, and a temperature difference across a material such as a conductive silicone or graphite interface) to cool the first heat transfer surface (e.g., 6022 such as a cooling surface).

In one or more embodiments, the system (e.g., 6014) further comprises a power source (e.g., 6038) in electrical communication with the thermoelectric device (e.g., 6020 such as an electrical device with high electrical conductivity, a low thermal conductivity, and a temperature difference across a material such as a conductive silicone or graphite interface) to heat the first heat transfer surface (e.g., 6022 such as a cooling surface).

In various embodiments, the fluid heat transfer system (e.g., 6014) further comprises a thermally conductive liquid (e.g., water, coolant, glycol, gel).

In some embodiments, a method 6070 comprises pumping (i.e., step 6072) a liquid (e.g., water, coolant, glycol, gel) along a front heat transfer surface (e.g., 6022 such as a cooling surface) of a thermoelectric device (e.g., 6020 such as an electrical device with high electrical conductivity, a low thermal conductivity, and a temperature difference across a material such as a conductive silicone or graphite interface) with a rear heat transfer surface (e.g., 6024 such as a waste heat surface), and pumping (i.e., step 6074) the liquid (e.g., water, coolant, glycol, gel) through a therapy device (e.g., 6010 such as a thermal comfort device, a therapeutic sleeve, a thermal therapy pad, a massager, a seat assembly) with a contact surface (e.g., 6036), spaced apart from the thermoelectric device (e.g., 6020 such as an electrical device with high electrical conductivity, a low thermal conductivity, and a temperature difference across a material such as a conductive silicone or graphite interface).

In various embodiments, a system (e.g., 6014) comprises a therapy device (e.g., 6010 such as a thermal comfort device, a therapeutic sleeve, a thermal therapy pad, a massager, a seat assembly) with a contact surface (e.g., 6036), a thermoelectric device (e.g., 6020 such as an electrical device with high electrical conductivity, a low thermal conductivity, and a temperature difference across a material such as a conductive silicone or graphite interface) with a first heat transfer surface (e.g., 6022 such as a cooling surface) and a second heat transfer surface (e.g., 6024 such as a waste heat surface), a fluid reservoir (e.g., 6026) in fluid communication with the first heat transfer surface (e.g., 6022 such as a cooling surface), tubing (e.g., 6032) in fluid communication with the fluid reservoir (e.g., 6026) and the therapy device (e.g., 6010 such as a thermal comfort device, a therapeutic sleeve, a thermal therapy pad, a massager, a seat assembly) to space the thermoelectric device (e.g., 6020 such as an electrical device with high electrical conductivity, a low thermal conductivity, and a temperature difference across a material such as a conductive silicone or graphite interface) away from the therapy device (e.g., 6010 such as a thermal comfort device, a therapeutic sleeve, a thermal therapy pad, a massager, a seat assembly), and a pump (e.g., 6034) in fluid communication with the fluid reservoir (e.g., 6026) to pump fluid (e.g., water, coolant, glycol, gel) from the fluid reservoir (e.g., 6026) to the contact surface (e.g., 6036).

FIG. 178 illustrates a seat assembly 6100 according to some embodiments. The seat assembly 6100 may be a vehicle seat assembly for a land vehicle, watercraft, aircraft, or the like. Although a vehicle seat assembly 6100 is illustrated and disclosed, any seat assembly 6100 may be employed, such as an office chair, comfort chair, or the like.

The seat assembly 6100 includes a seat bottom 6102 for supporting a pelvis and thighs of an occupant. The seat bottom 6102 is supported upon an underlying support surface, such as a vehicle floor. A seat back 6104 extends in an upright direction from the seat bottom 6102 to support a back and shoulders of the occupant. The seat back 6104 may be supported by the seat bottom 6102 or the underlying support surface. A head restraint 6106 may also be provided upon the seat back 6104 to support a head of the occupant.

The seat assembly 6100 provides contact surfaces 6108, 6110 for receiving and comfortably supporting the occupant. The seat assembly 6100 includes a plurality of actuators 6112-6126 provided within the seat assembly 6100 within the contact surfaces 6108, 6110. Although eight actuators 6112-6126 are illustrated and described, any number or location of actuators may be employed. The actuators 6112-6126 may be utilized to impart a tactile effect upon the occupant, such as pressure for imparting a pressurized massage effect, or the like.

In the depicted embodiment, the actuators 6112-6126 are fluid bladders such as air bladders for imparting a pressurized massage effect to the occupant. FIG. 179 illustrates a representative actuator assembly 6112 for the seat assembly 6100 according to some embodiments. The actuator assembly 6112 is illustrated schematically and may be installed within the seat assembly 6100. Actuator assembly 6112 includes an air inlet tube 6130 and an air outlet tube 6132. A flap 6134 permits air to flow into the actuator from inlet tube 6130 but prevents air from flowing out through inlet tube 6130.

FIG. 180 is a schematic diagram for a pneumatic network configured to distribute pressurized air from a pressure source, such as air pump 6140, to any one of the eight pneumatic actuators 6112-6126 based on three electrical signals. For this purpose, multiple pneumatic actuators which are configured to operate in unison because their inlet tubes and outlet tubes are connected to the same pneumatic lines should be regarded as a single pneumatic actuator. A person of skill in the art will modify this schematic to distribute pressurized air to any one of up to $2^N$ actuators based on N electrical signals. For example, four actuators can be controlled based on two electrical signals and sixteen actuators could be controlled based on four electrical signals.

The network of FIG. 180 utilizes three binary electrical signals labelled A, B, and C. Each electrical signal has an ON state and an OFF state. The ON state and the OFF state may each be represented physically by direct currents or voltages, alternating currents or voltages, an absence of current or voltage, or other electrically measurable property. For Example, the ON state could be represented by a direct current in one direction and the OFF state could be represented by an absence of current or a direct current in the opposite direction. Alternatively, the ON state could be represented by an absence of current and the OFF state by the presence of a direct or alternating current.

The network of FIG. 180 utilizes three signal valves 6150, 6152, and 6154 corresponding to electrical signals A, B, and C respectively. A signal valve is a valve that transmits pressurized air from a pressure source to a signal line when and only when the corresponding electrical signal is in an ON state. When the corresponding electrical signal is in the OFF state, the signal line is not pressurized by the valve. Unless otherwise stated, an output line not being pressurized by a valve means that air is not currently routed to the line via the valve. The output line not being pressurized by the valve does not always imply that the pressure in the line immediately drops to ambient pressure. Pressurized air may be routed into the line from another source. The line may hold pressure that was routed to it earlier. The pressure may decay toward ambient pressure due to leakage. In some instances, the line may be actively vented to ambient.

FIGS. 181 and 182 illustrate an exemplary signal valve for an electrical signal X. FIG. 181 shows the valve when the electrical signal X is in the ON state whereas FIG. 182 shows the valve when the electrical signal X is in the OFF state. The valve includes a body 6160 with a bore. A spool 6162 slides within the bore. The spool has two lands which are sealed against the inside walls of the bore. An input port 6164 and an output port 6166 penetrate the body at particular axial locations. Input port 6164 is connected to a pressure source, such as pump 6140. Output port 6166 is connected to a signal line. A spring 6168 biases the spool towards a default (off) position. When the electrical signal is in the ON state, as shown in FIG. 181, a force $F_X$ overcomes the spring force and pushes the spool to the right. In this position, the input port 6164 and the output port 6166 are fluidly connected between the lands of the spool, such that pressurized air from the pressure source is routed to the signal line. When the electrical signal is in the OFF state, as shown in FIG. 182, the force is removed and the spring pushes the spool to the left. In this position, the output port 6166 is blocked from the input port 6164.

Returning to FIG. 180, the network utilizes three NOT-type valves 6170, 6172, and 6174 corresponding to electrical signals A, B, and C respectively. A NOT-type valve is a valve that transmits pressurized air from a pressure source to a signal line when and only when an input line is not pressurized. FIGS. 183 and 184 illustrate an exemplary NOT-type valve associated with input signal line X. FIG. 183 shows the valve when signal line X is pressurized whereas FIG. 184 shows the valve when signal line X is not pressurized. The valve includes a body 6180 with a bore. A spool 6182 slides within the bore. The spool has two lands which are sealed against the inside walls of the bore. An input port 6184 and an output port 6186 penetrate the body at particular axial locations. Signal port 6188 penetrates the body at one end. Input port 6184 is connected to a pressure source, such as pump 6140. Output port 6186 is connected to the output signal line. Signal port 6188 is connected to the input signal line. A spring 6190 biases the spool towards a default position. When the input signal line is pressurized, as shown in FIG. 183, the pressure overcomes the spring force and pushes the spool to the right. In this position, the output port 6186 is blocked from the input port 6184. When the input signal line is not pressurized, as shown in FIG. 184, the spring pushes the spool to the left. In this position, the input port 6184 and the output port 6186 are fluidly connected between the lands of the spool, such that pressurized air from the pressure source is routed to the output signal line.

The combinations of signal valves and NOT-type valves create two mutually exclusive signal lines corresponding to each electrical signal. As long as the pressure source is operating and there is some leakage or other air flow path out of the signal lines, one of the signal lines will be pressurized and the other not pressurized based on the state of the electrical signal. If the leakage is small, then it may take some period of time to reach the new pressure state after a change in the state of the electrical signal as the pressure in the previously pressurized line decays.

Returning to FIG. 180, the network utilizes twelve AND-type valves 6200-6222 to route air from the six signal lines to one of the actuators 6112-6126. An AND-type valves is a valve that routes air to an output line when and only when both of the two input lines are pressurized. FIG. 185 illustrates an exemplary AND-type valve associated with input signal lines X and Y. The valve has a body 6230 and a spool 6232 which moves axially within a bore of the body. End plates 6234 attached to the spool seal against seats 6236 attached to the body when the spool is at a corresponding extreme of its motion. Input ports 6238 and 6239 are axially located on the outboard sides of the seats. Output port 6240 is axially located between the seats. If input X is pressurized and Y is unpressurized, the spool moves to the position shown FIG. 185. The pressurized air in line X is blocked from reaching output port 6240. Input port 6239 is fluidly connected to output port 6240, but since Y is unpressurized, the output is unpressurized. When X is unpressurized and Y is pressurized, the spool moves left, blocking input port 6239 from output port 6240 and fluidly connecting input port 6238 to output port 6240. When X and Y are in the same condition as one another, either both unpressurized or both pressurized, then the position of spool 6232 is indeterminate. However, at least one of the inputs will be fluidly connected to the output port. Thus, output port 6240 is pressurized by this valve when and only when both X and Y are pressurized.

Returning to FIG. 180, the AND-type valve in the first column of AND-type valves, 6202-6206, combine one of the A and the Not (A) signal lines with one of the B and Not (B) signal lines. The outputs of each of these AND-types valves in the first column is fed into two AND-type valves in the second column. The other input of the AND-type valve in the second column is either the C or the Not (C) signal line. Exactly one of the AND-type valves in the first column will have a pressurized output and exactly one of the AND-type valves in the second column will have a pressurized output. All other outputs will be unpressurized after a sufficient decay time.

The volume of the lines and the valves is relatively small compared to the volume of the actuators. A few intentional controlled leakage points strategically located in the network are sufficient to ensure that the pressure quickly decays in the lines once air is no longer being routed to those lines from the pressure source. The total leakage rate can be small relative to the flow available from the pressure source such that the pressure source has no trouble keeping lines pressurized. However, leakage by itself may not deflate the actuators in an acceptable amount of time. Therefore, a scheme for purposely venting actuators that are not commanded to be inflated is beneficial.

The column of NOT-type valves 6224-6238 actively vent the unselected actuators. Each of these valves may be structured like the valves of FIGS. 183 and 184. The actuator inlet tube is connected to signal port 6188. The actuator outlet tube is connected to 6184. Output port 6186 is vented to ambient. When the actuator is selected using the electrical signals, the valve is in the state illustrated in FIG. 183. In this state, the actuator outlet tube is sealed off such that the actuator may be inflated. When the actuator is not selected using the electrical signals, the valve is in the state illustrated in FIG. 184. In this state, the actuator outlet tube is vented such that the actuator quickly deflates.

FIGS. 186 and 187 illustrate a valve that combines the functions of the signal valve of FIGS. 181 and 182, the NOT-type valve of FIGS. 183 and 184, and also provides venting of the unselected signal line. FIG. 186 shows the valve when electrical signal is in the ON state whereas FIG. 187 shows the valve when electrical signal X is in the OFF state. The valve includes a body 6241 with a bore. A spool 6242 slides within the bore. The spool has three lands which are sealed against the inside walls of the bore. Input port 6244, vent ports 6246 and 6248, and output signal ports 6250 and 6252 penetrate the body at particular axial locations. Input port 6244 is connected to a pressure source, such as pump 6140. First output port 6250 is connected to a first signal line and second output port 6252 is connected to a second signal line. Vent ports 6246 and 6248 are vented to ambient. A spring 6254 biases the spool towards a default (off) position. When the electrical signal is in the ON state, as shown in FIG. 186, a force $F_X$ overcomes the spring force and pushes the spool to the right. In this position, the first output port 6250 is fluidly connected to the input port 6244 such that pressurized air may be routed to the first signal line. The second output port 6252 is vented via the second vent port 6248. When the electrical signal is in the OFF state, as shown in FIG. 187, the force is removed and the spring pushes the spool to the left. In this position, the second output port 6252 is fluidly connected to the input port 6244 such that pressurized air may be routed to the second signal line. The first output port 6250 is vented via the first vent port 6246.

FIG. 188 is a schematic diagram for a second pneumatic network configured to distribute pressurized air from a pressure source, such as air pump 6140, to any one of the eight pneumatic actuators 6112-6126 based on three electrical signals. Instead of the three signal valves and three NOT-type valves of the network of FIG. 180, the network of FIG. 188 utilizes three valves 6260, 6262, and 6264 of the type illustrated in FIGS. 186 and 187. Since these valves provide venting of the signal lines, the column of NOT-type valves 6224-6238 of the network of FIG. 180 are not required. The actuators in the network of FIG. 188 have a single tube which does not include a check valve. When electrical signals change such that an actuator becomes unselected, air from the previously selected actuator flows through the network of AND-type gates to one or more unselected signal lines and then through one of more of the signal valves 6260-6264 to vent.

FIG. 189 illustrates a valves similar to the type illustrated in FIGS. 186 and 187. Valves can be combined as long as the same signal is used to move the spool for the two valves. The signal may be an electrical signal, as illustrated in FIGS. 186 and 187, or may be a signal line as illustrated in FIG. 189. As illustrated in FIG. 189, the spool moves to the right when signal line Y is pressurized and moves to the left when Not (Y) (indicated using bar notation) is pressurized. Body 6241' and spool 6242' are lengthened relative to the valve of FIGS. 186 and 187. Spool 6242' has five lands instead of the three of FIGS. 186 and 187. Additional input port 6270, additional vent port 9272 and additional output ports 6274 and 9276 are added. Input port 6270 may be connected to a different line than input port 6244. In the state illustrated, output port 6250 is fluidly connected to signal line X via input port 6244, output port 6252 is vented via vent port 6248, output port 6274 is fluidly connected to signal line Not (X) via input port 6270, and output port 6276 is vented via vent port 6272. In the opposite state (not illustrated), output port 6250 is vented via vent port 6246, output port 6252 is fluidly connected to signal line X via input port 6244, output port 6274 is vented via vent port 6248, and output port 6276 is fluidly connected to signal line Not (X) via input port 6270. In theory, any number of valves can be combined as long as they utilize the same signal. However, there may be practical limits based on the physical length of the bore and the spool.

FIG. 190 illustrates a third network configured to distribute pressurized air from a pressure source, such as air pump 6140, to any one of the eight pneumatic actuators 6112-6126 based on three electrical signals. The hierarchy of AND-type valves have been replaced with a hierarchy of valves of the type illustrated in FIG. 189. Valves 6260 and 6264 are of the type illustrated in FIGS. 186 and 187. Valve 6290 is similar to that illustrated in FIG. 189 except that the spool is positioned according to electrical signal B, such as by a solenoid. The two inputs to valve 6290 are the signal lines corresponding to electrical signal A. The four outputs of valve 6290 correspond to the four possible combinations of the states of electrical signals A and B. Two of these combined signal lines are fed to valve 6292 while the other two are fed to valve 6294. The spools of valves 6292 and 6294 are positioned based on signal lines corresponding to the states of electrical signal C. When an actuator is unselected, air is routed from the actuator back to a vent port of one of the valves.

An assembly (e.g., seat assembly 6100) is described with a first number of pneumatic massage actuators (e.g., actuators 6112, 6114, 6116, 6118, 6120, 6122, 6124, 6126) and an air pump (e.g., air pump 6140). One of a plurality of the massage actuators may be attached to a seat cushion. The massage actuators may impart a tactile effect upon the occupant, such as a vibration for conveying an alert, vibration for imparting a massage, pressure for imparting a pressurized massage effect, and may be fluid bladders, such as air bladders, such as lumbar bladders, bolster bladders, and/or shoulder bladders. A pneumatic valve network (e.g., pneumatic network of FIG. 180) distributes air from the air pump (e.g., air pump 6140) to any one of the pneumatic massage actuators (e.g., actuators 6112, 6114, 6116, 6118, 6120, 6122, 6124, 6126), the one pneumatic massage actuator (e.g., actuators 6112, 6114, 6116, 6118, 6120, 6122, 6124, 6126) selected based on states of a second number of binary electrical signals, wherein no air from the air pump (e.g., air pump 6140) is routed to any of the actuators (e.g., actuators 6112, 6114, 6116, 6118, 6120, 6122, 6124, 6126) of the first number of pneumatic actuators (e.g., actuators 6112, 6114, 6116, 6118, 6120, 6122, 6124, 6126) except the one selected pneumatic actuator (e.g., actuators 6112, 6114, 6116, 6118, 6120, 6122, 6124, 6126), and the first number exceeds the second number. The valves may be spring-loaded spools with lands, formed from a lightweight and resilient material such as a polymeric material, such as polypropylene and may be reinforced with fiberglass, or formed from an aluminum alloy. The valves may include a beam extending from a valve body generally parallel with the valve body. The beam may be formed integral with the spring. The beam may have a first thickness. The beam may include a plurality of lateral projections extending outwardly from the beam and received in slots in a housing formed from a lightweight and structurally resilient material such as a polymeric material, or a lightweight metallic alloy, with gaskets, covers, fasteners, laser welded, friction welded, or glued, to prevent axial translation of the beam, and the slots may be slightly tapered so that as the projections are installed into the slots. The beam may be positioned gradually toward the first port to slightly compress and preload the spring. The projection may extend toward the valve body and provide an alignment spacer between the valve body and the beam to maintain the valve body in alignment with the path of translation toward and away from the first port. The valve may include a valve stem and valve end and may be sealed at three axial locations against an interior surface of a bore. The valve network may include at least the first number of AND-type valves, the second number of signal valve assemblies, each signal valve assembly to route air from a pressure source to a first signal line when and only when a corresponding binary electrical signal is in an ON state and to route air from the pressure source to a second signal line when and only when the corresponding binary electrical signal is in an OFF state, each of the signal valve assemblies may each comprise a single output signal valve to route air from a pressure source to the first signal line when and only when the corresponding binary electrical signal is in an ON state, a NOT-type valve to route air from the pressure source to the second signal line when and only when the first signal line is unpressurized, each may utilize a single spool in a single bore to route air to either the first signal line or the second signal line, each may further vent the first signal line when and only when the corresponding binary electrical signal is in the OFF state and vent the second signal line when and only when the corresponding binary electrical signal is in the ON state, the first number of NOT-type valves, and each NOT-type valve may vent a corresponding one of the pneumatic massage actuators in response to an input line of the corresponding pneumatic massage actuator being unpressurized. The pneumatic valve network may distribute air from the air pump to any one of the pneumatic massage actuators and only to that subset, the subset may be selected based on states of a second number of binary electrical signals wherein the first number exceeds the second number, and may vent air from all of the pneumatic massage actuator not in the selected subset. The second number may exceed two raised to the power of one less than the first number, and the second number may be equal to two raised to the power of the first number.

In some embodiments, the second number exceeds two raised to the power of one less than the first number.

In some embodiments, the second number is equal to two raised to the power of the first number.

In some embodiments, the pneumatic valve network (e.g., pneumatic network of FIG. 180) comprises: at least the first number of AND-type valves (e.g., AND-type valves 6200-6222). The second number of signal valve assemblies (e.g., signal valves 6150, 6152, 6154, 6260, 6262, 6264) each route air from a pressure source (e.g., air pump 6140) to a first signal line when and only when a corresponding binary electrical signal is in an ON state and to route air from the pressure source (e.g., air pump 6140) to a second signal line when and only when the corresponding binary electrical signal is in an OFF state. The signal valve assemblies may each comprise a single output signal valve to route air from a pressure source to the first signal line when and only when the corresponding binary electrical signal is in an ON state, and a NOT-type valve may route air from the pressure source to the second signal line when and only when the first signal line is unpressurized, wherein the signal valve assemblies may each utilize a single spool in a single bore to route air to either the first signal line or the second signal line each further vent the first signal line when and only when the corresponding binary electrical signal is in the OFF state and vent the second signal line when and only when the corresponding binary electrical signal is in the ON state.

In some embodiments, each of the signal valve assemblies (e.g., signal valves 6150, 6152, 6154, 6260, 6262, 6264) comprises: a single output signal valve (e.g., signal valve 6150, 6152, 6154, 6260, 6262, 6264) to route air from a pressure source (e.g., air pump 6140) to the first signal line when and only when the corresponding binary electrical signal is in an ON state. A NOT-type valve (e.g., NOT-type valves 6170, 6172, 6174, 6224-6238) routes air from the pressure source (e.g., air pump 6140) to the second signal line when and only when the first signal line is unpressurized.

In some embodiments, the signal valve assemblies (e.g., signal valves 6150, 6152, 6154, 6260, 6262, 6264) each utilize a single spool (e.g., spool 6162, 6182, 6232, 6242, 6242') in a single bore to route air to either the first signal line or the second signal line. Each signal line may further vent the first signal line when and only when the corresponding binary electrical signal is in the OFF state and vent the second signal line when and only when the corresponding binary electrical signal is in the ON state.

In some embodiments, the signal valve assemblies (e.g., signal valves 6150, 6152, 6154, 6260, 6262, 6264) each further vent the first signal line when and only when the corresponding binary electrical signal is in the OFF state and vent the second signal line when and only when the corresponding binary electrical signal is in the ON state.

In some embodiments, each of the first number of NOT-type valves (e.g., NOT-type valves 6170, 6172, 6174, 6224-6238) vent a corresponding one of the pneumatic massage actuators (e.g., actuators 6112, 6114, 6116, 6118, 6120, 6122, 6124, 6126) in response to an input line of the corresponding pneumatic massage actuator (e.g., actuators 6112, 6114, 6116, 6118, 6120, 6122, 6124, 6126) being unpressurized.

An assembly (e.g., seat assembly 6100) is described with a first number of pneumatic massage actuators (e.g., actuators 6112, 6114, 6116, 6118, 6120, 6122, 6124, 6126) and an air pump (e.g., air pump 6140). One of a plurality of the massage actuators may be attached to a seat cushion. The massage actuators may impart a tactile effect upon the occupant, such as a vibration for conveying an alert, vibration for imparting a massage, pressure for imparting a pressurized massage effect, and may be fluid bladders, such as air bladders, such as lumbar bladders, bolster bladders, and/or shoulder bladders. A pneumatic valve network (e.g., pneumatic network of FIG. 180) distributes air from the air pump (e.g., air pump 6140) to various subsets of the pneumatic massage actuators (e.g., actuators 6112, 6114, 6116, 6118, 6120, 6122, 6124, 6126) and only to that subset, the subset selected based on states of a second number of binary electrical signals wherein the first number exceeds the second number, and the first number of NOT-type valves (e.g., NOT-type valves 6170, 6172, 6174, 6224-6238), each NOT-type valve (e.g., NOT-type valves 6170, 6172, 6174, 6224-6238) to vent a corresponding one of the pneumatic massage actuators (e.g., actuators 6112, 6114, 6116, 6118, 6120, 6122, 6124, 6126) in response to an input line of the corresponding pneumatic massage actuator (e.g., actuators 6112, 6114, 6116, 6118, 6120, 6122, 6124, 6126) being unpressurized. The valves may be spring-loaded spools with lands, formed from a lightweight and resilient material such as a polymeric material, such as polypropylene and may be reinforced with fiberglass, or formed from an aluminum alloy. The valves may include a beam extending from a valve body generally parallel with the valve body. The beam may be formed integral with the spring. The beam may have a first thickness. The beam may include a plurality of lateral projections extending outwardly from the beam and received in slots in a housing formed from a lightweight and structurally resilient material such as a polymeric material, or a lightweight metallic alloy, with gaskets, covers, fasteners, laser welded, friction welded, or glued, to prevent axial translation of the beam, and the slots may be slightly tapered so that as the projections are installed into the slots. The beam may be positioned gradually toward the first port to slightly compress and preload the spring. The projection may extend toward the valve body and provide an alignment spacer between the valve body and the beam to maintain the valve body in alignment with the path of translation toward and away from the first port. The valve may include a valve stem and valve end and may be sealed at three axial locations against an interior surface of a bore. The valve network may include at least the first number of AND-type valves, the second number of signal valve assemblies, each signal valve assembly to route air from a pressure source to a first signal line when and only when a corresponding binary electrical signal is in an ON state and to route air from the pressure source to a second signal line when and only when the corresponding binary electrical signal is in an OFF state, each of the signal valve assemblies may each comprise a single output signal valve to route air from a pressure source to the first signal line when and only when the corresponding binary electrical signal is in an ON state, a NOT-type valve to route air from the pressure source to the second signal line when and only when the first signal line is unpressurized, each may utilize a single spool in a single bore to route air to either the first signal line or the second signal line, each may further vent the first signal line when and only when the corresponding binary electrical signal is in the OFF state and vent the second signal line when and only when the corresponding binary electrical signal is in the ON state, the first number of NOT-type valves, and each NOT-type valve may vent a corresponding one of the pneumatic massage actuators in response to an input line of the corresponding pneumatic massage actuator being unpressurized. The second number may exceed two raised to the power of one less than the first number, and the second number may be equal to two raised to the power of the first number. The one pneumatic massage actuator may be selected based on states of a second number of binary electrical signals, wherein no air from the air pump is routed to any of the actuators of the first number of pneumatic actuators except the one selected pneumatic actuator, or to vent air from all of the pneumatic massage actuator not in the selected subset.

In some embodiments, the second number exceeds two raised to the power of one less than the first number.

In some embodiments, the second number is equal to two raised to the power of the first number.

In some embodiments, the pneumatic valve network (e.g., pneumatic network of FIG. 180) comprises: at least the first number of AND-type valves (e.g., AND-type valves 6200-6222). The second number of signal valve assemblies (e.g., signal valves 6150, 6152, 6154, 6260, 6262, 6264) each route air from a pressure source (e.g., air pump 6140) to a first signal line when and only when a corresponding binary electrical signal is in an ON state and to route air from the pressure source (e.g., air pump 6140) to a second signal line when and only when the corresponding binary electrical signal is in an OFF state.

In some embodiments, each of the signal valve assemblies (e.g., signal valves 6150, 6152, 6154, 6260, 6262, 6264) comprises: a single output signal valve (e.g., signal valve 6150, 6152, 6154, 6260, 6262, 6264) to route air from a pressure source (e.g., air pump 6140) to the first signal line when and only when the corresponding binary electrical signal is in an ON state. A NOT-type valve (e.g., NOT-type valves 6170, 6172, 6174, 6224-6238) routes air from the pressure source (e.g., air pump 6140) to the second signal line when and only when the first signal line is unpressurized.

In some embodiments, the signal valve assemblies (e.g., signal valves 6150, 6152, 6154, 6260, 6262, 6264) each utilize a single spool (e.g., spool 6162, 6182, 6232, 6242, 6242') in a single bore to route air to either the first signal line or the second signal line. Each signal line may further vent the first signal line when and only when the corresponding binary electrical signal is in the OFF state and vent the second signal line when and only when the corresponding binary electrical signal is in the ON state.

In some embodiments, each of the various subsets of the pneumatic massage actuators (e.g., actuators 6112, 6114, 6116, 6118, 6120, 6122, 6124, 6126) includes exactly one pneumatic massage actuator (e.g., actuators 6112, 6114, 6116, 6118, 6120, 6122, 6124, 6126).

An assembly (e.g., seat assembly 6100) is described with a first number of pneumatic massage actuators (e.g., actuators 6112, 6114, 6116, 6118, 6120, 6122, 6124, 6126) and an air pump (e.g., air pump 6140). One of a plurality of the massage actuators may be attached to a seat cushion. The massage actuators may impart a tactile effect upon the occupant, such as a vibration for conveying an alert, vibration for imparting a massage, pressure for imparting a pressurized massage effect, and may be fluid bladders, such as air bladders, such as lumbar bladders, bolster bladders, and/or shoulder bladders. A pneumatic valve network (e.g., pneumatic network of FIG. 180) distributes air from the air pump (e.g., air pump 6140) to various subsets of the pneumatic massage actuators (e.g., actuators 6112, 6114, 6116, 6118, 6120, 6122, 6124, 6126) and only to that subset, the subset selected based on states of a second number of binary electrical signals wherein the first number exceeds the second number, and vents air from all of the pneumatic massage actuators (e.g., actuators 6112, 6114, 6116, 6118, 6120, 6122, 6124, 6126) not in the selected subset. The valves may be spring-loaded spools with lands, formed from a lightweight and resilient material such as a polymeric material, such as polypropylene and may be reinforced with fiberglass, or formed from an aluminum alloy. The valves may include a beam extending from a valve body generally parallel with the valve body. The beam may be formed integral with the spring. The beam may have a first thickness. The beam may include a plurality of lateral projections extending outwardly from the beam and received in slots in a housing formed from a lightweight and structurally resilient material such as a polymeric material, or a lightweight metallic alloy, with gaskets, covers, fasteners, laser welded, friction welded, or glued, to prevent axial translation of the beam, and the slots may be slightly tapered so that as the projections are installed into the slots. The beam may be positioned gradually toward the first port to slightly compress and preload the spring. The projection may extend toward the valve body and provide an alignment spacer between the valve body and the beam to maintain the valve body in alignment with the path of translation toward and away from the first port. The valve may include a valve stem and valve end and may be scaled at three axial locations against an interior surface of a bore. The valve network may include at least the first number of AND-type valves, the second number of signal valve assemblies, each signal valve assembly to route air from a pressure source to a first signal line when and only when a corresponding binary electrical signal is in an ON state and to route air from the pressure source to a second signal line when and only when the corresponding binary electrical signal is in an OFF state, each of the signal valve assemblies may each comprise a single output signal valve to route air from a pressure source to the first signal line when and only when the corresponding binary electrical signal is in an ON state, a NOT-type valve to route air from the pressure source to the second signal line when and only when the first signal line is unpressurized, each may utilize a single spool in a single bore to route air to either the first signal line or the second signal line, each may further vent the first signal line when and only when the corresponding binary electrical signal is in the OFF state and vent the second signal line when and only when the corresponding binary electrical signal is in the ON state, the first number of NOT-type valves, and each NOT-type valve may vent a corresponding one of the pneumatic massage actuators in response to an input line of the corresponding pneumatic massage actuator being unpressurized. Each of the various subsets of the pneumatic massage actuators may include exactly one pneumatic massage actuator. The second number may exceed two raised to the power of one less than the first number, and the second number may be equal to two raised to the power of the first number.

In some embodiments, the second number exceeds two raised to the power of one less than the first number.

In some embodiments, the second number is equal to two raised to the power of the first number.

In some embodiments, each of the various subsets of the pneumatic massage actuators (e.g., actuators 6112, 6114, 6116, 6118, 6120, 6122, 6124, 6126) includes exactly one pneumatic massage actuator (e.g., actuators 6112, 6114, 6116, 6118, 6120, 6122, 6124, 6126).

FIG. 191 illustrates a seat assembly 6300 according to some embodiments. The seat assembly 6300 may be a vehicle seat assembly for a land vehicle, watercraft, aircraft, or the like. Although a vehicle seat assembly 6300 is illustrated and disclosed, any seat assembly 6300 may be employed, such as an office chair, comfort chair, or the like.

The seat assembly 6300 includes a seat bottom 6302 for supporting a pelvis and thighs of an occupant. The seat bottom 6302 is supported upon an underlying support surface, such as a vehicle floor. A seat back 6304 extends in an upright direction from the seat bottom 6302 to support a back and shoulders of the occupant. The seat back 6304 may be supported by the seat bottom 6302 or the underlying support surface. A head restraint 6306 may also be provided upon the seat back 6304 to support a head of the occupant.

The seat assembly 6300 provides contact surfaces 6308, 6310 for receiving and comfortably supporting the occupant. The seat assembly 6300 includes a plurality of actuators 6312 provided within the seat assembly 6300 within the contact surfaces 6308, 6310. Although two actuators 6312 are illustrated and described, any number or location of actuators 6312 may be employed. The actuators 6312 may be utilized to impart a tactile effect upon the occupant, such as a vibration for conveying an alert, vibration for imparting a massage, pressure for imparting a pressurized massage effect, or the like. In the depicted embodiment, the actuators 6312 are fluid bladders 6312, such as air bladders for imparting a pressurized massage effect to the occupant.

FIGS. 192-194 illustrates a pneumatic system configured to inflate and deflate one of the actuators 6312 based on an electrical signal from a controller. The pneumatic system utilizes a three-position valve 6320. The valve is shown in a neutral position in FIG. 192, in an inflation position in FIG. 193, and in a deflation position in FIG. 194.

Valve 6320 includes a spool 6322 which moves axially within a bore of the valve. The spool 6322 is sealed at three axial locations against an interior surface of the bore. Several ports penetrate the bore at different axial positions, including vent port 6324, pressure port 6326, and outlet ports 6328 and 6330. In alternative embodiments, vent port 6324 and outlet port 6330 may penetrate the end of the bore as opposed to the side. Two compression springs 6332 and 6334 bias the spool 6322 toward the neutral position of FIG. 192. In alternative embodiments, a single compression/tension spring on one side may have a free length which biases the spool 6322 to this position. Pressure port 6326 is fluidly connected to an air pump 6336. Outlet ports 6328 and 6330 are fluidly connected to actuator 6312 by a tube 6338. Vent port 6324 is fluidly connected to the environment.

In the position shown in FIG. 192, neither outlet port 6328 nor 6330 is fluidly connected to either the vent port 6324 or to pressure port 6326. In this condition, the actuator remains in its present condition of inflation. In other words, if the actuator is inflated, it remains inflated. If the actuator is presently deflated, it remains deflated.

FIG. 193 illustrates the valve in the inflation position. A solenoid integrated into the body of valve 6320 exerts a leftward force F, compressing spring 6332 and forcing the spool 6322 to the left. The force F is generated by applying a current to the solenoid in a specified direction. Spring 6334 is extended relative to the position of FIG. 192. In some embodiments, it may reach its free length prior to reaching the position shown in FIG. 193. In this position, outlet port 6330 is fluidly connected to pressure port 6326, routing air from the air pump 6336 to the actuator 6312.

FIG. 194 illustrates the valve in the deflation position. The solenoid exerts a rightward force F, compressing spring 6334 and forcing the spool 6322 to the right. The force Fis generated by applying a current to the solenoid in the opposite direction as used to generate the force of FIG. 193. Spring 6332 is extended relative to the position of FIG. 192.

In some embodiments, it may reach its free length prior to reaching the position shown in FIG. 194. In this position, outlet port 6328 is fluidly connected to vent port 6324, routing air from the actuator 6312 to the environment.

In alternative embodiments, the roles of the vent port and the pressure port may be reversed by reversing the direction of the solenoid currents associated with inflation and deflation. In some embodiments, port 6324 would be fluidly connected to the air pump and port 6326 would be fluidly connected to the environment.

A similar pneumatic system may be used for each actuator 6312 in seat assembly 6300. However, a single pump may be shared among all of the actuators. For independent control of each actuator, a separate electrical signal is provided to the solenoid of each valve by a controller.

An assembly (e.g., seat assembly 6300, pneumatic system of FIGS. 192-194) is described with a massage actuator (e.g., actuator 6312) adapted to be attached to a seat cushion (e.g., seat bottom 6302, seat back 6304). One of a plurality of massage actuators may be attached to a seat cushion, impart a tactile effect upon the occupant, such as a vibration for conveying an alert, vibration for imparting a massage, pressure for imparting a pressurized massage effect, and may be fluid bladders, such as air bladders, such as lumbar bladders, bolster bladders, and/or shoulder bladders. An air pump (e.g., air pump 6336) is provided, which may be a compressor. A valve (e.g., valve 6320) comprises a pressure port (e.g., pressure port 6326) fluidly connected to the air pump (e.g., air pump 6336). The pressure port may be blocked by a spool when the spool is in a second or deflation position. At least one outlet port (e.g., outlet ports 6328 and 6330) is fluidly connected to the massage actuator (e.g., actuator 6312). A first outlet port may be axially located between the vent port and the pressure port and blocked by the spool when the spool is in the neutral or holding position and a second outlet port such that the pressure port may be axially located between the first outlet port and the second outlet port and wherein the pressure port may be blocked by the spool when the spool is in the neutral or holding position, the pressure port may be also blocked by the spool when the spool is in the second or deflation position, and the first outlet port may also be blocked by the spool when the spool is in the first or inflation position. A vent port (e.g., vent port 6324) is provided. A spool (e.g., spool 6322) slides within a bore. The valve may be a three-position valve. The spool may be formed from a lightweight and resilient material such as a polymeric material, such as polypropylene and may be reinforced with fiberglass, or formed from an aluminum alloy, with a beam extending from the valve body generally parallel with the valve body, the beam may be formed integral with the spring, with a first thickness, and the beam may include a plurality of lateral projections extending outwardly from the beam and received in slots in a housing to prevent axial translation of the beam, and the slots may be slightly tapered so that as the projections are installed into the slots, the beam is positioned gradually toward the first port to slightly compress and preload the spring. The projection may extend toward the valve body and provide an alignment spacer between the valve body and the beam to maintain the valve body in alignment with the path of translation toward and away from the first port. The valve may have a valve stem and valve end. The valve may be sealed at three axial locations against an interior surface of the bore. The bore may be of a housing with the fluid chamber formed therein with a first port, a second port parallel with the first port, and a third port to vent to an external atmosphere axially aligned with the first port and in fluid communication with the fluid chamber, wherein the valve body is oriented in the fluid chamber for translation to an inflate position whereby fluid passes from a source of pressurized fluid into the first port, through the fluid chamber and out of the second port to inflate a fluid bladder, such as lumbar bladders, bolster bladders, shoulder bladders, while the third port is sealed from the fluid chamber, and translatable to a deflate position whereby fluid passes from the fluid bladder into the second port, through the fluid chamber and out of the third port to deflate the fluid bladder, while the first port is sealed from the fluid chamber. At least one spring (e.g., compressions springs 6332, 6334) biases the spool (e.g., spool 6322) toward a neutral position in which the at least one outlet port (e.g., outlet ports 6328 and 6330) is isolated from both the pressure port (e.g., pressure port 6326) and the vent port (e.g., vent port 6324). The spring may be two compression springs, one on each side of the spool, a single compression/tension spring on one side and may have a free length which biases the spool to this position, may be sinusoidal with alternating curvature as a compression spring formed integrally with the valve body, the spring may have a second thickness that is reduced relative to the first thickness, to limit deformation to the spring. A solenoid (e.g., in FIGS. 193 and 194) moves the spool (e.g., spool 6322) to a first position in response to an electrical current in a first direction and moves the spool (e.g., spool 6322) to a second position in response to an electrical current in a second direction. Alternatively, a shape memory alloy may be provided with an electrical terminal mounted on the distal end of the beam in electrical communication with the shape memory alloy, the shape memory alloy extends from the terminals, along the beam, along the spring, and around a distal end of the valve body adjacent to the first seal, formed from a material that is actuated in response to an electrical current, such as a Nickel Titanium alloy that constricts when a current is passed through the material, to translate the valve body in response to an electrical current conducted through the shape memory alloy, such that the SMA shortens in length, thereby compressing the spring and moving the valve body away from the first port. The at least one outlet port (e.g., outlet ports 6328 and 6330) is fluidly connected to the pressure port (e.g., pressure port 6326) when the spool (e.g., spool 6322) is in the first position and fluidly connected to the vent port (e.g., vent port 6324) when the spool (e.g., spool 6322) is in the second position.

In some embodiments, the at least one spring (e.g., compressions springs 6332, 6334) comprises two compression springs, one on each side of the spool (e.g., spool 6322).

In some embodiments, the at least one outlet port (e.g., outlet ports 6328 and 6330) comprises a first outlet port (e.g., outlet ports 6328 and 6330) axially located between the vent port (e.g., vent port 6324) and the pressure port (e.g., pressure port 6326) and blocked by the spool (e.g., spool 6322) when the spool (e.g., spool 6322) is in the neutral position. A second outlet port may be provided such that the pressure port is axially located between the first outlet port and the second outlet port and wherein the pressure port is blocked by the spool when the spool is in the neutral or holding position, the pressure port is also blocked by the spool when the spool is in the second or deflation position, the first outlet port is also blocked by the spool when the spool is in the first or inflation position.

In some embodiments, the at least one outlet port (e.g., outlet ports 6328 and 6330) further comprises a second outlet port (e.g., outlet ports 6328 and 6330) such that the pressure port (e.g., pressure port 6326) is axially located between the first outlet port (e.g., outlet ports 6328 and 6330) and the second outlet port (e.g., outlet ports 6328 and 6330) and wherein the pressure port (e.g., pressure port 6326) is blocked by the spool (e.g., spool 6322) when the spool (e.g., spool 6322) is in the neutral position. The pressure port may also be blocked by the spool when the spool is in the second or deflation position, the first outlet port is also blocked by the spool when the spool is in the first or inflation position.

In some embodiments, the pressure port (e.g., pressure port 6326) is also blocked by the spool (e.g., spool 6322) when the spool (e.g., spool 6322) is in the second position.

In some embodiments, the first outlet port (e.g., outlet ports 6328 and 6330) is also blocked by the spool (e.g., spool 6322) when the spool (e.g., spool 6322) is in the first position.

In some embodiments, a seat assembly (e.g., seat assembly 6300), which may be for a vehicle, a land vehicle, a watercraft, an aircraft, an office chair, and/or a comfort chair, comprises a seat cushion (e.g., seat bottom 6302, seat back 6304), which may be a seat bottom for supporting a pelvis and thighs of an occupant, and/or a seat back to support a back and shoulders of the occupant. The pneumatic system (e.g., pneumatic system of FIGS. 192-194) is provided in cooperation with the seat assembly (e.g., seat assembly 6300).

In some embodiments, the seat cushion (e.g., seat bottom 6302, seat back 6304) is a seat back (e.g., seat back 6304).

In some embodiments, the massage actuator (e.g., actuator 6312) is one of a plurality of massage actuators (e.g., actuator 6312) attached to the seat cushion (e.g., seat bottom 6302, seat back 6304).

An assembly (e.g., seat assembly 6300, pneumatic system of FIGS. 192-194) is described with a pressure port (e.g., pressure port 6326), at least one outlet port (e.g., pressure port 6326), and a vent port (e.g., vent port 6324). The pressure port may be blocked by a spool when the spool is in a second or deflation position. A first outlet port may be axially located between the vent port and the pressure port and blocked by the spool when the spool is in the neutral or holding position and a second outlet port such that the pressure port may be axially located between the first outlet port and the second outlet port and wherein the pressure port may be blocked by the spool when the spool is in the neutral or holding position, the pressure port may be also blocked by the spool when the spool is in the second or deflation position, and the first outlet port may also be blocked by the spool when the spool is in the first or inflation position. A spool (e.g., spool 6322) slides within a bore. The valve may be a three-position valve. The spool may be formed from a lightweight and resilient material such as a polymeric material, such as polypropylene and may be reinforced with fiberglass, or formed from an aluminum alloy, with a beam extending from the valve body generally parallel with the valve body, the beam may be formed integral with the spring, with a first thickness, and the beam may include a plurality of lateral projections extending outwardly from the beam and received in slots in a housing to prevent axial translation of the beam, and the slots may be slightly tapered so that as the projections are installed into the slots, the beam is positioned gradually toward the first port to slightly compress and preload the spring. The projection may extend toward the valve body and provide an alignment spacer between the valve body and the beam to maintain the valve body in alignment with the path of translation toward and away from the first port. The valve may have a valve stem and valve end. The valve may be sealed at three axial locations against an interior surface of the bore. The bore may be of a housing with the fluid chamber formed therein with a first port, a second port parallel with the first port, and a third port to vent to an external atmosphere axially aligned with the first port and in fluid communication with the fluid chamber, wherein the valve body is oriented in the fluid chamber for translation to an inflate position whereby fluid passes from a source of pressurized fluid into the first port, through the fluid chamber and out of the second port to inflate a fluid bladder, such as lumbar bladders, bolster bladders, shoulder bladders, while the third port is sealed from the fluid chamber, and translatable to a deflate position whereby fluid passes from the fluid bladder into the second port, through the fluid chamber and out of the third port to deflate the fluid bladder, while the first port is sealed from the fluid chamber. At least one spring (e.g., compressions springs 6332, 6334) biases the spool (e.g., spool 6322) toward a neutral position in which the at least one outlet port (e.g., outlet ports 6328 and 6330) is isolated from both the pressure port (e.g., pressure port 6326) and the vent port (e.g., vent port 6324). The spring may be two compression springs, one on each side of the spool, a single compression/tension spring on one side and may have a free length which biases the spool to this position, may be sinusoidal with alternating curvature as a compression spring formed integrally with the valve body, the spring may have a second thickness that is reduced relative to the first thickness, to limit deformation to the spring. A solenoid (e.g., in FIGS. 193 and 194) moves the spool (e.g., spool 6322) to a first position in response to an electrical current in a first direction and moves the spool (e.g., spool 6322) to a second position in response to an electrical current in a second direction. Alternatively, a shape memory alloy may be provided with an electrical terminal mounted on the distal end of the beam in electrical communication with the shape memory alloy, the shape memory alloy extends from the terminals, along the beam, along the spring, and around a distal end of the valve body adjacent to the first seal, formed from a material that is actuated in response to an electrical current, such as a Nickel Titanium alloy that constricts when a current is passed through the material, to translate the valve body in response to an electrical current conducted through the shape memory alloy, such that the SMA shortens in length, thereby compressing the spring and moving the valve body away from the first port. The at least one outlet port (e.g., outlet ports 6328 and 6330) is fluidly connected to the pressure port (e.g., pressure port 6326) when the spool (e.g., spool 6322) is in the first position and fluidly connected to the vent port (e.g., vent port 6324) when the spool (e.g., spool 6322) is in the second position.

In some embodiments, the at least one spring (e.g., compressions springs 6332, 6334) comprises two compression springs, one on each side of the spool (e.g., spool 6322).

In some embodiments, the at least one outlet port (e.g., outlet ports 6328 and 6330) comprises a first outlet port (e.g., outlet ports 6328 and 6330) axially located between the vent port (e.g., vent port 6324) and the pressure port (e.g., pressure port 6326) and blocked by the spool (e.g., spool 6322) when the spool (e.g., spool 6322) is in the neutral position. A second outlet port may be provided such that the pressure port is axially located between the first outlet port and the second outlet port and wherein the pressure port is blocked by the spool when the spool is in the neutral or holding position, the pressure port is also blocked by the spool when the spool is in the second or deflation position, the first outlet port is also blocked by the spool when the spool is in the first or inflation position.

In some embodiments, the at least one outlet port (e.g., outlet ports 6328 and 6330) further comprises a second outlet port (e.g., outlet ports 6328 and 6330) such that the pressure port (e.g., pressure port 6326) is axially located between the first outlet port (e.g., outlet ports 6328 and 6330) and the second outlet port (e.g., outlet ports 6328 and 6330) and wherein the pressure port (e.g., pressure port 6326) is blocked by the spool (e.g., spool 6322) when the spool (e.g., spool 6322) is in the neutral position. The pressure port may also be blocked by the spool when the spool is in the second or deflation position, the first outlet port is also blocked by the spool when the spool is in the first or inflation position.

In some embodiments, the pressure port (e.g., pressure port 6326) is also blocked by the spool (e.g., spool 6322) when the spool (e.g., spool 6322) is in the second position.

In some embodiments, the first outlet port (e.g., outlet ports 6328 and 6330) is also blocked by the spool (e.g., spool 6322) when the spool (e.g., spool 6322) is in the first position.

An assembly (e.g., seat assembly 6300, pneumatic system of FIGS. 192-194) is described with a massage actuator (e.g., actuator 6312) adapted to be attached to a seat cushion (e.g., seat bottom 6302, seat back 6304). One of a plurality of massage actuators may be attached to a seat cushion, impart a tactile effect upon the occupant, such as a vibration for conveying an alert, vibration for imparting a massage, pressure for imparting a pressurized massage effect, and may be fluid bladders, such as air bladders, such as lumbar bladders, bolster bladders, and/or shoulder bladders. An air pump (e.g., air pump 6336) is provided, which may be a compressor. A valve (e.g., valve 6320) comprises a pressure port (e.g., pressure port 6326) fluidly connected to the air pump (e.g., air pump 6336). The pressure port may be blocked by a spool when the spool is in a second or deflation position. At least one outlet port (e.g., outlet ports 6328 and 6330) is fluidly connected to the massage actuator (e.g., actuator 6312). A first outlet port may be axially located between the vent port and the pressure port and blocked by the spool when the spool is in the neutral or holding position and a second outlet port such that the pressure port may be axially located between the first outlet port and the second outlet port and wherein the pressure port may be blocked by the spool when the spool is in the neutral or holding position, the pressure port may be also blocked by the spool when the spool is in the second or deflation position, and the first outlet port may also be blocked by the spool when the spool is in the first or inflation position. A vent port (e.g., vent port 6324) is provided. A spool (e.g., spool 6322) slides within a bore. The valve may be a three-position valve. The spool may be formed from a lightweight and resilient material such as a polymeric material, such as polypropylene and may be reinforced with fiberglass, or formed from an aluminum alloy, with a beam extending from the valve body generally parallel with the valve body, the beam may be formed integral with the spring, with a first thickness, and the beam may include a plurality of lateral projections extending outwardly from the beam and received in slots in a housing to prevent axial translation of the beam, and the slots may be slightly tapered so that as the projections are installed into the slots, the beam is positioned gradually toward the first port to slightly compress and preload the spring. The projection may extend toward the valve body and provide an alignment spacer between the valve body and the beam to maintain the valve body in alignment with the path of translation toward and away from the first port. The valve may have a valve stem and valve end. The valve may be sealed at three axial locations against an interior surface of the bore. The bore may be of a housing with the fluid chamber formed therein with a first port, a second port parallel with the first port, and a third port to vent to an external atmosphere axially aligned with the first port and in fluid communication with the fluid chamber, wherein the valve body is oriented in the fluid chamber for translation to an inflate position whereby fluid passes from a source of pressurized fluid into the first port, through the fluid chamber and out of the second port to inflate a fluid bladder, such as lumbar bladders, bolster bladders, shoulder bladders, while the third port is sealed from the fluid chamber, and translatable to a deflate position whereby fluid passes from the fluid bladder into the second port, through the fluid chamber and out of the third port to deflate the fluid bladder, while the first port is sealed from the fluid chamber. At least one spring (e.g., compressions springs 6332, 6334) biases the spool (e.g., spool 6322) toward a holding position in which the at least one outlet port (e.g., outlet ports 6328 and 6330) is isolated from both the pressure port (e.g., pressure port 6326) and the vent port (e.g., vent port 6324). The spring may be two compression springs, one on each side of the spool, a single compression/tension spring on one side and may have a free length which biases the spool to this position, may be sinusoidal with alternating curvature as a compression spring formed integrally with the valve body, the spring may have a second thickness that is reduced relative to the first thickness, to limit deformation to the spring. A solenoid (e.g., in FIGS. 193 and 194) moves the spool (e.g., spool 6322) to an inflation position in response to an electrical current in a first direction and moves the spool (e.g., spool 6322) to a deflation position in response to an electrical current in a second direction. Alternatively, a shape memory alloy may be provided with an electrical terminal mounted on the distal end of the beam in electrical communication with the shape memory alloy, the shape memory alloy extends from the terminals, along the beam, along the spring, and around a distal end of the valve body adjacent to the first seal, formed from a material that is actuated in response to an electrical current, such as a Nickel Titanium alloy that constricts when a current is passed through the material, to translate the valve body in response to an electrical current conducted through the shape memory alloy, such that the SMA shortens in length, thereby compressing the spring and moving the valve body away from the first port. The at least one outlet port (e.g., outlet ports 6328 and 6330) is fluidly connected to the pressure port (e.g., pressure port 6326) when the spool (e.g., spool 6322) is in the inflation position and fluidly connected to the vent port (e.g., vent port 6324) when the spool (e.g., spool 6322) is in the deflation position.

In some embodiments, the at least one spring (e.g., compressions springs 6332, 6334) comprises two compression springs, one on each side of the spool (e.g., spool 6322).

In some embodiments, the at least one outlet port (e.g., outlet ports 6328 and 6330) comprises a first outlet port (e.g., outlet ports 6328 and 6330) axially located between the vent port (e.g., vent port 6324) and the pressure port (e.g., pressure port 6326) and blocked by the spool (e.g., spool 6322) when the spool (e.g., spool 6322) is in the holding position. A second outlet port may be provided such that the pressure port is axially located between the first outlet port and the second outlet port and wherein the pressure port is blocked by the spool when the spool is in the neutral or holding position, the pressure port is also blocked by the spool when the spool is in the second or deflation position, the first outlet port is also blocked by the spool when the spool is in the first or inflation position.

In some embodiments, the at least one outlet port (e.g., outlet ports 6328 and 6330) further comprises a second outlet port (e.g., outlet ports 6328 and 6330) such that the pressure port (e.g., pressure port 6326) is axially located between the first outlet port (e.g., outlet ports 6328 and 6330) and the second outlet port (e.g., outlet ports 6328 and 6330) and wherein the pressure port (e.g., pressure port 6326) is blocked by the spool (e.g., spool 6322) when the spool (e.g., spool 6322) is in the holding position. The pressure port may also be blocked by the spool when the spool is in the second or deflation position, the first outlet port is also blocked by the spool when the spool is in the first or inflation position.

In some embodiments, the pressure port (e.g., pressure port 6326) is also blocked by the spool (e.g., spool 6322) when the spool (e.g., spool 6322) is in the deflation position.

In some embodiments, the first outlet port (e.g., outlet ports 6328 and 6330) is also blocked by the spool (e.g., spool 6322) when the spool (e.g., spool 6322) is in the inflation position.

FIG. 195 illustrates a vehicle seat assembly 6420 according to some embodiments. The vehicle seat assembly 6420 is provided with a seat bottom 6422 adapted to be mounted to a vehicle floor. The vehicle seat assembly 6420 may be provided in any row of a vehicle. The vehicle seat assembly 6420 includes a seat back 6424 extending upright from the seat bottom 6422. The vehicle seat assembly 6420 also includes a head restraint 6426 extending above the seat back 6424. The vehicle seat assembly 6420 may be employed in any type of vehicle, including land vehicles, watercrafts, aircrafts, or the like. The vehicle seat assembly 6420 may be any seat assembly such as an office chair, furniture, or the like.

The vehicle seat assembly 6420 is provided with a trim cover 6428, 6430, 6432 over the seat bottom 6422, seat back 6424, and head restraint 6426 respectively, to conceal a frame, cushioning, and functional components. The seat bottom 6422, seat back 6424, and head restraint 6426 each include a cushion. The cushion is made out of a stranded thermoplastic mesh. Traditional seat cushions are made out of a foam material, which creates a high surface area allowing a trim cover, actuator, or heat transfer layer to be adhered to the cushion. Thermoplastic mesh cushions provide the comfort and stability of a foam cushion, with increased porosity, while reducing weight, cost, and manufacturing tooling. Recyclability is also improved. The stranded thermoplastic mesh cushion (or foamless cushion) has a low surface area since the surface area is defined by a collection of extruded strands.

Due to the low surface area, some methods of attachment for a trim cover that work for a more traditional material are not applicable with a stranded thermoplastic mesh cushion. In particular, it may be difficult to securely fasten a trim cover to a concave surface of a bottom, back, or head restraint cushion. In some cases, it is considered aesthetically pleasing to have the means of attachment, such as stitching, be visible from the outside of the finished article. In other cases, it is considered to be more aesthetically pleasing if the means of attachment is not visible to users.

FIG. 196 illustrates a method of attaching a trim cover 6428 to a stranded thermoplastic cushion 6440 to form a seat bottom 6422. Although the method is illustrated for the seat bottom 6422, it is equally applicable for the seat back 6424, the head restraint 6426, or other cushioned portion of a seat. An envelope 6442 surrounds the cushion 6440. The envelope 6442 conforms closely to the outer surfaces of the cushion 6440. (It is shown slightly offset from the outer surfaces of the cushion in FIG. 196 such that it is visible as a separate component.) FIG. 197 is an exploded view of trim cover 6428. Trim cover 6428 has at least three layers: foam layer 6446, finish layer 6448, and attachment layer 6450. The finish layer 6448 is made of an aesthetically pleasing material and is bonded to an outer surface of the foam layer 6446. The attachment layer 6450 is bonded to an inner surface of the foam layer 6446 and is adapted for attachment to an attachment portion 6444 of the envelope 6442. The attachment may be, for example, a hook and loop type of attachment. Attachment layer 6450 may form the hook side of the hook and loop joint while attachment portion 6444 may form the loop side. Alternatively, attachment layer 6450 may form the loop side of the hook and loop joint while attachment portion 6444 may form the hook side.

The envelope may have panels at the ends of the cushion (parallel to the cross section of FIG. 196) which cause the attachment portion to conform to the concave surface of the cushion. Additional features may be added to the envelope between the end panels which interact with slots in the cushion to force the attachment portion to conform to the concave surface. In some embodiments, semi-rigid members may be attached to the portions of the envelope around concave portions, causing the envelope to conform in those regions. The semi-rigid members may be flexible enough that an occupant does not notice their presence.

In some embodiments, a slight vacuum may be drawn in the cushion to cause the envelope to conform tightly to the cushion. In these embodiments, the envelope 6442 is made of an air impermeable material and is sealed after insertion of the cushion 6440. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may be configurable to momentarily draw air from the cushion when needed.

An assembly (e.g., vehicle seat assembly 6420) is described with a stranded thermoplastic mesh seat cushion (e.g., thermoplastic cushion 6440), an envelope (e.g., envelope 6442) encircling the seat cushion (e.g., thermoplastic cushion 6440) and conforming thereto, and a multi-layer trim cover (e.g., trim cover 6428, 6430, 6432) having an outer layer (e.g., finish layer 6448) and an inner layer (e.g., attachment layer 6450), the inner layer (e.g., attachment layer 6450) attached to the envelope (e.g., envelope 6442) by hook and loop fasteners. A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be scaled after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tie down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tie down may be sewn or otherwise connected to the trim assembly or trim cover layer. The tie down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tie down may extend from the B-surface of the trim cover layer, and through the slit or trench in the nonfoam layer. The distal free end of the tie down may be positioned such that the nonfoam layer is between the distal free end of the tie down and the trim cover layer. Various fasteners or other components may be provided for direct assembly to the vehicle seat assembly in addition to the tie down or instead of the tie down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tie down strips may be selected. The tie down strips may be inserted into grooves defined in predetermined locations within the mesh pad. The tie down strip may define a plurality of equally spaced holes above a reinforcement bead that is attached to the tie down strip. A spiral retainer may be turned through the welded polymer fibers of the mesh pad and around the reinforcement bead, through the tie down strips, and in the groove, wherein the spiral retainer may be wound through the plurality of equally spaced holes and the welded polymer fibers to hold the tie down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion. The seat cover may include tie down strips attached to the seat cover that define a plurality of holes. The spiral retainer may secure the tie down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tie down strips to the welded polymer fibers. The welded polymer fibers may hold the spiral retainer in the mesh body. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the envelope (e.g., envelope 6442) has a portion with loops and the inner layer (e.g., attachment layer 6450) of the multi-layer trim cover (e.g., trim cover 6428, 6430, 6432) includes hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the inner layer (e.g., attachment layer 6450) of the multi-layer trim cover (e.g., trim cover 6428, 6430, 6432) has loops and the envelope (e.g., envelope 6442) has a portion with hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the multi-layer trim cover (e.g., trim cover 6428, 6430, 6432) has a foam layer (e.g., foam layer 6446) between the outer layer (e.g., finish layer 6448) and the inner layer (e.g., attachment layer 6450). A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, a surface of the seat cushion (e.g., thermoplastic cushion 6440) adjacent to the trim cover (e.g., trim cover 6428, 6430, 6432) is concave. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence.

In some embodiments, the envelope (e.g., envelope 6442) includes features that extend into slots in the cushion (e.g., thermoplastic cushion 6440) to prevent the envelope (e.g., envelope 6442) from separating from the concave surface. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence.

In some embodiments, the envelope (e.g., envelope 6442) has stiffeners adjacent to the concave surface preventing the envelope (e.g., envelope 6442) from separating from the concave surface. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence.

In some embodiments, a partial vacuum is maintained within the envelope (e.g., envelope 6442) causing the envelope (e.g., envelope 6442) to conform to the seat cushion (e.g., thermoplastic cushion 6440). A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

In some embodiments, the partial vacuum is maintained using an air pump that is part of a seat ventilation system. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

An assembly (e.g., vehicle seat assembly 6420) is described with a stranded thermoplastic mesh seat cushion (e.g., thermoplastic cushion 6440), an envelope (e.g., envelope 6442) encircling the seat cushion (e.g., thermoplastic cushion 6440), and a multi-layer trim cover (e.g., trim cover 6428, 6430, 6432) having an outer layer (e.g., finish layer 6448) and an inner layer (e.g., attachment layer 6450) fastened to the envelope (e.g., envelope 6442). A partial vacuum is maintained within the envelope (e.g., envelope 6442) causing the envelope (e.g., envelope 6442) to conform to the seat cushion (e.g., thermoplastic cushion 6440). A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tie down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tie down may be sewn or otherwise connected to the trim assembly or trim cover layer. The tie down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tie down may extend from the B-surface of the trim cover layer, and through the slit or trench in the nonfoam layer. The distal free end of the tie down may be positioned such that the nonfoam layer is between the distal free end of the tie down and the trim cover layer. Various fasteners or other components may be provided for direct assembly to the vehicle seat assembly in addition to the tie down or instead of the tie down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the scam is positioned within this reduced thickness layer. The trench or reduced thickness region may be located adjacent to an edge of the nonfoam layer, or may be positioned away from the edges and in a central region of the nonfoam layer. The seam may be provided as a joining seam and/or a decorative seam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tie down strips may be selected. The tie down strips may be inserted into grooves defined in predetermined locations within the mesh pad. The tie down strip may define a plurality of equally spaced holes above a reinforcement bead that is attached to the tie down strip. A spiral retainer may be turned through the welded polymer fibers of the mesh pad and around the reinforcement bead, through the tie down strips, and in the groove, wherein the spiral retainer may be wound through the plurality of equally spaced holes and the welded polymer fibers to hold the tie down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion.

The seat cover may include tie down strips attached to the seat cover that define a plurality of holes. The spiral retainer may secure the tie down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tie down strips to the welded polymer fibers. The welded polymer fibers may hold the spiral retainer in the mesh body. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the envelope (e.g., envelope 6442) has a portion with loops and the inner layer (e.g., attachment layer 6450) of the multi-layer trim cover (e.g., trim cover 6428, 6430, 6432) includes hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the inner layer (e.g., attachment layer 6450) of the multi-layer trim cover (e.g., trim cover 6428, 6430, 6432) has loops and the envelope (e.g., envelope 6442) has a portion with hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the multi-layer trim cover (e.g., trim cover 6428, 6430, 6432) has a foam layer (e.g., foam layer 6446) between the outer layer (e.g., finish layer 6448) and the inner layer (e.g., attachment layer 6450). A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, a surface of the seat cushion (e.g., thermoplastic cushion 6440) adjacent to the trim cover (e.g., trim cover 6428, 6430, 6432) is concave. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence.

In some embodiments, the partial vacuum is maintained using an air pump that is part of a seat ventilation system. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed.

In some embodiments, an assembly (e.g., vehicle seat assembly 6420) comprises a stranded thermoplastic mesh seat cushion (e.g., thermoplastic cushion 6440) having a concave surface. An envelope (e.g., envelope 6442) encircles the seat cushion (e.g., thermoplastic cushion 6440) and having stiffeners adjacent to the concave surface preventing the envelope (e.g., envelope 6442) from separating from the concave surface. A multi-layer trim cover (e.g., trim cover 6428, 6430, 6432) has an outer layer (e.g., finish layer 6448) and an inner layer (e.g., attachment layer 6450) fastened to the envelope (e.g., envelope 6442). A vehicle seat assembly may be provided with a seat bottom adapted to be mounted to a vehicle floor. The vehicle seat assembly may be provided in any row of a vehicle. The vehicle seat assembly may include a seat back extending upright from the seat bottom. The vehicle seat assembly may also include a head restraint extending above the seat back. The vehicle seat assembly may be employed in any type of vehicle, including land vehicles, watercrafts, aircrafts, or the like. The vehicle seat assembly may be any seat assembly such as an office chair, furniture, or the like. The vehicle seat assembly may be provided with a trim cover over the seat bottom, seat back, and head restraint respectively, to conceal a frame, cushioning, and functional components. The seat bottom, seat back, and head restraint each include a cushion. The cushion may be made from a stranded thermoplastic mesh. Thermoplastic mesh cushions provide the comfort and stability of a foam cushion, with increased porosity, while reducing weight, cost, and manufacturing tooling. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence. A slight vacuum may be drawn in the cushion to cause the envelope to conform tightly to the cushion. The envelope may be made of an air impermeable material and may be sealed after insertion of the cushion. The air pressure within the cushion may be maintained at a low enough level that the envelope does not become pressurized relative to ambient pressure when an occupant compresses the cushion or when the vehicle is driven to a high-altitude location. In some instances, an air pump may actively draw air from the cushion during operation. For example, an air pump that serves a seat ventilation system may momentarily draw air from the cushion when needed. The trim assembly may be formed from multiple layers of material. The trim assembly may be used with a vehicle seat assembly. The trim cover layer may provide the A-surface for the trim assembly, or the seating surface that is visible to the seat occupant. The trim cover layer may be formed from one or more panels of a woven fabric, knitted fabric, other fabric, leather, leatherette, vinyl, and/or other material. The various panels of the trim cover layer may be connected to one another, e.g., via sewing or another process, to form the trim cover layer. Panels for the trim cover layer may be cut from a fabric or other material, and then sewn, welded, glued, or otherwise connected to one another to form the trim cover layer. The nonfoam layer may be formed from a stranded mesh material or an entangled three-dimensional filament structure. The nonfoam layer may be provided as a plastic spacer material, and furthermore may be formed from a thermoplastic polyurethane. The plastic spacer material may include two films separated by spacer inserts to form air cushion pockets therebetween. The plastic spacer material may further define apertures extending through the two films to allow air to pass across the material, e.g., for ventilation. The nonfoam layer may have a first surface and a second surface opposite to the first surface. The first surface may be positioned to be in contact with the B-surface or back surface of the trim cover layer. The first surface and/or the second surface may define at least one trench. The plastic spacer material may include two films separated by spacer inserts to form air cushion pockets therebetween. The plastic spacer material may further define apertures extending through the two films to allow air to pass across the material, e.g., for ventilation. A spacer fabric and/or a cushion layer may be positioned between the seat cushion and the trim cover layer. The spacer fabric may be a knit or otherwise formed fabric layer that forms a mesh structure to allow air to pass through it, and provides a firm support surface. The cushion layer may be a foam layer, e.g., a urethane or other foam material, and may further be known as a soft touch material that provides a cushion feel for the seat occupant. The nonfoam layer may replace the spacer fabric and/or the cushion layer positioned between the seat cushion and the trim cover layer. The nonfoam layer may be on the order of 10-40 mm thick, and may be approximately 20 mm thick. This may allow for preassembly of the trim cover assembly, may result in fewer components to assemble to the support member and/or cushion for the vehicle seat assembly, and may provide for a modular seating system and assembly thereof. The nonfoam member may be formed by extruding thin filaments of linear low-density polyethylene, or another suitable material through a die plate from a hopper or other source of material. The thin filaments may be heated as they are extruded such that they exit the die plate in a molten state. The filaments may then be consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure. The consolidated filament structure may then be dried and cut into the appropriate shape for the nonfoam layer. A GPU layer may be formed and cut to a desired shape and size for the nonfoam layer based on the trim assembly. The trench may be an open channel or groove that is formed in the nonfoam layer and that intersects the first and/or second surface to extend through the member. The trench be a recess or blind hole that is formed in the stranded-mesh material member, or a through hole in the member. The trench may have a floor that is positioned between the first and second surfaces of the stranded-mesh material member. The nonfoam layer may have a first thickness between the first and second surfaces adjacent to the trench, and a second thickness between the floor and one of the first and second surfaces, with the second thickness being less than the first thickness. A tie down may be connected directly to the trim cover layer, or to another layer. The tie down may be formed as a nonwoven fabric, or other material layer that extends outwardly from the B-surface of the trim cover layer or another layer to a distal free end, and may be used to connect the trim assembly to the cushion or support member. The tie down may be sewn or otherwise connected to the trim assembly or trim cover layer. The tie down may be provided as an elastic element that extends outwardly from the trim cover assembly, e.g., as a band or cord. The trim assembly may be provided without any tie downs. The nonfoam layer may be cut or formed with the trench as an associated slit or through hole for the tie down as shown. The tie down may extend from the B-surface of the trim cover layer, and through the slit or trench in the nonfoam layer. The distal free end of the tie down may be positioned such that the nonfoam layer is between the distal free end of the tie down and the trim cover layer. Various fasteners or other components may be provided for direct assembly to the vehicle seat assembly in addition to the tie down or instead of the tie down. The trim assembly may be provided with components or layers, e.g., the nonfoam layer, that would otherwise be connected to the seat cushion or support member prior to installation of the trim cover, or installed during a separate step to the vehicle seat assembly. The trim cover assembly may be formed or assembled prior to connection to the cushion or seat assembly. The trim cover layer and the nonfoam layer may be connected to one another to form the trim cover assembly prior to attachment to the cushion or seat assembly. The trim cover assembly may be assembled at a first facility or in a first production line, and then shipped or moved to the location or assembly line for the vehicle seat assembly. The trim cover layer may be sewn to the nonfoam layer with one or more seams connecting the trim cover layer to the nonfoam layer. The nonfoam layer may be provided with a trench or reduced thickness region, and the seam is positioned within this reduced thickness layer. The trench or reduced thickness region may be located adjacent to an edge of the nonfoam layer, or may be positioned away from the edges and in a central region of the nonfoam layer. The seam may be provided as a joining scam and/or a decorative scam through the trim cover layer. The trim cover layer may be connected to the nonfoam layer with one or more tag fasteners or rivets. The tag fasteners may be provided as a plastic or polypropylene tag fasteners, e.g., similar to tag fasteners that are used with retail or industrial tagging, and that are inserted using a tagging gun or other tag attaching tool. The tags may be inserted through the trim cover layer and nonfoam layer. The tags may be inserted through a trench or reduced thickness region of the nonfoam layer. The tag fasteners may each have a longitudinal strand or filament as a stem and widened heads at the opposite ends. The trim cover layer and nonfoam layer may be positioned between the two widened heads, with the stem extending through the two layers. The trim cover layer and the nonfoam layer may be connected to one another first using tags, and are then sewn together via one or more seams. The trim cover may be formed with pockets, and the nonfoam layer may be inserted into a corresponding pocket, and then the pocket of the trim cover is then closed, e.g., via sewing or another process, to retain the nonfoam layer relative to the trim cover layer. The trim cover layer and pocket may partially or entirely enclose the nonfoam layer after the pocket is closed. The nonfoam layer may be directly fastened to the trim cover layer or encapsulated by the trim cover layer. The trim cover layer may be laminated to the nonfoam layer via a process with heat that melts filaments or a film in the nonfoam layer in a localized region at the surface and adjacent to the trim cover layer to weld or connect the trim cover layer to the nonfoam layer as shown by the bond between the two layers. The nonfoam layer may be bonded to the trim cover layer via an adhesive, or may be connected via an ultrasonic or high frequency welding process. The nonfoam layer may be connected to the trim cover layer in a foam tool during a foam-in-place process, or the trim cover layer itself may be provided by the foam in a foam-in-place process. Additional layers may be connected to the trim cover layer and the nonfoam layer when assembling the trim cover assembly, e.g., prior to, during, or after connecting the trim cover layer and nonfoam layer. These additional layers may be positioned between the trim cover layer and the nonfoam layer. Alternatively, or additionally, these additional layers may be positioned beneath the nonfoam layer, e.g., with the nonfoam layer positioned between the additional layers and the trim cover layer. The additional layers may include a spacer fabric, a soft touch cushion layer, an additional nonfoam layer, or the like. A third layer may be provided, with the nonfoam layer positioned between the trim cover layer and the third layer. The third layer may be provided as a sheet or layer of a nonwoven fabric. The third layer may be provided as another material. The third layer may be provided for use with a vehicle seat assembly having a nonfoam cushion, and may act as an air barrier between the cushion and the nonfoam layer of the trim assembly. The third layer may be attached to the trim cover layer and/or nonfoam layer. Various fasteners may be connected to the trim assembly. For any trim cover assemblies with tie downs, the tie downs may be positioned through the slits or trenches in the nonfoam layers. Other fasteners may be provided and attached to the trim cover assembly. Some fasteners may be provided and attached to the trim cover assembly when assembling it to the seat or cushion. A cushion may be connected to the frame or support member of the vehicle seat assembly. The cushion may be a seat back or a seat bottom cushion. The cushion may be formed from a foam material, or a nonfoam material, or a combination thereof. The seat assembly may be provided without a cushion, such that this step is omitted. The trim assembly may be connected to the seat assembly. The trim assembly may be connected to the vehicle seat assembly by directly connecting or attaching the trim assembly to the cushion and/or to the support member, e.g., frame or substrate. The trim assembly may be directly connected to the foam cushion. The tie down of the trim cover assembly may connect via hog rings to a wire in the foam cushion, or via the use of hook and loop fasteners to the foam cushion. The cushion may have a corresponding trench to receive the distal end of the tie down. In another example, paddles may be connected to the distal end of the tie down or to the trim cover layer, and the paddles may be inserted into slots in the cushion and then rotated, e.g., by ninety degrees, to retain the trim assembly to the cushion. Corresponding clips such as push clips, retainer clips, or the like may be used to connect the trim assembly to the cushion. Other fasteners may be used to connect the trim assembly to the foam cushion of the seat assembly. A drawstring around the perimeter of the trim assembly, e.g., sewn into the trim cover layer, may be used by inserting the cushion into the trim assembly and then cinching or tightening the drawstring. Furthermore, the trim assembly may be connected to a component during a foam-in-place process at the time of pouring the foam in a tool, where the trim assembly is positioned into the tool, and the component is then foamed in, along with other fasteners as desired. A seat assembly with a nonfoam cushion, e.g., a stranded mesh material cushion, the trim assembly may be connected directly to the nonfoam cushion via the use of one or more fasteners. The tie down of the trim cover assembly may connect via hog rings to strands in the nonfoam cushion or to a wire embedded in the nonfoam cushion, or via the use of hook and loop fasteners to the foam cushion. Paddles may be connected to the distal end of the tie down or to the trim cover layer, and the paddles may be inserted into slots in the nonfoam cushion and then rotated, e.g., by ninety degrees, to retain the trim assembly to the nonfoam cushion. Corresponding clips such as push clips, retainer clips, or the like may be used to connect the trim assembly to the nonfoam cushion. Other fasteners may be used to connect the trim assembly to the foam cushion of the seat assembly. The fasteners may be provided with barbs or other protrusions. The protrusions on the fastener may engage with the strands of the nonfoam layer and/or nonfoam cushion and limit or prevent movement of the fastener. The fasteners may be double ended such that one end engages with the nonfoam layer of the trim assembly and the other end engages with the nonfoam cushion. The fastener may have a head, and the head may be positioned beneath the nonfoam cushion such that the fastener extends upwardly or outwardly towards the A-surface with a distal end engaging either the nonfoam layer of the trim assembly or a tie down of the trim assembly, or the head may be positioned such that the fastener extends through the nonfoam layer with a distal end embedded into the nonfoam cushion beneath. A drawstring around the perimeter of the trim assembly, e.g., sewn into the trim cover layer, may be used by inserting the cushion or support member (e.g., as a substrate) into the trim assembly and then cinching or tightening the drawstring with the nonfoam layer positioned beneath the trim cover layer. The trim assembly is directly connected to the support member of the vehicle seat assembly. The tie down of the trim cover assembly may connect to the frame or substrate via arrows, J-clips, or the like into a through hole or trough formed in the frame or substrate, with the arrow, J-clips, or the like provided similarly to clips. Corresponding clips such as push clips, retainer clips, or the like may be used to connect the trim assembly to the frame or substrate by engaging with surfaces or apertures therein. Other fasteners may be used to connect the trim assembly to the frame or substrate, such as staples. The trim assembly may be formed with loops to engage with corresponding hooks on the frame or substrate, or the trim assembly may be formed with wires in the trim assembly, e.g., in the trim cover layer, to hook on the frame or substrate. A drawstring around the perimeter of the trim assembly, e.g., sewn into the trim cover layer, may be used by inserting the frame or substrate into the trim assembly and then cinching or tightening the drawstring. A portion of a seat structure may include a mesh pad that is made up of polymer fibers. The polymer fibers may be thermoplastic fibers that may be polyethylene fibers. The polymer fibers may be spun and heated in a mold or die and formed into the shape of a seat base, seat back, or another padded trim piece. A tie down strip may be attached by a spiral retainer. The tie down strip may define a plurality of equally spaced holes and may include a reinforcement bead. The spiral retainer may be rotated, or turned, as it is wound into the mesh pad, the holes in the tie down strip and around the reinforcement bead. The tie down strip may be retained in a groove by the spiral retainer to retain a seat cover on the seat structure. The spiral retainer may be looped through the polymer fibers of the mesh pad. The spiral retainer may also engage the tie down strip by being wound through the holes and may also encircle the reinforcement bead. The spiral retainer may include a radial leg that is engaged by a rotating tool to wind the spiral retainer into the mesh pad and the tie down strip. The tie down strip may be disposed in the groove and may be connected to the seat cover that may be overlying the mesh pad. The spiral retainer may be looped through the welded polymer fibers and the holes defined by the tie down strip. The reinforcement bead may be disposed inside the spiral retainer. The mesh pad may be flexed to open the groove to facilitate inserting the tie down strip with the reinforcement bead in the predetermined location in the bottom of the groove. The tie down strip may be connected to the seat cover that is folded over to provide access to the groove. The mesh pad may be made up of the polymer fibers and may define a groove. The spiral retainer may be adjacent to a guide comb that includes a plurality of equally spaced teeth that are separated by gaps. The gaps may correspond to the spacing between the holes formed in the tie down strip. When the guide comb and the tie down strip are placed in the groove, the gaps defined between the teeth may be aligned with the holes. The helical wraps of the spiral retainer may have the same spacing as the gaps and holes so that once the spiral retainer begins to be wound through the holes it is fed through the holes. The spiral retainer may also be wound through the polymer fibers that are randomly located in the mesh pad but sufficiently packed together to firmly retain the tie down strip in the groove defined by the mesh pad. A machine for inserting the spiral retainer may include a fixture for holding the mesh pad. The spiral retainer may be engaged by a rotating tool that engages and rotates the radial leg. The guide comb may be aligned with the holes in the tie down strip and may receive the spiral retainer as it guides the spiral retainer into the holes. The spiral retainer may also wind through the polymer fibers of the mesh pad. A seat cover may be attached to a seat structure including a resilient seat cushion. A mesh pad of welded polymer fibers may be selected, and a cover including tie down strips may be selected. The tie down strips may be inserted into grooves defined in predetermined locations within the mesh pad. The tie down strip may define a plurality of equally spaced holes above a reinforcement bead that is attached to the tie down strip. A spiral retainer may be turned through the welded polymer fibers of the mesh pad and around the reinforcement bead, through the tie down strips, and in the groove, wherein the spiral retainer may be wound through the plurality of equally spaced holes and the welded polymer fibers to hold the tie down strips in the predetermined locations. The mesh pad may be formed into the shape of a seat cushion. The tie down strips may be sewn to the seat cover. A guide comb may be inserted in the groove to align the equally spaced holes with gaps defined by the guide comb and a plurality of turns of the spiral retainer. The spiral retainer may be guided as the spiral retainer is turned into the mesh body, the holes and the groove. An apparatus may include a mesh pad, a seat cover, and a spiral retainer. The mesh pad may be made of polymer fibers bonded together by melted portions of the polymer fibers and the mesh pad may be formed into a seat cushion. The seat cover may include tie down strips attached to the seat cover that define a plurality of holes. The spiral retainer may secure the tie down strips to the polymer fibers with the spiral retainer wound through the holes and the spiral retainer looped into the welded polymer fibers. The seat cover may be formed by sewing together a plurality of sections of cover material and attaching the plurality of sections of cover material to the tie down strips. The mesh pad of polymer fibers may define a plurality of grooves recessed into the mesh pad. The tie down strips may be plastic strips that include a bead reinforcement. The tie down strips may each include a bead reinforcement and a flexible flange that are sewn or ultrasonically welded to an edge of the seat cover. The tie down strips in some embodiments may each include a bead reinforcement and a flexible flange that are formed as a combination. The mesh pad may define grooves; the seat cover may include segments of flexible sheet material that are sewn together with the tie down strips that are received in the grooves; and the tie down strips may be disposed in the grooves with a guide comb when the spiral retainer is wound through the groove to secure the tie down strips to the welded polymer fibers. The welded polymer fibers may hold the spiral retainer in the mesh body. A retainer assembly may be installed in the seat cushion. The retainer assembly may be provided with a base with a contact surface to provide a planar contact surface upon the cushion. The base of the retainer assembly may also be provided with a surface fastener. The surface fastener may be a hook and loop fastener, an adhesive material, or the like. The base may be provided with the fastener to attach a seat trim cover, an actuator such as a massage bladder assembly, and/or a heat transfer layer such as a heating pad or ventilation layer to the cushion. The base may be composed of a polymeric material. The retainer assembly may be further provided with a connector and a retainer. The connector may be sewn to a surface of the base opposite to the contact surface with the surface fastener. The connector may also be sewn to the retainer. The connector may be provided with a width in a material thickness direction of the connector. The connector width may be smaller than a width of the base. The retainer may have a thickness less than a width of the retainer. The connector may extend through a slot in the seat cushion. The connector may be composed of a textile material such as fabric, cloth, or the like. The retainer width may be greater than the width of the connector. The retainer may be pivotally attached to the connector spaced apart from the base of the retainer assembly. The retainer may pivot externally to the seat cushion so that the width of the retainer engages the seat cushion. The retainer may retain the base upon the seat cushion. The retainer may be composed of a polymeric material. The retainer assembly may be partially inserted in the seat cushion. The retainer of the retainer assembly may collapse along the connector of the retainer assembly. The retainer and the connector may then be inserted into the slot formed through the seat cushion. The retainer may be translated through the seat cushion with the connector still at least partially within the slot of the seat cushion. The retainer may then be expanded relative to the connector into contact with a region of the seat cushion adjacent to the slot to retain the connector within the slot of the seat cushion. The trim cover may be attached to the base of the retainer assembly. The slot may extend the entire thickness of the seat cushion, allowing the retainer to be exposed on one end of the seat cushion. The base of the retainer assembly may be exposed on one end of the seat cushion opposite to the retainer. The retainer assembly may be placed in the seat cushion. The retainer assembly may be provided with a trim cover which acts as a base whereby the trim cover may be anchored upon the cushion. The retainer assembly may be provided with an actuator as opposed to the trim cover which acts as a base whereby the actuator may be anchored upon the cushion. The retainer assembly may be provided with a heat transfer layer in place of the trim cover which acts as a base whereby the heat transfer layer may be anchored upon the cushion. The retainer assembly may be further provided with a connector and a retainer. The connector may be sewn to the trim cover. The connector may be also sewn to the retainer. The connector may be provided with a width smaller than the width of the trim cover. The retainer includes a thickness less than the width of the retainer. The connector extends through a slot in the seat cushion. The connector may be composed of a textile material such as fabric, cloth, or the like. The retainer may be provided with a width greater than the width of the connector. The retainer may be pivotally attached to the connector spaced apart from the trim cover of the retainer assembly. The retainer may pivot externally to the seat cushion so that the width of the retainer engages the seat cushion. The retainer may retain the trim cover upon the seat cushion. The retainer may be composed of a polymeric material.

In some embodiments, the envelope (e.g., envelope 6442) has a portion with loops and the inner layer (e.g., attachment layer 6450) of the multi-layer trim cover (e.g., trim cover 6428, 6430, 6432) includes hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the inner layer (e.g., attachment layer 6450) of the multi-layer trim cover (e.g., trim cover 6428, 6430, 6432) has loops and the envelope (e.g., envelope 6442) has a portion with hooks engaging the loops. A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the multi-layer trim cover (e.g., trim cover 6428, 6430, 6432) has a foam layer (e.g., foam layer 6446) between the outer layer (e.g., finish layer 6448) and the inner layer (e.g., attachment layer 6450). A trim cover may be attached to a stranded thermoplastic cushion to form a seat bottom. The assembly may be equally applicable for the seat back, the head restraint, or other cushioned portion of a seat. An envelope may surround the cushion. The envelope may conform closely to the outer surfaces of the cushion. The trim cover may have at least three layers: foam layer, finish layer, and attachment layer. The finish layer may be made of an aesthetically pleasing material and may be bonded to an outer surface of the foam layer. The attachment layer may be bonded to an inner surface of the foam layer and may be adapted for attachment to an attachment portion of the envelope. The attachment may be, for example, a hook and loop type of attachment. Attachment layer may form the hook side of the hook and loop joint while attachment portion may form the loop side. The attachment layer may form the loop side of the hook and loop joint while attachment portion may form the hook side.

In some embodiments, the envelope (e.g., envelope 6442) includes features that extend into slots in the cushion (e.g., thermoplastic cushion 6440) to prevent the envelope (e.g., envelope 6442) from separating from the concave surface. The envelope may have panels at the ends of the cushion which cause the attachment portion to conform to the concave surface of the cushion. Additional features may be added to the envelope between the end panels which interact with slots in the cushion to force the attachment portion to conform to the concave surface. Semi-rigid members may be attached to the portions of the envelope around concave portions, causing the envelope to conform in those regions. The semi-rigid members may be flexible enough that an occupant does not notice their presence.

According to a first clause, a bladder for providing a shiatsu massaging effect includes a first sheet with a round portion molded therein and a second sheet cooperating with the first sheet. Together the sheets define a round-shaped chamber. The bladder also includes a fluid passage having a terminating end at the chamber such that a fluid may travel through it to the chamber.

According to a second clause, the round portion of any of the preceding or following clauses is a hemisphere.

According to a third clause, the round-shaped chamber of any of the preceding or following clauses is a sphere.

According to a fourth clause, the first and second sheets of any of the preceding or following clauses are heat sealed or ultrasonically welded together.

According to a fifth clause, a seat assembly including a frame supporting a massage subassembly includes the bladder of any of the preceding or following clauses.

According to a sixth clause, a subassembly for massaging an occupant is disclosed. The subassembly includes a plurality of bladders. Each bladder includes a first sheet cooperating with a second sheet to define a round-shaped chamber. The first sheet and/or second sheet defines a molded round portion and each bladder also includes a fluid passage from a compressor to the chamber. The compressor is configured to move a fluid through the one or more fluid passage to the one or more chambers.

According a seventh clause, the round portion of any of the preceding or following clauses is configured to protrude into an occupant.

According an eighth clause, the round portion of any of the preceding or following clauses defines a contact area with the occupant about an apex of the round portion.

According to a ninth clause, one or more bladders of any of the preceding or following clauses is configured to apply a pressure of at least 2 PSI.

According to a tenth clause, one or more bladders of any of the preceding or following clauses is configured to apply a pressure of at least 2.5 PSI.

According to an eleventh clause, the assembly of any of the preceding or following clauses includes a first plurality of bladders arranged along a direction and a controller cooperating with the first plurality of bladders. The controller is configured to scan an occupant by filing one or more bladders of the plurality of bladders with a fluid and determining an associated pressure.

According to a twelfth clause, the scan of any of the preceding or following clauses is configured to determine a first dimension of an occupant.

According to a thirteenth clause, the controller of any of the preceding or following clauses is configured to control the first plurality of bladders to massage an occupant according to the first dimension.

According to a fourteenth clause, the scan of any of the preceding or following clauses includes filling each bladder and determining a corresponding pressure.

According to a fifteenth clause, the scan of any of the preceding or following clauses includes filling a first group of bladders of the first plurality of bladders and determining a first pressure corresponding to the first group as well as filling a second group of bladders of the first plurality of bladders that is different than the first group of bladders and determining a second pressure corresponding to the second group.

According to a sixteenth clause, the assembly of any of the preceding or following clauses includes one or more sensors corresponding to each bladder of the first plurality of bladders.

According to a seventeenth clause, the assembly of any of the preceding or following clauses includes one or more sensors disposed in an exhaust pathway of the first plurality of bladders and the one or more sensors is configured to determine pressure associated with the first plurality of bladders such as a pressure of the fluid released from the first plurality of bladders.

According to an eighteenth clause, the assembly of any of the preceding or following clauses includes a frame supporting the cushion and/or massage assembly.

According to a nineteenth clause, the assembly of any of the preceding or following clauses includes a first plurality of bladders arranged along a first axis, a second plurality of bladders arranged along a second axis, and one or more sensors. Each bladder of the first plurality of bladders is configured to be filled with a fluid, individually or filled simultaneously and each bladder of the second plurality of bladders is configured to be filled with a fluid, individually or filled simultaneously. The one or more sensors are arranged to determine pressures associated with different groups of the bladders.

According to a twentieth clause, the assembly of any of the preceding or following clauses includes a seat back having a frame. The frame may support the massaging or fluid assemblies described herein.

According to a twenty-first clause, the first plurality of bladders of any of the preceding or following clauses is arranged along a width of a seat back at a first position According to a twenty-second clause, the second plurality of bladders of any of the preceding or following clauses is arranged along the width of the seat back at a second position that is different than the first position.

According to a twenty-third clause, the first plurality of bladders of any of the preceding or following clauses is arranged along a width of the seat back.

According to a twenty-fourth clause, the second plurality of bladders of any of the preceding or following clauses is arranged along a height of the seat back.

According to a twenty-fifth clause, the first plurality of bladders of any of the preceding or following clauses is arranged along a height of the seat back at a first position.

According to a twenty-sixth clause, the second plurality of bladders of any of the preceding or following clauses is arranged along the height of the seat back at second position that is different than the first position.

According to a twenty-seventh clause, the assembly of any of the preceding or following clauses includes a controller that cooperates with the first plurality of bladders. The controller being configured to scan an occupant by filling one or more bladders with a fluid and determining an associated pressure.

According to a twenty-eighth clause, the scan of any of the preceding or following clauses is configured to determine one or more dimensions of an occupant.

According to a twenty-nineth clause, a method including determining a first pressure associated with a first bladder, determining a second pressure associated with a second bladder, determining a first occupant dimension based on the first and second pressures.

According to a thirtieth clause, the pressure of any of the preceding or following clauses is determined by releasing the fluid from a bladder (e.g., the first and/or second bladder).

According to a thirty-first clause, the assembly or method of any of the preceding or following clauses applies a massaging effect to an occupant based on the first occupant dimension.

According to a thirty-second clause, the assembly or method of any of the preceding or following clauses includes determining a third pressure associated with a third bladder and determining a second occupant dimension based on the third pressure and the first and/or second pressure.

According to a thirty-third clause, the assembly or method of any of the preceding or following clauses includes applying a massaging effect to an occupant based on the first and second occupant dimensions.

According to a thirty-fourth clause, a system is provided with a first valve having a first valve element, and a second valve having a second valve element, with the second valve positioned adjacent to the first valve. A first actuator is provided with an actuator member movable between a first actuator position and a second actuator position, and the actuator member is coupled to each of the first valve element and the second valve element for movement therewith.

According to a thirty-fifth clause, the system of any of the preceding or following clauses wherein each of the first and second valves are in a closed position when the actuator member is in the first actuator position and in an open position when the actuator member is in the second actuator position.

According to a thirty-sixth clause. the system of any of the preceding or following clauses further comprising a third valve with a third valve element, wherein the first valve has a fourth valve element.

According to a thirty-seventh clause, the system of any of the preceding or following clauses wherein the system further comprises a second actuator with a second actuator member coupled to each the third and fourth valve elements for movement therewith.

According to a thirty-eighth clause, the system of any of the preceding or following clauses wherein the first actuator is a solenoid actuator or a shape-memory alloy actuator.

According to a thirty-nineth clause, the system of any of the preceding or following clauses further comprising a connector plate connected to the actuator member, and the first and second valve elements.

According to a fortieth clause, the system of any of the preceding or following clauses further comprising a pump positioned upstream of the first and second valves, and a control valve fluidly connecting the pump to the first and second valves. The pump is fluidly coupled to the first valve with the control valve in a first valve position, and the pump is fluidly coupled to the second valve with the control valve in a second valve position.

According to a forty-first clause, the system of any of the preceding or following clauses further comprising a first fluid rail providing pressurized fluid from the pump to the first valve via the control valve, and a second fluid rail providing pressurized fluid from the pump to the second valve via the control valve.

According to a forty-second clause, the system of any of the preceding or following clauses further comprising a first bladder in fluid communication with the first valve to receive pressurized fluid therefrom.

According to a forty-third clause, the system of any of the preceding or following clauses wherein the first valve has a first port in fluid communication with the first bladder, wherein the first port fluidly couples the first fluid rail to the first bladder via the first valve element, and wherein the first port fluidly couples the first bladder to atmosphere via a third valve element of the first valve.

According to a forty-fourth clause, the system of any of the preceding or following clauses further comprising a second bladder in fluid communication with a second port of the second valve to receive pressurized fluid therefrom.

According to a forty-fifth clause, the system of any of the preceding or following clauses further comprising a third valve with a fourth valve element, wherein the third valve is in fluid communication with the second fluid rail. A second actuator with a second actuator member coupled to each the third and fourth valve elements for movement therewith. A third bladder is in fluid communication with the third valve to receive pressurized fluid therefrom.

According to a forty-sixth clause, the system of any of the preceding or following clauses wherein the second fluid rail is in fluid communication with atmosphere with the second valve element in a closed position, and wherein the second fluid rail is in fluid communication with the second port and the second bladder with the second valve element in an open position.

According to a forty-seventh clause, the system of any of preceding or following clauses further comprising a vent valve fluidly connecting the second rail to atmosphere in a vent position.

According to a forty-eighth clause, the system of any of the preceding or following clauses further comprising a check valve fluidly connecting the first port of the first valve to the second fluid rail via the third valve element, wherein the check valve is positioned to be closed when a pressure in the second fluid rail is greater than a pressure in the first port with the third valve element in an open position.

According to a forty-nineth clause, the system of any of the preceding or following clauses further comprising a third fluid rail receiving fluid from the first port of the first valve, and a check valve fluidly connecting the third fluid rail to the second fluid rail. The check valve is positioned to be closed when a pressure in the second fluid rail is greater than a pressure in the third fluid rail.

According to a fiftieth clause, a system is provided with a pump, a first rail connected to the pump via at one or more control valves, and a second rail connected to the pump via the one or more control valves. The one or more control valves control fluid flow from the pump to one of the first rail and the second rail. A series of first valves is provided, with each first valve having a first port with an associated first valve element and an associated second valve element, and a vent line. The first port of each of the first valves receives pressurized fluid from the first rail via the first valve element. A series of first bladders is provided, with each first bladder fluidly coupled to the port of one of the first valves. A series of pairs of second valves is provided, with each second valve having a second port with an associated third valve element, and the second port of each of the second valves receiving pressurized fluid from the second rail. A series of second bladders is provided, with each second bladder fluidly coupled to the second port of one of the second valves. A series of pairs of actuators is provided, with one of the actuators in each pair of actuators coupled to the first valve element and third valve element of one of the second valves in each pair for movement therewith, and the other of the actuators in each pair of actuators coupled to the second valve element and third valve element of the other of the second valves in each pair for movement therewith.

According to a fifty-first clause, the system of any of the preceding or following clauses further comprising one or more check valves fluidly coupling the vent line of the at least one of the first ports to the second rail, wherein the one or more check valves are positioned to be closed when a pressure in the second rail is greater than a pressure in the at least one of the first ports with the second valve element in an open position.

According to a fifty-second clause, a method is provided. Fluid flow is pumped to a first rail via a control valve in a first position. Fluid flow is pumped to a second rail via the control valve in a second position. A first actuator is actuated to a first position thereby moving a first valve element in a first valve and a second valve element in a second valve to open positions with the control valve in the first position thereby inflating a first bladder connected to the first valve while maintaining deflation of a second bladder connected to the second valve. The first actuator is actuated to the first position thereby moving the first valve element and the second valve element to open positions with the control valve in the second position thereby inflating the second bladder connected to the second valve without changing a state of inflation of the first bladder. A second actuator is actuated to a first position thereby moving a third valve element in the first valve and a fourth valve element in a third valve to open positions with the control valve in the first position thereby deflating a first bladder connected to the first valve while maintaining deflation of a third bladder connected to the third valve.

According to fifty-third clause, the method of any of the preceding or following clauses further comprising opening a vent valve to a vent position thereby fluidly coupling the second rail to atmosphere, and opening a check valve in response to a pressure in the second rail being less than a pressure in the first valve thereby deflating of the first bladder with the second actuator in the first position.

According to a fifty-fourth clause, an assembly is provided with a first layer connected to a second layer to form a bladder, the first layer defining a first aperture therethrough, and one of the first or second layers defining a second aperture therethrough. A third layer is connected to the first layer and positioned between the first and second layers within the bladder. The third layer is movable between a first position covering the first aperture, and a second position spaced apart from the first aperture.

According to a fifty-fifth clause, the assembly of any of the preceding or following clauses wherein at least one of the first, second, and third layers comprise a thermoplastic.

According to a fifty-sixth clause, the assembly of any of the preceding or following clauses wherein the third layer comprises one or more perforations therethrough, with the one or more perforations overlapping the first aperture when the third layer is in the first position.

According to a fifty-seventh clause, the assembly of any of the preceding or following clauses wherein the third layer is connected to the first layer along a proximal end, and extends to a distal free end.

According to a fifty-eight clause, the assembly of any of the preceding or following clauses wherein the third layer is connected to the first layer at a first end and is connected to the second layer at a second end opposite thereto.

According to a fifty-nineth clause, the assembly of any of the preceding or following clauses wherein the assembly has a fourth layer connected to one of the first or second layers, with the fourth layer movable between a first position covering the second aperture, and a second position spaced apart from the second aperture.

According to a sixtieth clause, the assembly of any of the preceding or following clauses wherein the third and fourth layers cover the first and second apertures, respectively, in the first positions.

According to a sixty-first clause, an assembly is provided with a first bladder comprising a first layer connected to a second layer, and a third layer connected to the first layer. The first layer defines a first aperture therethrough. One of the first or second layers defines a second aperture therethrough. The first bladder is in fluid communication with a pump via the first aperture, and the third layer is movable from a first position covering the first aperture and a second position spaced apart from the first aperture. A second bladder comprises a fourth layer connected to a fifth layer to form a cavity, the fifth layer defining a third aperture therethrough.

According to a sixty-second clause, the assembly of any of the preceding or following clauses further comprising the pump, a valve fluidly connecting the pump to the second aperture of the first bladder, and a controller configured to control the valve between an open position and a closed position, wherein the first bladder inflates with the valve in the open position.

According to a sixty-third clause, the assembly of any of the preceding or following clauses further comprising a second valve, wherein the first bladder is positioned between and fluidly connects the first valve to the second valve, and wherein the second bladder is positioned between and fluidly connects the first valve to the second valve, and is arranged for parallel fluid flow with the first bladder. The controller is configured to control the second valve between a closed position and an open position, wherein the first bladder deflates with the second valve in the closed position.

According to a sixty-fourth clause, the assembly of any of the preceding or following clauses wherein the third aperture of the second bladder is fluidly connected to the first bladder, the second bladder receiving fluid flow from the first aperture of the first bladder.

According to a sixty-fifth clause, the assembly of any of the preceding or following clauses wherein the third aperture of the second bladder is the sole aperture in the second bladder.

According to a sixty-sixth clause, the assembly of any of the preceding or following clauses wherein the third layer of the first bladder comprises one or more perforations therethrough, the perforations positioned to overlap the first aperture of the first bladder when the third layer is in the first position.

According to a sixty-seventh clause, the assembly of any of the preceding or following clauses wherein the third layer of the first bladder is connected to the second layer of the first bladder.

According to a sixty-eighth clause, the assembly of any of the preceding or following clauses further comprising a third bladder comprising a sixth layer connected to a seventh layer, and an eighth layer connected to the sixth layer, wherein the sixth layer defines a fourth aperture, wherein the sixth or the seventh layer defines a fifth aperture therethrough, wherein the eighth layer is movable from a first position covering the fourth aperture and a second position spaced apart from the fourth aperture. The third bladder is fluidly connected to the first bladder via the first aperture of the first bladder and the fifth aperture of the third bladder. The second bladder is fluidly connected to the third bladder via the fourth aperture of the third bladder and the third aperture of the second bladder.

According to a sixty-nineth clause, the assembly of any of the preceding or following clauses wherein the eighth layer of the third bladder defines one or more perforations therethrough, with the perforations positioned to overlap the fourth aperture of the third bladder when the third layer is in the first position.

According to a seventieth clause, the assembly of any of the preceding or following clauses wherein the first bladder further comprises a ninth layer positioned between the first and second layers and connected to one of the first or second layers, the ninth layer moveable from a first position covering the second aperture, and a second position spaced apart from the second aperture.

According to a seventy-first clause, the assembly of any of the preceding or following clauses wherein the fourth layer or the fifth layer of the second bladder defines a sixth aperture therethrough. The second bladder comprises a tenth layer positioned between the fourth and fifth layers and connected to the fourth layer of the second bladder, with the tenth layer of the second bladder movable from a first position covering the third aperture of the second bladder. The second bladder comprises an eleventh layer positioned between the fourth and fifth layers and connected to one of the fourth or fifth layers, with the eleventh layer of the second bladder movable from a first position covering the sixth aperture of the second bladder to a second position spaced apart from the sixth aperture.

According to a seventy-second clause, a seat assembly is provided with a seat member comprising a seating surface, a pump, and a bladder assembly supported by the seat member and in fluid communication with the pump to receive fluid flow therefrom. The bladder assembly comprises a first bladder comprising a first layer connected to a second layer, with the first layer defining a first aperture therethrough, and one of the first or second layers defining a second aperture therethrough, the first bladder in fluid communication with the pump via the first aperture. The first bladder further comprises a third layer connected to the one of the first or second layers, with the third layer movable from a first position covering the second aperture and a second position spaced apart from the second aperture. The bladder assembly comprises a second bladder comprising a fourth layer connected to a fifth layer, with the fourth layer defining a third aperture therethrough.

According to a seventy-third clause, the seat assembly of any of the preceding or following clauses wherein the bladder assembly is inflated by the pump to modify an orientation of seating surface of the seat member.

According to a seventy-fourth clause, a system is provided with a thermoelectric device with a first heat transfer surface and a second heat transfer surface adapted for cooperation with a therapy device such that the first heat transfer surface is spaced apart from a contact surface of the therapy device to transfer heat to or from the contact surface. A fluid heat transfer system is in fluid communication with the thermoelectric device to transfer heat to or from the thermoelectric device.

According to a seventy-fifth clause, the system of any of the preceding or following clauses wherein the liquid heat transfer system is further defined as a first fluid heat transfer system in fluid communication with the first heat transfer surface to transfer heat to or from the contact surface of the therapy device.

According to a seventy-sixth clause, the system of any of the preceding or following clauses wherein the first fluid heat transfer system is further provided with a fluid reservoir in fluid communication with the first heat transfer surface.

According to a seventy-seventh clause, the system of any of the preceding or following clauses further provided with tubing in fluid communication with the fluid reservoir and the therapy device to space the thermoelectric device away from the therapy device.

According to a seventy-eighth clause, the system of any of the preceding or following clauses further provided with insulation disposed about the tubing.

According to a seventy-nineth clause, the system of any of the preceding or following clauses further provided with a bladder in fluid communication with the tubing. The bladder further provides the contact surface.

According to an eightieth clause, the system of any of the preceding or following clauses wherein the bladder is sized to be oriented within a seat assembly.

According to an eighty-first clause, a seat assembly is provided with a seat bottom, a seat back, and the system of any of the preceding or following clauses.

According to an eighty-second clause, the system of any of the preceding or following clauses wherein the bladder is further defined as a sleeve.

According to an eighty-third clause, the system of any of the preceding or following clauses wherein the first fluid heat transfer system further comprises a pump in fluid communication with the fluid reservoir to pump fluid from the fluid reservoir to the contact surface.

According to an eighty-fourth clause, the system of any of the preceding or following clauses further provided with a second fluid heat transfer system in fluid communication with the second heat transfer surface to transfer heat to or from the second heat transfer surface.

According to an eighty-fifth clause, the system of any of the preceding or following clauses wherein the second fluid heat transfer system further comprises a heat exchanger to convey heat to or from the second heat transfer surface.

According to an eighty-sixth clause, the system of any of the preceding or following clauses further provided with conductive pipes in conductive contact with the heat exchanger and the second heat transfer surface.

According to an eighty-seventh clause, the system of any of the preceding or following clauses wherein the heat exchanger is further provided as a radiator.

According to an eighty-eighth clause, the system of any of the preceding or following clauses further provided with a fluid actuator in fluid communication with the heat exchanger to convey a fluid through the heat exchanger to transfer heat to or away from the heat exchanger.

According to an eighty-nineth clause, the system of any of the preceding or following clauses wherein the thermoelectric device is further provided with a material with a high electrical conductivity, a low thermal conductivity, and a temperature difference across the material in response to an induced thermoelectric voltage across the material.

According to a ninetieth clause, the system of any of the preceding or following clauses wherein the material of the thermoelectric device is further provided as a conductive silicone or graphite.

According to a ninety-first clause, the system of any of the preceding or following clauses further provided with a power source in electrical communication with the thermoelectric device to cool the first heat transfer surface.

According to a ninety-second clause, the system of any of the preceding or following clauses further provided with a power source in electrical communication with the thermoelectric device to heat the first heat transfer surface.

According to a ninety-third clause, the system of any of the preceding or following clauses wherein the liquid heat transfer system is further provided as a thermally conductive liquid.

According to a ninety-fourth clause, the system of any of the preceding or following clauses wherein the thermally conductive liquid is further provided as water or coolant.

According to a ninety-fifth clause, a method is provided by pumping a liquid along a front heat transfer surface of a thermoelectric device with a rear heat transfer surface. The liquid is pumped through a therapy device with a contact surface, spaced apart from the thermoelectric device.

According to a ninety-sixth clause, a system is provided with a therapy device with a contact surface. A thermoelectric device is provided with a first heat transfer surface and a second heat transfer surface. A fluid reservoir is in fluid communication with the first heat transfer surface. Tubing is in fluid communication with the fluid reservoir and the therapy device to space the thermoelectric device away from the therapy device. A pump is in fluid communication with the fluid reservoir to pump fluid from the fluid reservoir to the contact surface.

According to a ninety-seventh clause, a ventilation assembly for a seat, in combination with, or without, any of the preceding or following clauses comprising: a trim cover configured to contact an occupant and provide ventilation from a fluid flow when assembled in a seat and during operation; a ventilation bag (i) defining a cavity and a channel in fluid communication with the cavity and disposed opposite the trim cover, the channel being configured to connect with a blower through one or more additional layers and (ii) fixed to the trim cover such that a fluid flow travels from the ventilation bag to the trim cover or vice versa; and a spacer fabric disposed in the cavity.

According to a ninety-eighth clause, the ventilation assembly of any of the preceding or following clauses, wherein the ventilation bag is sewn or welded to the trim cover.

According to a ninety-nineth clause, the ventilation assembly of any of the preceding or following clauses, wherein the ventilation bag is fixed to the trim cover at least partially along an outer periphery.

According to a 100th clause, the ventilation assembly of any of the preceding or following clauses, wherein the one or more additional layers comprise a substrate configured to support a blower.

According to a 101st clause, the ventilation assembly of any of the preceding or following clauses, wherein the one or more additional layers comprise a foamless mesh.

According to a 102nd clause, the ventilation assembly of any of the preceding or following clauses further comprising the blower supported by the substrate.

According to a 103rd clause, the ventilation assembly of any of the preceding or following clauses wherein the ventilation bag comprises a first sheet adjacent to the trim cover and a second sheet fixedly sealed to the first sheet and opposite the trim cover such that the first and second sheets define the cavity and the channel.

According to a 104th clause, the ventilation assembly of any of the preceding or following clauses wherein the one or more additional layers do not include a foam cushion.

According to a 105th clause, a seat assembly comprising the ventilation assembly of any of the preceding or following clauses wherein the outer periphery is the outer periphery of a face of the seat assembly.

According to a 106th clause, a vehicle seat comprising the ventilation assembly of any of the preceding or following clauses and a seat frame supporting the ventilation assembly.

According to a 107th clause, a seat subassembly, in combination with, or without, any of the preceding or following clauses comprising: a trim cover having an exposed surface and an unexposed surface opposite the exposed surface, the trim cover configured to provide ventilation to an occupant adjacent to the exposed surface when a fluid flow is received at the unexposed surface; a carrier configured to support a blower, the carrier defining an orifice for receiving the fluid flow from the blower; a first sheet fixed to the trim cover and between the trim cover and the carrier; a second sheet between the first sheet and the carrier, the second sheet sealed to the first sheet such that the first and second sheets define a cavity including a channel, the channel configured to receive a fluid flow from the blower through the orifice; a spacer disposed in the cavity; and one or more additional layers disposed between the second sheet and the carrier such that the channel provides a passage through the one or more additional layers wherein ventilation is provided to or from the blower through the cavity and to or from the occupant adjacent to the trim cover.

According to a 108th clause, the seat subassembly of any of the preceding or following clauses wherein the first sheet is fixed to the trim cover by being sewn or welded.

According to a 109th clause, the seat subassembly of any of the preceding or following clauses wherein the spacer is disposed between the first and second sheets.

According to a 110th clause, a seat assembly comprising a seat frame and the seat subassembly of any of the preceding or following clauses supported by the seat frame.

According to a 111th clause, a ventilation assembly for a seat, in combination with, or without, any of the preceding or following clauses comprising: a trim cover; a carrier configured to support a blower, the carrier defining a first orifice configured to receive a fluid flow from the blower during operation; a cushion disposed between the trim cover and the carrier, the cushion adjacent to the carrier and defining a second orifice; and a membrane disposed between the cushion and the trim cover and extending through the second orifice, the membrane fixed to the trim cover such that the fluid flow is received or delivered through the first orifice to the trim cover and provides ventilation through the trim cover to an occupant adjacent to the trim cover during operation.

According to a 112th clause, the ventilation assembly of any of the preceding or following clauses wherein the membrane is fixed to the trim cover along an outer periphery.

According to a 113th clause, the ventilation assembly of any of the preceding or following clauses wherein the membrane is sewn or welded to the trim cover.

According to a 114th clause, the ventilation assembly of any of the preceding or following clauses wherein the membrane is sewn to the trim cover.

According to a 115th clause, the ventilation assembly of any of the preceding or following clauses wherein the membrane welded to the trim cover.

According to 116th clause, a vehicle seat comprising a seat frame and the ventilation assembly of any of the preceding or following clauses supported by the seat frame.

According to a 117th clause, an assembly, in combination with, or without, any of the preceding or following clauses comprising: a perforated trim cover layer; a tie down membrane connected to the trim cover layer; a barrier layer connected to the trim cover layer; and a porous spacer material layer positioned between the trim cover layer and the barrier layer.

According to a 118th clause, the assembly of any of the preceding or following clauses wherein the porous spacer material layer is positioned between the trim cover layer and at least a portion of the tie down membrane.

According to a 119th clause, the assembly of any of the preceding or following clauses further comprising a ventilation port connected to the barrier layer.

According to a 120th clause, the assembly of any of the preceding or following clauses wherein the spacer material layer is enclosed by the trim cover layer and the barrier layer.

According to a 121st clause, the assembly of any of the preceding or following clauses further comprising a second porous spacer material layer, the second porous spacer material layer positioned between the first porous spacer material layer and the barrier layer.

According to a 122nd clause, the assembly of any of the preceding or following clauses wherein the first porous spacer material layer comprises reticulated foam.

According to a 123rd clause, the assembly of any of the preceding or following clauses wherein the second porous spacer material layer comprises a spacer fabric.

According to a 124th clause, the assembly of any of the preceding or following clauses wherein the trim cover layer is connected to the barrier layer about a perimeter of the assembly.

According to a 125th clause, the assembly of any of the preceding or following clauses further comprising one or more trim panels connected to the assembly adjacent to the perimeter thereof.

According to a 126th clause, the assembly of any of the preceding or following clauses further comprising one or more tie downs connected to the assembly adjacent to the perimeter thereof.

According to a 127th clause, the assembly of any of the preceding or following clauses further comprising a perforated heating pad positioned between the trim cover layer and the barrier layer.

According to a 128th clause, the assembly of any of the preceding or following clauses wherein the perforated trim cover layer comprises a first panel connected to a second panel along a join with an allowance.

According to a 129th clause, the assembly of any of the preceding or following clauses wherein the join comprises a seam.

According to a 130th clause, the assembly of any of the preceding or successive clauses, wherein the tie down membrane is connected to the join and/or the allowance of the first and second panels.

According to a 131st clause, the assembly of any of the preceding or successive clauses, wherein the porous spacer material defines a trench; and wherein the allowance is received within the trench.

According to a 132nd clause, the assembly of any of the preceding or successive clauses, wherein the allowance is sewn to the tie down membrane through the porous spacer material.

According to a 133rd clause, the assembly of any of the preceding or successive clauses, wherein the tie down membrane is connected to the trim cover layer in a central region of a panel thereof via decorative stitching, bonding, and/or laminating.

According to a 134th clause, the assembly of any of the preceding or successive clauses, wherein the perforated trim cover layer comprises leather, leatherette, vinyl, and/or fabric.

According to a 135th clause, the assembly of any of the preceding or successive clauses, wherein the barrier layer comprises a non-permeable layer.

According to a 136th clause, the assembly of any of the preceding or successive clauses, wherein the barrier layer comprises plastic.

According to a 137th clause, the assembly of any of the preceding or successive clauses, wherein the tie down membrane is layered between the first and second porous spacer material layers such that the tie down membrane is separated from the trim cover layer by the first porous spacer material layer.

According to a 138th clause, the assembly of any of the preceding or successive clauses, wherein the first spacer material layer and the tie down membrane are each connected to the second spacer material layer.

According to a 139th clause, the assembly of any of the preceding or successive clauses, wherein the first spacer material layer and the tie down membrane are each connected to the second spacer material layer via bonding and/or laminating.

According to a 140th clause, the assembly of any of the preceding or successive clauses, wherein the tie down membrane comprises a nonwoven fabric.

According to a 141st clause, the assembly of any of the preceding or successive clauses, wherein the porous spacer material layer comprises a first portion and a second portion; and wherein the tie down membrane extends between the first and second portions of the porous spacer material layer to the barrier layer.

According to a 142nd clause, the assembly of any of the preceding or successive clauses, wherein the second porous spacer material layer comprises a first portion and a second portion; and wherein the tie down membrane extends between the first and second portions of the second porous spacer material layer to the barrier layer.

According to a 143rd clause, the assembly of any of the preceding or successive clauses, wherein the tie down membrane extends transversely through the spacer material layer and the barrier layer to a distal end.

According to a 144th clause, the assembly of any of the preceding or successive clauses, wherein the barrier layer is positioned between the distal end of the tie down membrane and the spacer material layer such that the distal end of the tie down membrane is outboard of the barrier layer.

According to a 145th clause, the assembly of any of the preceding or successive clauses, wherein the barrier layer is connected to the tie down membrane.

According to a 146th clause, the assembly of any of the preceding or successive clauses, wherein the tie down membrane is perforated.

According to a 147th clause, the assembly of any of the preceding or successive clauses, wherein the tie down membrane comprises a screen.

According to a 148th clause, a seat assembly comprising: a frame; and an assembly according to any of the preceding or successive clauses.

According to a 149th clause, the seat assembly of any of the preceding or successive clauses, further comprising a cushion member covered by the assembly; wherein the assembly is connected to the frame and/or the cushion member.

According to a 150th clause, the seat assembly of any of the preceding or successive clauses, further comprising an air pump and/or a fan connected to the barrier layer.

According to a 151st clause, a method, in combination with, or without, any of the successive clauses, comprising: positioning one or more porous spacer material layers between a perforated trim cover layer and a barrier layer; connecting the perforated trim cover layer to a tie down membrane with the spacer layer positioned between the trim cover layer and at least a portion of the tie down membrane; and connecting the perforated trim cover layer to the barrier layer to assemble a trim assembly.

According to a 152nd clause, the method of any of the preceding or successive clauses, wherein positioning one or more spacer layers between the perforated trim cover layer and the barrier layer further comprises positioning a first spacer material layer and a second spacer material layer between the perforated trim cover layer and the barrier layer.

According to a 153rd clause, the method of any of the preceding or successive clauses, further comprising forming a trench in the spacer material layer; and positioning an allowance of a join between two panels of the trim cover layer into the trench.

According to a 154th clause, the method of any of the preceding or successive clauses, further comprising layering the spacer material layer between the tie down membrane and the trim cover layer; and sewing the allowance to the tie down membrane through the spacer material layer along the trench.

According to a 155th clause, the method of any of the preceding or successive clauses, wherein positioning one or more porous spacer material layers between the perforated trim cover layer and the barrier layer further comprises positioning a first portion and a second portion of the spacer material layer; and wherein the method further comprises positioning the tie down membrane such that it extends transversely to the trim cover layer and extends between the first and second portions of the spacer material layer to a distal end.

According to a 156th clause, the method of any of the preceding or successive clauses, further comprising connecting the distal end to the barrier layer.

According to a 157th clause, the method of any of the preceding or successive clauses, further comprising connecting the trim assembly to a frame of a seat assembly.

According to a 158th clause, the method of any of the preceding or successive clauses, further comprising positioning an inlet port in the barrier layer.

According to a 159th clause, the method of any of the preceding or successive clauses, further comprising connecting a fan and/or a pump to the inlet port.

According to a 160th clause, the method of any of the preceding or successive clauses, further comprising flowing air into the inlet port, through the spacer material layer, and through the perforated trim cover layer to ventilate the trim assembly.

According to a 161st clause, the method of any of the preceding or successive clauses, further comprising flowing air across the tie down membrane.

According to a 162nd clause, an assembly, in combination with, or without, any of the successive clauses, comprising: a first fluid impermeable layer sized to be placed over a seat cushion; a plurality of adjacent trim cover segments sewn to the first fluid impermeable layer; and a seam extending through the plurality of adjacent trim cover segments and the first fluid impermeable layer.

According to a 163rd clause, the assembly of any of the preceding or successive clauses, wherein the first fluid impermeable layer further comprises a plurality of vents formed therethrough.

According to a 164th clause, the assembly of any of the preceding or successive clauses, wherein the seam extends through the first impermeable layer thereby defining a first zone and a second zone of the trim cover.

According to a 165th clause, the assembly of any of the preceding or successive clauses, further comprising a second fluid impermeable layer in cooperation with the first fluid impermeable layer to provide a fluid chamber therebetween.

According to a 166th clause, the assembly of any of the preceding or successive clauses, wherein the second fluid impermeable layer further comprises a first portion extending through the first zone and the second zone.

According to a 167th clause, the assembly of any of the preceding or successive clauses, wherein the second fluid impermeable layer further comprises a second portion extending in a direction opposite of the first portion for connection to the seat cushion.

According to a 168th clause, the assembly of any of the preceding or successive clauses, wherein the second fluid impermeable layer is perforated to allow air to pass through the first zone and the second zone.

According to a 169th clause, the assembly of any of the preceding or successive clauses, further comprising a fluid actuator attached to the second fluid impermeable layer to convey a fluid through the fluid chamber and out of the first fluid impermeable layer.

According to a 170th clause, the assembly of any of the preceding or successive clauses, wherein the fluid actuator further comprises a fan attached to one of the first zone or the second zone to provide fluid communication through the first zone and the second zone.

According to a 171st clause, the assembly of any of the preceding or successive clauses, wherein the fan conveys air through the first portion of the second fluid impermeable layer, the fluid chamber, and the first fluid impermeable layer, and wherein the air passes from the first zone to the second zone through the second fluid impermeable layer.

According to a 172nd clause, the assembly of any of the preceding or successive clauses, further comprising a first fluid permeable layer displaced along the first fluid impermeable layer.

According to a 173rd clause, the assembly of any of the preceding or successive clauses, wherein the first fluid permeable layer extends through the first zone and the second zone, and wherein the first fluid permeable layer is sewn to the seam.

According to a 174th clause, the assembly of any of the preceding or successive clauses, further comprising a second fluid permeable layer sized to be received within the fluid chamber and spaced apart from the first fluid permeable layer.

According to a 175th clause, the assembly of any of the preceding or successive clauses, wherein the fluid impermeable layer is insulative.

According to a 176th clause, the assembly of any of the preceding or successive clauses, wherein the plurality of adjacent trim cover segments is perforated to permit the fluid to pass through the trim cover segments.

According to a 177th clause, the assembly of any of the preceding or successive clauses, wherein the second fluid impermeable layer extends through the first zone and the second zone, and wherein the second fluid impermeable layer further comprises a first perforated portion extending to the seam of the trim cover segments and a second portion connected to the seat cushion.

According to a 178th clause, a seat assembly, in combination with, or without, any of the successive clauses, comprising: a seat bottom; a seat back extending in an upright position from the seat bottom; a seat cushion attached to the seat bottom or the seat back; and the trim cover assembly of any of the preceding or successive clauses, installed over the seat cushion.

According to a 179th clause, the seat assembly of any of the preceding or successive clauses, wherein the seat cushion is fluid permeable.

According to a 180th clause, a method, in combination with, or without, any of the successive clauses, comprising: attaching a plurality of adjacent trim cover segments to a first fluid impermeable layer; and sewing a seam through the adjacent trim cover segments and the first fluid impermeable layer to create a first zone and a second zone.

According to a 181st clause, the method of any of the preceding or successive clauses, further comprising: attaching a second fluid impermeable layer in cooperation with the first fluid impermeable layer, with a perforated first portion extending through the first zone and the second zone.

According to a 182nd clause, the method of any of the preceding or successive clauses, further comprising attaching a fluid actuator to a second fluid impermeable layer.

According to a 183rd clause, the method of any of the preceding or successive clauses, further comprising: installing the first fluid impermeable layer, the second fluid impermeable layer, and the trim cover segments over a preassembled seat assembly with a cushion and a frame.

According to a 184th clause, an assembly, in combination with, or without, any of the successive clauses, comprising: a first fluid impermeable layer sized to be received by a seat cushion, wherein the first fluid impermeable layer is provided with at least one vent formed therethrough; a plurality of adjacent trim cover segments sewn to the first fluid impermeable layer with a seam extending through the trim cover segments and the first fluid impermeable layer to create a first zone and a second zone; a perforated second fluid impermeable layer in cooperation with the first fluid impermeable layer to provide a fluid chamber therebetween, wherein the second fluid impermeable layer is provided with a first portion extending vertically through the first zone and the second zone and a second portion connected to the seat cushion; a first fluid permeable layer sized to be received by the first fluid impermeable layer; a fluid actuator directly attached to the first portion of the second fluid impermeable layer; a second fluid permeable layer displaced along the first fluid impermeable layer; wherein the second fluid permeable layer is spaced apart from the first fluid permeable layer; and a heat transfer layer along the second fluid permeable layer, wherein the heat transfer layer is provided with an electrically conductive heater mat.

According to a 185th clause, an assembly, in combination with, or without, any of the successive clauses, comprising: a first fluid impermeable layer sized to be placed over a seat cushion with at least one vent formed therethrough; and a fluid actuator attached to the first fluid impermeable layer to convey a fluid through the vent of the first fluid impermeable layer.

According to a 186th clause, the assembly of any of the preceding or successive clauses, further comprising a second fluid impermeable layer in cooperation with the first fluid impermeable layer to provide a fluid chamber therebetween.

According to a 187th clause, the assembly of any of the preceding or successive clauses, wherein the fluid actuator is attached directly to the second fluid impermeable layer to covey the fluid through the fluid chamber and then out of the vent of the first fluid impermeable layer.

According to a 188th clause, the assembly of any of the preceding or successive clauses, further comprising a first fluid permeable layer sized to be received within the fluid chamber.

According to a 189th clause, the assembly of any of the preceding or successive clauses, further comprising a second fluid permeable layer displaced along the first fluid impermeable layer spaced apart from the first fluid permeable layer.

According to a 190th clause, the assembly of any of the preceding or successive clauses, wherein the fluid actuator is attached directly to the second fluid impermeable layer.

According to a 191st clause, the assembly of any of the preceding or successive clauses, wherein the fluid actuator is welded to the second fluid impermeable layer.

According to a 192nd clause, the assembly of any of the preceding or successive clauses, further comprising a heat transfer layer displaced along the first fluid impermeable layer spaced apart from the second fluid impermeable layer.

According to a 193rd clause, the assembly of any of the preceding or successive clauses, wherein the heat transfer layer further comprises an electrically conductive heater mat.

According to a 194th clause, the assembly of any of the preceding or successive clauses, further comprising an external trim layer disposed over the first fluid impermeable layer and the second fluid impermeable layer.

According to a 195th clause, the assembly of any of the preceding or successive clauses, wherein the external trim layer is perforated to permit the fluid to pass through the external trim layer.

According to a 196th clause, the assembly of any of the preceding or successive clauses, wherein the external trim layer is sewn to the first fluid impermeable layer, without an adhesive.

According to a 197th clause, the assembly of any of the preceding or successive clauses, wherein the fluid actuator further comprises a fan.

According to a 198th clause, the assembly of any of the preceding or successive clauses, wherein the first fluid impermeable layer is insulative.

According to a 199th clause, the assembly of any of the preceding or successive clauses, wherein a plurality of vents is formed through the first fluid impermeable layer.

According to a 200th clause, a seat assembly, in combination with, or without, any of the successive clauses, comprising: a seat bottom; a seat back extending in an upright position from the seat bottom; a seat cushion attached to the seat bottom or the seat back; and the trim cover assembly of any of the preceding or successive clauses installed over the seat cushion.

According to a 201st clause, the seat assembly of any of the preceding or successive clauses, wherein the seat cushion is fluid permeable.

According to a 202nd clause, a method, in combination with, or without, any of the successive clauses, comprising: attaching a fluid actuator to a first fluid impermeable layer; attaching an external trim layer over the first fluid impermeable layer; and installing the first fluid impermeable layer, and the external trim layer over a preassembled seat assembly with a cushion and a frame.

According to a 203rd clause, the method of any of the preceding or successive clauses, further comprising attaching a second fluid impermeable layer in cooperation with the first fluid impermeable layer to provide a fluid chamber therebetween.

According to a 204th clause, an assembly, in combination with, or without, any of the successive clauses, comprising: a first fluid impermeable layer sized to be received by a seat cushion, wherein the first fluid impermeable layer is provided with at least one vent formed therethrough; a second fluid impermeable layer in cooperation with the first fluid impermeable layer to provide a fluid chamber therebetween; a first fluid permeable layer sized to be received by the first fluid impermeable layer; a fluid actuator directly attached to the second fluid impermeable layer; a second fluid permeable layer displaced along the first fluid impermeable layer; wherein the second fluid permeable layer is spaced apart from the first fluid permeable layer; a heat transfer layer along the second fluid permeable layer, wherein the heat transfer layer is provided with an electrically conductive heater mat; and a perforated external trim layer disposed over the first fluid impermeable layer and the second impermeable layer to permit fluid to pass through the external trim layer.

According to a 205th clause, an assembly, in combination with, or without, any of the successive clauses, comprising: a first trim cover layer sized to be placed over a seat cushion; and at least one inflatable bladder assembly supported upon the first trim cover layer to impart a pressure upon an occupant.

According to a 206th clause, the assembly of any of the preceding or successive clauses, wherein the first trim cover layer is fluid impermeable.

According to a 207th clause, the assembly of any of the preceding or successive clauses, wherein the first fluid impermeable layer further comprises at least one vent formed therethrough.

According to a 208th clause, the assembly of any of the preceding or successive clauses, further comprising a second fluid impermeable layer in cooperation with the first fluid impermeable layer to provide a fluid chamber therebetween.

According to a 209th clause, the assembly of any of the preceding or successive clauses, further comprising a second fluid actuator attached directly to the second fluid impermeable layer.

According to a 210th clause, the assembly of any of the preceding or successive clauses, wherein the second fluid actuator is welded to the second fluid impermeable layer.

According to a 211th clause, the assembly of any of the preceding or successive clauses, wherein the second fluid actuator further comprises a fan.

According to a 212th clause, the assembly of any of the preceding or successive clauses, wherein the at least one inflatable bladder assembly is oriented within the fluid chamber.

According to a 213th clause, the assembly of any of the preceding or successive clauses, further comprising a first fluid permeable layer sized to be received within the fluid chamber, wherein the first fluid permeable layer is displaced upon the inflatable bladder assembly.

According to a 214th clause, the assembly of any of the preceding or successive clauses, further comprising a second fluid permeable layer displaced along the first fluid impermeable layer spaced apart from the first fluid permeable layer.

According to a 215th clause, the assembly of any of the preceding or successive clauses, further comprising a heat transfer layer displaced along the first fluid impermeable layer spaced apart from the second fluid impermeable layer.

According to a 216th clause, the assembly of any of the preceding or successive clauses, wherein the heat transfer layer further comprises an electrically conductive heater mat.

According to a 217th clause, the assembly of any of the preceding or successive clauses, further comprising an external trim layer disposed over the first fluid impermeable layer and the second fluid impermeable layer, wherein the external trim layer is perforated to permit the fluid to pass through the external trim layer.

According to a 218th clause, the assembly of any of the preceding or successive clauses, wherein the external trim layer is sewn to the first fluid impermeable layer, without an adhesive.

According to a 219th clause, the assembly of any of the preceding or successive clauses, further comprising a controller in electrical communication with the at least one inflatable bladder assembly configured: receive input indicative of a manual adjustment; and adjust the at least one inflatable bladder assembly to impart a pressure upon an occupant.

According to a 220th clause, the assembly of any of the preceding or successive clauses, wherein the first fluid impermeable layer is insulative.

According to a 221st clause, the assembly of any of the preceding or successive clauses, wherein a plurality of vents is formed through the first fluid impermeable layer.

According to a 222nd clause, the assembly of any of the preceding or successive clauses, wherein the at least one inflatable air bladder assembly further comprises a plurality of inflatable air bladder assemblies housed within the fluid chamber.

According to a 223rd clause, a seat assembly, in combination with, or without, any of the successive clauses, comprising: a seat bottom; a seat back extending in an upright position from the seat bottom; a seat cushion attached to the seat bottom or the seat back; and the assembly of any of the preceding or successive clauses, installed over the seat cushion.

According to a 224th clause, the seat assembly of any of the preceding or successive clauses, wherein the seat cushion is fluid permeable.

According to a 225th clause, a method, in combination with, or without, any of the successive clauses, comprising: installing a first trim cover layer sized to be placed over a seat cushion; and installing at least one inflatable bladder assembly supported upon the first trim cover layer to impart a pressure upon an occupant.

According to a 226th clause, an assembly, in combination with, or without, any of the successive clauses, comprising: an insulative first fluid impermeable layer sized to be received by a seat cushion, wherein the first fluid impermeable layer is provided with at least one vent formed therethrough; a second fluid impermeable layer in cooperation with the first fluid impermeable layer to provide a fluid chamber therebetween; a fluid actuator directly attached to the second impermeable layer; at least one inflatable bladder assembly oriented within the fluid chamber and supported upon the first fluid impermeable layer to impart a pressure upon an occupant; a first fluid permeable layer displaced upon the inflatable bladder assembly; a second fluid permeable layer displaced along the first fluid impermeable layer; wherein the second fluid permeable layer is spaced apart from the first fluid permeable layer; a heat transfer layer along the second fluid permeable layer, wherein the heat transfer layer is provided with an electrically conductive heater mat; and a perforated external trim layer disposed over the first fluid impermeable layer and the second impermeable layer to permit fluid to pass through the external trim layer.

According to a 227th clause, a support member, in combination with, or without, any of the successive clauses, of cushioning material providing a seat support surface sized to support an occupant with a weakened region to provide a movable portion for translation relative to the seat support surface from a local pressure effect imparted upon a rear surface of the movable portion from a local pressure device provided on the rear surface of the support of cushioning material, which is spaced apart from the seat support surface.

According to a 228th clause, the support member of any of the preceding or successive clauses, wherein the weakened region extends around a majority of a perimeter of the movable portion.

According to a 229th clause, the support member of any of the preceding or successive clauses, wherein the weakened region extends around a perimeter of the movable portion.

According to a 230th clause, the support member of any of the preceding or successive clauses, wherein the weakened region is further defined as a recess formed into the support member to partially separate the movable portion from the seat support surface.

According to a 231st clause, the support member of any of the preceding or successive clauses, wherein the recess is formed through the support member.

According to a 232nd clause, the support member of any of the preceding or successive clauses, wherein the recess is formed to a blind depth with a tether in the weakened region.

According to a 233rd clause, the support member of any of the preceding or successive clauses, wherein the weakened region is further defined as a plurality of recesses formed in the support member to partially separate the movable portion from a remainder of the support member.

According to a 234th clause, the support member of any of the preceding or successive clauses, further comprising at least one tether connecting the movable portion and the seat support surface.

According to a 235th clause, the support member of any of the preceding or successive clauses, wherein the seat support surface has a first thickness, and the tether has a second thickness that is less than the first thickness.

According to a 236th clause, the support member of any of the preceding or successive clauses, wherein the at least one tether is sized to tear during initial operation to permit untethered translation of the movable portion.

According to a 237th clause, the support member of any of the preceding or successive clauses, wherein the movable portion is strengthened relative to the seat support surface to distribute the local pressure effect imparted upon the strengthened portion from the local pressure device.

According to a 238th clause, the support member of any of the preceding or successive clauses, wherein the support member is formed with a first firmness and the movable portion is formed with a second firmness that is greater than the first firmness.

According to a 239th clause, a local pressure assembly, in combination with, or without, any of the successive clauses, comprising: a local pressure device; and the support member according to any of the preceding or successive clauses.

According to a 240th clause, the local pressure assembly of any of the preceding or successive clauses, wherein the local pressure device further comprises an inflatable air bladder.

According to a 241st clause, a seat assembly, in combination with, or without, any of the successive clauses, comprising: a seat frame; a local pressure device provided on the seat frame; and the support member according to any of the preceding or successive clauses, installed upon the seat frame with the local pressure device aligned with the movable portion.

According to a 242nd clause, a support member of any of the preceding or successive clauses, of cushioning material providing a seat support surface sized to support an occupant with a strengthened portion within the seat support surface to distribute a local pressure effect imparted upon the strengthened portion from a local pressure device.

According to a 243rd clause, the support member of any of the preceding or successive clauses, wherein the support member is formed with a first firmness and the strengthened portion is formed with a second firmness that is greater than the first firmness.

According to a 244th clause, a local pressure assembly comprising: a local pressure device; and the support member of any of the preceding or successive clauses.

According to a 245th clause, a seat assembly comprising: a seat frame; a local pressure device provided on the seat frame; and the support member of any of the preceding or successive clauses, installed upon the seat frame with the local pressure device aligned with the strengthened portion.

According to a 246th clause, a seat support member of cushioning material, in combination with, or without, any of the successive clauses, comprising: a seat support surface sized to support an occupant, with a plurality of recesses formed through the seat support surface and extending partially around a perimeter of a movable portion for translation from a local pressure effect imparted upon the movable portion from a local pressure device, the seat support surface having a first thickness; and at least one tether connecting the movable portion and the seat support surface, the tether having a second thickness that is less than the first thickness; and wherein the support member is formed with a first firmness and the movable portion is formed with a second firmness that is greater than the first firmness.

According to a 247th clause, an assembly, in combination with, or without, any of the successive clauses, comprising: a massage actuator operable to provide a massage effect to a seat assembly; and a controller in communication with the massage actuator, the controller programmed to: receive input indicative of an authorization to operate the massage actuator, receive input indicative of a massage request, and output a signal to operate the massage actuator in response to the authorization and the massage request.

According to a 248th clause, the assembly of any of the preceding or successive clauses, wherein the massage actuator is operable to provide at least two massage effects; and wherein the controller is further programmed to: receive input indicative of an authorization to operate a first massage effect of the massage actuator, receive input indicative of a request for the first massage effect, and output a first massage effect signal to operate the massage actuator to provide the first massage effect in response to the first massage effect authorization and the first massage effect request.

According to a 249th clause, the assembly of any of the preceding or successive clauses, wherein the controller is further programmed to: receive input indicative of an authorization to operate a second massage effect of the massage actuator, receive input indicative of a request for the second massage effect, and output a second massage effect signal to operate the massage actuator to provide the second massage effect in response to the second massage effect authorization and the second massage effect request.

According to a 250th clause, the assembly of any of the preceding or successive clauses, wherein the massage actuator further comprises at least one air bladder assembly.

According to a 251st clause, the assembly of any of the preceding or successive clauses, wherein the massage actuator further comprises a valve assembly in fluid communication with a pump and the at least one air bladder assembly, and in electrical communication with the controller to convey pressurized air from the pump to the at least one air bladder assembly in response to the signal from the controller.

According to a 252nd clause, a seat assembly, in combination with, or without, any of the successive clauses, comprising: a seat bottom; a seat back extending upright from the seat bottom; and the assembly of any of the preceding or successive clauses, wherein the massage actuator is oriented in the seat bottom or the seat back.

According to a 253rd clause, a system comprising: the assembly of any of the preceding or successive clauses; and an interface in electrical communication with the controller to output the input indicative of the massage request to the controller.

According to a 254th clause, a system, in combination with, or without, any of the successive clauses, comprising: the assembly of any of the preceding or successive clauses; and a second controller in communication with the controller to output the input indicative of the authorization.

According to a 255th clause, a method, in combination with, or without, any of the successive clauses, comprising: installing a massage actuator in a seat assembly to provide a massage effect; and deactivating the massage actuator to prevent operation of the massage actuator.

According to a 256th clause, the method of any of the preceding or successive clauses, further comprising: connecting the massage actuator to a controller that is programmed to control operation of the massage actuator; and programming the controller to deactivate operation of the massage actuator.

According to a 257th clause, the method of any of the preceding or successive clauses, further comprising inputting an activation code to activate the massage actuator.

According to a 258th clause, the method of any of the preceding or successive clauses, further comprising inputting a massage request to the massage actuator to impart the massage effect from the activated massage actuator.

According to a 259th clause, the method of any of the preceding or successive clauses, further comprising retailing an activation code for activation of the massage actuator.

According to a 260th clause, the method of any of the preceding or successive clauses, further comprising retailing a software application with an activation code to activate the massage actuator.

According to a 261st clause, the method of any of the preceding or successive clauses, further comprising activating the massage actuator with a wireless device.

According to a 262nd clause, the method of any of the preceding or successive clauses, further comprising activating the massage actuator to perform a first massage effect with a first activation code.

According to a 263rd clause, the method of any of the preceding or successive clauses, further comprising activating the massage actuator to perform a second massage effect with a second activation code.

According to a 264th clause, the method of any of the preceding or successive clauses, further comprising installing at least one air bladder assembly and at least one valve assembly in the seat assembly.

According to a 265th clause, a seat assembly, in combination with, or without, any of the successive clauses, comprising: a seat bottom; a seat back extending upright from the seat bottom; and a massage assembly comprising: a massage actuator oriented in the seat bottom or the seat back, and operable to provide a massage effect, and a controller in communication with the massage actuator, the controller programmed to: receive input indicative of an authorization to operate the massage actuator, receive input indicative of a massage request, and output a signal to operate the massage actuator in response to the authorization and the massage request.

According to a 266th clause, the seat assembly of any of the preceding or successive clauses, wherein the massage actuator is operable to provide at least two massage effects; and wherein the controller is further programmed to: receive input indicative of an authorization to operate a first massage effect of the massage actuator, receive input indicative of a request for the first massage effect, output a first massage effect signal to operate the massage actuator to provide the first massage effect in response to the first massage effect authorization and the first massage effect request, receive input indicative of an authorization to operate a second massage effect of the massage actuator, receive input indicative of a request for the second massage effect, and output a second massage effect signal to operate the massage actuator to provide the second massage effect in response to the second massage effect authorization and the second massage effect request.

According to a 267th clause, a bladder, in combination with, or without, any of the successive clauses, comprising: a first sheet including a round portion molded therein; a second sheet cooperating with the first sheet to define a round-shaped chamber; and a fluid passage having a terminating end at the chamber such that a fluid may travel through the fluid passage to the chamber.

According to a 268th clause, the bladder of any of the preceding or successive clauses, wherein the round portion is a hemisphere.

According to a 269th clause, the bladder of any of the preceding or successive clauses, wherein the round-shaped chamber is a sphere.

According to a 270th clause, the bladder of any of the preceding or successive clauses, wherein the first sheet and second sheet are heat sealed or ultrasonically welded together.

According to a 271st clause, a seat assembly comprising a frame supporting a massaging assembly comprising the bladder of any of the preceding or successive clauses.

According to a 272nd clause, a subassembly for massaging an occupant, in combination with, or without, any of the successive clauses, comprising: a plurality of bladders, each including a first sheet cooperating with a second sheet to define a round-shaped chamber and a fluid passage to the chamber, the first and/or second sheet defining a molded round portion; and a compressor to move a fluid through one or more of the fluid passages to one or more of the chambers.

According to a 273rd clause, the subassembly of any of the preceding or successive clauses, wherein the round portion includes a hemisphere.

According to a 274th clause, the subassembly of any of the preceding or successive clauses, wherein the round-shaped chamber is spherical.

According to a 275th clause, the subassembly of any of the preceding or successive clauses, wherein the first sheet and second sheet are heat sealed or ultrasonically welded together.

According to a 276th clause, a seat assembly having a frame supporting the subassembly of any of the preceding or successive clauses.

According to a 277th clause, the seat assembly of any of the preceding or successive clauses, wherein at least one round portion is configured to protrude into an occupant when seated.

According to a 278th clause, the seat assembly of any of the preceding or successive clauses, wherein a contact area with the occupant is defined about an apex of the at least one round portion.

According to a 279th clause, the seat assembly of any of the preceding or successive clauses, wherein each bladder applies a pressure of at least 2 PSI to the occupant.

According to a 280th clause, the seat assembly of any of the preceding or successive clauses, wherein each bladder applies a pressure of at least 2.5 PSI to the occupant.

According to a 281st clause, an assembly, in combination with, or without, any of the successive clauses, comprising: a first plurality of bladders arranged along a direction; and a controller cooperating with the first plurality of bladders, the controller configured to scan an occupant by filling one or more bladders with a fluid and determining an associated pressure.

According to a 282nd clause, the assembly of any of the preceding or successive clauses, wherein the scan is configured to determine a first dimension of an occupant.

According to a 283rd clause, the assembly of any of the preceding or successive clauses, wherein the controller is configured to control the first plurality of bladders to massage an occupant according to the first dimension.

According to a 284th clause, the assembly of any of the preceding or successive clauses, wherein the scan includes filling each bladder and determining a corresponding pressure.

According to a 285th clause, the assembly of any of the preceding or successive clauses, wherein the scan further comprises: filling a first group of bladders of the first plurality of bladders and determining a first pressure corresponding to the first group; and filling a second group of bladders of the first plurality of bladders that is different than the first group of bladders and determining a second pressure corresponding to the second group.

According to a 286th clause, the assembly of any of the preceding or successive clauses, further comprising one or more sensors corresponding to each bladder of the first plurality of bladders.

According to a 287th clause, the assembly of any of the preceding or successive clauses, further comprising one or more sensors disposed in an exhaust pathway of the first plurality of bladders, the one or more sensors configured to determine a pressure of the fluid released from the first plurality of bladders.

According to a 288th clause, a seat assembly comprising a frame supporting the assembly of any of the preceding or successive clauses.

According to a 289th clause, an assembly, in combination with, or without, any of the successive clauses, comprising: a first plurality of bladders arranged along a first axis, each bladder of the first plurality of bladders configured to be filled with a fluid, individually or filled simultaneously; a second plurality of bladders arranged along a second axis, the second axis different than the first axis, each bladder of the second plurality of bladders configured to be filled with the fluid individually or filled simultaneously; and one or more sensors arranged to determine pressures associated with different groups of the bladders.

According to a 290th clause, a seat back comprising a frame supporting the assembly of any of the preceding or successive clauses.

According to a 291st clause, the seat back of any of the preceding or successive clauses, wherein the first plurality of bladders is arranged along a width of the seat back at a first position and the second plurality of bladders is arranged along the width of the seat back at a second position that is different than the first position.

According to a 292nd clause, the seat back of any of the preceding or successive clauses, wherein the first plurality of bladders is arranged along a width of the seat back and the second plurality of bladders is arranged along a height of the seat back.

According to a 293rd clause, the seat back of any of the preceding or successive clauses, wherein the first plurality of bladders is arranged along a height of the seat back at a first position and the second plurality of bladders is arranged along the height of the seat back at second position that is different than the first position.

According to a 294th clause, the assembly of any of the preceding or successive clauses, further comprising a controller cooperating with the first plurality of bladders, the controller configured to scan an occupant by filling one or more bladders with a fluid and determining an associated pressure.

According to a 295th clause, the assembly of any of the preceding or successive clauses, wherein the scan is configured to determine one or more dimensions of an occupant.

According to a 296th clause, a method, in combination with, or without, any of the successive clauses, comprising: determining a first pressure associated a first bladder; determining a second pressure associated with a second bladder; determining a first occupant dimension based on the first and second pressures.

According to a 297th clause, the method of any of the preceding or successive clauses, wherein first and second pressures are determined by releasing the fluid from the first and second bladders.

According to a 298th clause, the method of any of the preceding or successive clauses, further comprising applying a massaging effect to an occupant based on the first occupant dimension.

According to a 299th clause, the method of any of the preceding or successive clauses, further comprising determining a third pressure associated with a third bladder and determining a second occupant dimension based on the third pressure and the first and/or second pressures.

According to a 300th clause, the method of any of the preceding or successive clauses, further comprising applying a massaging effect to an occupant based on the first and second occupant dimensions.

According to a 301st clause, a valve assembly, in combination with, or without, any of the successive clauses, comprising: a valve body sized for translation within a fluid chamber; a pair of opposed seals oriented on the valve body to seal a pair of ports; and a linear actuator mounted on the valve body to actuate the valve body.

According to a 302nd clause, the valve assembly of any of the preceding or successive clauses, wherein the linear actuator further comprises a shape memory alloy to translate the valve body in response to an electrical current conducted through the shape memory alloy.

According to a 303rd clause, the valve assembly of any of the preceding or successive clauses, wherein the valve body is elongate; and wherein each of the pair of opposed seals are spaced apart and oriented on distal ends of the elongate valve body.

According to a 304th clause, the valve assembly of any of the preceding or successive clauses, further comprising: a housing with the fluid chamber formed therein with a first port, a second port, and a third port in fluid communication with the fluid chamber; and wherein the valve body is oriented in the fluid chamber for translation relative thereto.

According to a 305th clause, the valve assembly of any of the preceding or successive clauses, wherein the valve body is translatable to an inflate position whereby fluid passes from a source of pressurized fluid into the first port, through the fluid chamber and out of the second port to inflate a fluid bladder, while the third port is sealed from the fluid chamber; and wherein the valve body is translatable to a deflate position whereby fluid passes from the fluid bladder into the second port, through the fluid chamber and out of the third port to deflate the fluid bladder, while the first port is sealed from the fluid chamber.

According to a 306th clause, an actuator assembly comprising: the valve assembly according to any of the preceding or successive clauses; and an actuator connected to the second port.

According to a 307th clause, a seat assembly, in combination with, or without, any of the successive clauses, comprising: a seat bottom adapted to be affixed to a vehicle floor; a seat back extending upright from the seat bottom; the actuator assembly according to any of the preceding or successive clauses, wherein the actuator is provided on the seat bottom or the seat back; and the source of pressurized fluid connected to the first port.

According to a 308th clause, an actuator assembly, in combination with, or without, any of the successive clauses, comprising: a housing with a plurality of fluid chambers formed therein, each with a first port, a second port, and a third port; and a plurality of valve assemblies, each according to any of the preceding or successive clauses, wherein the valve body of each valve assembly is oriented for translation in one of the plurality of fluid chambers.

According to a 309th clause, a valve assembly, in combination with, or without, any of the successive clauses, comprising: a valve body formed from a polymeric material, sized for translation within a fluid chamber; a spring formed integrally with the valve body, extending from the valve body to bias the valve body in one direction; and a linear actuator mounted on the valve body to actuate the valve body and compress the spring.

According to a 310th clause, the valve assembly of any of the preceding or successive clauses, wherein the linear actuator further comprises a shape memory alloy to translate the valve body in response to an electrical current conducted through the shape memory alloy.

According to a 311th clause, the valve assembly of any of the preceding or successive clauses, further comprising a beam extending from the valve body.

According to a 312th clause, the valve assembly of any of the preceding or successive clauses, wherein the beam has a first thickness; and wherein the spring has a second thickness that is reduced relative to the first thickness.

According to a 313th clause, the valve assembly of any of the preceding or successive clauses, wherein the spring further comprises a compression spring.

According to a 314th clause, the valve assembly of any of the preceding or successive clauses, further comprising an electrical terminal mounted on the beam in electrical communication with the shape memory alloy.

According to a 315th clause, the valve assembly of any of the preceding or successive clauses, further comprising: a housing with the fluid chamber formed therein with a first port, a second port, and a third port in fluid communication with the fluid chamber; and wherein the valve body is oriented in the fluid chamber for translation relative thereto.

According to a 316th clause, the valve assembly of any of the preceding or successive clauses, wherein the valve body is translatable to an inflate position whereby fluid passes from a source of pressurized fluid into the first port, through the fluid chamber and out of the second port to inflate a fluid bladder, while the third port is sealed from the fluid chamber; and wherein the valve body is translatable to a deflate position whereby fluid passes from the fluid bladder into the second port, through the fluid chamber and out of the third port to deflate the fluid bladder, while the first port is sealed from the fluid chamber.

According to a 317th clause, an actuator assembly comprising: the valve assembly according to any of the preceding or successive clauses; an actuator connected to the second port; and a source of pressurized fluid connected to the first port.

According to a 318th clause, a seat assembly comprising: a seat bottom adapted to be affixed to a vehicle floor; a seat back extending upright from the seat bottom; and the actuator assembly according any of the preceding or successive clauses, wherein the actuator is provided on the seat bottom or the seat back.

According to a 319th clause, an actuator assembly comprising: a housing with a plurality of fluid chambers formed therein, each with a first port, a second port, and a third port in fluid communication with the fluid chamber; and a plurality of valve assemblies, each according to any of the preceding or successive clauses, wherein the valve body of each valve assembly is oriented for translation in one of the plurality of fluid chambers.

According to a 320th clause, a valve assembly, in combination with, or without, any of the successive clauses, comprising: a housing with a fluid chamber formed therein with a first port, a second port, and a third port in fluid communication with the fluid chamber, wherein the first port or the third port is formed at a distal end of the fluid chamber; and a valve oriented in the fluid chamber for translation to: an inflate position whereby fluid passes from a source of pressurized fluid into the first port, through the fluid chamber and out of the second port to inflate a fluid bladder, while the third port is sealed from the fluid chamber, and a deflate position whereby fluid passes from the fluid bladder into the second port, through the fluid chamber and out of the third port to deflate the fluid bladder, while the first port is sealed from the fluid chamber.

According to a 321st clause, a system, in combination with, or without, any of the successive clauses, comprising: a housing with a matrix of fluid chambers; a plurality of gate valves, each provided in one of the matrix of fluid chambers; a plurality of inflate pressure inlets, each in fluid cooperation with a subset of the fluid chambers and a first source of pressurized fluid; a plurality of control pressure inlets, each in fluid cooperation with one fluid chamber of each subset of the fluid chambers and a second source of pressurized fluid; a plurality of ports, each in fluid cooperation with one of the matrix of fluid chambers to inflate a fluid actuator when pressurized fluid is conveyed through the corresponding inflate pressure inlet and the corresponding control pressure inlet of the corresponding fluid chamber, and to deflate the fluid actuator when pressurized fluid is not conveyed through at least one of the corresponding inflate pressure inlet and the corresponding control pressure inlet of the corresponding fluid chamber; and a controller in communication with the first source of pressurized fluid and the second source of pressurized fluid so that a first subset of the plurality of gate valves is operated in a constant inflation position, and a second subset of the plurality of gate valves is operated in a constant deflation position.

According to a 322nd clause, the system of any of the preceding or successive clauses, further comprising a plurality of inflate pressure valves, each in fluid cooperation with one of the plurality of inflate pressure inlets and in electrical communication with the controller to regulate a flow of the first source of pressurized fluid into each of the plurality of inflate pressure inlets.

According to a 323rd clause, the system of any of the preceding or successive clauses, further comprising a plurality of control pressure valves, each in fluid cooperation with one of the plurality of control pressure inlets and in electrical communication with the controller to regulate a flow of the second source of pressurized fluid into each of the plurality of control pressure inlets.

According to a 324th clause, the system of any of the preceding or successive clauses, further comprising a source of pressurized air in fluid communication with the plurality of inflate pressure valves and the plurality of control pressure valves.

According to a 325th clause, the system of any of the preceding or successive clauses, further comprising a plurality of vents, each in fluid cooperation with one of the matrix of fluid chambers.

According to a 326th clause, the system of any of the preceding or successive clauses, wherein at least one of the first subset of the plurality of gate valves has a first condition wherein the corresponding vent is closed and the corresponding port is closed, a second condition wherein the corresponding vent is closed and the corresponding port is open, and a third condition wherein the corresponding vent is open and the corresponding port is closed to contain the pressurized fluid in the corresponding fluid actuator.

According to a 327th clause, the system of any of the preceding or successive clauses, wherein at least one of the second subset of the plurality of gate valves has a first condition wherein the corresponding vent is open and the corresponding port is closed, and a second condition wherein the corresponding vent is closed and the corresponding port is open.

According to a 329th clause, the system of any of the preceding or successive clauses, further comprising a plurality of air bladders, each in fluid communication with one of the plurality of ports.

According to a 330th clause, the system of any of the preceding or successive clauses, further comprising: a seat bottom; a seat back; and the fluid actuator in the seat bottom or the seat back.

According to a 331st clause, an assembly, in combination with, or without, any of the successive clauses, comprising: a piston body with a rectangular cross section; and a seal oriented about the piston body to engage an inner wall of a fluid chamber.

According to a 332nd clause, the assembly any of the preceding or successive clauses, wherein the piston seal is tapered to narrow away from the piston body.

According to a 333rd clause, the assembly any of the preceding or successive clauses, wherein the piston seal is spaced apart from a distal end of the piston body; and wherein a projection is provided on the distal end to maintain a gap between the distal end and the fluid chamber.

According to a 334th clause, the assembly any of the preceding or successive clauses, further comprising a housing with the fluid chamber, wherein the piston body and piston seal are oriented in the fluid chamber.

According to a 335th clause, the assembly any of the preceding or successive clauses, further comprising an inlet in the housing into the fluid chamber for receipt of a pressurized fluid on a distal end of the piston body.

According to a 336th clause, the assembly any of the preceding or successive clauses, further comprising a valve body extending from the piston body to be actuated by the piston body.

According to a 337th clause, the assembly any of the preceding or successive clauses, further comprising a valve seal on the valve body.

According to a 338th clause, the assembly any of the preceding or successive clauses, further comprising: an inflate pressure inlet formed in the housing into the fluid chamber; and a port formed in the housing into the fluid chamber; and wherein the valve seal engages the port in a closed position of the port.

According to a 339th clause, the assembly any of the preceding or successive clauses, further comprising a biasing member cooperating with the housing and the valve body to bias the valve seal into engagement with the port.

According to a 340th clause, the assembly any of the preceding or successive clauses, further comprising a vent formed in the housing to vent the fluid chamber.

According to a 341st clause, the assembly any of the preceding or successive clauses, wherein the valve seal engages the vent in an open position of the port to permit pressurized fluid to pass from the inflate pressure inlet to the port.

According to a 342nd clause, the assembly any of the preceding or successive clauses, further comprising: a seat bottom; a seat back; and a fluid actuator in the seat bottom or the seat back in fluid communication with the fluid chamber.

According to a 343rd clause, a system, in combination with, or without, any of the successive clauses, comprising: a housing with a matrix of fluid chambers; a plurality of gate valves, each provided in one of the matrix of fluid chambers, each gate valve comprising: a piston body with a rectangular cross section, a seal oriented about the piston body to engage an inner wall of the corresponding fluid chamber, a valve body extending from the piston body, and a valve seal on the valve body; a plurality of inflate pressure inlets, each in fluid cooperation with a subset of the fluid chambers; a plurality of inflate pressure valves, each in fluid cooperation with one of the plurality of inflate pressure inlets to regulate a flow of pressurized fluid into each of the plurality of inflate pressure inlets; a plurality of control pressure inlets, each in fluid cooperation with one fluid chamber of each subset of the fluid chambers to distribute pressure to the corresponding piston body to actuate the corresponding gate valve; a plurality of control pressure valves, each in fluid cooperation with one of the plurality of control pressure inlets to regulate a flow of pressurized fluid into each of the plurality of control pressure inlets; a plurality of ports, each in fluid cooperation with one of the matrix of fluid chambers to inflate a fluid actuator when pressurized fluid is conveyed through the corresponding inflate pressure inlet and the corresponding control pressure inlet of the corresponding fluid chamber, and to deflate the fluid actuator when pressurized fluid is not conveyed through at least one of the corresponding inflate pressure inlet and the corresponding control pressure inlet of the corresponding fluid chamber, wherein the corresponding valve seat engages the corresponding port in a closed position of the port; and a controller in communication with the plurality of inflate pressure valves and the plurality of control pressure valves to regulate operation of the plurality of inflate pressure valves and the plurality of control pressure valves so that a first subset of the plurality of gate valves is operated in a constant inflation position, and a second subset of the plurality of gate valves is operated in a constant deflation position.

According to a 344th clause, a system, in combination with, or without, any of the successive clauses, comprising: a first valve having a first valve element; a second valve having a second valve element, the second valve positioned adjacent to the first valve; and a first actuator with an actuator member movable between a first actuator position and a second actuator position, the actuator member coupled to each of the first valve element and the second valve element for movement therewith.

According to a 345th clause, the system of any of the preceding or successive clauses, wherein each of the first and second valves are in a closed position when the actuator member is in the first actuator position and in an open position when the actuator member is in the second actuator position.

According to a 346th clause, the system of any of the preceding or successive clauses, further comprising a third valve with a third valve element; wherein the first valve has a fourth valve element.

According to a 347th clause, the system of any of the preceding or successive clauses, wherein the system further comprises a second actuator with a second actuator member coupled to each the third and fourth valve elements for movement therewith.

According to a 348th clause, the system of any of the preceding or successive clauses, wherein the first actuator is a solenoid actuator or a shape-memory alloy actuator.

According to a 349th clause, the system of any of the preceding or successive clauses, further comprising a connector plate connected to the actuator member, and the first and second valve elements.

According to a 350th clause, the system of any of the preceding or successive clauses, further comprising a pump positioned upstream of the first and second valves; and a control valve fluidly connecting the pump to the first and second valves; wherein the pump is fluidly coupled to the first valve with the control valve in a first valve position, and wherein the pump is fluidly coupled to the second valve with the control valve in a second valve position.

According to a 351st clause, the system of any of the preceding or successive clauses, further comprising a first fluid rail providing pressurized fluid from the pump to the first valve via the control valve, and a second fluid rail providing pressurized fluid from the pump to the second valve via the control valve.

According to a 352nd clause, the system of any of the preceding or successive clauses, further comprising a first bladder in fluid communication with the first valve to receive pressurized fluid therefrom.

According to a 353rd clause, the system of any of the preceding or successive clauses, wherein the first valve has a first port in fluid communication with the first bladder, wherein the first port fluidly couples the first fluid rail to the first bladder via the first valve element, and wherein the first port fluidly couples the first bladder to atmosphere via a third valve element of the first valve.

According to a 354th clause, the system of any of the preceding or successive clauses, further comprising a second bladder in fluid communication with a second port of the second valve to receive pressurized fluid therefrom.

Clause 355. The system of any of the preceding or successive clauses, further comprising a third valve with a fourth valve element, wherein the third valve is in fluid communication with the second fluid rail; a second actuator with a second actuator member coupled to each the third and fourth valve elements for movement therewith; and a third bladder in fluid communication with the third valve to receive pressurized fluid therefrom.

Clause 356. The system of any of the preceding or successive clauses, wherein the second fluid rail is in fluid communication with atmosphere with the second valve element in a closed position, and wherein the second fluid rail is in fluid communication with the second port and the second bladder with the second valve element in an open position.

Clause 357. The system of any of the preceding or successive clauses, further comprising a vent valve fluidly connecting the second rail to atmosphere in a vent position.

Clause 358. The system of any of the preceding or successive clauses, further comprising a check valve fluidly connecting the first port of the first valve to the second fluid rail via the third valve element, wherein the check valve is positioned to be closed when a pressure in the second fluid rail is greater than a pressure in first port with the third valve element in an open position.

Clause 359. The system of any of the preceding or successive clauses, further comprising a third fluid rail receiving fluid from the first port of the first valve; and a check valve fluidly connecting the third fluid rail to the second fluid rail, wherein the check valve is positioned to be closed when a pressure in the second fluid rail is greater than a pressure in the third fluid rail.

Clause 360. A system, in combination with, or without, any of the successive clauses, comprising: a pump; a first rail connected to the pump via at one or more control valves; a second rail connected to the pump via the one or more control valves, wherein the one or more control valves control fluid flow from the pump to one of the first rail and the second rail; a series of first valves, each first valve having a first port with an associated first valve element and an associated second valve element, and a vent line, the first port of each of the first valves receiving pressurized fluid from the first rail via the first valve element; a series of first bladders, each first bladder fluidly coupled to the first port of one of the first valves; a series of pairs of second valves, each second valve having a second port with an associated third valve element, the second port of each of the second valves receiving pressurized fluid from the second rail; a series of second bladders, each second bladder fluidly coupled to the second port of one of the second valves; and a series of pairs of actuators, one of the actuators in each pair of actuators coupled to the first valve element and third valve element of one of the second valves in each pair for movement therewith, and the other of the actuators in each pair of actuators coupled to the second valve element and third valve element of the other of the second valves in each pair for movement therewith.

Clause 361. The system of any of the preceding or successive clauses, further comprising one or more check valves fluidly coupling the vent line of the at least one of the first ports to the second rail, wherein the one or more check valves are positioned to be closed when a pressure in the second rail is greater than a pressure in the at least one of the first ports with the second valve element in an open position.

Clause 362. A method, in combination with, or without, any of the successive clauses, comprising: pumping fluid flow to a first rail via a control valve in a first position; pumping fluid flow to a second rail via the control valve in a second position; actuating a first actuator to a first position thereby moving a first valve element in a first valve and a second valve element in a second valve to open positions with the control valve in the first position thereby inflating a first bladder connected to the first valve while maintaining deflation of a second bladder connected to the second valve; actuating the first actuator to the first position thereby moving the first valve element and the second valve element to open positions with the control valve in the second position thereby inflating the second bladder connected to the second valve without changing a state of inflation of the first bladder; and actuating a second actuator to a first position thereby moving a third valve element in the first valve and a fourth valve element in a third valve to open positions with the control valve in the first position thereby deflating a first bladder connected to the first valve while maintaining deflation of a third bladder connected to the third valve.

Clause 363. The method of any of the preceding or successive clauses, further comprising opening a vent valve to a vent position thereby fluidly coupling the second rail to atmosphere; and opening a check valve in response to a pressure in the second rail being less than a pressure in the first valve thereby deflating the first bladder with the second actuator in the first position.

Clause 364. A trim assembly, in combination with, or without, any of the successive clauses, comprising: a trim cover layer, a nonfoam layer attached to the trim cover layer, and one or more fasteners connected to the trim cover layer and/or the nonfoam layer.

Clause 365. The trim assembly of any of the preceding or successive clauses, wherein the nonfoam layer comprises a stranded-mesh material member.

Clause 366. The trim assembly of any of the preceding or successive clauses, wherein the stranded mesh material member comprises a polymeric mesh having a plurality of integrated polymeric strands.

Clause 367. The trim assembly of any of the preceding or successive clauses, wherein the nonfoam layer comprises a plastic spacer material.

Clause 368. The trim assembly of any of the preceding or successive clauses, wherein the nonfoam layer defines a trench intersecting at least one of a first side and a second side of the nonfoam layer.

Clause 369. The trim assembly of any of the preceding or successive clauses, wherein the one or more fasteners further comprises a tie down connected to the trim cover layer and extending into the trench of the nonfoam layer to a distal free end.

Clause 370. The trim assembly of any of the preceding or successive clauses, wherein the one or more fasteners further comprises a hog ring, a hook fastener, a loop fastener, an arrow, a loop, a clip, a paddle, and/or a drawstring.

Clause 371. The trim assembly of any of the preceding or successive clauses, wherein the trim cover layer is attached to the nonfoam layer via a seam.

Clause 372. The trim assembly of any of the preceding or successive clauses, wherein the trim cover layer is attached to the nonfoam layer via a welded connection.

Clause 373. The trim assembly of any of the preceding or successive clauses, wherein the trim assembly further comprises a third layer connected to the trim cover layer and/or the nonfoam layer; and wherein the nonfoam layer is positioned between the trim cover layer and the third layer.

Clause 374. The trim assembly of any of the preceding or successive clauses, wherein the third layer comprises a nonwoven fabric.

Clause 375. The trim assembly of any of the preceding or successive clauses, wherein the trim assembly is provided without a spacer fabric.

Clause 376. A seat assembly, in combination with, or without, any of the successive clauses, comprising: a support member; and a trim assembly according to any one of the successive or preceding clauses.

Clause 377. The seat assembly of any of the preceding or successive clauses, wherein the one or more fasteners connect the trim assembly to the support member.

Clause 378. The seat assembly of any of the preceding or successive clauses, further comprising a seating cushion defining a first surface to support an occupant and a second surface opposite to the first surface; wherein the seating cushion is supported by the support member, and is positioned between the support member and the trim assembly; and wherein the trim assembly is connected to the seating cushion and/or the support member via the one or more fasteners.

Clause 379. The seat assembly of any of the preceding or successive clauses, wherein the seating cushion comprises a nonfoam member and/or a foam member.

Clause 380. The seat assembly of any of the preceding or successive clauses, wherein the support member comprises at least one of a frame and a substrate.

Clause 381. A method, in combination with, or without, any of the successive clauses, comprising attaching a trim cover layer to a nonfoam layer, and attaching one or more fasteners to the trim cover layer and/or the nonfoam layer such that the trim cover layer, the nonfoam layer, and the one or more fasteners form a trim assembly.

Clause 382. The method of any of the preceding or successive clauses, further comprising attaching the trim assembly to a support structure of a seat assembly subsequent to forming the trim assembly.

Clause 383. The method of any of the preceding or successive clauses, further comprising: forming a trim cover layer; and forming a nonfoam layer.

Clause 384. The method of any of the preceding or successive clauses, further comprising sewing the trim cover layer to the nonfoam layer to form the trim assembly.

Clause 385. The method of any of the preceding or successive clauses, further comprising forming a trench in the nonfoam layer; and positioning a seam formed by sewing the trim cover layer to the nonfoam layer into the trench.

Clause 386. The method of any of the preceding or successive clauses, comprising forming a trench in the nonfoam layer; and connecting the trim cover layer to the nonfoam layer via one or more tag fasteners to form the trim assembly.

Clause 387. The method of any of the preceding or successive clauses, further comprising laminating the trim cover layer to the nonfoam layer to form the trim assembly.

Clause 388. The method of any of the preceding or successive clauses, further comprising forming a pocket in the trim cover layer; inserting the nonfoam layer into the pocket; and closing the pocket.

Clause 389. The method of any of the preceding or successive clauses, further comprising attaching a third layer to one of the trim cover layer and the nonfoam layer to form the trim assembly.

Clause 390. The method of any of the preceding or successive clauses, further comprising positioning the nonfoam layer between the trim cover layer and the third layer.

Clause 391. The method of any of the preceding or successive clauses, further comprising connecting a cushion to the support structure prior to attaching the trim assembly.

Clause 392. The method of any of the preceding or successive clauses, further comprising forming the cushion from a stranded mesh material or a foam.

Clause 393. A method, in combination with, or without, any of the successive clauses, comprising: selecting a mesh pad of welded polymer fibers, the mesh pad defining a plurality of grooves in predetermined locations; selecting a cover including tie down strips; inserting at least one of the tie down strips into at least one of the grooves defined in the mesh pad, wherein each of the tie down strips defines a plurality of equally spaced holes above a reinforcement bead that is attached to the tie down strip; and turning a spiral retainer through the welded polymer fibers of the mesh pad and around the reinforcement bead, through the tie down strip, and in the groove, wherein the spiral retainer is wound through the plurality of equally spaced holes and the welded polymer fibers to hold the tie down strips in the predetermined locations.

Clause 394. The method of any of the preceding or successive clauses, comprising: forming the mesh pad into the shape of a seat cushion.

Clause 395. The method of any of the preceding or successive clauses, further comprising: sewing the tie down strips to the cover, wherein the cover is a seat cover.

Clause 396. The method of any of the preceding or successive clauses, further comprising: inserting a guide comb in the groove to align the equally spaced holes, with gaps defined by the guide comb, and a plurality of turns of the spiral retainer.

Clause 397. The method of any of the preceding or successive clauses, further comprising: inserting a mandrel into the spiral retainer, and guiding the spiral retainer as the spiral retainer is turned into the mesh body.

Clause 398. A vehicle seat made according to the method of any of any of the preceding or successive clauses.

Clause 399. An apparatus, in combination with, or without, any of the successive clauses, comprising: a mesh pad of polymer fibers bonded together by melted portions of the polymer fibers, wherein the mesh pad is formed into a seat cushion; a seat cover including tie down strips attached to the seat cover, wherein the tie down strips define a plurality of holes; and a spiral retainer securing the tie down strips to the polymer fibers with the spiral retainer being wound through the holes and the spiral retainer being looped into the welded polymer fibers.

Clause 400. The apparatus according to any of the preceding or successive clauses, wherein the seat cover is formed by sewing together a plurality of sections of cover material and attaching the plurality of sections of cover material to the tie down strips.

Clause 401. The apparatus according to any of the preceding or successive clauses, wherein the mesh pad of polymer fibers defines a plurality of grooves recessed into the mesh pad.

Clause 402. The apparatus according to any of the preceding or successive clauses, wherein the tie down strips are plastic strips that include a bead reinforcement.

Clause 403. The apparatus according to any of the preceding or successive clauses, wherein the tie down strips each include a bead reinforcement and a flexible flange that are sewn to an edge of the seat cover.

Clause 404. The apparatus according to any of the preceding or successive clauses, wherein the tie down strips each include a bead reinforcement and a flexible flange that are formed as a combination.

Clause 405. The apparatus according to any of the preceding or successive clauses, wherein the mesh pad defines grooves, the seat cover includes segments of flexible sheet material that are sewn together with the tie down strips, wherein the tie down strips are received in the grooves and the tie down strips are disposed in the grooves with a guide comb when the spiral retainer is wound through the groove to secure the tie down strips to the welded polymer fibers.

Clause 406. The apparatus according to any of the preceding or successive clauses, wherein the welded polymer fibers hold the spiral retainer in the mesh body.

Clause 407. The apparatus according to any of the preceding or successive clauses, wherein the polymer fibers are polyethylene.

Clause 408. A machine, in combination with, or without, any of the successive clauses, comprising: a fixture that receives a mesh pad of polymer fibers bonded together in a form of a seat cushion, a seat cover including tie down strips defining a plurality of holes, and a guide; and a rotary tool including a spiral retainer that is rotated into the fixture and a groove defined by the mesh pad, wherein the spiral retainer is wound into the plurality of holes and through the welded polymer fibers of the mesh pad to hold the tie down strip in a predetermined location in the mesh pad.

Clause 409. The machine according to any of the preceding or successive clauses, further comprising: a guide comb including a plurality of teeth that define tooth gaps.

Clause 410. The machine according to any of the preceding or successive clauses, wherein the guide comb includes a plurality of teeth that define tooth gaps that are spaced apart by the distance between each of the plurality of holes.

Clause 411. The machine according to any of the preceding or successive clauses, wherein the tie down strip includes a plastic reinforcement bead and a flexible flange that are attached to the seat cover.

Clause 412. The machine according to any of the preceding or successive clauses, wherein the polymer fibers are thermoplastic polymer fibers.

Clause 413. A retainer assembly, in combination with, or without, any of the successive clauses, comprising: a base, the base comprising a contact surface; a connector attached to the base, the connector comprising a width smaller than a width of the base, the connector configured to extend through a slot in a cushion; and a retainer, the retainer comprising a width greater than the width of the connector, the retainer comprising a thickness less than the retainer width, the retainer pivotally attached to the connector spaced apart from the base and configured to be inserted into the slot in the cushion in a thickness direction, and further configured to be pivoted externally to the cushion so that the retainer width engages the cushion, the retainer retaining the base upon the cushion.

Clause 414. The retainer assembly of any of the preceding or successive clauses, further comprising a surface fastener on the base contact surface.

Clause 415. The retainer assembly of any of the preceding or successive clauses, wherein the base provides a planar surface.

Clause 416. The retainer assembly of any of the preceding or successive clauses, wherein the connector comprises a textile material.

Clause 417. The retainer assembly of any of the preceding or successive clauses, wherein the base comprises a polymeric material.

Clause 418. The retainer assembly of any of the preceding or successive clauses, wherein the retainer comprises a polymeric material.

Clause 419. The retainer assembly of any of the preceding or successive clauses, wherein the connector is sewn to a surface of the base opposite to the contact surface.

Clause 420. The retainer assembly of any of the preceding or successive clauses, wherein the connector is sewn to the retainer.

Clause 421. A vehicle seat assembly, in combination with, or without, any of the successive clauses, comprising: a seat bottom adapted to be attached to a vehicle floor; a seat back extending in an upright position; a seat cushion connected to the seat bottom or the seat back; and the retainer assembly of any of the preceding or successive clauses, attached to a portion of the seat cushion.

Clause 422. The vehicle seat assembly of any of the preceding or successive clauses, wherein the seat cushion further comprises a stranded thermoplastic mesh.

Clause 423. The vehicle seat assembly of any of the preceding or successive clauses, wherein a slot is formed through the cushion sized to receive the retainer assembly.

Clause 424. The vehicle seat assembly of any of the preceding or successive clauses, further comprising a seat trim, an actuator, and/or a heat transfer layer attached to the contact surface of the base.

Clause 425. The vehicle seat assembly of any of the preceding or successive clauses, wherein the base further comprises a seat trim, an actuator, and/or a heat transfer layer.

Clause 426. A method, in combination with, or without, any of the successive clauses, comprising: collapsing a retainer along a connector of a retainer assembly; inserting the retainer and the connector of the retainer assembly into a slot formed through a seat cushion; translating the retainer through the seat cushion with the connector still at least partially within the slot; and expanding the retainer relative to the connector into contact with a region of the cushion adjacent the slot to retain the connector within the slot.

Clause 427. The method of any of the preceding or successive clauses, further comprising connecting a base to the connector spaced apart from the retainer to engage a region of the cushion adjacent the slot and spaced apart from the retainer.

Clause 428. The method of any of the preceding or successive clauses, further comprising fastening at least one of a seat trim, an actuator, and a heat transfer layer to the base.

Clause 429. A vehicle seat assembly, in combination with, or without, any of the successive clauses, comprising: a seat bottom adapted to be attached to a vehicle floor; a seat back extending in an upright position; a stranded thermoplastic mesh seat cushion connected to the seat bottom or the seat back, wherein a slot is formed through the cushion; and a retainer assembly attached to a portion of the seat cushion, the retainer assembly comprising: a base, the base comprising a contact surface, a fabric connector attached to the base, the connector comprising a width smaller than a width of the base, the connector configured to extend through the slot in the cushion, and a retainer, the retainer comprising a width greater than the width of the connector, the retainer comprising a thickness less than the retainer width, the retainer pivotally attached to the connector spaced apart from the base and configured to be inserted into the slot in the cushion in a thickness direction, and further configured to be pivoted externally to the cushion so that the retainer width engages the cushion, the retainer retaining the base upon the cushion.

Clause 430. The vehicle seat assembly of any of the preceding or successive clauses, further comprising a surface fastener on the base contact surface.

Clause 431. The vehicle seat assembly of any of the preceding or successive clauses, further comprising at least one of a seat trim, an actuator, and a heat transfer layer attached to the contact surface of the base.

Clause 432. The vehicle seat assembly of any of the preceding or successive clauses, wherein the base further comprises at least one of a seat trim, an actuator, and a heat transfer layer.

Clause 433. An apparatus, in combination with, or without, any of the successive clauses, comprising: a pneumatic bladder formed from at least one sheet of polymer material; and a conduit defining an opening into the pneumatic bladder, wherein the conduit is integrally formed from the at least one sheet of polymer material, wherein the conduit is partially separated from the pneumatic bladder and extends to a location externally spaced from a periphery of the pneumatic bladder, and wherein the conduit is adapted to be connected to a source of compressed air to inflate and deflate the pneumatic bladder.

Clause 434. The apparatus of any of the preceding or successive clauses, wherein the pneumatic bladder includes two portions of the sheet that are welded together about a periphery of the pneumatic bladder except in a port area that is open to the opening defined by the conduit.

Clause 435. The apparatus of any of the preceding or successive clauses, wherein the conduit includes a reverse turn between the opening in the pneumatic bladder and a distal end of the conduit.

Clause 436. The apparatus of any of the preceding or successive clauses, wherein the pneumatic bladder is adapted to be assembled to a vehicle seat to provide an adjustable lumbar support.

Clause 437. The apparatus of any of the preceding or successive clauses, wherein the polymer material is polyurethane.

Clause 438. The apparatus of any of the preceding or successive clauses, wherein the pneumatic bladder is adapted to be assembled to a vehicle seat to provide a massage system.

Clause 439. A method, in combination with, or without, any of the successive clauses, comprising: selecting a sheet of a polymer material; cutting the sheet into a first bladder portion and a second bladder portion and a first conduit portion and a second conduit portion; folding the first bladder portion onto the second bladder portion and the first conduit portion onto the second conduit portion; welding a peripheral edge of the first bladder portion onto the second bladder portion and the first conduit portion onto the second conduit portion, wherein a port area between the first bladder portion and the second bladder portion and the first conduit portion and second conduit portion is not welded and defines an area defining a passageway therebetween; cutting the first conduit portion and the second conduit portion from the first bladder portion and second bladder portion except for the area defining the passageway; and folding the conduit portions to extend to a location spaced from the peripheral edge of the first and second bladder portions and being adapted to be connected to an air valve.

Clause 440. The method of any of the preceding or successive clauses, wherein the sheet of polymer material is a polyurethane sheet.

Clause 441. The method of any of the preceding or successive clauses, wherein the first conduit portion and the second conduit portion are disposed between the first bladder portion and the second bladder portion on the sheet before the step of cutting the sheet into the first bladder portion and the second bladder portion and the first conduit portion and the second conduit portion.

Clause 442. The method of any of the preceding or successive clauses, wherein the step of cutting the first conduit portion and the second conduit portion from the first bladder portion and the second bladder portion except for the area defining the passageway is performed after the welding step.

Clause 443. The method of any of the preceding or successive clauses, wherein the welding step is performed after the step of folding the first bladder portion onto the second bladder portion and the first conduit portion onto the second conduit portion.

Clause 444. The method, in combination with, or without, any of the successive clauses, wherein the step of folding the conduit portions to extend to a location spaced from the peripheral edge of the first bladder portion and the second bladder portion is performed after the step of cutting the first conduit portion and the second conduit portion from the first bladder portion and the second bladder portion.

Clause 445. The product made according to the method of any of the preceding or successive clauses.

Clause 446. A method, in combination with, or without, any of the successive clauses, comprising: selecting a sheet of a polymer material; folding a first end of the sheet to form a first bladder and a second end of the sheet to form a second bladder; cutting the sheet between a conduit portion and the first bladder and a second bladder; welding a peripheral edge of the first bladder and the second bladder, except for in an intermediate port area open to the conduit portion; welding first and second edges of the conduit and an intermediate port area to form two passageways extending from a distal end of the conduit portion to the intermediate port area; folding the conduit portion back across the intermediate port area to extend to a location spaced from the intermediate port area, wherein the distal end is adapted to be connected to an air valve; and folding the first bladder to a position adjacent the second bladder.

Clause 447. The method of any of the preceding or successive clauses, wherein the sheet of polymer material is a polyurethane sheet.

Clause 448. The method of any of the preceding or successive clauses, wherein the conduit portion includes a first conduit portion and a second conduit portion that are disposed between the first bladder and the second bladder on the sheet before the step of cutting the sheet into the first bladder and the second bladder and the first conduit portion and the second conduit portion.

Clause 449. The method of any of the preceding or successive clauses, wherein the step of cutting the conduit portion from the first bladder and the second bladder except for the area defining the two passageways is performed after the welding step.

Clause 450. The method of any of the preceding or successive clauses, wherein the welding step is performed after the step of folding the first bladder onto the second bladder and the conduit.

Clause 451. The method of any of the preceding or successive clauses, wherein the step of folding the conduit to extend to a location spaced from the peripheral edge of the first and second bladders is performed after the step of cutting the conduit from the first bladder portion and second bladder portion.

Clause 452. The product made according to the method of any of the preceding or successive clauses.

Clause 453. A compression-resistant support structure, in combination with, or without, any of the successive clauses, comprising: a body having a first side and a second side opposite the first side, the body defining a plurality of orifices such that a fluid can travel from the second side to the first side and having a plurality of cells disposed between the first side and the second side, the cells being configured to maintain the first side from collapsing entirely onto the second side under a load of ten kilograms or more per twenty centimeters squared.

Clause 454. The structure of any of the preceding or successive clauses, wherein the plurality of cells includes a first group of cells attached to the first side and a second group of cells attached to the second side and aligned with the first group of cells such that each cell of the first group of cells cooperates with a respective cell of the second group of cells to form a stabilizing column between the first and second sides.

Clause 455. The structure of any of the preceding or successive clauses, wherein one or more of the plurality of cells includes a foam disposed therein.

Clause 456. The structure of any of the preceding or successive clauses, wherein the body includes a first planar sheet along the first side, a second planar sheet along the second side and an intermediate sheet disposed between the first and second sheets with a plurality of cells being disposed between the first sheet and the intermediate sheet and between the intermediate sheet and the second sheet, and the first, intermediate, and second sheets each define a number of the plurality of orifices.

Clause 457. The structure of any of the preceding or successive clauses, wherein the plurality of cells includes arc shaped channels.

Clause 458. The structure of any of the preceding or successive clauses, further comprising moldable nonwoven sheets disposed adjacent the first sheet, the intermediate sheet, and/or the second sheet.

Clause 459. The structure of any of the preceding or successive clauses, wherein the plurality of cells forms an open polygonal cell pattern.

Clause 460. The structure of any of the preceding or successive clauses, wherein the open polygonal cell pattern is a honeycomb pattern.

Clause 461. The structure of any of the preceding or successive clauses, further comprising a bridging member such that the body is held in a non-planar position.

Clause 462. A seat assembly, in combination with, or without, any of the successive clauses, comprising: a cushion; and a fluid system at least partially disposed in the cushion, the fluid system configured to transport a fluid through a passageway from a first location to a second location during operation, the fluid system including a compression resistant support structure disposed in the passageway such that passageway does not collapse when under a load of ten kilograms or more per 20 centimeters squared, the compression resistant support structure includes a plurality of planar sheets made of an impermeable polymeric film, the compression resistant support structure defining a plurality of orifices to facilitate travel of the fluid.

Clause 463. The seat assembly of any of the preceding or successive clauses, wherein the fluid system is a pneumatic ventilation assembly.

Clause 464. The seat assembly of any of the preceding or successive clauses, wherein the compression resistant support structure includes a plurality of cells including a first group of cells disposed at a first side and a second group of cells disposed at a second side and aligned with the first group of cells such that each cell of the first group of cells cooperates with a respective cell of the second group of cells to form a stabilizing column between the first and second sides.

Clause 465. The structure of any of the preceding or successive clauses, wherein the compression resistant support structure has a plurality of cells and one or more of the plurality of cells includes a foam disposed therein.

Clause 466. The structure of any of the preceding or successive clauses, wherein the compression resistant support structure has a plurality of cells and includes a first planar sheet along a first side, a second planar sheet along a second side and an intermediate sheet disposed between the first and second sheets with the plurality of cells being disposed between the sheets, and each sheet defines one or more orifices of the plurality of orifices.

Clause 467. The structure of any of the preceding or successive clauses, wherein the plurality of cells includes arc shaped channels.

Clause 468. The structure of any of the preceding or successive clauses, further comprising moldable nonwoven sheets disposed adjacent the first sheet, the intermediate sheet, and/or the second sheet.

Clause 469. The structure of any of the preceding or successive clauses, wherein the compression resistant support structure includes a bridging strap and/or bar such that the compression resistant support structure is held in non-planar position.

Clause 470. A seat assembly, in combination with, or without, any of the successive clauses, comprising: a cushion; a ventilation system defining a cavity disposed in the cushion; and a honeycomb compression resistant support structure disposed in the cavity and defining a plurality of cells, the support structure providing an air velocity of at least 290 mm/s under a 10 kg load according to ISO 9237.

Clause 471. The seat assembly of any of the preceding or successive clauses, wherein the support structure provides an air velocity of at least 300 mm/s under a 10 kg load on 20 centimeters squared according to ISO 9237.

Clause 472. The seat assembly of any of the preceding or successive clauses, wherein the cells have a rectangular or diamond shape.

Clause 473. A seat assembly, in combination with, or without, any of the successive clauses, comprising: a plurality of intertwined polymeric strands forming an entangled mass, the entangled mass defining one or more cavities; and a fluid system including one or more bladders wherein a portion of the fluid system is disposed in the one or more cavities.

Clause 474. The seat assembly of any of the preceding or successive clauses, wherein the fluid system is a pneumatic system massage and/or ventilation system.

Clause 475. The seat assembly of any of the preceding or successive clauses, wherein the one or more bladder is disposed in the one or more cavities.

Clause 476. The seat assembly of any of the preceding or successive clauses, wherein the one or more cavities includes a plurality of cavities, and the one or more bladders includes a plurality of bladders.

Clause 477. The seat assembly of any of the preceding or successive clauses, wherein each bladder includes a first sheet joined to a second sheet.

Clause 478. A die, in combination with, or without, any of the successive clauses, comprising: a body defining a plurality of orifices disposed around a first solid section, the first solid section having a surface area that is at least ten times a cross-sectional area of an orifice of the plurality of orifices such that when a flowable resin is disposed through the plurality of orifices and hardened to form an entangled mass of polymeric strands defining a cavity.

Clause 479. The die of any of the preceding or successive clauses, wherein the surface area is at least fifty times greater than the cross-sectional area of the orifice.

Clause 480. The die of any of the preceding or successive clauses, wherein the surface area is at least 100 times greater than the cross-sectional area of the orifice.

Clause 481. The die of any of the preceding or successive clauses, wherein the first solid section has a surface area of one to twenty square inches.

Clause 482. The die of any of the preceding or successive clauses, wherein the first solid section has a surface area of two to twelve square inches.

Clause 483. The die of any of the preceding or successive clauses, wherein the first solid section has a surface area of three to seven square inches.

Clause 484. The die of any of the preceding or successive clauses, wherein the body includes a second solid section.

Clause 485. A method of producing a seat cushion, in combination with, or without, any of the successive clauses, comprising: dispensing a polymeric resin through a first breaker plate defining a plurality of orifices positioned around a first solid section such that the polymeric resin is dispensed from the plurality of orifices into an interface between two mediums forming a first entangled mass defining one or more cavities; removing the entangled mass from a medium; and drying the entangled mass.

Clause 486. The method of any of the preceding or successive clauses, wherein the first solid section is ten times a cross-sectional area of an orifice of the plurality of orifices.

Clause 487. The method of any of the preceding or successive clauses, wherein the first solid section has a surface area of is one to twenty square inches.

Clause 488. The method of any of the preceding or successive clauses, wherein the one or more cavities is a plurality of cavities.

Clause 489. The method of any of the preceding or successive clauses, further comprising replacing the first breaker plate with a second breaker plate defining a plurality of orifices and dispensing the polymeric resin from the plurality of orifices into the interface to form a second entangled mass.

Clause 490. The method of any of the preceding or successive clauses, further comprising disposing one or more bladder within the one or more cavities.

Clause 491. The method of any of the preceding or successive clauses, further comprising arranging the first entangled mass in a seat assembly as a cushion.

Clause 492. The method of any of the preceding or successive clauses, wherein the one or more bladders are a portion of a massaging or ventilating system.

Clause 493. A cushion, in combination with, or without, any of the successive clauses, comprising: a plurality of intertwined polymeric strands forming an entangled mass having a first surface configured to be proximate an occupant when assembled in a seat and a second surface opposite the first surface, the entangled mass defining one or more cavities configured to receive a fluid system.

Clause 494. The cushion of any of the preceding or successive clauses, wherein the entangled mass includes a first section having a first hardness and a second section having a second hardness that is greater than the first hardness.

Clause 495. The cushion of any of the preceding or successive clauses, wherein the second section has a greater bulk density and/or thicker average strand diameter than the first section.

Clause 496. The cushion of any of the preceding or successive clauses, wherein the first section is disposed proximate the first surface such that it is configured to be more proximate an occupant than the second section when assembled in the seat.

Clause 497. The cushion of any of the preceding or successive clauses, wherein the one or more cavities are disposed in the second section.

Clause 498. The cushion of any of the preceding or successive clauses, wherein the second hardness is at least five kilopascals.

Clause 499. The cushion of any of the preceding or successive clauses, further comprising the fluid system disposed in the one or more cavities.

Clause 500. The cushion of any of the preceding or successive clauses, wherein the fluid system is a pneumatic ventilation and/or massage assembly.

Clause 501. A seat assembly including a seat frame for supporting the cushion of any of the preceding or successive clauses.

Clause 502. A die, in combination with, or without, any of the successive clauses, comprising: a body defining a plurality of orifices disposed around a solid section, the solid section having a surface area that is at least ten times the area of an orifices of the plurality of orifices such that when a flowable resin is disposed through the plurality of orifices and hardened to form an entangled mass of polymeric strands defining a cavity.

Clause 503. The die of any of the preceding or successive clauses, wherein the plurality of orifices includes a first group of orifices and a second group of orifices, the first group of orifices being present at a first orifice density and having a first average diameter, the second group of orifices being present at a second orifice density and having a second average diameter wherein the second orifice density is greater than the first orifice density and/or the second average diameter is greater than the first average diameter.

Clause 504. The die of any of the preceding or successive clauses, wherein the second group of orifices is disposed around the solid section such that the cavity is defined by a harder section of the entangled mass.

Clause 505. The die of any of the preceding or successive clauses, wherein the second orifice density is greater than the first orifice density.

Clause 506. The die of any of the preceding or successive clauses, wherein the second average diameter is greater than the first average diameter.

Clause 507. The die of any of the preceding or successive clauses, wherein the first orifice density is no more than 11.5 orifices per square inch and the second orifice density is at least nine orifices per square inch.

Clause 508. A method, in combination with, or without, any of the successive clauses, of producing a seat pad comprising: dispensing a flowable resin through a die defining a plurality of orifices to dispense a plurality of polymeric strands through an interface defined by a first medium and a second medium such that at least a portion of polymeric strands are deflected, intertwines, and harden to form a foamless cushion in the second medium; removing the foamless cushion from the second medium; and drying the foamless cushion, wherein the plurality of orifices is disposed around a solid section of die such that the foamless cushion defines a cavity configured to receive a subassembly.

Clause 509. The method of any of the preceding or successive clauses, wherein the plurality of orifices includes (i) a first group of orifices arranged at a first density and defining a first average diameter and (ii) a second group of orifices arranged at a second density and defining a second average diameter, the first density being different than the second density and/or the first average diameter being different than the second average diameter such the non-foam cushion has a first region with a first hardness and a second region with a second hardness that is different than the first hardness.

Clause 510. The method of any of the preceding or successive clauses, wherein the second group of orifices is disposed around the solid section such that the cavity is defined by the second region.

Clause 511. The method of any of the preceding or successive clauses, wherein the subassembly is a massage and/or ventilation assembly.

Clause 512. The method of any of the preceding or successive clauses, further comprising exchanging the die with another die and dispensing the flowable resin through the other die.

Clause 513. An assembly, in combination with, or without, any of the successive clauses, comprising: a first layer connected to a second layer to form a bladder, the first layer defining a first aperture therethrough, and one of the first or second layers defining a second aperture therethrough; and a third layer connected to the first layer and positioned between the first and second layers within the bladder; wherein the third layer is movable between a first position covering the first aperture, and a second position spaced apart from the first aperture.

Clause 514. The assembly of any of the preceding or successive clauses, wherein at least one of the first, second, and third layers comprise a thermoplastic.

Clause 515. The assembly of any of the preceding or successive clauses, wherein the third layer comprises one or more perforations therethrough, the one or more perforations overlapping the first aperture when the third layer is in the first position.

Clause 516. The assembly of any of the preceding or successive clauses, wherein the third layer is connected to the first layer along a proximal end, and extends to a distal free end.

Clause 517. The assembly of any of the preceding or successive clauses, wherein the third layer is connected to the first layer at a first end and is connected to the second layer at a second end opposite thereto.

According to a 518th clause, the assembly of any of the preceding or successive clauses, further comprising a fourth layer connected to one of the first or second layers, the fourth layer movable between a first position covering the second aperture, and a second position spaced apart from the second aperture.

According to a 519th clause, the assembly of any of the preceding or successive clauses, wherein the third and fourth layers cover the first and second apertures, respectively, in the first positions.

According to a 520th clause, an assembly, in combination with, or without, any of the successive clauses, comprising: a first bladder comprising a first layer connected to a second layer, and a third layer connected to the first layer, wherein the first layer defines a first aperture therethrough, wherein one of the first or second layers defines a second aperture therethrough, wherein the first bladder is in fluid communication with a pump via the first aperture, and wherein the third layer is movable from a first position covering the first aperture and a second position spaced apart from the first aperture; and a second bladder comprising a fourth layer connected to a fifth layer to form a cavity, the fifth layer defining a third aperture therethrough.

According to a 521st clause, the assembly of any of the preceding or successive clauses, further comprising the pump; a valve fluidly connecting the pump to the second aperture of the first bladder; and a controller configured to control the valve between an open position and a closed position, wherein the first bladder inflates with the valve in the open position.

According to a 522nd clause, the assembly of any of the preceding or successive clauses, further comprising a second valve; wherein the first bladder is positioned between and fluidly connects the first valve to the second valve; wherein the second bladder is positioned between and fluidly connects the first valve to the second valve, and is arranged for parallel fluid flow with the first bladder; and wherein the controller is configured to control the second valve between a closed position and an open position, wherein the first bladder deflates with the second valve in the closed position.

According to a 523rd clause, the assembly of any of the preceding or successive clauses, wherein the third aperture of the second bladder is fluidly connected to the first bladder, the second bladder receiving fluid flow from the first aperture of the first bladder.

According to a 524th clause, the assembly of any of the preceding or successive clauses, wherein the third aperture of the second bladder is the sole aperture in the second bladder.

According to a 525th clause, the assembly of any of the preceding or successive clauses, wherein the third layer of the first bladder comprises one or more perforations therethrough, the perforations positioned to overlap the first aperture of the first bladder when the third layer is in the first position.

According to a 526th clause, the assembly of any of the preceding or successive clauses, wherein the third layer of the first bladder is connected to the second layer of the first bladder.

According to a 527th clause, the assembly of any of the preceding or successive clauses, further comprising: a third bladder comprising a sixth layer connected to a seventh layer, and an eighth layer connected to the sixth layer, wherein the sixth layer defines a fourth aperture, wherein the sixth or the seventh layer defines a fifth aperture therethrough, wherein the eighth layer is movable from a first position covering the fourth aperture and a second position spaced apart from the fourth aperture; wherein the third bladder is fluidly connected to the first bladder via the first aperture of the first bladder and the fifth aperture of the third bladder; and wherein the second bladder is fluidly connected to the third bladder via the fourth aperture of the third bladder and the third aperture of the second bladder.

According to a 528th clause, the assembly of any of the preceding or successive clauses, wherein the eighth layer of the third bladder defines one or more perforations therethrough, the perforations positioned to overlap the fourth aperture of the third bladder when the third layer is in the first position.

According to a 529th clause, the assembly of any of the preceding or successive clauses, wherein the first bladder further comprises a ninth layer positioned between the first and second layers and connected to one of the first or second layers, the ninth layer moveable from a first position covering the second aperture, and a second position spaced apart from the second aperture.

According to a 530th clause, the assembly of any of the preceding or successive clauses, wherein the fourth layer or the fifth layer of the second bladder defines a sixth aperture therethrough; wherein the second bladder comprises a tenth layer positioned between the fourth and fifth layers and connected to the fourth layer of the second bladder, the tenth layer of the second bladder movable from a first position covering the third aperture of the second bladder; and wherein the second bladder comprises an eleventh layer positioned between the fourth and fifth layers and connected to one of the fourth or fifth layers, the eleventh layer of the second bladder movable from a first position covering the sixth aperture of the second bladder to a second position spaced apart from the sixth aperture.

According to a 531st clause, a seat assembly, in combination with, or without, any of the successive clauses, comprising: a seat member comprising a seating surface; a pump; and a bladder assembly supported by the seat member and in fluid communication with the pump to receive fluid flow therefrom, the bladder assembly comprising: a first bladder comprising a first layer connected to a second layer, the first layer defining a first aperture therethrough, one of the first or second layers defining a second aperture therethrough, the first bladder in fluid communication with the pump via the first aperture, the first bladder further comprising a third layer connected to the one of the first or second layers, the third layer movable from a first position covering the second aperture and a second position spaced apart from the second aperture, and a second bladder comprising a fourth layer connected to a fifth layer, the fourth layer defining a third aperture therethrough.

According to a 532nd clause, the seat assembly of any of the preceding or successive clauses, wherein the bladder assembly is inflated by the pump to modify an orientation of seating surface of the seat member.

According to a 533rd clause, a system, in combination with, or without, any of the successive clauses, comprising: a thermoelectric device with a first heat transfer surface and a second heat transfer surface adapted for installation in a seat assembly with the first heat transfer surface oriented facing a seating surface to transfer heat to or from the seating surface; and a liquid heat transfer system in fluid communication with the second heat transfer surface to transfer heat to or from the second heat transfer surface.

According to a 534th clause, the system of any of the preceding or successive clauses, wherein the liquid heat transfer system further comprises a conductor attached to the second heat transfer surface to conduct heat to or from the second heat transfer surface; and wherein the liquid heat transfer system conveys liquid along the conductor to transfer heat to or from the conductor.

According to a 535th clause, the system of any of the preceding or successive clauses, wherein the liquid heat transfer system further comprises a heat exchanger to convey heat to or from the second heat transfer surface.

According to a 536th clause, the system of any of the preceding or successive clauses, further comprising tubing in fluid communication with the heat exchanger and the second heat transfer surface to space the heat exchanger away from the second heat transfer surface.

According to a 537th clause, the system of any of the preceding or successive clauses, further comprising insulation disposed about the tubing.

According to a 538th clause, the system of any of the preceding or successive clauses, wherein the liquid heat transfer system further comprises a pump to convey the liquid through the heat exchanger.

According to a 539th clause, the system of any of the preceding or successive clauses, wherein the heat exchanger further comprises a radiator.

According to a 540th clause, the system of any of the preceding or successive clauses, further comprising a fluid actuator in fluid communication with the heat exchanger to convey a fluid through the heat exchanger to transfer heat to or away from the heat exchanger.

According to a 541st clause, the system of any of the preceding or successive clauses, wherein the liquid heat transfer system further comprises a thermally conductive liquid.

According to a 542nd clause, the system of any of the preceding or successive clauses, wherein the thermally conductive liquid further comprises water or coolant.

According to a 543rd clause, the system of any of the preceding or successive clauses, further comprising a bracket connected to the thermoelectric device and sized to be installed in the seat assembly to support the thermoelectric device in the seat assembly.

According to a 544th clause, the system of any of the preceding or successive clauses, wherein the thermoelectric device further comprises a material with a high electrical conductivity, a low thermal conductivity, and a temperature difference across the material in response to an induced thermoelectric voltage across the material.

According to a 555th clause, the system of any of the preceding or successive clauses, wherein the material of the thermoelectric device further comprises a conductive silicone or graphite.

According to a 556th clause, the system of any of the preceding or successive clauses, further comprising a power source in electrical communication with the thermoelectric device to cool the first heat transfer surface.

According to a 557th clause, the system of any of the preceding or successive clauses, further comprising a power source in electrical communication with the thermoelectric device to heat the first heat transfer surface.

According to a 558th clause, a seat assembly, in combination with, or without, any of the successive clauses, comprising: a seat bottom; a seat back; and the system of any of the preceding or successive clauses.

According to a 559th clause, the seat assembly of any of the preceding or successive clauses, wherein the liquid heat transfer system further comprises a heat exchanger system to convey heat to or from the second heat transfer surface; and wherein the heat exchanger is spaced apart from the first heat transfer surface.

According to a 560th clause, a method, in combination with, or without, any of the successive clauses, comprising: pumping a liquid along a rear heat transfer surface of a thermoelectric device with a forward heat transfer surface installed in a seat assembly facing a seating surface; and pumping the liquid through a heat exchanger away from the thermoelectric device.

According to a 561st clause, the method of any of the preceding or successive clauses, further comprising: conducting electrical current through the thermoelectric device to heat or cool the forward heat transfer surface.

According to a 562nd clause, the method of any of the preceding or successive clauses, further comprising: conveying a fluid across the heat exchanger to transfer heat to or away from the heat exchanger.

According to a 563rd clause, a system, in combination with, or without, any of the successive clauses, comprising: a thermoelectric device with a first heat transfer surface and a second heat transfer surface adapted for installation in a seat assembly with the first heat transfer surface oriented facing a seating surface to transfer heat to or from the seating surface; and a fluid heat transfer system in fluid communication with the second heat transfer surface to transfer heat to or from the second heat transfer surface; and wherein a fluid is not conveyed across the thermoelectric device and through the seating surface.

According to a 564th clause, a system, in combination with, or without, any of the successive clauses, comprising: a thermoelectric device with a first heat transfer surface and a second heat transfer surface adapted for cooperation with a therapy device such that the first heat transfer surface is spaced apart from a contact surface of the therapy device to transfer heat to or from the contact surface; and a fluid heat transfer system in fluid communication with the thermoelectric device to transfer heat to or from the thermoelectric device.

According to a 565th clause, the system of any of the preceding or successive clauses, wherein the fluid heat transfer system is further defined as a first fluid heat transfer system in fluid communication with the first heat transfer surface to transfer heat to or from the contact surface of the therapy device.

According to a 566th clause, the system of any of the preceding or successive clauses, wherein the first fluid heat transfer system further comprises a fluid reservoir in fluid communication with the first heat transfer surface.

According to a 567th clause, the system of any of the preceding or successive clauses, further comprising tubing in fluid communication with the fluid reservoir and the therapy device to space the thermoelectric device away from the therapy device.

According to a 568th clause, the system of any of the preceding or successive clauses, further comprising insulation disposed about the tubing.

According to a 569th clause, the system of any of the preceding or successive clauses, further comprising a bladder in fluid communication with the tubing, wherein the bladder comprises the contact surface.

According to a 570th clause, the system of any of the preceding or successive clauses, wherein the bladder is sized to be oriented within a seat assembly.

According to a 571st clause, a seat assembly comprising: a seat bottom; a seat back; and the system of any of the preceding or successive clauses.

According to a 572nd clause, the system of any of the preceding or successive clauses, wherein the bladder is further defined as a sleeve.

According to a 573rd clause, the system of any of the preceding or successive clauses, wherein the first fluid heat transfer system further comprises a pump in fluid communication with the fluid reservoir to pump fluid from the fluid reservoir to the contact surface.

According to a 574th clause, the system of any of the preceding or successive clauses, further comprising a second fluid heat transfer system in fluid communication with the second heat transfer surface to transfer heat to or from the second heat transfer surface.

According to a 575th clause, the system of any of the preceding or successive clauses, wherein the second fluid heat transfer system further comprises a heat exchanger to convey heat to or from the second heat transfer surface.

According to a 576th clause, the system of any of the preceding or successive clauses, further comprising conductive pipes in conductive contact with the heat exchanger and the second heat transfer surface.

According to a 577th clause, the system of any of the preceding or successive clauses, wherein the thermoelectric device further comprises a material with a high electrical conductivity, a low thermal conductivity, and a temperature difference across the material in response to an induced thermoelectric voltage across the material.

According to a 578th clause, the system of any of the preceding or successive clauses, wherein the material of the thermoelectric device further comprises a conductive silicone or graphite.

According to a 579th clause, the system of any of the preceding or successive clauses, further comprising a power source in electrical communication with the thermoelectric device to cool the first heat transfer surface.

According to a 580th clause, the system of any of the preceding or successive clauses, further comprising a power source in electrical communication with the thermoelectric device to heat the first heat transfer surface.

According to a 581st clause, the system of any of the preceding or successive clauses, wherein the fluid heat transfer system further comprises a thermally conductive liquid.

According to a 582nd clause, a method, in combination with, or without, any of the preceding or successive clauses, comprising: pumping a liquid along a front heat transfer surface of a thermoelectric device with a rear heat transfer surface; and pumping the liquid through a therapy device with a contact surface, spaced apart from the thermoelectric device.

According to a 583rd clause, a system, in combination with, or without, any of the preceding or successive clauses, comprising: a therapy device with a contact surface: a thermoelectric device with a first heat transfer surface and a second heat transfer surface; a fluid reservoir in fluid communication with the first heat transfer surface; tubing in fluid communication with the fluid reservoir and the therapy device to space the thermoelectric device away from the therapy device; and a pump in fluid communication with the fluid reservoir to pump fluid from the fluid reservoir to the contact surface.

According to a 584th clause, a seat assembly includes a first number of pneumatic massage actuator, an air pump, and a pneumatic valve network. The pneumatic valve network distributes air from the air pump to any one of the pneumatic massage actuators. The one pneumatic massage actuator is selected based on states of a second number of binary electrical signals. No air from the air pump is routed to any of the actuators except the one selected pneumatic actuator. The first number exceeds the second number.

According to a 585th clause, the seat assembly of any of the preceding or successive clauses, wherein the second number exceeds two raised to the power of one less than the first number.

According to a 586th clause, the seat assembly of any of the preceding or successive clauses wherein the second number is equal to two raised to the power of the first number.

According to a 587th clause, the seat assembly of any of the preceding or successive clauses wherein the pneumatic valve network includes at least the first number of AND-type valves and the second number of signal valve assemblies. Each signal valve assembly routes air from a pressure source to a first signal line when and only when a corresponding binary electrical signal is in an ON state and to route air from the pressure source to a second signal line when and only when the corresponding binary electrical signal is in an OFF state.

According to a 588th clause, the seat assembly of any of the preceding or successive clauses wherein each of the signal valve assemblies includes a single output signal valve and a NOT-type valve. The single output signal valve routes air from a pressure source to the first signal line when and only when the corresponding binary electrical signal is in an ON state. The NOT-type valve routes air from the pressure source to the second signal line when and only when the first signal line is unpressurized.

According to a 589th clause, the seat assembly of any of the preceding or successive clauses wherein the signal valve assemblies each utilize a single spool in a single bore to route air to either the first signal line or the second signal line.

According to a 590th clause, the seat assembly of any of the preceding or successive clauses wherein the signal valve assemblies each further vent the first signal line when and only when the corresponding binary electrical signal is in the OFF state and to vent the second signal line when and only when the corresponding binary electrical signal is in the ON state.

According to a 591st clause, the seat assembly of any of the preceding or successive clauses further including the first number of NOT-type valves. Each of these NOT-type valves vents a corresponding one of the pneumatic massage actuators in response to an input line of the corresponding pneumatic massage actuator being unpressurized.

According to a 592nd clause, a seat assembly includes a first number of pneumatic massage actuators and NOT-type valves, an air pump, and a pneumatic network. The pneumatic valve network distributes air from the air pump to various subsets of the pneumatic massage actuators and only to that subset. The subset is selected based on states of a second number of binary electrical signals wherein the first number exceeds the second number. Each NOT-type valve vents a corresponding one of the pneumatic massage actuators in response to an input line of the corresponding pneumatic massage actuator being unpressurized.

According to a 593rd clause, the seat assembly of any of the preceding or successive clauses wherein the second number exceeds two raised to the power of one less than the first number.

According to a 594th clause, the seat assembly of any of the preceding or successive clauses wherein the second number is equal to two raised to the power of the first number.

According to a 595th clause, the seat assembly of any of the preceding or successive clauses wherein the pneumatic valve network includes at least the first number of AND-type valves and the second number of signal valve assemblies. Each signal valve assembly routes air from a pressure source to a first signal line when and only when a corresponding binary electrical signal is in an ON state and to route air from the pressure source to a second signal line when and only when the corresponding binary electrical signal is in an OFF state.

According to a 596th clause, the seat assembly of any of the preceding or successive clauses wherein each of the signal valve assemblies includes a single output signal valve and a NOT-type valve. The single output signal valve routes air from a pressure source to the first signal line when and only when the corresponding binary electrical signal is in an ON state. The NOT-type valve routes air from the pressure source to the second signal line when and only when the first signal line is unpressurized.

According to a 597th clause, the seat assembly of any of the preceding or successive clauses wherein the signal valve assemblies each utilize a single spool in a single bore to route air to either the first signal line or the second signal line.

According to a 598th clause, the seat assembly of any of the preceding or successive clauses wherein each of the various subsets of the pneumatic massage actuators includes exactly one pneumatic massage actuator.

According to a 599th clause, a seat assembly including a first number of pneumatic massage actuators, an air pump, and a pneumatic valve network. The pneumatic network distributes air from the air pump to various subsets of the pneumatic massage actuators and only to that subset. The subset is selected based on states of a second number of binary electrical signals wherein the first number exceeds the second number. The pneumatic network further vents air from all of the pneumatic massage actuator not in the selected subset.

According to a 600th clause, the seat assembly of any of the preceding or successive clauses wherein the second number exceeds two raised to the power of one less than the first number.

According to a 601st clause, the seat assembly of any of the preceding or successive clauses wherein the second number is equal to two raised to the power of the first number.

According to a 602nd clause, the seat assembly of any of the preceding or successive clauses wherein each of the various subsets of the pneumatic massage actuators includes exactly one pneumatic massage actuator.

According to a 603rd clause, a vehicle seat assembly includes a seat cushion, a massage actuator, an air pump, and a valve. The massage actuator is attached to the seat cushion. The valve includes a pressure port, at least one outlet port, a vent port, a spool, at least one spring, and a solenoid. The pressure port is fluidly connected to the air pump. The at least one outlet port is fluidly connected to the massage actuator. The spool slides within a bore. The at least one spring biases the spool toward a neutral position in which the at least one outlet port is isolated from both the pressure port and the vent port. The solenoid moves the spool to a first position in response to an electrical current in a first direction and to move the spool to a second position in response to an electrical current in a second direction. The at least one outlet port is fluidly connected to the pressure port when the spool is in the first position and is fluidly connected to the vent port when the spool is in the second position.

According to a 604th clause, the vehicle seat of any of the preceding or successive clauses wherein the at least one spring includes two compression springs, one on each side of the spool.

According to a 605th clause, the vehicle seat of any of the preceding or successive clauses wherein the at least one outlet port includes a first outlet port axially located between the vent port and the pressure port and blocked by the spool when the spool is in the neutral position.

According to a 606th clause, the vehicle seat of any of the preceding or successive clauses wherein the at least one outlet port further includes a second outlet port such that the pressure port is axially located between the first outlet port and the second outlet port. The pressure port is blocked by the spool when the spool is in the neutral position.

According to a 607th clause, the vehicle seat of any of the preceding or successive clauses wherein the pressure port is also blocked by the spool when the spool is in the second position.

According to a 608th clause, the vehicle seat of any of the preceding or successive clauses wherein the first outlet port is also blocked by the spool when the spool is in the first position.

According to a 609th clause, the vehicle seat of any of the preceding or successive clauses wherein the seat cushion is a seat back.

According to a 610th clause, the vehicle seat of any of the preceding or successive clauses wherein the massage actuator is one of a plurality of massage actuators attached to the seat cushion.

According to a 611st clause, a pneumatic valve includes a pressure port, at least one outlet port, a vent port, a spool, at least one spring, and a solenoid. The spool slides within a bore. The at least one spring biases the spool toward a neutral position in which the at least one outlet port is isolated from both the pressure port and the vent port. The solenoid moves the spool to a first position in response to an electrical current in a first direction and to move the spool to a second position in response to an electrical current in a second direction. The at least one outlet port is fluidly connected to the pressure port when the spool is in the first position and fluidly connected to the vent port when the spool is in the second position.

According to a 612th clause, the pneumatic valve of any of the preceding or successive clauses wherein the at least one spring includes two compression springs, one on each side of the spool.

According to a 613th clause, the pneumatic valve of any of the preceding or successive clauses wherein the at least one outlet port includes a first outlet port axially located between the vent port and the pressure port. The first outlet port is blocked by the spool when the spool is in the neutral position.

According to a 614th clause, the pneumatic valve of any of the preceding or successive clauses wherein the at least one outlet port further includes a second outlet port such that the pressure port is axially located between the first outlet port and the second outlet port. The pressure port is blocked by the spool when the spool is in the neutral position.

According to a 615th clause, the pneumatic valve of any of the preceding or successive clauses wherein the pressure port is also blocked by the spool when the spool is in the second position.

According to a 616th clause, the pneumatic valve of any of the preceding or successive clauses wherein the first outlet port is also blocked by the spool when the spool is in the first position.

According to a 617th clause, a vehicle seat assembly includes a seat cushion, a massage actuator, an air pump, and a valve. The massage actuator is attached to the seat cushion. The valve includes a pressure port, at least one outlet port, a vent port, a spool, at least one spring, and a solenoid. The pressure port is fluidly connected to the air pump. The at least one outlet port is fluidly connected to the massage actuator. The spool slides within a bore. The at least one spring biases the spool toward a holding position in which the actuator is maintained in its current state of inflation. The solenoid moves the spool to an inflation position in response to an electrical current in a first direction and moves the spool to a deflation position in response to an electrical current in a second direction. Air is routed from the air pump to the massage actuator when the spool is in the inflation position. Air is routed from the massage actuator to the environment via the vent port when the spool is in the deflation position.

According to a 618th clause, the vehicle seat of any of the preceding or successive clauses wherein the at least one spring includes two compression springs, one on each side of the spool.

According to a 619th clause, the vehicle seat of any of the preceding or successive clauses wherein the at least one outlet port includes a first outlet port axially located between the vent port and the pressure port and blocked by the spool when the spool is in the holding position.

According to a 620th clause, the vehicle seat of any of the preceding or successive clauses wherein the at least one outlet port further includes a second outlet port such that the pressure port is axially located between the first outlet port and the second outlet port. The pressure port is blocked by the spool when the spool is in the holding position.

According to a 621st clause, the vehicle seat of any of the preceding or successive clauses wherein the pressure port is also blocked by the spool when the spool is in the deflation position.

According to a 622nd clause, the vehicle seat of any of the preceding or successive clauses wherein the first outlet port is also blocked by the spool when the spool is in the inflation position.

According to a 623rd clause, a vehicle seat cushion assembly includes a stranded thermoplastic mesh seat cushion, an envelope, and a multi-layer trim cover. The envelope encircles the seat cushion and conforms thereto. The multi-layer trim cover has an outer layer and an inner layer. The inner layer is attached to the envelope by hook and loop fasteners.

According to a 624th clause, the vehicle seat cushion assembly of any of the preceding or successive clauses wherein envelope has a portion with loops and the inner layer of the multi-layer trim cover includes hooks engaging the loops.

According to a 625th clause, the vehicle seat cushion assembly of any of the preceding or successive clauses wherein the inner layer of the multi-layer trim cover has loops and the envelope has a portion with hooks engaging the loops.

According to a 626th clause, the vehicle seat cushion assembly of any of the preceding or successive clauses wherein the multi-layer trim cover has a foam layer between the outer layer and the inner layer.

According to a 627th clause, the vehicle seat cushion assembly of any of the preceding or successive clauses wherein a surface of the seat cushion adjacent to the trim cover is concave.

According to a 628th clause, the vehicle seat cushion assembly of any of the preceding or successive clauses wherein the envelope includes features that extend into slots in the cushion to prevent the envelope from separating from the concave surface.

According to a 629th clause, the vehicle seat cushion assembly of any of the preceding or successive clauses wherein the envelope has stiffeners adjacent to the concave surface preventing the envelope from separating from the concave surface.

According to a 630th clause, the vehicle seat cushion assembly of any of the preceding or successive clauses wherein a partial vacuum is maintained within the envelope causing the envelope to conform to the seat cushion.

According to a 631st clause, the vehicle seat cushion assembly of any of the preceding or successive clauses wherein the partial vacuum is maintained using an air pump that is part of a seat ventilation system.

According to a 632nd clause, a vehicle seat cushion assembly includes a stranded thermoplastic mesh seat cushion, and envelope, and a multi-layer trim cover. The envelope encircles the seat cushion. The multi-layer trim cover has an outer layer and an inner layer which is fastened to the envelope. A partial vacuum is maintained within the envelope causing the envelope to conform to the seat cushion.

According to a 633rd clause, the vehicle seat cushion assembly of any of the preceding or successive clauses wherein the envelope has a portion with loops and the inner layer of the multi-layer trim cover includes hooks engaging the loops.

According to a 634th clause, the vehicle seat cushion assembly of any of the preceding or successive clauses wherein the inner layer of the multi-layer trim cover has loops and a envelope has a portion with hooks engaging the loops.

According to a 635th clause, the vehicle seat cushion of any of the preceding or successive clauses wherein the multi-layer trim cover has a foam layer between the outer layer and the inner layer.

According to a 636th clause, the vehicle seat cushion assembly of any of the preceding or successive clauses wherein a surface of the seat cushion adjacent to the trim cover is concave.

According to a 637th clause, the vehicle seat cushion of any of the preceding or successive clauses wherein the partial vacuum is maintained using an air pump that is part of a seat ventilation system.

According to a 638th clause, a vehicle seat cushion assembly includes a stranded thermoplastic mesh seat cushion, an envelope, and a multi-layer trim cover. The stranded thermoplastic mesh seat cushion has a concave surface. The envelope encircles the seat cushion and has stiffeners adjacent to the concave surface preventing the envelope from separating from the concave surface. The multi-layer trim cover has an outer layer and an inner layer fastened to the envelope.

According to a 639th clause, the vehicle seat cushion assembly of any of the preceding or successive clauses wherein the envelope has a portion with loops and the inner layer of the multi-layer trim cover includes hooks engaging the loops.

According to a 640th clause, the vehicle seat cushion assembly of any of the preceding or successive clauses wherein the inner layer of the multi-layer trim cover has loops and a envelope has a portion with hooks engaging the loops.

According to a 641st clause, the vehicle seat cushion of any of the preceding or successive clauses wherein the multi-layer trim cover has a foam layer between the outer layer and the inner layer.

According to a 642nd clause, the vehicle seat cushion of any of the preceding or successive clauses wherein envelope includes features that extend into slots in the cushion to prevent the envelope from separating from the concave surface.

According to a 643rd clause, any of the preceding clauses in any combination.

Seat assemblies, seats, or chairs may be used herein to refer generally to an assembly which incorporates the teachings of one or more embodiments disclosed herein, which may include any combination of embodiments, or features of embodiments disclosed herein. Similarly, the terms: seat assembly, seat, or chair may refer to the same or similar assemblies. Scat bottoms, backs, bases, head restraints, headrests, or bolsters may be used herein to refer generally to any component, region or portion of a seat assembly, vehicle seat, or chair. Layers, sheets, substrates, portions, sections, regions, or segments may refer to any planar, non-planar, shaped, or contoured portion or region of a seat bottom, back, base, head restraint, headrest, or bolster formed from any disclosed material or combination of materials to provide a comfort and/or structure for the seat bottom, back, base, head restraint, headrest, or bolster. Bonded, connected, welded, sewn, fastened, retained, adhered, attached, coupled, or staked may refer to any manufacturing method or process for connecting components with or without fasteners, retainers, adhesives, welds, hog rings, connector strips, retention clips, hook and loop fasteners, clamps, deflective angled ribbed shank fasteners, barbed fasteners, lamination, compression molding, or additional trim components. Filaments, strands, bends, or loops may be used herein to refer to the generally linear polymeric units (although they may be looped, fused or bonded together to form a mesh-like structure) after being dispensed through one or more orifices of the die, plate, die plate, tool, tooling plate, extrusion die, or breaker plate, or other variations thereof, which are likewise used to refer to equivalent components. Similarly, the terms: consolidated filament structure, filament structure, entangled filament structure, yield strands, body, mesh, final member, nonfoam (component), non-woven mesh, foamless material, support, component, core, member, extruded material, cushioning, cushion, or cushion component may refer to the same or similar components. The description herein may also use various terms to refer to a hole such as a hole, an orifice, an aperture, a vent, a port, etc. In still other embodiments, carrier, carrier board, rigid board, board, substrate, and/or support structure may be used interchangeable to refer to various embodiments and structures of varying scope that support or retain various structure components such as a blower. The use of different terms to refer to the same or similar components may be used to avoid confusion when describing different preferred embodiments. The terms may be interchangeable as various components of features from various embodiments may be combined in manners not expressly described herein. This does not detract from the fact that certain terms may provide inherent detail not included by other interchangeable term(s) unless expressly stated otherwise (e.g., water tank and liquid tank refer to similar interchangeable components although in at least one preferred embodiment, the tank is filled with water or arranged to be filled with water as opposed to any liquid when water tank is used).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly or system comprising:

a) a valve body sized for translation within a fluid chamber, a pair of opposed seals oriented on the valve body to seal a pair of ports, and a linear actuator mounted on the valve body to actuate the valve body;

b) a valve body formed from a polymeric material, sized for translation within a fluid chamber spring formed integrally with the valve body, extending from the valve body to bias the valve body in one direction, and a linear actuator mounted on the valve body to actuate the valve body and compress the fluid chamber spring;

c) a housing with a fluid chamber formed therein with a first port, a second port, and a third port in fluid communication with the fluid chamber, wherein the first port or the third port is formed at a distal end of the fluid chamber, and a valve oriented in the fluid chamber for translation to: an inflate position whereby fluid passes from a source of pressurized fluid into the first port, through the fluid chamber and out of the second port to inflate a fluid bladder, while the third port is sealed from the fluid chamber, and a deflate position whereby fluid passes from the fluid bladder into the second port, through the fluid chamber and out of the third port to deflate the fluid bladder, while the first port is sealed from the fluid chamber;

d) a housing with a matrix of fluid chambers, a plurality of gate valves, each provided in one of the matrix of fluid chambers, a plurality of inflate pressure inlets, each in fluid cooperation with a subset of the fluid chambers and a first source of pressurized fluid, a plurality of control pressure inlets, each in fluid cooperation with one fluid chamber of each subset of the fluid chambers and a second source of pressurized fluid, a plurality of ports, each in fluid cooperation with one of the matrix of fluid chambers to inflate a fluid actuator when pressurized fluid is conveyed through a corresponding inflate pressure inlet of the plurality of inflate pressure inlets and a corresponding control pressure inlet of the plurality of control pressure inlets of a corresponding fluid chamber of the matrix of fluid chambers, and to deflate the fluid actuator when pressurized fluid is not conveyed through at least one of the corresponding inflate pressure inlet and the corresponding control pressure inlet of the corresponding fluid chamber, and a controller in communication with the first source of pressurized fluid and the second source of pressurized fluid so that a first subset of the plurality of gate valves is operated in a constant inflation position, and a second subset of the plurality of gate valves is operated in a constant deflation position;

e) a piston body with a rectangular cross section, and a seal oriented about the piston body to engage an inner wall of a fluid chamber;

f) a first valve having a first valve element, a second valve having a second valve element, the second valve positioned adjacent to the first valve, and a first actuator with an actuator member movable between a first actuator position and a second actuator position, the actuator member coupled to each of the first valve element and the second valve element for movement therewith;

g) a pump, a first rail connected to the pump via at one or more control valves, a second rail connected to the pump via the one or more control valves, wherein the one or more control valves control fluid flow from the pump to one of the first rail and the second rail, a series of first valves, each first valve having a first port with an associated first valve element and an associated second valve element, and a vent line, the first port of each of the first valves receiving pressurized fluid from the first rail via the first valve element, a series of first bladders, each first bladder fluidly coupled to the first port of one of the first valves, a series of pairs of second valves, each second valve having a second port with an associated third valve element, the second port of each of the second valves receiving pressurized fluid from the second rail, a series of second bladders, each second bladder fluidly coupled to the second port of one of the second valves, and a series of pairs of actuators, one of the actuators in each pair of actuators coupled to the first valve element and third valve element of one of the second valves in each pair for movement therewith, and the other of the actuators in each pair of actuators coupled to the second valve element and third valve element of the other of the second valves in each pair for movement therewith;

h) a first number of pneumatic massage actuators, an air pump, and a pneumatic valve network to distribute air from the air pump to any one of the pneumatic massage actuators, the one pneumatic massage actuator selected based on states of a second number of binary electrical signals, wherein no air from the air pump is routed to any of the actuators of the first number of pneumatic massage actuators except the one selected pneumatic actuator, and the first number exceeds the second number;

i) a first number of pneumatic massage actuators, an air pump, a pneumatic valve network to distribute air from the air pump to various subsets of the pneumatic massage actuators and only to that subset, the subset selected based on states of a second number of binary electrical signals wherein the first number exceeds the second number, and a first number of NOT-type valves, each NOT-type valve to vent a corresponding one of the pneumatic massage actuators in response to an input line of the corresponding pneumatic massage actuator being unpressurized;

j) a first number of pneumatic massage actuators, an air pump, and a pneumatic valve network to distribute air from the air pump to various subsets of the pneumatic massage actuators and only to that subset, the subset selected based on states of a second number of binary electrical signals wherein the first number exceeds the second number, and vent air from all of the pneumatic massage actuators not in the selected subset;

k) a massage actuator adapted to be attached to a seat cushion, an air pump, and a valve comprising: a pressure port fluidly connected to the air pump, at least one outlet port fluidly connected to the massage actuator, a vent port, a spool to slide within a bore, at least one spring to bias the spool toward a neutral position in which the at least one outlet port is isolated from both the pressure port and the vent port, and a solenoid to move the spool to a first position in response to an electrical current in a first direction and to move the spool to a second position in response to an electrical current in a second direction, the at least one outlet port being fluidly connected to the pressure port when the spool is in the first position and fluidly connected to the vent port when the spool is in the second position;

l) A pressure port, at least one outlet port, a vent port, a spool to slide within a bore, at least one spring to bias the spool toward a neutral position in which the at least one outlet port is isolated from both the pressure port and the vent port, and a solenoid to move the spool to a first position in response to an electrical current in a first direction and to move the spool to a second position in response to an electrical current in a second direction, the at least one outlet port being fluidly connected to the pressure port when the spool is in the first position and fluidly connected to the vent port when the spool is in the second position; and/or m) a massage actuator adapted to be attached to a seat cushion, an air pump, and a valve comprising: a pressure port fluidly connected to the air pump, at least one outlet port fluidly connected to the massage actuator, a vent port, a spool to slide within a bore, at least one spring to bias the spool toward a holding position in which the actuator is maintained in its current state of inflation, and a solenoid to move the spool to an inflation position in response to an electrical current in a first direction and to move the spool to a deflation position in response to an electrical current in a second direction, air being routed from the air pump to the massage actuator when the spool is in the inflation position and air being routed from the massage actuator to an environment via the vent port when the spool is in the deflation position.

2. The assembly or system of claim 1 further comprising: the valve body sized for translation within the fluid chamber; the pair of opposed seals oriented on the valve body to seal the pair of ports; and the linear actuator mounted on the valve body to actuate the valve body.

3. The assembly or system of claim 1, wherein the linear actuator further comprises a shape memory alloy to translate the valve body in response to an electrical current conducted through the shape memory alloy.

4. The assembly or system of claim 1, wherein the valve body is elongate; and wherein each of the pair of opposed seals are spaced apart and oriented on distal ends of the elongate valve body.

5. The assembly or system of claim 1, further comprising: a housing with the fluid chamber formed therein with a first port, a second port, and a third port in fluid communication with the fluid chamber; and wherein the valve body is oriented in the fluid chamber for translation relative thereto.

6. The assembly or system of claim 5, wherein the valve body is translatable to an inflate position whereby fluid passes from a source of pressurized fluid into the first port, through the fluid chamber and out of the second port to inflate a fluid bladder, while the third port is sealed from the fluid chamber; and wherein the valve body is translatable to a deflate position whereby fluid passes from the fluid bladder into the second port, through the fluid chamber and out of the third port to deflate the fluid bladder, while the first port is sealed from the fluid chamber.

7. The assembly or system of claim 6, further comprising an actuator connected to the second port.

8. An assembly or system comprising: a housing with a plurality of fluid chambers formed therein, each with a first port, a second port, and a third port; and a plurality of valve assemblies, each according to the valve body of claim 1, wherein the valve body of each valve assembly is oriented for translation in one of the plurality of fluid chambers.

9. The assembly or system of claim 1 further comprising: the valve body formed from the polymeric material, sized for translation within the fluid chamber; the fluid chamber spring formed integrally with the valve body, extending from the valve body to bias the valve body in one direction; and the linear actuator mounted on the valve body to actuate the valve body and compress the fluid chamber spring.

10. The assembly or system of claim 9, wherein the linear actuator further comprises a shape memory alloy to translate the valve body in response to an electrical current conducted through the shape memory alloy.

11. The assembly or system of claim 10, further comprising a beam extending from the valve body.

12. The assembly or system of claim 11, wherein the beam has a first thickness; and wherein the spring has a second thickness that is reduced relative to the first thickness.

13. The assembly or system of claim 11, wherein the spring further comprises a compression spring.

14. The assembly or system of claim 11, further comprising an electrical terminal mounted on the beam in electrical communication with the shape memory alloy.

15. The assembly or system of claim 10, further comprising: a housing with the fluid chamber formed therein with a first port, a second port, and a third port in fluid communication with the fluid chamber; and wherein the valve body is oriented in the fluid chamber for translation relative thereto.

16. The assembly or system of claim 15, wherein the valve body is translatable to an inflate position whereby fluid passes from a source of pressurized fluid into the first port, through the fluid chamber and out of the second port to inflate a fluid bladder, while the third port is sealed from the fluid chamber; and wherein the valve body is translatable to a deflate position whereby fluid passes from the fluid bladder into the second port, through the fluid chamber and out of the third port to deflate the fluid bladder, while the first port is sealed from the fluid chamber.

17. The assembly or system of claim 15, further comprising: an actuator connected to the second port; and a source of pressurized fluid connected to the first port.

18. An assembly or system comprising: a housing with a plurality of fluid chambers formed therein, each with a first port, a second port, and a third port in fluid communication with at least one fluid chamber of a plurality of fluid chambers; and a plurality of valve assemblies, each according to the valve body of claim 9, wherein the valve body of each valve assembly is oriented for translation in one of the plurality of fluid chambers.

19. A method comprising:

pumping fluid flow to a first rail via a control valve in a first position;

pumping fluid flow to a second rail via the control valve in a second position;

actuating a first actuator to a first position thereby moving a first valve element in a first valve and a second valve element in a second valve to open positions with the control valve in the first position thereby inflating a first bladder connected to the first valve while maintaining deflation of a second bladder connected to the second valve;

actuating the first actuator to the first position thereby moving the first valve element and the second valve element to open positions with the control valve in the second position thereby inflating the second bladder connected to the second valve without changing a state of inflation of the first bladder; and actuating a second actuator to a first position thereby moving a third valve element in the first valve and a fourth valve element in a third valve to open positions with the control valve in the first position thereby deflating a first bladder connected to the first valve while maintaining deflation of a third bladder connected to the third valve.

20. The method of claim 19 further comprising opening a vent valve to a vent position thereby fluidly coupling the second rail to atmosphere; and opening a check valve in response to a pressure in the second rail being less than a pressure in the first valve thereby deflating the first bladder with the second actuator in the first position.

* * * * *